United States Patent [19]

Allen, Jr. et al.

[11] Patent Number: 4,837,735

[45] Date of Patent: Jun. 6, 1989

[54] PARALLEL MACHINE ARCHITECTURE FOR PRODUCTION RULE SYSTEMS

[75] Inventors: John D. Allen, Jr.; Philip L. Butler, both of Knoxville, Tenn.

[73] Assignee: Martin Marietta Energy Systems, Inc., Oak Ridge, Tenn.

[21] Appl. No.: 59,976

[22] Filed: Jun. 9, 1987

[51] Int. Cl.[4] .............................................. G06F 15/16

[52] U.S. Cl. .................................... 364/513; 364/200

[58] Field of Search ........ 364/513, 300, 200 MS File, 364/900 MS File

[56] References Cited

U.S. PATENT DOCUMENTS 4,709,327 11/1987 Hillis et al. ......................... 364/200

*Primary Examiner*—Allen MacDonald

*Attorney, Agent, or Firm*—Bruce M. Winchell

[57] ABSTRACT

A parallel processing system for production rule programs utilizes a host processor for storing production rule right hand sides (RHS) and a plurality of rule processors for storing left hand sides (LHS). The rule processors operate in parallel in the recognize phase of the system recognize -Act Cycle to match their respective LHS's against a stored list of working memory elements (WME) in order to find a self consistent set of WME's. The list of WME is dynamically varied during the Act phase of the system in which the host executes or fires rule RHS's for those rules for which a self-consistent set has been found by the rule processors. The host transmits instructions for creating or deleting working memory elements as dictated by the rule firings until the rule processors are unable to find any further self-consistent working memory element sets at which time the production rule system is halted.

55 Claims, 66 Drawing Sheets

| HEAT ADDR | CHIP | ROW ADDR PIN | COL ADDR PIN |
|---|---|---|---|
| C-A0 | CH | A6/11 | A5/10 |
| C-A1 | CH | A7/5 | A8/6 |
| C-A2 | CG | A10/11 | A9/10 |
| C-A3 | CG | A11/5 | A12/6 |
| C-A4 | CF | A14-11 | A13/10 |
| C-A5 | CF | A15/5 | A16/6 |
| C-A6 | CE | A3/11 | A4/10 |
| C-A7 | CE | A2/5 | A1/6 |
| C-A8 | CD | A17/11 | A18/10 |

| SPARE | FC2 | FC1 | FCO | AS* | | *DATA* | *PGM* | DTK* | VPA* |
|---|---|---|---|---|---|---|---|---|---|
| X | 0 | 0 | 0 | 0 | X | 1 | 1 | 0 | 1 |
| X | 0 | 0 | 0 | 1 | X | 1 | 1 | 1 | 1 |
| X | 0 | 0 | 1 | 0 | X | 0 | 1 | 0 | 1 |
| X | 0 | 0 | 1 | 1 | X | 1 | 1 | 1 | 1 |
| X | 0 | 1 | 0 | 0 | X | 1 | 0 | 0 | 1 |
| X | 0 | 1 | 0 | 1 | X | 1 | 1 | 1 | 1 |
| X | 0 | 1 | 1 | 0 | X | 1 | 1 | 0 | 1 |
| X | 0 | 1 | 1 | 1 | X | 1 | 1 | 1 | 1 |
| X | 1 | 0 | 0 | 0 | X | 1 | 1 | 0 | 1 |
| X | 1 | 0 | 0 | 1 | X | 1 | 1 | 1 | 1 |
| X | 1 | 0 | 1 | 0 | X | 0 | 1 | 0 | 1 |
| X | 1 | 0 | 1 | 1 | X | 1 | 1 | 1 | 1 |
| X | 1 | 1 | 0 | 0 | X | 1 | 0 | 0 | 1 |
| X | 1 | 1 | 0 | 1 | X | 1 | 1 | 1 | 1 |
| X | 1 | 1 | 1 | 0 | X | 1 | 1 | 1 | 0 |
| X | 1 | 1 | 1 | 1 | X | 1 | 1 | 1 | 1 |

*FOR DEBUG PURPOSES ONLY

FIG. 18

| S* | RS | BG* | AS* | Y | X | X | MR* | L*/H | L/H* | ACK* | BR* | Yn+1 |
|---|---|---|---|---|---|---|---|---|---|---|---|---|
| 0 | 0 | 0 | 0 | 0 | 0 | 0 | 0 | 1 | 0 | 1 | 0 | 1 |
| 0 | 0 | 0 | 0 | 1 | 0 | 0 | 0 | 1 | 0 | 1 | 0 | 1 |
| 0 | 0 | 0 | 1 | 0 | 0 | 0 | 0 | 1 | 0 | 1 | 0 | 1 |
| 0 | 0 | 0 | 1 | 1 | 0 | 0 | 0 | 1 | 0 | 1 | 0 | 1 |
| 0 | 0 | 1 | 0 | 0 | 0 | 0 | 0 | 1 | 0 | 1 | 0 | 1 |
| 0 | 0 | 1 | 0 | 1 | 0 | 0 | 0 | 1 | 0 | 1 | 0 | 1 |
| 0 | 0 | 1 | 1 | 0 | 0 | 0 | 0 | 1 | 0 | 1 | 0 | 1 |
| 0 | 0 | 1 | 1 | 1 | 0 | 0 | 0 | 1 | 0 | 1 | 0 | 1 |
| 0 | 1 | 0 | 0 | 0 | 0 | 0 | 1 | 0 | 1· | 1 | 0 | 1 |
| 0 | 1 | 0 | 0 | 1 | 0 | 0 | 1 | 0 | 1 | 1 | 0 | 1 |
| 0 | 1 | 0 | 1 | 0 | 0 | 0 | 0 | 1 | 0 | 1 | 0 | 1 |
| 0 | 1 | 0 | 1 | 1 | 0 | 0 | 0 | 1 | 0 | 1 | 0 | 1 |
| 0 | 1 | 1 | 0 | 0 | 0 | 0 | 1 | 0 | 1 | 1 | 0 | 1 |
| 0 | 1 | 1 | 0 | 1 | 0 | 0 | 1 | 0 | 1 | 1 | 0 | 1 |
| 0 | 1 | 1 | 1 | 0 | 0 | 0 | 1 | 0 | 1 | 1 | 0 | 1 |
| 0 | 1 | 1 | 1 | 1 | 0 | 0 | 1 | 0 | 1 | 1 | 0 | 1 |
| 1 | 0 | 0 | 0 | 0 | 0 | 0 | 0 | 0 | 1 | 1 | 1 | 0 |
| 1 | 0 | 0 | 0 | 1 | 0 | 0 | 0 | 0 | 1 | 1 | 1 | 0 |
| 1 | 0 | 0 | 1 | 0 | 0 | 0 | 0 | 0 | 1 | 1 | 1 | 0 |
| 1 | 0 | 0 | 1 | 1 | 0 | 0 | 0 | 0 | 1 | 1 | 1 | 0 |
| 1 | 0 | 1 | 0 | 0 | 0 | 0 | 0 | 0 | 1 | 1 | 1 | 0 |
| 1 | 0 | 1 | 0 | 1 | 0 | 0 | 0 | 0 | 1 | 1 | 1 | 0 |
| 1 | 0 | 1 | 1 | 0 | 0 | 0 | 0 | 0 | 1 | 1 | 1 | 0 |
| 1 | 0 | 1 | 1 | 1 | 0 | 0 | 0 | 0 | 1 | 1 | 1 | 0 |
| 1 | 1 | 0 | 0 | 0 | 0 | 0 | 0 | 0 | 1 | 1 | 1 | 0 |
| 1 | 1 | 0 | 0 | 1 | 0 | 0 | 0 | 0 | 1 | 1 | 1 | 0 |
| 1 | 1 | 0 | 1 | 0 | 0 | 0 | 0 | 0 | 1 | 1 | 1 | 0 |
| 1 | 1 | 0 | 1 | 1 | 0 | 0 | 0 | 0 | 1 | 1 | 1 | 0 |
| 1 | 1 | 1 | 0 | 0 | 0 | 0 | 0 | 0 | 1 | 1 | 1 | 0 |
| 1 | 1 | 1 | 0 | 1 | 0 | 0 | 0 | 0 | 1 | 1 | 1 | 0 |
| 1 | 1 | 1 | 1 | 0 | 0 | 0 | 0 | 0 | 1 | 1 | 1 | 0 |
| 1 | 1 | 1 | 1 | 1 | 0 | 0 | 0 | 0 | 1 | 1 | 1 | 0 |

"1" WHEN NOT READY

Fig. 19

| NET* | BDSEL | W IN* | W A1 | W AO | S3* | SO* | S1* | S2 | SPARE | SEL* |
|---|---|---|---|---|---|---|---|---|---|---|
| 0 | X | X | X | X | 0 | 0 | 0 | 0 | X | 0 |
| 1 | 0 | 0 | 0 | 0 | 1 | 1 | 1 | 1 | X | 1 |
| 1 | 0 | 0 | 0 | 1 | 1 | 1 | 1 | 1 | X | 1 |
| 1 | 0 | 0 | 1 | 0 | 1 | 1 | 1 | 1 | X | 1 |
| 1 | 0 | 0 | 1 | 1 | 1 | 1 | 1 | 1 | X | 1 |
| 1 | 0 | 1 | 0 | 0 | 1 | 1 | 1 | 1 | X | 1 |
| 1 | 0 | 1 | 0 | 1 | 1 | 1 | 1 | 1 | X | 1 |
| 1 | 0 | 1 | 1 | 0 | 1 | 1 | 1 | 1 | X | 1 |
| 1 | 0 | 1 | 1 | 1 | 1 | 1 | 1 | 1 | X | 1 |
| 1 | 1 | 0 | 0 | 0 | 1 | 0 | 1 | 1 | X | 0 |
| 1 | 1 | 0 | 0 | 1 | 1 | 1 | 0 | 1 | X | 0 |
| 1 | 1 | 0 | 1 | 0 | 1 | 1 | 1 | 0 | X | 0 |
| 1 | 1 | 0 | 1 | 1 | 0 | 1 | 1 | 1 | X | 0 |
| 1 | 1 | 1 | 0 | 0 | 1 | 1 | 1 | 1 | X | 1 |
| 1 | 1 | 1 | 0 | 1 | 1 | 1 | 1 | 1 | X | 1 |
| 1 | 1 | 1 | 1 | 0 | 1 | 1 | 1 | 1 | X | 1 |
| 1 | 1 | 1 | 1 | 1 | 1 | 1 | 1 | 1 | X | 1 |

FIG. 26

| REF | W* | BDS | STE* | S* | ST* | 6 | 5 | 4 | 3 | 2 | ST* | DB* |
|---|---|---|---|---|---|---|---|---|---|---|---|---|
| 0 | 0 | 0 | 0 | 0 | 1 | 0 | 0 | 0 | 0 | 0 | 1 | 1 |
| 0 | 0 | 0 | 0 | 1 | 1 | 0 | 0 | 0 | 0 | 0 | 1 | 1 |
| 0 | 0 | 0 | 1 | 0 | 1 | 0 | 0 | 0 | 0 | 0 | 1 | 0 |
| 0 | 0 | 0 | 1 | 1 | 1 | 0 | 0 | 0 | 0 | 0 | 1 | 1 |
| 0 | 0 | 1 | 0 | 0 | 1 | 0 | 0 | 0 | 0 | 0 | 1 | 1 |
| 0 | 0 | 1 | 0 | 1 | 1 | 0 | 0 | 0 | 0 | 0 | 1 | 1 |
| 0 | 0 | 1 | 1 | 0 | 1 | 0 | 0 | 0 | 0 | 0 | 1 | 0 |
| 0 | 0 | 1 | 1 | 1 | 1 | 0 | 0 | 0 | 0 | 0 | 1 | 1 |
| 0 | 1 | 0 | 0 | 0 | 1 | 0 | 0 | 0 | 0 | 0 | 1 | 1 |
| 0 | 1 | 0 | 0 | 1 | 1 | 0 | 0 | 0 | 0 | 0 | 1 | 1 |
| 0 | 1 | 0 | 1 | 0 | 1 | 0 | 0 | 0 | 0 | 0 | 1 | 1 |
| 0 | 1 | 0 | 1 | 1 | 1 | 0 | 0 | 0 | 0 | 0 | 1 | 1 |
| 0 | 1 | 1 | 0 | 0 | 1 | 0 | 0 | 0 | 0 | 0 | 1 | 1 |
| 0 | 1 | 1 | 0 | 1 | 0 | 0 | 0 | 0 | 0 | 0 | 0 | 0 |
| 0 | 1 | 1 | 1 | 0 | 1 | 0 | 0 | 0 | 0 | 0 | 1 | 0 |
| 0 | 1 | 1 | 1 | 1 | 1 | 0 | 0 | 0 | 0 | 0 | 1 | 1 |
| 1 | 0 | 0 | 0 | 0 | 1 | 0 | 0 | 0 | 0 | 0 | 1 | 1 |
| 1 | 0 | 0 | 0 | 1 | 1 | 0 | 0 | 0 | 0 | 0 | 1 | 1 |
| 1 | 0 | 0 | 1 | 0 | 1 | 0 | 0 | 0 | 0 | 0 | 1 | 1 |
| 1 | 0 | 0 | 1 | 1 | 1 | 0 | 0 | 0 | 0 | 0 | 1 | 1 |
| 1 | 0 | 1 | 0 | 0 | 1 | 0 | 0 | 0 | 0 | 0 | 1 | 1 |
| 1 | 0 | 1 | 0 | 1 | 1 | 0 | 0 | 0 | 0 | 0 | 1 | 1 |
| 1 | 0 | 1 | 1 | 0 | 1 | 0 | 0 | 0 | 0 | 0 | 1 | 1 |
| 1 | 0 | 1 | 1 | 1 | 1 | 0 | 0 | 0 | 0 | 0 | 1 | 1 |
| 1 | 1 | 0 | 0 | 0 | 1 | 0 | 0 | 0 | 0 | 0 | 1 | 1 |
| 1 | 1 | 0 | 0 | 1 | 1 | 0 | 0 | 0 | 0 | 0 | 1 | 1 |
| 1 | 1 | 0 | 1 | 0 | 1 | 0 | 0 | 0 | 0 | 0 | 1 | 1 |
| 1 | 1 | 0 | 1 | 1 | 1 | 0 | 0 | 0 | 0 | 0 | 1 | 1 |
| 1 | 1 | 1 | 0 | 0 | 1 | 0 | 0 | 0 | 0 | 0 | 1 | 1 |
| 1 | 1 | 1 | 0 | 1 | 0 | 0 | 0 | 0 | 0 | 0 | 0 | 0 |
| 1 | 1 | 1 | 1 | 0 | 1 | 0 | 0 | 0 | 0 | 0 | 1 | 1 |
| 1 | 1 | 1 | 1 | 1 | 1 | 0 | 0 | 0 | 0 | 0 | 1 | 1 |

FIG. 27

BD-SEL=H-A23*H-A22*H-A21 (SELECT BASE ADDRESS SC00000)

R/W=H-WR*H-RD*

READ-ONLY = H-RD* * H-WR*

WRITE-ONLY = H-RD* * H-WR*

<u>I-NETWORK*</u>

I-NETWORK*=BD-SEL * WRITE ONLY * H-A19 * H-20

<u>I-WINDOW*</u>

I-WINDOW*=BO-SEL * R/W * H-A19* @ H-A20*

<u>I-STATEN*</u>

I-STATEN*=BO-SEL * READ-ONLY * H-A20* * H-A19* * H-A18*

<u>CELL BOARD ACCESS</u>

CELL BOARD ACCESS = I-NETWORK* + I-WINDOW*

<u>I-W*</u>

I-W* = CELL BOARD ACCESS + H-WR*

<u>I/O ENABLE*</u>

I/O ENABLE* = BO-SEL * R/W * H-A19* *H-A20*

<u>W1-ACCESS*</u>

W1-ACCESS* = BO-SEL * R/W * H-A19* * H-A20*

<u>W2-ACCESS*</u>

W1-ACCESS* = BO-SEL * R/W * H-A19* * H-A20*

Fig. 34

| A23 | A22 | A21 | A20 | A19 | A18 | WR | RD | W2 | W1 | CELL | I/O | W | ST | WN | NT | |
|---|---|---|---|---|---|---|---|---|---|---|---|---|---|---|---|---|
| 0 | 0 | 0 | X | X | X | X | X | 1 | 1 | 0 | 1 | 1 | 1 | 1 | 1 | |
| 0 | 0 | 1 | 0 | 0 | 0 | 0 | 0 | 1 | 1 | 0 | 1 | 1 | 1 | 1 | 1 | |
| 0 | 0 | 1 | 0 | 0 | 0 | 0 | 1 | 1 | 1 | 0 | 1 | 1 | 1 | 1 | 1 | |
| 0 | 0 | 1 | 0 | 0 | 0 | 1 | 0 | 1 | 1 | 0 | 1 | 1 | 0 | 1 | 1 | STATEN |
| 0 | 0 | 1 | 0 | 0 | 0 | 1 | 1 | 1 | 1 | 0 | 1 | 1 | 1 | 1 | 1 | |
| 0 | 0 | 1 | 0 | 0 | 1 | 0 | 0 | 1 | 1 | 0 | 1 | 1 | 1 | 1 | 1 | |
| 0 | 0 | 1 | 0 | 0 | 1 | 0 | 1 | 1 | 1 | 0 | 0 | 1 | 1 | 1 | 1 | IF BOARD I/O |
| 0 | 0 | 1 | 0 | 0 | 1 | 1 | 0 | 1 | 1 | 0 | 0 | 1 | 1 | 1 | 1 | IF BOARD I/O |
| 0 | 0 | 1 | 0 | 0 | 1 | 1 | 1 | 1 | 1 | 0 | 1 | 1 | 1 | 1 | 1 | |
| 0 | 0 | 1 | 0 | 1 | X | 0 | 0 | 1 | 1 | 0 | 1 | 1 | 1 | 1 | 1 | |
| 0 | 0 | 1 | 0 | 1 | X | 0 | 1 | 0 | 1 | 1 | 1 | 0 | 1 | 0 | 1 | WINDOW 2 WR |
| 0 | 0 | 1 | 0 | 1 | X | 1 | 0 | 0 | 1 | 1 | 1 | 1 | 1 | 0 | 1 | WINDOW 2 RD |
| 0 | 0 | 1 | 0 | 1 | X | 1 | 1 | 1 | 1 | 0 | 1 | 1 | 1 | 1 | 1 | |
| 0 | 0 | 1 | 1 | 0 | X | 0 | 0 | 1 | 1 | 0 | 1 | 1 | 1 | 1 | 1 | |
| 0 | 0 | 1 | 1 | 0 | X | 0 | 1 | 1 | 0 | 1 | 1 | 0 | 1 | 0 | 1 | WINDOW 1WR |
| 0 | 0 | 1 | 1 | 0 | X | 1 | 0 | 1 | 0 | 1 | 1 | 1 | 1 | 0 | 1 | WINDOW 1 RD |
| 0 | 0 | 1 | 1 | 0 | X | 1 | 1 | 1 | 1 | 0 | 1 | 1 | 1 | 1 | 1 | |
| 0 | 0 | 1 | 1 | 1 | X | 0 | 0 | 1 | 1 | 0 | 1 | 1 | 1 | 1 | 1 | |
| 0 | 0 | 1 | 1 | 1 | X | 0 | 1 | 1 | 1 | 1 | 1 | 0 | 1 | 1 | 0 | NETWORK |
| 0 | 0 | 1 | 1 | 1 | X | 1 | 0 | 1 | 1 | 0 | 1 | 1 | 1 | 1 | 1 | |
| 0 | 0 | 1 | 1 | 1 | X | 1 | 1 | 1 | 1 | 0 | 1 | 1 | 1 | 1 | 1 | |
| 0 | 1 | X | X | X | X | X | X | 1 | 1 | 0 | 1 | 1 | 1 | 1 | 1 | |
| 1 | X | X | X | X | X | X | X | 1 | 1 | 0 | 1 | 1 | 1 | 1 | 1 | |

Fig. 35

| BIT | 4 | 3 | 2 | 1 | 0 | 2-7 | 2 | 1 | 0 | |
|---|---|---|---|---|---|---|---|---|---|---|
| PIN | 14 | 13 | 12 | 11 | 10 | - | 3 | 2 | 1 | |
| | GND | OUT 0 | OUT 1 | Y | Z | SPARE | RREQ | YNXY | ZNXT | |
| 00 | 0 | 0 | 0 | 0 | 0 | 0 | 0 | 0 | 0 | <--STATE 0 |
| 01 | 0 | 0 | 0 | 0 | 1 | 0 | 1 | 1 | 0 | <--STATE 1 |
| 02 | 0 | 0 | 0 | 1 | 0 | 0 | 1 | 1 | 0 | <--STATE 2 |
| 03 | 0 | 0 | 0 | 1 | 1 | 0 | 0 | 0 | 0 | <--STATE 3 |
| 04 | 0 | 0 | 1 | 0 | 0 | 0 | 0 | 0 | 0 | <--STATE 0 |
| 05 | 0 | 0 | 1 | 0 | 1 | 0 | 1 | 0 | 1 | <--STATE 1 |
| 06 | 0 | 0 | 1 | 1 | 0 | 0 | 0 | 1 | 1 | <--STATE 2 |
| 07 | 0 | 0 | 1 | 1 | 1 | 0 | 0 | 0 | 0 | <--STATE 3 |
| 08 | 0 | 1 | 0 | 0 | 0 | 0 | 1 | 0 | 1 | <--STATE 0 |
| 09 | 0 | 1 | 0 | 0 | 1 | 0 | 1 | 1 | 0 | <--STATE 1 |
| 0A | 0 | 1 | 0 | 1 | 0 | 0 | 1 | 1 | 0 | <--STATE 2 |
| 0B | 0 | 1 | 0 | 1 | 1 | 0 | 0 | 1 | 1 | <--STATE 3 |
| 0C | 0 | 1 | 1 | 0 | 0 | 0 | 1 | 0 | 1 | <--STATE 0 |
| 0D | 0 | 1 | 1 | 0 | 1 | 0 | 1 | 0 | 1 | <--STATE 1 |
| 0E | 0 | 1 | 1 | 1 | 0 | 0 | 0 | 1 | 1 | <--STATE 2 |
| 0F | 0 | 1 | 1 | 1 | 1 | 0 | 0 | 1 | 1 | <--STATE 3 |
| 1X | 1 | X | X | X | X | 0 | 0 | 0 | 0 | <--STATE 0 |

| RRQ | NR* | WR* | X | Y | W* | N* | REF | HST* | ACC | ERR | XN | YN | |
|---|---|---|---|---|---|---|---|---|---|---|---|---|---|
| 0 | 0 | 0 | 0 | 0 | 1 | 1 | 0 | 1 | 0 | 1 | 1 | 1 | <--ERROR |
| 0 | 0 | 0 | 1 | 0 | 1 | 1 | 0 | 1 | 0 | 1 | 1 | 1 | <--ERROR |
| 0 | 0 | 0 | 1 | 0 | 1 | 1 | 0 | 1 | 0 | 1 | 1 | 1 | <--ERROR |
| 0 | 0 | 0 | 1 | 1 | 1 | 1 | 0 | 1 | 0 | 1 | 1 | 1 | <--ERROR |
| 0 | 0 | 1 | 0 | 0 | 1 | 0 | 0 | 0 | 1 | 0 | 0 | 0 | <--NETWORK |
| 0 | 0 | 1 | 0 | 1 | 1 | 1 | 1 | 1 | 0 | 0 | 1 | 1 | <--REFRESH >DORMANT >NETWORK |
| 0 | 0 | 1 | 1 | 0 | 1 | 1 | 0 | 1 | 0 | 0 | 1 | 1 | <--WINDOW >DORMANT >NETWORK |
| 0 | 0 | 1 | 1 | 1 | 1 | 0 | 0 | 0 | 1 | 0 | 0 | 0 | <--DORMANT >NETWORK |
| 0 | 1 | 0 | 0 | 0 | 1 | 1 | 0 | 1 | 0 | 0 | 1 | 1 | <--NETWORK >DORMANT >WINDOW |
| 0 | 1 | 0 | 0 | 1 | 1 | 1 | 1 | 1 | 0 | 0 | 1 | 1 | <--REFRESH >DORMANT >WINDOW |
| 0 | 1 | 0 | 1 | 0 | 0 | 1 | 0 | 0 | 1 | 0 | 1 | 0 | <--WINDOW |
| 0 | 1 | 0 | 1 | 1 | 1 | 1 | 0 | 1 | 0 | 0 | 1 | 0 | <--DORMANT >WINDOW |
| 0 | 1 | 1 | 0 | 0 | 1 | 1 | 0 | 1 | 0 | 0 | 1 | 1 | <--NETWORK >DORMANT |
| 0 | 1 | 1 | 0 | 1 | 1 | 1 | 1 | 1 | 0 | 0 | 1 | 1 | <--REFRESH >DORMANT |
| 0 | 1 | 1 | 1 | 0 | 1 | 1 | 0 | 1 | 0 | 0 | 1 | 1 | <--WINDOW >DORMANT |
| 0 | 1 | 1 | 1 | 1 | 1 | 1 | 0 | 1 | 0 | 0 | 1 | 1 | <--DORMANT |

SEE FIG. 43 CONTINUED

Fig. 43 CONTINUED

| RRQ | NR* | WR* | X | Y | W* | N* | REF | HST* | ACC | ERR | XN | YN | |
|---|---|---|---|---|---|---|---|---|---|---|---|---|---|
| 1 | 0 | 0 | 0 | 0 | 1 | 1 | 0 | 1 | 0 | 1 | 1 | 1 | <- ERROR |
| 1 | 0 | 0 | 0 | 1 | 1 | 1 | 0 | 1 | 0 | 1 | 1 | 1 | <- ERROR |
| 1 | 0 | 0 | 1 | 0 | 1 | 1 | 0 | 1 | 0 | 1 | 1 | 1 | <- ERROR |
| 1 | 0 | 0 | 1 | 1 | 1 | 1 | 0 | 1 | 0 | 1 | 1 | 1 | <- ERROR |
| 1 | 0 | 1 | 0 | 0 | 1 | 0 | 0 | 0 | 1 | 0 | 0 | 0 | <- NETWORK |
| 1 | 0 | 1 | 0 | 1 | 1 | 0 | 1 | 1 | 1 | 0 | 0 | 1 | <- REFRESH |
| 1 | 0 | 1 | 1 | 0 | 1 | 1 | 1 | 1 | 0 | 0 | 0 | 1 | <- WINDOW >DORMANT >REFRESH |
| 1 | 0 | 1 | 1 | 1 | 1 | 0 | 0 | 0 | 1 | 0 | 0 | 0 | <- DORMANT >NETWORK >REFRESH |
| 1 | 1 | 0 | 0 | 0 | 1 | 1 | 1 | 1 | 0 | 0 | 0 | 1 | <- NETWORK >DORMANT >REFRESH |
| 1 | 1 | 0 | 0 | 1 | 1 | 0 | 1 | 1 | 1 | 0 | 0 | 1 | <- REFRESH |
| 1 | 1 | 0 | 1 | 0 | 0 | 1 | 0 | 0 | 1 | 0 | 1 | 0 | <- WINDOW |
| 1 | 1 | 0 | 1 | 1 | 0 | 1 | 0 | 0 | 1 | 0 | 1 | 0 | <- DORMANT >WINDOW >REFRESH |
| 1 | 1 | 1 | 0 | 0 | 1 | 1 | 1 | 1 | 0 | 0 | 0 | 1 | <- NETWORK >DORMANT >REFRESH |
| 1 | 1 | 1 | 0 | 1 | 1 | 0 | 1 | 1 | 1 | 0 | 0 | 1 | <- REFRESH |
| 1 | 1 | 1 | 1 | 0 | 1 | 1 | 1 | 1 | 0 | 0 | 0 | 1 | <- WINDOW >REFRESH |
| 1 | 1 | 1 | 1 | 1 | 1 | 1 | 1 | 1 | 0 | 0 | 0 | 1 | <- DORMANT >REFRESH |

| CMP | MRY | A1D | F1 | F0 | 7 | 6 | 5 | 4 | 3 | A2 | F1 | F0 |
|---|---|---|---|---|---|---|---|---|---|---|---|---|
| 0 | 0 | 0 | 0 | 0 | 0 | 0 | 0 | 0 | 0 | 0 | 0 | 0b |
| 0 | 0 | 0 | 0 | 1 | 0 | 0 | 0 | 0 | 0 | 0 | 0 | 1 |
| 0 | 0 | 0 | 1 | 0 | 0 | 0 | 0 | 0 | 0 | 1 | 1 | 1 |
| 0 | 0 | 0 | 1 | 1 | 0 | 0 | 0 | 0 | 0 | 1 | 1 | 1 |
| 0 | 0 | 1 | 0 | 0 | 0 | 0 | 0 | 0 | 0 | 0 | 0 | 0 |
| 0 | 0 | 1 | 0 | 1 | 0 | 0 | 0 | 0 | 0 | 1 | 1 | 1 |
| 0 | 0 | 1 | 1 | 0 | 0 | 0 | 0 | 0 | 0 | 1 | 1 | 1 |
| 0 | 0 | 1 | 1 | 1 | 0 | 0 | 0 | 0 | 0 | 1 | 1 | 1 |
| 0 | 1 | 0 | 0 | 0 | 0 | 0 | 0 | 0 | 0 | 0 | 0 | 0 |
| 0 | 1 | 0 | 0 | 1 | 0 | 0 | 0 | 0 | 0 | 0 | 0 | 1 |
| 0 | 1 | 0 | 1 | 0 | 0 | 0 | 0 | 0 | 0 | 1 | 1 | 1 |
| 0 | 1 | 0 | 1 | 1 | 0 | 0 | 0 | 0 | 0 | 1 | 1 | 1 |
| 0 | 1 | 1 | 0 | 0 | 0 | 0 | 0 | 0 | 0 | 0 | 0 | 0 |
| 0 | 1 | 1 | 0 | 1 | 0 | 0 | 0 | 0 | 0 | 1 | 1 | 1 |
| 0 | 1 | 1 | 1 | 0 | 0 | 0 | 0 | 0 | 0 | 1 | 1 | 1 |
| 0 | 1 | 1 | 1 | 1 | 0 | 0 | 0 | 0 | 0 | 1 | 1 | 1 |
| 1 | 0 | 0 | 0 | 0 | 0 | 0 | 0 | 0 | 0 | 1 | 1 | 1 |
| 1 | 0 | 0 | 0 | 1 | 0 | 0 | 0 | 0 | 0 | 1 | 1 | 1 |
| 1 | 0 | 0 | 1 | 0 | 0 | 0 | 0 | 0 | 0 | 1 | 1 | 1 |
| 1 | 0 | 0 | 1 | 1 | 0 | 0 | 0 | 0 | 0 | 1 | 1 | 1 |
| 1 | 0 | 1 | 0 | 0 | 0 | 0 | 0 | 0 | 0 | 1 | 1 | 1 |
| 1 | 0 | 1 | 0 | 1 | 0 | 0 | 0 | 0 | 0 | 1 | 1 | 1 |
| 1 | 0 | 1 | 1 | 0 | 0 | 0 | 0 | 0 | 0 | 1 | 1 | 1 |
| 1 | 0 | 1 | 1 | 1 | 0 | 0 | 0 | 0 | 0 | 1 | 1 | 1 |
| 1 | 1 | 0 | 0 | 0 | 0 | 0 | 0 | 0 | 0 | 1 | 1 | 1 |
| 1 | 1 | 0 | 0 | 1 | 0 | 0 | 0 | 0 | 0 | 1 | 1 | 1 |
| 1 | 1 | 0 | 1 | 0 | 0 | 0 | 0 | 0 | 0 | 1 | 1 | 1 |
| 1 | 1 | 0 | 1 | 1 | 0 | 0 | 0 | 0 | 0 | 1 | 1 | 1 |
| 1 | 1 | 1 | 0 | 0 | 0 | 0 | 0 | 0 | 0 | 1 | 1 | 1 |
| 1 | 1 | 1 | 0 | 1 | 0 | 0 | 0 | 0 | 0 | 1 | 1 | 1 |
| 1 | 1 | 1 | 1 | 0 | 0 | 0 | 0 | 0 | 0 | 1 | 1 | 1 |
| 1 | 1 | 1 | 1 | 1 | 0 | 0 | 0 | 0 | 0 | 1 | 1 | 1 |

FIG. 45

| I/O | STAT | CELL A | CELL X | BER | XAC | EN | |
|---|---|---|---|---|---|---|---|
| 0 | 0 | X | X | X | 1 | 1 | ERROR |
| 0 | 1 | X | X | X | 0 | 0 | IF BOARD I/O |
| 1 | 0 | X | X | X | 0 | 0 | CELL BOARD STATUS (STATEN) |
| 1 | 1 | 0 | X | X | 1 | 1 | NO ACCESS |
| 1 | 1 | 1 | 0 | 0 | 1 | 0 | CELL BOARD BUS ERROR |
| 1 | 1 | 1 | 0 | 1 | 0 | 0 | CELL TRANSFER COMPLETE |
| 1 | 1 | 1 | 1 | 0 | 1 | 0 | CELL BOARD BUS ERROR |
| 1 | 1 | 1 | 1 | 1 | 1 | 0 | CELL TRANSFER PENDING |

Fig. 51

| OFFSET | WORD NAME | FILE DEFINED | SCREEN # | FUNCTION |
|---|---|---|---|---|
| 0 | RP-STOP | RPPOLY.PF | 106 | STOP |
| 4 | CONFIG-CHK | RPPOLY.PF | 106 | CHECK CONFIGURATION |
| 8 | COLD | RPPOLY.PF | 107 | INITIALIZE FORTH AND ENTER QUIT LOOP |
| C | COLD-3LOAD | RPPOLY.PF | 107 | INITIALIZE FORTH AND REBUILD SYSTEM |
| 10 | INIT-STOP | RPPOLY.PF | 107 | INITIALIZE FORTH AND STOP |
| 14 | RP-COLD | LHS.PS | 7 | INITIALIZE OPS SYSTEM ON RP |
| 18 | RP-MTEST | RPPOLY.PF | 18 | EXECUTE MEMORY TEST |

Fig. 56

| OFFSET | WORD NAME | FILE DEFINED | SCREEN # | FUNCTION |
|---|---|---|---|---|
| 0 | -- | - | -- | RETURN FROM EXCEPTION |
| 4 | ABORT | RPPOLY.PF | 86 | GET TO FORTH QUIT LOOP |
| 8 | RP-STOP | RPPOLY.PF | 106 | STOP PROCESSOR |
| C | -- | -- | -- | (NOT USED) |
| 10 | -- | -- | -- | (NOT USED) |
| 14 | BLINKER | RPPOLY.PF | 19 | BLINKER DEMO |
| 18 | INTERPRET-STREAM | LHS.PF | 5 | MAIN RP INTERPRET LOOP |

Fig.57

| OFFSET | FUNCTION | <SERVER-1>TO HOST | <SERVER-2>TO HOST | <SERVER-1>FROM HOST | <SERVER-2>FROM HOST |
|---|---|---|---|---|---|
| 00 | NO OPERATION | - | - | - | - |
| 04 | EMIT CHARACTER | CHARACTER (W) | - | - | - |
| 08 | OPEN FILE | FILE # (W) | - | MAXBLK (W) | SHADOWS (W) |
| 0C | READ BLOCK | BLOCK # (W) | ADDRESS | - | - |
| 10 | WRITE BLOCK | BLOCK # (W) | ADDRESS | - | - |
| 14 | SAVE RP FORTH IMAGE | SIZE | - | - | - |
| 18 | BYE-EXIT SERVER | - | - | - | - |
| 1C | GET DATE | - | - | COMPRESSED DATE | COMPRESSED DATE |
| 20 | CLONE TO OTHER RP'S | SIZE | - | - | - |
| 24 | CRITICAL REQUEST | - | - | - | - |
| 28 | RP PRINT FUNCTION | PRINT ENABLE FLAG (W) | - | - | - |
| 2C | PRINT TOKEN | TOKEN | - | PRINTED STRING LENGTH | - |
| 30 | GET TOKEN SIZE | TOKEN | - | TOKEN LENGTH (W) | - |
| 34 | GET CLASS TOKEN | CLASS # (W) | - | TOKEN | TOKEN LENGTH |
| 38 | GET ATTRIBUTE TOKEN | CLASS # & ATTR. # | - | TOKEN | TOKEN LENGTH |

| CODE | FUNCTION | SIZE | FIELD | SIZE | FIELD | SIZE | FIELD | NOTE |
|---|---|---|---|---|---|---|---|---|
| 00 | END OF NETWORK STREAM | - | - | - | - | - | - | A |
| 04 | START OF RULE | 2 | RULE NUMBER | 4 | RULE NAME TOKEN | - | - | B |
| 08 | NEW LHS | 2 | LHS # | 2 | NEGATE FLAG | 2 | CLASS # | B |
| 0C | END LHS | - | - | - | - | - | - | B |
| 10 | NEW ATTRIBUTE | 2 | ATTRIBUTE OFFSET | - | - | - | - | B |
| 14 | END ATTRIBUTE | - | - | - | - | - | - | B |
| 18 | BIND VARIABLE | 2 | VARIABLE NUMBER | - | - | - | - | B |
| 1C | EXCISE RULE | 2 | RULE NUMBER | - | - | - | - | B |
| 20 | '=' LITERAL | 4 | TOKEN | - | - | - | - | B |
| 24 | '<>' LITERAL | 4 | TOKEN | - | - | - | - | B |
| 28 | '>' LITERAL | 4 | TOKEN | - | - | - | - | B |
| 2C | '<' LITERAL | 4 | TOKEN | - | - | - | - | B |
| 30 | '>=' LITERAL | 4 | TOKEN | - | - | - | - | B |
| 34 | '<=' LITERAL | 4 | TOKEN | - | - | - | - | B |
| 38 | '=' <VARIABLE> | 2 | VARIABLE NUMBER | - | - | - | - | B |
| 3C | '<>' <VARIABLE> | 2 | VARIABLE NUMBER | - | - | - | - | B |
| 40 | '>' <VARIABLE> | 2 | VARIABLE NUMBER | - | - | - | - | B |
| 44 | '<' <VARIABLE> | 2 | VARIABLE NUMBER | - | - | - | - | B |
| 48 | '>=' <VARIABLE> | 2 | VARIABLE NUMBER | - | - | - | - | B |
| 4C | '<=' <VARIABLE> | 2 | VARIABLE NUMBER | - | - | - | - | B |
| 50 | COMPOUND CONDITION START | - | - | - | - | - | - | B |
| 54 | ENTER OR CONDITION | - | - | - | - | - | - | B |
| 58 | EXIT OR CONDITION | - | - | - | - | - | - | B |
| 5C | OR ' ' LITERAL | 4 | TOKEN | - | - | - | - | B |
| 60 | OR ' ' LITERAL | 4 | TOKEN | - | - | - | - | B |

SEE FIG. 59 CONTINUED

Fig. 59
CONTINUED

| CODE | FUNCTION | SIZE | FIELD | SIZE | FIELD | SIZE | FIELD | NOTE |
|---|---|---|---|---|---|---|---|---|
| 64 | OR '>' LITERAL | 4 | TOKEN | - | - | - | - | B |
| 68 | OR '<' LITERAL | 4 | TOKEN | - | - | - | - | B |
| 6C | OR '>=' LITERAL | 4 | TOKEN | - | - | - | - | B |
| 70 | OR '<=' LITERAL | 4 | TOKEN | - | - | - | - | B |
| 74 | OR '=' <VARIABLE> | 2 | VARIABLE NUMBER | - | - | - | - | B |
| 78 | OR '<>' <VARIABLE> | 2 | VARIABLE NUMBER | - | - | - | - | B |
| 7C | OR '>' <VARIABLE> | 2 | VARIABLE NUMBER | - | - | - | - | B |
| 80 | OR '<' <VARIABLE> | 2 | VARIABLE NUMBER | - | - | - | - | B |
| 84 | OR '>=' <VARIABLE> | 2 | VARIABLE NUMBER | - | - | - | - | B |
| 88 | OR '<=' <VARIABLE> | 2 | VARIABLE NUMBER | - | - | - | - | B |
| 8C | END OF RULE COMPILATION | 2 | COMPLEXITY CODE | - | - | - | - | B |
| 90 | MAKE WME | 4 | RHS # | 2 | CLASS # | n | WME W/TIME-TAG | C |
| 94 | - | - | - | - | - | - | - | D |
| 98 | REMOVE WME | 4 | RHS # | 4 | WME # | - | - | C |
| 9C | REMOVE CLASS | 4 | RHS # | 2 | CLASS # | - | - | C |
| A0 | REMOVE ALL WME | 4 | RHS # | 4 | NEW LIST SIZE | - | - | C |
| A4 | NEW CLASS | 2 | CLASS # | 2 | CLASS SIZE | 2 | # OF ATTRIBUTES | C |
| A8 | INIT WME ARRAY | 4 | INITIAL WME LIST SIZE | - | - | - | - | C |
| AC | RESIZE WME ARRAY | 4 | NEW LIST SIZE | - | - | - | - | C |
| 80 | SOFT REALLOCATE | - | - | - | - | - | - | E |
| 84 | EVALUATE RULES | - | - | - | - | - | - | C |
| 88 | FIRE RULE | 2 | RP NUMBER | 2 | RULE NUMBER | - | - | C |
| BC | GET # OF FIREABLE | 2 | RP NUMBER | 2 | RULE NUMBER | - | - | F |
| C0 | GET INSTANTIATION | 2 | RP NUMBER | 2 | RULE NUMBER | 2 | INSTANTIATION NUMBER | F |
| C4 | IDENTIFY BOARD | | | | | | | G |

| NOTE | COMMENT |
|---|---|
| A | USED TO STOP RP |
| B | USED IN RULE LHS COMPILATION ON RP - ONLY ONE RP RECEIVES THIS STREAM CODE FOR A SINGLE RULE |
| C | USED DURING MAIN RECOGNIZE-ACT EXECUTION - ALL RP'S RECEIVE THIS STREAM CODE |
| D | USED CODE - PREVIOUSLY USED FOR MODIFY WME WHICH IS NOT REQUIRED |
| E | USED BY HOST TO TELL RP'S WHEN THEY CAN REALLOCATE MEMORY |
| F | USED BY HOST'S CS (CONFLICT SET) COMMAND |
| G | USED BY HOST'S IDENTIFY COMMAND |

MAKE NON-NEGATED WME

- ADD NEW WME TO LHS LIST
- EXECUTE PRECHECK FILTER
  - EXIT IF PRECHECK FAILS
    - SET COUNTER OF PIVOT POSITION TO NEW WME
- PIVOT OVER NEW WME
- IF FIREABLE INSTANTIATION FOUND, ADD TO FIREABLE LIST AND SORT
- IF NOT-FIREABLE INSTANTIATION FOUND, ADD PARTIAL INSTANTIATION TO NOT-FIREABLE LIST
- CONTINUE UNTIL ALL POSSIBLE PATTERNS INVOLVING NEW WME ARE TESTED

REMOVE NON-NEGATED WME

- SCAN LHS LIST FOR WME TO BE REMOVED
- EXIT IF NOT FOUND
- SCAN FIREABLE LIST FOR REMOVED WME
- REMOVE ANY FIREABLE INSTANTIATIONS INVOLVING REMOVED WME
- SCAN NOT-FIREABLE LIST FOR REMOVED WME
  - REMOVE ANY PARTIAL INSTANTIATIONS INVOLVING WME

SEE Fig. 64 CONTINUED

Fig. 64
CONTINUED

| MAKE NEGATED WME | REMOVE NEGATED WME |
| --- | --- |
| -ADD NEW WME TO LHS LIST<br><br>-SCAN FIREABLE LIST TO SEE IF ANY FIREABLE INSTANTIATIONS NEED TO BE REMOVED<br><br>-IF SO, MOVE THEM TO NOT-FIREABLE LIST AND SET WME # THAT PREVENTS INSTANTIATION | -SCAN LHS FOR WME TO BE REMOVED<br><br>-EXIT IF NOT FOUND<br><br>-REMOVE WME FROM LHS LIST<br><br>-SCAN NOT-FIREABLE LIST FOR REMOVED WME<br><br>-EXIT IF NOT FOUND<br><br>-INITIALIZE COUNTER TO REFLECT PARTIAL INSTANTIATION<br><br>-REMOVE NOT-FIREABLE INSTANTIATION<br><br>-SCAN REMAINDER OF NOT-FIREABLE LIST FOR ANY MORE PARTIAL INSTANTIATIONS THAT WOULD KEEP RULE FROM FIRING<br><br>-EXIT IF OTHER PARTIAL INSTANTIATIONS FOUND WITH THE SAME HEADER UP TO THE REMOVED WME<br><br>-PIVOT OVER REMOVED WME POSITION TO SEE IF ANY FIREABLE INSTANTIATIONS CAN BE FOUND<br><br>-ADD ANY FIREABLE INSTANTIATIONS TO FIREABLE LIST AND SORT<br><br>-ADD ANY NEW NOT-FIREABLE PARTIAL INSTANTIATIONS TO NOT-FIREABLE LIST<br><br>-CONTINUE UNTIL ALL POSSIBLE PATTERNS ARE TRIED |

SEE FIG. 65 CONTINUED

Fig. 66

"BLOCK" WME'S

20 BYTES

| Address | WHE NUMBER | COLOR ATTRIBUTE | SIZE ATTRIBUTE | NUMBER ATTRIBUTE | WEIGHT ATTRIBUTE |
|---|---|---|---|---|---|
| F4 h | 17 | TOKEN (RED) | TOKEN (HUGE) | TOKEN (8) | 0 |
| E0 h | 12 | TOKEN (BLUE) | TOKEN (SMALL) | TOKEN (12) | 0 |
| CC h | 11 | TOKEN (RED) | TOKEN (MEDIUM) | TOKEN (10) | 0 |
| B8 h | 16 | TOKEN (RED) | TOKEN (LARGE) | TOKEN (15) | 0 |
| A4 h | 6 | TOKEN (RED) | TOKEN (MEDIUM) | TOKEN (6) | 0 |
| 90 h | - | ??? | ??? | ??? | ??? |
| 7C h | 9 | TOKEN (BLUE) | TOKEN (HUGE) | TOKEN (9) | 0 |
| 68 h | - | ??? | ??? | ??? | ??? |
| 54 h | 4 | TOKEN (BLUE) | TOKEN (LARGE) | TOKEN (4) | 0 |
| 40 h | 10 | TOKEN (RED) | TOKEN (HUGE) | TOKEN (2) | 0 |
| 2C h | 14 | TOKEN (BLUE) | TOKEN (SMALL) | TOKEN (11) | 0 |
| 18 h | 3 | TOKEN (RED) | TOKEN (MEDIUM) | TOKEN (3) | 0 |
| C4 h | - | ??? | ??? | ??? | ??? |
| C0 h | | | | | |

POINTED TO BY HANDLE → C0 h

"GOAL" WME'S

16 BYTES

| Address | WME NUMBER | WANT ATTRIBUTE | ID ATTRIBUTE | STATUS ATTRIBUTE |
|---|---|---|---|---|
| C4 h | 18 | TOKEN (TEST) | 0 | TOKEN (ACTIVE) |
| C0 h | | | | |

POINTED TO BY HANDLE → C0 h

SEE Fig. 66 CONTINUED

Fig. 66
CONTINUED

MAIN WME LIST

4 BYTES

| | | | | |
|---|---|---|---|---|
| 19: | FF | FF | FF | FF |
| 18: | 00 | 00 | 00 | 04 |
| 17: | 01 | 00 | 00 | F4 |
| 16: | 01 | 00 | 00 | B8 |
| 15: | FF | FF | FF | FF |
| 14: | 01 | 00 | 00 | 20 |
| 13: | FF | FF | FF | FF |
| 12: | 01 | 00 | 00 | E0 |
| 11: | 01 | 00 | 00 | 00 |
| 10: | 01 | 00 | 00 | 40 |
| 9: | 01 | 00 | 00 | 7C |
| 8: | FF | FF | FF | FF |
| 7: | FF | FF | FF | FF |
| 6: | 01 | 00 | 00 | A4 |
| 5: | FF | FF | FF | FF |
| 4: | 01 | 00 | 00 | 54 |
| 3: | 01 | 00 | 00 | 18 |
| 2: | FF | FF | FF | FF |
| 1: | FF | FF | FF | FF |
| 0: | ?? | ?? | ?? | ?? |

POINTED TO BY HANDLE → 0:

CLASS NUMBER | OFFSET WITHIN CLASS

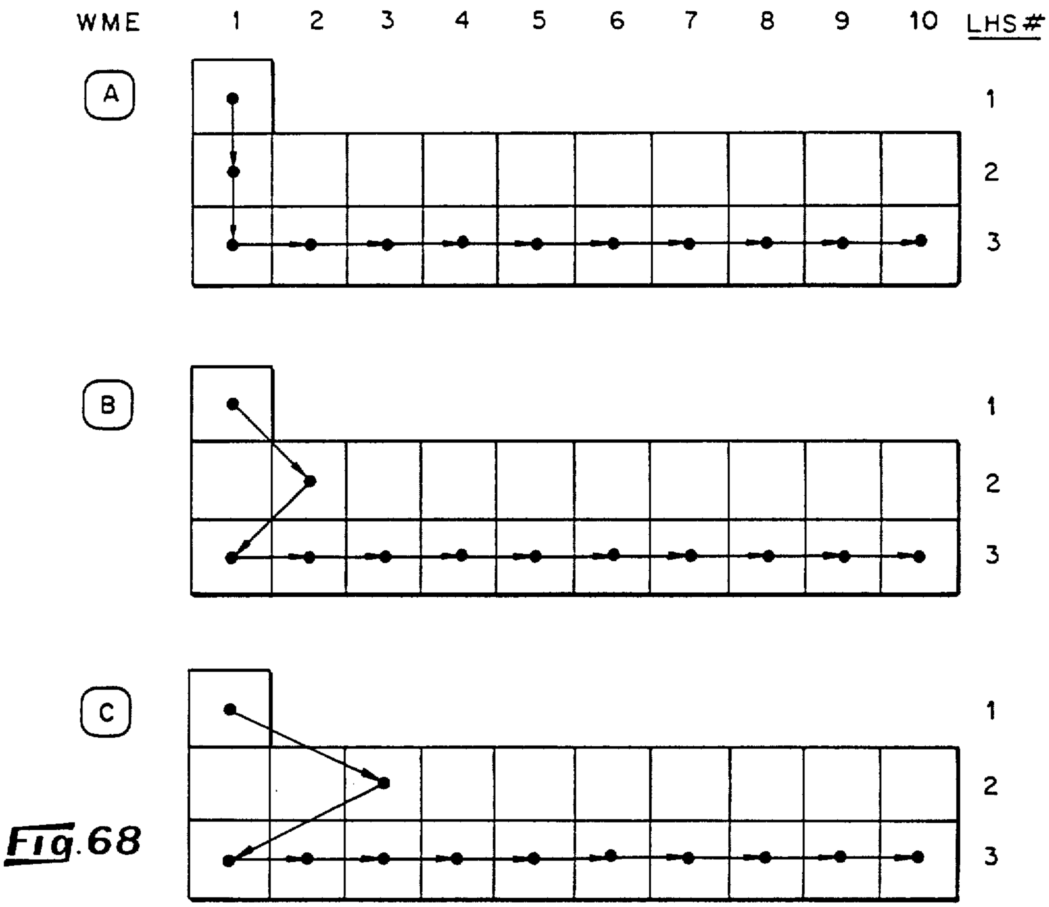
Fig. 68
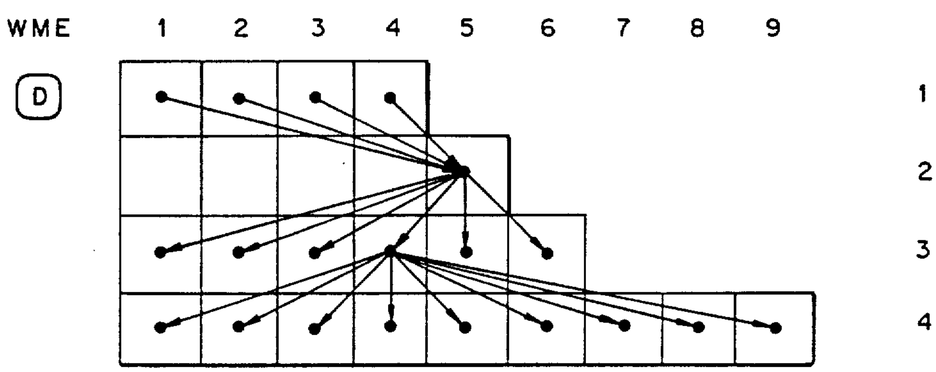

FIREABLE LIST

| LHS #1 | LHS #2 | LHS #3 | SORTED TIME-TAGS | | |
|---|---|---|---|---|---|
| 18 | 16 | 0 | 18 | 16 | 0 |
| 18 | 9 | 0 | 18 | 9 | 0 |
| 18 | 4 | 0 | 18 | 4 | 0 |

POINTED TO BY HANDLE (arrow to last row)

CONFLICT SET (LHS #1 – LHS #3) SORTED CONFLICT SET (SORTED TIME-TAGS)

NOT FIREABLE LIST

| LHS #1 | LHS #2 | LHS #3 |
|---|---|---|
| 18 | 17 | 10 |
| 18 | 14 | 12 |
| 18 | 12 | 14 |
| 18 | 11 | 6 |
| 18 | 11 | 3 |
| 18 | 10 | 17 |
| 18 | 6 | 11 |
| 18 | 6 | 3 |
| 18 | 3 | 11 |
| 18 | 3 | 6 |

POINTED TO BY HANDLE (arrow to last row)

FIG. 69

PARALLEL MACHINE ARCHITECTURE FOR PRODUCTION RULE SYSTEMS

BACKGROUND OF THE INVENTION

The Expert System, or Production Rule System, is one of the most important products of recent Artificial Intelligence research Capable of emulating and at times transcending the behavior of human experts in practically any domain, Expert System programs are proving their worth in such diverse areas as medical diagnosis, mineral prospecting, diesel locomotive repair, computer design, organic chemical synthesis, and a host of others. The earliest of such systems, and most of the presently popular ones, have been characterized by a sufficient naivete of knowledge representation that conventional computer architectures were adequate for their execution. With each new insight into the mechanisms of capturing ever more of the complexity and cognitive depth of the human's reasoning processes, such architectures are proving increasingly inadequate if anything approaching real-time speeds of execution are required.

One of the best known Expert System languages is Carnegie Mellon's OPS. This language facilitates approaches to problem solving and knowledge representation and has considerable power. An unfortunate additional characteristic of many OPS systems, particularly those of any real cognitive complexity, is an abysmally low speed of execution on present computers. For example, in complex organic synthesis programs some runs consumed 30 hours of single-user VAX 11/780 time during which approximately 5000 rule firings occurred. The average rule firing rate of 3 per minute is atypically low for Expert Systems, but is representative of figures to be expected for the more complex Expert System programs now being written. It is generally believed that, for effective execution of this next generation of programs, a figure of 1000 firings per second will be required.

In general, the classical hardware approaches to achieving the speed enhancements which the above figures imply have involved the construction of large scale, generalized parallel processing systems (e.g., the CRAY and CYBER), or relatively small serial processors dedicated to the execution of a particular language (e.g., the various LISP machines). For most purposes, the CRAY class machines are far too expensive and, in any case, were they suited to the execution of OPS-like languages, could offer a speed advantage of at best a factor of about 200 with respect to a VAX. A LISP machine, although far less expensive, is not more than a factor of four to eight faster than a VAX, despite the fact that it executes the LISP language in which OPS is written.

On the software side, a popular matching algorithm is the Rete Match Algorithm (see the Forgy and Shepard reference cited below) which exploits common IF parts of production rules and processes these patterns before the system is interpreted. However, this algorithm assumes that few working memory elements change during each cycle (much less than 1%) and is not useful where significant fractions of the working memory elements change in each cycle.

The references listed below teach various types of expert systems and are representative of present day approaches to parallelism for achieving faster execution time. These references are representative of the background of the invention and are incorporated herein by reference.

P. M. Dew "VLSI Architectures For Problems In Numerical Computation", *Supercomputers and parallel computation* edited by D. J. Paddon, 1984.

Charles L. Forgy and Susan I. Shepard, "Rete: A Fast Matching Algorithm", *AI Expert,* January 1987.

Dan Neiman, "Adding the Rete Net to your OPS5 Toolbox", *AI Expert,* January 1987.

Robert J. Douglass, "A Qualitative Assessment of Parallelism in Expert Systems", *IEEE Software,* May 1985.

Beverly A. Thompson et al, "Inside An Expert System", *BYTE,* April 1985.

Charles L. Seitz, "The Cosmic Cube", *Communications of the ACM,* January 1985.

J. R. Gurd et al, "The Manchester Prototype Dataflow Computer", *Communications of the ACM,* January 1985.

William M. Raike, "The Fifth Generation in Japan", *BYTE,* April 1985.

Michael F. Deering, "Architectures for AI", *BYTE,* April 1985.

Robert H. Michaelsen et al, "The Technology of Expert Systems", *BYTE,* April 1985.

Patrick H. Winston, "The LISP Revolution", *BYTE,* April 1985.

Charles Forgy et al, "Initial Assessment of Architectures for Production Systems", *Proceedings of the American Association of Artificial Intelligence,* pp. 116-112, August 1984.

J. H. Griesmer et al, "WES/MVS: A Continuous Real Time Expert System", *Proceedings of the American Association of Artificial Intelligence,* pp. 130-136, August 1984.

Salvatore J. Stolfo, "Five Parallel Algorithms for Production System Execution On the Dado Machine", *Proceedings of the American Association of Artificial Intelligence,* pp. 300-307, August 1984.

SUMMARY OF THE INVENTION

An object of the invention is to provide a system for executing programs associated with Artificial Intelligence.

Another object of the invention is to provide a high speed computer architecture capable of executing large and complex OPS and OPS-like Production Rule programs at speeds several thousand times faster than those characterizing present machine architectures.

Yet another object of the invention is to speed up rule firings in a production rule system by utilizing a plurality of identical, independently and simultaneously functioning rule processors.

A further object of the invention is to provide a production rule system in which additional rule processors may easily and simply be incorporated into the system.

Yet another object of the invention is to provide a production rule system which operates efficiently on complex problems and does not rely on the Rete Matching Algorithm or any assumption that the number of working memory elements changing with each rule firing is necessarily small. Although the Rete Matching Algorithm may be used in the system of the present invention, the invention does not require it and its use is marginal in cases where large numbers of working memory elements change with each rule firing, or where there is little similarity among rules.

The invention is directed toward a parallel processing system for processing production rule programs having a plurality of rules wherein each rule includes at least one non-negated "if" condition left hand side and at least one "then" action right hand side. The system comprises a data bus, an address bus, a host processor and a plurality of rule processors. The host processor is connected to the data and address bus and executes the right hand sides of the rules. The plurality of rule processors are each connected to the data and address buses and each include a memory storage device having a data memory section storing data and a program memory section storing the at least one left hand side of at least one of the rules. The memory storage device has storage locations designated by address. Each rule processor operates for evaluating the at least one stored left hand side of the at least one rule and generates an associated match flag if all conditions specified in the stored at least one left hand side are satisfied by at least one combination of stored data. The host processor is responsive to the match flags from each of the rule processors for selecting one of the rules and executing the actions of the at least one right hand side of the selected rule for generating commands and associated data. The host processor is operative for transmitting the commands and associated data to all rule processors. Each of the rule processors receives the commands of associated data and selects ones of the commands in associated data for which the associated data is identified in at least one stored left hand side of the rule and changes the stored data in accordance with the selected one of the commands and associated data DESCRIPTION OF THE DRAWINGS These and other objects and advantages of the invention will be come clear taken in conjunction with the detailed description which follows and in reference to the incompanying drawings in which:

Figure 5:
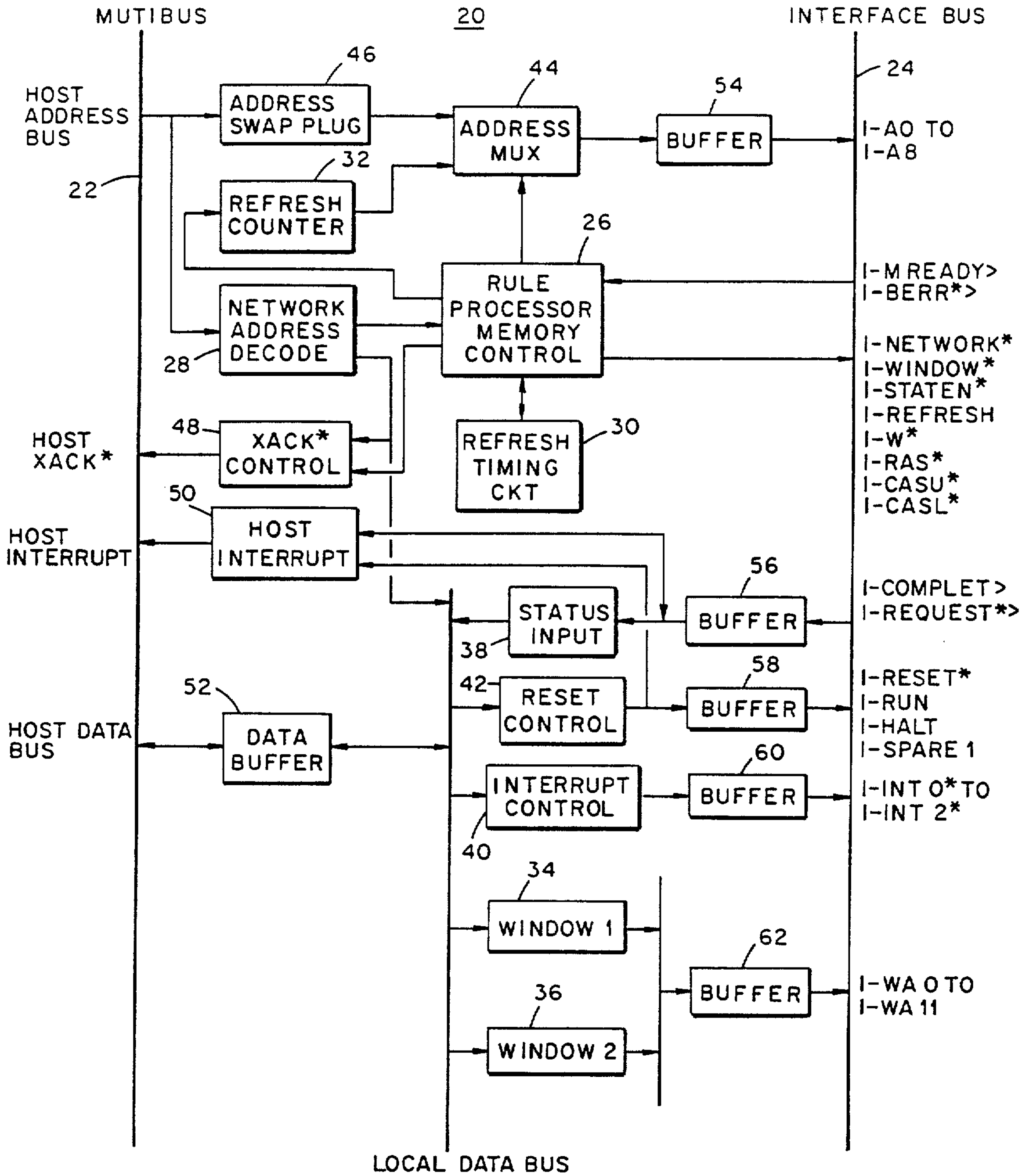
FIG. 5 is a block diagram of the interface board of FIG. 4.
Figure 7:
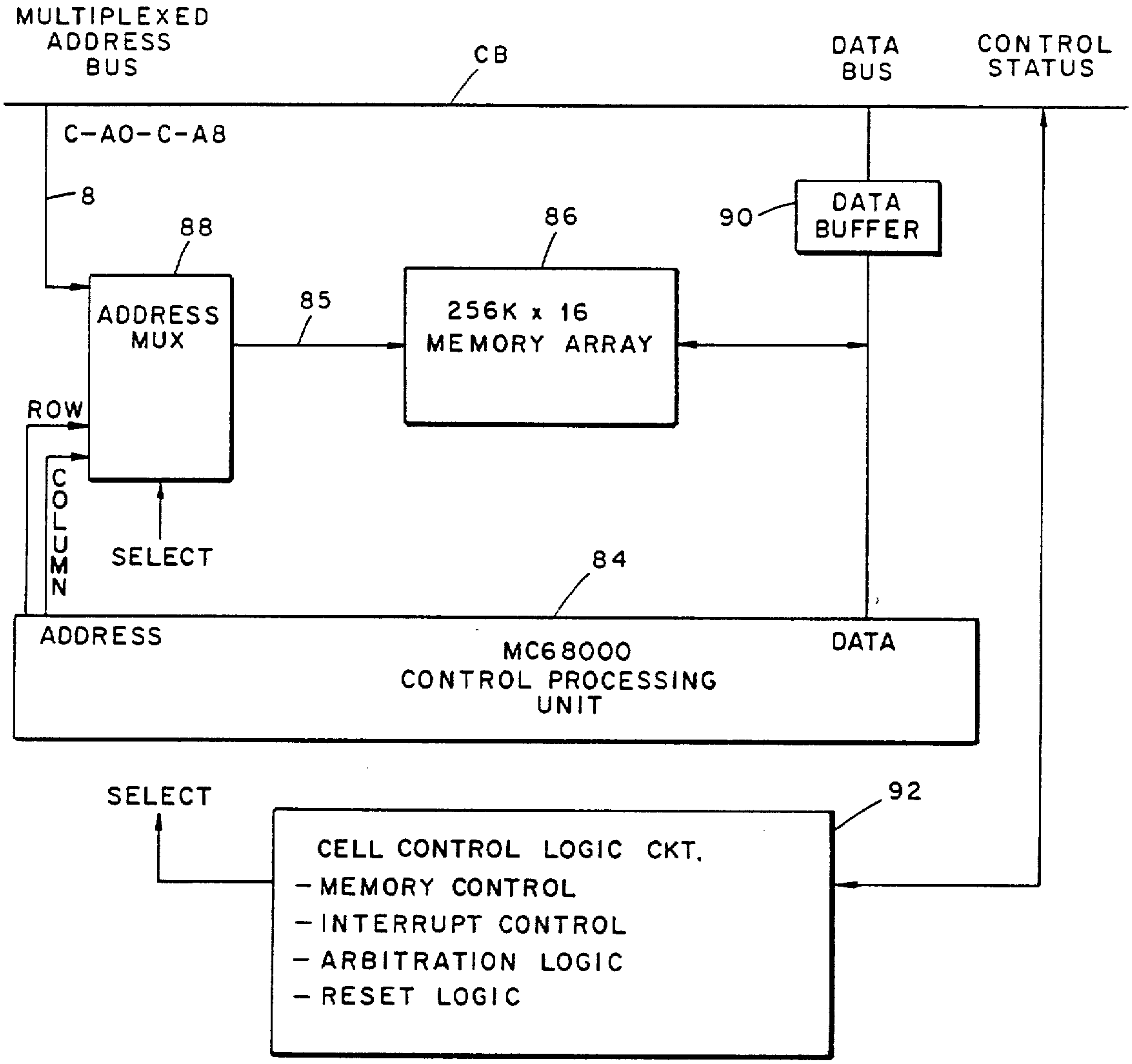
FIG. 7 is a block diagram of the rule processor cell circuitry.
Figure 9A:
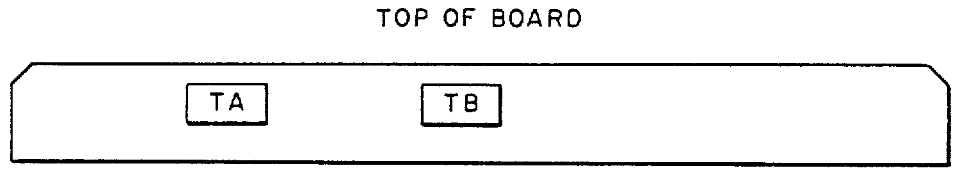
Figure 9B:
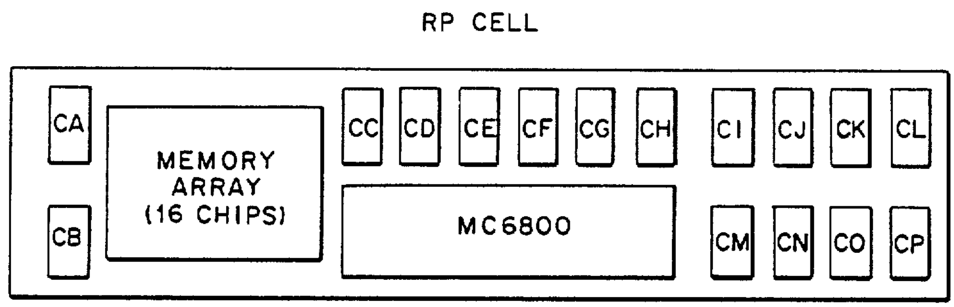
Figure 9C:
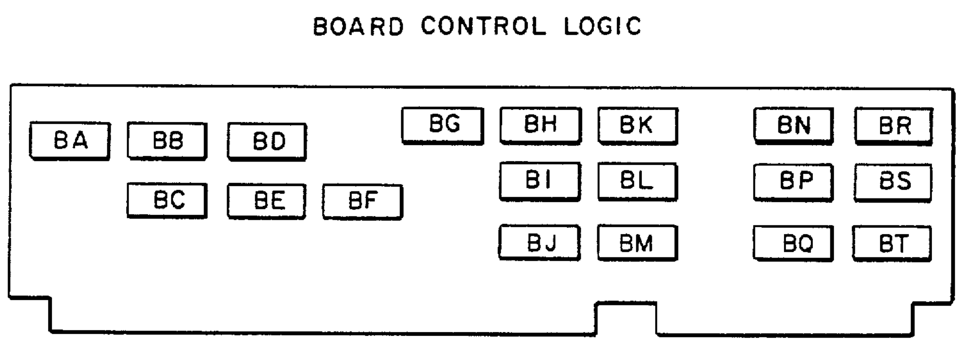
Figure 10:
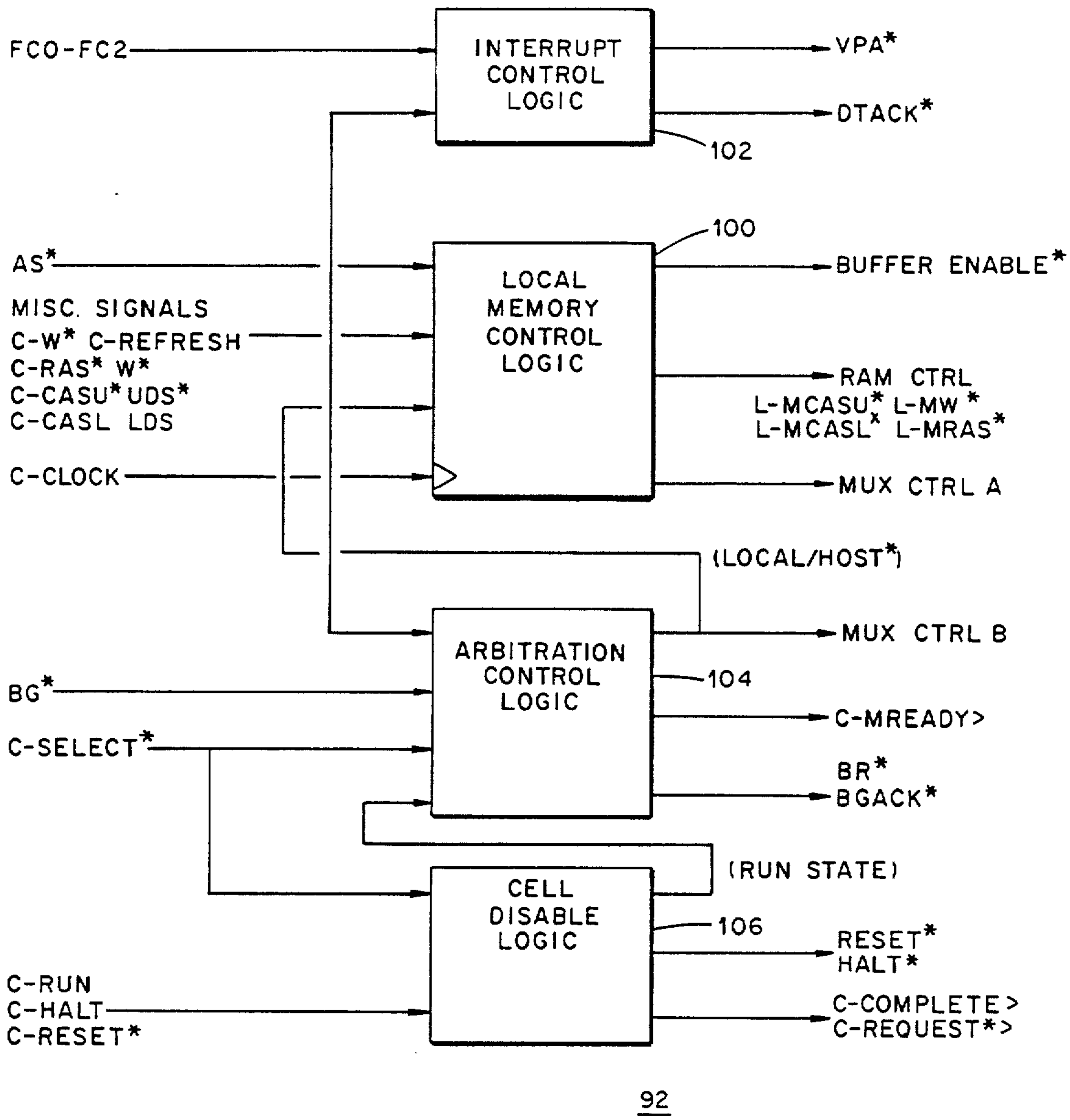
Figure 11:
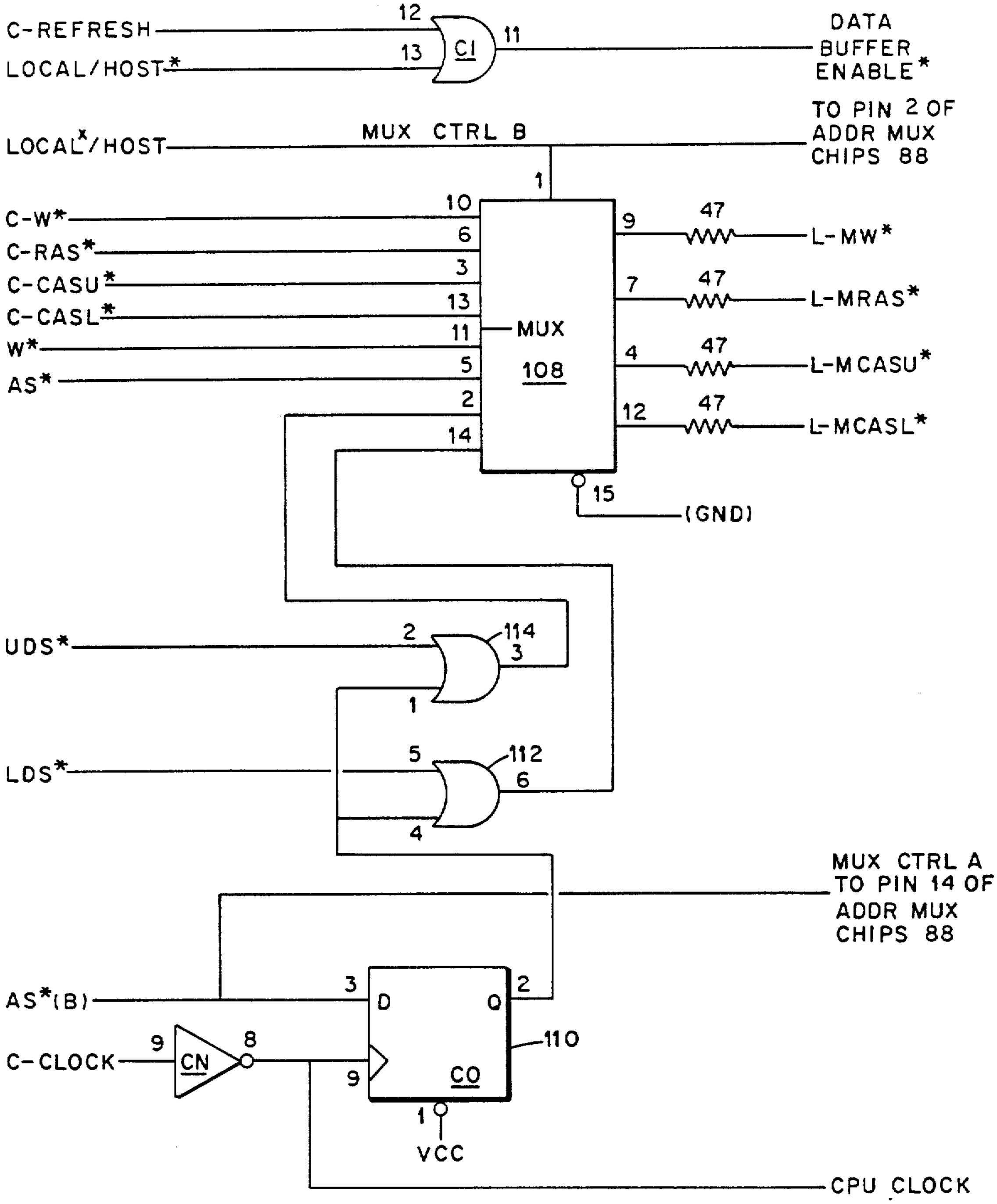
Figure 12:
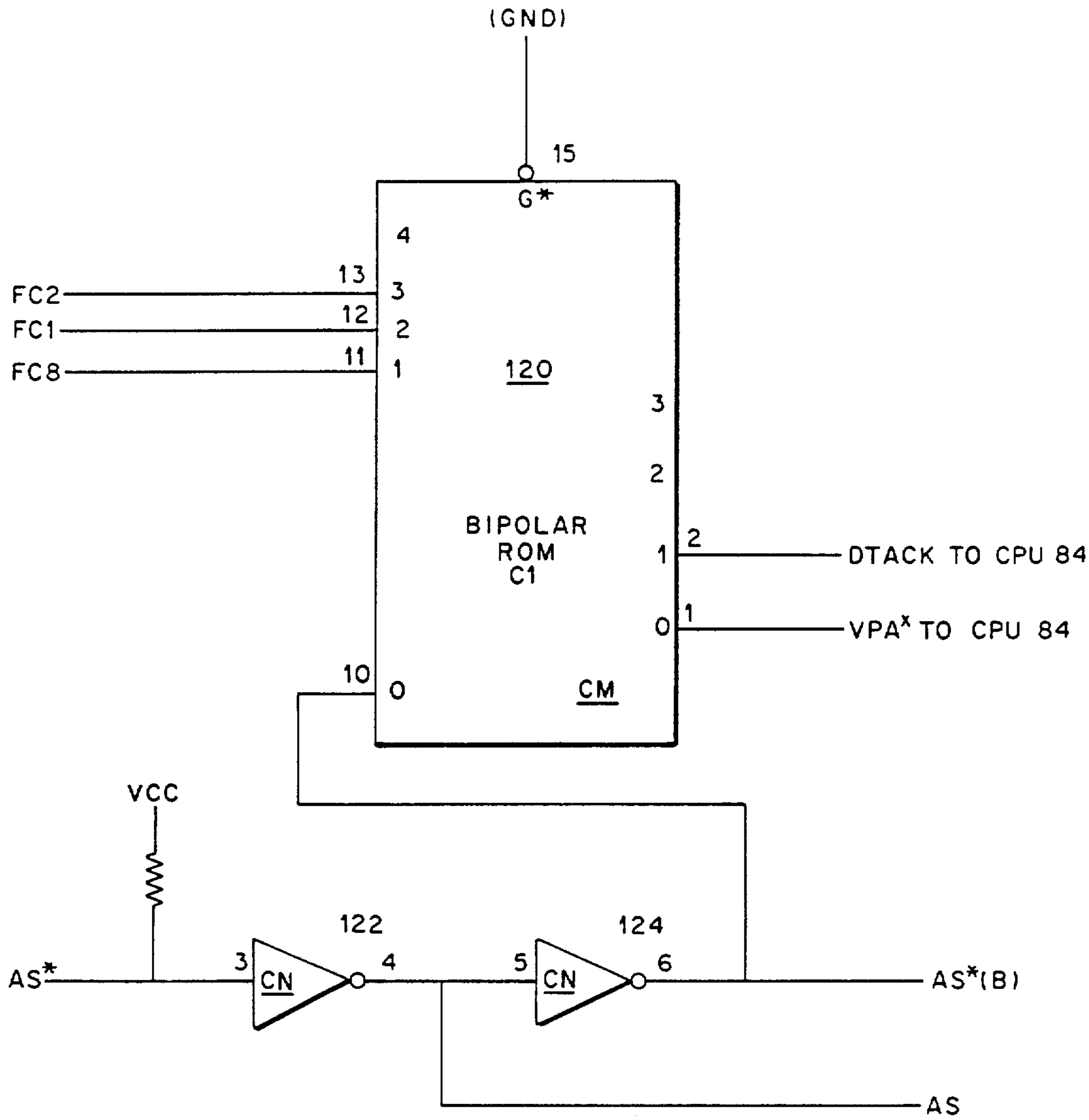
Figure 13:
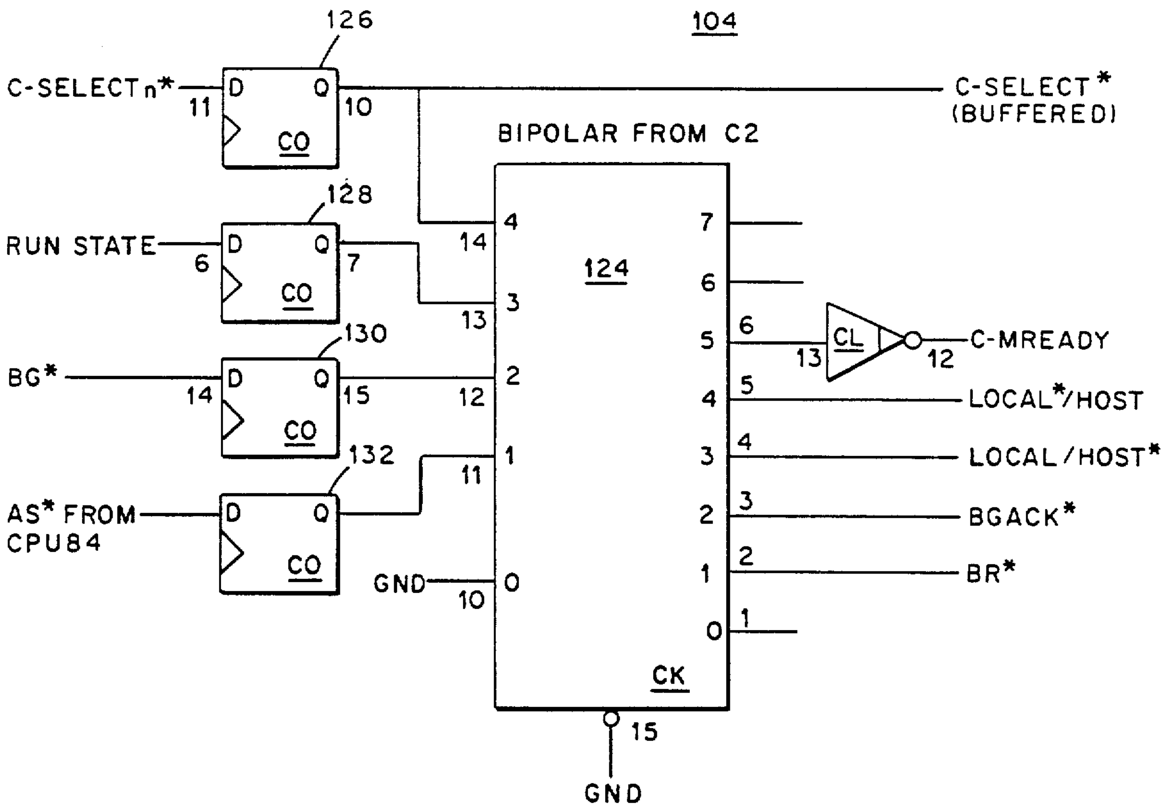
Figure 14:
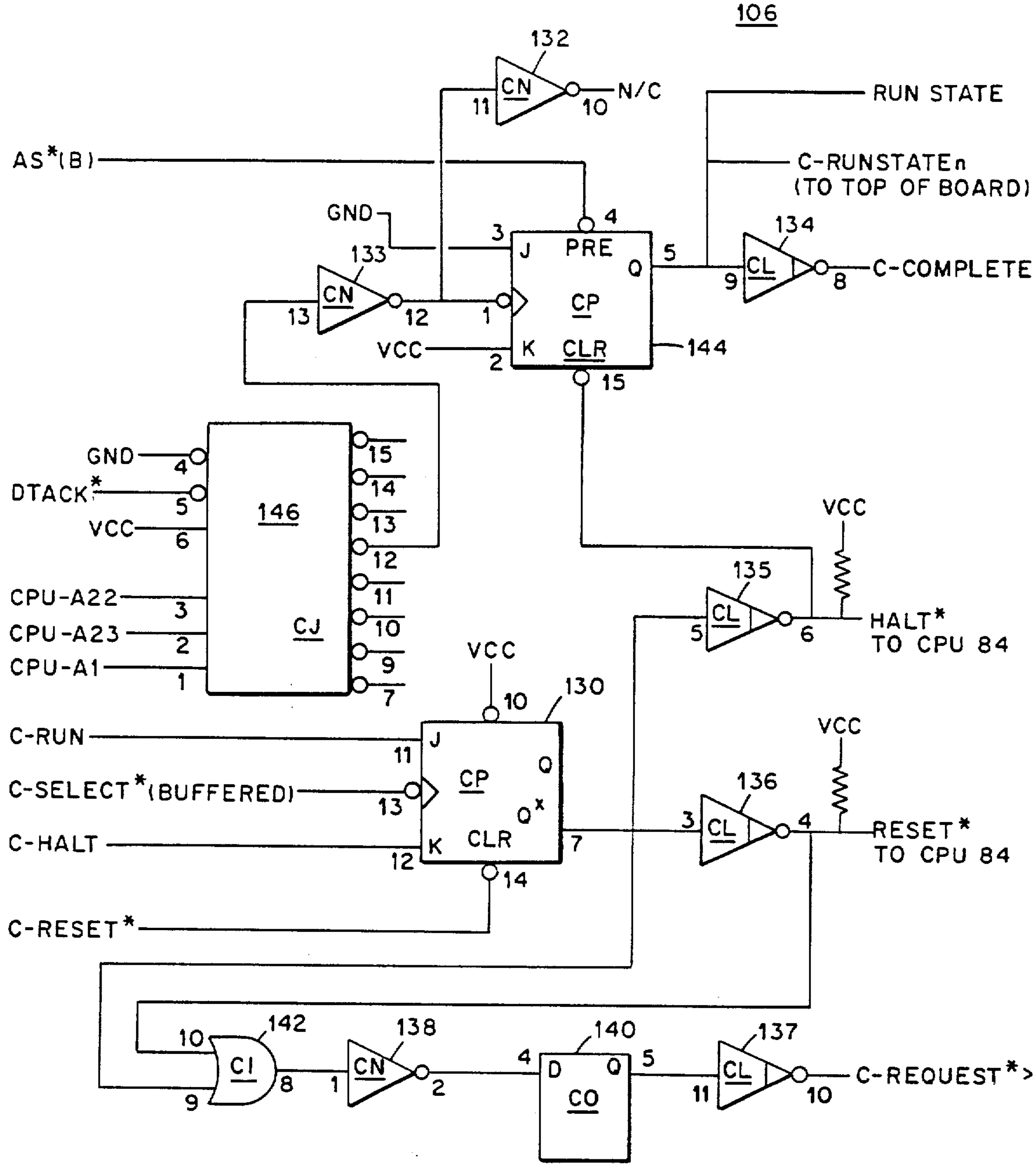
Figure 15:
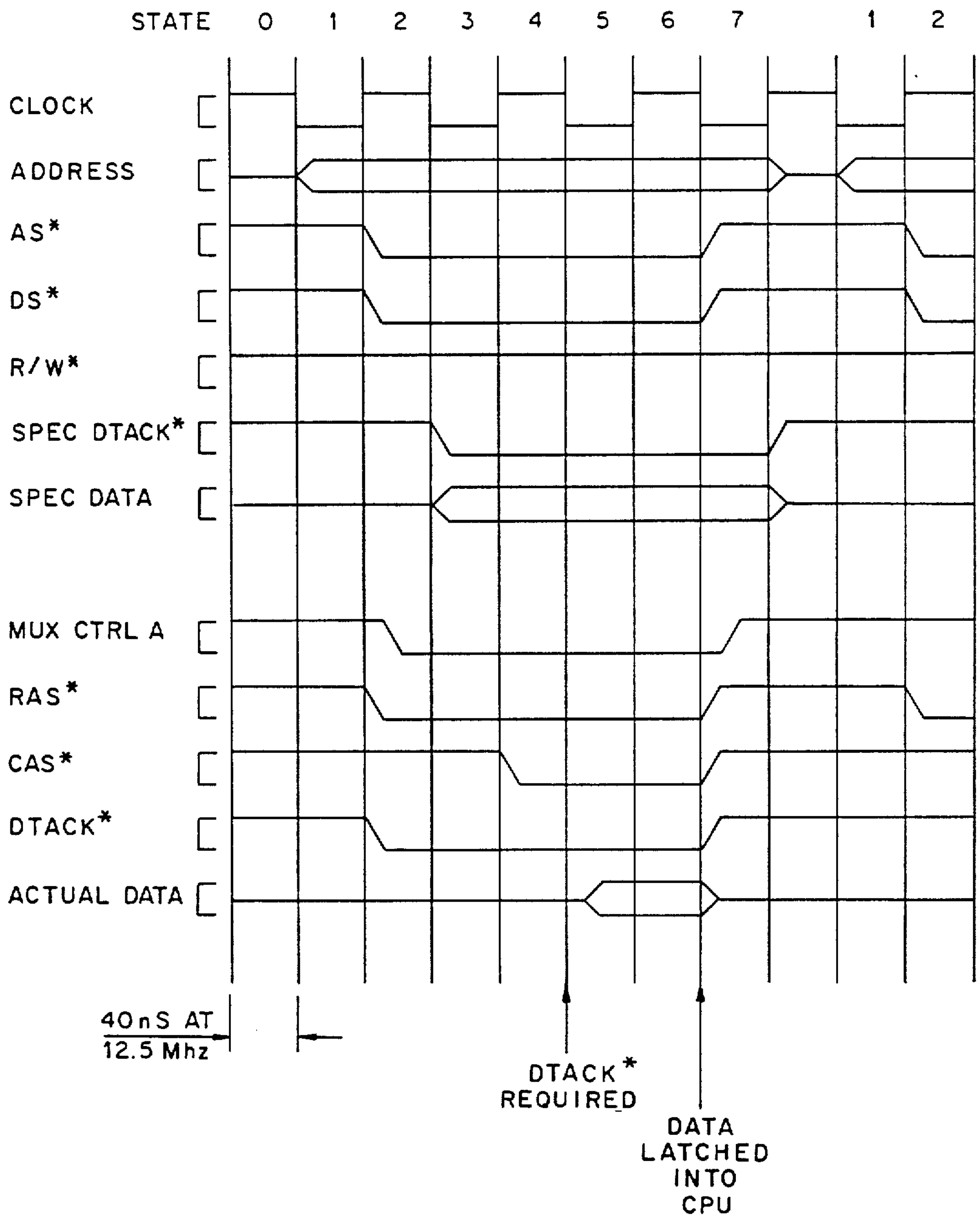
Figure 16:
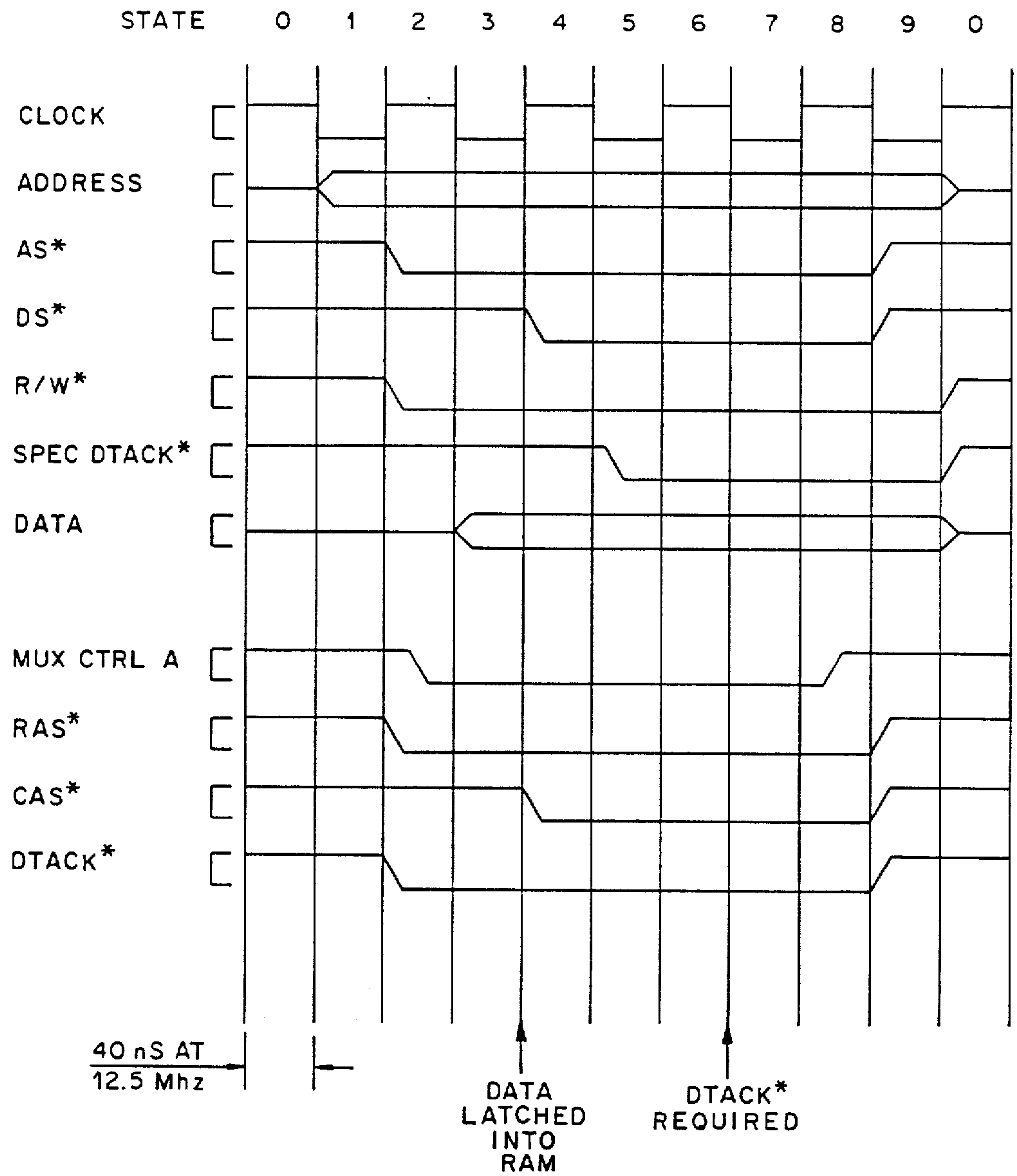
Figure 17:
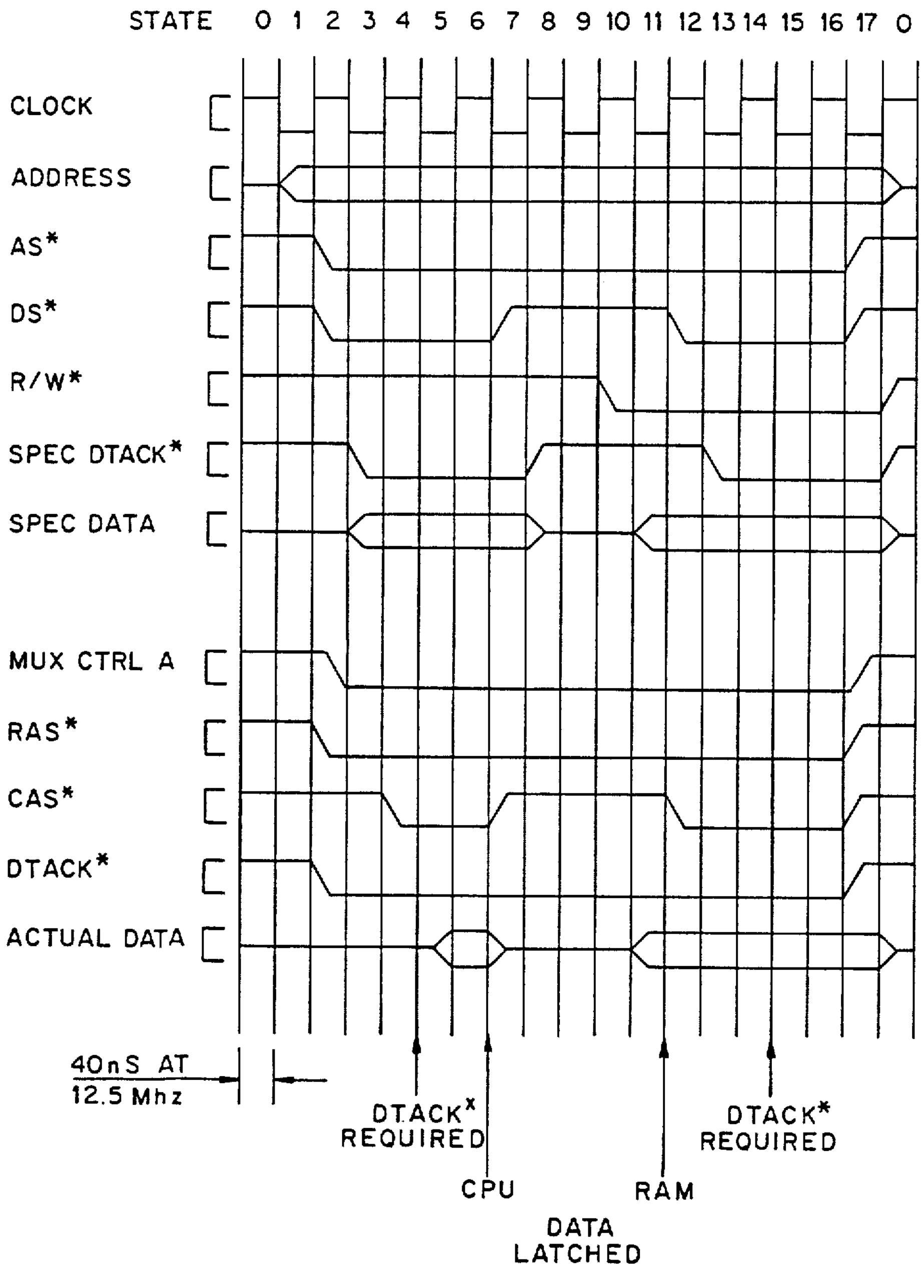
Figure 20:
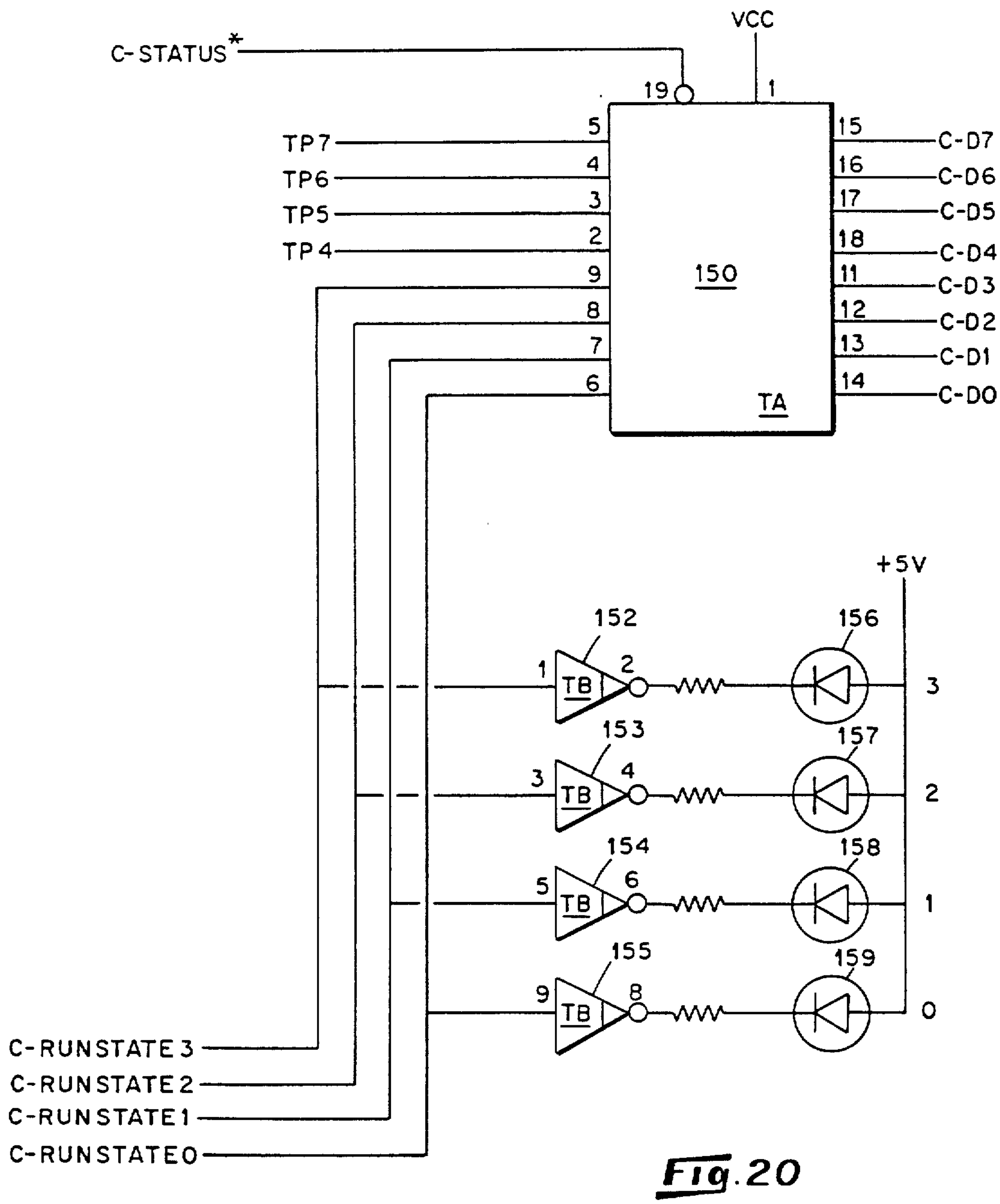
Figures 28, 29:
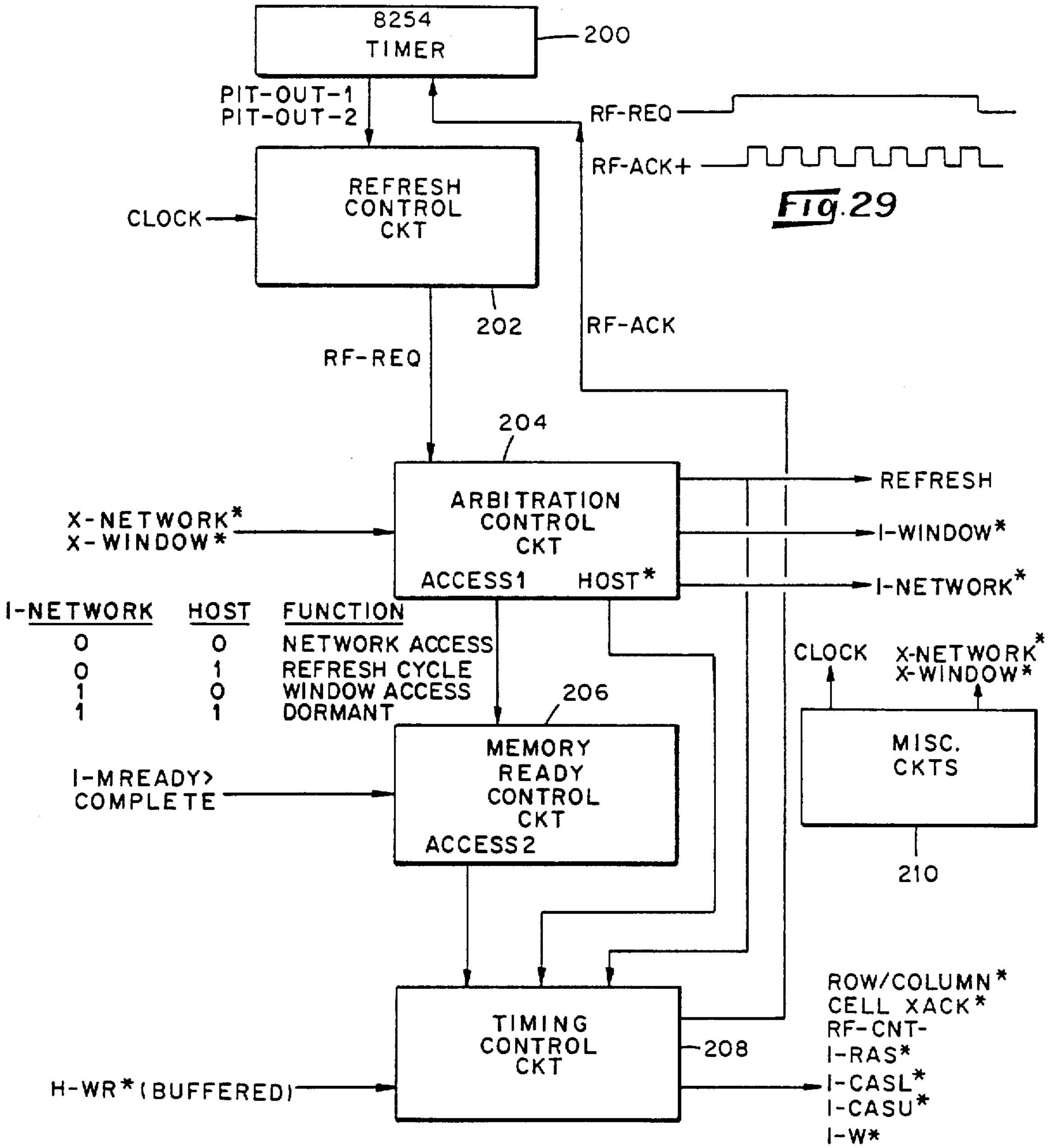
Figure 30:
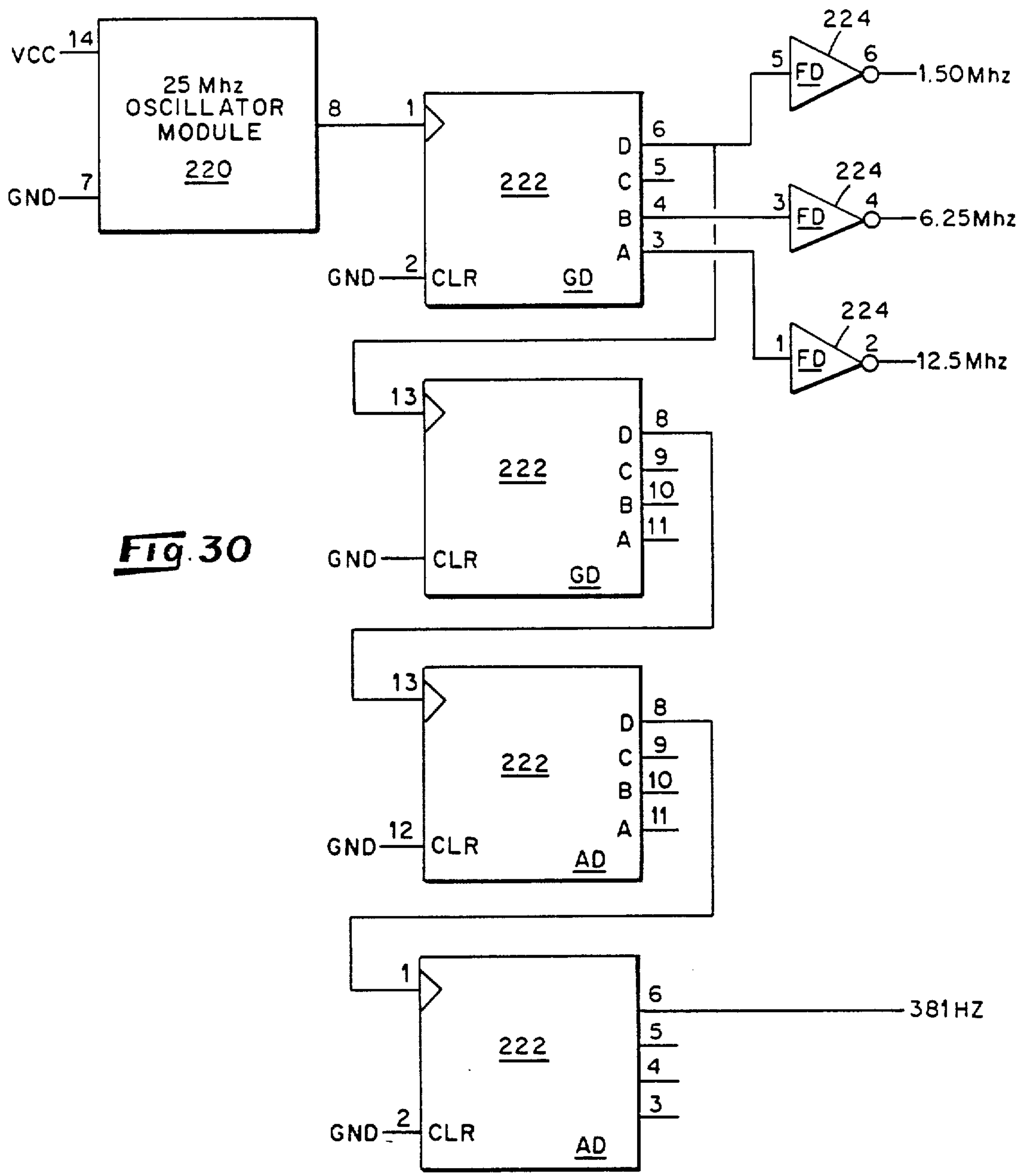
Figure 31:
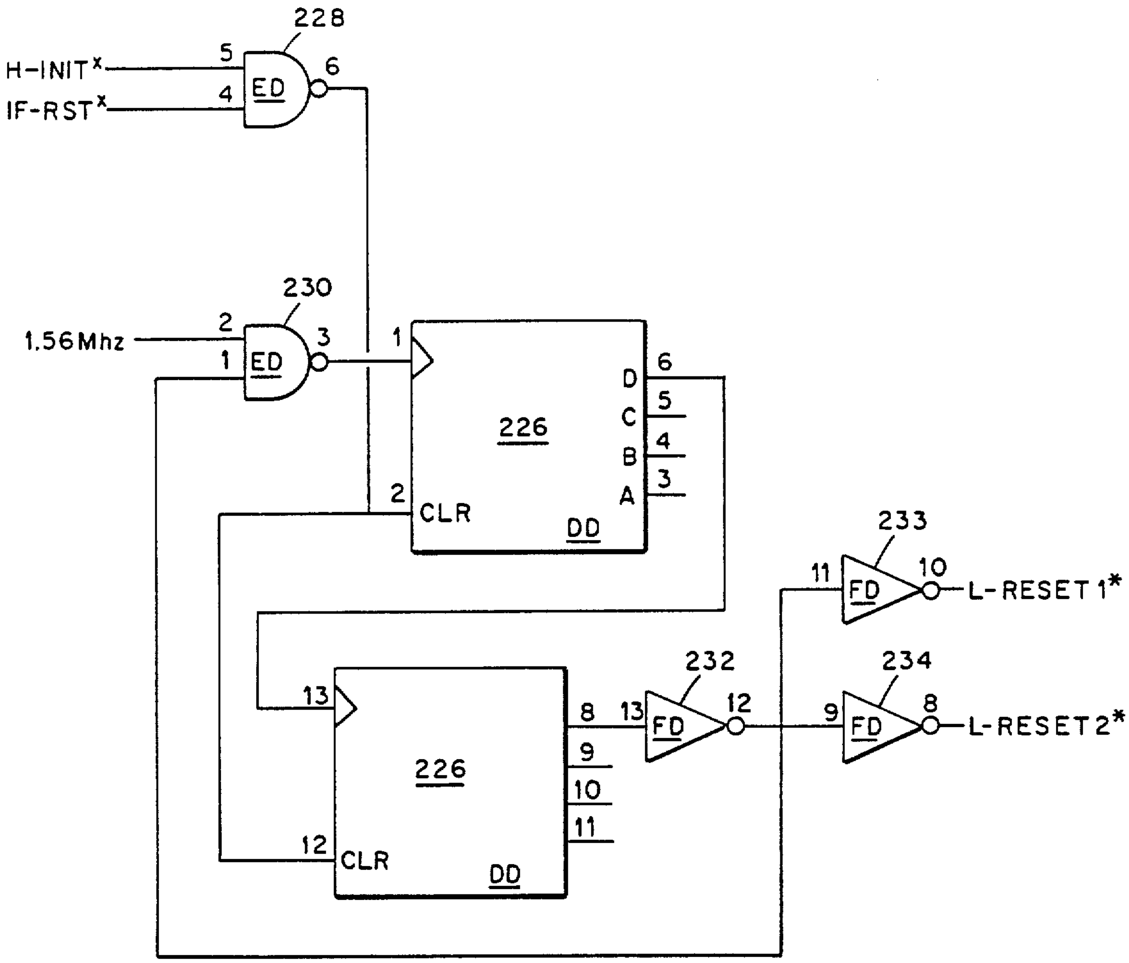
Figure 32:
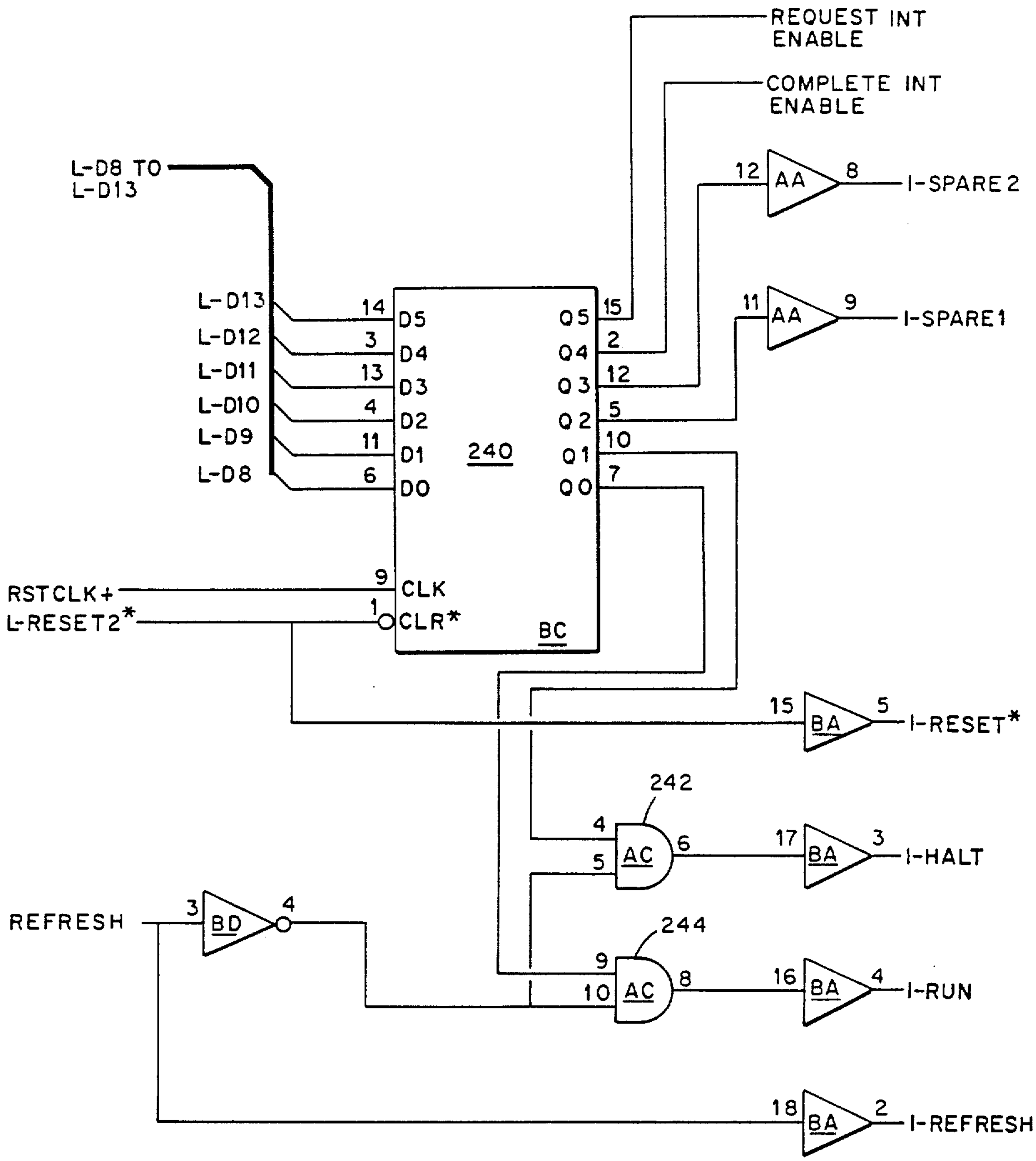
Figure 33:
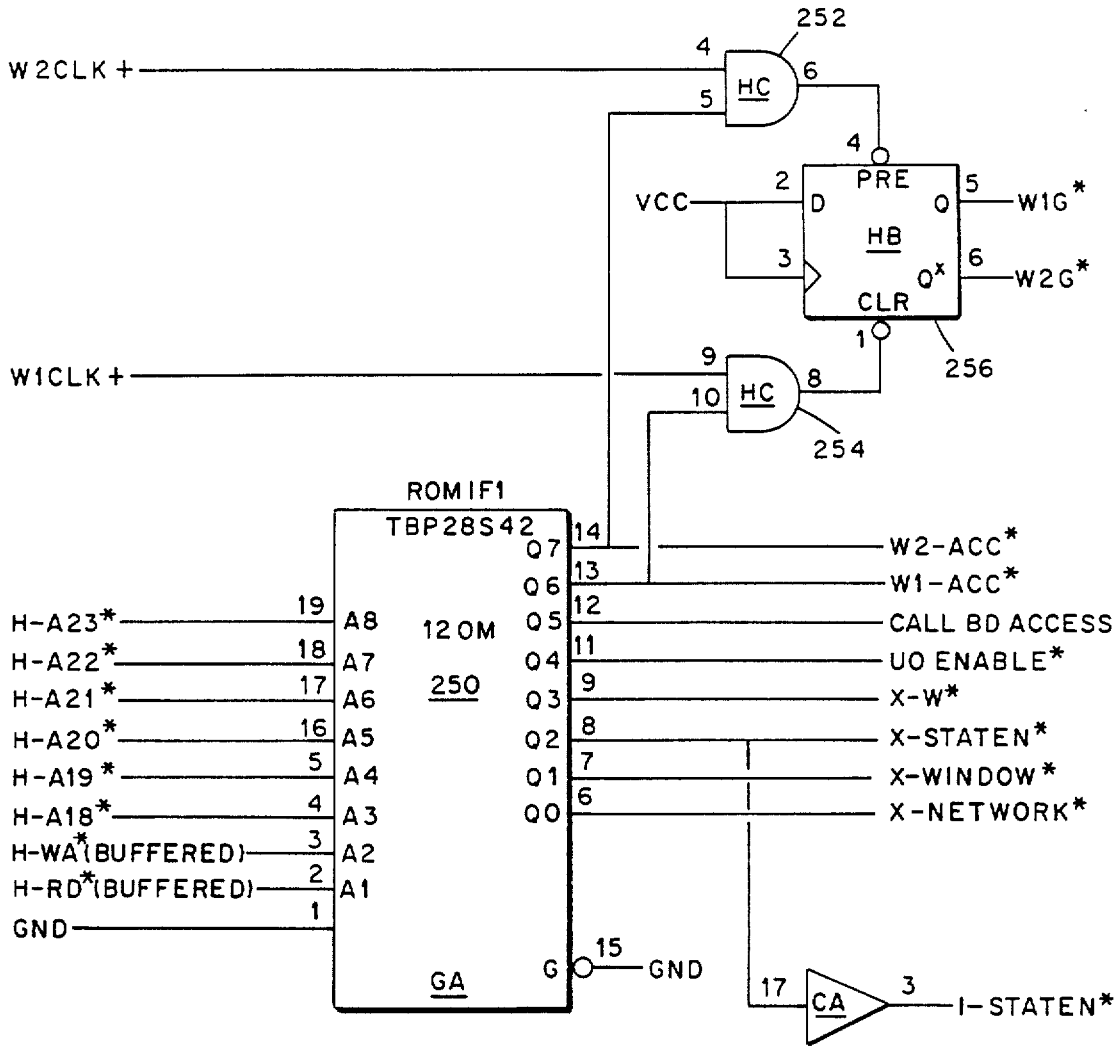
Figure 36:
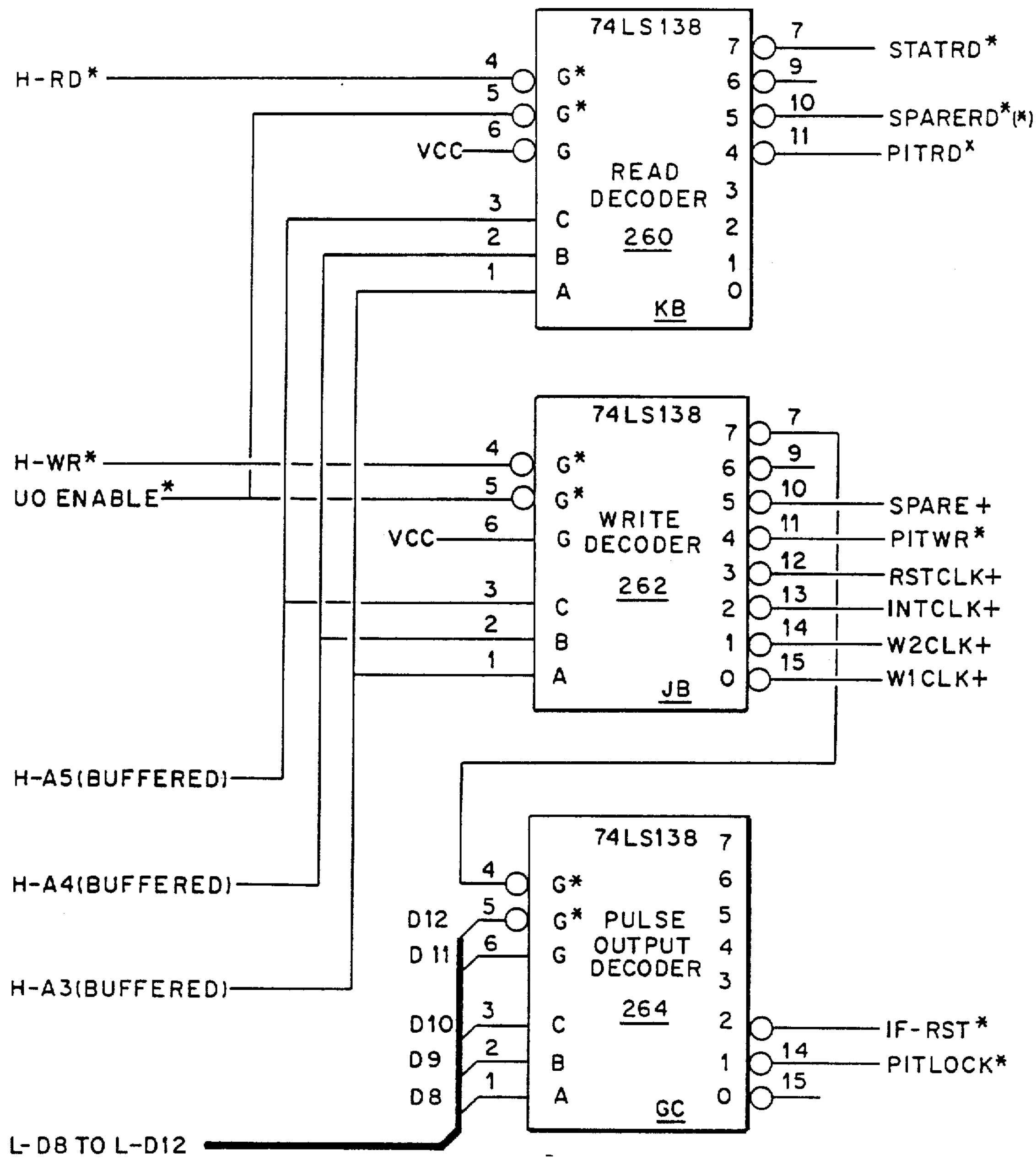
Figure 37:
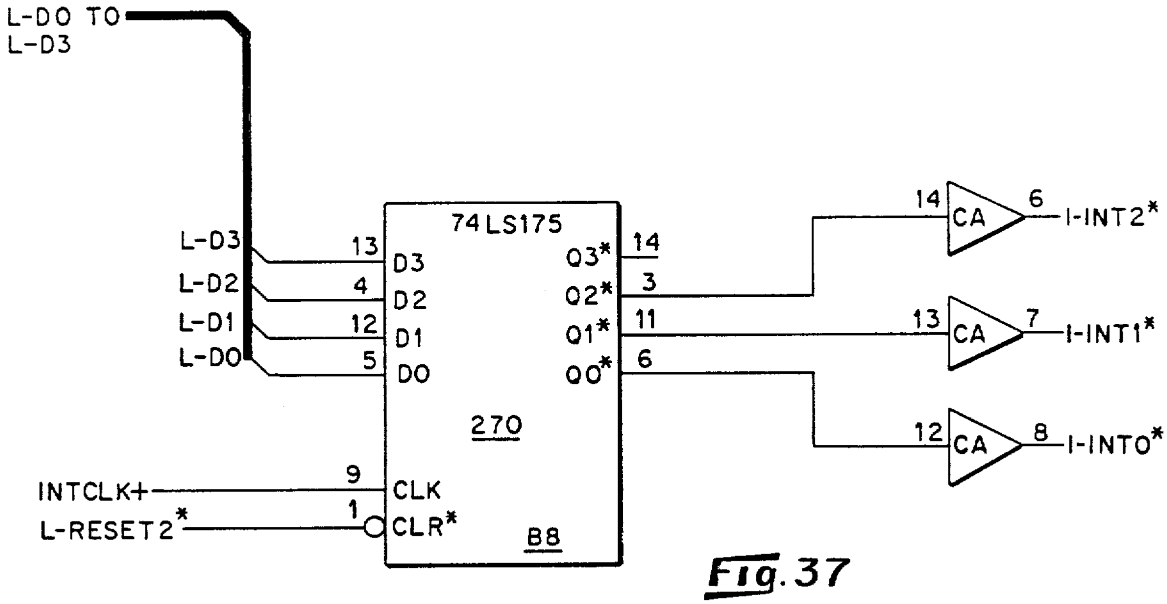
Figure 38:
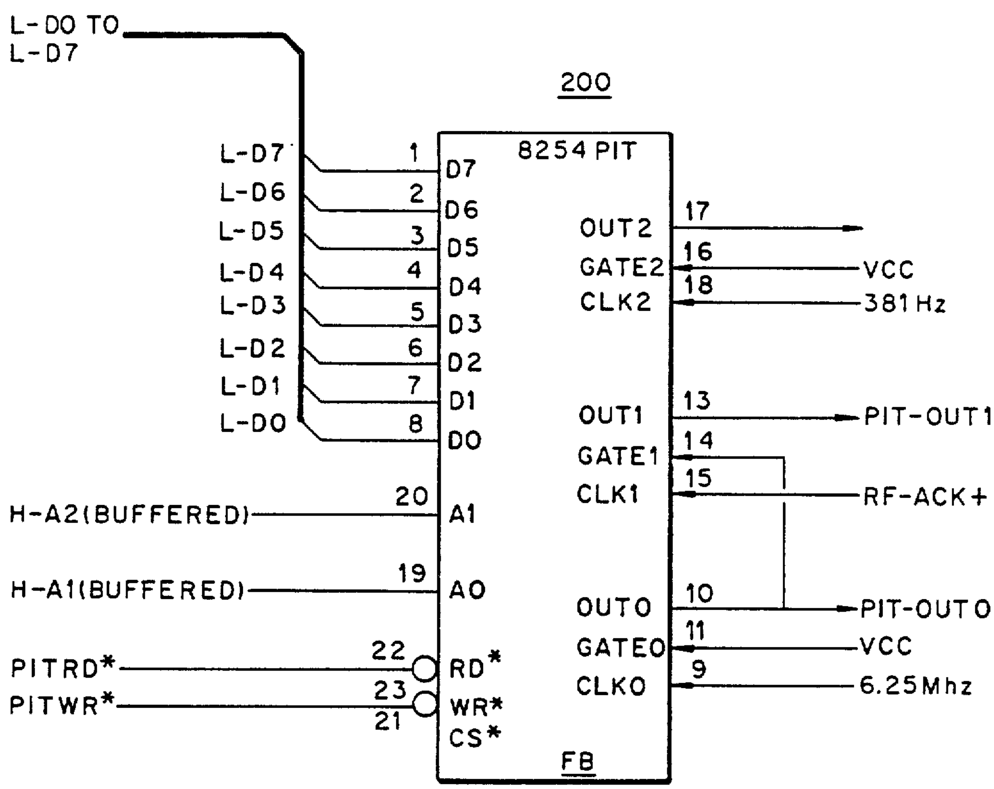
Figure 39:
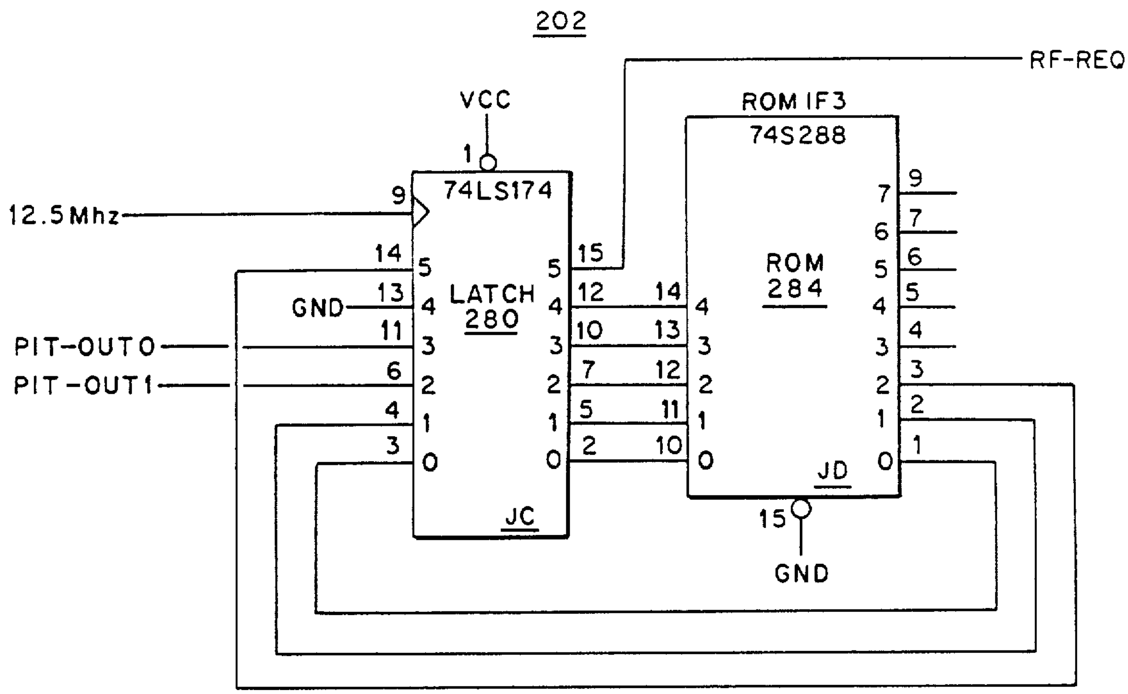
Figure 41:
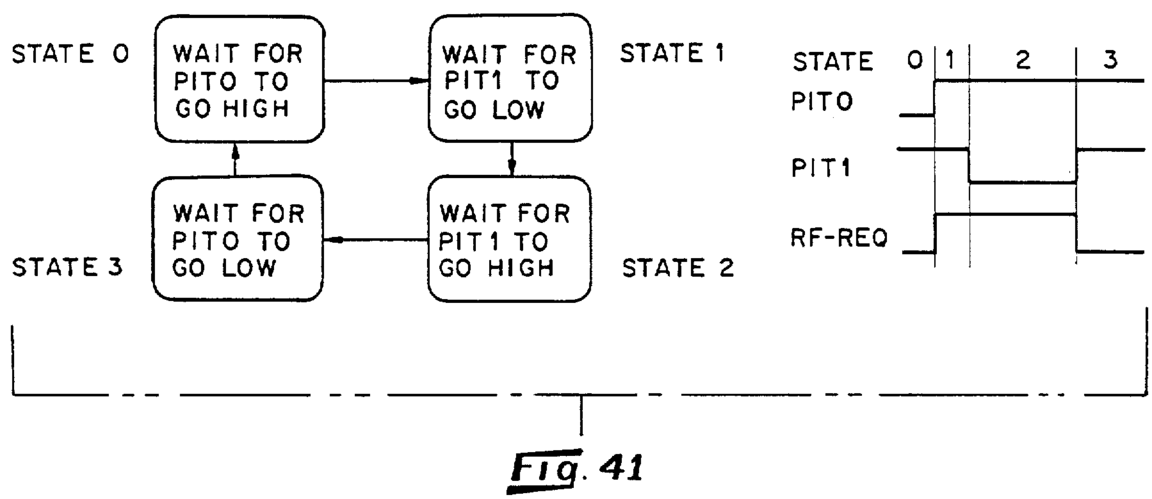
Figure 42:
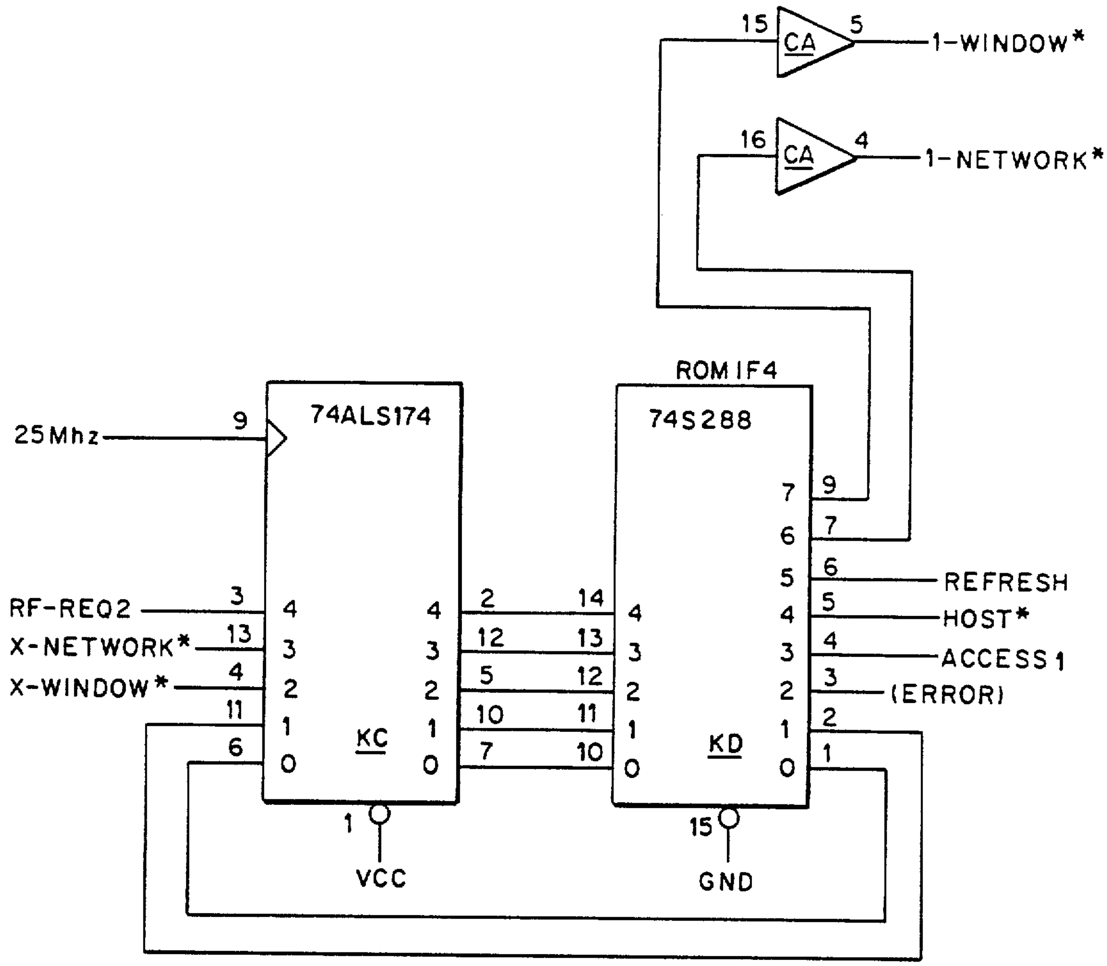
Figure 44:
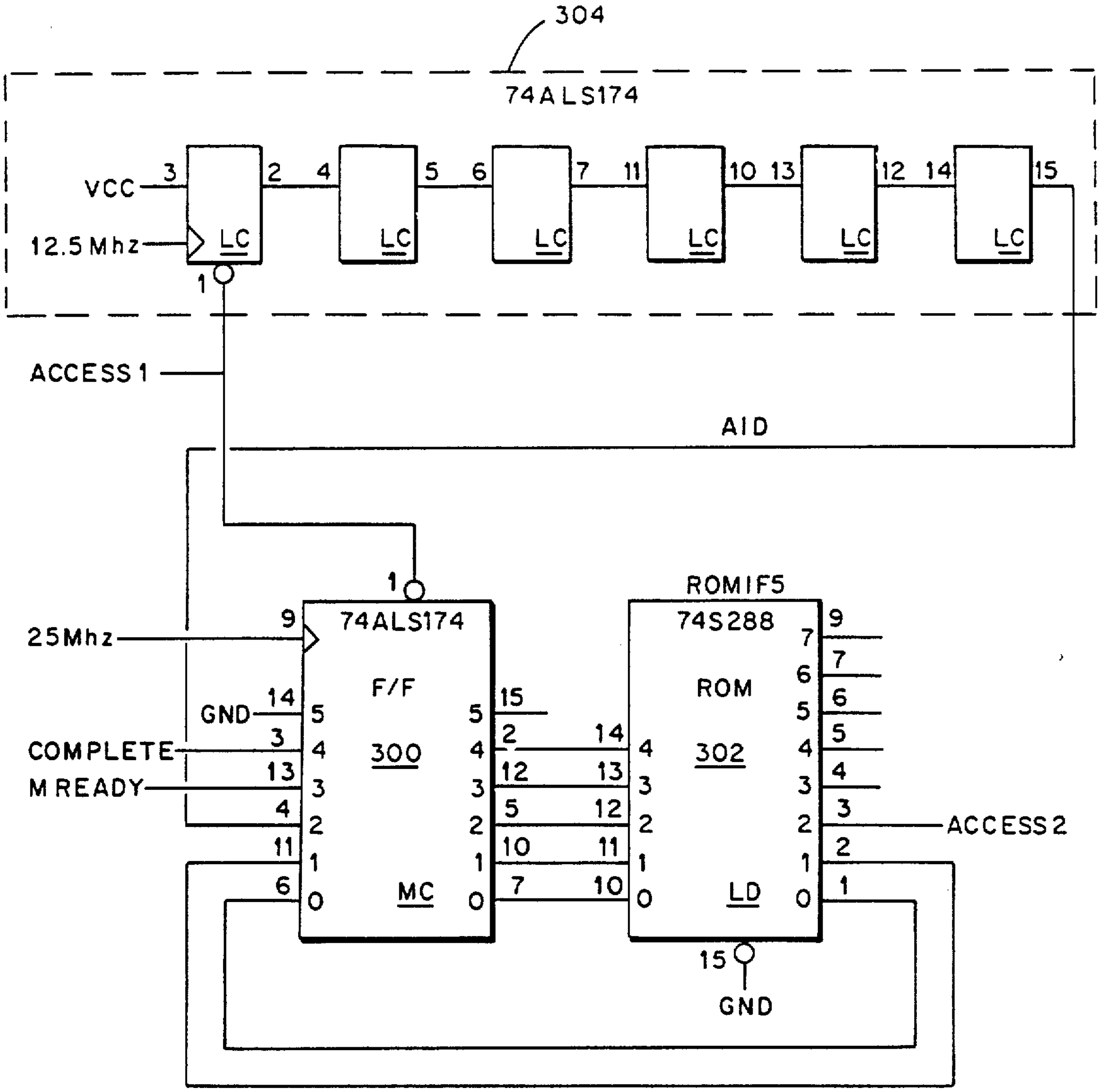
Figure 46:
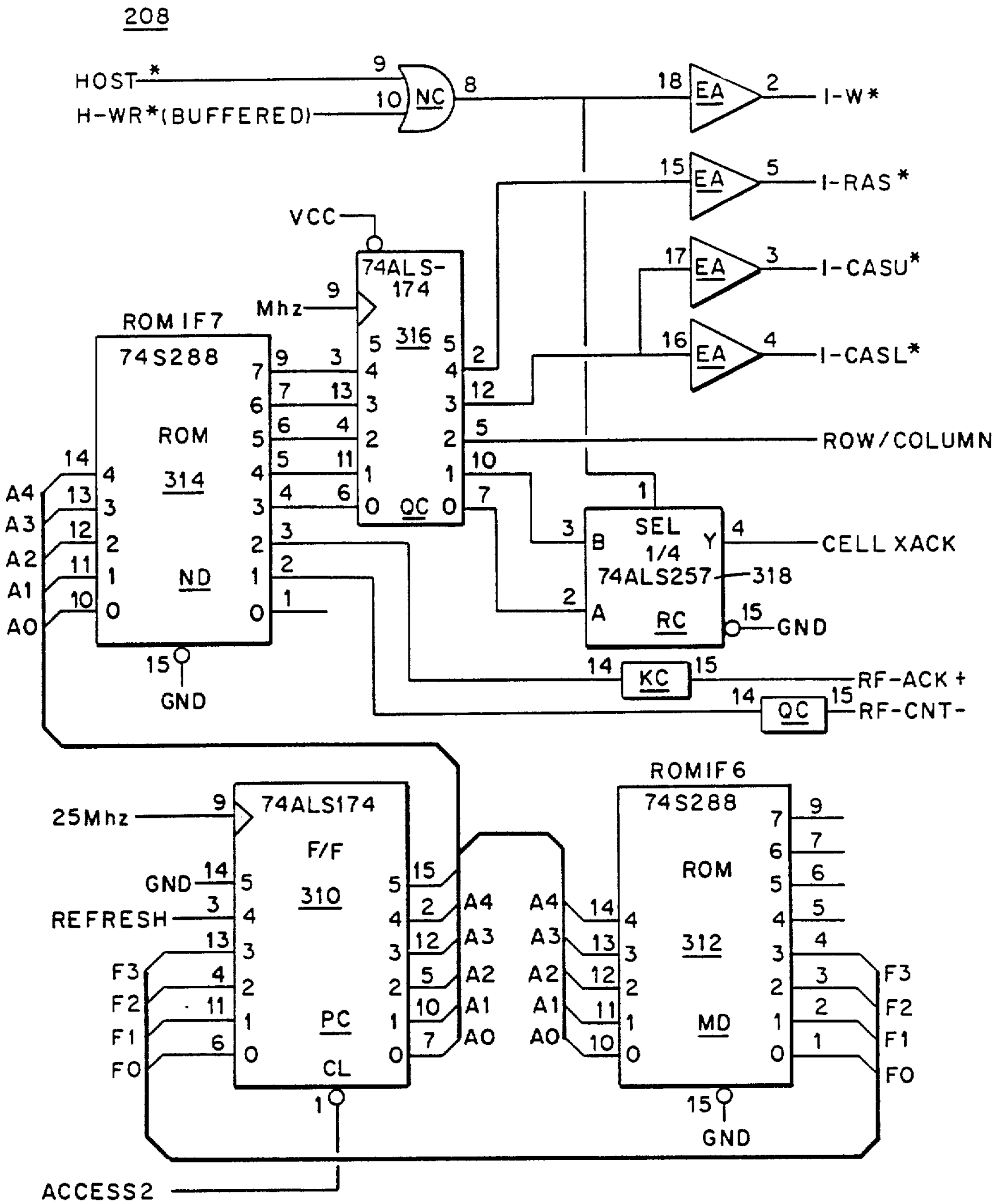
Figure 47:
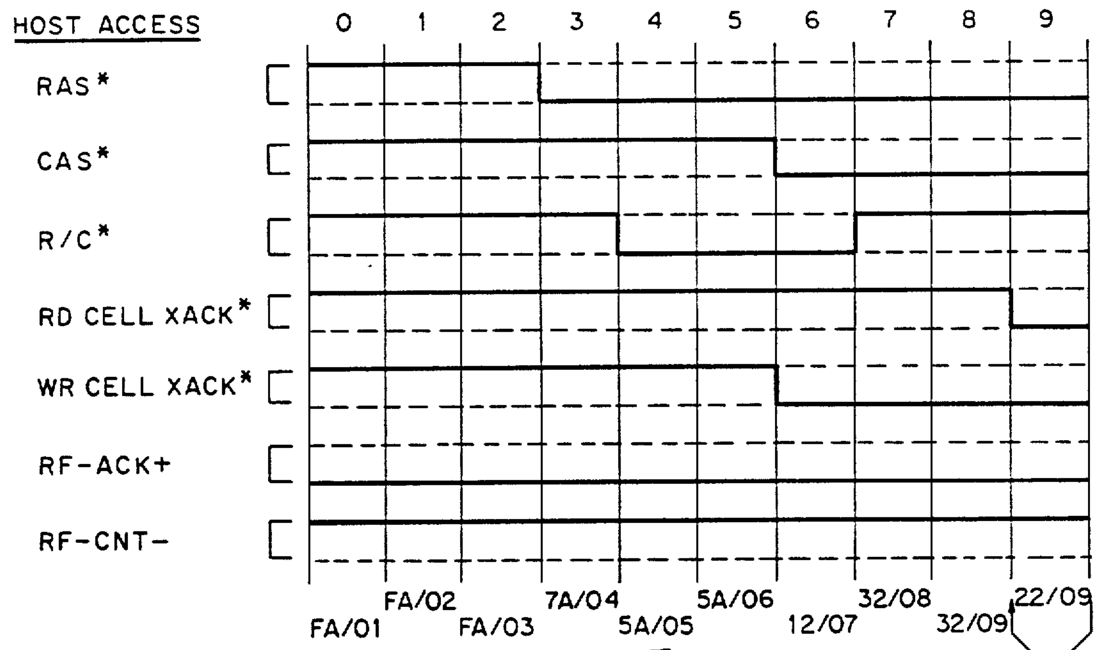
Figure 48:
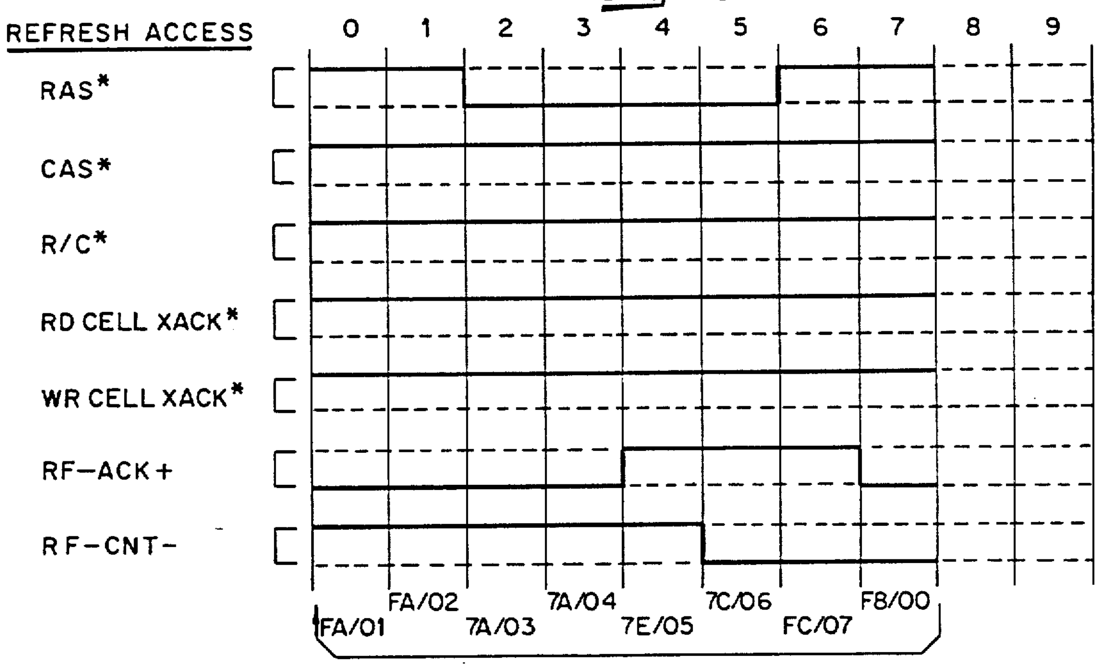
Figure 49:
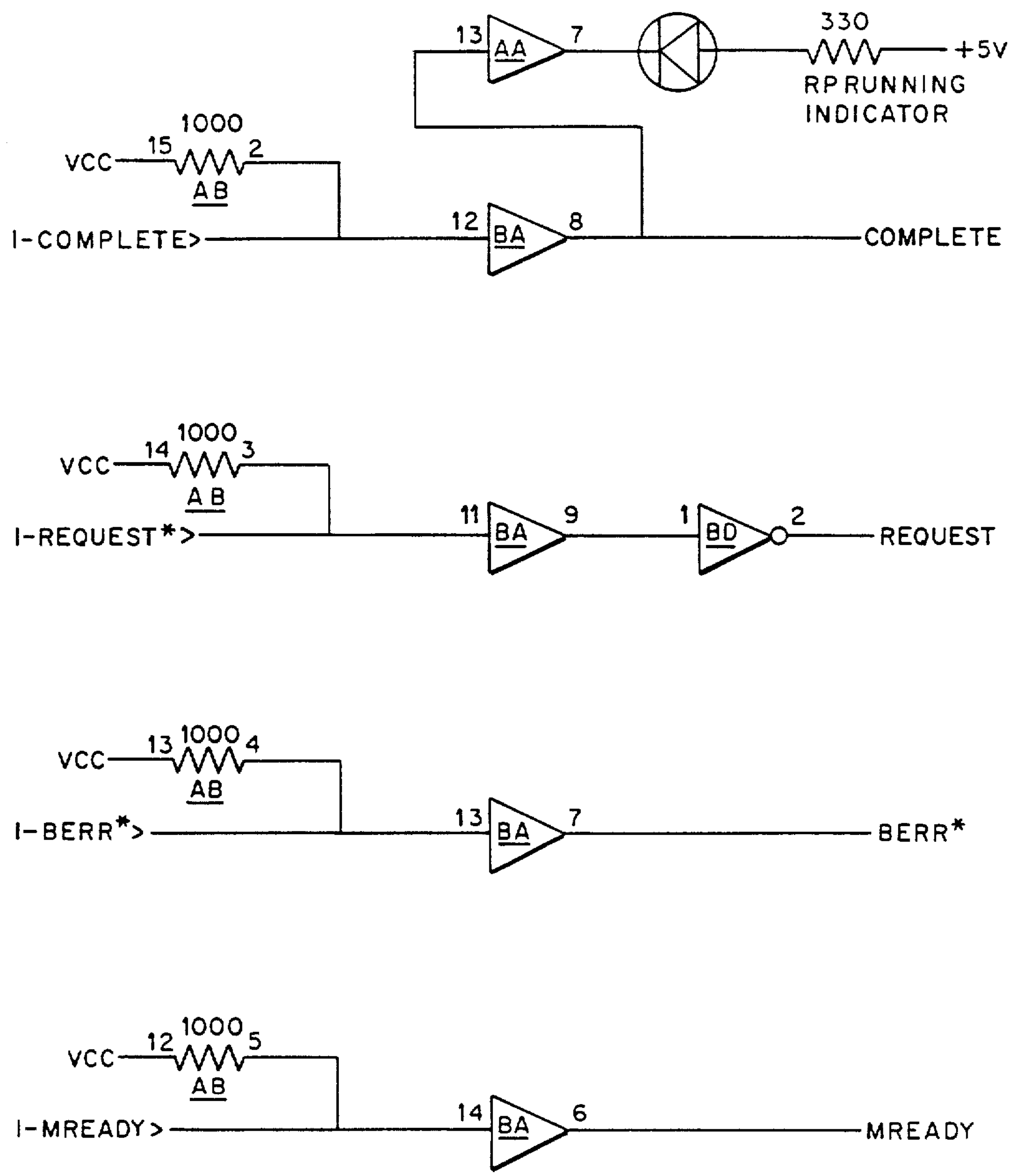
Figure 50:
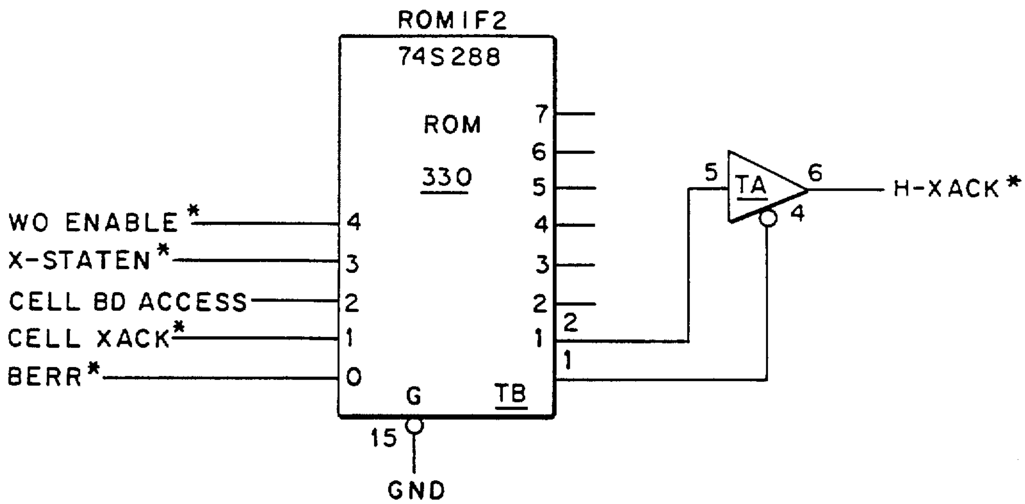
Figure 52:
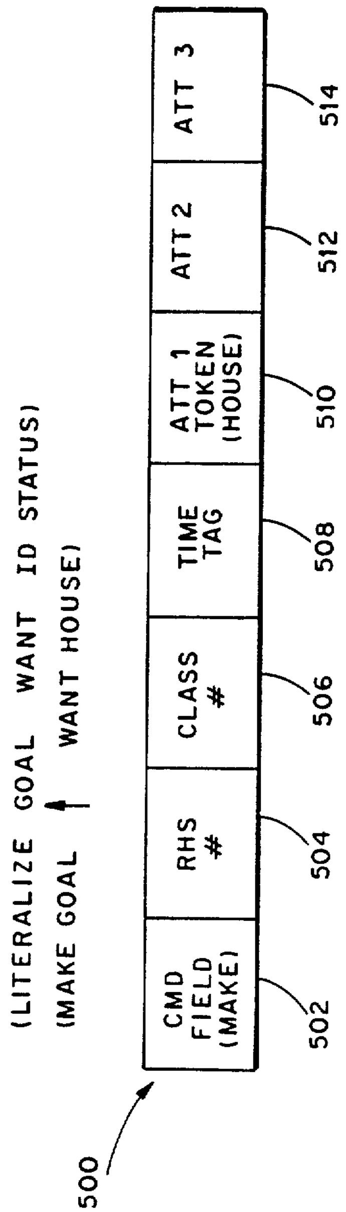
Figure 53:
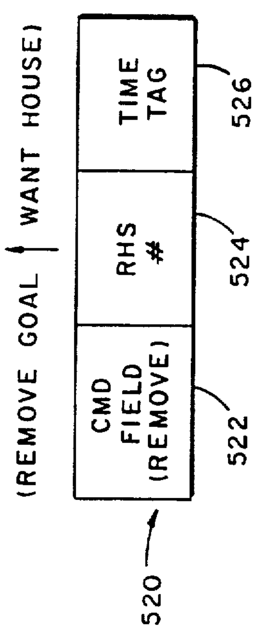
Figure 54A:
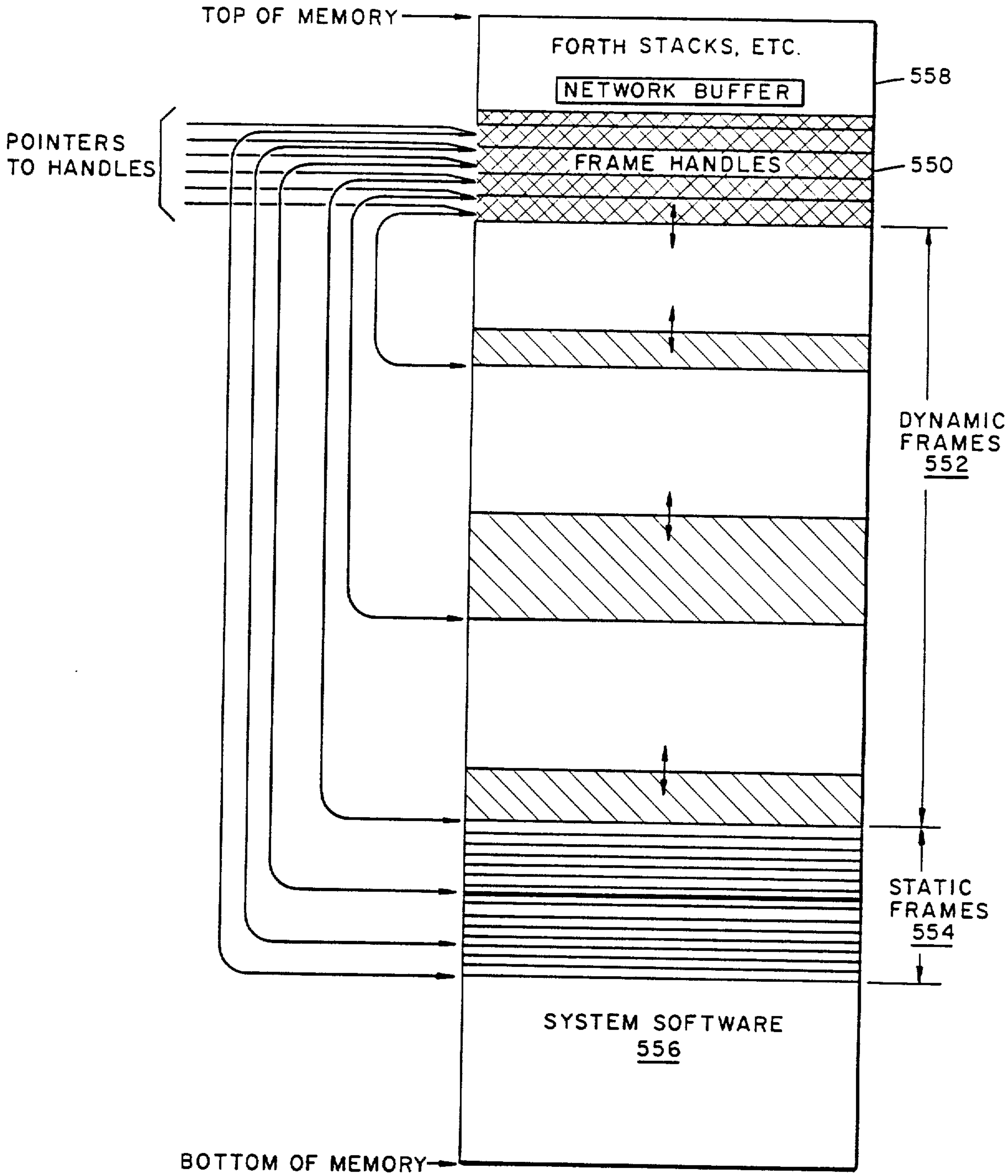
Figure 54B:
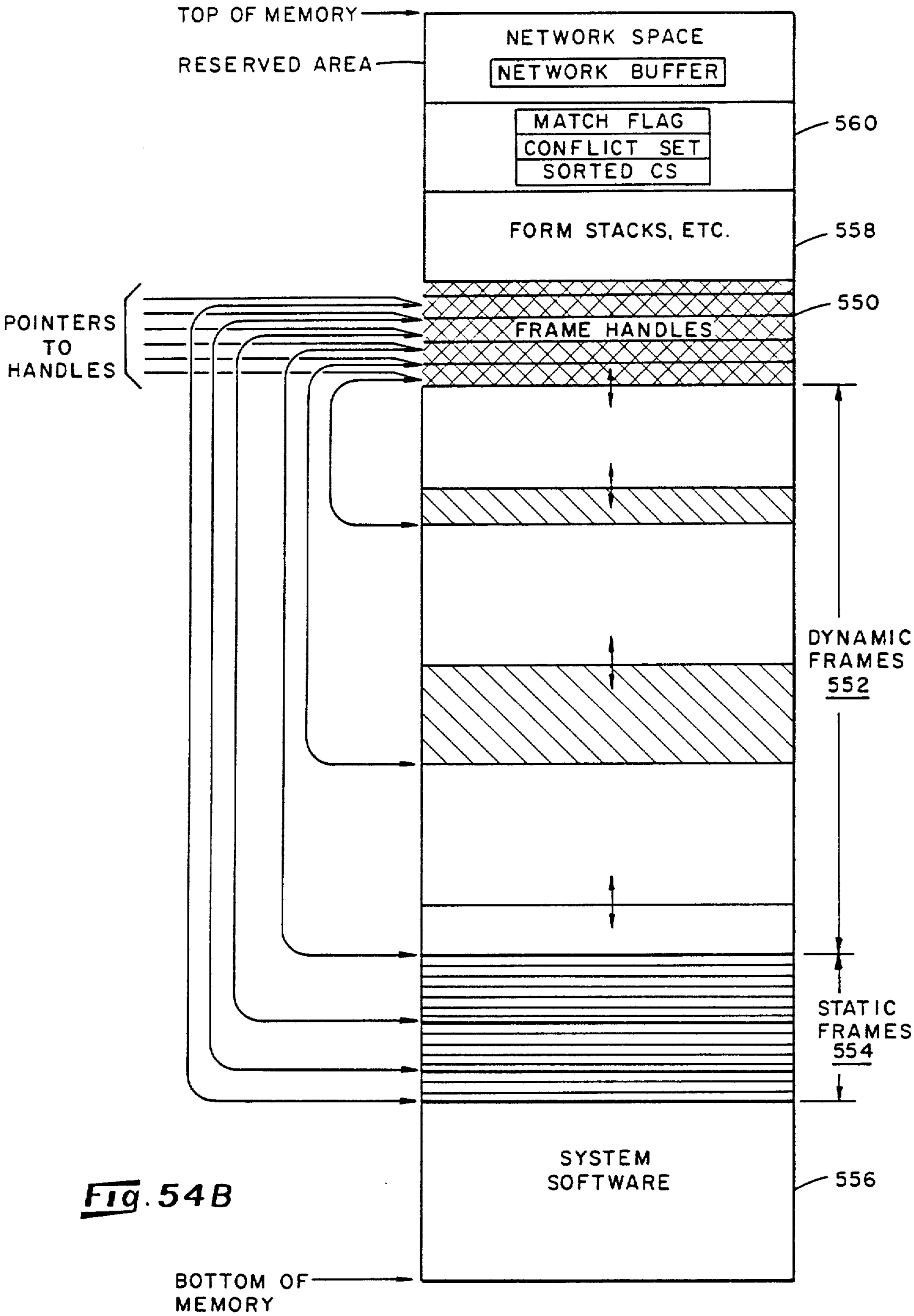
Figure 55:
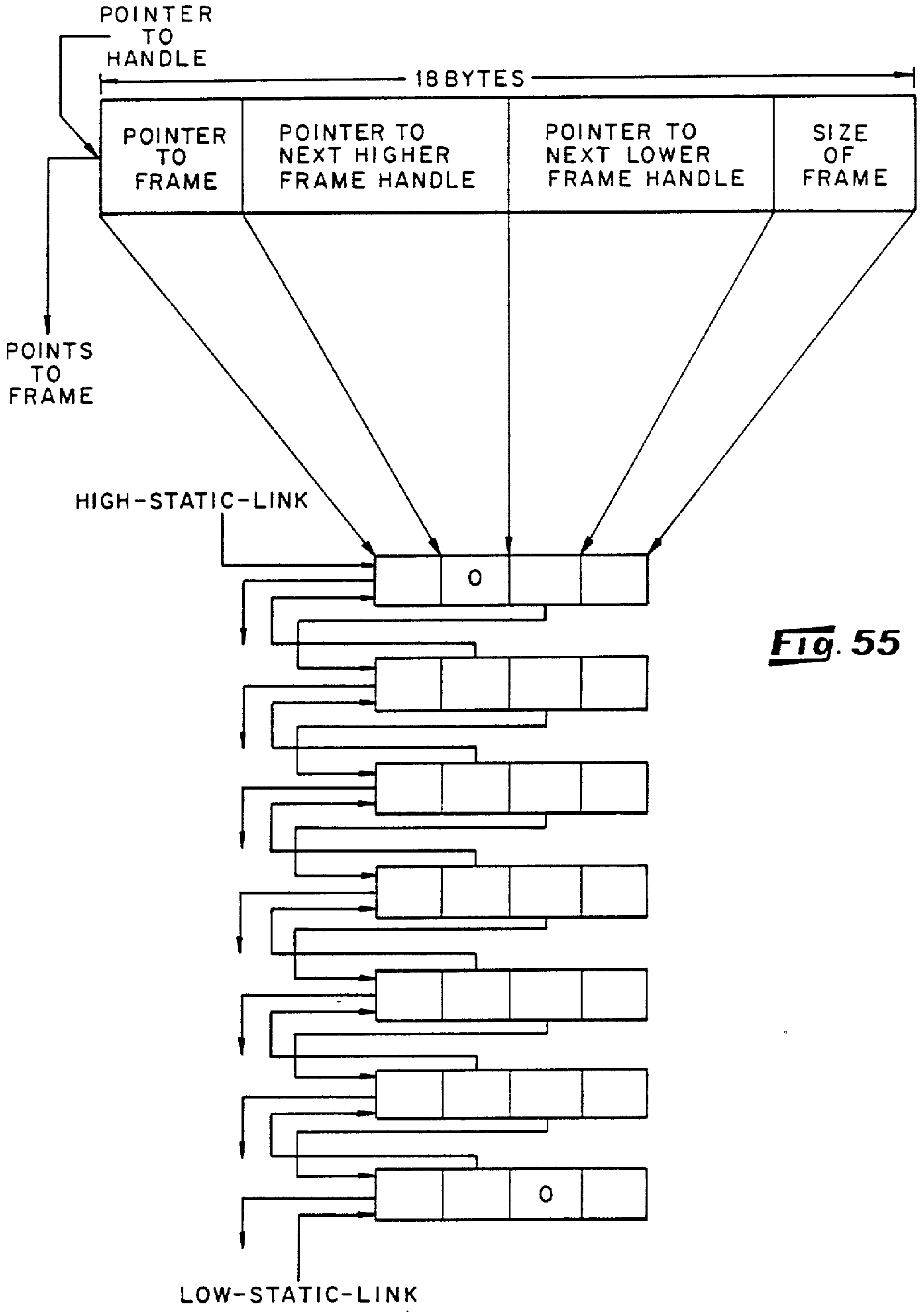
Figure 65:
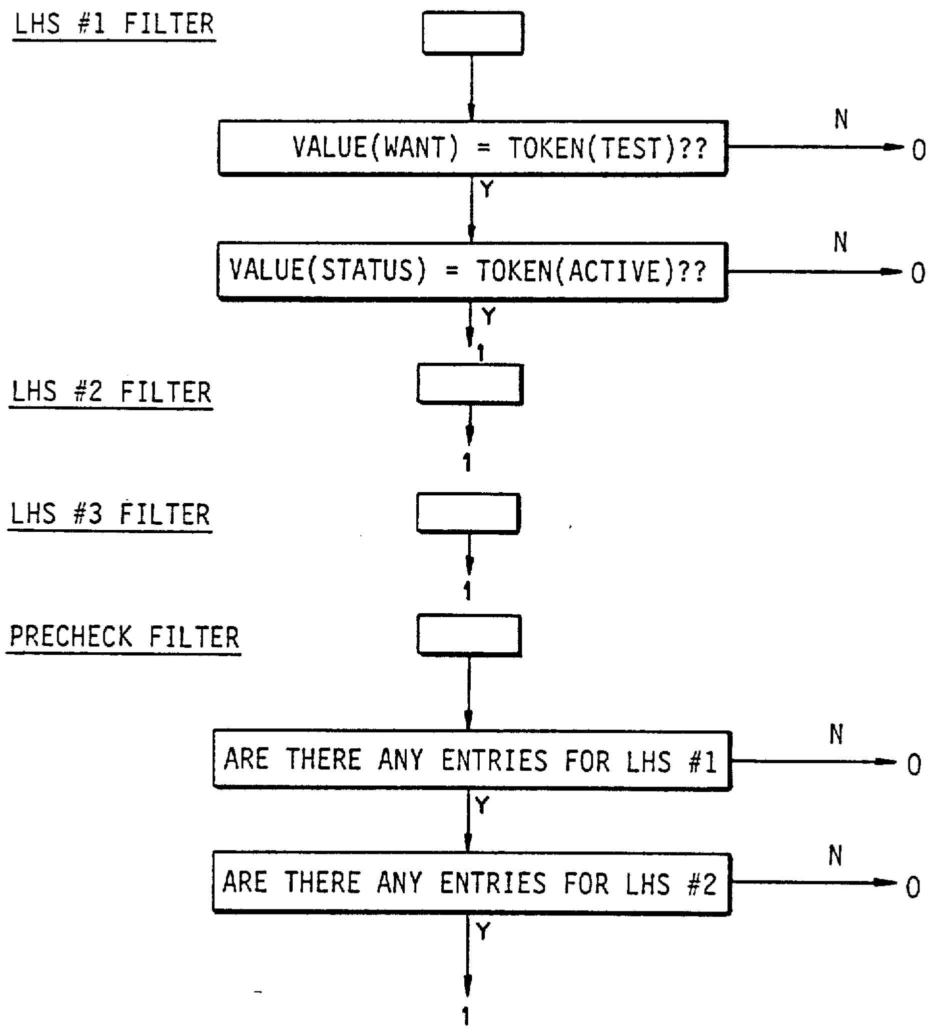
Figure 65:
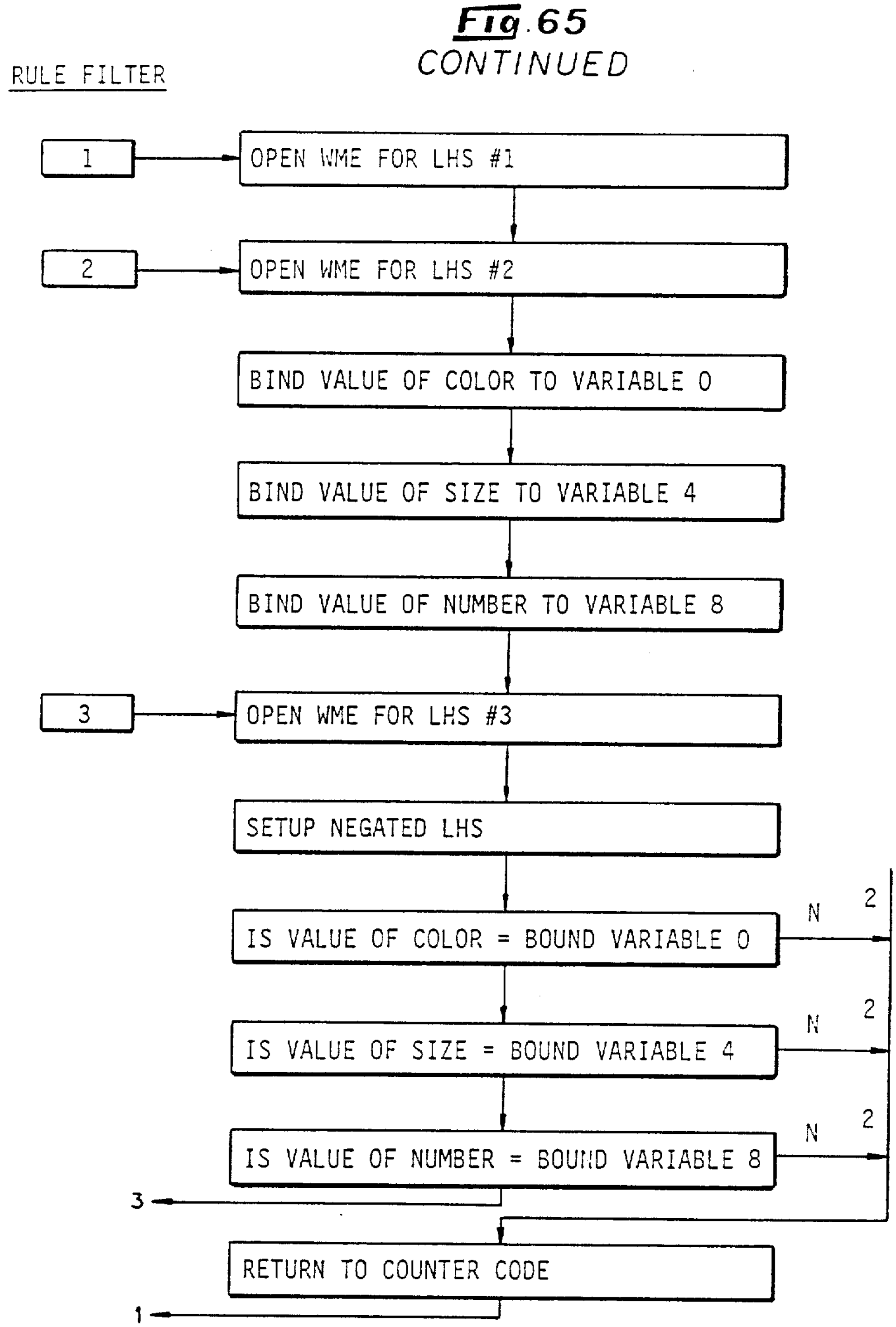
Figure 67:
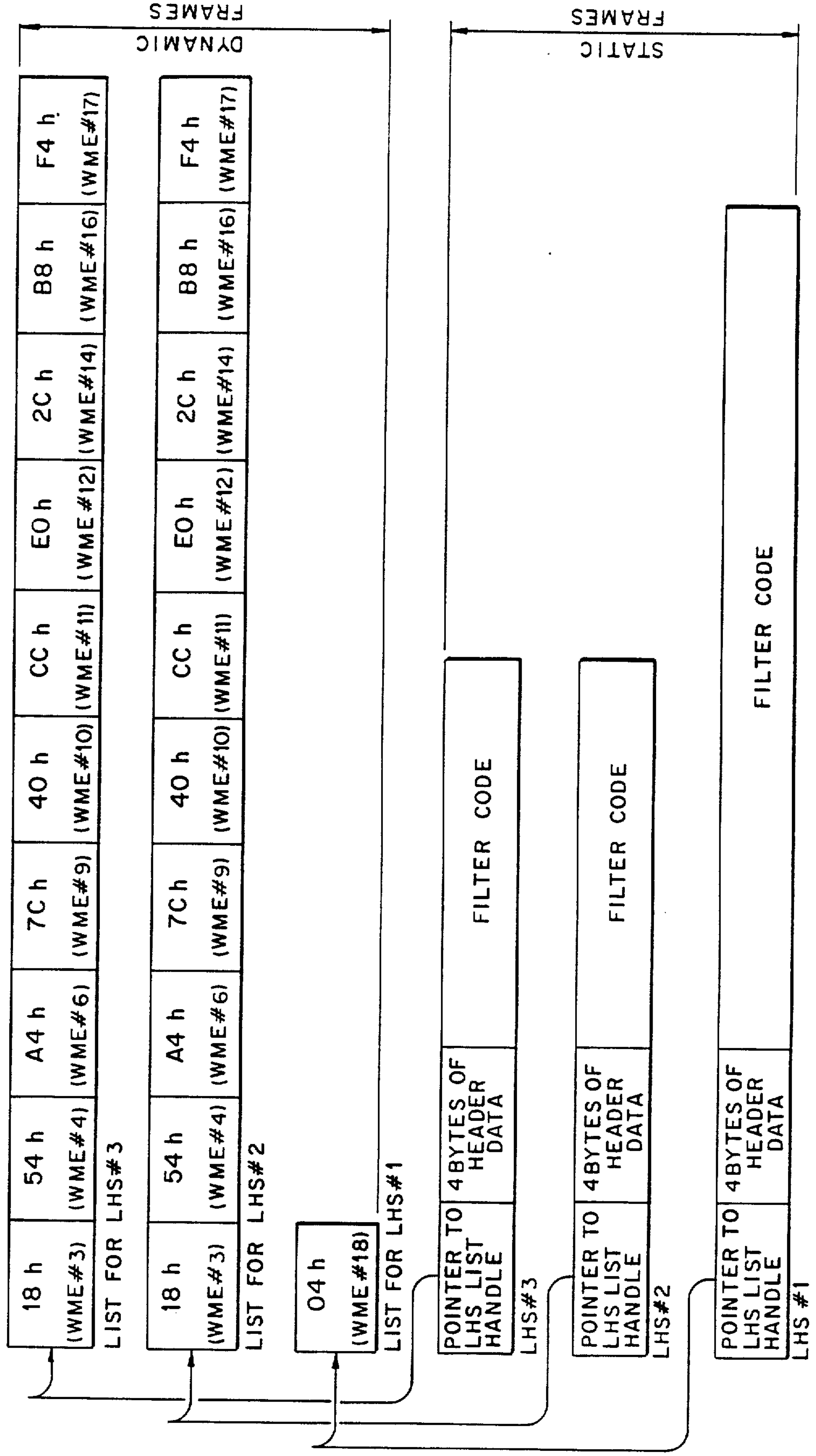

FIGS. 9A-9C set forth the cell board layout;

FIG. 10 is a block diagram of major portions of the cell control logic circuit of FIG. 7;

FIG. 11 is a schematic diagram of the local memory control logic of FIG. 10;

FIG. 12 is a schematic diagram of the interrupt control logic of FIG. 10;

FIG. 13 is a schematic diagram of the arbitration control logic of FIG. 10;

FIG. 14 is a schematic diagram of the cell disable logic of FIG. 10;

FIGS. 15-17 are timing graphs for the rule processors;

FIGS. 18 and 19 are ROM tables;

FIG. 20 illustrates the top board circuitry of FIG. 9A;

FIGS. 21-27 illustrate circuit details of the board control/logic of FIG. 9C;

FIG. 28 is a block diagram of the rule processor memory control circuit of FIG. 5;

FIG. 29 is a graph of the refresh request and acknowledge signals;

FIG. 30 is a schematic diagram of the board clock circuit of FIG. 28;

FIG. 31 is a schematic diagram of the board reset logic circuit;

FIG. 32 is a schematic diagram of the reset port;

FIG. 33 is a schematic diagram of the board select logic circuit;

FIG. 34 sets forth the board select equations;

FIG. 35 is the board select ROM table;

FIG. 36 is a schematic diagram of the I/O decode logic;

FIG. 37 is a schematic diagram of the interrupt port;

FIG. 38 is a schematic diagram of the refresh programmable interval timer;

FIG. 39 is a schematic diagram of the refresh control circuit of FIG. 28;

FIG. 40 is a refresh ROM table;

FIG. 41 is a state machine diagram;

FIG. 42 is a schematic diagram of the arbitration control circuit of FIG. 28;

FIG. 43 is the arbitration ROM table;

FIG. 44 is a schematic diagram of the memory ready control circuit of FIG. 28;

FIG. 45 is the memory ready ROM table;

FIG. 46 is a schematic diagram of the timing control circuit of FIG. 28;

FIGS. 47 and 48 are graphs of the memory timing for a host access and a refresh access respectively;

FIG. 49 is a schematic diagram of the open collector interface bus lines;

FIG. 50 is a schematic diagram of the transfer acknowledge logics;

FIG. 51 is a transfer acknowledge ROM table;

FIG. 52 is a block representation of a message format for a make command;

FIG. 53 is a block representation of a message format for a REMOVE command;

FIGS. 54A and 54B illustrate the memory organization for the host and rule processors respectively;

FIG. 55 illustrates the handle organization for the memory management;

FIGS. 56 and 57 set forth vector tables for the rule processor reset and interrupt respectively;

FIG. 58 sets forth a table for the rule processor server command;

FIGS. 59 and 60 are tables for the rule processor stream code;

FIGS. 61-64 are flow charts for the interrupt-stream codes;

FIG. 65 illustrates the filter code organization for an illustrative example;

FIG. 66 sets forth the working memory organization of the illustrative example;

FIG. 67 gives the left hand side (LHS) list for the illustrative examples;

FIG. 68 sets forth the counter operation for the illustrative examples;

FIG. 69 illustrates the fireable and nonfireable list for the illustrative example.

DETAILED DESCRIPTION OF THE PREFERRED EMBODIMENTS

A general discussion of production rule system with particular emphasis on the OPS5 programming language may be found in L. Brownston et al., *Programming Expert Systems in OPS5—An Introduction to Rule-Based Programing,* Addison-Wesley, 1986. Reference may also be made to the OPS5e User's Manual, Veraz Incorporated, San Diego, 1983, both of which references are incorporated herein by reference.

The OPS language is defined in terms of the following elements and certain relations among and operations on them:

1. The left and right parentheses; ( )
2. The up arrow;
3. The right arrow; →
4. The left and right curly brackets; { }
5. The left and right angle brackets; < >
6. The left and right double angle brackets; << >>
7. The reserved words; "literalize", "make", "p", "write", "cbind", "modify", "remove", "bind",
8. Any character string or numeric representation One can construct Expert System programs from these elements which embody to a surprising degree the human expertise of practically any domain and which exhibit behavior often transcending in competence that of the human.

Central to an appreciation of the OPS language is an understanding of the OPS Recognize-Act Cycle (RAC). OPS is fundamentally a pattern processing scheme. The elements of the patterns with which OPS deals are the attribute-value pairs. These are entities formally associated with some concept or idea. The first member of the pair, the attribute label, defines the meaning of the value entry which immediately follows. In general, the meanings of the attribute-value pairs are specific to the domain of the production rule system in which they occur. Example (I), taken from a system designed to perform organic chemical synthesis, illustrates the formal procedure by which association of attributes with a "concept" (here "compound-structure") is made.

EXAMPLE (I)

```
(literalize C-S; compound-structure
FID; fragment-id
A-N; atom-number
A-T; atom-type
B-A-N; bonded-atom-number
B-A-T; bonded-atom-type
B-T); bond-type
```

From the attribute-value pairs are constructed the simplest pattern representations, the so-called working memory elements. These form the data structures of the production rule system (or, the system's representation of the "world"), and are stored in working memory. An example of such a pattern is the following, again from the organic chemical synthesis system. For the indicated working memory element, the concept with which the attribute-value pairs are associated is denoted by the symbol, "C-S". This working memory element represents, for a fragment numbered 13, the connection between one atom (carbon atom number 7) and another (oxygen atom number 3) by a double bond (d):

EXAMPLĖ (II)

```
(C-S ^FID—^A-N 7 ^A-T C ^B-A-N 3^B-A-T O^B-T
  d).
```

Any organic molecule, or portion thereof, (neglecting, for the purposes of illustration, such details as stereo-chemistry, hydrogen bonding, and the like) can be represented by collections of working memory elements (i.e., by patterns of patterns) of this type which in effect define the molecule's inter-atomic connectivity.

It is the function of the Recognize part of the Recognize-Act Cycle (hereinafter RAC) to "recognize" those patterns (those combinations of working memory elements) which have specified meanings or relevance in the domain of the production rule system in which they occur. The Production Rule is the mechanism through which this meaning or relevance is defined. In its fundamental form, a Production Rule (hereinafter PR) is an IF→THEN statement. The IF part represents some set of conditions which must obtain (i.e., which must be recognized) among a subset of working memory elements (hereinafter WMEs) if the PR is to be found applicable. The THEN part comprises a set of actions which will be executed if the PR is in fact applied and constitutes the ACT part of the RAC. In general, these actions fall into two broad classes, those which affect in some way some or all of the WMEs to which the PR has responded, and those which add new WMEs to the working memory. In OPS nomenclature, a PR is represented as follows:

EXAMPLE (III)

```
(p rule-name
(left-hand-side condition specification number 1)
(left-hand-side condition specification number 2)
.
.
.
(left-hand-side condition specification number m-1)
(left-hand-side condition specification number m)
→
(right-hand-side action specification number 1)
(right-hand-side action specification number 2)
(right-hand-side action specification number n-1)
(right-hand-side action specification number n)
```

The following PR (again, from the organic chemical synthesis program) illustrates the recognition o a combination of WMEs representing a specific molecular configuration (methoxy) and the actions which are to be taken upon that recognition.

EXAMPLE (IV)

```
(p find-target-site*methoxy
(goal ^status active ^want find ^obj target-site
 ^fid <fid>)
(c-s ^fid <fid> ^a-t C ^a-n <an1> ^b-a-t O ^b-a-n
<an2> ^b-t s)
(c-s ^fid <fid> ^a-t C ^a-n <an1> ^b-a-t H ^b-a-n
<an3> ^b-t s)
(c-s ^fid <fid> ^a-t C ^a-n <an1> ^b-a-t H ^b-a-n
{<an4>><an3>} ^b-t s)
(c-s ^fid <fid> ^a-t C a-n <an1> ^b-a-t H ^b-a-n
{<an5>} ^b-t s)
(bind <type>methoxy)
(bind <tid>(tgint))
(write (crlf) found target site <type>)
(make target-site ^fid <fid> ^tid <tid> ^type <type>
 ^complexity 5 ^augmentation 2 ^status pending)
(make alter-bond ^fid <fid> ^tid <tid> ^a-n1 <an1>
```

-continued

```
 ^a-n2 <an2> ^old s ^new nil)
(bind <aa1>(agint))
(bind <aa2>(agint))
(make add-atom ^fid <fid> ^tid <tid> ^a-t I ^a-n
<aa1> ^b-a-t c ^b-a-n <an1> ^b-t s)
(make add-atom ^fid <fid> ^tid <tid> ^a-t H ^a-n
<aa2> ^b-a-t o ^b-a-n <an2> ^b-t s))
```

Translated literally into English, the IF part of the rule becomes: IF in working memory there can be found WMEs as follows:

(1) One representing an active goal to find a target-site in some fragment (denoted by the variable, <fid>)

(2) One representing a portion of a compound-structure (c-s) of the same fragment <fid> whose atom type (a-t) is carbon (c), whose atom number (a-n) has some value (denoted by the variable <an1>), bonded to the bonded atom type (b-a-t) oxygen (o) whose atom number (b-a-n) has a value denoted by the variable <an2>) by a bond which is of bond type (b-t) single (s)

(3) One representing a portion of a compound-structure (c-s) of the same fragment <fid> whose atom type is carbon (c), whose atom number (<an1>) is the same as that defined by (2), bonded to a hydrogen (h) atom whose number is <an3> by a single (s) bond (4) One representing a portion of a compound-structure (c-s) of the same fragment <fid> whose atom type is carbon (c), whose atom number (<an1>) is the same as that defined by (2), bonded to a hydrogen (h) atom whose number is <an4> and greater (>) than <an3>, by a single (s) bond (5) One representing a portion of a compound-structure (c-s) of the same fragment <fid> whose atom type is carbon (c), whose atom number (<an1>) is the same as that defined by (2), bonded to a hydrogen (h) atom whose number is <an5> and greater (>) than <an4>, by a single (s) bond.

Or, more simply, can there be found a carbon atom bonded to an oxygen atom by a single bond and by single bonds to three distinct hydrogen atoms. IF these conditions are met, THEN, perform the following actions:

(1) For the remainder of the rule, associate with the variable <type> the word methoxy (2) For the remainder of the rule, associate with the variable <tid> a unique number generated by the LISP function "tgint"

(3) Write the message on the user's terminal: "found target site methoxy"

(4) Make a new target-site WME of the indicated form in which the current values for the variables, <fid>, <tid>, and <type> are inserted (5) Make a new alter-bond WME of the indicated form in which the current values for the variables, <fid>, <tid>, <an1>, and <an2> are inserted (6) For the remainder of the rule, associate with the variable <aa1> a unique number generated by the LISP function "agint"

(7) For the remainder of the rule, associate with the variable <aa2> a unique number generated by the LISP function "agint"

(8) Make a new add-atom WME of the indicated form in which the current values for the variables, <fid>, <tid>, <aa1>, and <an1> are inserted (9) Make a new add-atom WME of the indicated form in which the current values for the variables, <fid>, <tid>, <aa2>, and <an2> are inserted.

More simply, notify the user that the methoxy target site has been found and make working memory elements, to which other rules will subsequently respond, indicating the nature of those chemical modifications dictated by the finding of the methoxy target site.

A production rule program of any substance comprises a collection of a large number (frequently thousands) of (often very complex) PRs of the general form illustrated in Example (III) above and a (generally much) larger number of WMEs. The WMEs may be regarded as constituting a dynamic pool of relational and factual information above which, and always scrutinizing it for matched patterns, reside the PRs. It is in the mechanisms underlying the processes of searching for matched patterns and performing the resulting operations on the contents of working memory (i.e., in the execution of the RAC) that inherent, but untapped, parallelism is found. These mechanisms are described in the following paragraphs.

As might be imagined, the mechanisms associated with the RAC fall into two broad categories, those which support the Recognize part and those which support the Act part. The Act part is conceptually simple and computationally economical and involves the execution of the operations defined by the right-hand-side action specifications of whatever rule the system selects for application (or, as it is generally referred to, for "firing"). The most important of these operations are those which make new WMEs, and those which modify or remove WMEs referenced in the left-hand-side of the selected rule.

It is the recognize part of the RAC which is by far the more conceptually and computationally difficult. In a naive view, it can be represented as a search over the entire contents of working memory for those sets of WMEs which self consistently satisfy the left-hand-side condition specifications of one or more of the system rules. If no such set can be found, the system halts. If only one set for only one rule is found, that one rule is applied and its right-hand-side actions executed. If two or more sets are found for one rule, or if sets can be found for more than one rule, a conflict-resolution operation is performed and the most "appropriate" set, or rule and set, selected for application. It is necessary merely to recall that a contemporary production rule system may consist of a thousand or more rules, each of several tens of left-hand-side condition specifications, each of these comprising several tens of attribute-value pairs, to appreciate the complexity of a search which must in effect compare all rules with the contents of a working memory which may contain several thousand WMEs!

OPS avoids the necessity of performing a complete search over working memory, a search which otherwise would have to be performed once per Recognize-Act Cycle, by constructing a network representation of the relations among the PRs. This network, in effect, links each left-hand side condition specification of each rule in the system with the right-hand sides of all rules whose actions could (as a result of their operations on the contents of working memory) in any way affect the potential response of the linked rule. Note that, since the information required for the construction of this network is inherent in the forms of the rules themselves, the network can be constructed once and need be altered only if new rules are added to the system, either by the user or by the executing PR system.

The two steps of (V) below define the formal construction of the network described above. The nine steps of (VI) provide a formal definition of the operation of the RAC in terms of the network.

(V) Network Construction (1) Associate with every left-hand-side condition specification of every rule an empty list.
(2) Create a network link between each of these lists and every right-hand-side whose literal form is congruent with the literal form of the associated left-hand-side condition specification over the full specification of that left-hand-side.

N.B. By literal form is meant the non-variable part of a left- or right-hand-side.

(VI) RAC Operation (1) If a rule can fire, evaluate in turn its right-hand-sides.
(2) For each right-hand-side which involves making a new WME, generate a unique number, assign it to the newly constructed WME, and send that number, suitably tagged with a reference indicating "make", over the network branches emanating from the right-hand-side to the lists of (V-1) above. Store the new WME itself in working-memory together with its unique numerical reference.
(3) For each right-hand-side which involves removing a WME, retrieve the unique numerical reference to the WME, send that number, suitably tagged with a reference indicating "remove", over the network branches emanating from the right-hand-side to the lists of (V-1) above. Remove the reference WME from working-memory and the references to it from those lists on which it appears.
(4) For each right-hand-side which involves modifying a WME, note that "modify" is a combination of the operations "remove" and "make" and perform the operations of (3) and (2) above.
(5) When all right-hand-sides have been executed and all network transmission completed, examine in turn (by rule) the lists of (V1) above to determine if, for one or more rules, there is at least one entry for the list associated with each non-negated left-hand-side of the rule under examination. Ignore as inapplicable those rules for which this condition is not met.
(6) For each rule for which the above stated condition is satisfied, retrieve from working memory those WMEs whose unique numerical references appear on the lists and examine these in turn (by rule) to determine if a set or sets can be found which self consistently satisfy the rule.
(7) If no such subset can be found, no rule can fire and the system halts.
(8) If one such subset can be found for one, and only one, rule, select that rule for application and return to (VI-1).
(9) If two or more subsets can be found for one rule, or if subsets can be found for two or more rules, perform the conflict resolution operation to select the most "appropriate" set under the current conflict resolution strategy, or rule and set, for application then return to (VI-1).

SYSTEM ARCHITECTURE

The discussion above has been a general one directed toward those aspects of pattern processing (network construction, the recognize-act-cycle) which would by definition underlie any OPS-like production rule system. It is important to remember in all that follows that no use whatsoever is made of the RETE pattern matcher which is central to other implementations of OPS. Although not well known within the broad area of computer science, these features are common currency in the AI community. In accordance with the teachings of the invention, hardware methods and apparatus are disclosed for exploiting to considerable advantage the parallelism which is inherent in several components of OPS-like production rule languages.

Parallelism is inherent in several aspects of the RAC above described. Of principal importance are those associated with the network transmission aspects of Example VI, (2), (3), and (4), and the left-hand-side operations of (5) and (6). The network aspects are discussed in the following three paragraphs.

It is important to recall that in a computer characterized by a conventional architecture (i.e., one capable only of serial execution of its instruction set), the operations required to notify all rules affected by the evaluation of a single right-hand-side action can be performed only on a one at a time basis. Although, in effect, the right-hand-side sends a signal over the network to each affected left-hand-side, in reality, a set of instructions is executed. The instructions comprising this set are executed as many times as there are network branches leading from the given right-hand-side. The number of sendings (or transmissions) may in principle equal the sum of all the left-hand-side condition specifications in the rule set, although it will generally be smaller than this.

In the new architecture, the network, which in a conventional computer can be represented only as a set of program instructions, is physically implemented as a collection of wires constituting a bus (hereinafter, the network bus) and a series of independently functioning network decoders which reside in parallel on the network bus. In practice, the network decoders are integral parts of the rule processors (RPs) which perform the operations associated with (5) and (6) above and are implemented, for example, by a microprocessor associated with one or more rules. For the moment, however, it is useful to consider the decoders as separate entities. At the "transmitting" end of the network bus is a single host processor whose function is to place on the network bus the information which results from the evaluation (in turn) of the right-hand-side actions of a rule which has been selected for firing. It is the function of each network decoder to identify and copy signals appearing on the network bus which are relevant to one or more of the left-hand-side condition specifications of the rule (or rules) with which the decoder is associated. Since the network decoders function independently and simultaneously, a given network transmission need be made only once; it is received in parallel by all network-linked left-hand-side condition specifications.

Example (VII) below illustrates the general format of the "messages" which the host transmits over the network bus.

EXAMPLE (VII)

(rule-number, right-hand-side-action-number, action-type, WME-reference-number, body-of-WME)

Rule-number refers to the system assigned number of the rule which has been selected for firing and whose resultant the network message represents. Right-hand-side-action-number refers to the specific right-hand-side action whose evaluation has resulted in the sending of the message. (In practice, it is possible to utilize a single identifier combining the rule number and right-hand-side-action-number.

Action-type refers to make, modify, or remove. The WME-reference-number is the unique number previously assigned by the system to an extant WME if the R-H-S action is "remove", or newly assigned to one which is the result of the specific right-hand-side actions "make" or "modify". Body-of-WME is the WME itself if action-type is "make" or "modify". This message slot is blank if action-type is remove.

The parallelism inherent in the left-hand-side operations VI,5 and VI,6 arises from the fact that each PR is a local entity. That is, each PR embodies a complete definition of the state of the world (i.e., the set of left-hand-side condition specifications) which must obtain if it is to be applicable, together with a complete specification of the operations (i.e., the right-hand-side action specifications) which are to be performed on the world (i.e., on the contents of working memory) if the rule is in fact applied. The network operations described in the preceding three paragraphs provide for the kind of bookkeeping (via the lists of V-1 above) which supports the inherent locality by permitting each PR to refer precisely to that portion, and only that portion, of the world to which it might be applied.

In order to take full advantage of the inherent parallelism described above, a rule processor, RP, is associated with each rule. (In practice, it is possible to associate one rule processor with several rules without severely limiting the performance of the overall system. In the implementation described herein by way of example, the rule processors are single chip microcomputers. Associated with each rule processor is a small amount of local memory (approximately 0.5 megabyte) in which are stored those WMEs (or the relevant parts thereof) which the associated rule decoder has, to the moment, recognized as being pertinent to the associated rule (or rules). It is this association of local memory with rule processor which makes it possible for all rule processors to execute the processes of (VI-5) and (VI-6) simultaneously on the contents of the local working memories.

Together with the rule processors and the network bus, four more components complete the system. The first of these is a small, conventional (i.e., serial processing) host processor with its associated global memory. It is in this global memory that the complete set of WMEs is stored, as well as the set of right-hand-side definitions for all the system PRs. Note that no rule processor need ever have access to the host's global memory.

The second of the four components is a single-wire ("open collector"), "processing complete" bus which serves to notify the host when all left-hand-side processing is complete. The third is a "potentially fireable" flag bus via which the host can ascertain which, if any, of the system rules is (are) satisfied (and thereby, fireable). The potentially fireable bus is a conceptual construct and need not be a distinct physical device. Its functions can be supported without temporal conflict by the network bus over which the host processor polls the individual rule processors when all left-hand-side processing is complete. The last component is an I/O device via which the user interacts with the system. The I/O device may, for example, be a CRT with graphics capability.

The remainder of this section is devoted to a description of the operation of a generalized hardware realization of the ideas presented thus far. Reference is made to the simple Conceptual Schematic of FIG. 1.

One of the difficulties in describing the behavior of any cyclical function is the choosing of a point within the cycle at which to begin the description. For the present purpose, it is convenient to enter the cycle just after the operations associated with the recognize part of the RAC have been completed and to close the descriptive circle with a discussion of how the next recognize operation is performed. Thus, we being with the firing of a selected rule and the execution by the host processor of the right-hand-side actions associated with it.

(Host Operations)

(A) Fire Selected Rule

Send a token over the network indicating that a rule firing is to commence.

The leading left parenthesis may be used as a token indicating the beginning of a specific network message. Other indications of the system state may, of course, also be used.

1. Evaluate each right-hand-side action specification;

If the action is make, generate a WME of the specific form, transmit it, per the syntax of Example (VII), over the network bus, and write a copy of it in the host's global memory.

If the action is remove, transmit a message, per the syntax of Example (VII), so indicating and delete the referenced WME from the global memory of the host's global memory.

If the action is modify, perform the above two operations, the make first, followed by the remove.

The trailing right parenthesis will be used as a token indicating the end of a specific network message.

(Rule Processor Operations)

2. Each of the network decoders makes a temporary copy of the message. Alternatively, as in the specific embodiment described later, the message is directly written into each rule processor memory. Upon detection of an "end of message" token, each network decoder (which, it should be recalled, is only in a formal sense distinct from its associated rule processor) compares the leading two entries in the message (i.e., the fired rule number, and the right-hand-side action number) with the contents of a pointer-directed look-up table in which are stored references to those rule/right-hand-side pairs of potential utility to the associated rule. If the decoder determines that the message is relevant, the copy is retained for further processing. If not, the copy is deleted.

It is in terms of the aforementioned pointer-directed look-up tables that the network representation is encoded in the new architecture. It is important to note that this approach is, in principle, distinct from that used in conventional software implementations of OPS-like languages which utilize the RETE pattern matcher.

If more right-hand-side actions remain to be executed for the selected rule, return to (1). Otherwise, send a token over the network indicating that the actions associated with the firing of the selected rule are complete.

(B) Process Left-Hand-Sides in Parallel

As each rule processor completes the tasks associated with the evaluation of the left-hand-side condition specifications for the rule (or rules) which it encodes, it releases its connection to the single wire (open-collector) completion bus. When all rule processors have released their connections to this bus, the host processor detects the resulting change of bus state and initiates the process polling the potentially fireable flags in order to determine which, if any, of the newly processed rules may now be fireable. The following conditions may obtain following rule processing:

(a) No rule is found to be satisfied.

(b) One, and only one, rule is satisfied by one, and only one, subset of WMEs.

(c) One and only one, rule is satisfied. Two or more subsets of WMEs are found which satisfy the rule.

(d) Two or more rules are satisfied, each for one or more subsets of WMEs.

The hose processor responds to these conditions as follows:

If condition (a) obtains, HALT the system.

If condition (b) obtains, return to (A) with the single rule as the selected rule.

If conditions (c) or (d) obtain, perform a conflict resolution operation to determine the "most appropriate" of the applicable rule-WME set combinations. Return to (A).

Note that the responses to conditions (b) through (d) bring the system to the point in the RAC at which the descriptive cycle began.

KEY HARDWARE FEATURES

Discussed herein are some of the important hardware aspects of the invention which pertain specifically to the exemplary embodiment, in which the individual rule processors are Motorola 68000 single chip computers.

(A) Parallel Network mapped into the Host address space: By decoding the host address space properly, the network transmissions by the host to the rule processors become write operations to specific portions of the host's own (apparent) memory ("apparent" because the memory does not actually reside in the host but is distributed among the rule processors). The principal advantages of this approach include an increase in network transmission speed and a reduction in the complexity of the hardware on both the host and rule processor ends of the network. Once the RPs are started, they process asynchronously and halt independently of one another.

(B) Individual access to the Rule Processors by the Host: As suggested in (A) above, the host memory can be represented as a write-only "network" section of the (apparent) host memory, a section all processors share in common. A second section is set aside for those host-processor communications which are not shared. This section is to be subdivided into a number of portions equal to the number of rule processors. Through each of these, the associated rule processor can be treated as an extension of a specific portion of the host's memory address space, a portion we refer to as the "processor window address space", or, more simply, as the "window." It is through this window that the host loads individual rule processors with the rules which have been assigned to them. The host utilizes the window for other functions as well, principal among these being the scanning for set, or raised, potentially ready to fire flags. It is worth noting that, since the host can have access to all of a processor's memory in this way, any number of new flags which may prove useful in future versions of the architecture can be simply implemented in software.

(C) RP CPU's HALT line as the Completion Flag: In the described implementation, the local 68000 HALT line, suitably buffered, becomes the "wired-or'ed" completion flag. This approach yields a simple mechanism for producing a single bit output for the completion flag. It supports as well the current network transmission scheme, under which all processors are halted during a network transmission and remain so until the transmission is complete (see A, above).

(D) Simple Host to RP CPU Arbitration Circuit: Although there are many rule processors, the arbitration circuitry associated with a given one of these is concerned only with arbitration involving the host and that processor. Thus, arbitration takes place in parallel both for network transfers and for the operations associated with global memory refresh.

(E) No ROM within the Rule Processor Cells: Because the Host can access and reset the rule processors individually, there need be no "boot ROM", address decoding, or ROM wait state generation circuitry within the Rule Processor cells.

(F) Rule Processor Request Line: A single, open-collector, request line is provided via which an individual rule processor can initiate a request for an action by the host. Perhaps the most important of these actions would be the reallocation of a rule for which a processor no longer had sufficient free memory. The host responds to a request to move the rule and working memory elements associated with it by copying rule and memory from the overloaded processor memory into the memory space of a less occupied processor. Because the copying can be effected at great speed, overall processing speed scarcely suffers. Another important application for the request line arise in connection with diagnostic support and error detection.

(G) Minimization of Rule Processor Circuitry: In any large system constructed by replication of a fundamental cell, it is vital to reduce to an absolute minimum the complexity and part count of the cell. Not only does the reduction result in lower costs, it generally leads to lower heat dissipation and greater reliability. It has proved possible to effect a considerable simplification in the fundamental cell (the RP) circuitry of the new architecture by moving many common circuit elements out of the cells and onto the only singular circuit board in the system. This board, the interface board, includes circuitry for memory refresh, address decoding, and host memory control.

HARDWARE OVERVIEW

References

Although the invention may be implemented with any appropriate hardware now known or later developed, the preferred embodiments described herein make use of currently available technology, in particular the Motorola 68000 microprocessor technology, and familiarity with same is assumed by those skilled in the art. Reference may thus be made to the following publications incorporated herein by reference.

68000 References

Figure 1:
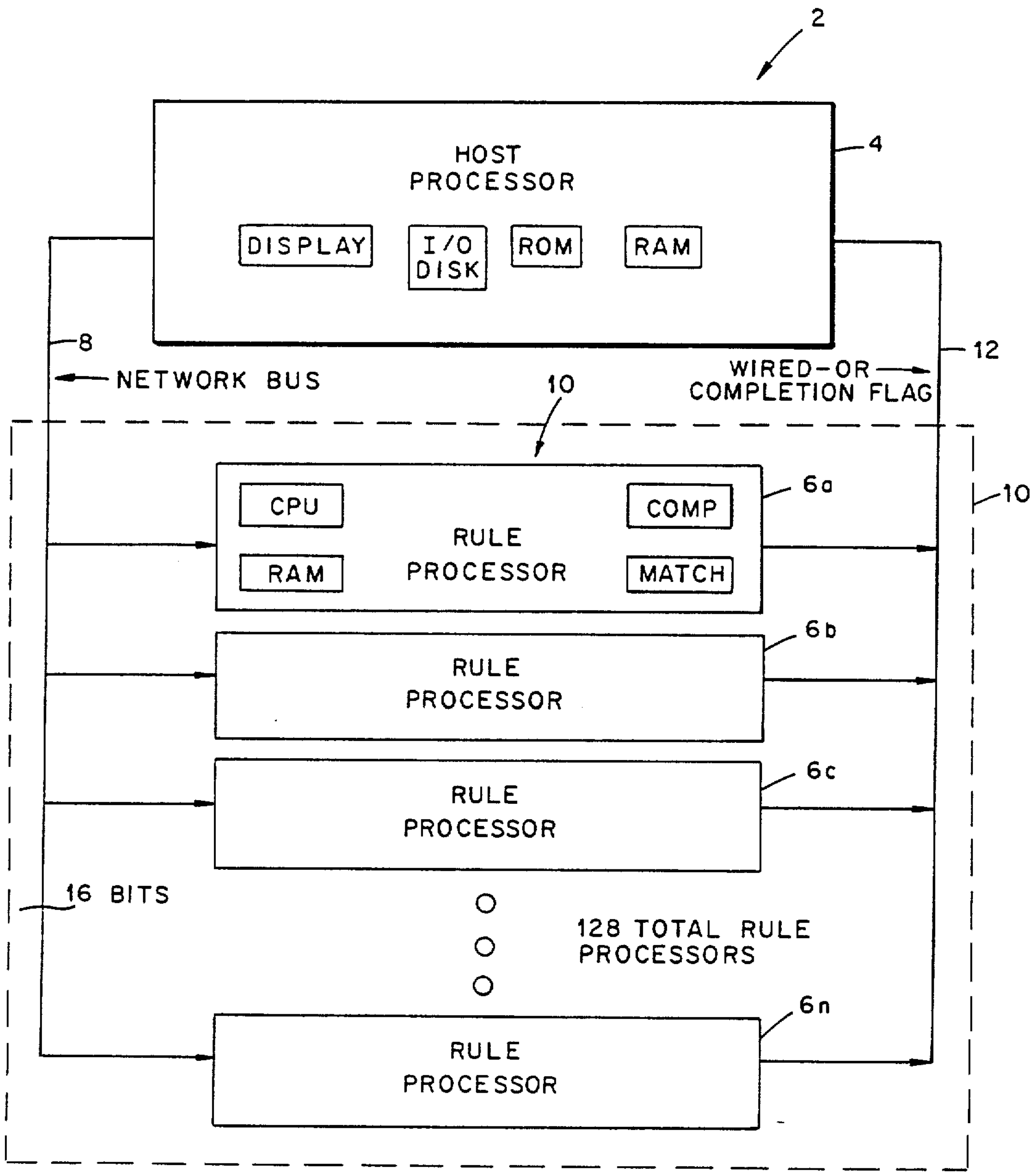
FIG. 1 is a block diagram of a first embodiment of the invention.

Motorola MC68000 User's Manual, Second Edition
Motorola MC68000 Advance Information, April 1983
Motorola MC68010 Advance Information, August 1983
Motorola MC68000 Family Speaker's Guide
Motorola Ap-Note AN-867
A High Performance MC68000L 12 System With No Wait States
Motorola AP-Note AN-881
Dual-Ported RAM for the MC68000 Microprocessor
Motorola Ap-Note AN-897
MC68008 Minimum Configuration System Memory Motorola Ap-Note AN-887
Dynamic Memory Refresh Considerations
Texas Instruments 1982 MOS Memory Data Book
TMS 4164 Dynamic RAM data sheet
Fujitsu 1984 Memory Data Book
MB8264A-15W 64K×1 memory data sheet
MB81256-15 246K×1 memory data sheet
Motorola MCM6257 256K×1 memory product preview Logic Reference Texas Instruments TTL Data Book, Second Edition Introduction In a first embodiment of the invention as illustrated in FIG. 1, the network concept for the OPS language involves the use of a single host processor 4 and a plurality of rule processors (RPs) 6*a*, 6*b* . . . 6*n*. The host processor is understood to include a CPU, ROM, RAM and either to include or be connected to a display, keyboard, disk controller and other peripherals as will be evident to one of skill in the art. The host sends information over a network bus 8 for reception by all rule processors. The plurality of rule processors may be referred to as a network 10. (More generally, the term network is used to indicate the RHS to LHS mapping which is made possible by the host/RP configuration of the system.) Each rule processor contains a CPU and RAM but need not contain ROM memory as the host 4 effects the loading of all necessary boot and operating system software. Each rule processor is responsible for a different rule or set of rules. During execution, after the rule processors receive information, they independently process the information (in parallel) until all are finished. Thus, the system is much faster than a single processor system. Each rule processor halts itself when its processing is completed. A complete ("comp") status signal is provided by each rule processor when its processing of rules is completed. Further, if a set of WMEs is found to self-consistently satisfy the LHS of a rule, the rule processor associated with that rule raises a "match" flag at a predetermined memory location. The halt pins on the 68000 processors are buffered and wired-OR'ed together to provide a composite completion signal on line 12. The host processor 4 waits until all rule processors 6 have finished before taking the next action.

From the system shown in FIG. 1, come two important points for the hardware implementation. First, the rule processors only listen to the network bus 8 and need not transmit data over the network bus 8. Thus, the host processor 4 is the only master W/R to the network bus. Further, the rule processors 6 are not required to be able to communicate with each other. These two points make the host-to-rule processor communication much less complicated than a general purpose multiprocessor system in which every processor must be able to communicate with every other processor or with at least some subset of "nearest neighbors". Also, since the rule processors are not connected with each other, there is no communication penalty as the number of rule processors is increased.

In the embodiment described herein, the system is configured for 128 rule processors and the system is described in detail assuming that 16 rule processors are utilized. For small OPS production systems, each rule processor would process one rule. However, the system is not limited to a production system of 128 rules or fewer. Several rules can be placed in each rule processor for large production systems. This may result in some speed reduction depending on which rules are placed together, but the system will still have 128 processors working in parallel. Further, the invention is applicable to systems with fewer or more processors as may be optimum for the production system of concern.

All rule processors should ideally be identical for both hardware and software considerations. Also it is desirable to have the rule processors 6 be of the same type as the host processor 4. Although this identity is not necessary, it is an important consideration in the coding and debugging of software in the rule processors. In the embodiment described herein the Motorola MC68000 16/32 bit microprocessor is utilized for the host and rule processors. Other types of microprocessors of greater or lesser processing speed could obviously alternatively be employed.

Utilizing the 68000 microprocessor, the network bus 8 is selected to be a 16 bit data bus with data words transmitted in parallel to optimize speed. Each rule processor 6 is provided with a memory means for storing one or more production rules. In the embodiment described herein, the memory means is fabricated with sixteen 256K×1 bit dynamic memory chips. The memory size selection thus produces 512 Kbytes of R/W memory for each rule processor Thus the total memory that is required for 128 rule processors is 64 Mbytes.

Network Implementation

One method in which to implement the network would be to have a dedicated 16 bit parallel bus. All rule processors would then look at the network through their own 16 bit parallel input port. A handshake exchange would be required to acknowledge the transfer before the next word could be sent. Each rule processor would be required to have a CPU, local memory, a boot ROM, and a 16 bit input port.

The disadvantage of the above implementation is that each rule processor would be required to have a boot ROM and an input port. The simpler embodiment described herein allows the rule processor memories to be mapped into the host processor address space at the same address. In other words, the network transmission from the host simply becomes a host memory write to a certain area of its memory. This area of memory is decoded and forces a write to all 128 rule processors in parallel. One advantage of this method is speed. Network transmission can go as fast as possible since a memory write becomes the method of transmission Also, the host processor can fill the buffers of each rule processor without having to handshake at every word transfer Further, the 16 bit input port on each rule processor can be eliminated. The host fills the rule processor's memory directly. By having as well a read/write window into each individual rule processor, the host can load the program code for each rule processor on power-up. This totally eliminates the need for a boot ROM and associated decode and control circuitry. The rule processor "window" has several other uses as well. For software debugging, the host can "peek" into individual rule processor memories to check for proper operation. Also, completion flags and ready-to-fire flags can be checked without having to include additional hardware to bring these flags out on a host input port separately.

Network Memory Map

Figure 2:
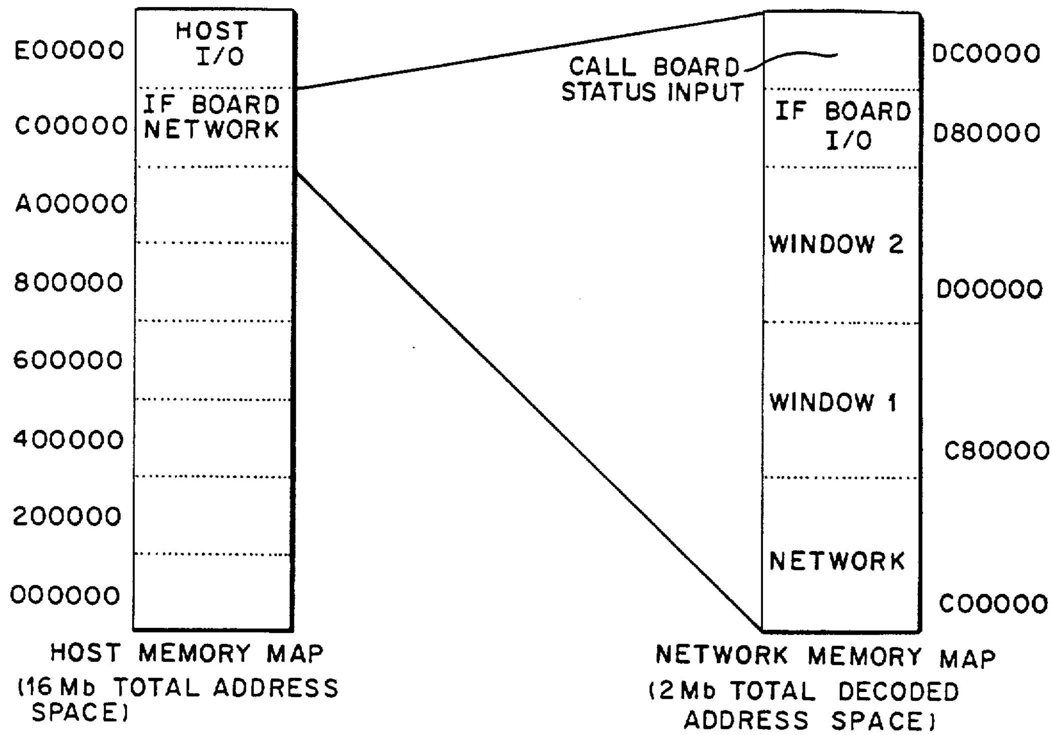
FIG. 2 is a representation of a network memory map.

Within the host processor address space, the network, two processor windows, and associated control features are allocated 2 Mbytes of address space. FIG. 2 shows the network memory map. The location within the host address space can be selected from any of 8 areas since the 68000 microprocessor can address 16 Mbytes of memory and I/O.

Note that since the address of the network is selectable, multiple networks can be supported on a single network bus. This network bus may either have a single host processor controlling multiple networks or can have multiple processors controlling multiple independent networks. In the interest of clarity, a single host-single network is described herein.

Within the 2 Mbytes of address space allocated to the network, there are three distinct regions The first region is the actual network space itself When the host writes to this region, all rule processors are enabled to accept data from the network bus. In this manner, all processors receive the information from the network at the same time. In this connection, it is important to note that the network bus is not a separate parallel bus, but is rather an extension of the host address and data bus. Also note that the network area is a write-only region as there is no need to read from all rule processors' memories at the same time.

The second region within the network address space is a two-processor window. Each window allows a read or write into a single, selectable, rule processor. The particular rule processor that is enabled for this window read/write is selected by a parallel output port. By scanning through all rule processors in the output port, all rule processors can be selected for rule loading, flag checking, or debugging. The rule processor windows comprise an important concept in this implementation since they provide the only way for loading each rule processor with its individual rule(s). Further, the output port allows any number of RPs to be added. The output port can also be thought of as a bank-switch scheme to allow 64 mbytes (on a 128 processor system) to be mapped into a smaller space.

The third region within the network address space is allocated for the interface board I/O and cell board status input. Two of the ports in this section control window number registers which select the rule processors that will respond to a read or write to the processor window regions Another port controls the power-up reset of all rule processors This is important since the rule processors have no ROM of their own. The hardware reset latch allows the host to keep all rule processors in the reset state until the host has loaded the boot code for all of the rule processors. Another output port controls the interrupt lines to all rule processors This can be used as a wake-up signal to the rule processors to start them processing after a network transmission. An input port must be used to check a completion flag that signals all rule processors have completed processing the network transmission. This is an open-collector single line input that represents the state of all rule processors combined. This single line status port has several benefits. The host does not have to scan all rule processors waiting for completion, and the rule processors are not delayed by the host processor periodically taking over the local memories. While processing, the rule processors are all allowed to execute at full speed.

Hardware and Software Considerations

Figure 3:
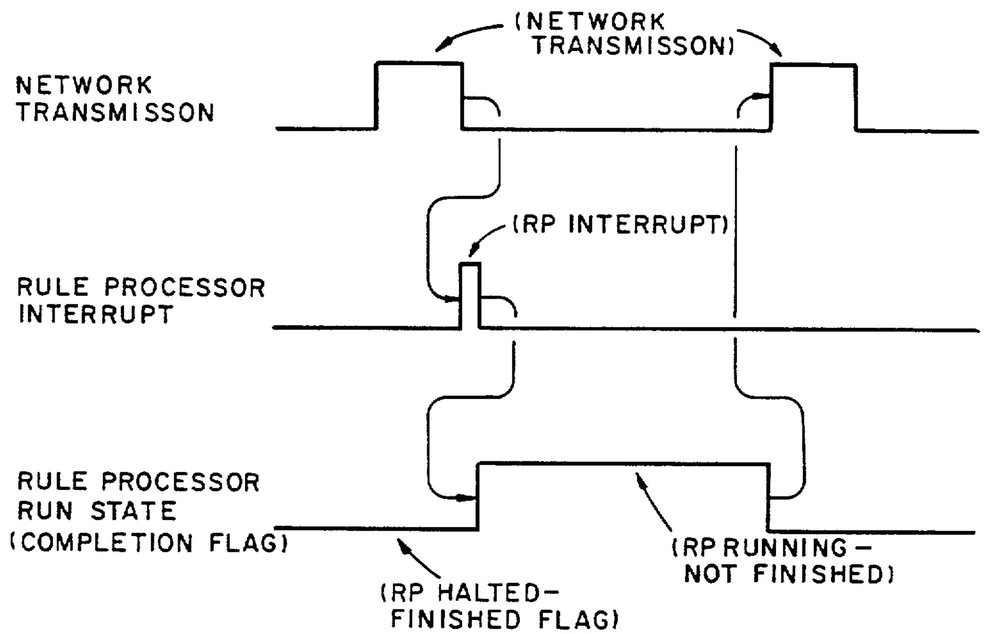
FIG. 3 is a timing chart showing the host/rule processor handshaking protocol.

FIG. 3 shows the relationship between the hardware and software for one cycle of the hardware/software handshaking.

The host processor actually "fires" the rules. As a result of a rule firing, some number of right-hand-side (RHS) actions are sent over the network bus. In one embodiment a single RHS action is sent at a time. This is advantageous since a single RHS action minimizes the memory in each rule processor allocated specifically to the network. Also, the host can send single RHS actions as it computes them. The rule processors can be "crunching" (i.e., adding WMEs to their respective list, generating fireable list, etc.) on their responses to RHS actions while the host is computing more RHS actions. In another embodiment, all RHS actions can be sent at once which would reduce overhead associated with Host-RP cycling Assume that the network transmission starts the cycle as far as the hardware handshake cycle is concerned. During the network transmission, all rule processors are halted. This is a self-imposed halt condition that is not required to exist before transmission. However, if all rule processors are halted, the host memory access to all rule processors' memories will proceed without any interruptions from the rule processors. Thus, the host has no arbitration delays during a network transmission. Due to the nature of the OPS language, there is nothing that the rule processors could be doing at this time in any case, and thus, there is no penalty for having halted rule processors. The host processor fills a predetermined area of each RP memory with data resulting from RHS actions as in Example VII above. Then the host puts a flag in a certain location that indicates to the rule processors whether or not the current RHS action is the last for the rule being fired. If it is, the rule processors will then calculate the fireability of their respectively stored rule or rules for the conditions (WMEs) currently obtaining.

After the network transmission, the host processor will write to one of the network control ports to force an interrupt to all of the rule processors After the rule processors have had sufficient time to respond to the interrupt, which brings them out of the halted condition, the host will clear the interrupt control port.

The rule processors independently process the results of the RHS actions sent by the host in accordance with the specific rules or LHS considerations that each rule processor contains. If the host processor has indicated that the last RHS action was the last for the rule just fired, then the rule processors must also determine whether the rules they contain are ready to fire. If a self-consistent set of WMEs is found to satisfy the LHS of the rule within any rule processor, then that rule processor raises a "match" flag at a predetermined memory location within its network space. After each rule processor has completed, it then halts itself, and raises a completion flag. The completion flags are buffered and wired-OR'ed to make a single completion flag on line 12 to the host as shown in FIG. 1.

After the last rule processor completes, the host can determine from the single completion flag that it is free to select which rule to fire, assuming multiple rules are potentially fireable using a conflict resolution strategy based on considerations of recency and complexity of matching WME sets. The host then fires the selected rule and sends more information in the form of created WMEs or references to deleted WMEs over the network. This hardware/software cycle repeats until no more rules are fireable.

The handshaking technique of FIG. 3 insures that no unnecessary bottlenecks or constraints are placed on the software. As far as the hardware is concerned, there are two distinct advantages. The first arises because the rule processors are halted during network transmission. Thus, no complicated arbitration required nor arbitration delays are presented to the host processor. The second advantage derives from the fact that each individual halt pin becomes a single bit status output for the associated rule processor.

Software Debugging Considerations

With a large system, software debugging becomes a critical factor in the system implementation. With 128 rule processors, it becomes unreasonable to attempt to connect a debug terminal to every rule processor. Since the host processor is the only one connected to any I/O devices, it is desirable to have the host act as an intermediary between a debug terminal and any of the rule processors. Thus, each rule processor may run a debug program within its own local memory and may check memory locations for console input and output status and data. The host sets and clears the appropriate flags within the rule processor's local memory using the rule processor window scheme of Fig. 2. This virtual terminal concept may be extended to allow all rule processors access to a disk drive by requesting a transfer from the host. However, as in the virtual terminals, the host would have to scan all rule processors periodically to see if there is a transfer request.

HARDWARE DETAILS

In what follows, the terms "assertion" and "negation" will be used extensively. This is done to avoid confusion when dealing with a mixture of "active-low" and "active-high" signals. The term "assert" or "assertion" is used to indicate that a signal is active or true, independent of whether that level is represented by a high or low voltage. The term "negate" or "negation? is used to indicate that a signal is inactive or false.

Host Bus Selection

A variety of readily available choices for the host processor bus may be utilized, for example, Multibus, the VME bus, and VERSAbus. The Multibus is utilized in the detailed description which follows with four 68000 microprocessors being placed on a single Multibus board.

The VME bus and VERSAbus may, of course, also be utilized. Both buses are 32 bit buses with the VERSAbus being of relatively large physical size.

Implementation Technology

Due to the large number of rule processors, VLSI would be most desirable for implementing the rule processors. In the detailed description which follows, a multilayer PC board is utilized. For this latter technology, the square JEDEC 68000 packages and 256K×8 single-in-line hybrid memory modules are most space efficient. For control logic, a PLA and latch could form a control state machine for memory timing, memory refresh and other local rule processor cell functions. Also, a custom VLSI chip for the control logic would be desirable to save board space.

In the detailed embodiment described herein, all rule processor components are in bare chip form. Four microprocessors are placed on each of four Multibus boards for a total of 16 rule processors. The system may, of course, be expanded to include 128 rule processors or even a larger number if desired.

Interface

Figure 4:
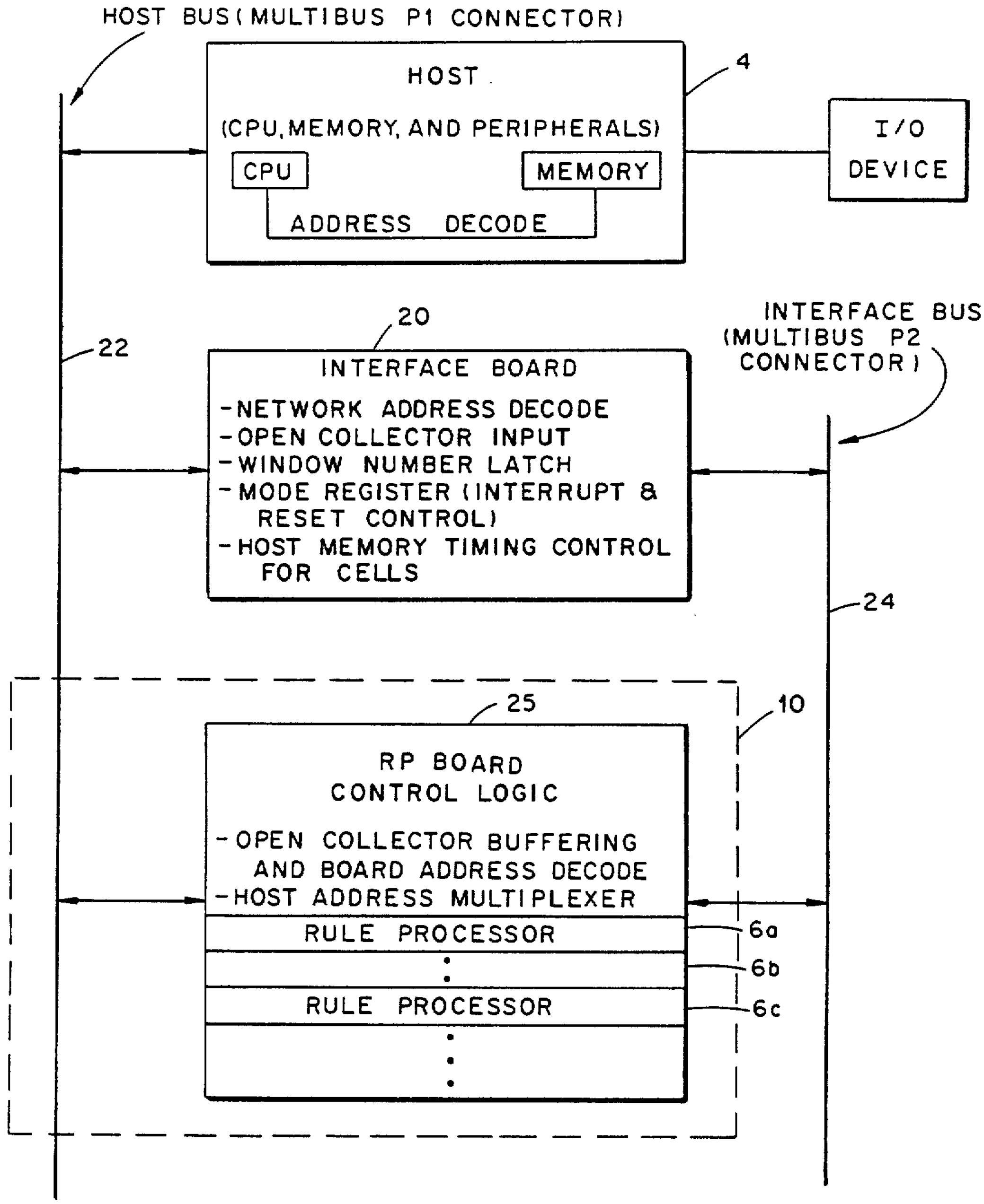
FIG. 4 is a block diagram of another embodiment of the invention.

In accordance with a second embodiment of the invention as shown in FIG. 4, an interface 20 is interconnected between the host processor 4 and the rule processors 6 of the network 10. The interconnection is accomplished via a host bus 22 (sometimes referred to as the Multibus P1 connector) and an interface bus 24 (sometimes referred to the Multibus P2 connector). The interface 20 permits streamlining of the rule processor logic which must be utilized for each of the plurality of rule processors 6. Thus, the interface contains much of the functional logic to interface the 128 rule processors to the host processor bus. The data bus of the host Multibus still goes to the individual rule processor boards. However, all network address decoding and Multibus memory control functions to the rule processors are controlled by the interface board 20.

FIG. 4 also illustrates the RP board control logic 25 which is provided on each circuit board. This control logic 25 is explained more fully below in reference to FIG. 6.

Interface Board Description

FIG. 5 is a block diagram of the interface 20 which is seen to comprise, inter alia, a rule processor (RP) memory control 26 for host memory accesses, and a network address decode 28 for the network space, the rule processor window space, and the local interface board I/O.

The RP memory control 26 on the interface board is intended to reduce the hardware needed on the individual rule processors. Also, since the network will transmit to n rule processors at once (e.g., n=128), this method insures that all rule processors are doing the same thing at the same time. The RP memory control 26 is the only place that the Multibus memory control signals (memory read, memory write and data transfer acknowledge) are used by the system.

This arrangement has the advantage of allowing one to change busses (for example to utilize a VME bus or VERSAbus) with only one change to the interface board logic. Notice the I-MREADY> signal that comes back from the rule processors. This signal will not become true until all addressed rule processors have gone into the bus release state and are ready for a host memory transfer. If only one processor is being addressed through the window, this case is trivial However, if all rule processors are being accessed through the network, this signal only comes true when all of the rule processors are ready for a data transfer. Note that in the normal case of a network transmission, the rule processors would already be halted and this line would stay true. This allows a transfer at the fastest possible rate.

The network address decode 28 simply decodes the multibus address lines on the host bus 22 to give select lines for the network, the single processor window access, and local I/O on the interface board itself. When the network mode is selected, the network select line indicates to the rule processor boards that all rule processor memories are to accept in parallel the data being transferred. Notice that this is a write only transfer as far as the host is concerned. When the window mode is selected, only the rule processor which has been selected by an RP window register accepts the data transfer. Note that in this mode the transfer could either be a read or a write.

The interface board is also seen to contain a global dynamic memory refresh controller which includes a refresh timing circuit 30 and refresh counter 32. Since the 68000 timing does not allow totally transparent memory refresh, there is some overhead regardless of where the refresh control is placed. With the refresh control placed on the interface board, the refresh can take place at precisely timed intervals, reducing the number of unnecessary refresh cycles. Since the network transmission is a write-only process to the rule processor, the refresh may be thought of as a read of the network with data buffers disabled.

The interface board also contains some input and output registers to facilitate control of the rule processors. First, there are two window number latches 34 and 36 that are used to select a rule processor that is addressed in the window mode. These are write-only latches which can be incremented to scan through all rule processors if desired. There is a single bit status (flag completion) input port 38 that is used to determine when all rule processors have completed processing the data that were sent to them over the network. Also, there is an interrupt control register 40 that is used to interrupt all rule processors in parallel. Since the 68000 has three interrupt input lines, this port is a three bit write-only port. An additional single bit RP reset control port 42 is used to reset the rule processors. The reset output to the rule processor also reflects the latched state of the system reset signal. Only by software command by the host can the rule processors come out of the reset state. This is due to the fact that the software is loaded into the local memories of all rule processors before they are allowed to run.

Interface 20 is also seen to comprise an address mux 44 and address swap plug 46. The address mux 44 permits either host or refresh access to the RP memories. The address swap plug 46 preconditions host address lines to be consistent with the cell board wiring used for accessing local memory as explained more fully below. Interface 20 further comprises a transfer acknowledge control circuit 48 for acknowledging to thę host a completion of data transfer to the RPs; a host interrupt circuit 50 and a plurality of buffers 52, 54, 56, 58, 60 and 62.

Due to the central nature of the interface 20 between the host and the rule processors, there are possibilities for additional functions therein. One possibility is to have a status cable coming from the interface board to a panel-mounted display. This display may display such useful information as the selected window number, the completion flag input from the rule processors, the interrupt control output, and the reset state of the rule processors The network and window selects may also be displayed. Any signal that is too quick to see should be buffered by a one-shot so that it becomes a useful visible status symbol.

Rule Processor Board Control Logic Description

Figure 6:
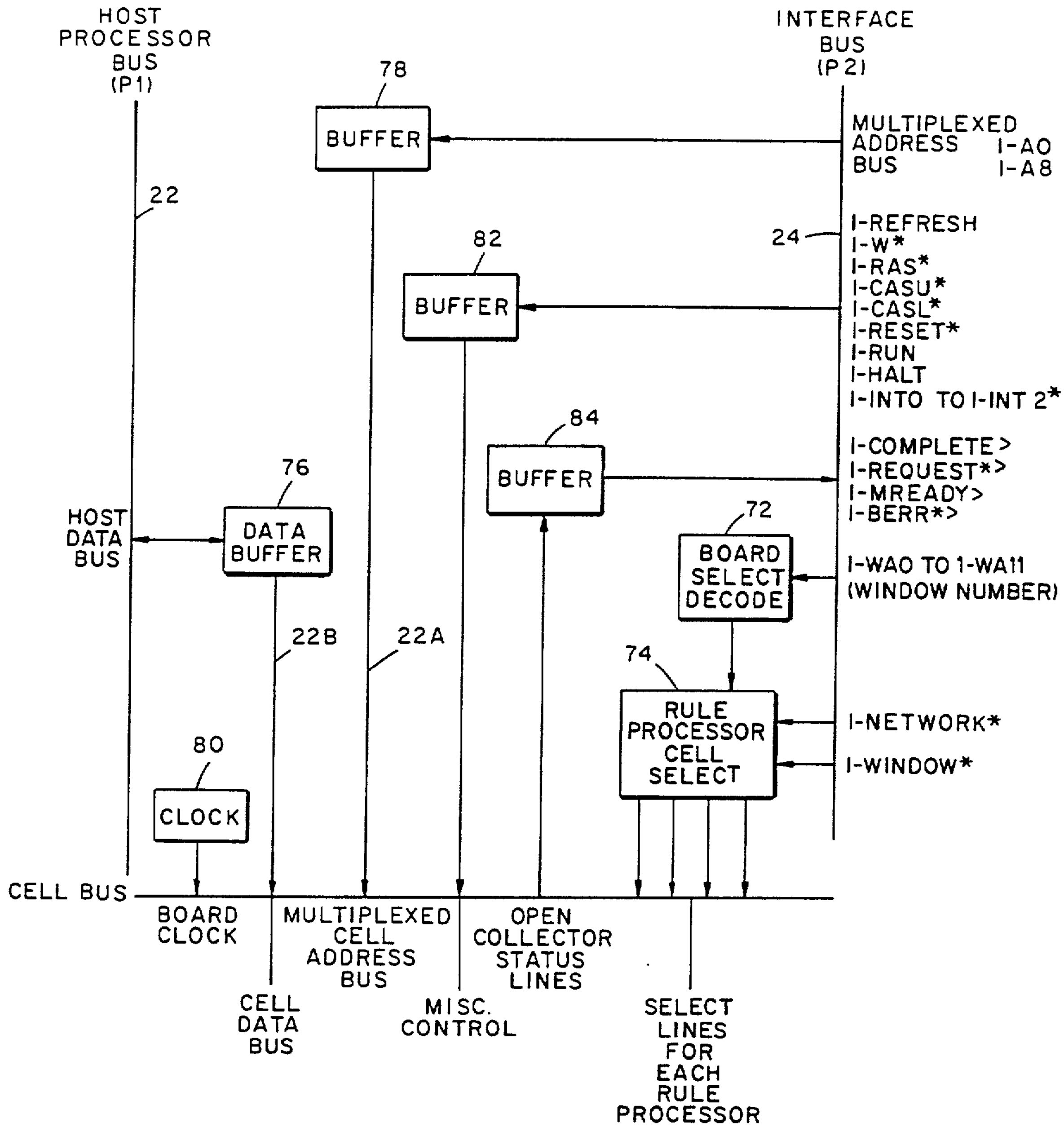
FIG. 6 is a block diagram of the rule processor board control logic of FIG. 4.

FIG. 6 shows a diagram of the RP board control logic 25 which is required on each rule processor board to buffer control and status symbols. Control logic 25 is seen to comprise a board selection decode circuit 72 which, via an RP cell select circuit 74, selects all the rule processors when the network mode is selected or selects a single rule processor when the window mode is selected.

The host interface data come from the normal Multibus data bus of the host bus 22 even though the bus control signals for the rule processors are generated in the interface 20. On each rule processor board, the data bus is fed to a buffer 76 to prevent bus loading by the rule processors. This means that the Multibus is loaded by the number of boards in the system, not by the greater number of rule processors. The host address bus and refresh address are multiplexed for the dynamic memory at the interface 20 (FIG. 5), not the rule processor level. The address signals from the interface 20 are buffered in buffer 78 and sent along a buffered address bus 22A to cell bus CB. Similarly, the buffered data from data buffer 76 are sent to the rule processors via the buffered data bus 22B to cell bus CB.

The system clock 80 for all rule processors is in the board level logic. Again, this is done to reduce the circuitry required in each rule processor cell.

The host memory control signals from the RP memory control 26 of the interface board are buffered in miscellaneous buffer 82 and sent to the RP cells as needed. Note that one of the control lines from the interface 20 is used to select either the row or the column addresses on the address bus from the host. The miscellaneous buffers 82 to 84 also buffer certain control signals to (buffer 84) and from (buffer 82) the interface board. These signals include the I-RESET line, the interrupt control from the IF Board, and the open collector completion flag from the rule processors to the host. Buffers 82 and 84 are unidirectional and need no separate enable signal.

The RP Board control logic 25 also decodes the high order window number address on the interface bus 24 to give a board select. When the board is selected, the rule processor selected by the low order window number address is selected for a memory transfer. Also, when the network is selected, all rule processors are forced into being selected for a write regardless of whether or not the board was selected by the high order window-address lines.

Rule Processor Cell Description

The rule processor cell contains the circuitry that is to be repeated a number of times, i.e., n=128. Because of this relatively large number, it is advantageous to minimize circuit complexity. FIG. 7 shows a block diagram of the RP cell circuitry for a single cell.

The RP cell is based around a CPU 84 (for example, a 68000 processor) and includes a memory 86, local RAM address bus 85, address mux 88, data buffer 90 and control logic circuit 92. Notice that there is no ROM in the rule processors nor is any required since the host processor loads each RP cell's memory 86 with the appropriate software for proper operation. Also notice that there is no I/O circuitry. This is a result of the direct memory mapped network. Since there is no ROM nor rule processor I/O, there is no need for any address decode circuitry.

The 256K×16 dynamic memory of memory 86 can be accessed by either the RP cell CPU 84, the host bus 22 or interface bus 24 buffered on the cell boards to the cell bus CB. The data bus of the memory is further buffered to prevent conflicts with other RP cells on the same board. There need be no buffering between the memory 86 and the CPU 84 because the CPU 84 is in a bus grant state whenever the host is accessing the local RP memory 86.

The address for the dynamic memory 86 can come from one of three different sources. The first is from the host address bus buffered to the cell bus CB. The second source of address comes from the refresh circuitry of interface 20. The last source of memory address is from the CPU 84. The 18 bits of address are multiplexed into 9 bits before addressing the dynamic memory 86. The selection of the address source is controlled by a select signal from the control logic 92.

Note that 18 bits of CPU 84 are used to address the local memory 86. This allows for the use of 256K dynamic memories for a total of 512 Kbytes of memory on each rule processor. It is pointed out, however, that the rule processors do not have to be identical as far as memory population is concerned. There could be a small number of "super" rule processors that are assigned more memory intensive rules for processing.

The control logic 92 handles all local memory timing, host bus arbitration, and CPU reset. The most important function of the control logic 92 is to allow the local CPU 84 to access memory 86 at full speed without wait states. The local memory control is not concerned with memory refresh because this function is controlled by the interface 20.

Each rule processor is required to have its own local memory. This eliminates memory arbitration problems between a number of rule processors and a common global memory. The only need for arbitration is between each rule processor and the host processor. All host-to-RP memory transfers are initiated and controlled by the host. However, during most of the host-to-RP memory transfers, the rule processors will normally be halted to permit network transmission of the data resulting from RHS actions and to permit polling by the host of the match condition flag of each RP indicating a potentially fireable rule.

Data Buffers

The data buffers 76 (FIG. 6) and 90 (FIG. 7) may take the form of 74LS245 integrated circuits. These data buffers are used to separate the host data bus from the local rule processor data bus. The direction signal comes from the cell-bus read/write signal, C-W*. This is essentially the same as the host read/write signal with one exception. When the interface 20 is performing a mass memory refresh to all rule processor memories, the C-W* signal must be high, signifying a read cycle. Because the interface performs a refresh essentially by doing a network read, which would cause data bus contention problems, a provision is made to disable the data buffers during refresh and eliminate contention problems. The cell-bus signal C-REFRESH will force the data buffers to be disabled during refresh. This signal insures that the data buffers are enabled only when the host is accessing local RP memory (memory 86 of each cell) and the C-REFRESH signal is low, signifying a normal read or write cycle from the host.

Address Multiplexer

Figures 8A, 8B:
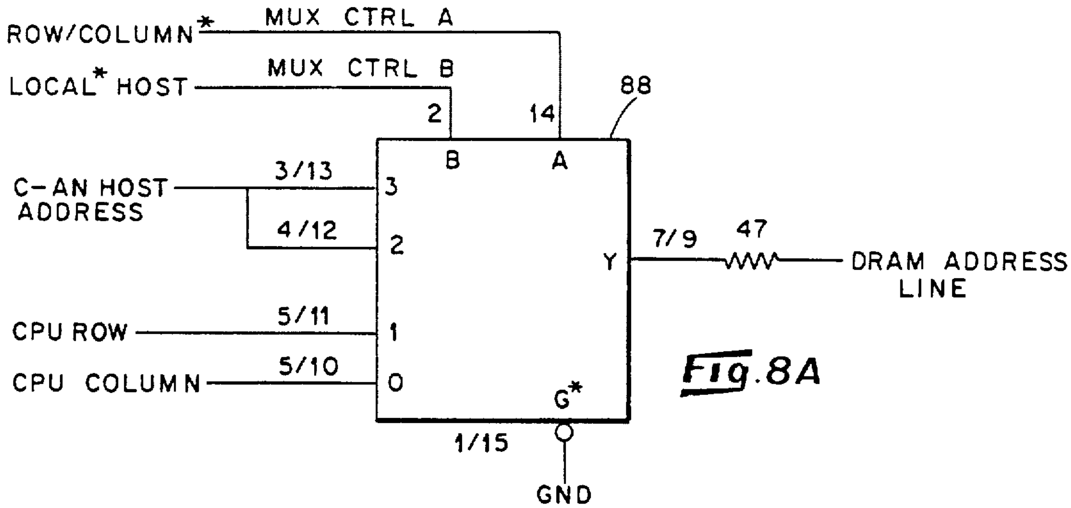
FIG. 8A is a diagram of the address multiplexer of FIG. 7.
FIG. 8B is a corresponding address/pin table.

The address multiplexer 88 is utilized in addressing of the local RP memory 86 by both the CPU 84 and the host processor 4. FIG. 8A shows a diagram of the address multiplexer 88 and FIG. 8B shows an address/pin assignment table.

The control signals "Mux Ctrl A" and "Mux Ctrl B" select the source of the local memory address. Mux Ctrl A selects the row and column address from the CPU 84. When Mux Ctrl A is high, the row address is selected. When it is low, the column address is selected. Mux Ctrl A is high when a host memory transfer is taking place. Mux Ctrl B is high when the local CPU 84 is accessing memory and is low when the host processor 4 is accessing memory. The following table indicates the source of the address for each combination of Mux Ctrl A and Mux Ctrl B.

Multiplexer Control Truth Table

| Mux Ctrl B | Mux Ctrl A | RAM Address Source |
|---|---|---|
| 0 | 0 | (Not Used) |
| 0 | 1 | Host Memory Address |
| 1 | 0 | Local Column Address |
| 1 | 1 | Local Row Address |

Note that the host address is not multiplexed at the cell level but is multiplexed via mux 44 at the IF board level in FIG. 5. This has several benefits. First, only 9 bits of address have to be sent to every RP cell instead of 18 bits. The second benefit is that it insures that all rule processors are in sync when the interface board is controlling a host network memory transfer or global refresh.

The most important aspect in assigning the inputs to the multiplexers is to be consistent in assigning the inputs from both the host address bus and the local address bus. Otherwise, a particular address from the host will not correspond to the same address from the local CPU 84. Thus, one must make sure that the host and local processor's addresses are mapped to equivalent bits on both the row and column addresses to the dynamic memory 86. For example, if the CPU 84 address line A7 is mapped to local memory address line 1, L-MA1, on the row address, the host A7 line must also be mapped to L-MA1 on the row address. Note that the actual order of address line assignments does not matter (since the memory 86 is random access) as long as both the host and local addresses correspond on both the row and column addresses. The address swap plug 46 of FIG. 5 basically insures the consistency between the host/local RP address designation.

The multiplexer circuit is implemented with five 74LS253 multiplexer chips of which 4½ are utilized. Due to ringing problems on dynamic memory address inputs, 47 ohm resistors are used to smooth the signal transition from the output of the multiplexer array.

The table of FIG. 8B illustrates the address/pin assignments for the multiplexer 88. Pin assignments may be made considering wiring convenience. It is to be noted that FIG. 8A shows only one half of the 74ALS253 chip with the notation number 1/number 2 designating the first half/second half address/pin assignments. For example, local CPU row address A7 of multiplexer chip CH is assigned to pin 5 (i.e., number 1 of the 5/11 designation) whereas local CPU row address A6 of the same chip is assigned to pin 11 (number 2 of the 5/11 designation). It is noted that the 68000 processor does not have an A0 pin but uses upper and lower address strobes for selecting upper and lower bytes (8 bits) of a 16-bit word. Thus, the A0 address line need not be considered. In this manner, FIGS. 8A and 8B represent the 4½ chips needed to generate the 9 row/column address lines for DRAM memory 86.

FIGS. 9A–9C set forth the cell board circuit layout. It is noted that in the detailed description set forth herein, four RP cells are placed on each board so that FIG. 9B is repeated four times per circuit board. The top and board control logic of FIGS. 9A and 9C appear only once per board and the signals generated thereby are used in common for all RP cells. The table set forth below may be utilized in conjunction with FIGS. 9A–9C and the detailed description herein as representative of commercially available chips used in implementing the invention. Specification of particular chips is made only to set forth a detailed embodiment of the invention and is not intended to limit the invention to such detailed implementation since alternate embodiments including VLSI technology may be equally suited to implement the invention.

TABLE

| |
|---|
| Top of Board |
| TA-(1) 74ALS245 Buffer |
| TB-(1) 74ALS05 Hex Open-Collector Invertor |
| Rule Processor Cell |
| CA,CB-(2) 74ALS245 Buffers |
| 16-4164 or 41256 Dynamic Memory Chips |
| 1-MC68000 CPU |
| CC-(1) 74LS257 Control Multiplexer |
| CD-CH-(5) 74ALS253 Address Multiplexers |
| CI-(1) 74ALS32 Quad OR Gate |
| CJ-(1) 74ALS138 Decoder |
| CK-(1) 74S288 Bipolar ROM(C2) |
| CL-(1) 74ALS05 Hex Open-Collector Invertor |
| CM-(1) 74S288 Bipolar ROM(C1) |
| CN-(1) 74LS14 HEX Schmitt-Trigger Inverter |
| CO-(1) 74ALS174 HexD Flip-Flop |
| CP-(1) 74ALS112 Dual J-K Flip-Flop |
| Board Control Logic |
| BA,BK,BL,BR,-(4) 74LS245 Data Buffers |
| BB,BE or BC,BD-(2) 74LS640 Data Buffers |
| BF-(1) 10 Position DIP Switch |
| BG-BI-(3) 74LS85 Comparators |
| BJ-(1) 74LS14 Hex Schmitt-Trigger Inverter |
| BM-(1) 74S288 Bipolar ROM(2) |
| BN-(1) 20 or 25 Mhz Oscillator |
| BP-(1) 74S112 Dual J-K Flip-Flop |
| BQ-(1) 74S288 Bipolar ROM(B1) |
| BS-(1) 7407 Hex Open-Collector Buffer |
| BT-(1) 74ALS174 HexD Flip-Flop |

SIGNAL DEFINITIONS

Bus Naming Conventions

In order to simplify the names of bus signals certain naming conventions are utilized. The prefix of the signal name specifies the location of the signal. The first character specifies the bus followed by a dash character. A list of the prefixes is given in Table 1. In order to specify the types of signals used the conventions and symbols shown in Table 2 are utilized.

TABLE 1

Signal Name Prefixes

| Prefix | Bus Location |
|---|---|
| "H-" | Host Processor Bus (Multibus connector P1) |
| "I-" | Interface Bus (Multibus connector P2) |
| "C-" | Rule Processor cell bus (common to all RPs on a board) |
| "L-" | Local Rule Processor signals |

TABLE 2

Signal Name Suffixes

| Suffix | Meaning |
|---|---|
| "*" | Active low signal<br>A "*" indicates that the active level of the signal is low or logic zero. A signal name that has no "*" is assumed to have an active high level. |
| "+" | Positive Edge Clock<br>A "+" symbol indicates that the signal is some type of a clock that takes meaning on the 0 →1 edge |
| "−" | Negative Edge Clock<br>A "−" symbol is the inverse of the "+" symbol. A "−" means that the signal takes meaning on the 1 →0 edge. |
| ">" | Open Collector Signal<br>A ">" symbol is used to represent an open-collector signal. |

SIGNALS ON HOST BUS

The following signals are from the host processor bus 22 which is the Multibus connector P1. Other signals, such as the LDS, UDS, and R/W* also come from this bus. However, keep in mind that there will be a significant load placed on the Multibus for the signals that are used by the rule processor boards. For this reason, control signals may require buffering on the interface board before being placed in the interface bus 24.

H-A1 to H-A18

Host processor address lines to Interface board. Since there is a UDS and LDS to select lower address bit, A0 is not included here. In other words, A0 is selected by the use of UDS and LDS. These address lines are multiplexed by the address mux 44 (FIG. 5) and used for the multiplexed input of the dynamic memory 86.

H-D0 to H-D15

Host processor data lines to Interface board and RF boards. This is the data bus used for network transmissions and single processor windowing by the host processor.

SIGNALS ON INTERFACE BUS

The following signals are from the interface bus 24 which is the Multibus P2 connector. Some of the high order address lines from the host CPU are also placed on this bus. These address lines are used to extend the Multibus addressing, and are used only on the interface board for address decoding. The rule processor boards do not need these high order address lines.

The Interface Bus consists of four sections as listed below:

Board Select Control

Memory Control
Cell Reset Control
Miscellaneous Control

Detailed Interface Bus Description

Board Select Control

I-WA0 to I-IWA11

This 12 bit bus contains the number of the RP cell that is to be accessed during a window read or write. The interface board can change this number depending on what window mode it is in. I-WA2 to I-WA11 are used to select the cell board, and I-WA0 and I-WA1 select the particular cell on the selected board.

I-NETWORK*

This is the network select signal to force all rule processor cells to respond to a host write command. This signal is also used by the global refresh control circuit on the interface board.

I-WINDOW*

Window Select Signal. The cell that is selected by the window number on the window number bus is actually selected when this line is low.

I-STATEN*

Board Status Port Enable. This line goes low to allow the board selected by the window address lines to put the on-board 16 bit status port onto the host data bus.

Memory Control

I-W*

Read/Write Signal. This signal is normally a buffered version of the host R/W* line and is low (in the write state) only when the host is writing to the RP boards. However, this line is forced high, to the read state, during the global refresh cycle.

I-RAS*

Row address strobe signal The falling edge of this signal indicates that the row address is stable and should be latched by the selected RP cell memories. This signal is also used to clock in the refresh address during the global system refresh.

I-CASU*

Upper byte column address strobe.

I-CASL*

Lower byte column address strobe. The CAS signals latch the column address in the falling edge of the strobe and initiate the actual read or write.

I-MREADY>

Open collector memory ready signal. This signal is fed back to the interface board to indicate when it can actually make a bus transfer. During a single processor access, this signal is the state of the single selected processor cell. However, in the network or refresh mode, this signal is the overall memory ready state of all rule processor cells.

I-REFRESH

Refresh active signal. This signal is high during a refresh cycle and deselects the local data buffers to prevent bus contention problems.

I-A0 to I-A8

Nine bit multiplexed address bus. This bus contains the host row address, host column address, and refresh address multiplexed under control of the interface board.

Cell Reset Control

I-RESET*

System level reset signal. Active Low.

I-RUN

This signal is used to enable the selected rule processor to come out of a reset state, by first bringing I-RUN high and then performing any memory access to the selected cell. The I-RUN signal is then brought low again. Note that a single processor is enabled to run through a read/write window, while all processors can be enabled by writing to the write-only network. In any case, only a single access is required. This signal should be low during the global refresh operation.

I-HALT

This signal is used to reset selected processors in a similar manner as the I-RUN signal. This signal must be low during the global refresh operation.

Miscellaneous Control

I-COMPLETE>

Single bit completion status of all rule processor cells. This is an open collector signal. When this line is low, there is at least one RP that is running. When this line is high, all RPs are halted.

I-REQUEST*>

Single bit request line from all rule processor cells. A single rule processor can pull this open collector signal low, requesting the attention of the host.

I-INT0* to I-INT2*

RP cell interrupt lines. These lines are normally high, indicating no interrupt. One or more of these lines will go low when an interrupt is to be serviced by all rule processor cells.

I-BDSEL*>

RP board selected line. This line can be used by the interface or buffer boards to determine if a board is present in a certain configuration. Its main intent is to allow several card cages to be attached to a single ribbon cable type interface bus. A buffer board could then buffer and transfer all signals to and from the cell boards in that particular cage. The open collector line gets around the need to have a cage decode circuit on the buffer board.

I-SPARE1, I-SPARE2

Spare IF Bus control output. The I-SPARE2 signal does not have a corresponding C-SPARE2 signal.

CELL BUS SIGNALS

The signals on the cell bus go to every rule processor cell on a board. One of the purposes of the interface bus and cell bus is to separate the large number of rule processors into sections to prevent large bus loading problems.

The cell bus consists of four sections as follows:

Address and Data Bus
Memory Control
Cell Reset Control
Miscellaneous Control

Address and Data Bus

C-A0 to C-A8

Multiplexed host row/column address and refresh address bus corresponding to bus 22A of FIG. 6. This 9 bit bus can contain three address types host row address, host column address, and Global Refresh Address. The host row and column addresses must correspond to the local CPU address connections.

C-D0 to C-D15

This is the 16 bit host data bus extension line 22B of FIG. 6. The naming scheme reflects that of the 68000

CPU chip, not the Multibus data bus naming convention.

Memory Control

C-W*

This is the host read/write* signal. During refresh, this signal must be high in order to do a memory read of all local rule processor memories The complement of this signal also is transmitted over the cell bus and is called C-W.

C-RAS*

Host row address strobe signal. The falling edge is used to latch the row address into the RAM chips. This signal is also used to clock in the refresh address.

C-CASU*

Upper byte column address strobe. Used to latch the column address from the host.

C-CASL*

Lower byte column address strobe. Used to latch the column address from the host.

C-MREADY>

Open collector memory ready signal. This open collector signal is used as feedback to the host to signify that all required local processors have given up the memory to the host. This signal should be thought of as a level type signal. The rising edge of this signal should not be used to proceed with the memory transfer. This is because there will be no rising edge if all local processors are already halted or reset. This signal is also used by the global refresh circuitry.

C-REFRESH

This is the refresh indicator signal. This signal will be high during the global refresh. This will cause all cell data buffers to disable during the global refresh.

C-SELECTn*

Cell Select Signal for n=0, 1, 2, 3. This is the only signal that is specific to an individual cell. This signal goes low when the host wishes to initiate a memory transfer and will go high again when the memory transfer has been completed.

Reset Control

C-RESET*

This is the system reset signal. This forces all rule processors to stop and remain in the reset state until enabled in the RUN state.

C-RUN

Cell run enable signal. In order to enable an RP cell to run, this signal must be high during a memory access to the desired cell. This signal must be forced to a low when a refresh operation is taking place.

C-HALT

Cell halt enable signal. In order to stop an RP cell, this signal must be high during a memory access to the desired cell. This signal must be forced to a low when a refresh operation is taking place.

Miscellaneous Control

C-COMPLETE>

Open collector completion flag. This signal will go high when all RP cells have halted, indicating that the recognize phase of the RAC is complete.

C-REQUEST*>

Open collector request line. This signal is pulsed by the RESET instruction of the rule processor to signal the host to scan all rule processors to see which one has a request.

C-INT0* to C-INT2*

Rule processor cell interrupt lines. These lines are normally high, indicating no interrupt pending. When a line or set of lines is brought low, the RP cell CPU will start an interrupt acknowledge sequence.

C-CLOCK

Rule processor cell clock. This is the clock to the rule processor CPU and control logic. This clock should be close to a 50% duty cycle.

C-STATUS*

Board status port enable. This signal is not used by the rule processor cells at all, but is sent to the top of the board where there is an eight bit input port. Four of these bits are used to allow the host to determine the run state of each of the RP cells. The other four bits can be used as test points for any reason. Note that this port is only the lower eight bits. The upper eight bits come from the bottom of the board where two more signals are brought in for input.

C-SPARE1

Spare cell bus signal. This is a spare signal that can be used for any reason. Currently, the board layout buffers the corresponding interface bus signal and transmits it over the cell bus.

RP CELL CONTROL LOGIC

Introduction

The cell control logic is responsible for making all portions of the rule processor cell work properly. There are four main portions of the cell control logic. They are listed below and described in the following paragraphs.

Local Memory Control Logic
Interrupt Control Logic
Arbitration Control Logic
Cell Disable Logic (Reset Logic)

FIG. 10 is a block diagram of the major portions of the cell control logic circuit 92 which illustrates the signals that are common between the major portions of the logic and the relationships between the portions of the cell control logic. FIG. 10 illustrates the local memory control logic 100, interrupt control logic 102, arbitration control logic 104 and cell disable logic 106. Signals beginning with "C-" are cell-bus signals that are common to all cells on a board. The only exception is the C-SELECTn* signal which is specific to each rule processor cell. Signals beginning with "L-" are the local rule processor signals, i.e., the signals specific to a given cell as illustrated in FIG. 7.

Local Memory Control Logic

The local memory control logic 100, illustrated in FIG. 11, is responsible for the dynamic memory control by the local CPU 84. The DTACK* logic is shown in FIG. 12 due to the dependence of DTACK* on the interrupt logic timing. FIGS. 13 and 14 show the arbitration control logic 104 and cell disable logic 106, respectively. FIGS. 15-17 show the timing of the 68000 CPU and the resulting dynamic memory timings. The timing diagrams are shown for a 12.5 Mhz 68000 to show the worst case timing for the dynamic memory.

Referring now to FIG. 11, a mux 108 (for example a 74LS257 multiplexer chip) is used to select between the local RAM control signals from the local rule processor 84 (W*, AS*, UDS*, LDS*) and the host RAM control signals from host 4 (signals having the "C" prefix). The outputs of the mux 108 go to the memory 86 which may take the form of a RAM chip array (for example, Fujitsu MB1256). The signals required by the RAM array are the read/write signal (L-MW*), row address strobe (L-MRAS*), and column address strobes for both the upper (L-MCASU*) and lower (L-MCASL*) data bytes. The corresponding signals from the host come directly from the cell bus CB. The Local*/Host signal is generated in response to a network or window access from the host and comes from the interface 20 via the arbitration control logic 104 of FIG. 13. This signal also serves as the Mux Ctrl B signal to address Mux 88 of FIG. 8A.

The RAS* for the local timing comes from the address strobe AS* of the CPU 84. The "mux Ctrl A" signal is connected directly to the AS*[B] signal line (originating in FIG. 12) and is fed as a select signal to mux 88 of FIG. 8A. The "Mux Ctrl A" must change to allow address multiplexer 88 to enable the column address onto the local RAM address bus 85. This is derived by a delayed version of AS*. The CAS* signal is generated by delaying AS*[B] via a flip-flop 110 a few gate delays (20–30 ns). The delay permits the generation of CAS* at the proper read timing as shown in FIG. 15. (Note in FIG. 15 that DS* is used to represent both the upper and lower data strobes from the local CPU.) For the write timing, the DS* signal from the 68000 is already delayed relative to the AS* signal as shown in FIG. 16.

The CAS* signals must be generated for both the upper byte memory bank and the lower byte memory bank. This is accomplished using OR gates 112 and 114 on the delayed AS* signal from flip-flop 110 and the UDS* and LDS* signals from the CPU 84. This has the added benefit of creating two CAS* cycles for the read-modify-write timing as shown in FIG. 17. Due to the UDS* and LDS* timing, the CAS* signals will go high at the same time RAS* goes high. However, this timing is still valid for normal DRAM timing.

Interrupt Control Logic

FIG. 12 illustrates the interrupt control logic 102 and is seen to comprise a ROM 120 and inverters 122 and 124. A ROM table Cl for ROM 120 is set forth in FIG. 18. The function codes FC0–FC2 are provided by the CPU 84 and are all high to provide an interrupt acknowledge signal The VPA* signal is the 68000 valid peripheral address signal and is used to initiate an autovector interrupt mode when the function codes are in their highest priority state, namely state 7 (FC0=FC1=FC2=1) and the address strobe AS* is asserted (i.e., low). In the described implementation, there are seven levels of interrupt which are carried out in the autovector mode using the VPA* signal.

The interrupt control logic is responsible for the proper timing associated with the CPU 84 autovector interrupts. Autovector interrupts are used because a vector number is not required to be placed on the CPU data bus. Seven interrupt levels are sufficient for use in the rule processor cell. The interrupt inputs of the 68000 processor, namely IPL0* to IPL2*, provide the required input to the CPU to initiate an interrupt acknowledge cycle. These interrupt inputs occur asynchronously to the CPU clock and originate on the IF board, generated by host software.

Two signals are affected by the interrupt acknowledge requirements. The VPA* is required to go low to indicate to the 68000 CPU that autovector interrupts are to be used. The DTACK* signals should be high during an interrupt acknowledge cycle to ensure that a vector number is not on the data bus. During cycles other than interrupt acknowledge, DTACK* follows AS* to satisfy the memory control timing since there are no wait states for local memory access by the local RP.

The signals FC0 to FC2 are used in FIG. 12 to detect an interrupt acknowledge cycle. The 68000 timing specifies that all three lines go high during an interrupt acknowledge cycle. However, these lines are valid only during the period when AS* is low. Because AS* is a three-state signal, a pull-up resistor is used to ensure that AS* is never left floating.

The DTACK* signal generated in FIG. 12 is required by the CPU 84 to indicate the completion of a memory transfer cycle. Although the local CPU 84 does not need to worry about timing delays, decoding or the like, DTACK* is still required to be low to terminate a memory transfer cycle. However, due to the autovector interrupts that are used, DTACK* must be high during an interrupt acknowledge cycle to prevent the local CPU 84 from reading an interrupt vector number from the data bus enabling auto vector interrupt when VPA* is asserted (low). DTACK* is low during all memory reads and writes by the CPU 84. This insures that CPU 84 will execute at full speed with no wait-states.

Arbitration Control Logic

The arbitration control logic 104 is shown in FIG. 13 and is seen to comprise a ROM 124 and flip-flops 126, 128, 130 and 132. The ROM table C2 for ROM 124 is set forth in FIG. 19. The arbitration control logic 104 is important in the communication between the host processor and the rule processor All memory transfers between the host and the local rule processor memory are initiated by the host processor. The local rule processor CPU does not have the ability to initiate such a transfer. The only need for the arbitration control logic is to ensure that the local rule processor has released the local address bus and data bus for use by the host processor. Notice that when the local RP is not running, either by being held in a reset state or by having executed the halt instruction, the arbitration is such that the host has immediate access to the local rule processor memory. In this state, the normal 68000 arbitration signals are not used to generate the signals required by other parts of the cell logic. This is because these signals cannot be guaranteed functional when the 68000 is held in the reset state These signals are functional when the RP is halted as via a halt instruction, but in this case they are simply ignored.

The C-SELECTn* input to flip-flop 126 comes from the interface 20 and is low whenever the host needs to initiate either a network or data transfer. The run state signal is generated by the cell disable logic of FIG. 14, indicating that the local CPU is running.

When the local 68000 is running, the arbitration circuit has to arbitrate between local RP memory accesses and host memory accesses. A memory access, either by the host or the local RP, is never interrupted midstream. Therefore, the host will have to wait until the local RP releases the bus before it can gain access to the local memory. The RPs (at this point) do not distinguish between actual host CPU accesses and memory refresh.

The flip-flops shown in FIG. 13 primarily ensure proper transitions at the edge of the clock. FIG. 19 shows the arbitration control ROM table for ROM 124. A finite state machine could be implemented using this ROM and the signals Y and YN+1. However, these signals are currently not used. ROM 124 generates the memory ready, local/host and the 68000 BR* and BGACK* signals For a simple arbitration scheme, BGACK* is tied high and the ROM entry for this is always 1. BR* to the 68000 RP is the same as the SELECT* input The ROM will ensure that the local RP remains in control of the memory until it receives a BG* assertion (low) from the local 68000 RP.

Cell Disable Logic

The cell disable logic has three main functions as shown in FIG. 14. The first function is to hold the local 68000 in a reset state until enabled by the host. This is important since the host has to load the local rule processor memory before the 68000 is allowed to start running. The second function is to provide the single bit open collector completion status signal that the host uses to determine the collective completion state of all rule processors The last function of the Cell Disable Logic is to allow the local rule processor to request the attention of the host.

The cell disable logic 106 may also be termed the reset logic and is seen to comprise flip-flop 130 inverting buffers 132–138, timing flip-flop 140, OR gate 142, flip-flop 144 and decoder 146. Inverting buffers 134–137 are open-collector gates indicated by the vertical bar within the triangular symbol. The upper portion of FIG. 14 including decoder 146, flip-flop 144 and inverting buffer 133 is used to generate a Run State signal from the RP CPU address lines A1, A22 and A23 serving as select inputs to decoder 146 (type LS138). The Run State signal is fed as an output of flip-flop 144 to the "D" terminal of flip-flop 128 of FIG. 13. The local RP CPU is running whenever Run State is high.

The lower portion of FIG. 14 is used for resetting the RP CPU 84. The flip-flop 130 is used to latch the reset state of the CPU 84. This flip flop is initially set to the reset state by a power-on reset signal. When the system is first powered up, a global system reset is generated by asserting C-RESET* which in turn forces and both HALT* and RESET* to be asserted (low) thus forcing a reset of the RP CPU 84. By configuring the host to control each RP's HALT and RUN lines, the host may remove from the system any CPU which is defective or otherwise not desired. Both the C-HALT and C-RUN lines must be low during normal refresh and normal memory access.

One important aspect of this scenario is that flip-flop 130 be latched on the falling edge of the C-SELECT* signal. This assures that the cell is reset when the host cycle is initiated. Otherwise, a bad cell that is not responding to arbitration requests properly will hang up the system. The global system reset C-RESET* is generated in the interface 20 in response to either a hardware or software reset as explained in more detail below.

The RESET* signal to the CPU 84 is buffered by an open-collector buffer and pulled up by a resistor due to the 68000 RESET instruction which will try to drive the RESET pin low. The HALT* line is buffered separately and is also used as an input to the completion status flip-flop 144. The HALT* from the 68000 does not accurately show the run state of the RP. For example, the HALT* pin is low on the 68000 only when the 68000 is being held in the reset state (in which case, the gate 135 pulls the 68000 HALT* line low) or when the 68000 has encountered condition known as double-bus-fault (described in the 68000 manual). In the double-bus-fault condition, the 68000 itself pulls the HALT* line low. The flip-flop 144 and decoder 146 allow the RP software to control the hardware to force Run State low when a 68000 STOP instruction is executed. The AS*(B) leading to the preset is the mechanism for setting the FF 144 into the "Run" state (AS*(B) goes low to force RUN STATE high).

After resetting the RP CPU 84 which is done simultaneously for all RPs through the C-RESET* line, each CPU 84 may be loaded with a common operating code, as, for example, the Polyforth kernel, and with individual LHS rule evaluation code specific to each RP. The RPs may then be started (again simultaneously) by asserting C-RUN and negating C-HALT, both of which originate from the interface 20 and are conditioned by host execution. The CPU 84 is then started by doing any kind of access such as a dummy read or write. When all RPs are started with C-RUN, the host must do a dummy write since it is not possible to read from all RPs at once. For a single RP, either a dummy read or write will be effective. To effect a halt of CPU 84, the C-HALT line is asserted and again a dummy access is made.

The need may arise for a single rule processor to request the attention of the host. This may be to signal the host that an error has occurred which requires the host's attention. The C-REQUEST*> signal is used to allow a single rule processor to interrupt the host. In order to minimize rule processor hardware, the manner in which the C-REQUEST*> signal is generated is unusual. The 68000 has a RESET instruction that normally allows the 68000 to reset the rest of the system. The RESET instruction pulls the RESET* pin on the 68000 low for 124 clock periods or 12.4 uS using a 10 Mhz clock. The C-REQUEST*> line uses this reset pulse to generate the request. Rule processor software may also set a flag to allow the host to identify the requesting rule processor.

Top of Board Circuitry

The circuitry of FIG. 4A, the top of board logic, is shown in detail in FIG. 20 and is seen to comprise a tri-state buffer 150, inverting buffers 152–155 and LEDs 156–159. The run state signal of each cell, namely the C-RUNSTATEn signal of FIG. 14, is fed to the buffer 150 to permit the host to determine whether or not any individual RP is running. A visual indication of the RP running state is also provided by the LEDs 156–159 by buffering the run state signals with their respective buffers 152–155.

Board Control Logic

Figure 21:
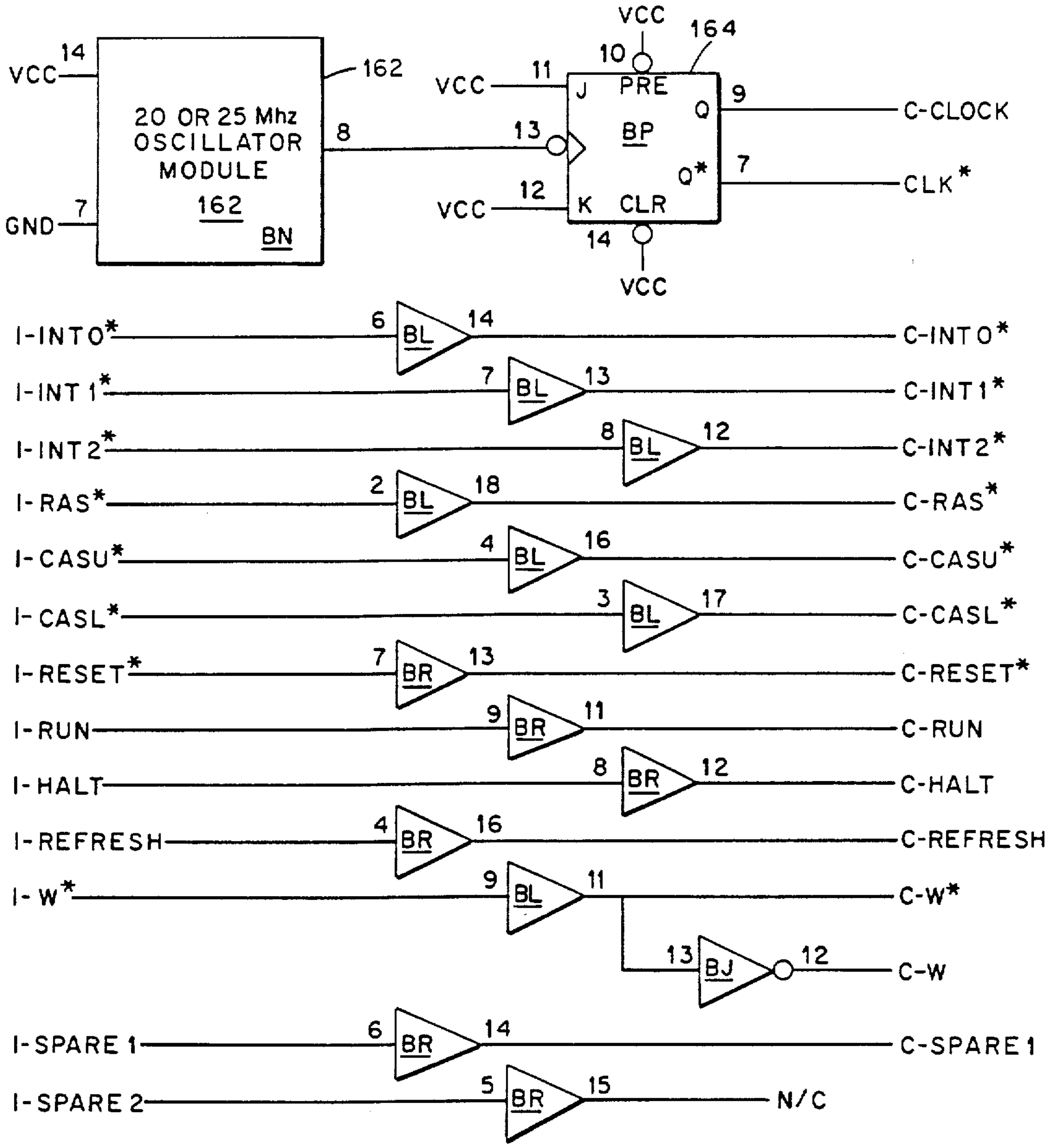

The board control logic of FIG. 9C is set forth in detail in FIGS. 21–27. FIG. 21 shows the conversion of the interface signals pre-fixed by the letter "I" to the cell bus signals pre-fixed by the letter "C". The clock signal generation is also shown in FIG. 21 and includes a clock oscillator 162 and a flip-flop 164 serving to divide the oscillator output by a factor of two. The clock signal C-CLOCK is fed to the clock inputs of each rule processor cell as shown in FIG. 11. Since each cell board has its own clock, it is possible to run each cell board at different clock rates for the CPUs contained on each board. (Notice the CPU clock signal of FIG. 11.) The network architecture and handshaking sequence (FIG. 3) also permit this different clock rate embodiment.

Figure 22:
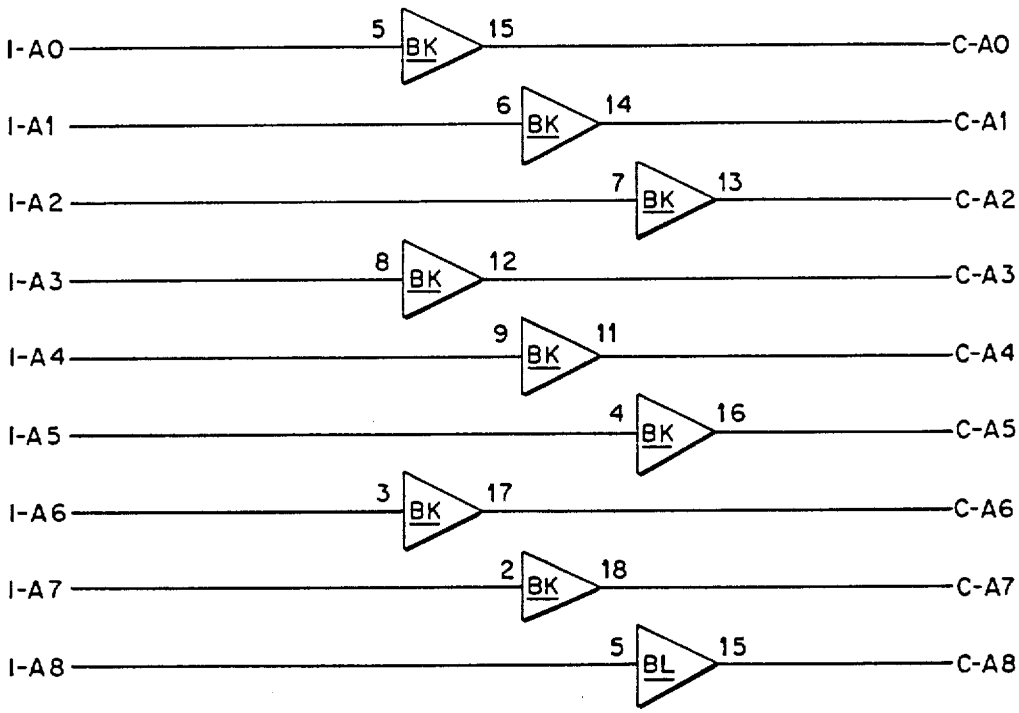

FIG. 22 illustrates the further buffering of the address line I-A0 to I-A8 from the interface 20 to the cell bus signals C-A0 to C-A8.

Figure 23:
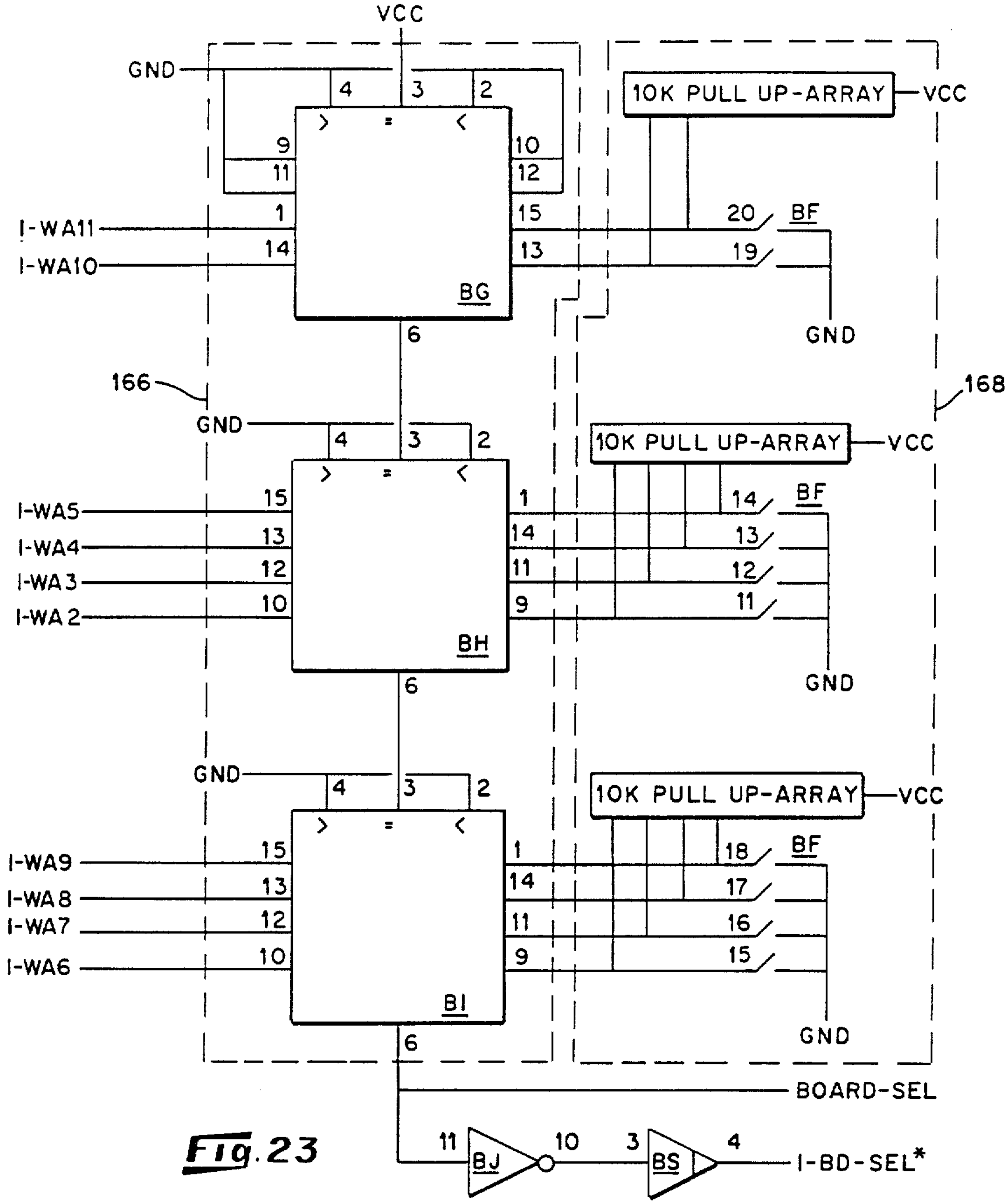

The window select logic circuit is shown in FIG. 23 and is seen to comprise a comparator 166 (made up of three 74LS85 comparators) and a DIP switch array 168. The window address lines are static lines and stay asserted until another board is selected since they are latched in the interface 20. The window address lines I-WA2 through I-WA11 are used for board selection.

Figure 24:
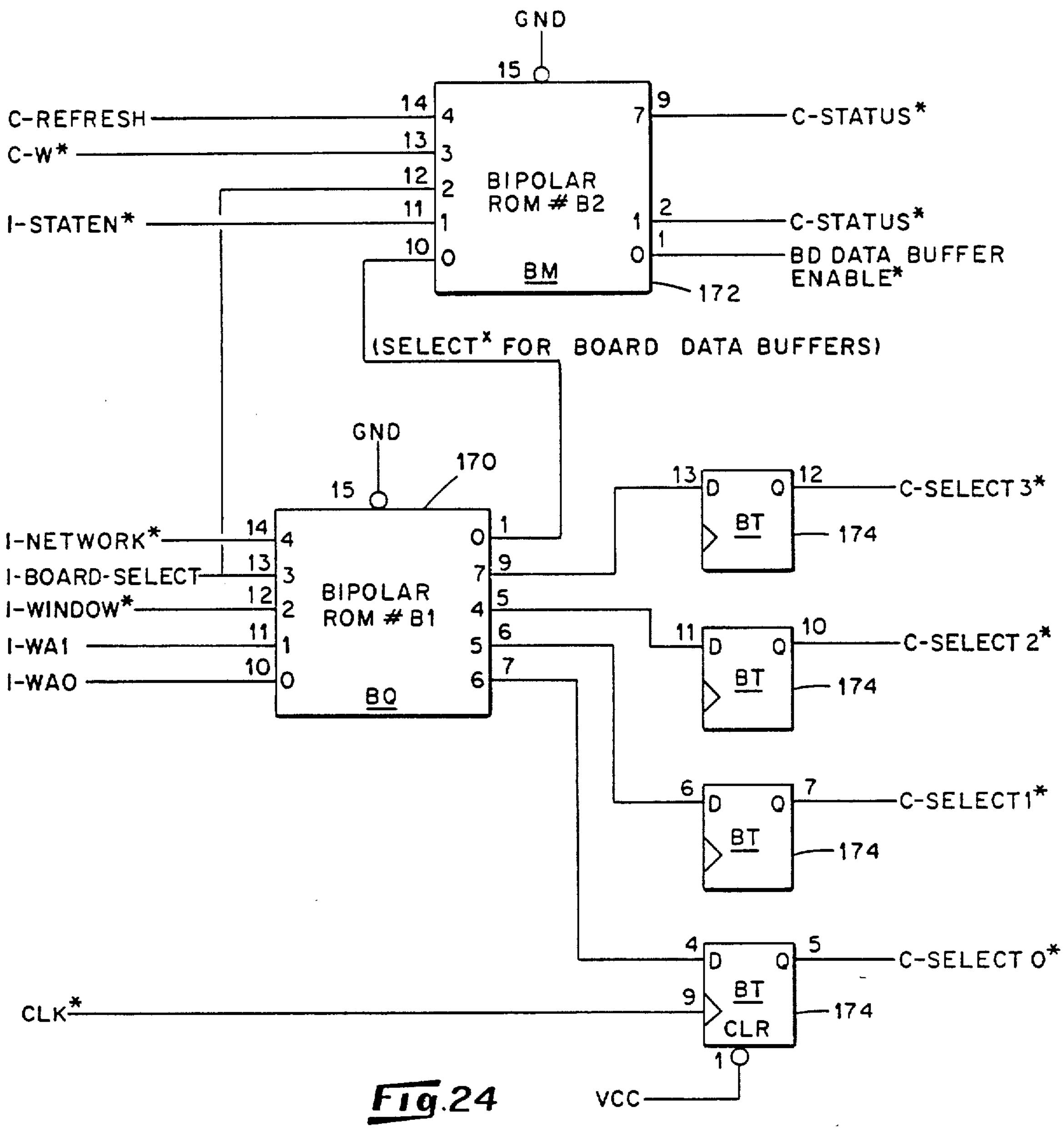

FIG. 24 is a schematic diagram of the cell select logic which comprises B1 ROM 170, B2 ROM 172 and flip-flops 174 used for timing. The ROM tables for ROM 170 are shown in FIG. 26 and for ROM 172 in FIG. 27. The basic purpose of the cell selection circuit is to permit access by the host to a particular RP on the selected board. This access is achieved via the lower window address lines I-WA0 and I-WA1. The I-WINDOW* signal is asserted by the host when a window access is desired. I-NETWORK* is asserted (by either a host network write access or interface refresh) to indicate a network access. The BOARD-SELECT signal comes from the window select logic of FIG. 23 and represents a decode of the window address.

In the case of a window access only one of the RPs on the board will be selected corresponding to one of the basic C-SELECTn* being driven low. This decoding may be seen in rows 10-13 of the ROM table of FIG. 26 wherein Sn* corresponds to C-SELECTn* for n=0, 1, 2 and 3. For a network transmission, all RPs need to be accessed as seen in row 1 of the ROM table of FIG. 26.

The Sel* output of ROM 170 (FIG. 26) is designated as the S* input for ROM 172 (FIG. 27). In practice, ROM 170 and 172 may be thought of as a single ROM table, and it is only divided for the sake of implementing same from readily available commercial components.

The C-STATUS* output of ROM 172 (designated ST*) is connected to enable the tri-state buffer 150 of FIG. 20. With the exception of the S* (Select) input, the remaining inputs to ROM 172 come from the interface 20. For example, I-STATEN* comes from FIG. 33 described below. The BD DATA BUFFER ENABLE* enables the cell board data buffer 76 of FIG. 6.

Figure 25:
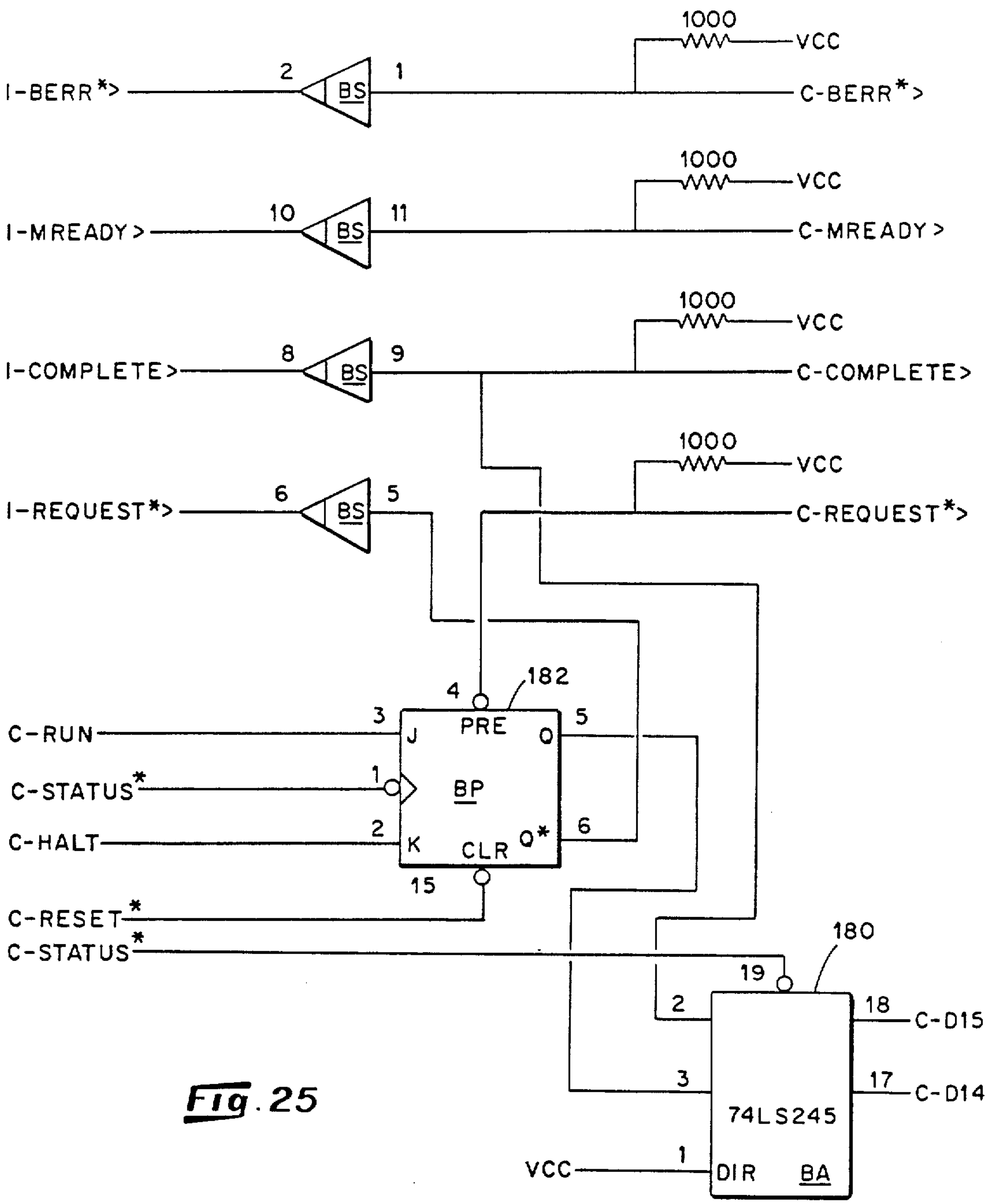

FIG. 25 is a schematic diagram of the open collector lines and status latch. Tri-state buffer 180 and flip-flop 182 serve as a status port for providing the host the ability to monitor the C-COMPLETE> and C-REQUEST*> lines and is similar to the port 150 of FIG. 20 for the top of the circuit board. The open collector buffers are used for buffering the signals shown. It is noted that FIG. 25 represents the wire OR'ed connection of the like signals which are tied to the cell bus so that the C-COMPLETE> line of FIG. 25 is the OR'ed connection for each of the four completion signals of FIG. 14. (Note that FIG. 14 is repeated four times for each of the four RPs on the board as are all figures representative of details of the RP cell of FIG. 9B.)

INTERFACE BOARD

The following description is provided to set forth details of the block diagram of FIG. 5. A block diagram of rule processor memory control circuit 26 is shown in FIG. 28. The RP memory control circuit 26 comprises a timer 200, refresh control circuit 202, arbitration control circuit 204, memory ready control circuit 206, timing control circuit 208 and miscellaneous control circuit 210. The miscellaneous control circuit 210 includes numerous input and output signals which are not shown in order to simplify the connection of the remaining illustrated blocks of the figure. However, the detailed schematics which follow more fully describe the interrelationship of the miscellaneous control circuit 210 with the other circuit block elements.

Timer 200 is a programmable interval timer which generates a refresh request (RF REQ) and waits for the receipt of a predetermined number, of refresh acknowledge (RF-ACK+) signals from the timer control circuit 208 via the refresh control circuit 202. The predetermined number of refresh acknowledge signals may, for example, be 16. During this time interval, the refresh request signal remains high forcing the remaining circuitry to perform a refresh cycle. The refresh cycle is terminated by negation of the refresh request signal after the predetermined number of refresh acknowledged signals is counted in a counter which forms part of the timer 200. The interrelationship of the refresh request signal and refresh acknowledge signal is illustrated in FIG. 29 which shows seven refresh acknowledge signals appearing within the asserted state of the refresh request signal. In practice, the predetermined number of refresh acknowledge signals is chosen to be 16 in the preferred embodiment described herein.

The arbitration control circuit 204 controls arbitration between the refresh and any type of host access such as a network or window access. The arbitration control is designed to operate on a first-come, first-served basis so that any "request" for refresh is simply treated as a request and is not operative in a true interrupt function. Thus, as between a host transfer and a refresh request, the existing mode of operation completes its cycle before deferring to the requesting second mode. The arbitration control circuit 204 includes a ROM table which operates, at least in part, according to the function table illustrated adjacent the arbitration control circuit block 204. When both the NETWORK* and HOST* signals are asserted, a network access is selected by the arbitration control circuit 204. If the NETWORK* is asserted with the HOST* negated, a refresh cycle is effected, whereas if NETWORK* is negated and HOST* is asserted, a window access is being performed. When NETWORK* and HOST* are negated, there is no memory transfer taking place to any of the rule processors.

The memory access control circuit 206 examines the I-MREADY> signal and the Complete signal, and if both are asserted, generates an "ACCESS2" signal which in turn causes a memory access operation. The ACCESS2 signal is transmitted to the timing control circuit 208 which generates the appropriate DRAM control signals for accessing all or a selected one of the memories 86 of the rule processors.

FIG. 30 illustrates the board clock circuitry which forms part of the miscellaneous circuits 210 of FIG. 28. The board clock circuitry 30 is seen to comprise a 25 Mhz oscillator module 220 and a plurality of counter chips 222 for dividing down the clock signal to provide the various divided signals as illustrated. Inverting buffers 224 are utilized with the upper counter chip 222 for sharpening the clock edges of the higher frequency clock signals.

FIG. 31 is a schematic diagram of the board reset logic which holds the two reset signals (L-RESET1* and L-RESET2*) low (active) for at least 81 microseconds which is long enough to effect the resetting of all of the rule processors CPUs. The circuit comprises two counters 226, NAND gates 228 and 230 and inverting buffers 232–234. The inputs to NAND gate 228 comes from either a hardware or software initiated pulse. The hardware pulse is the hardware set switch provided by the Multibus which generates the H-INIT* signal to the upper input of NAND gate 228. The interface may also provide a software reset as a decode of a predetermined output of the host databus for generating the software reset IF-RST* signal as a lower input to NAND gate 228.

One of the outputs of the board reset logic circuit of FIG. 31, namely L-RESET2* is fed to the reset port illustrated in FIG. 32. The reset port also forms part of the miscellaneous circuit 210 of FIG. 28. The reset port comprises a HexD flip-flop 240 AND gates 242 and 244 and a plurality of buffers and inverters as illustrated. The Request Int Enable and the Complete Int Enable are interrupt enable signals to the host to allow the host to be interrupted when a Request is generated or when all RPs complete processing.

The reset port provides the I-RESET* signal to FIG. 14 of the cell disable logic (termed C-RESET* in FIG. 14 since it is fed via the cell bus) as a buffered version of the L-RESET2* signal. The reset port provides the I-HALT and I-RUN signals to the cell disable logic of FIG. 14 (termed C-HALT and C-RUN respectively) conditioned by AND gates 242 and 244. The upper inputs of AND gates 242 and 244 come from the flip-flop 240 as a decode of the data from the host data bus. The lower input of each of AND gates 242 and 244 is connected to receive an inverted refresh signal from the arbitration control circuit 204 so as to negate the I-HALT and I-RUN signals during a refresh cycle. The reason both the HALT and RUN signals are negated is that the refresh cycle is a network type access to all rule processors whereas the HALT and RUN signals may be utilized in connection with all or a selected rule processor.

The AND gate circuitry is configured assuming that I-HALT and I-RUN are low when refresh occurs. Since Refresh is asynchronous to any host access, one cannot be sure when a refresh cycle will come along. Thus, for example, if the host is attempting to enable RP 43 (the forty-third rule processor), I-RUN is brought high through the reset port 240, RP 43 is accessed (any dummy access), followed by I-RUN being brought low again. If refresh started anywhere where I-RUN was high, all processors (not just RP 43) would start running. Thus, to prevent this erroneous result, the I-RUN and I-HALT signals are negated during refresh.

The network address decode logic 28 of FIG. 5 includes a board select logic circuit as illustrated in FIG. 33 and an I/O decode logic circuit as illustrated in FIG. 36. The board select logic circuit of FIG. 33 is seen to comprise a ROM 250, AND gates 252 and 254 and a flip-flop 256. The relevant equations governing the selection of the output signals as a function of the input signals are illustrated in FIG. 34 with the actual ROM table itself set forth in FIG. 35.

In FIG. 34, the symbol "@" represents an exclusive –OR operation, the symbol "*" indicates an AND operation (logical product), and the symbol "+" the logic OR (logical sum).

It is noted in FIG. 33 that the inputs to ROM 250 originate from the host address and R/W lines. The X-WINDOW* and X-NETWORK* signals go to the arbitration control circuit 204 (FIG. 28) and the signals from the flip-flop 256, namely WIG* and W2G* are utilized to enable the window ports to drive the window address bus. The clear and preset inputs of flip-flop 256 are conditioned by AND gates 252 and 254, the lower inputs of which are connected to receive the W1 and W2 access signals and the upper inputs of which are supplied respectively with signals W2CLK+ and W1CLK+.

Cell Bd Access line of FIG. 33 goes to the XACK* logic (FIG. 50). The I-Staten* signal is fed to the ROM 172 of FIG. 24 contained within the cell-select logic.

The AND gates 252 and 254 may more easily be understood by considering them jointly as OR gates. In other words, when W2CLK+ goes low OR W2-ACC* from the ROM 250 goes low, then the preset of the flip-flop 256 goes low thus enabling the Window 2 address to be placed on the IF bus. The W2-ACC* is required to force the Window 2 address to the I-WA0 to I-WA11 lines. The W2CLK+ also is used for the following reason: If the software writes a rule processor number to the WINDOW 2 port, then one can assume that an actual window 2 access will follow; thus, the hardware goes ahead and puts the Window 2 address on the I-WA0 to I-WA11 line.

The network address decode logic 28 of FIG. 5 is shown in greater detail in FIG. 36. The circuit is seen to comprise a read decoder 260, a write decoder 262 and a pulse output decoder 264. The host read and write signals are fed as inputs to the read and write decoders, respectively, which are both fed with the I/O Enable* signal from ROM 250 of FIG. 33. Both the read decoder 260 and write decoder 262 provide port select signals to input ports and control latches (for example, the Reset port of FIG. 32). The pulse output decoder 264 provides control pulses to the IF board circuitry—for example, the IF-RST* pulse to FIG. 31. The timings of the read decoder, write decoder, and pulse output decoder are similar but have different functions. Both the read and write decoders further receive the host address lines H-A 3 through H-A 5. The read decoder 260 provides a programmable interface timer read signal, PITRD*, and the write decoder 262 provides a similar write "programmable" interface timer signal PITWR*. These signals are fed to the refresh timing circuit 30 of FIG. 5 as explained more fully below. The W2CLK+ and WICLK+ from the write decode 262 are provided to the upper inputs of AND gates 252 and 254, respectively of FIG. 33. These signals are utilized to condition the AND gates for generation of the window write enable signals W1G* and W2G*. The pulse output decoder 264 provides the software reset strobe IF-RST* as an input to AND gate 228 of FIG. 31. This reset signal is provided as a decode on the host data lines D8–D12.

The RSTCLK+ signal from the write decoder 262 is fed as the clock input to the flip-flop 240 of FIG. 32.

The data buffer 52 of FIG. 5 may simply comprise 74LS640 inverting tri-state buffers for connecting the host data bus (prefixed by H-) to the local data bus on the interface board (prefixed by L-). Further, the window ports 34 and 36 of FIG. 5 may simply comprise 74LS374 latches which are connected at the output control (terminal 1) thereof to receive the W1G* for the window 1 port and the W2G* for the window 2 port. The clock input (pin 11) is connected to receive the WICLK+ signal for the window 1 port and the W2CLK+ signal for the window 2 ports. These signals are supplied by the write decoder 262 of FIG. 36. Thus, the window 1 ports merely latch the local data lines L-D0 through L-D15 to the window address lines W0 through W11 (although 16 bits are latched, only 12 bits are used for the window address lines). The window address lines W0 through W11 are buffered in the buffer 62 of FIG. 5 and the resulting output is denoted by the interface window address lines I-WA0 through I-WA11.

The interrupt control register 40 of FIG. 5 is illustrated in FIG. 37 and is seen to comprise a Quad D flip-flop for providing the three interrupt output lines I-INT0* through I-INT2* latched from the local data lines L-D0 through L-D3. The local data lines are in turn derived from the host data bus by the data buffer 52. The clock and clear inputs to the flip-flop 270 are provided respectively by the INTCLK+ signal from the write decoder 262 of FIG. 36 and the L-RESET2* signal from the board reset logic of FIG. 31.

The buffered output of flip-flop 270 provides the I-INT0* through I-INT2* signals to the local rule processors CPU. Normally, these signal links are high and are driven low when the host needs to interrupt all rule processors. It is noted that all rule processors are interrupted simultaneously and in parallel. In contrast, memory transfer can take place either in a network fashion or on a per-rule processor basis.

The status input port 38 of FIG. 5 may simply comprise one or more data buffers in the form of 74LS245 chips to permit reading of any number of plurality of lines determinative of the status of the system. Such lines may include the bus error line, BERR*, the completion line, the L-RESET2* line, etc. The status input port is enabled by the status read signal STATRD* from the read decoder 260 of FIG. 36.

The timer 200 of FIG. 28 is illustrated in FIG. 38. The timer 200 is seen to comprise a programmable interval timer (PIT) 8254 which is programmable by means of the host CPU via the data lines L-D0 through L-D7. The PITRD* and PITWR* signals come from the read decoder 260 and write decoder 262 of the I/O decode logic of FIG. 36. Timer 0 of the PIT timer is utilized to provide the time interval between the refresh pulses Timer 1 of the PIT timer is utilized to actually count the refresh acknowledge signals, RF-ACK+. The outputs of the timer 0 and timer 1, namely PIT-OUT0 and PIT-OUT1 are provided to the refresh control circuit 202 of FIG. 28 which itself is further illustrated in FIG. 39. The refresh control circuit 202 is seen to comprise a latch 280 and a ROM 284. The purpose of the refresh control circuit is to generate the refresh request signal, RF-REQ. The latch 280 and ROM 284 are configured to implement a finite-state machine. The ROM table for ROM 284 is set forth in FIG. 40 and the state machine diagram is illustrated in FIG. 41.

During the time period in which the refresh request, RF-REQ, signal is high, the PIT timer 200 counts the refresh acknowledge signals RF-ACK+ until 16 such signals are counted. After this time, the finite state machine of FIG. 39 transitions from state 2 to state 3, thus removing the refresh request signal.

The refresh request signal, RF-REQ is fed to the arbitration control circuit 204 of FIG. 28. The arbitration control circuit 204 is shown in more detail in FIG. 42 and is seen to comprise a latch 290 and a ROM 294. The host network and window signals are also latched by means of the latch 290 and fed to the ROM 294. The ROM table for ROM 294 is illustrated n FIG. 43. In this ROM table, it is noted that the inputs designated "X" and "Y" correspond to "I-NETWRK*" and "Host*" in FIG. 28. The purpose of the arbitration control circuit 204 within the interface board is to provide arbitration between a refresh and a host transfer state. The refresh cycle is performed while the refresh request signal is asserted (high), and during this time the host must wait until the 16 refresh acknowledge, RF-ACK+, signals are counted in the PIT timer 200. After the refresh has completed, the host may initiate a memory transfer either to a selected processor via a window transfer or to all processors via a network transfer. Thus, the X-NETWORK* signal provided by the board select logic of FIG. 33 is transformed in FIG. 24 to the I-NETWRK* signal subsequently fed to the cell select logic of FIG. 24 for each of the cell boards. Similarly, the X-WINDOW* signal from the board select logic of FIG. 33 is transformed in FIG. 42 to the I-WINDOW* signal which in turn is fed to the cell select logic of FIG. 24. The refresh signal as an output of the ROM 294 of FIG. 42 is fed to several places in the interface 20 including the reset port of FIG. 32 and the memory sequencer 208 of FIG. 28. The refresh signal is further provided to the cell boards as the C-REFRESH signal fed to the cell select logic of FIG. 24. The Access 1 signal from the ROM 294 is fed as an input to the memory ready control 206 of FIG. 28.

The Access 1 signal from the arbitration control circuit 204 of FIG. 42 is fed to the memory ready control circuit 206 of FIG. 28. The memory ready control circuit 206 is further illustrated in FIG. 44. Memory ready control circuit 206 is seen to comprise a flip-flop 300, ROM 302 and a shift register 304. The shift register 304 is made up of a plurality of 74 ALS 174 flip-flops arranged in a one-shot configuration. The Access 1 signal is fed to the clear input terminal of the flip-flop 300 and to each flip-flop within the shift register 304. Flip-flop 300 receives the wire OR'ed "Complete" signal which is the composite complete signal derived from each of the rule processors cell disable logic circuitry as shown in FIG. 14. (See also FIG. 49 below.) The MReady signal is similarly derived for each rule processor from the arbitration control logic circuit of each cell as shown in FIG. 13 (and FIG. 49). The Complete signal is high if no rule processor is running, and the MReady signal is high when the rule processor memories are ready to receive a new data transfer. The ROM table for ROM 302 is set forth in FIG. 45. The output of ROM 302 is the ACCESS 2 signal which indicates to the host that a new memory transfer is now possible since no rule processors are running and the memory ready condition for all rule processors is asserted. The Access 2 signal is fed to the timing control circuit 208 of FIG. 28.

The timing control circuit 208 is further illustrated in FIG. 46. The timing control circuit 208 is seen to comprise a state machine made up of flip-flop 310 and ROM 312, and is further seen to comprise a sequence ROM 314, flip-flop 316 and multiplexer 318. Instead of ROM tables for the ROMs 312 and 314, use is made of the timing diagrams set forth in FIGS. 47 and 48. ROMs 312 and 314 may be thought of as a single ROM chip with bytes below (10)hex govern a host access as shown in FIG. 47 and bytes above (10) hex governing a refresh access as shown in FIG. 48. Thus, the signal Refresh is fed to the fifth bit of the F/F 310, and when Refresh is asserted (logic 1), the upper bytes, beginning at address (10)hex, of ROMs 312 and 314 are addressed resulting in the timing diagram of FIG. 48. It is further noted that the inputs to the ROM 312 and sequence ROM 314 are the same. In both FIGS. 47 and 48 the waveforms illustrated correspond to the output of the sequence ROM 314, and the numbers at the bottom of each graph in FIGS. 47 and 48 correspond to numbers stored in the ROM 314 and ROM 312, respectively. For example, in state 0 for the host access of FIG. 47 the number "FA" is stored in the ROM 314 whereas the number "01" is stored in ROM 312. State 09 of the ROM 312 for the host access of FIG. 47 loops back around on itself and cycles indefinitely in state 9 until the host is finished with accessing any one or all of the rule processors. The first 3 cycles, namely states 01 and 2, are dead-time cycles designed to permit signal levels to settle down prior to host access.

It is further noted for the host access of FIG. 47 that the reading and writing time for the dynamic RAM are different and that if one wants to read it is necessary to wait an extra 3 cycles (states 6, 7, and 8) in relation to the write timing. In the implementation provided, separate read and write cell acknowledge signals are provided and selected by means of multiplexer 318 utilizing an OR'ed Host*/WR* condition for the select terminal thereof. The output of the multiplexer 318 provides the cell transfer acknowledge (cell XACK*) signal which may either be the read or write transfer acknowledge signal, depending upon whether the host is performing a read or write operation. The write cell acknowledge signal is generated immediately after the CAS* signal is asserted as compared with waiting an extra 3 cycles for the read transfer acknowledge signal. This increase in speed for a write operation is possible by taking advantage of the DRAM chip operation in which one may write data into memory on the falling edge of CAS*. For a read operation, however, one must wait the extra 3 cycles for the data to become available.

The FIG. 48 corresponds to a RAS only refresh. Only 7 states of the state machine defined by ROM 312 are present and the system would normally cycle around the 7 states but is terminated by means of the negation of the RF-ACK+ signal sent to the PIT timer 200 of FIG. 38.

The output signals of the timing control circuit 208 shown in FIG. 46 provide the RAS and CAS strobes for the dynamic RAM memory at the appropriate timing as shown in FIGS. 47 and 48. The host may access any of the rule processors in a read or write mode for a window access or all of the rule processors in a write mode for a network access. The network access is a write only access whereas the window access may be either read or write. For example, in a network access, the host generates an appropriate address code on the address lines H-A18 through H-A23 together with the appropriate write signal H-WR* signal which is fed to the ROM decoder 250 of the interface as shown in FIG. 33. The output of ROM 250 is the X-NETWORK* signal which is provided to the arbitration control circuit of the interface as shown in FIG. 42. The output of the arbitration control circuit 204 generates the I-NETWORK* signal which goes to the cell board logic and in particular the cell select logic of FIG. 24. The I-NETWORK* signal then generates the cell select signals for all of the rule processor cells on the board, namely, C-SELECTn* is asserted for n 0,1,2,3. In this manner, the I-NETWORK transmission accesses all processors on all boards at the same time. Moreover, the host network address accesses the same memory location in all of the rule processors which may be any location within the 512 K memory space of the rule processors starting at the host address C00000 (hex) as shown in FIG. 2. If any rule processor is running during the time the host wishes to assert a network access the Complete signal is low providing a zero input to the flip-flop 300 of the timing control circuit 206 of FIG. 44. It may be recalled that the Complete signal is derived from the cell disable logic of FIG. 14 (via FIG. 49) and is driven low if any of the rule processors on any circuit board are running.

The complete signal is the inverted signal of the run state signal. The presence of the complete signal being negated in FIG. 44 indicates that the memory ready control circuit 206 must await receipt of the appropriate memory ready signal which will occur only after all rule processors have stopped running and the DRAM memory of each rule processor cell is ready to receive a bus transmission. The cell select signal, C-SELECTn* is fed to the cell board arbitration control logic circuit as shown in FIG. 13 which arbitrates within each rule processor cell. If the particular rule processor is not running, the arbitration circuit asserts C-MREADY> indicating that a memory transfer is permitted. However, if any particular rule processor is running, the arbitration circuit negates C-MREADY> and, thus, by pulling memory ready low, indicates to the memory ready control circuit 206 of FIG. 44 that a delay time will be needed prior to a memory access. As far as the interface board is concerned, the open collector nature of the memory ready (MReady) signal means that the MReady signal is negated even though only one rule processor is running. In this sense it does not matter to the interface whether one or more processors are running at this time. When all rule processors have stopped running, each MREADY> signal in FIG. 13 is asserted (one for each RP) which results in the MReady signal of FIG. 44 being asserted. The shift register 304 of FIG. 44 forces a certain delay time to insure that there is enough time to get the C-SELECTn* out to each RP so they can pull MReady low if they are not ready to release their own (local RP) bus. The shift register 304 forces a delay in this case to insure MReady is valid.

When the ACCESS2 signal is generated, it is fed to the state machine comprising the flip-flop 310 ROM 312 of FIG. 46. The generation of the ACCESS2 signal basically initiates the generation of all of the row and column strobes for the dynamic RAM memory of all of the rule processors and provides the upper inputs to the local memory control logic as illustrated in FIG. 11.

The refresh count signals, RF-CNT- is provided as an output to ROM 314 of FIG. 46. The waveform for the refresh count signal is shown in FIG. 48. The refresh count signal is fed to the refresh counter 32 of FIG. 5 which comprises an eight bit counter fabricated for example from 74LS393 chips. The output of the refresh counter 32 provides refresh address lines RA0–RA7 to the address multiplexer 44 of FIG. 5. The address multiplexer 44 may comprise 74ALS253 chips and selects between the refresh address and the host address fed by the host address bus and the swap plug 46. One of the select terminals for the multiplexer 44 is provided by the refresh signal generated from the arbitration control circuit 204 of FIG. 42, and the other select terminal for the multiplexer 44 is provided by the Row/Column* signal generated by the timing control circuit 208 of FIG. 46. The address swap plug 46 simply insures that the interface bus address lines correspond to the correct local bus address lines and cell bus address lines. The swap plug may be a simple 40 pin DIP socket used to provide an address swap jumper.

FIG. 49 illustrates the conversion of the open collector interface signals to the corresponding TTL signals utilized on the interface board itself. For example, the open collector I-COMPLETE> from FIG. 25 is converted to TTL logic to become the "Complete" signal utilized, for example, in FIG. 44. Simple pull up resistors, buffers and inverters are utilized to convert the other signals as shown in FIG. 49. Further, a RUN state indicator signal may be provided by means of an LED as shown in FIG. 49. This LED comes on whenever any RP is running.

FIG. 50 shows the circuit diagram of the transfer acknowledge control circuit 48 of FIG. 5. The circuit is seen to comprise simply a ROM 330 for which the ROM table is illustrated in FIG. 51. The purpose of the circuit is to provide the host with the requisite transfer acknowledge signal to complete a memory transfer cycle. The cell XACK* signal is provided as an output to multiplexer 318 of FIG. 46. The "I/O Enable*" signal is derived as an output from ROM 250 of FIG. 33 as well as is the Cell Bd Access signal. Also, the "X-STATEN*" signal is derived from ROM 250.

SOFTWARE DESCRIPTION

One of the primary features of the system described herein is the provision for parallel processing of the left hand sides of the various rules while the right hand sides are fired by means of the host processor which transmits the results of this firing in a network transmission to all of the rule processors. The results of a rule firing are either to make new working memory elements or to remove old working memory elements. The modify command is simply a combination of make and remove and thus need not be considered separately. Typically, vector commands for make, modify and remove are transmitted to the rule processors utilizing small numbers which may then be indexed by the rule processors utilizing a vector table.

As a simple example of a network transmission format reference is made to FIG. 52. It is assumed that the program has previously literalized the element class "GOAL" defining three attribute, namely, WANT, ID and STATUS. As a result of firing, a particular rule, a value may be associated with the attribute WANT, in particular the value "HOUSE". The right hand side firing may then call for the making of the new "Goal" working memory element defined by the attribute-value pair WANTHOUSE. The host processor will then transmit this new working memory element as well as the command for making same to all of the rule processors in a network transmission. Although the format for the transmission of the new working memory element may take many forms, it is advantageous to simplify the amount of data transmitted to reduce transmission time and complexity of coding and decoding the transmitted results. Thus, as shown in FIG. 52, the transmitted message 500 is composed of a command (CMD) field 502, an RHS number field 504, an element class or class number field 506, a time tag field 508, and three attribute fields, 510, 512 and 514 corresponding respectively to ATT1, ATT2 and ATT3. The RHS number field 504 may be used to uniquely identify the RHS's of all the rules and is useful for building the network links between RHS actions and LHS conditions affected by each RHS action. (It is noted, however, that in the programs set forth in the appendix, the RHS number field is not used, as this feature is currently not implemented.) The class number field 506 is used for defining the element class, in this case GOAL. The attribute fields are preassigned, position dependent fields such that it is not necessary to transmit the actual attribute itself but only the token or value of the attribute as called for in the "MAKE" command. In other words, field 510 is always reserved for the value of attribute 1, field 512 for attribute 2 and field 514 for attribute 3. These attributes are assigned in the literalize command for the class "GOAL. " Thus, in transmitting the new working memory element for the pair WANT HOUSE, it is only necessary to put the token for HOUSE within the ATT1 field 510. Fields 512 and 514 are assigned the nil token (0-hex) since no values have been assigned to these attributes in the "MAKE" command of the example.

The rule processor receives the message 500 and responds to same only if it has a left hand side which can be affected by any of the attributes of the class element GOAL. If no left hand sides within the rule processor utilize the class element GOAL, the rule processor simply ignores the message and waits for another message which contains an element class for which the particular rule processor has a defined left hand side.

FIG. 53 illustrates yet another message format 520 which contains a command field 522 for removing a WME, RHS number field 524 and time tag field 526. The time tag field stores the time tag of the working memory element. The time tag is a unique integer associated with a working memory element, so generated that the most recently created WMES bear the largest numbers. The time tag may be utilized for conflict resolution purposes in the event that more than one set of combinations of working memory elements satisfies a particular rule left hand side during the recognize part of the recognize-act cycle.

The time tags may be utilized for conflict resolution in the sense of a rule processor having a single rule with multiple combinations of working memory elements satisfying the left hand sides thereof and also for purposes of selecting among multiple rules within a particular rule processor where the particular rule processor stores the LHS of more than one rule. Conflict resolution is of course, applied over all rule processors. The message for "MAKE. " in FIG. 52 has 2 constant length header with the number of attribute fields determined by the LITERALIZE statement for given class. Each attribute field is four bytes in widths the message for "Remove" in FIG. 53 is always a constant length. In the implemented embodiment, four bytes are utilized for each field, i.e., a 32 bit message length, with the details of the stream codes set forth in FIG. 59 discussed below. It would also be possible to utilize a message length designation field at the beginning of each message to specify the number of bytes or to utilize an end of message designator as alternate mechanisms to tell the rule processors when the end of a message occurs.

The various programs described below and set forth in the appendix represent examples of the codes stored both in the host and rule processors. The language used for implementation of the software is the FORTH Inc. version of FORTH known as PolyFORTH. A version of the PolyFORTH has been modified to run on top of the CP/M-68K operating system from Digital Research The CP/M-68K provides a simple file structure for reading source code files and user OPS files. CP/M-68K is a single-user/single-tasking system and does not interfere with the operation of the parallel processing implementation of the OPS language. Thus, while running OPS, CP/M-68K is only used for file I/O and character I/O to the console and printer. Also, CP/M-68K does not have any "knowledge" of the parallel processors or the status display that is used within OPS. For more details on the OPS language, the reader is referred to the Brownston et al reference and the OPS User's Manual mentioned above. For the FORTH language, reference is made to the PolyFORTH II Reference Manual, FORTH, Inc., Ray Vn DeWalker et al, 1983, and to the publications of Leo Brodie, *Thinking FORTH* and *Starting FORTH* (Prentice-Hall, Inc.), all of which are incorporated herein by reference.

The programs POLY.PF and RPPOLY.PF are the host and RP PolyFORTH codes respectively.

The program FILES.PF was developed to allow the POLYFORTH program to run under CP/M-68K and to permit access to various source files.

The program PFEDIT.PF contains the original POLYFORTH line editor and is part of the commercially available POLYFORTH system.

The file FSEDIT.PF contains the sources for a full screen editor and is designed to run on top of the POLYFORTH program.

BDOS.PF allows OPS to access the character and disk I/O of the CM/P-68K operating system.

The file TIME.PF contains time and date format routines.

The program TERMINAL.SCR allows the video terminal (for example, VT100 terminal) to be accessed for various display purposes.

The program SBE.PF contains initialization parameters for the SBE M68K10 multibus single board computer. This code is provided also time and date information, accessing the printer, etc.

The program MAC.PF contains the initialization parameters for the MacIntosh running IQ Software's CP/M-68K implementation.

The program XFER.SCR contains a code for a simple file server system to allow the MacIntosh and the SBE system to exchange files.

The program TOKEN.PF contains the token package that allows each string argument to be converted into a single 32 bit token.

The program HOST.PF contains the port definitions of the interface board, system initialization and rule processor support.

The proggaa DISPLAY.PF contains a display server that acts as a status display and a server to a selected rule processor. This program permits efficient debugging of code within the rule processors.

The program PARSER.PF contains the OPS parser and command line interpreter utilized for compiling the OPS program.

The programs OPSVAR.PF and OPSCMD.PF give the OPS variable and command codes respectively.

The program MM.PF is the memory management package program.

The program WME.PF is the management program for the host work memory elements.

The program RHS.PF sets forth the RHS parser and execution codes.

The program RPVAR.PF gives the RP variables and support code.

The program RPWME.PF gives the RP working memory management program.

The program FILTER.PF is the code for the RP LHS filter.

The program LHS.PF gives the LHS evaluation code.

The program CONRES.PF sets forth the conflict resolution code package.

The program COUNTER.PF gives the OPS counter statement support code, an extension to the OPS language.

As an example of some of the features of the software, reference is made to the program HOST.PF. The left hand screens represent the actual FORTH program with the right hand screens being the "shadow" screens utilized for comment statements. Screen 1 the load screen and screen 2 simply defines various constants. The constants defined in screen 2, for example, correspond to the memory map addresses as shown in FIG. 2 as well as the addresses for the PIT timer, status port, etc. Screen 3 translates words by adding a network address to the offset generated by the host processor. Thus, if the offset is 20, the network address is added to 20 in order to get the proper address within the network space. Screen 4 is utilized for initializing and refreshing the system. The element COLD is utilized to provide a cold boot to the POLYFORTH program. PULSE-INIT is the software reset that forces generation of the reset signal IF-RST* of FIG. 36 which is in turn fed to FIG. 31 for performing the software reset function.

Screen 5 allows low level support to turn the rule processors on and off. Screen 6 provides the necessary words for allowing interrupts to be sent to the rule processor. Screen 7 defines the timer words to the PIT timer and reads the timer 2 signals. Screens 8–11 are used to load the software from the disk onto the various rule processors. Screen 12 is simply a utility screen, and Screen 13 initiates the blink display test. Screens 14 and 15 are utilized for request service and debug support respectively. The HOST.PF program provides the first level of access to the rule processor hardware for the rest of the system.

FORTH runs on both the host processor 4 and the parallel rule processors 6. On the host, the polyFORTH runs under CP/M-68K. It is pointed out that polyFORTH is multitasking but CP/M-68K is not. The polyFORTH multitasker is used to provide a status and server task. This server task communicates with the display terminal (for example, a VT-100 type terminal) through a serial link. This task normally shows a status screen to allow the user to see how the OPS program is running. However, this same task can be placed into a server mode, allowing a debugging environment for the rule processors. Only a single rule processor can be debugged at a time.

On the rule processors, the polyFORTH is the only operating environment. Character and file I/O for the rule processors is done through the server task that runs on the host and is used for program development and debugging. Since there is no ROM on the rule processors, the host loads the RP FORTH from a disk file. It then determines which processors are available. All normal communication between the host and the RP's goes through a reserved area at the very top of the RP memory. This is done mainly to prevent the host from having to know about the internal memory structure of the rule processors.

A token package (TOKEN.PF) has been implemented on the host to allow all strings and numbers to take on a 32 bit token. In this manner, comparisons on the RP's can simply be a 32 bit comparison as opposed to a full string comparison. During normal OPS execution, only tokens (created in the host) are passed between the host and the rule processors. This procedure cuts down on the system complexity and the amount of information passed between the host and the rule processors. The token package is passed a string and then determines if it is numeric or not. If a string is numeric, then the number is converted into a 32 bit token that has the upper bit set. Therefore only 31 bits of numeric precision are maintained. If a string is found to be non-numeric by the token package, then it is converted into a string token with the upper bit forced to O. String tokens are simply the address of the string within the host token memory area. Since equality and inequality comparisons must be done on string tokens by the RP's, string tokens must be unique and not duplicated. In other words, tokenizing a particular string will always return the same token for a particular run. This is done by searching the existing strings being held by the token package. If a string exists already, then the address is returned as the token. If a string does not exist, then it is added to the token package and the address is returned. Note that the address of the string in the token package is returned as the token. This is not essential, but is convenient to the host in converting the token back into a string. The token package consists of multiple linked lists to reduce search time. Experience with the system shows that most of the tokens are created at compile time when a new OPS program is being loaded. Also, new tokens are usually added when the user is asked to enter something from the keyboard. In either case, speed is not very critical, so the search time to add a new string to the token package is not a limiting factor.

The next paragraphs will show a general sequence of operations required for the parallel processing OPS initialization and program compilation. When OPS is first started from CP/M, the rule processors are loaded with their operating environment from the disk file RPFORTH.IMG, which is a machine language version of the programs set forth in the appendix. The "IMG" signifies binary image file. The RP's are then started and return a flag to tell the host that they exist and are operational The RP's also initialize their own variables and memory arrays. The RP's then stop because there is nothing else for them to do. The host also does some initialization.

The host then prints the "OPS>" prompt and waits for user commands. As commands are entered, they are executed when the user enters a carriage return. The user can also load commands from a file with the "(LOAD filename.ext)" command. This simply redirects the input to come from a file. The user will generally load a file with an OPS program. The host does all of the parsing for the system. This is important since tokens are being added at compile time and only the host can perform the tokenizing task. Also, error messages will be printed by the host. The parsing starts with the host determining which RP will receive the rule LHS's. This is done by checking the exist on each RP. The RP that currently has the smallest number of LHS's is selected for receiving the new rule. Other algorithms may be used, but the above algorithm is advantageous since it does not require a look ahead approach. The OPS parser is a one pass compiler As each rule is parsed, the host reads the LHS's, checks for proper syntax, then adds a simple command to the RP stream and stores the stream in a host stream buffer. It is this stream that concisely defines the LHS's for the RP's. After all of the LHS's of a rule are compiled, the host sends the stream in the host stream buffer to a selected RP which converts this stream into executable code for later evaluation. Also, if the host stream buffer is filled before all LHS's are parsed, then as much as possible is given to the RP. The host will then clear the stream buffer and continue to fill it from the beginning. The host will then start reading the RHS's of the rule. Executable FORTH code is placed in the host memory as the RHS's are compiled. After the last RHS is compiled, the host has completed parsing for a particular rule. This process repeats until all rules have been loaded.

During the compile phase, the RP's are responsible for accepting the command stream from the host. This stream is sent only to a single processor during the compile phase using a window transition mode. A RP reads the stream and compiles executable FORTH code into "filters" to be described shortly. The "filters" may also be executable machine code which will speed the system up noticeably. After a RP has finished with the stream sent to it by the host, it simply stops.

The next paragraphs describe the operations that take place during the actual execution of an OPS program. The Recognize-Act cycle consists of three main parts: the recognize part that takes place in parallel on the rule processors, the conflict resolution part that takes place both in the rule processors and the host, and the act part that takes place on the host.

The recognize code resides on the rule processors. Basically, this code has to find all fireable instantiations (self-consistent sets of working memory elements) that can satisfy each rule given the current state of the working memory. This code is split into two parts - a "counter" and the filter The counter has to go through all reasonable combinations of working memory elements that may satisfy a rule. Each LHS is assigned a list of WME's that satisfy the literal conditions. This is done by checking the literal conditions through the LHS filter for each LHS. The counter has to go through all reasonable combinations of WME entries on each of these LHS lists. There are many combinations that are not reasonable. For example, if the second LHS variable bindings did not match the first, there is no reason to check the third, fourth, etc. LHS for any matches. Therefore, the counter code goes on to try to find another WME entry in the second LHS list that will match the variable bindings that were assigned by the first LHS. By eliminating this extra work, the rule filter has to go through only hundreds of possible matches instead of millions. Another thing that the counter code does is to enter the rule filter in such a way as to eliminate unnecessary work. For example, if a particular WME did not match the third LHS as far as variable bindings from the first and second LHS is concerned, then another WME from the third LHS list must be tried. The counter code will reenter the rule filter at the third LHS. This will speed the filter up since it is known at this point that the first and second LHS's are self-consistent. The details of the counter code are found in the program LHS. PF.

The "filter" is a very important concept to the AI Machine. Basically, a rule LHS set is compiled into several filters Each filter returns a single flag that indicates a pass or no-pass condition. There is a filter for each LHS of a rule. This filter deals only with the literal comparisons that have to be executed in order to accept a new WME to match a single LHS. There is a pre-check filter that checks to make sure that there is at least one WME to match each non-negated LHS for a rule. Also, it checks to make sure that any negated LHS's that have no variable bindings have no WME matches. The precheck filter is simply a convenience and makes the rule filter code simpler The rule filter is a single filter for each rule that binds variables and checks for conditions on previously bound variables. Each rule filter has as many entry points as there are LHS's. This is to allow efficient scanning through the lists without starting at the top each time. The 15 filters are described in more detail below, and the filter code is set forth in detail in the program FILTER.PF.

Conflict resolution takes place both on the rule processors and the host. Since each RP may have several rules, they perform conflict resolution on the rules contained within them. Only the most fireable rule will be passed back to the host by each RP, and the host, in turn, performs conflict resolution on these fireable rules. In this manner, the host only has to perform conflict resolution over the number of RP's, not the number of rules, which may be much larger in a complex expert system.

After the host determines which rule to fire, it then performs the actual firing of the rule. This consists of executing the RHS code that was previously compiled into the host memory. Parts of this code may look into the RP that contains this rule to get variable bindings and the conflict set. The act of firing a rule will usually require sending changes to the working memory to each of the rule processors. The types of changes are MAKE, MODIFY and REMOVE After the host has executed all of the RHS code, the Recognize-Act cycles starts over again.

Memory Management

The memory management routines in MM. PF run on both host and RP's and serve several useful functions. Basically, the memory manager allows variable sized arrays to be defined in the system. These arrays can be resized at any time. There are two different kinds of arrays or "frames" known to the memory manager—static frames and dynamic frames. Both kinds of frames can be resized or removed at any time, however the static frames are reserved for the type of data that does not require very much resizing. Therefore, static frames are kept next to each other without any free memory between them. Dynamic frames are the ones that need to grow and shrink quickly Therefore, dynamic frames are kept spread out in memory with some free memory above each of them to allow each one to grow quickly. When there is not enough free room above a dynamic frame that needs to grow, the system will reallocate so that there will be enough room. This takes some time, but occurs fairly infrequently.

On the host, the static frames are used for holding the RHS code of all of the rules. Literalize definitions are also held in static frames as well as pointer tables to rules and literalize definitions. Dynamic frames on the host are used for holding the WME list and WME definitions. These need to grow and shrink rapidly during the execution of an OPS program.

The RP's use static frames to hold LHS and rule filters as well as a few pointer tables to the LHS's and rules. Dynamic frames are used to hold the local working memory as well as the pointer table to allow quick access to any local WME.

Since all frames must be relocatable in memory, handles are used to hold the actual address of the frame. The handles never change location, therefore code can always gain access to the frame required. Handles also hold other information required internally to the memory manager. Basically this information assists the memory manager when a reallocation is required. The size of the frame is kept as well a doubly linked list. The doubly linked list is used for reallocation. This list is kept in the same order as the frames in memory, even though the handles may not be in order. There are separate lists for static frames and dynamic frames. When a reallocation occurs, frames are moved to one end of memory and then moved back to the proper place. Static frames are always kept together, while dynamic frames are kept spread apart for the most part. Sometimes, dynamic frames are kept together during such processes as creating a new dynamic frame and creating a new handle, both of which would occur during the system compilation and therefore are not critical conditions.

FIGS. 54A and 54B show a simple organizations of the memory for the host and RP's, respectively. In both the host and RP's, the memory management package consists of three main parts—the handles 550, dynamic frames 552 and static frames 554. In addition to the area of memory that is controlled by the memory management package, there are such things as the system software 556 that resides in low memory and memory area 558 which contains the FORTH stacks, disk buffers and other items These areas of memory are not managed by the memory management package.

The frame handles 550 are stationary in memory once created. In other words, they never move once assigned The frame handles 550 always point to the actual dynamic (552) or static (554) frame in memory. Therefore a double fetch is required to get the actual address of the frame given the handle address.

Static frames 554 are kept at the bottom of the memory managed by the memory management package. There is no room left above each static frame because it is assumed that it will not grow or shrink rapidly.

Dynamic frames 552 may grow or shrink rapidly and therefore are given free memory above each dynamic frame. When a dynamic frame shrinks, it will never cause a reallocation. When a dynamic frame grows, it may cause a reallocation. This reallocation will occur only when the amount to grow is larger than the free space above the dynamic frame. In most instances, the amount to grow is relatively small and the system will not have to reallocate memory often. Experience with the system shows that once the initial reallocation forces the dynamic frames to be spread apart for the first time, memory reallocation occurs very infrequently. Only when the available memory goes down does the memory manager start to become a problem and reallocate fairly frequently. Experience shows that this only becomes a problem when more than 100 rules are placed in each processor.

Although the overall layout of the memory for the host (FIG. 54A) and RP (FIG. 54B) is the same, the actual data stored within the dynamic and static frames are different as summarized in the table below:

| Memory Area | Host | RP |
|---|---|---|
| 552 (Dynamics) | 1. Global WME Definitions<br>2. WME list | 1. Local WME definitions<br>2. Pointer tables to local WME |

-continued

| Memory Area | Host | RP |
|---|---|---|
| | | 3. LHS Lists<br>4. Fireable Lists<br>5. Not-Fireable Lists |
| 554 (Static) | 1. RHS code<br>2. Literalize definitions<br>3. Pointer tables to rules and literalize definition | 1. LHS<br>2. Precheck filter<br>3. Rule filters<br>4. Pointer tables to LHS and rules |
| 556 | 1. Parser<br>2. RHS support code<br>3. PolyFORTH kernel | 1. LHS evaluation code<br>2. PolyFORTH kernel |
| 558 | 1. CP/M operating system<br>2. FORTH stacks<br>3. String token memory<br>4. Buffer Type (character buffer)<br>5. Network buffer | 1. FORTH stacks |

An important further difference between the host and RP memory arrangement is seen by the presence of a reserved area 560 which is positioned at the top of the RP memory (FIG. 54B) and is not required in the host memory (FIG. 54A). Reserved area 560 is the same address space for all of the RP's and is used by the host for both window transmissions (LHS stream communication) and for network transmissions (i.e., transmission of WME's). Such information is stored in the RP network buffer. Also part of the reserve area 560 is utilized to store the RP system variables as set forth in screens 2-8 of RPPOLY.PF. Of these variables, the variable <BEST-RULE> in screen 7 of RPPOLY.PF provides an indication of which rule "owns" the conflict set array <CONFLICT-SET> and the sorted conflict set <SORTED-CS> is the most fireable rule within the particular RP as determined, for example, by standard recency and complexity criteria. If only one rule is stored within a particular RP, the <BEST-RULE> variable stores a 0 (for the rule number within the RP) if the rule is fireable and a −1 if the rule is not fireable. Thus, the <BEST-RULE> variable serves as a match flag indicating to the host that particular RP has or has not determined the existence of a self-consistent set of WME (<SORTEDCS>) and thus has a fireable rule.

The conflict set is the set of self-consistent working memory elements ordered per the LHS of each rule and is used by the RP in connection with host rule firings. The sorted conflict set is the same grouping of WME's but ordered with the most recent time tags first as an aid in conflict resolution.

After the completion flag (FIG. 1 indicative of the RUN state signal from each RP) indicates to the host that all RP's have finished the recognize or match phase of the Recognize-Act Cycle (RAC), the host polls in turn each RP accessing the variable <BEST-RULE> to determine if a match condition is satisfied, (i.e, <BEST-RULE> set to other than a −1) thus indicating the existence of a fireable rule. If a rule is found to be fireable, the host reads the sorted conflict set array stored in the variable array <SORTED-CS>.

FIG. 55 shows the organization of the frame handles. Each frame handle actually contains four long-words of information. The first is the pointer to the frame itself. The second and third are doubly-linked lists used by the memory manager only. The fourth is the size of the frame, used both by the operating code and the memory manager.

The doubly-linked list exists only for the use of the memory manager. These lists allow the memory manager to scan both up and down the dynamic and static frames in the order that they exist in memory. When a reallocation is required, this ordered list is required. For a dynamic frame reallocation, the memory manager is designed to move all frames to one end of memory and then move them again them out. A zero word is at the end of each linked list.

Host < > RP Protocols

In any multiprocessor system, the communication between processors is a very important factor. For the parallel AI machine, there are several types of communication between the host and the RP's. They are:

RP Reset
RP Interrupt
Server Commands
RP Stream Codes

Of these, the RP Stream codes are the most important. The other functions are support functions.

FIG. 56 is a table of the reset codes that the host sends to the rule processors upon hard reset of the RP's. The code is placed in the location <BOOT-CMD> within the rule processors. Note that the code offset is in increments of 4 bytes corresponding to a 32 bit word for the 68000 microprocessor. Of interest are the CONFIG-CHK which is used by the host in order to determine which processors are available. The RP-COLD is used to initialize the OPS operating code in each RP. The RP-MTEST is used to check memory in the RP's.

FIG. 57 shows a table of the interrupt codes that are used by the host to start an interrupt service routine on the RP's. The code is placed in the location <INTR-CMD> within the rule processors. The 0 code is special. If a RP encounters an interrupt with a 0 code placed in the <INTR-CMD> location, then it will simply return from the interrupt. The host interrupts a single processor by placing a zero in every other processor's <INTR-CMD> location and the non-zero interrupt vector code in the RP that it wishes to interrupt. This is used primarily for compiling rule LHS's into a selected RP's. It is to be recalled that all RP's receive an interrupt at the same time. This software trick allows some simple control by the host as to whether only one RP get interrupted or if all RP's get interrupted.

The INTERPRET-STREAM is the main interrupt routine for the compilation and execution of OPS programs. In this mode, stream codes are placed in the network buffer by the host and are executed by the RP's.

FIG. 58 is a table showing a list of the server commands from the RP to the host. The commands are used for a debug function only, and thus, only one RP can be served at a time. The SERVER task on the host continually reads the <SERVER-CMD> location and executes the command found there. Most of the time, this command is zero and nothing is done. Disk I/O is implemented for debugging on the RP itself as well as the rebuild function that allows the RP to build a new FORTH system from the stripped-down kernel. Several TOKEN print commands are implemented to allow the RP to print the value of tokens without having to know the token string itself. This is used within debugging of a particular RP during either compilation or execution.

FIGS. 59 and 60 list and describe all of the "INTERPRET-STREAM" RP Stream Codes that are sent from the host to the RP during LHS compilation and main execution. The network buffer can hold many stream codes, one after another, in memory. In this manner, "chunks" of data can be sent to the RP's at once. Typically, only one network transmission is required to send the RHS actions to the RP's. If more are required, then two or more network transmissions are sent. The stream codes are used for both actual LHS compilation and main program execution. Examples will be given of the RP Stream Codes in use.

Host Parser

The parser on the host reads the source OPS file from the disk, parses it, and sends rule LHS's to the rule processors. The RHS code stays in the host itself. The main parser code is in the file "PARSER.PF". Additional RHS parsing coding is in the file "RHS.PF".

The lowest level routine for the parser is the "get character" routine. This routine gets a single character from the keyboard buffer or the disk file that has been selected. There is a simple file stack in the file "BDOS.PF" that will allow files to be nested. In other words, files can load files. This is a convenient "batch" support system. The system will start off by getting characters from the keyboard. Only when the user tells the system to load a file will it open the specified file and redirect the input to come from the file instead of the keyboard. When the "get character" routines see a control-Z, the file stack will be "popped" and the input will be redirected to the previous input, whether it be another file or the keyboard input.

At the next level of complexity, there is the GET-ATOM routine. The GET-ATOM routine scans the input stream for valid OPS "atoms". An atom can be thought of as a legal keyword to the OPS system. The GET-ATOM routine also strips comments from the input. A comment starts with a semi-colon ";" and continues until the next carriage return. Below are some examples of legal atoms:

(
)
^
HOUSE
<VOLTAGE>
→
{
}

The GET-ATOM routine itself is built around a software finite state machine. This state machine technique is used extensively in the parser. One important point is that atoms with reserved characters may be next to each other without any spaces in between. The state machine approach allows only the correct characters to be picked up, leaving remaining characters for the next atom When the host reads the input and sees that a new rule is to be compiled, it has to determine which processor the new rule's LHS's must enter. This is done by determining which rule processor has the smallest number of LHS's although other selection algorithms may also be employed. This is a simple form of load balancing. The number of LHS's is used because this is a better measure of the load that each rule processor has to handle than the number of rules in each processor. Once a rule processor is selected for the LHS's, the LHS compilation can proceed.

The LHS compilation requires that each LHS be parsed for syntax errors. As each LHS is being parsed, the host adds to the rule processor stream using the stream code mechanism discussed above in connection with host <> RP protocols. By sending a reduced representation of the rule LHS's to the rule processor, and by checking for the proper syntax at the host level, several important benefits are realized. First, the rule processor has a simplified representation, and is required to do no more parsing of the LHS. Second, the rule processor does not have to do any more syntax or error checking. The rule processor does have to read the input stream from the host and set it's own memory organization. This is important because the host has no knowledge about the internal memory organization of the rule processors. By using the "stream", complexity can be reduced by having a single interface between the host and the rule processors. It is important to note that this does not compromise speed in any way. During the actual execution of the OPS program, the host is sending information to all rule processors in parallel, and therefore cannot be responsible for slightly different location requirements in each processor. By sending the "stream" to the network buffer locations, which are identical for all rule processors, the host has no need to interfere with individual locations within each rule processor.

After the host reads the "→" delimiter between the LHS's and the RHS's, it will make sure that all information has been sent to the selected rule processor. It then reads each RHS and executes the compiler word for each RHS. This is done because different RHS's types will have different syntax. Each RHS compiler word, for example the code that parses MAKE statements, will parse the appropriate RHS and add code to a static frame within the host. All RHS code is kept within the host, and, thus, the rule processors are not concerned with the RHS code at all. The RHS execution code is added to the frame within the host for later execution when the rule fires. This code currently is executable FORTH code, but could alternately be machine code for enhanced speed.

RP Compiler

The rule processors are responsible for taking the reduced representation of the rule LHS's and actually converting it to executable code. This code is high-level FORTH code but may alternatively be machine coded for maximum speed. Keep in mind that the host has already done the syntax and error checking on the LHS's and no more checking is required by the rule processors The representation sent to the rule processors by the host is a tokenized representation. This is because the rule processors cannot assign tokens, as this is done only by the host. Also, if the rule processors did assign tokens, then conflicting token values might exist when several rule processors tried to assign different tokens to the same alphanumeric string. Another point to keep in mind is actually very simple. One of the reasons that the host does the error checking is that it has to send error messages to the user anyway.

The rule processors take the coded representation from the host and build multiple code filters for later use. There is one LHS filter for each LHS in a rule. These filters deal only with the literal (constant) items specified by the LHS. There is one rule filter for each rule in the system. It deals only with the variable bindings specified by the LHS. There are multiple entry points to the rule filter, one per LHS, that allow the counter code to efficiently execute the rule filter code without any wasted computation. A third filter type exists for convenience only. This is the precheck filter for each rule. The precheck filter will quickly check to see if the rule filter is even required. For example if there are not any entries on the list of a non-negated LHS, the rule cannot fire and it is unnecessary to go any further in the evaluation. Also, if there are any entries on the list of a negated LHS that has no variable bindings, then the rule cannot fire and there is no reason to pursue matters any further.

Examples of the filter code will be given later.

Host Run-time Code

The run-time code that executes on the host is responsible for actually firing the rules and then resolving the conflict between multiple processors that may have fireable instantiations.

When the recognize-act cycle starts, the host sends a message to all rule processors to "evaluate rules". This is done through the RP stream code mechanism discussed above. (See code B4 in FIG. 59.) Normally, stream codes are placed in a buffer local only to the host so that a double buffering arrangement can effectively allow the host and the rule processors to work simultaneously during large rule firings. However, the buffer is sent to the rule processors at this time and all on-line processors will start processing the information that has been sent by the host.

After the host sends the stream to the rule processors, it has nothing to do except to wait for the rule processors to complete their evaluation. Instead of simply waiting, the host will use it's time to speed the system up. When a rule fires, it may print messages on the display. This takes a certain amount of time at 9600 baud and therefore is buffered in the host memory during the rule firing. Only when the host knows it has nothing to do will it actually send the contents of this character buffer out the display device. So when a rule fires, any messages that it produces will not be printed until the next evaluation cycle. This is not an inconvenience to the user since the act of firing a rule is very quick and the next recognize cycle will immediately follow. This trick has given a noticeable speed improvement over a non-buffered character output.

After the host types any characters that were in the RAM buffer, then it simply waits for the rule processors to complete. Although not implemented herein, it is possible for the host to be scanning the rule processors to see if there were any that couldn't complete processing due to memory shortage or even a catastrophic hardware failure. The host could also be evaluating rule processor loads to see if the rules needed to be redistributed in any way to speed evaluation.

After the rule processors stop, then the host scans through the rule processors to resolve the conflicts between fireable rules. This is known as conflict resolution. Note that the host has to scan only through the number of rule processors and not the number of rules in the system since the rule processors perform local conflict resolution on the rules that they contain. Therefore the host is able to read from a designated area of each rule processor the most fireable rule of the potentially many rules that it may contain.

After the most fireable rule is found from among all the RP's, the host then executes the rule RHS code that was laid down by the RHS parser statements. The rule processors are affected by the MAKE, MODIFY, and REMOVE statements as they are executed on the host. The host also sends a message (code B8 in FIG. 59) to the rule processor that contains the LHS's for the rule that is about to fire. The rule processor interprets this message and takes the most fireable instantiation from the fireable list and places it on the not-fireable list. All other rule processors do not respond to this message. Any text that is output by the RHS firing actually goes to the host RAM character buffer. These characters will actually be output when the next recognize-act cycle begins or when the character buffer gets full. The actual firing of the rule currently runs the FORTH code that was laid down by the RHS compiler. Alternatively, machine code can be generated by the RHS compiler statements to give a faster execution time.

This now completes the part of the OPS recognize-act cycle that runs on the host. The rule processors exist for the speed improvement of the recognize portion of the cycle. Once the cycle is completed, it starts again. However, the next rule processor evaluation will evaluate the conflict set as affected by the actions of the previously fired rule. When all of the rule processors are not affected by the RHS actions and no rule has any fireable instantiations, then no more rules can fire and the system halts.

RP Run-time Code

The rule processors are responsible for accepting changes to the working memory in the form of MAKE's, MODIFY's, and REMOVE's from the host and determining the new conflict set for each rule. Since each rule is truly independent in this fashion, the parallel architecture can provide a significant speed advantage over a conventional serial computer architecture. Keep in mind that a MODIFY is a MAKE and REMOVE combined. Therefore, the rule processor code does not have any specific MODIFY code, but relies on the host to send the MAKE and REMOVE code, as specified, for example, in respective codes 90 and 98 of FIG. 59, to actually modify a working memory element.

For a MAKE command, the rule processor has to go through every LHS of every rule that it contains and determine whether or not the rule needs to accept the new working memory element. Most of the cases will be trivial and fail due to the class numbers not matching, but many LHS's will have to be evaluated further. This is done by using the LHS filter that was previously compiled when the rule was first loaded. The output of the LHS filter is a flag (see LHS.PF, screens 42) that signifies whether or not a particular working memory element satisfied the literal ( constant ) bindings specified by the rule LHS code. When the filter fails, nothing else needs to be done for a particular LHS and the evaluation code goes on to the next LHS in the rule processor. If the filter passes, then a working memory element identifier is added to the LHS list for a particular LHS. There is one list for each LHS in the system and each list contains entries that identify the working memory elements that match each LHS. The WME identifier is not the time-tag of the working memory element, but is the offset into the working memory element frame to uniquely identify where the working memory element is actually stored within the RP memory. This is done to achieve faster access to the working memory element.

Once a working memory element is added to the LHS list for a rule, the rule must be evaluated to determine whether or not any new instantiations have been created due to the new WME. For negated LHS's, instantiations may possibly be deleted from the fireable list. This is the reason for the "not-fireable" list. The not-fireable list exists in to permit quick additions back to the fireable list when the WME that prevents firing or matching a negated LHS is removed. When a new WME is added to a LHS list, then the counter code will "pivot" over this new WME. This means that only the new WME for a particular LHS will be examined for possible new matches. The other LHS's are not bound by this pivot position. In other words, all WME's on other LHS lists are examined for possible matches against the newly added WME. This can lead to millions of possible searches, which can take a long time. Fortunately, most of these matches are discounted for the following reason. If a WME does not match the bound variables of the combined WME's of the previous LHS's, then there is no need to go through possible combinations below it. This simple fact alone is a central key to other shortcuts. For example, the rule filter has an entry point for each LHS in the rule. If a match fails for a WME on a particular LHS, then the code can re-enter the filter at the same LHS but for another WME that may be on the list. An example of the counter-code rule-filter relationship will be shown later.

When a WME is deleted from a non-negated LHS list, it is simply removed from the list and both the fireable and not-fireable lists are scanned to determine if the WME was there also. If so, those entries with the WME to be deleted are removed.

Negated LHS's pose a very different problem. WME's that match a negated LHS are still added to the LHS list as in the non-negated LHS. However, the rule filter and the counter code are very different. When the counter gets to a negated LHS, it must scan through all entries in the list to make sure that there are not any WME's that match the rule to this point. If there are WME's that match, then these partial instantiations are added to the not-fireable list because they cannot fire. When the WME is deleted from the negated LHS, then this partial instantiation can possibly be added back to the fireable list without having to go through a full evaluation. The special case of negated LHS's will be shown in the example.

Figure 61:
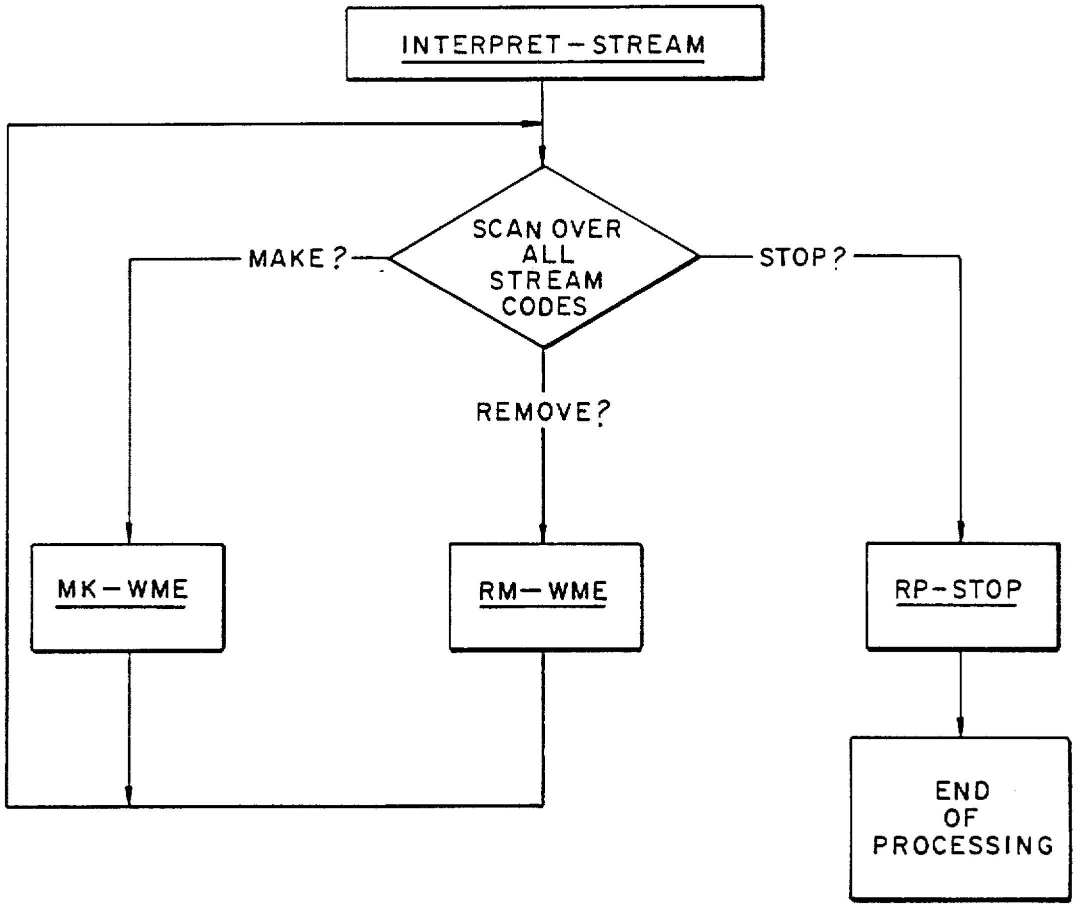

FIGS. 61–64 show some simple flowcharts of the rule processor run-time code. FIG. 61 shows a simple representation of the INTERPRET-STREAM word. This flowchart shows the INTERPRET-STREAM in relationship to MAKE and REMOVE commands. This word is actually table driven for speed. This following table is useful for locating the actual code in the program listings:

| Program | Screen | Function |
|---|---|---|
| LHS.PF | 3,4 | INTERPRET-STREAM table |
| LHS.PF | 5 | INTERPRET-STREAM code |
| RPPOLY.PF | 106 | RP-STOP word used for completion flag |

-continued

| Program | Screen | Function |
|---|---|---|
| LHS.PF | 42 | MK-WME used to make WME's |
| LHS.PF | 43 | RM-WME used to remove WME's |

Figure 62:
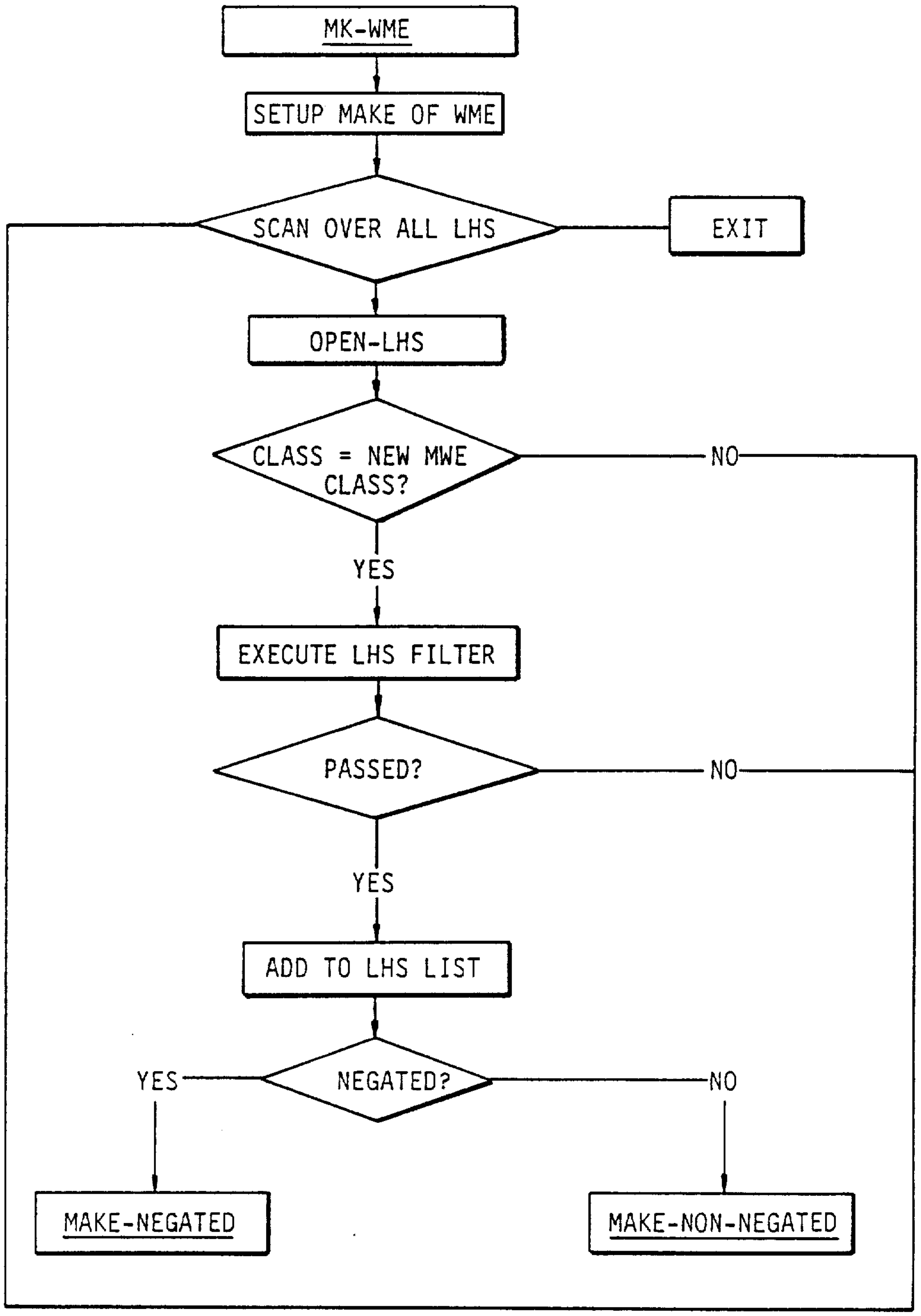

In FIG. 61, for example, the scanning over the stream codes is done by using screen 3 of LHS.PF which basically corresponds to FIG. 59. The MK-WME routine is illustrated in FIG. 62. The steps illustrated in FIG. 62 are found primarily in screen 42 of LHS.PF. Only a WME which can be used in a given LHS is stored and each LHS is scanned in turn in the scanning step. For each LHS, various pointers are set up in the OPEN-LHS step to speed-up memory access. Subsequently the class of each new WME is compared to classes present in the LHS, and if no classes match, the WME is not stored. If the new WME class does correspond to a class used in the rule LHS, then the LHS filter is executed and if passed, the WME is added to the rule processor LHS list. The treatment for WME's used in negated and non-negated LHS's is shown in FIG. 64.

Figure 63:
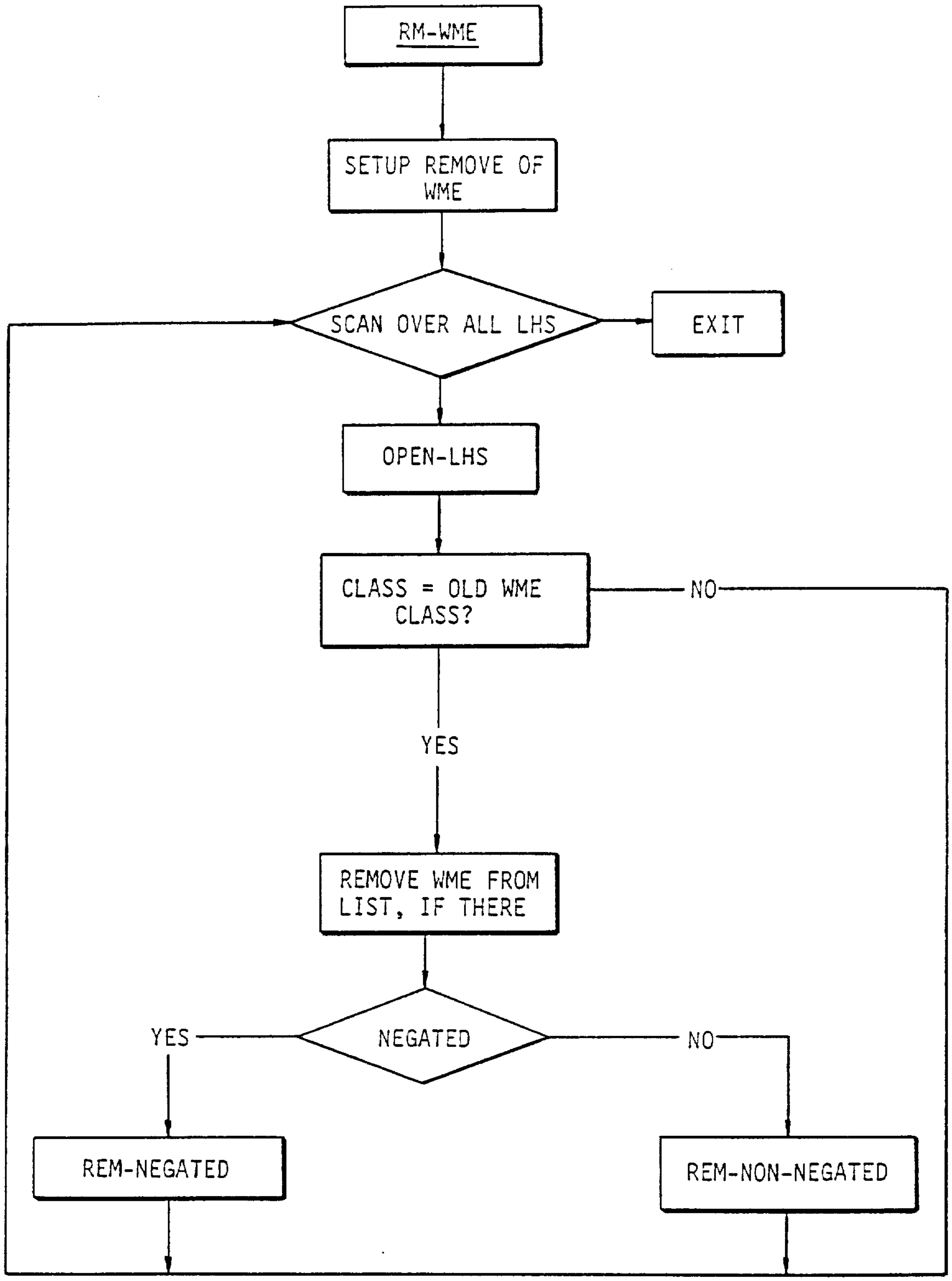

The flowchart for removing a WME is illustrated in FIG. 63 and is similar to that of FIG. 62. Screen 42 in LHS.PF shows the applicable program and again FIG. 64 applies to WME's used in rejected and non-negate LHS's.

EXAMPLES

A simple example is set forth to illustrate the AI machine details. The example is a single rule that is to find all blocks known to the system of a particular color and size that are not identical to any other block in the system. In other words, find all unique blocks in the system. The OPS literalize statements that may be used to define the WME structures are shown below:

```
(LITERALIZE GOAL
  WANT
  ID
  STATUS)
(LITERALIZE BLOCK
  COLOR
  SIZE
  NUMBER
  WEIGHT
```

The first literalize statement indicates that a GOAL may have three attributes, WANT, ID, and STATUS. The second literalize statement indicates that a BLOCK may have four attributes, COLOR, SIZE, NUMBER, and WEIGHT. The WEIGHT attribute will not be used in this example, but has been included to emphasis the memory organization for working memory elements.

The rule that will find all unique blocks known to a system is as follows:

```
(P        FIND_ALL_UNIQUE_BLOCKS
(GOAL      ^WANT TEST  ^STATUS ACTIVE)
(BLOCK     ^COLOR <COLOR>
           ^SIZE <SIZE>
           ^NUMBER <N>)
-(BLOCK    ^COLOR <COLOR>
           ^SIZE <SIZE>
           ^NUMBER <> <N>)
→
           (WRITE (CRLF) The system has found a
           <COLOR>block of size <SIZE>))
```

Note that this rule does not really do anything in the RHS except for printing a message. Normally, when a rule fires, it will affect working memory elements in the system by MAKE, MODIFY or REMOVE statements. In this manner, incremental facts can be found and subsequently acted upon.

Now assume that some other rule in the system has made certain working memory elements to be used in this example. Actually, the working memory elements can be made by a rule, loaded from a file, or made by the user from the keyboard. The working memory elements are listed below and include time-tag information (specified by the number before the colon).

| | | | |
|---|---|---|---|
| 3: (BLOCK | ^COLOR RED | ^SIZE MEDIUM | ^NUMBER 3) |
| 4: (BLOCK | ^COLOR BLUE | ^SIZE LARGE | ^NUMBER 4) |
| 6: (BLOCK | ^COLOR RED | ^SIZE MEDIUM | ^NUMBER 6) |
| 9: (BLOCK | ^COLOR BLUE | ^SIZE HUGE | ^NUMBER 9) |
| 10: (BLOCK | ^COLOR RED | ^SIZE HUGE | ^NUMBER 2) |
| 11: (BLOCK | ^COLOR RED | ^SIZE MEDIUM | ^NUMBER 10) |
| 12: (BLOCK | ^COLOR BLUE | ^SIZE SMALL | ^NUMBER 12) |
| 14: (BLOCK | ^COLOR BLUE | ^SIZE SMALL | ^NUMBER 11) |
| 16: (BLOCK | ^COLOR RED | ^SIZE LARGE | ^NUMBER 15) |
| 17: (BLOCK | ^COLOR RED | ^SIZE HUGE | ^NUMBER 8) |
| 18: (GOAL | ^WANT TEST | ^STATUS ACTIVE) | |

FIG. 65 gives a simple representation of how the filters are set up by the rule processors. The LHS #1 filter checks for the literals and returns a false flag if the literal conditions are not met. FILTER.PF, screens 17, 32 and 33 are the relevant compilation codes whereas LHS.PF, screen 42 is the relevant execution code. In this example, the value of WANT must equal "TEST". If it does not, then the filter exits with a false flag. Likewise, the value for STATUS must equal "ACTIVE" or the filter will also exit with a false flag.

Note that the LHS #2 and LHS #3 filters are both trivial since the second and third LHS's did not specify any literal comparisons. Therefore, both filters will accept any working memory elements that are of the proper class.

The precheck filter is simply a convenience for allowing a quick check to be performed to allow the code to determine if the rule filter needs to be executed. In this example, the precheck filter makes sure that the first and second LHS's have at least one entry on their lists (see FIG. 67). If there were not any entries, then the rule simply could not fire and therefore the code will not go any further on this rule. Negated LHS's are different for two reasons. Notice that there is no check for the third LHS because it is negated. The rule could still fire even though there are not any WME's on the third LHS list. Another reason for the negated LHS difference is that the precheck filter can check negated LHS's that have no variable bindings. A WME that is on the list of a negated LHS with no variable bindings will also keep the rule from firing.

It is in the rule filter that variable bindings and thus the relationships between WME's will become important As stated before, the rule filter has as many entry points as there are LHS's in the rule. In the example, notice that the first entry point opens the WME for the first LHS. This means the counter position for this LHS is read and the address of the actual WME (shown in FIG. 66) is stored for quick access. Since the rule has no variable bindings on the first LHS, nothing else is done. The second LHS is then opened to allow the variables specified to be bond. Notice that no variable names are kept on the rule processors. Only variable numbers are kept within the rule processors and these numbers actually represent the offset from the variable binding table. Each variable entry in the table takes four bytes since everything is kept as a four byte token. Notice that LHS #3 is different because it is negated. Its structure allows the counter to know that the LHS is negated because the counter has to go through all entries of a negated LHS to make sure that there are no WME's that satisfy the negated LHS for currently bound variables. The codes 1, 2 and 3 shown in the rule filter are set forth in screen 77 of LHS.PF.

FIG. 66 shows the representation of the working memory elements. This structure exists both on the host as the global working memory and on the rule processors as the local working memory. The main LHS list contains four bytes for each working memory element that has ever been made. If a working memory element is deleted, then it's entry is filled with −1 ( FFFFFFFF hex ) to signify that it has been deleted. When a WME does exist in the table, the most-significant byte contains the class number of the WME. Since GOAL was literalized first, then it 1 since it was literalized next. The next three bytes in the main WME list are the 24 bit offset within the WME frame. Once a WME is placed in the WME frame, it can never be moved within the frame. Otherwise this offset within the WME frame would have to be changed. The WME list is a dynamic frames since it grows dynamically during system operation.

The WME frames for GOAL and BLOCK are shown at the top of FIG. 66. The first four byte cell is used to keep the WME number, otherwise known as the time-tag. Then the values for the attributes are listed in the order defined by the literalize statement. If a WME does not have a value assigned to a particular attribute when it is made, then it is assigned a token value of 0, which is NIL. As multiple WME's are added to a given class, the WME frame is extended to allow more room for the simple array. When a WME is deleted, the code checks to see if it was the top WME of the frame. If so, then this memory is returned to the memory manager. If not, then a linked list is created where the WME# would normally be. The links are offsets to other blank WME entries. When a new WME is created, then the link is checked to see if there are any free entries. Only when there are not any free entries will the system add more WME entries to a WME frame. Notice the single four byte cell at offset 0. This exists primarily for tee linked list code to make sure that there are not any WME's that have an offset of 0. The WME frames are dynamic frames to the memory manager since they grow and shrink dynamically.

One can now examine a single WME. WME #11 says that there is a BLOCK of COLOR RED, SIZE MEDIUM and NUMBER 10. Looking at the main WME list, at position 11, we see the hex number 010000CC. The 01 refers to the BLOCK class and the 0000CC is the offset within this class. Now looking at the 0000CC offset in the BLOCK WME list, we see an 11 for the WME number. This is a redundant reference to the WME number that exists for coding convenience only. Scanning across the 0000CC row, the COLOR position is listed as being RED, the SIZE position is listed as being MEDIUM and the NUMBER is listed as being 10. Notice that the weight attribute was not specified, so this position is given the value NIL, represented by 0.

FIG. 67 shows the LHS lists for each of the three LHS's in this example rule. The static frames show how the filter code is stored. There is an eight byte header that comes before the filter code. Of this header, the first four bytes are used to hold a handle to the actual LHS list. The symbols to the left of the LHS lists signify that this is a double indirect memory reference as mentioned in the explanation of the memory management routines. FIG. 65 shows that LHS #2 and LHS #3 have trivial filters. Thus the filter code diagram in FIG. 67 is shorter for the last two LHS's in the rule. An important point is that the filter code need be only as long as required by the associated LHS's. With the WME's as given in the example, the upper portion of FIG. 67 shows the LHS lists for each LHS. Notice that the WME offsets shown in FIG. 66 allow fast·access to the actual WME. Again the lists for LHS #2 and LHS #3 happen to be the same since there were no literal conditions placed on the WME's for the last two LHS's. It is noted that FIGS. 66 and 67 show the memory organization as it occurs in memory. For example, LHS #1 was defined first, so it comes lower in memory. Thus the drawing is consistent with what the code actually does.

FIG. 68 shows an abstract representation of what the counter code has to do. Notice that LHS #1 is at the top of these diagrams. A, B, and C refer to the block example set forth above. D will be used to make a general point that is not otherwise covered in this block example. When the counter first starts, it begins at the head of each list as shown in A. For negated LHS's, the counter must cover all entries. B shows the counter at a later time. The counter here must also go through all negated LHS's. The counter continues, as shown in C and keeps on going until the end is reached.

Letter D in FIG. 66 does not relate to the "block" example, but suggests other points. In this diagram, the code "pivots" over a newly added entry (WME) in the second LHS. All other LHS's must be checked against this LHS. The light, wider arrows indicate where a self consistent match has been found between working memory elements and the LHS's while the dark, thinner arrows indicate where tests had to be made but the working memory elements were found to be inconsistent. When the counter first starts, its checks the first WME on the list for LHS #1 against the single WME at the end of LHS #2 that is being pivoted upon. Neither the first or the second entries on the list for LHS #1 consistently satisfy the variable bindings implied by the WME on LHS #2, so the counter code knows not to go further down the filter. The counter finally finds that the third entry on the list of LHS #1 does satisfy the bindings at the pivot point of LHS #2, so the filter can examine the next LHS. On LHS #3, the counter starts at the first entry and continues across finding that the forth entry is the only one that matches with the established variable bindings. Therefore, the filter continues to LHS #4, forcing the counter to start at the head of the list and continue to the right until all entries are tested. In this example, three entries are found to match on LHS #4. Since this is the end of the rule, three self consistent sets are added to the fireable list. Note that after these three sets are found, the counter starts working its way back up. For example, it would then test the last two entries on LHS #3 and finally the last entry on the list for LHS #1.

At this point one can see where the filter and counter complexities give a speed benefit. The counter and filter code are invoked 19 times in this simple example. If the counter code and filter code were not as versatile and only had one filter entry point for example, then the code would have been executed 4 * 6 * 9 times, or 216 times to pivot on the last entry for LHS #2.

Going back to the simple "Find Unique Block" example, one can see the fireable and not-fireable list for the sample rule in FIG. 69. Both the fireable list and the not-fireable lists are dynamic frames to the memory manager. Again, this is to allow the frames in memory to grow and shrink dynamically. The fireable list has to contain the time tags for the set of WME's that match the rule. This list is in the order of the WME's. The second half of the fireable list is a sorted version of the instantiation time-tags. This is used by the routine that sorts the instantiations as they are entered on the fireable list. The fireable list width is the number of LHS's in the rule times 8 bytes. Note that the fireable list is sorted in order of fireability. Therefore the instantiation at the top of the list is the most fireable instantiation.

Looking at the fireable list for the example, one can see that the instantiation on the top is the ordered set ( 18 16—). This means that the WME that matches the first LHS has a time-tag of 18. The WME that matches the second LHS has a time-tag of 16. Note that since the third LHS is negated, nothing can match the third LHS if the rule is to be fireable.

The not-fireable list is kept only for rules that have a negated LHS. The main function of the not-fireable list is to facilitate the quick return of instantiations to the fireable list when a WME is deleted from a negated LHS list. The sorted time-tags are not kept for the not-fireable list for two reasons. One is to save memory The other is because an entry in the not-fireable list may be a partial instantiation. For example, if an instantiation could not fire because the filter found a WME on a negated LHS list that satisfied the variable bindings, then this partial instantiation is added to the not-fireable list. Thus, LHS's lower than this are not checked, forming an incomplete instantiation. Only when the WME is removed that prevented the rule from firing will the counter pick back up from this point and find possible instantiations.

Looking at the not-fireable list for the example, one can see that there are 10 partial instantiations that are not-fireable. In order for a partial instantiation to be put on the not-fireable list, a WME has to exist that can match a negated LHS. This list is not sorted as the fireable list and always represents the order in which the not-fireable partial instantiations are found. The fifth entry from the bottom on the not-fireable list in this example is (18 10 17). Since a 17 is in the negated LHS #3 position, this instantiation cannot fire because a WME with a time-tag of 17 exists. The entire purpose of the not-fireable list is to be able to quickly transfer an instantiation back to the fireable list when the WME that satisfies the negated LHS is removed. Thus in this example, when WME #17 is removed, the ( 18 10—) instantiation will go back to the fireable list.

When the rule processors are told to evaluate the rules, (code B4 of FIG. 59) they scan through all of the fireable lists of all rules that they contain. The rule processors perform a local conflict resolution on all fireable rules and then store the most fireable instantiation of the most fireable rule for access by the host.

FAULT MONITORING

The architecture described herein permits a fault monitoring system by the host of all of the rule processors. The host may simply transmit a unique code in a network fashion to all of the rule processors and then subsequently read the code to determine if it has been received and stored correctly. The BOOT command in screen 106 of the program RPPOLY.PF is utilized for this purpose wherein the code is simply "1 2 3 4". This technique provides the lowest level of fault tolerance wherein if a processor is not connected, the processor will simply be ignored when the host allocates rules to the various processors which are connected. In the RPPOLY.PF program, the test utilizing the boot command is made only during start up but the program could alternately be modified to periodically check operation of each rule processor.

In the following appendix, each program listed in the beginning of the software description above is identified by its name appearing at the bottom of the page. Within each program, the screen numbers in the lefthand column inc in ascending order beginning at one, with the shadow screens, used for comments, also increasing in ascending order but beginning with the next integer after the highest lefthand column screen number.

APPENDIX

Screen # 0

```
( PolyForth Level 4 - AI Machine System )       ( PLB*01/16/86)
HOST System Version
Update Records :

<01> 10/03/85 PLB  -  Initial Transfer from Forth Inc.
                        Original Disks.
<02> 10/07/85 PLB  -  Start of conversion to CP/M System.
<03> 11/09/85 PLB  -  Replaced STRAIGHT vector with KEY vector
<04> 12/01/85 PLB  -  Added ?TERMINAL and its own USER vector
<05> 01/06/86 PLB  -  Start of Rule Processor FORTH
                        configuration.
<06> 01/15/86 RFS,PLB  -  Convert kernel to full name field.
                            Also added VIEW field to kernel.
<07> 01/29/86 PLB  -  Added 'ABORT vector
```

Screen # 1

```
$ Load Screen for Forth, Inc. Standard Extensions( PLB*12/14/86)
   $ Screen 10 contains the original PolyForth Load Screen.
   $   The FORTH, Inc PolyForth revision date is on this screen.
DECIMAL     START-SEGMENT .( ==> Host PolyForth Extensions)

4 9 THRU            $ Misc. PolyForth Extensions
15 LOAD             $ ON/OFF words
14 LOAD             $ ?WAIT, CTRL-Y
20 LOAD             $ Diagnostic Aids
27 LOAD             $ High-level within a code word
11 13 THRU          $ Multitasker Support
29 30 THRU          $ *wFILL, *LFILL, *WMOVE, *LMOVE
35 LOAD             $ Bit array set, clear, and test words
36 LOAD             $ CASE statement
37 LOAD             $ ARRAY allocation
END-SEGMENT
```

Screen # 2

```
$ Load Screen for more PolyForth Extensions     ( PLB*10/25/86)
$ For HOST only !!!!!
DECIMAL

START-SEGMENT  .( ==> Misc. Forth Extensions)
$ ******21 21 MAC/SBE  LOAD           $ SHOWC
21 22   THRU                   $ SHOWC
25 LOAD                        $ Printer Task Support
26 LOAD                        $ DUMP routine
28 LOAD                        $ TAB-ALIGN
34 LOAD                        $ Macro Support
END-SEGMENT
```

Screen # 3

```
$ Load Screen for Rule Processor Extensions     ( PLB*12/14/86)
DECIMAL
START-SEGMENT   .( ==> RP PolyForth Extensions )
    29   30     THRU     $ *WFILL, *LFILL, *WMOVE, *LMOVE
    35          LOAD     $ Bit array set, clear, and test words
    4    9      THRU     $ Misc. PolyForth Extensions
    15          LOAD     $ ON/OFF words
    14          LOAD     $ ?WAIT CTRL-Y
    20          LOAD     $ Diagnostic Aids
    26          LOAD     $ DUMP routine
    27          LOAD     $ High-level within a code word
    34          LOAD     $ Macro Support
    36          LOAD     $ CASE statement

  END-SEGMENT
```

Screen # 4

```
  ( Dictionary management)                        ( PLB*10/07/95)
CODE U< ( u u - t)   S )+ RL MMOV DO D1 \\   S -) CLR
  DO D1 SUB   2 S) ROXL   NEXT
: IMMEDIATE   32768  LAST @ @ 4+  W+! ;
: [COMPILE]   ' 4- , ;   IMMEDIATE

: 'HEAD ( - a)   -' ABORT" ?"  SWAP DROP  ( B/H) 2- ;
: CAN'T ( t)   ABORT" Can't" ;

: FORGET   'HEAD  DUP 'S  H 4+ @  WITHIN  CAN'T H !
  CURRENT  CONTEXT 2+ DO  I BEGIN @  DUP 'S HERE
   WITHIN UNTIL  I !  4 /LOOP ;
```

Screen # 5

```
 ( Programmer aids)                               ( PLB*01/17/86)
: ~   31 WIDTH C! ;          : RECOVER   -4 ALLOT ;

: $IN ( AC-) SWAP DUP >R 1+ SWAP EXPECT  CNT C@ R> C! ;

$ WMOVE is like CMOVE and MOVE except it moves by 2 bytes
CODE WMOVE   S )+ RL MMOV DO \ AO A1 \\
     1 # DO LSR   1 #Q DO SUB   0< NOT IF
  BEGIN   A1 )+ AO )+ W. MOV   DO DBRA   THEN   NEXT
```

Screen # 6

```
 ( Double word access)                            ( PLB*01/07/86)

CODE 2W@ ( a - n n)   S )+-W MOV   W ) RL W. MMOV AO A1 \\
   RL S -) MMOV AO A1 \\   NEXT

CODE 2W! ( n n a)   S )+ AO MOV   S )+ RL MMOV DO D1 \\
   RL AO ) W. MMOV DO D1 \\   NEXT

$ WFILL ( a n word -)
$ CODE WFILL   S )+ DO MOV   S )+ D1 MOV    S )+ AO MOV
$    1 # D1 LSR                $ 1 #Q D1 SUB
$ $   BEGIN  DO AO )+ W. MOV   D1 DBRA    NEXT
$     BEGIN  DO AO )+ W. MOV  1 #Q D1 SUB  0= UNTIL  NEXT

512 1024 * CONSTANT 512K
```

Screen # 7

```
 ( Mixed arithmetic)
```

```
CODE M*/ ( n n n - n)
   S )+ RL MMOV D0 D1 \\   S )+ RL W. MMOV D2 D3 \\
   D3 D4 MOV   D1 D4 MULU   D4 D6 W. MOV   D4 W. CLR   D4 SWP
   D2 D5 MOV   D1 D5 MULU   D4 D5 ADD
      D2 TST   0< IF   D5 SWP   D1 D5 W. SUB   D5 SWP   THEN
      D1 TST   0< IF   D2 SWP   D3 D2 W. MOV   D2 D5 SUB   THEN
   D0 D3 W. MOV   0< IF   D0 W. NEG   THEN
   D5 TST   0< IF   D0 SWP   D0 D5 ADD   D0 SWP   THEN
   D0 D5 DIVU   D5 D4 W. MOV   D5 SWP   D6 SWP   D5 D6 W. MOV
    D6 SWP   D0 D6 DIVU   D4 SWP   D6 D4 W. MOV
   D3 W. TST   0< IF   D4 NEG   THEN   D4 S -) MOV   NEXT
```

Screen # 8

```
   ( String and character operators)
CODE -TEXT ( a n a - n)   S )+ A0 MOV   S )+ D0 MOV
   S )+ A1 MOV   2 # D0 ASR   BEGIN   A1 )+ A0 )+ CMP   0= IF
      1 #Q D0 SUB   SWAP 0= UNTIL   ELSE
   CS IF   -1 # D0 MOV   ELSE  1 # D0 MOV   THEN   THEN
      D0 S -) MOV   NEXT

: <TEXT ( a n a - n)   -TEXT 0< ;

: TEXT ( c)   PAD 72 BLANK  WORD COUNT  PAD SWAP <CMOVE ;

CODE 2OVER ( d d - d d d)     8 S) D0 MOV    12 S) D1 MOV
   RL S -) MMOV  D0 D1 \\    NEXT
```

Screen # 9

```
   ( Miscellaneous extensions)                    ( PLB*04/08/86

CODE >< ( n - n)   S )+ D0 MOV   8 # D0 W. ROR   D0 S -) MOV
   NEXT
CODE >W< ( n - n)   S ) D0 MOV   D0 SWP   D0 S ) MOV   NEXT
: assign ( a)   BEGIN  R> 4+ SWAP ! ;
: ASSIGN   COMPILE assign  COMPILE [ 4- @ , ] ;   IMMEDIATE
: RECURSE   LAST @ @ 4+ 4+ , ;   IMMEDIATE

: .S   DEPTH  DUP 0< ABORT" Underflow"  CR  IF
  'S  S0 @ 4- 4- DO  I ?  -4 +LOOP  THEN  ." <-Top " ;
: "   34 WORD DROP ;  IMMEDIATE

: dotM"   1 ?R@ COUNT MARK ;
: .M"     COMPILE dotM"  34 STRING ;  IMMEDIATE
: M-EMIT ( c-)  'S 3 + 1 MARK DROP ;
```

Screen # 10

```
: <CREATE>   BLK W@ 16 *  >IN W@ 64 /  + W, (CREATE) ;
   ' <CREATE>  'CREATE !  -2 WCONSTANT B/H ( 0 if no VIEW)

( Aids)  14 LOAD  13 LOAD  10 LOAD   ( Exceptions)  12 LOAD
( Extensions)  18 21 THRU   ( Editor)  29 LOAD
( Calendar)  31 LOAD   ( Clock)  15 16 ( OKI  17) THRU
( Disk error reporting)  33 LOAD
: SYSTEM   11 DATED  SPACE  @TIME .TIME ;
: HELP   SYSTEM ;   HELP
( Terminals)  24 25 THRU   ( Serial printer  27 LOAD)

GILD
*** This screen was the original FORTH Inc. Screen 9 **********
***************************************************************
( polyFORTH/32 Level 4  19 June 1985)
```

Screen # 11

```
   ( Task definition)
: HIS ( a a - a)   STATUS -  SWAP @ + ;

: BACKGROUND ( u s r)   CREATE  OVER +
   DUP HERE 4+ + ,  SWAP HERE + ,  + 4- ALLOT ;

: BUILD ( a)   DUP 4+ @  SWAP @  STATUS OVER 6 CMOVE
   DUP STATUS 2+ !  10 + ! ;

: U0) ( a)   [ ASSEMBLER ]  STATUS - 0) ;

CODE ACTIVATE ( a)   S )+ A0 MOV   A0 ) A0 MOV   CTR U0) W. CLR
   WAKE #W A0 ) MOV   S0 U0) A1 MOV   A1 -) CLR   A0 A1 -) MOV
   I A1 -) MOV   A1 S0 4- U0) MOV   ' EXIT AB JMP
```

Screen # 12

```
   ( Terminal Tasks)                              ( PLB*12/07/85)
$ : TERMINAL   CREATE  26 LOAD ;

: CONSTRUCT ( a)   STATUS OVER @ 256 MOVE  DUP BUILD
   DUP 4+ 4+  SWAP  'CR HIS  36 MOVE ;

: PROMPT ( a)   ACTIVATE   DECIMAL  DISK RELEASE  EMPTY
    CR ." PolyForth CP/M-68K" CR  QUIT ;   RECOVER

: SEND ( a)    S0 @ OVER  S0 HIS @ 80 MOVE
     BASE OVER  BASE HIS  48 MOVE  >IN W@ CNT W!
     ACTIVATE   DISK RELEASE  INTERPRET  ABORT ;
$ SEND was modified to take out the OFFSET move ( now '?TERM)
```

Screen # 13

```
   ( Terminal Parameters)   DECIMAL                 ( PLB*01/29/86)
$ TASK: is modified from screen 26
$      Since the image can be saved and to prevent (CR) etc.
$      from being redefined, this TASK: word requires that
$      the vectors be filled in seperately.

: TASK:  ( size  TASK: name)
   CREATE
   DUP 256 ( user area) -  HERE +  ( user address)  DUP ,
   176  ( return + input)  -  ( S0) ,
   28 ALLOT ( terminal vectors)
     $ ' (CR) ,  ' (PAGE) ,  ' (TAB) ,  ' (MARK) ,
     $ ' (TYPE) ,  SWAP ( device) ,  ' (EXPECT) ,
   HERE 32 - DUP ( H's) , ,   ( 40) 44 - ALLOT GILD ;
```

Screen # 14

```
( Diagnostic Aids                                  ( PLB*04/19/87)
VARIABLE CTLY-VEC    VARIABLE ?CR-STATE    ?CR-STATE OFF
VARIABLE CTRL-C-FLG  CTRL-C-FLG OFF      CTLY-VEC OFF
VARIABLE ?SP-STATE    ?SP-STATE OFF   : OR! DUP >R @ OR R> ! ;
: ?CR C# W@ IF CR THEN ;   : ?USER-ABORT IF ?CR-STATE OFF
  ?SP-STATE OFF CTLY-VEC @EXECUTE ?CR 128 EMIT ( +REV) ." User A
bort !!"  132 EMIT ( -REV) CR CTRL-C-FLG OFF ABORT THEN ;
: WKEY ( -c)  KEY  127 AND  DUP 25 = ?USER-ABORT DUP 3 =
 CTRL-C-FLG OR! DUP 13 = ?CR-STATE ! DUP 32 = ?SP-STATE OR! ;
: CTRL-Y   ?TERMINAL IF WKEY DROP THEN ;
: CTRL-C   CTRL-Y CTRL-C-FLG @ ?USER-ABORT ;
: ?WAIT  ?CR-STATE @ IF BEGIN ?TERMINAL UNTIL THEN
    ?SP-STATE @ IF WKEY DROP ?SP-STATE OFF ELSE
    ?TERMINAL IF ?CR-STATE @ NOT WKEY DROP ?SP-STATE @ AND
    IF WKEY DROP ?SP-STATE OFF THEN THEN THEN ;
: ?CWAIT ?WAIT CTRL-C-FLG @ ?USER-ABORT ;
```

Screen # 15

```
$ ON/OFF words                                     ( PLB*10/30/86)
CODE ON          S )+ A0 MOV 1 #Q D0 MOV D0 A0 ) MOV ,NEXT
CODE OFF         S )+ A0 MOV 0 #Q D0 MOV D0 A0 ) MOV ,NEXT
CODE TALLY       S )+ A0 MOV 1 #Q A0 ) ADD ,NEXT
CODE DOCK        S )+ A0 MOV A0 ) D0 MOV
                       1 #Q D0 SUB D0 A0 ) MOV ,NEXT

CODE 2TALLY      S )+ A0 MOV 2 #Q A0 ) ADD ,NEXT
CODE 4TALLY      S )+ A0 MOV 4 #Q A0 ) ADD ,NEXT

CODE W-ON        S )+ A0 MOV 1 #Q D0 MOV D0 A0 ) W. MOV ,NEXT
CODE W-OFF       S )+ A0 MOV 0 #Q D0 MOV D0 A0 ) W. MOV ,NEXT
CODE W-TALLY     S )+ A0 MOV 1 #Q A0 ) W. ADD ,NEXT
CODE W-DOCK      S )+ A0 MOV A0 ) D0 W. MOV
                       1 #Q D0 SUB D0 A0 ) W. MOV ,NEXT
```

Screen # 16

```
   ( Clock)   HEX                                   ( PLB*10/07/85)
CODE +CLOCK   NEXT
CODE -CLOCK   NEXT     DECIMAL
24 60 *  T/SEC 60 *  * CONSTANT T/DAY
: EST ( hh:mm)   -CLOCK  100 /MOD 60 * +
   T/SEC 60 *  *  TICKS !  +CLOCK ;
: (TIME) ( n - a n)   <# #  6 BASE W! #  58 HOLD
   DECIMAL # # #> ;
: @TIME ( - d)   -CLOCK T/DAY  TICKS @  BEGIN  OVER -  DUP
   0< NOT WHILE  1 TODAY W+!  REPEAT  +  DUP TICKS !  +CLOCK ;
: .TIME ( n)   T/SEC 60 * /  (TIME) TYPE SPACE ;
CODE COUNTER ( - n)   TICKS AB S -) MOV   NEXT
: TIMER ( n)   COUNTER SWAP -  1000 T/SEC */  . ;
: MS ( n)   T/SEC 1000 */  COUNTER +
   BEGIN  PAUSE  DUP COUNTER < UNTIL  DROP ;
```

Screen # 17

```
   ( Calendar - days since 1 JAN 1900)
365 4 * 1+ CONSTANT D/Y   VARIABLE JAN0   VARIABLE LEAP
: MTH   WCONSTANT DOES>  W@ 58 OVER <  LEAP @ * +  JAN0 @ + + ;
  0 MTH JAN      31 MTH FEB      59 MTH MAR      90 MTH APR
120 MTH MAY     151 MTH JUN     181 MTH JUL     212 MTH AUG
```

```
243 MTH SEP     273 MTH OCT     304 MTH NOV     334 MTH DEC
: A.D. ( n)   1897 -  D/Y 4 */MOD  1096 - JAN0 !  3 = LEAP ! ;
: .YR ( n - n n y)   4 D/Y */MOD  1900 + SWAP  4 /MOD 1+
   DUP ROT 0= IF  DUP 60 ) -  SWAP DUP 59 ) -  THEN ROT ;
: .MTH ( n - n a)  ['] JAN 11 0 DO  2DUP B/H 14 + + W@ >IF  B/H
   14 + + 1 ELSE 11 THEN /LOOP  SWAP DROP DUP 8 - >R  W@ - R> ;
: (DATE) ( n - a n)   <# .YR  # # # #  DROP  32 HOLD  .MTH
     -3 PTR +!  COUNT  PTR @ SWAP CMOVE  32 HOLD  #S #> ;
: .DATE ( n)    (DATE) TYPE  SPACE ;    : NOW ( n)    TODAY W! ;
: DATED ( n)    HELPS  TODAY W@  ?DUP IF  .DATE  ELSE
   ." not yet entered. " THEN ;
```

Screen # 18

```
  ( Calendar, days since 1/01/00)
HERE 2-  0 W, 31 W, 59 W, 90 W, 120 W, 151 W, 181 W, 212 W,
   243 W,  273 W, 304 W, 334 W, 367 W,
: MTH ( i - a)   2* LITERAL + W@ ;      365 4 * 1+ CONSTANT D/Y
: M/D/Y ( d - n)   100 /MOD  SWAP >R  100 /MOD  MTH 31 OVER < IF
   I 3 AND 0= + THEN +  R> 3 + D/Y 4 */MOD SWAP DROP + 1096 - ;
: NOW ( m/d/y)    M/D/Y  TODAY W! ;
: Y-MD ( n - ny nd nd)    4 D/Y */MOD  SWAP 4 /MOD 1+
   DUP ROT 0=  IF DUP 60 ) -  SWAP DUP 59 ) -  THEN ;
: MD ( n n - m d)    1 BEGIN  1+  2DUP MTH > 0= UNTIL  1 -
   SWAP DROP SWAP  OVER MTH - ;
: (DATE) ( n - a n)   Y-MD  ROT  <#  # #  DROP  47 HOLD
   MD  # #  DROP  47 HOLD   #S  #> ;
: .DATE ( n)    (DATE) TYPE  SPACE ;
: DATED ( n)    HELPS  TODAY W@  ?DUP IF  .DATE  ELSE
   ." not yet entered. " THEN ;
```

Screen # 19

```
( Program Documentation)   EMPTY   DECIMAL
: HELP   41 DATED  ."  Time "  @TIME .TIME ;   HELP
: LINE ( n n)    BLOCK +  64 -TRAILING >TYPE ;
: C   ."      FORTH, Inc. Proprietary    "  TODAY W@ .DATE
   @TIME .TIME   960 39 LINE  CR ;

: INDEX ( f l)    DUP ROT DO  PAGE  DUP I 60 + MIN  I DO
      CR  I 10 U.R SPACE  8 I < IF  I BLOCK W@ IF  0 I LINE
   THEN THEN LOOP  CR CR C  60 +LOOP DROP ;

: TRIAD ( n)    9 MAX  PAGE CR CR  3 / 3 *  DUP 3 + SWAP DO
      I 7 U.R ."  LIST"  CR  I BLOCK W@ IF  I  16 0 DO
         CR  I 10 U.R SPACE  I 64 * OVER LINE  LOOP DROP  3
      ELSE 19  THEN  0 DO CR LOOP LOOP  C ;

pF32-68K1A/0B-8P  polyFORTH/32
```

Screen # 20

```
$ Diagnostic Aids                                  ( PLB*11/15/86)

$ : BINARY 2 BASE W! ;
: ?CREATE  CTRL-Y >IN W@ -' NOT IF 0 ALLOT CR HERE 4+ COUNT TYPE
      ."  redefined in " .PFFILE  ." , Screen # "
      BASE W@ DECIMAL BLK W@ . BASE W! DROP CR THEN
      DROP >IN W! (CREATE) ;
: -TWINS      ['] (CREATE)      'CREATE ! ;
: +TWINS      ['] ?CREATE       'CREATE ! ;     +TWINS
```

Screen # 21

```
( SHOWC compact screen printer )                   ( PLB*12/06/86)
HEX   ( FOR IMAGEWRITER)
: DWIDTH 1B EMIT 4E EMIT  0E EMIT ;
: -DWIDTH  OF EMIT 1B EMIT 4E EMIT ;
: ESC-SEQ ( n -) 1B EMIT EMIT ;
: COMP 51 ESC-SEQ ;                    : -CMP 4E ESC-SEQ ;
: EMPH 21 ESC-SEQ ;                    : -EMPH 22 ESC-SEQ ;
: +PUL 58 ESC-SEQ ;                    : -PUL   59 ESC-SEQ ;
: .BANNER  -CMP EMPH CR CR 9 SPACES ." PolyFORTH CP/M-68K"
   10 SPACES  TODAY W@ .DATE 2 SPACES @TIME .TIME
   6 SPACES .PFFILE -EMPH COMP PAGE ;
: .SCR#   ." Screen # " ;
: .BLK# ( n-)  CR  9 SPACES  -CMP DWIDTH EMPH
   +PUL .SCR# DUP 3 U.R -PUL  8 SPACES +PUL .SCR#
   SHADOWS IF  (Q)  ELSE  1+ THEN  3 U.R -PUL
   CR -DWIDTH COMP -EMPH CR ; DECIMAL
```

Screen # 22

```
( SHOWC compact screen printer )                   ( PLB*12/05/86)
HEX   ( FOR IMAGEWRITER)
: SHOWC ( from to --)  DECIMAL 2DUP > IF 2DROP EXIT THEN
     0 ROT ROT 1+ SWAP 63 ESC-SEQ ( RESET) 42 ESC-SEQ ( 8 LPI)
     DO I .BLK#  I SCR ! ( STORE WHERE WE ARE)   HERE 83 BLANK
     400 0 DO
        J  ( LEFT SCREEN)
        BLOCK I + HERE 40 CMOVE
        SHADOWS IF J (Q)  ELSE J 1+ THEN
        BLOCK I + HERE 43 + 40 CMOVE
        5 SPACES   HERE 83 -TRAILING TYPE CR
     40 +LOOP
     1+ DUP 4 = IF DROP 0 .BANNER THEN
     SHADOWS IF 1 ELSE 2 THEN  ( INCREMENT 1 FOR SHADOW SCREENS)
     +LOOP ?DUP IF 4 SWAP - 13 * 0 DO CR LOOP .BANNER THEN
     -CMP PAGE 63 ESC-SEQ ( RESET) ;  DECIMAL
```

Screen # 23

```
( SHOWC compact screen printer )                   ( PLB*01/21/86)
HEX   ( FOR OKIDATA)
: DWIDTH 1E EMIT 1F EMIT ;
: -DWIDTH  1E EMIT ;
: ESC-SEQ ( n -) 1B EMIT EMIT ;
: COMP 1D ESC-SEQ ;                    : -COMP 1E ESC-SEQ ;
: EMPH 54 ESC-SEQ ;                    : -EMPH 49 ESC-SEQ ;
: +UL 43 ESC-SEQ ;                     : -UL    44 ESC-SEQ ;
: .BANNER  -COMP EMPH CR CR ." PolyFORTH CP/M-68K" 10 SPACES
   TODAY W@ .DATE 2 SPACES @TIME .TIME
   6 SPACES .PFFILE -EMPH COMP PAGE ;
: .SCR#   ." Screen # " ;
: .BLK# ( n-)  CR  5 SPACES  -COMP DWIDTH EMPH
   +UL .SCR# DUP 3 U.R -UL  7 SPACES +UL .SCR#
   SHADOWS IF  (Q)  ELSE  1+ THEN  3 U.R -UL
   CR -DWIDTH COMP -EMPH CR ; DECIMAL  1 +LOAD
```

Screen # 24

```
( SHOWC compact screen printer )                   ( PLB*01/21/86)
HEX   ( FOR OKIDATA)
: SHOWC ( from to --)  DECIMAL 2DUP > IF 2DROP EXIT THEN
     0 ROT ROT 1+ SWAP  38 ESC-SEQ ( 8 LPI)
     DO I .BLK#  I SCR ! ( STORE WHERE WE ARE)   HERE 83 BLANK
     400 0 DO
        J  ( LEFT SCREEN)
        BLOCK I + HERE 40 CMOVE
        SHADOWS IF J (Q)  ELSE J 1+ THEN
        BLOCK I + HERE 43 + 40 CMOVE
        5 SPACES   HERE 83 -TRAILING TYPE CR
     40 +LOOP
     1+ DUP 4 = IF DROP 0 .BANNER THEN
     SHADOWS IF 1 ELSE 2 THEN  ( INCREMENT 1 FOR SHADOW SCREENS)
     +LOOP ?DUP IF 4 SWAP - 13 * 0 DO CR LOOP .BANNER THEN
     -COMP 36 ESC-SEQ ( 6 LPI) ;  DECIMAL
```

Screen # 25

```
$ CP/M Printer Drivers                             ( PLB*02/24/87)
HEX 300 TASK: PRINTER     PRINTER CONSTRUCT
: (P-PAGE)    0C EMIT ;
' (P-TYPE)    PRINTER 'TYPE    HIS !
' (P-PAGE)    PRINTER 'PAGE    HIS !
' (CR)        PRINTER 'CR      HIS !
' (TAB)       PRINTER 'TAB     HIS !
' (MARK)      PRINTER 'MARK    HIS !
' STOP        PRINTER 'KEY     HIS !
' STOP        PRINTER 'EXPECT HIS !      WVARIABLE   PSTART
' STOP        PRINTER '?TERM  HIS !      WVARIABLE   PEND
: PRINT ( from to -)  PEND W!  PSTART W!  FLUSH PRINTER ACTIVATE
 PSTART W@ PEND W@ SHOWC -1 PEND W! FLUSH STOP ; RECOVER
: PRINT-FF  PRINTER ACTIVATE PAGE STOP ; RECOVER
: WAIT-PRT BEGIN 0D EMIT ." Printing Screen " PRINTER SCR HIS @
  3 U.R ."  in " .PFFILE CTRL-C PEND W@ FFFF = UNTIL CR ;
```

Screen # 26

```
* Memory DUMP routine                              ( PLB*01/27/86)
HEX  VARIABLE D-A  VARIABLE D-N   CREATE DUMP-TAB  10 ALLOT

: D-H ( A) 7 SPACES 10 0 DO I OVER + F AND 3 U.R LOOP CR DROP ;
: D-SETUP ( A-) DUP 6 U.R    DUMP-TAB 10 MOVE   SPACE ;
: D-HEX  10 0 DO SPACE I DUMP-TAB + C@ <# # # #> TYPE LOOP ;
: D-ASCII  4 SPACES 10 0 DO I DUMP-TAB + C@
    7F AND DUP 20 < OVER 7F = OR IF DROP 2E THEN EMIT LOOP ;
: DUMP ( an-) 2DUP   D-N !  D-A !  OVER 1 AND
   IF 7 EMIT CR ." Warning - Dump is on even bytes !!! " THEN
   SWAP FFFFFE AND SWAP CR OVER BASE W@ >R HEX D-H R> BASE W!
   OVER + SWAP DO BASE W@ HEX I D-SETUP D-HEX D-ASCII CR BASE W!
       ?WAIT 10 +LOOP ;

: LDUMP  D-A @  D-N @ DUMP ;
```

Screen # 27

```
$ Steve's Code to High-level and back              ( SDZ*01/24/86)

$ Definitions to get from low-level to high-level and back.
```

```
ASSEMBLER DEFINITIONS
ASSEMBLER CREATE >HIGH-LEVEL
   R )+ D7 MOV   I R -) MOV   D7 I MOV   ,NEXT

: [[   >HIGH-LEVEL AB JSR  CURRENT W@ CONTEXT W! ] ;
FORTH DEFINITIONS
CODE >LOW-LEVEL  I A0 MOV   R )+ I MOV   A0 ) JMP
: ]]   COMPILE >LOW-LEVEL R> DROP ASSEMBLER ;  IMMEDIATE
```

Screen # 28

```
$ TAB-ALIGN                                          ( PLB*02/05/86)
DECIMAL
WVARIABLE (#CHAR)
WVARIABLE (SPACING)
WVARIABLE (FIRST-COL)

: TAB-ALIGN ( #char spacing first-col# - )
   (FIRST-COL) W!  (SPACING) W!  (#CHAR) W!
   (FIRST-COL) W@   C# W@  - DUP 0< NOT IF SPACES EXIT THEN
   NEGATE (SPACING) W@ MOD (SPACING) W@ SWAP -   DUP
   C# W@ (#CHAR) W@ + + 80 > IF DROP CR (FIRST-COL) W@ THEN
   SPACES ;

EXIT
: TEST 0 DO 5 9 13 TAB-ALIGN ." TEST!" LOOP ;
```

Screen # 29

```
$ *WFILL, *LFILL                                     ( PLB*03/16/86)

$ *WFILL ( a n word - )
CODE *WFILL      S )+ D0 MOV     S )+ D1 MOV     S )+ A0 MOV
                 1 # D1 LSR      1 #Q D1 SUB     D1 D2 MOV
                 D2 SWP
        BEGIN    BEGIN         D0 A0 )+ W. MOV   D1 DBRA
        D2 DBRA                NEXT

$ *LFILL ( a n l-word - )
CODE *LFILL      S )+ D0 MOV     S )+ D1 MOV     S )+ A0 MOV
                 2 # D1 LSR      1 #Q D1 SUB     D1 D2 MOV
                 D2 SWP
        BEGIN    BEGIN         D0 A0 )+ MOV      D1 DBRA
        D2 DBRA                NEXT
```

Screen # 30

```
$ *WMOVE, *LMOVE                                     ( PLB*12/12/86)

$ *WMOVE ( from to count - )
CODE *WMOVE      S )+ D1 MOV     S )+ A1 MOV     S )+ A0 MOV
                 1 # D1 LSR      1 #Q D1 SUB     D1 D2 MOV
                 D2 SWP
        BEGIN    BEGIN         A0 )+ A1 )+ W. MOV   D1 DBRA
        D2 DBRA                NEXT

$ *LMOVE ( from to count - )
CODE *LMOVE      S )+ D1 MOV     S )+ A1 MOV     S )+ A0 MOV
                 2 # D1 LSR      1 #Q D1 SUB     D1 D2 MOV
                 D2 SWP
        BEGIN    BEGIN         A0 )+ A1 )+ MOV    D1 DBRA
        D2 DBRA  NEXT
```

Screen # 31

```
$ 68000 Trap Diagnostic Words                        ( PLB*04/08/86)
HEX    CREATE TRAP-REG          40 ALLOT
: (.DR) ."  D0          D1          D2          D3          D4          D5
        D6          D7" CR ;
: (.AR) ."  A0          A1          A2 next     A3 U        A4 W        A5
 I      A6 S        A7 R" CR ;
: (.REG) ( a-)  HEX B 0 DO DUP @ <# # # # # # # # # #> TYPE  4+
    SPACE SPACE  LOOP DROP CR ;
: .TRAP-ABORT CR (.DR) TRAP-REG (.REG) (.AR) TRAP-REG 20 +
   (.REG)  CR DECIMAL ABORT ; RECOVER
: ;TRAP   R> DROP ; IMMEDIATE
: 68K-TRAP ( a-)  HERE SWAP !   $ Store vector in vector table
   [ ASSEMBLER ]   RL   TRAP-REG AB   MMOV   D0 D7 \ A0 R \\
   [ HOST? ] ONLY->     0000 #W MTSR
   SO U) S MOV            S -) CLR      >HIGH-LEVEL AB JSR
   CURRENT W@ CONTEXT W! ] ;     FORTH
```

Screen # 32

```
$ 68000 Trap Diagnostic Words                        ( PLB*04/08/86)
HEX
08  68K-TRAP CR .M" Bus Error"             .TRAP-ABORT ;TRAP
0C  68K-TRAP CR .M" Address Error"         .TRAP-ABORT ;TRAP
```

```
10  68K-TRAP CR .M" Illegal Instruction"    .TRAP-ABORT ;TRAP
14  68K-TRAP CR .M" Divide by Zero"         .TRAP-ABORT ;TRAP
18  68K-TRAP CR .M" CHK Instruction"        .TRAP-ABORT ;TRAP
1C  68K-TRAP CR .M" TRAPV Instruction"      .TRAP-ABORT ;TRAP
20  68K-TRAP CR .M" Privilege Violation"    .TRAP-ABORT ;TRAP
24  68K-TRAP CR .M" Trace"                  .TRAP-ABORT ;TRAP
28  68K-TRAP CR .M" Line 1010 Emulator"     .TRAP-ABORT ;TRAP
2C  68K-TRAP CR .M" Line 1111 Emulator"     .TRAP-ABORT ;TRAP
30  68K-TRAP CR .M" Unassigned, Reserved"   .TRAP-ABORT ;TRAP
   $ Fill in all reserved trap locations
GILD   : RESERVED 30 @ SWAP ! ; : FR DO I .S RESERVED 4 +LOOP ;
34 RESERVED      60 40 FR     100 C0 FR      EMPTY
```

Screen # 33

```
$ 68000 Trap Diagnostic Words                        ( PLB*04/08/86)
HEX
38  68K-TRAP CR .M" 68010 Format Error"      .TRAP-ABORT ;TRAP
3C  68K-TRAP CR .M" Uninitialized Interrupt Vector"
                                         .TRAP-ABORT ;TRAP
60  68K-TRAP CR .M" Spurious Interrupt"      .TRAP-ABORT ;TRAP
64  68K-TRAP CR .M" Level 1 Autovector"      .TRAP-ABORT ;TRAP
68  68K-TRAP CR .M" Level 2 Autovector"      .TRAP-ABORT ;TRAP
6C  68K-TRAP CR .M" Level 3 Autovector"      .TRAP-ABORT ;TRAP
70  68K-TRAP CR .M" Level 4 Autovector"      .TRAP-ABORT ;TRAP
74  68K-TRAP CR .M" Level 5 Autovector"      .TRAP-ABORT ;TRAP
78  68K-TRAP CR .M" Level 6 Autovector"      .TRAP-ABORT ;TRAP
7C  68K-TRAP CR .M" Level 7 Autovector"      .TRAP-ABORT ;TRAP
GILD
```

Screen # 34

```
$ Macro definition words                             ( PLB*06/05/86)
HEX
: M: CREATE  >IN W@ W,  BLK-W@ W,   FILE# @ W,  IMMEDIATE
   $ Now, scan for ";M"
   BEGIN 20 WORD @ 023B4D20 = UNTIL
   DOES>   FILE# @ >R  >IN W@ >R   BLK W@ >R
      DUP 4+ W@ (OPEN)     DUP 2+ W@ BLK W!     W@ >IN W!
          ]   $ Compile macro text!!!!
      R> BLK W!   R> >IN W!   R> (OPEN) ;

: ;M     R> DROP ; IMMEDIATE
```

Screen # 35

```
$ Bit set and test words                             ( PLB*08/08/86)
$ BIT-SET ( bit# base-address - )
CODE BIT-SET       S )+ A0 MOV       S )+ D0 MOV     D0 D1 MOV
   3 # D1 LSR      D1 A0 ADD         D0 A0 ) BSET    ,NEXT
$ BIT-CLR ( bit# base-address - )
CODE BIT-CLR       S )+ A0 MOV       S )+ D0 MOV     D0 D1 MOV
   3 # D1 LSR      D1 A0 ADD         D0 A0 ) BCLR    ,NEXT
$ BIT-CHG ( bit# base-address - )
CODE BIT-CHG       S )+ A0 MOV       S )+ D0 MOV     D0 D1 MOV
   3 # D1 LSR      D1 A0 ADD         D0 A0 ) BCHG    ,NEXT

$ BIT-TST ( bit# base-address - f )
CODE BIT-TST     S )+ A0 MOV       S )+ D0 MOV     D0 D1 MOV
   3 # D1 LSR    D1 A0 ADD         D0 A0 ) BTST
   0= NOT IF 1 # S -) MOV ELSE S -) CLR THEN   ,NEXT
```

Screen # 36

```
$ CASE statement                                     ( PLB*09/18/86)

: CASE       0 ; IMMEDIATE

: OF         COMPILE OVER      COMPILE =
             [COMPILE] IF      COMPILE DROP ; IMMEDIATE

: RANGEOF    COMPILE 1+        COMPILE 2>R       COMPILE DUP
             COMPILE 2R>       COMPILE WITHIN
             [COMPILE] IF      COMPILE DROP ; IMMEDIATE

: ENDOF      [COMPILE] ELSE ; IMMEDIATE

: ENDCASE    COMPILE DROP
             BEGIN ?DUP WHILE [COMPILE] THEN REPEAT ; IMMEDIATE
```

Screen # 37

```
$ ARRAY Definition                                   ( PLB*10/27/86)
$  The ARRAY word allows large areas of space to be allocated
$  when the system is first being loaded.
```

```
VARIABLE (ARR-PTR)
    OPERATOR S0 HIS @ 1024 -   (ARR-PTR) !
$ Allow 1024 bytes for parameter stack

: ARRAY NEGATE (ARR-PTR) +!  (ARR-PTR) @ CONSTANT ;
```

Screen # 38

Screen # 39

Screen # 40

Screen # 41

Screen # 42

Screen # 43

Screen # 44

```
 ( Target compatibility)   EMPTY
CREATE 'R  HERE 4+ ,   ( RAM size) ALLOT
: THERE ( - n)   'R @ ;
: ALLOT ( n)   'R +! ;
: ORG ( n)   1+ 2/ 2*  H ! ;
: GAP ( n)   HERE + ORG ;

: TARGET   IMMEDIATE ;
: HOST   FORTH ;   IMMEDIATE
: FORTH   FORTH ;   IMMEDIATE

: CVARIABLE   THERE CONSTANT  1 ALLOT ;
: VARIABLE   THERE 1 AND ALLOT  CVARIABLE  1 ALLOT ;
: LABEL   CREATE  ASSEMBLER ;
: EQU   CONSTANT ;
: |   ;
```

Screen # 45

```
( Target Compiler)   EMPTY   DECIMAL              ( PLB*01/03/86)
  ' (CREATE) 'CREATE !   31 WIDTH 1+ C!
-TWINS
: AHEAD ( - a)   >IN W@  32 WORD  SWAP >IN W! ;
: LOG ;   : .WHERE ;     110 LOAD   HELP
CREATE HEAD  32 ALLOT   CREATE HDS  4 ALLOT   CREATE ?TWO  1 W,
VARIABLE WO   VARIABLE 'H   VARIABLE 'R   WVARIABLE VOC
( Meta)  46 LOAD   HOST DEFINITIONS
: ORG ( a)   1+ 2/ 2*  'H ! ;    : HERE ( - a)   'H @ ;
: GAP ( n)   HERE + ORG ;    : THERE ( - a)   'R @ ;   HEX
: WINDOW ( n)  DUP ORG WO ! 0 'R ! 000B VOC W!  HEAD 20 ERASE ;
: |   0 HDS W! ;       : RECOVER   -4 GAP ;      DECIMAL
( Compile to RAM)  48 49 THRU   ( Assembler)  50 LOAD
: ALLOT ( n)   'R +! ;
61 LOAD EMPTY EMPTY CR  .( CP/M-68K PolyForth Kernel Complete )
CR
```

Screen # 46

```
 ( Host computer)
: NAME ( - a)   LAST @ @ 4+ ;
: PREVIOUS ( - a)  LAST @ @ CFA 4+ @ ;
: VOCAB ( - n)   NAME 1+ C@  VOC W@  10 - + ;
: -' ( - a t, a a f)   CONTEXT W@ >R  VOC W@ CONTEXT W!  -'
  R> CONTEXT W! ;
HEX 0071 VOCABULARY FORTH   IMMEDIATE
    0017 VOCABULARY HOST   IMMEDIATE
    0179 VOCABULARY ASSEMBLER      DECIMAL
: HASH ( - a)   VOCAB 10 +  14 AND 2*  CONTEXT 2+ + ;
: TARGET   LAST @  DUP @  DUP @  ROT ROT DUP
     HASH  DUP LAST !  DUP @  ROT !  !  ! ;
: TWIN   ?TWO W@ IF  .WHERE  DUP WIDTH W@  >IN W@
  ROT CONSTANT  >IN W! WIDTH W!  THEN  DROP ;
: SIAMESE   ?TWO W@ IF  .WHERE  DUP WIDTH W@  >IN W@
  ROT WCONSTANT  >IN W!  WIDTH W!  THEN DROP ;
```

Screen # 47

```
HELP          Displays these target COMPILER instructions

CP/M LOAD     Compiles polyFORTH for CP/M 68K system

s n TDUMP     Dumps target address space,  n bytes at  s
HERE U.       Current top of target dictionary
THERE U.      Next available target RAM location




Nucleus          Edit   Asm  Total       Program date
```

Screen # 48

```
 ( Compile to RAM)                                 ( PLB*01/09/86)
```

```
20 CONSTANT PFK    PFK 1024 * CONSTANT PFSZ
CREATE RAM   PFSZ ALLOT
: DICTIONARY ( n)   RAM PFSZ 255 FILL  HDS 2DUP W!  2+ W! ;
: >T ( a - a)    W0 @ - PFSZ 4- MIN  RAM + ;
: TC@ ( a - n)   >T C@ ;          : TC! ( n a)   >T C! ;
: TW@ ( a - n)   >T W@ ;          : TW! ( n a)   >T W! ;
: TW+! ( n a)   >T W+! ;          : T! ( d a)   >T ! ;
: TC,   HERE TC!  1 'H +! ;       : W,    2 GAP  HERE 2- TW! ;
: ,    4 GAP  HERE 4- T! ;
: CMOVE ( s d n)    >R  >T R> CMOVE ;   HEX
: TDUMP ( an-)  BASE W@  ROT ROT  HEX  CR CR  6 SPACES
 10 0 DO  OVER I +  0F AND  3 U.R  LOOP  CR  OVER + SWAP DO
 CR  I 4 U.R  SPACE  I 10 + I DO  I TC@  3 U.R  LOOP  2 SPACES
 I 10 + I DO  I TC@ 7F AND  DUP  20 < OVER 7F = OR IF  DROP 2E
 THEN  EMIT  LOOP  10 +LOOP  CR  BASE W! ;  DECIMAL
```

Screen # 49

```
 ( Compile to RAM  - CP/M EXTENSIONS)           ( PLB*01/03/86)
HEX
CREATE PFS 24 ALLOT
: PFSAVE  PFS 24 ERASE
 004B4552 PFS ! 4E454C20 PFS 4+ ! 2036384B PFS 8 + !
 ( DELETE)  PFS 13 BDOS DROP  ( MAKE)  PFS 16 BDOS DROP
   PFK 8 * 0 DO
       I 80 * RAM + 1A BDOS DROP
       PFS 15 BDOS ABORT" File Write Error"
   LOOP  PFS 10 BDOS  FF = ABORT" File Close Error" FLUSH ;

CREATE TPA-ARRAY   0A ALLOT
: GET-TPA  0 TPA-ARRAY W!  TPA-ARRAY 3F BDOS DROP ;
: LOW-TPA ( -a)  GET-TPA  TPA-ARRAY 2+ @ ;
: HIGH-TPA ( -a)  GET-TPA  TPA-ARRAY 6 + @ ;
HEX $ : LOW-TPA FEFC ; : HIGH-TPA 40000 ;
```

Screen # 50

```
 ( Target assembler)                             ( PLB*01/16/86)
: SIZE   AHEAD C@  WIDTH C@  MIN 2+ -2 AND  4+  HDS W@ MIN 4+ ;
: EMPLACE ( n)   LOG  CONSTANT TARGET DOES>  @ 4- , ;
: (CREATE)   SIZE DUP    DUP IF BLK W@ W, THEN ( VIEW FIELD)
     HERE +  EMPLACE 4- ?DUP IF
     4- >R  VOCAB  14 AND 2* HEAD +  DUP @ ,
     NAME HERE I CMOVE  HERE 4- SWAP !  R> GAP
   THEN  HDS 2+ W@  HDS W!  HERE 4+ , ;
: CODE   (CREATE) ASSEMBLER ;   : EQU ( n)   LOG CONSTANT ;
: LABEL   HERE EQU  ASSEMBLER ;
: STRING ( c)  WORD  DUP C@  2+ 2/ 2*
   >R I GAP  HERE I - R> CMOVE ;
HEX   ( WIDTH W@ >R  1F1F WIDTH W!)   ASSEMBLER DEFINITIONS
CREATE MODES  FORTH  00204000 , 0060E000 , 80A0C000 , ASSEMBLER
DECIMAL 112 119 THRU   : BEGIN ( n)   HERE ;   : U)   3) ;  MR>
( R> WIDTH W!) HOST DEFINITIONS   : USE ( a)   PREVIOUS 4- T! ;
```

Screen # 51

```
 ( Target compiler)
: COMPILE   -' ABORT" ?" DROP  4- FORTH , ;  IMMEDIATE
: [COMPILE]   [COMPILE] COMPILE ;   IMMEDIATE
: '   -' ABORT" ?" DROP @ ;
: LITERAL   COMPILE long , ;    TARGET
: [']   '  [COMPILE] LITERAL ;    TARGET
: ]   BEGIN  -' IF  NUMBER  ?CELL IF  COMPILE long ,
      ELSE  COMPILE cell W,  THEN   ELSE
   DROP  EXECUTE  DEPTH 0< ABORT" Stack empty"  THEN AGAIN ;
: [   R> DROP ;   TARGET
: ;code   R> @ USE ;
: ;CODE   FORTH COMPILE  HOST ;code  HERE FORTH ,  SMUDGE
   R> DROP  ASSEMBLER ;  IMMEDIATE
: DOES>   FORTH COMPILE  HOST ;code  HERE FORTH ,
   R> DROP  HOST  20153 W, does> , ] ;   IMMEDIATE
```

Screen # 52

```
 ( Compiler directives)
: BEGIN   HERE ;   TARGET       : !BACK   HERE  - W, ;
: UNTIL   COMPILE if  !BACK ;   TARGET
: AGAIN   COMPILE else  !BACK ;   TARGET
: THEN   HERE OVER -  SWAP TW! ;   TARGET
: IF   COMPILE if  HERE 0 W, ;   TARGET
: WHILE   [COMPILE] IF  SWAP ;   TARGET
: REPEAT   [COMPILE] AGAIN  [COMPILE] THEN ;   TARGET
: ELSE   COMPILE else  HERE 0 W, SWAP [COMPILE] THEN ; TARGET
: DO   COMPILE 2>R  HERE ;   TARGET
: LOOP   COMPILE loop  !BACK ;   TARGET
: /LOOP   COMPILE /loop  !BACK ;   TARGET
: +LOOP   COMPILE +loop  !BACK ;   TARGET
: ;   COMPILE EXIT  SMUDGE R> DROP ;   TARGET
: (   41 WORD  DROP ;   TARGET
: $   64  >IN W@  OVER MOD  -  >IN W+! ; TARGET
```

Screen # 53

```
 ( Defining Words)                              ( PLB*01/16/86)
HERE  colon ORG
FORTH : :   CURRENT W@ CONTEXT W!  (CREATE)  SMUDGE ] ;CODE
     create ORG $ The DUP IF 2+ THEN below is for VIEW FIELD
FORTH : CREATE HERE SIZE DUP IF 2+ THEN + TWIN  (CREATE)  ;CODE
     wconstant ORG
FORTH : WCONSTANT   DUP SIAMESE  (CREATE)  W,  ;CODE
     constant ORG
FORTH : CONSTANT   DUP TWIN  (CREATE) ,  ;CODE
     user ORG
FORTH : USER   WCONSTANT  ;CODE      ORG
FORTH : VARIABLE   THERE CONSTANT  4 ALLOT ;  ( PROM versions)
FORTH : 2VARIABLE   VARIABLE  4 ALLOT ;
FORTH : VARIABLE   CREATE 0 , ;
FORTH : 2VARIABLE   VARIABLE 0 , ;  ( RAM versions)
```

Screen # 54

```
( PROM editor)
( Characters)  58 LOAD   ( Terminal)  59 LOAD
  : (COPY) ( n n)   SWAP BLOCK DROP  IDENTIFY  UPDATE ;

HEX   0015 VOCABULARY EDITOR   DECIMAL 55 LOAD
HEX 00BF VOC W!  FORTH  1F1F WIDTH W!  HOST  DECIMAL  56 57 THRU
  : WIPE   0  SCR @ BLOCK DUP 1024 BLANK W!  UPDATE 0 ADV  L ;
  : M ( b l)   -LINE  RETAIN  SCR @  R# @  64 +  2>R
     64 * R# !  SCR !  u  2R>  R# !  SCR !  .LINE ;

HEX 00FB VOC W!   FORTH  303 WIDTH W!  HOST   DECIMAL
  : T ( n)   -LINE  15 AND  64 *  R# !  .LINE  EDITOR ;
  : N   1 ADV L ;      : B   -1 ADV L ;

HEX 000B VOC W!   HERE 7 U.R
```

Screen # 55

```
 ( Editor)
| : #I ( - a)   PAD 80 + ;       | : #F ( - a)   PAD 160 + ;
| : REST ( n - n)   R# @  OVER 1- AND - ;
| : AT ( - a)   SCR @ BLOCK  R# @ +  64 REST ;
| : SET ( n)   R# @  64 /MOD  1+  SWAP 2+ 1+ TAB ;
: >TYPE ( a n)   >R  PAD I CMOVE  PAD R> TYPE ;
| : -LINE   SET  AT >TYPE SPACE ;
| : .LINE   EDITOR  SET  AT MARK  CLEAN  17 0 TAB  SPACE SPACE
   R# @ 63 AND  AT DROP OVER -  SWAP >TYPE  AT MARK ;
| : ADVANCE ( a)   R# @ +  1023 MIN  R# ! ;
: LIST ( n)   PAGE DUP ;  16 0 DO  CR I 2 U.R  SPACE
   DUP BLOCK I 64 * +  64 -TRAILING >TYPE  LOOP SPACE  SCR ! ;
: L   SCR @ LIST  0 ADVANCE  .LINE ;
: COPY ( n n)   FLUSH (COPY) ;
| : BODY   R# @  1024 OVER  -64 AND  DO
     I R# !  -LINE  64 +LOOP  R# ! ;
```

Screen # 56

```
 ( Line editor)
| : ?BODY ( n)   EXTENT W@ 64 > IF  BODY  ELSE  DUP IF  -LINE
   THEN THEN ADVANCE  .LINE ;
| : STRING ( s - s')   94 WORD C@ IF  DUP 80 BLANK
      HERE 4+ HERE 1 AND +  2DUP C@ 1+ CMOVE  THEN 1+ ;
| : DELETE ( d d# s#)   OVER MIN  >R  I -  2DUP OVER I +
   ROT ROT CMOVE  + R> BLANK  UPDATE ;
| : INSERT ( s s# d d#)   ROT  OVER MIN >R  I -
   OVER DUP I +  ROT <CMOVE  R> CMOVE  UPDATE ;
| : AT0 ( - a n)   R# @  -64 AND  R# !  AT ;
| : RETAIN   AT0 #I  2DUP C!  1+ SWAP CMOVE ;
: P   -LINE  #I STRING  AT0 CMOVE  UPDATE  .LINE ;
: X   RETAIN  AT0  1024 REST  SWAP DELETE  BODY .LINE ;
| : u   #I STRING  64 ADVANCE  AT0 SWAP  1024 REST  INSERT ;
: U   -LINE  u  BODY .LINE ;
: K   #I PAD 160 MOVE  PAD #F 80 MOVE ;
```

Screen # 57

```
 ( String editor)
| : ADV ( n)   SCR +!  0 R# ! ;
| : -FOUND ( - a a' t)   #F STRING DROP  AT DROP  DUP
   1024 REST  1+ #F C@ -  #F COUNT  -MATCH ;
| : SEARCH   -LINE  -FOUND IF  #F  HERE 4+ 80 CMOVE
   CLEAN  ABORT" None"  THEN  SWAP - ADVANCE ;
| : EXT   AT DROP  EXTENT W@ REST ;
: TILL   R# @  SEARCH  R# @ SWAP  DUP R# !
   - EXT ROT DELETE  0 ?BODY ;
| : e   #F C@ DUP  NEGATE  ADVANCE  EXT ROT DELETE ;
: E   e  0 ?BODY ;
: I   #I STRING  #I C@ EXT INSERT  -LINE  #I C@ ?BODY ;
```

```
: D   SEARCH E ;     : F   SEARCH  .LINE ;     : R   e I ;
: S ( n)   SCR @ DO  -FOUND IF  2DROP  1 ADV
    ELSE  SWAP -  ADVANCE  I' LEAVE  L  THEN LOOP ;
```

Screen # 58

```
 ( Character operators)
: -TRAILING ( a n - a n)   BEGIN 1- 2DUP + C@ 32 - OVER
   0< + UNTIL  1+ ;
CODE -MATCH   ( d n s n - a t)
    S )+ RL MMOV DO D3 \\   1 #Q DO W. SUB   DO D5 MOV
  BEGIN  D3 A0 MOV   D1 A1 MOV   D5 DO MOV
  BEGIN  A0 )+ A1 )+ B. CMP   DO 0= DBCC
     0= NOT IF   1 #Q D3 ADD   1 #Q D2 SUB  SWAP  0> NOT UNTIL
  THEN   A0 S -) MOV  1 #Q DO W. ADD   DO S -) MOV   NEXT

CODE <CMOVE   S )+ RL MMOV D1 \ A0 A1 \\   D1 TST   0= NOT IF
    D1 A1 ADD   D1 A0 ADD   1 #Q D1 SUB
    BEGIN  A1 -) A0 -) B. MOV   D1 DBRA  THEN   NEXT
CODE CMOVE   S )+ RL MMOV D1 \ A0 A1 \\
  1 #Q D1 SUB    0< NOT IF   BEGIN   A1 )+ A0 )+ B. MOV
    D1 DBRA   THEN   NEXT
```

Screen # 59

```
 ( CRT  Terminal)   HEX                          ( PLB*12/05/86)

: >TYPE ( a n)   >R  PAD I CMOVE  PAD R> TYPE ;

MSG (CR)   20D W, 0A00 W,   DECIMAL
: (PAGE)   24 0 DO CR  LOOP ;
: (TAB) ( l c)   2DROP  CR ;
: (MARK) ( a n)   >R PAD I CMOVE  94 EMIT  PAD R> TYPE ;

$ : CLEAN   1B 0 TAB  79 SPACES  13 EMIT ;
```

Screen # 60

```
( 68000 polyFORTH)                               ( PLB*10/15/85)
CODE X   HERE 10 - HEAD !   HEAD DUP 4+ 28 MOVE
   HEX 8020  HERE 6 - TW!   DECIMAL
63 69 THRU   108 109 THRU   70 71 THRU  $ Nucleus
51 53 THRU      FORGET VARIABLE         $ Target Compiler
72 74 THRU               $ Level 1
75 77 THRU               $ Multiprogrammer
78 LOAD                  $ Terminal
84 86 THRU               $ Output
87 90 THRU               $ Interpreter
79 LOAD                  $ CP/M BDOS Interface
91 93 THRU               $ Disk
99 105 THRU              $ Compiler
  HEX  HERE 7 U.R  THERE 7 U.R  DECIMAL
58 59 THRU               $ Kernel Extensions
111 LOAD                 $ Assembler
```

Screen # 61

```
$ CP/M 68K System                                 ( PLB*10/15/85)
HELP   HOST DEFINITIONS   FORGET ALLOT
: ALLOT ( n)   'R +! ;
HEX    LOW-TPA 100 + 1C - EQU PROM
26 DICTIONARY   PROM WINDOW   PROM 22 + ORG
8 EQU nb    HIGH-TPA 2- 400 nb * - EQU FIRST   DECIMAL
  FIRST 220 256 + -  DUP EQU 'OPERATOR   256 +  'R !
60 LOAD
81 82 THRU                $ Terminal
94 97 THRU                $ Disk
106 107 THRU              $ Initialize
HOST HERE H'S T!  HERE H'S 4 + T!
( Links)  HOST  HEAD ram 2+ 32 CMOVE
   HEX  HERE 7 U.R  THERE 7 U.R SPACE
HOST   PFSAVE  FLUSH
```

Screen # 62

Screen # 63

```
( Nucleus)                                        ( PLB*12/13/86)
LABEL ':'   44 GAP
LABEL colon   I R -) MOV   W I MOV
LABEL 'NEXT   ,NEXT

  CODE cell   I )+ A0 W. MOV   A0 S -) MOV   ,NEXT
  CODE long   I )+ S -) MOV   ,NEXT

CODE EXIT   R )+ I MOV   ,NEXT
```

Screen # 64

```
  ( Defining words - execution)
LABEL 'CREATE'    190 GAP
LABEL create   W S -) MOV   NEXT

LABEL 'WCONSTANT'   32 GAP
LABEL wconstant   W ) A0 W. MOV   A0 S -) MOV   NEXT
LABEL 'CONSTANT'  32 GAP
LABEL constant   W ) S -) MOV   NEXT
LABEL 'USER'    24 GAP
LABEL user   W ) A0 W. MOV   U A0 ADD   A0 S -) MOV   NEXT

LABEL does>   W S -) MOV   R )+ D7 MOV   I R -) MOV
    D7 I MOV   ,NEXT
```

Screen # 65

```
  ( Structures)
| CODE else   BEGIN   I ) I W. ADD   ,NEXT
| CODE if ( t)   S )+ TST   0= NOT UNTIL   2 #Q I ADD
   ,NEXT

CODE 2>R ( n n)   S )+ RL MMOV DO D1 \\
  RL R -) MMOV DO D1 \\   NEXT
CODE 2R> ( - n n)   R )+ RL MMOV DO D1 \\
  RL S -) MMOV DO D1 \\   NEXT
| CODE loop   1 #Q R ) ADD   BEGIN   R ) DO MOV
  4 R) DO CMP   CS IF   I ) A0 W. MOV   A0 I ADD   ,NEXT
    THEN   BEGIN  2 #Q I ADD   8 #Q R ADD   ,NEXT
| CODE /loop ( n)   S )+ DO MOV   DO R ) ADD   SWAP BRA
| CODE +loop ( n)   S )+ DO MOV   DO D1 MOV
   DO R ) ADD   R ) DO MOV   4 R) DO SUB
     D1 DO EOR   0< UNTIL   I ) A0 W. MOV   A0 I ADD   ,NEXT
```

Screen # 66

```
  ( Logical Operators)
CODE AND ( n n - n)   S )+ DO MOV   DO S ) AND   ,NEXT
CODE OR ( n n - n)   S )+ DO MOV   DO S ) OR   ,NEXT
CODE XOR ( n n - n)   S )+ DO MOV   DO S ) EOR   NEXT

CODE 0= ( n - t)   BEGIN   D1 CLR   S ) TST   0= IF
  1 #Q D1 ADD    THEN   D1 S ) MOV   ,NEXT

CODE = ( n n - t)   S )+ DO MOV   DO S ) SUB   BRA

CODE 0< ( n - t)   S ) TST   HERE   0< IF   1 # S ) MOV
  ELSE   S ) CLR   THEN   ,NEXT
CODE < ( n n - t)   4 S) DO MOV   S )+ DO SUB   DUP BRA
CODE > ( n n - t)   S )+ DO MOV   S ) DO SUB   BRA
```

Screen # 67

```
   ( Memory reference operators)
CODE W@ ( a - n)   S )+ A0 MOV   D0 CLR   A0 ) D0 W. MOV
   D0 S -) MOV   ,NEXT
CODE W! ( n a)   S )+ A0 MOV   2 #Q S ADD   S )+ A0 ) W. MOV
     ,NEXT
CODE W+! ( n a)   S )+ A0 MOV   S )+ D0 MOV   D0 A0 ) W. ADD
     NEXT
CODE C+!   S )+ A0 MOV   S )+ D0 MOV   D0 A0 ) B. ADD   NEXT

CODE C@ ( a - n)   S )+ A0 MOV   D0 CLR
   A0 ) D0 B. MOV   D0 S -) MOV   ,NEXT
CODE C! ( n a)   S )+ A0 MOV   S )+ D0 MOV   D0 A0 ) B. MOV
   ,NEXT

CODE >R ( n)   S )+ R -) MOV   NEXT
CODE R> ( - n)   R )+ S -) MOV   NEXT
```

Screen # 68

```
   ( Stack operators)
CODE DUP ( n - n n)   S ) S -) MOV   ,NEXT
CODE DROP ( n)   4 #Q S ADD   ,NEXT
CODE SWAP ( n1 n2 - n2 n1)   S )+ RL MMOV D0 D1 \\
   D0 S -) MOV   D1 S -) MOV   ,NEXT

CODE OVER ( n1 n2 - n1 n2 n1)   4 S) S -) MOV   ,NEXT
CODE ROT ( n1 n2 n3 - n2 n3 n1)   S )+ RL MMOV D0 D2 \\
   RL S -) MMOV D0 D1 \\   D2 S -) MOV   NEXT

CODE I ( - n)   R ) S -) MOV   ,NEXT
```

Screen # 69

```
   ( Arithmetic Operators)                          ( PLB*09/04/86)
CODE + ( n n -n)   S )+ D0 MOV   D0 S ) ADD   ,NEXT
CODE - ( n n -n)   S )+ D0 MOV   D0 S ) SUB   ,NEXT

CODE 1+ ( n - n)   1 #Q S ) ADD   NEXT
CODE 1- ( n - n)   1 #Q S ) SUB   NEXT
CODE 2+ ( n - n)   2 #Q S ) ADD   NEXT
CODE 2- ( n - n)   2 #Q S ) SUB   NEXT
CODE 4+ ( n - n)   4 #Q S ) ADD   NEXT
CODE 4- ( n - n)   4 #Q S ) SUB   NEXT

CODE 2* ( n - n)   2 S) ASL   S ) ROXL   ,NEXT
CODE 2/ ( n - n)   S ) ASR   2 S) ROXR   NEXT
CODE 4* ( n - n)   S )+ D0 MOV   2 # D0 ASL   D0 S -) MOV
  ,NEXT
CODE 4/ ( n-n) S )+ D0 MOV 2 # D0 ASR D0 S -) MOV ,NEXT
```

Screen # 70

```
   ( Multiply, divide)
CODE /MOD ( u u - r q)   S )+ RL MMOV D0 D1 \\
   udiv BSR   RL S -) MMOV D0 D1 \\   NEXT
CODE */MOD ( u u u - r q)   S )+ RL MMOV D0 D1 \\
   S )+ RL W. MMOV D2 D3 \\   umul BSR   mudiv BSR
     D6 W. CLR   D6 SWP   RL S -) MMOV D4 \ D6 \\   NEXT
CODE * ( n n - p)   S )+ RL MMOV   D1 D2 \\   mul BSR
   D1 S -) MOV   NEXT
CODE / ( n n - q)   S )+ RL MMOV D0 D1 \\   sdiv BSR
   D0 S -) MOV   NEXT
CODE MOD ( u u - r)   S )+ RL MMOV D0 D1 \\   sdiv BSR
   D1 S -) MOV   NEXT
CODE H* ( n n - p)   S )+ RL MMOV D0 D1 \\   D0 D1 MULU
   HERE   D1 S -) MOV   NEXT
CODE H/ ( n n - q)   S )+ RL MMOV D0 D1 \\   D0 D1 DIVS
   D1 EXT   BRA
```

Screen # 71

```
   ( String Operators)
CODE MOVE   S )+ RL MMOV D0 \ A0 A1 \\
     2 # D0 LSR   1 #Q D0 SUB   0< NOT IF
   BEGIN   A1 )+ A0 )+ MOV   D0 DBRA   THEN   NEXT
```

Screen # 72

```
   ( Arithmetic)
CODE NEGATE ( n - n)   S ) NEG   NEXT
CODE ABS ( n - n)   S ) TST   0< IF   S ) NEG   THEN   NEXT
CODE NOT ( t - t)   ' 0= USE

CODE MIN ( n n - n)   S )+ D0 MOV   S ) D0 CMP   0< IF
   D0 S ) MOV   THEN   NEXT
CODE MAX ( n n - n)   S )+ D0 MOV   S ) D0 CMP   0> IF
   D0 S ) MOV   THEN   NEXT

CODE WITHIN ( n l h - t)   S )+ RL MMOV  D0 D2 \\   S -) CLR
   D1 D0 SUB   D1 D2 SUB   D0 D2 SUB   2 S) ROXL   NEXT

0 WCONSTANT 0   1 WCONSTANT 1
```

Screen # 73

```
   ( Miscellaneous)
CODE ERASE ( a n)   S -) CLR
LABEL fill   S )+ RL MMOV D0 D1 \ A0 \\
   1 #Q D1 SUB   0< NOT IF   BEGIN   D0 A0 )+ B. MOV
     D1 DBRA   THEN   NEXT
CODE FILL ( a n c)   fill USE

CODE 'S ( - a)   S S -) MOV   NEXT
CODE ?DUP ( n - 0, n n)   S ) TST   0= NOT IF
   S ) S -) MOV   THEN   NEXT

CODE I' ( - n)   4 R) S -) MOV   NEXT
CODE J ( - n)   8 R) S -) MOV   NEXT

CODE LEAVE   R ) 4 R) MOV   NEXT
```

Screen # 74

```
   ( 32-bit memory reference)
CODE 2DUP ( d - d d)   S ) RL MMOV D0 D1 \\
   RL S -) MMOV D0 D1 \\   ,NEXT
CODE 2DROP ( d)   8 #Q S ADD   ,NEXT

CODE @ ( a - n)   S )+ A0 MOV   A0 ) S -) MOV   ,NEXT
CODE ! ( n a)   S )+ A0 MOV   S )+ A0 ) MOV   ,NEXT
CODE +! ( n a)   S )+ A0 MOV   S )+ D0 MOV   D0 A0 ) ADD
   ,NEXT
```

Screen # 75

```
( System and USER variables)                    ( PLB*01/29/86)
0 USER STATUS   10 USER S0      14 USER CTR   16 USER PTR
```

```
20 USER EXTENT  22 USER 'CR     26 USER 'PAGE   30 USER 'TAB
34 USER 'MARK   38 USER 'TYPE   42 USER 'KEY    46 USER '?TERM
50 USER H       58 USER 'EXPECT 62 USER BASE    64 USER 'ABORT
68 USER CNT
70 USER >IN     72 USER BLK   74 USER CONTEXT  108 USER CURRENT
110 USER LAST   114 USER C#     116 USER L#     118 USER WIDTH
120 USER POST   121 USER S/D    122 USER MODE   124 USER WSZ
( WSZ 1+)       126 USER SCR    130 USER R#

VARIABLE GOLDEN 32 ALLOT   VARIABLE 'BLOCK   2VARIABLE 'BUFFER
VARIABLE 'NUMBER   VARIABLE 'CREATE   2VARIABLE NB
VARIABLE DISK  10 ALLOT   VARIABLE PREV nb 4* ALLOT
VARIABLE TODAY ( and  TICKS )  2 ALLOT
```

Screen # 76

```
  ( Multi-programmer)   HEX
4E40 WCONSTANT WAKE    ( 0 TRAP)

LABEL GIVE    R )+ DO W. MOV   R )+ U MOV   2 #Q U SUB
   4EF9 #W U ) MOV   S0 4- U) S MOV   S )+ I MOV
   DO MTSR   S )+ R MOV     NEXT

CODE PAUSE   4 #Q I SUB   HERE USE   WAKE #W U ) MOV
LABEL WAIT   R S -) MOV   I S -) MOV   S S0 4- U) MOV
   STATUS 2+ U) A0 MOV   A0 ) JMP

CODE STOP   WAIT USE      DECIMAL
```

Screen # 77

```
  ( Multiprogrammer control)
CODE GRAB ( a)   S )+ A0 MOV   A0 ) U CMP   0= NOT IF
   A0 ) TST   0= NOT IF   A0 S -) MOV
      ' PAUSE BRA   THEN
     U A0 ) MOV   THEN   NEXT

: GET ( a)   PAUSE GRAB ;

CODE RELEASE ( a)   S )+ A0 MOV   A0 ) U CMP   0= IF
   A0 ) CLR   THEN   NEXT
```

Screen # 78

```
  ( Vectored Terminal)                              ( PLB*11/09/85)
CODE EXECUTE ( a)   S )+ W MOV  HERE   4 #Q W SUB   'NEXT 2+ BRA
CODE @EXECUTE ( a)   S )+ A0 MOV   A0 ) W MOV
  W DO MOV   0= UNTIL   NEXT

: TYPE     ( a n)  DUP C# W+!  'TYPE @EXECUTE PAUSE ;
: ?TERMINAL ( -f)  PAUSE '?TERM @EXECUTE ;
: KEY ( -c)        'KEY @EXECUTE ;
: EXPECT   ( a n)  'EXPECT @EXECUTE ;
: STRAIGHT  ( a n-) ?DUP IF
      0 DO DUP KEY SWAP C! 1+ LOOP THEN DROP ;
: CR              'CR @EXECUTE  0 C# W!  1 L# W+! ;
: PAGE            'PAGE @EXECUTE  0 C# ! ;
: TAB ( l c)   2DUP 'TAB @EXECUTE  C# W! L# W! ;
: MARK ( a n)  DUP C# W@ + >R  'MARK @EXECUTE R> C# W! ;
: EMIT ( c)    'S 3 + 1 TYPE  DROP ;
```

Screen # 79

```
$ CP/M 68K BDOS Function Call                        ( PLB*10/29/85)
HEX
$ BDOS ( parameter function# - result )
CODE BDOS   S )+ DO MOV   S )+ D1 MOV    4E42 W, ( TRAP2)
   DO S -) MOV    ,NEXT

$ BIOS ( parameter function# - result )
CODE BIOS   S )+ DO MOV   S )+ D1 MOV   RL R -) MMOV A2 S \\
   4E43 W, ( TRAP3)  R )+ RL MMOV A2 S \\   DO S -) MOV  ,NEXT

CREATE FILE# 4 GAP
CREATE ~TPA 0A GAP
: ~GET-TPA   0 ~TPA W!  ~TPA 3F BDOS DROP ;
: LOW-TPA ( -a)   ~GET-TPA  ~TPA 2+ @ ;
: HIGH-TPA ( -a)   ~GET-TPA  ~TPA 6 + @ ;
```

Screen # 80

Screen # 81

```
$ Terminal I/O                                       ( PLB*12/05/86)
DECIMAL
: (C-EMIT) ( char - ) 4 BIOS DROP ;

: (TYPE)   ( addr cnt - )
 ?DUP IF 0 DO DUP C@ (C-EMIT) 1+ LOOP THEN DROP ;

$ : (TYPE)    ( addr cnt - )
$  ?DUP IF 0 DO DUP C@ 02 BDOS DROP 1+ ( PAUSE) LOOP THEN DROP ;
HEX
: (KEY) ( -char) BEGIN ?TERMINAL UNTIL 0 3 BIOS ;
: (?TERM) ( -flag)  0 2 BIOS FF AND ;
```

Screen # 82

```
$ BDOS TERMINAL I/O                                  ( PLB*10/16/86)
DECIMAL
CREATE KYVAL 0 W,
: !CHAR ( C-)   PTR @ C!   1 PTR +!   1 CTR W+! ;
: (EXPECT)  ( a n-) DUP 0= IF 2DROP ELSE
   0 CNT C! NEGATE CTR W!    PTR !  ( SAVE COUNT AND ADDRESS )
BEGIN KEY 127 AND KYVAL C! ( MASK PARITY)
 KYVAL C@ DUP 8 = SWAP 127 = OR IF 255 KYVAL C!
```

```
    CNT C@ 0=  IF   7 EMIT  ELSE   8 EMIT ( BACKSPACE)
                 SPACE 8 EMIT ( erase old input)
    -1 PTR +!   -1 CTR W+!   -1 CNT C+!   THEN THEN
KYVAL C@ DUP 255 = NOT SWAP 13 = NOT AND
    IF KYVAL C@  DUP !CHAR 1 CNT C+! EMIT THEN
KYVAL C@ 13 = IF  32 DUP  !CHAR 0 CTR W! EMIT  THEN
CTR W@ 0= UNTIL THEN ;
```

Screen # 83

Screen # 84

```
  ( Output)
CODE HERE   H U) DO MOV   DO S -) MOV   NEXT
CODE PAD ( - a)   H U) DO MOV   64 # DO ADD   DO S -) MOV  NEXT
CODE COUNT ( a - a n)   S )+ AO MOV   DO CLR   AO )+ DO B. MOV
   RL S -) MMOV DO \ AO \\   NEXT
CODE BLANK ( a n)   32 # S -) MOV   fill BRA
HERE   8224 W, 8224 W, 8224 W, 8224 W,
| CODE ?ANY ( n - 0, n a # t)   S ) TST   0< IF   S ) CLR   ELSE
   SWAP # S -) MOV   8 #Q DO MOV   8 # 4 S) SUB   0< IF
   4 S) DO ADD   THEN   DO S -) MOV   W S -) MOV   THEN   NEXT
: SPACES ( n)   BEGIN  ?ANY WHILE  TYPE  REPEAT ;
: SPACE   1 SPACES ;
CODE HOLD ( c)   PTR U) AO MOV   S )+ DO MOV
   DO AO -) B. MOV   AO PTR U) MOV   NEXT
CODE DIGIT ( n - c)   10 #W 2 S) CMP   0< NOT IF
   7 #W 2 S) ADD   THEN   48 #W 2 S) ADD   NEXT
```

Screen # 85

```
  ( Numeric output)
CODE /DIGIT ( d - d n)   DO CLR   S )+ DO W. MOV
   S )+ D1 W. MOV   BASE U) DO DIVU   DO D2 MOV   D1 DO W. MOV
   BASE U) DO DIVU   DO S -) W. MOV   D2 S -) W. MOV   DO W. CLR
      DO SWP   DO S -) MOV   NEXT
: <#   PAD PTR ! ;
: #> ( d - a n)   DROP  PTR @  PAD OVER - ;
: SIGN ( n d - d)   SWAP 0< IF  45 HOLD  THEN ;
: # ( d - d)   /DIGIT  DIGIT HOLD ;
: #S ( d - d)   BEGIN  #  DUP 0= UNTIL ;
: (.) ( d - a n)   DUP ABS  <# #S SIGN #> ;
: . ( d)   (.) TYPE SPACE ;
: U.R ( d n)   >R <# #S #>  R> OVER - SPACES  TYPE ;
: U.   0 U.R SPACE ;   : ?   @ . ;
$ : DUMP ( a n)   SWAP -2 AND  DUP ROT + SWAP DO  CR I 8 U.R
$    I 16 + I' MIN I DO  I W@ 6 U.R 2 /LOOP  16 +LOOP SPACE ;
```

Screen # 86

```
  ( String output)                              ( PLB*01/29/86)
CODE ?R@ ( t - a)   R ) AO MOV   DO CLR
   AO ) DO B. MOV   2 #Q DO ADD   0 # DO BCLR   DO R ) ADD
   S )+ TST   0= IF   R )+ I MOV   NEXT   THEN
     AO S -) MOV   NEXT
CODE (ABORT)   SO U) S MOV   S -) CLR
LABEL 'QUIT   0. # I MOV   NEXT

: ABORT 'ABORT @EXECUTE ; RECOVER
| : abort" ( t)   ?R@  BLK W@ ?DUP IF  SCR !  >IN W@  R# ! THEN
   HERE 4+ COUNT TYPE  SPACE  COUNT TYPE  CR  ABORT ;   RECOVER
| : dot"   1 ?R@  COUNT TYPE ;

FORTH : ABORT"   COMPILE abort"  34 STRING ;   TARGET
FORTH : ."   COMPILE dot"  34 STRING ;   TARGET
```

Screen # 87

```
( Interpreter)
| CODE SOURCE ( - # a)   1024 # S -) MOV   BLK U) AO W. MOV
    AO S -) MOV   0= IF   CNT 1+ U) 7 S) B. MOV
  6 S) B. CLR   SO U) S ) MOV   4 #Q I ADD   THEN   NEXT
| CODE (WORD) ( c # a - a)   >IN U) AO W. MOV   S )+ AO ADD
  H U) D7 MOV   5 #Q D7 ADD   0 # D7 BCLR   D7 A1 MOV
     D7 W MOV   A1 )+ W. CLR   8224 #W A1 ) MOV   D3 CLR
     S )+ RL MMOV DO D1 \\   >IN U) DO W. SUB   0= NOT IF
  1 #Q DO SUB   BEGIN   AO )+ D1 B. CMP   DO 0= DBCC
  0= NOT IF   1 #Q A1 SUB   1 #Q AO SUB   BEGIN
     AO )+ A1 ) B. MOV   A1 )+ D1 B. CMP   0= NOT IF
     1 #Q W ) B. ADD   SWAP DO DBRA   1 #Q A1 ADD
     THEN   THEN   THEN   W S -) MOV   32 #B A1 -) MOV
  -8 S) AO SUB   AO >IN U) W. MOV   ' EXIT BRA

: WORD ( c - a)  SOURCE SOURCE  (WORD) ;  RECOVER
```

Screen # 88

```
  ( Dictionary Search)                          ( PLB*01/30/86)
CODE HASH ( a v - a a, a t)  S )+ DO MOV  0= IF
  I S -) MOV   ' EXIT BRA   THEN   DO D1 MOV
    15 #W DO AND   4 # D1 LSR   S ) A1 MOV
  1 1) D2 B. MOV   D2 DO ADD   14 # DO AND   1 # DO W. ASL
    CONTEXT 2+ # DO ADD   U DO ADD   DO S -) MOV   NEXT
CODE -FIND ( a a - a v, p a f)   DO AO MOV   A1 D4 MOV
  BEGIN   AO ) AO MOV   AO DO MOV  0= NOT IF   4 #Q AO ADD
  AO )+ D3 W. MOV   A1 )+ D3 W. SUB   1 # D3 W. ASL   0= IF
  -2 1) D2 B. MOV   1 # D2 B. ASR   0= NOT IF   BEGIN
 AO )+ D3 W. MOV  0< NOT IF   A1 )+ D3 W. SUB   0= IF
1 #Q D2 B. SUB   ROT 0= UNTIL   ROT THEN   BEGIN   4 #Q AO ADD
  AO 4 S) MOV   DO S ) MOV   S -) CLR   ' EXIT BRA   ROT THEN
  A1 )+ D3 W. SUB   1 # D3 W. ASL   0= NOT UNTIL
  THEN   THEN   D4 A1 MOV   DO AO MOV   SWAP BRA   THEN
    8 #Q I SUB   D1 S ) MOV   NEXT
```

Screen # 89

```
  ( Number Input)
CODE ?DIGIT   01 #Q S ) ADD   S ) AO MOV   DO CLR
  AO ) DO B. MOV   58 #W DO CMP   0< NOT IF   65 #W DO CMP
    0< NOT IF   7 #Q DO SUB   SWAP THEN   48 #W DO SUB
    0< NOT IF   BASE U) DO W. CMP   0< IF   DO S -) MOV
  I S -) MOV   NEXT   THEN  THEN  THEN   S -) CLR   NEXT
CODE *DIGIT   S )+ DO MOV   S )+ D3 MOV   2 S) D1 W. MOV
  BASE U) D1 MULU   S ) D2 W. MOV   BASE U) D2 MULU   D2 SWP
  DO D2 W. MOV   D2 D1 ADD   D1 S ) MOV   D3 S -) MOV   NEXT

" : CONVERT   BEGIN  ?DIGIT WHILE  *DIGIT  1 PTR W+!  REPEAT ;
: (NUMBER)   -1025 PTR W!  DUP 1+ C@ 45 = DUP >R  +
  0.  SWAP  BEGIN  CONVERT DUP C@  DUP 44 48 WITHIN
     SWAP 58 =  + WHILE  0 PTR W!  REPEAT  C@ 32 - ABORT" ?"
  R> IF  NEGATE  THEN ;
: NUMBER   'NUMBER @EXECUTE ;
```

Screen # 90

```
  ( Interpreter control)                          ( PLB*11/24/85)
CODE DEPTH ( - n)   S0 U) D0 MOV   S D0 SUB
   2 # D0 ASR   1 #Q D0 SUB-   D0 S -) MOV   NEXT
: -' ( - a t, p a f)  32 WORD  CONTEXT W@  HASH -FIND ; RECOVER
: ' ( - a)   -' ABORT" ?"  DROP ;
: INTERPRET   BEGIN  -' IF  NUMBER  ELSE  DROP EXECUTE
      DEPTH 0< ABORT" Stack empty"  THEN AGAIN ;   RECOVER

| CODE RESET   U R MOV   NEXT
| CODE CLEAR   >IN U) CLR   CNT U) CNT 1+ U) B. MOV   NEXT
: QUERY   S0 @ 80 EXPECT CLEAR ;

: QUIT   BEGIN  RESET  QUERY  INTERPRET   BASE W@ 10 BASE W! CR
  DEPTH 1- ?DUP IF 0 U.R THEN  DUP 10 = IF ." D" ELSE DUP 16 =
  IF ." H" ELSE DUP ." [" 0 U.R ." ]" THEN THEN ." >> " BASE
  W! AGAIN ; RECOVER   ' QUIT 'QUIT 2+ T!  ' EXIT ' X 4- T!
```

Screen # 91

```
( n-buffer Manager)   HEX
CODE ?ABSENT ( - a | n)   PREV 4+ # A0 MOV   NB AB D0 MOV
   1 #Q D0 W. SUB   BEGIN   A0 )+ D1 MOV   S ) D1 SUB
   D1 D1 ADD   0= IF   PREV 8 + # A0 SUB   A0 PREV AB W. MOV
   A0 D1 MOV   100 #W D1 MULU   NB 4+ AB D1 ADD   D1 S ) MOV
   ( - a) ' EXIT BRA  THEN   D0 DBRA   ( - n) NEXT

CODE ?UPDATED ( - a | a n)   PREV 2+ AB D0 W. MOV   NB AB D1 MOV
   2 # D1 ASL   BEGIN   4 #Q D0 W. ADD   D0 D1 W. CMP   0= IF
   D0 CLR   THEN   PREV AB D0 W. CMP   0= NOT UNTIL
   D0 PREV AB W. MOV   D0 PREV 2+ AB W. MOV   D0 A1 W. MOV
   100 #W D0 MULU   NB 4+ AB D0 ADD   D0 S -) MOV
   PREV 4+ # A1 ADD   A1 ) D0 MOV   7FFFFFFF # A1 ) MOV
   D0 TST   0< NOT IF   ( - a) ' EXIT BRA   THEN   1F # D0 BCLR
   D0 S -) MOV   D0 'BUFFER 4+ AB MOV   ( - a n) NEXT
```

Screen # 92

```
  ( 31-bit Block)

CODE UPDATE   PREV AB A0 W. MOV   PREV 4+ # A0 ADD
   15 # A0 ) BSET   NEXT

CODE ESTABLISH ( n' n - n)   PREV 2+ AB A0 W. MOV
   A0 PREV AB W. MOV   PREV # D7 MOV   4 S) 4 D7 +XL 0) MOV
   S )+ S ) MOV   NEXT

CODE IDENTIFY ( n a - a)   S )+ D0 MOV
  PREV AB A0 W. MOV   PREV # D1 MOV   D0 4 D1 +XL 0) MOV   NEX
```

Screen # 93

```
  ( Vectored block, buffer)   HEX
| CODE buffer   'BUFFER AB W MOV   colon BRA

: BUFFER ( n - a)   DISK GET  buffer  ESTABLISH
   DISK RELEASE ;

| CODE block   'BLOCK AB W MOV   colon BRA

: BLOCK ( n - a)   PAUSE ?ABSENT  DISK GRAB  block
   DISK RELEASE ;   ' BLOCK 4-   ' WORD 4+ T!

: FLUSH   NB @ 0 DO 7FFFFFFF BUFFER DROP  LOOP ;

: EMPTY-BUFFERS   PREV NB @ 4* 4+ ERASE
   NB 4+ @  NB @ 400 *  ERASE  FLUSH ;
```

Screen # 94

```
( BDOS SCREEN FILE FUNCTIONS )                    ( PLB*8/24/85)
DECIMAL
CREATE PFSCR  36 GAP
CREATE <SHADOW>  4 GAP
CREATE <MAXBLK>  4 GAP
: XLATE ( blk# - CP/M-record-# )
    DUP   0   <MAXBLK> @ 1+   WITHIN
    NOT ABORT" Error - Block Number Out of Range"
    <SHADOW> @ ?DUP
      IF
        2DUP < IF ( MAIN**) DROP 2*  ELSE
         ( SHADOW ***) - 2* 1+ THEN
      THEN   8 * ;

: SHADOWS  <SHADOW> @ ;
```

Screen # 95

```
( BDOS SCREEN FILE FUNCTIONS )                    ( PLB*8/24/85)
DECIMAL
CREATE FILES  0 ,
CREATE fcode  4 GAP
: (FILE)   ( BLK ADDR CODE -)   FILES GET
     fcode !
     SWAP XLATE SWAP
     8 0 DO  PAUSE
       2DUP  I 128 * + 26 BDOS DROP ( SET ADDRESS)
       I + ( RECORD #) PFSCR 34 + W!
       PFSCR  fcode @  BDOS  DROP
     LOOP 2DROP ;
( NOTE THAT ONLY 2 BYTES OF RECORD # ARE SET !!! )
```

Screen # 96

```
( BDOS SCREEN FILE FUNCTIONS )                    ( PLB*8/24/85)
HEX
: <OPEN-SCREEN>     PFSCR OF BDOS  FF =
          IF ." Screen File Open Error !!" CR THEN
    PFSCR 23 BDOS DROP
    PFSCR 22 + W@    8 / DUP 1- <MAXBLK> !  ( SET FILESIZE)
   PFSCR 9 + C@ 50 = PFSCR A + C@ 46 = AND
   IF 2 / <SHADOW> !   ELSE DROP 0 <SHADOW> ! THEN ;
: INIT     PFSCR 24 ERASE
     LOW-TPA 5C + PFSCR  0C MOVE
     <OPEN-SCREEN>  ;
: FLUSH FLUSH 0 30 BDOS DROP FILES RELEASE ;
DECIMAL
: BYE  FLUSH
     PFSCR 16 BDOS 255 = IF CR ." File Close Error" THEN
      0 0 BDOS ; RECOVER
```

Screen # 97

```
  ( Media switch)                                 ( PLB*10/15/85)
DECIMAL
CREATE 'FILE  ' (FILE) ,

: (BLOCK)   ?ABSENT  buffer 2DUP 33 'FILE @EXECUTE ( READ)
   ESTABLISH ;

: (BUFFER)   ?UPDATED  OVER 34 'FILE @EXECUTE ;  ( WRITE)

EXIT
NOTE-  EVENTUALLY PUT ERROR CODE IN DISK 4+
```

Screen # 98

Screen # 99

```
( Compiler)   HEX
FORTH : IMMEDIATE   8000 PREVIOUS  NAME 4- CFA 4+ NAME - -
   TW+!  VOC W@  0003 VOC W!  TARGET VOC W! ;
FORTH : [COMPILE]   FORTH  CONTEXT W@  0003 CONTEXT W!
   '  EXECUTE  CONTEXT W! ;   TARGET   HOST DECIMAL
| CODE ?ALLOT ( n - t)    H U) DO MOV   S )+ DO ADD   1 #Q DO ADD
   0 # DO BCLR   DO H U) MOV   250 # DO ADD   DO S CMP
      CS NOT IF   ' EXIT BRA   THEN   I S -) MOV   NEXT
: ALLOT ( n)   ?ALLOT ABORT" Dictionary full" ;   RECOVER
CODE ?CELL   S ) DO MOV   32768 # DO ADD   -65536 # DO AND
   DO S -) MOV   NEXT
: C, ( n)   HERE C!  1 H +! ;   : , ( n)   4 ALLOT  HERE 4- ! ;
: W, ( n)   2 ALLOT  HERE 2- W! ;
CODE COMPILE   H U) AO MOV   I )+ AO )+ MOV   AO H U) MOV  NEXT
: LITERAL ( n)   ?CELL IF COMPILE long  , ELSE
   COMPILE cell W,  THEN ;   IMMEDIATE
```

Screen # 100

```
   ( Defining words)
: ]   BEGIN  -' IF  NUMBER  [COMPILE] LITERAL
   ELSE  4+ @  0< IF  EXECUTE  DEPTH 0< ABORT" Stack empty"
      ELSE 4- , THEN THEN  AGAIN ;   RECOVER
CODE [   ' EXIT USE      IMMEDIATE
: [']   '  [COMPILE] LITERAL ;   IMMEDIATE
CODE CFA   S )+ AO MOV   6 #Q AO ADD   DO CLR   -2 O) DO B. MOV
   31 #W DO AND   1 # DO ASR   0= NOT IF
      1 #Q DO SUB   BEGIN   AO )+ W. TST   DO 0< NOT DBCC
   THEN   AO S -) MOV   NEXT
: USE ( a)   LAST @ @  CFA  ! ;
| : ;code   R> USE ;
FORTH : ;CODE   COMPILE ;code  SMUDGE  R> DROP  ASSEMBLER ;
   TARGET
FORTH : DOES>   COMPILE ;code  20153 W, does> , ;   TARGET
: SMUDGE   LAST @ @ 4+  DUP C@ 32 XOR  SWAP C! ;
```

Screen # 101

```
   ( Defined words)                                  ( PLB*12/07/85)
: CREATE   'CREATE @EXECUTE ;
: ,VW   FILE# @ 1024 *   BLK W@ +   W, ;  ( VIEW FIELD)
  HERE   'CREATE' ORG
: (CREATE) 0 ALLOT ,VW HERE 32 WORD CURRENT W@ HASH DUP LAST !
   DUP @ ,  SWAP C@  WIDTH C@  2DUP MIN  2+ -2 AND  ALLOT >
  32768 HERE  ROT 2* - W+!  0. ,  !  WIDTH W@ WIDTH C! ;CODE
'WCONSTANT' ORG   : WCONSTANT ( n)   CREATE W,  ;CODE ( - n)
'CONSTANT' ORG    : CONSTANT ( n)   CREATE ,   ;CODE ( - n)
'USER' ORG        : USER ( n)   WCONSTANT  ;CODE ( - a)
':' ORG           : :   CURRENT W@ CONTEXT W!  CREATE
                    SMUDGE ]  ;CODE                 ORG
: WVARIABLE   CREATE  0 W, ;   : VARIABLE   CREATE  0. , ;
: MSG   CREATE  ;CODE      FORTH
: MSG   CREATE  DOES>  COUNT TYPE ;
```

Screen # 102

```
  ( Compiler Directives)
: BEGIN ( - a)   HERE ;   IMMEDIATE
| : !BACK ( a)   HERE  -  W, ;
: UNTIL ( a)   COMPILE if  !BACK ;   IMMEDIATE
: AGAIN ( a)   COMPILE else  !BACK ;   IMMEDIATE
: THEN ( a)   HERE OVER -  SWAP W! ;   IMMEDIATE
: IF ( - a)   COMPILE if  HERE 0 W, ;   IMMEDIATE
: WHILE ( a - a a)   [COMPILE] IF  SWAP ;   IMMEDIATE
: REPEAT ( a a)   [COMPILE] AGAIN  [COMPILE] THEN ;   IMMEDIATE
: ELSE ( a - a)   COMPILE else  HERE 0 W,
   SWAP  [COMPILE] THEN ;   IMMEDIATE
: DO ( - a)   COMPILE 2>R  HERE ;   IMMEDIATE
: LOOP ( a)   COMPILE loop  !BACK ;   IMMEDIATE
: /LOOP ( a)   COMPILE /loop  !BACK ;   IMMEDIATE
: +LOOP ( a)   COMPILE +loop  !BACK ;   IMMEDIATE
: ;   COMPILE EXIT  SMUDGE  R> DROP ;   IMMEDIATE   EXIT
```

Screen # 103

```
  ( Generic words)
: VOCABULARY ( n)   WCONSTANT  ;CODE      FORTH
: VOCABULARY ( n)   (CREATE) W,  DOES>  W@ CONTEXT W! ;

HEX 0013 VOCABULARY ASSEMBLER
    0001 VOCABULARY FORTH

: CODE   CREATE  HERE USE  ASSEMBLER ;
: ;CODE   COMPILE ;code  SMUDGE  R> DROP  ASSEMBLER ;
   IMMEDIATE        does>
: DOES>   COMPILE ;code  4EB9 W, LITERAL , ;   IMMEDIATE
DECIMAL
```

Screen # 104

```
  ( Miscellaneous)
: EMPTY   H 4+ @ H !  GOLDEN CONTEXT 36 MOVE ;
: GILD   CONTEXT GOLDEN 36 MOVE  HERE H 4+ ! ;
: STRING ( n)   -4 ALLOT  WORD C@  4+ 1+ ALLOT ;
: ABORT" ( t)   COMPILE abort"  34 STRING ;   IMMEDIATE
: ."   COMPILE dot"  34 STRING ;   IMMEDIATE
: .(   41 WORD COUNT TYPE ; IMMEDIATE
: DECIMAL   10 BASE W! ;
: HEX   16 BASE W! ;
: LOAD ( n)   >IN @ >R   0 >IN W!  BLK W!   INTERPRET
   R> >IN !  DECIMAL ;
: THRU ( f l)   1+ SWAP DO  I LOAD  LOOP ;
: (   41 WORD DROP ;   IMMEDIATE
: $   64  >IN W@  OVER MOD  -  >IN W+! ; IMMEDIATE
CODE R@ ( - n)   R ) S -) MOV   NEXT
```

Screen # 105

```
$ Miscellaneous, Cont.                                 ( PLB*02/01/86)

CODE SP ( -n)   S DO MOV   DO S -) MOV   NEXT

: DEFINITIONS   CONTEXT W@  CURRENT W! ;
```

Screen # 106

```
   ( Initial RAM)   HEX                                ( PLB*01/29/86)
CREATE OPERATOR  ( 76 bytes)  'OPERATOR ,   'OPERATOR BO - ,
   4EF9 W,  'OPERATOR ,  0 ,   'OPERATOR  BO - ,
   0 W,  0 ,  40 W,  ' (CR) ,  ' (PAGE) ,  ' (TAB) ,
   ' (MARK) ,  ' (TYPE) ,  ' (KEY) ,  ' (?TERM) ,
LABEL H'S  8 GAP   ' (EXPECT) ,  ( base) 0A W,   ' (ABORT) ,

CREATE ram  ( 70 bytes)  1 W, 20 GAP 1 W,
   ' (BLOCK) ,  ' (BUFFER) , 0 ,  ' (NUMBER) ,
   ' (CREATE) ,  nb , FIRST ,  0 , 0 W, ( DISK)

CREATE XYZ GIVE ,
```

Screen # 107

```
  ( Power up)   HEX                                    ( PLB*11/09/86)
: COLD   XYZ @ BO ! ram GOLDEN 46 MOVE
   OPERATOR 8 + STATUS  DUP 100 ERASE  44 CMOVE
   POST 6 ERASE  2 WSZ C!  1F1F WIDTH W!  0 SCR !
   PAGE  EMPTY  EMPTY-BUFFERS ( INIT )
   ( ." polyFORTH/32  19 June 1985"  CR ) ;
CREATE 'INIT   ' COLD ,
LABEL START ]  'INIT @EXECUTE ABORT [
LABEL POWER-UP $ 3E #Q DO MOV  4E42 W, $ TRAP2 - SET SUPRV STATE
   START # I MOV
   'OPERATOR DUP # U MOV  BO - # S MOV   U R MOV
   'NEXT # A2 MOV   D2 S -) MOV   NEXT
 HERE   PROM ORG 601A W,   DUP PROM 1C + - ,   ( #BYTES)
   0 , 0 , 0 , 0 , PROM 1C + , FFFF W,
   POWER-UP AB JMP    ORG
```

Screen # 108

```
  ( Mixed arithmetic)
LABEL umul   D3 D4 MOV   D1 D4 MULU   D4 D6 W. MOV   D4 W. CLR
   D4 SWP   D2 D5 MOV   D1 D5 MULU   D4 D5 ADD   RTS
LABEL mudiv   DO D5 DIVU   D5 D4 W. MOV   D5 SWP   D6 SWP
   D5 D6 W. MOV   D6 SWP   DO D6 DIVU   D4 SWP
      D6 D4 W. MOV   RTS
CODE */ ( n n n - n)   S )+ RL MMOV DO D1 \\
   S )+ RL W. MMOV D2 D3 \\   umul BSR
      D2 TST   0< IF   D5 SWP   D1 D5 W. SUB   D5 SWP   THEN
      D1 TST   0< IF   D2 SWP   D3 D2 W. MOV   D2 D5 SUB   THEN
   DO D3 W. MOV   0< IF   DO W. NEG   THEN
   D5 TST   0< IF   DO SWP   DO D5 ADD   DO SWP   THEN
      mudiv BSR   D3 W. TST   0< IF   D4 NEG   THEN
   D4 S -) MOV   NEXT
```

Screen # 109

```
  ( math subroutines)   HEX
LABEL udiv   D3 W. CLR   D0 D1 DIVU   800 ( OV) IF
      D1 D2 W. MOV   D1 W. CLR   D1 SWP   D0 D1 DIVU
      D1 D3 W. MOV   D2 D1 W. MOV   D0 D1 DIVU   THEN
   D1 D0 MOV   D0 SWP   D3 D0 W. MOV   D0 SWP
   D1 W. CLR   D1 SWP   RTS

LABEL mul   D1 D3 MOV   D1 D4 MOV   D4 SWP   D2 D5 MOV
   D5 SWP   D2 D1 MULU   D4 D2 MULU   D5 D3 MULU   D1 SWP
     D2 D1 W. ADD   D3 D1 W. ADD   D1 SWP   RTS

LABEL sdiv   D0 D4 W. MOV   0< IF   D0 W. NEG   THEN
   D4 SWP   D1 D4 EOR   D1 TST  0< IF   D1 NEG   THEN
   udiv BSR   D4 TST   0< IF   D0 NEG   THEN   RTS
```

Screen # 110

```
( Target compiler log)
: **   ." **" ;
: LOAD ( n)   CR  DUP BLOCK  DUP C@  40 ( left paren) = IF
   **  DUP 64 -TRAILING TYPE  **  CR  THEN  DROP
     DUP 4 U.R SPACE  LOAD  DEPTH IF .S  THEN ;

: THRU ( f l)   1+ SWAP DO  I LOAD LOOP ;
: ?SPACE   C# W@ + 2+ 78 > IF  CR 5 SPACES  THEN ;
: LOG ( a - a)   BASE W@ HEX  OVER <# #S #>  DUP AHEAD C@ +
   ?SPACE  TYPE SPACE  AHEAD COUNT TYPE  SPACE  BASE W! ;

: .WHERE   BASE W@ HEX  OVER <# 41 HOLD #S 40 HOLD #>
   DUP ?SPACE  TYPE  BASE W! ;
: HELP ( n)   PAGE ;
```

Screen # 111

```
( PROM Assembler)   HEX
000D VOC W!   0 ?TWO W!   FORTH 1F1F WIDTH W! HOST
  ASSEMBLER DEFINITIONS
' W@ EMPLACE TW@        ' W! EMPLACE TW!
' C! EMPLACE TC!        ' W+! EMPLACE TW+!
: GAP ( n)   DUP 1 AND +  H +! ;    : ORG ( a)   H ! ;
  1 CREATE MODES  00204000 , 0060E000 , 80A0C000 ,
  DECIMAL   112 119 THRU
WAIT CONSTANT WAIT
: U) ( a)   STATUS - 3) ;      HEX

000B VOC FORTH W!    1 ?TWO W!   FORTH 1F1F WIDTH W! HOST
  HOST DEFINITIONS
    HERE 7 U.R
```

Screen # 112

```
  ( 68000 Assembler)   HEX
| : MR>   POST 6 ERASE  2 WSZ C! ;
| : (EA) ( - a)   S/D DUP C@ + ;
| : +S/D ( m)   1 S/D C+!  (EA) C+! ;

FORTH : REG   WCONSTANT  DOES> W@ +S/D ;
   00 REG D0   01 REG D1   02 REG D2   03 REG D3
   04 REG D4   05 REG D5   06 REG D6   07 REG D7
   08 REG A0   09 REG A1   0A REG A2   0B REG U    0C REG A4
   0C REG W    0D REG I    0E REG S    0F REG R    FF REG RL
: W.   1 WSZ C! ;      : B.   0 WSZ C! ;

| : !AHEAD ( a n)   DUP >R  POST C@ PAD +
     SWAP 2- IF  W!  ELSE  !  THEN  R> 2*  POST C+! ;
: AB ( a)   DUP -8000 AND  0= NEGATE 2+  DUP 37 + +S/D  !AHEAD ;
```

Screen # 113

```
  ( Addressing modes)   HEX
FORTH : IND   WCONSTANT  DOES> ( x)   W@ (EA) C+! ;
FORTH : IMM   WCONSTANT  DOES> ( n)   W@  DUP +S/D  40 /
    ?DUP IF  1-  DUP WSZ C!  1 MAX !AHEAD  THEN ;
FORTH : OFS   WCONSTANT  DOES> ( n)   W@ +S/D  1 !AHEAD ;
FORTH : NDX   WCONSTANT  DOES> ( n r)   W@  SWAP OFF AND +
    (EA) C@ 1000 * +  8 (EA) C!  -1 S/D C+! ;

   08 IND )     10 IND )+    18 IND -)
   28 OFS 0)    29 OFS 1)    2A OFS 2)    2B OFS 3)    2C OFS 4)
   2C OFS W)    2D OFS I)    2E OFS S)    2F OFS R)
   3C IMM #Q    7C IMM #B    BC IMM #W    FC IMM #
   00 NDX +X   800 NDX +XL

: PC) ( a)   (EA) 1+ C@ 0= NEGATE  DUP 7 AND  33 + +S/D
    IF HERE 2+ -  THEN 1 !AHEAD ;
```

Screen # 114

```
  ( Unary and binary opcodes)   HEX
| : ,POST ( a)   POST C@  DUP 80 AND IF  SWAP 2+ SWAP  THEN
     HERE 2+  SWAP 7F AND  DUP 2+ GAP  CMOVE  MR> ;
| : !OP ( o)   HERE TW!  PAD ,POST ;
| : OPERAND ( o 'f 'm - o')   MODE + C@  3F AND
     SWAP IF  8 40 */MOD +  40 *  THEN + ;

FORTH : UNI   WCONSTANT  DOES> ( mr)   W@  DUP C0 AND
     0= IF  WSZ C@ 40 * +  THEN  0 0 OPERAND  !OP ;
FORTH : M/M   WCONSTANT  DOES> ( mlr mlr)   W@ 8 /MOD
     WSZ C@ ROT AND  8 * +  MODE C@ 8 /MOD  0= NEGATE ROT +
     8 * +  (EA) C@ 7 AND  200 * +  !OP ;

: MOV ( mr# mr)   MODE C@ 3C - IF   WSZ C@  2 4 */MOD + 1+
     1000 *  1 1 OPERAND  0 0 OPERAND  !OP  EXIT THEN
   FF AND  (EA) C@ 200 *  7000 + +  W, MR> ;
```

Screen # 115

```
  ( Binary opcodes)   HEX
| : @OP-MODE ( n - o')   4* WSZ C@ +  MODES +  C@ 2* ;

| : -QUICK ( o - o l | o 'f 'm 0)   MODE C@ 3C -  ?DUP 0= IF
     9005 - IF 5000  ELSE 5100  THEN  0 @OP-MODE +
     SWAP 7 AND  200 * +  0 1  0 THEN ;

| : -CONFUSED ( o - o l | o 'f 'm 0)   MODE C@ 3C > IF
     DUP 1 AND IF  -2 AND  (EA) C@  OF 8 WITHIN IF  100 *
        0 @OP-MODE +  0 1  0 EXIT  THEN THEN THEN  1 ;

FORTH : R/M   WCONSTANT  DOES> ( rm#q r | r rm)   W@
   -QUICK IF  -CONFUSED IF  -10 AND  (EA) C@ 8 /
        2 MIN @OP-MODE  OVER OR >R  B100 =
        (EA) C@ OF >  + IF  0 1 MODE  ELSE  0 0 (EA)  THEN C@
        7 AND 200 *  R> +  ROT ROT  THEN THEN  OPERAND  !OP ;
```

Screen # 116

```
  ( Register ops)   HEX
FORTH : 1RG   WCONSTANT  DOES> ( d)   W@
     WSZ C@ 1-  40 * +  0 0 OPERAND  !OP ;
| : OPMODE ( r r - r r n)   OVER 8 < OVER 8 < AND IF  40
   ELSE  2DUP AND 8 AND  -8 *  88 + >R
   7 AND SWAP 7 AND SWAP  R>  THEN ;
: EXG   (EA) C@  (EA) 1- C@  OPMODE >R  200 * +  R> +
   C100 +  W,  MR> ;
FORTH : SHFT   WCONSTANT  DOES> ( dl# d | m)   W@
   MODE C@  3C 8 WITHIN IF  F138 AND  MODE C@
      DUP 8 > IF  DROP  F118 AND  PAD @ 7 AND  0 POST C!  THEN
      8 *  WSZ C@ +  40 *  (EA) C@ + +
   ELSE  FFC0 AND  0 0 OPERAND  THEN  !OP ;
FORTH : BITS   WCONSTANT  DOES>  W@
   MODE C@  DUP 8 > IF  DROP  100 -  4  7E POST C+!  THEN
   200 * +  0 1 OPERAND  !OP ;
```

Screen # 117

```
  ( Exceptional instructions)   HEX
: PMOV   (EA) C@  5  MODE C@  DUP 7 > IF  SWAP 2- ROT  THEN
     8 * +  WSZ C@ +  40 * +  20 -  !OP ;
: MMOV   MODE C@ FF = NEGATE  4C80  WSZ C@ 1-  40 * +  OVER IF
     (EA) C@  20 28 WITHIN  WSZ 1+ C!  400 -  THEN
   0 ROT NEGATE OPERAND  0  S/D 3 ERASE ;
| : MIRROR   0 SWAP  10 0 DO  2 /MOD >R + 2* R>  LOOP DROP 2/ ;
| : 2**N   1  I' -1 DO  2* LOOP  2/ + ;
: \   0  (EA) C@ 1+ MODE C@ DO  2**N LOOP  WSZ 1+ C@ IF  MIRROR
   THEN +  S/D 3 ERASE ;
: \\   \  PAD  ROT W,  SWAP HERE TW!  ,POST  MR> ;
B00D | R/M CMP
: CMP   MODE W@  CMP 3838 AND 1818 = IF  HERE 2- DUP TW@
   FFEF AND  SWAP TW!  THEN ;
```

Screen # 118

```
  ( Opcodes)   HEX
4000 UNI NEGX    4200 UNI CLR     4400 UNI NEG     4600 UNI COM
4840 UNI PEA     46C0 UNI MTSR    4A00 UNI TST     4AC0 UNI TAS
4E71 UNI NOP     4E72 UNI STOP    4E73 UNI RTE     4E75 UNI RTS
4E77 UNI RTR     4E80 UNI JSR     4EC0 UNI JMP     4E70 UNI RESET
C1C0 R/M MULS    C0C0 R/M MULU    81C0 R/M DIVS    80C0 R/M DIVU
4101 R/M LEA     8001 R/M OR      C003 R/M AND     B10B R/M EOR
9005 R/M SUB     D007 R/M ADD                      8108 M/M SBCD
910B M/M SUBX    B10B M/M CMPM    C108 M/M ABCD    D10B M/M ADDX
E0E0 SHFT ASR    E1E0 SHFT ASL    E2E8 SHFT LSR    E3E8 SHFT LSL
E4F0 SHFT ROXR   E5F0 SHFT ROXL   E6F8 SHFT ROR    E7F8 SHFT ROL
0100 BITS BTST   0140 BITS BCHG   0180 BITS BCLR   01C0 BITS BSET
47C0 1RG NBCD    4800 1RG SWP     4880 1RG EXT
4E18 1RG >USP    4E20 1RG <USP    4E10 1RG UNLK
4E72 UNI STOP ( n W,)             4E08 1RG LINK ( n W,)
```

Screen # 119

```
  ( Transfers)   HEX
400 WCONSTANT CS   600 WCONSTANT 0=   800 WCONSTANT VS
A00 WCONSTANT 0<   F00 WCONSTANT 0>   : NOT   100 XOR ;

| : ?PIECE ( n)   8000 -8000 WITHIN  ABORT" Jump range" ;
| : -BYTE ( a a - n t)   -  DUP 80 -80 WITHIN  OVER ?PIECE ;
: UNTIL   6000 + W,  HERE -BYTE IF W,  ELSE HERE 1- TC!  THEN ;
: BRA   0 UNTIL ;       : BSR   100 UNTIL ;

: THEN   HERE OVER -BYTE ABORT" Jump range"  SWAP 1- TC! ;
: IF   6000 + W,  HERE ;       : ELSE   0 IF  SWAP THEN ;

: DBCC   MODE C@ +  50C8 + W,  HERE -  DUP ?PIECE  W,  MR> ;
: DBRA   100 DBCC ;       : NEXT   A2 ) JMP ;
: ,NEXT   I )- W MOV   W )+ A0 MOV   A0 ) JMP ;
```

Screen # 120

Screen # 121

Screen # 122

Screen # 123

( Release notes)

1. Interrupt code for OPERATOR and TYPIST's serial ports does not reliably detect control-S. This can cause buffer overflow when printing on serial printers. A temporary fix is to put a time delay in TYPIST's (CR) .
2. 2@ and 2! have been renamed to 2W@ and 2W! .
3. The assembler has been replaced. Many bugs have been fixed.
4. Database Manager and Documentor replaced.
5. Many shadow blocks have been improved.
6. NEXT is expanded in-line for critical nucleus words for performance reasons.
7. Editor replaced.
8. Entire nucleus replaced. Much of the code is the same, but some improvements have been made.

Screen # 124

( Release notes)

9. Source code has been reorganized to be more like other versions of polyFORTH II.
10. CLOCK utility added. This sets a battery-backed clock if you have one.
11. NETWORK utility added to transfer blocks between polyFORTH computers over a serial port.

Screen # 125

Screen # 126

Screen # 127

Screen # 128

Screen # 129

These words deal with the programming environment:
U< is an unsigned compare.
IMMEDIATE marks the last word defined as immediate (executed during compilation) It is useful for adding to the compiler.
DEFINITIONS permits words to be defined in vocabularies other than FORTH .
[COMPILE] compiles an immediate word. It is useful only when writing compilers (see the FORTH compiler directives).
.( starts a comment ended by ) which will be typed immediately
'HEAD returns the address of the 1st byte of the word which follows in the input stream ( with B/H subtracted).
VIEW types the source block of the next word. It relies upon the version of CREATE loaded in Block 9.
FORGET forgets the next word and all words defined more recently than it. It strips the 8 dictionary chains back to before the word being forgotten. It won't forget the nucleus.

Screen # 130

~ causes the next word to be compiles with a full length name.

Screen # 131

2W@ fetches two words from the longword at a .
2W! stores two words into the longword at a .

Screen # 132

M*/ is an mixed precision version of */ , which allows multiplication of a signed 31-bit integer by a ratio of 16-bit numbers, with a 48-bit intermediate product, giving a precise signed 31-bit result.

H* is a 16 * 16 —> 32 hardware multiply
H/ 32 / 16 —> 16 hardware divide

Screen # 133

The commands in this block are used by the DISKING utility and the Data Base Support System.

-TEXT takes the address of two strings and a count and returns a +1 if the 1st string has a higher ASCII value, -1 if it has a lower value, and 0 (false) if they are equal.
Note that the comparison is longword-by-longword.
Pronounced 'not-text'.
<TEXT is like -TEXT , but returns 'true' if the 1st string has a lower value, 'false' otherwise.

TEXT takes a delimiter and parses the input stream, moving the string from the current input pointer to PAD until the end of the input stream or the delimiter is encountered.
2OVER copies double number second on stack to top of stack.

Screen # 134

>< and >W< perform byte and word swaps on the top stack item.
TALLY increments the value at a given address by 1.

GILD makes the dictionary contents permanent.
ASSIGN provides a facility for giving behavior to a vectored execution variable.
The usage is as follows:
VARIABLE THAT
: THIS THAT ASSIGN ... code to be vectored to ... ;
execution of THIS causes the address of the code following ASSIGN in the definition to be stored in THAT.
THAT @EXECUTE
causes the vector to be executed.

.S prints the stack, non-destructively.
" behaves like ( . It's useful for commenting assembler code.

Screen # 135

This block is loaded when, after booting, the operator types HI . The routines loaded here are in the common dictionary which is available to all users.

<CREATE> This compiles, before each new entry, the block number in which the source resides. The cost is 2 bytes/entry. This information is used by LOCATE to display the block. To disable this feature, change B/H to 0 and put parens around the phrase ' <CREATE> 'CREATE !

Additional terminal tasks (if any) should be prompted after the code on Line 10 and before the GILD .

Line 15 is the product release date. Please don't change it.

Screen # 136

HIS takes a task address and user variable name and returns the address of that user variable in that task's user area.
BACKGROUND sets up the task definition table for a non-terminal task, given user area size and stack sizes.
BUILD takes the address of a table set up by BACKGROUND and and builds the task's user area in RAM. In a target compiled application this is done in the target's power-up code.

The version of BACKGROUND here is for resident applications. For an application to be target compiled, this definition must be preceded by FORTH to make it HOST definition. If the application is in PROM, change HERE to THERE , and remove the 4+ and the 4- . BUILD must be in the target dictionary, and is normally executed as part of the start-up initialization code.

Screen # 137

The version of TERMINAL given in this block is for resident applications only. For an application which is to be Target Compiled, it must be preceeded by FORTH in order to make it a HOST defintion. CONSTRUCT , on the other hand, must be in the target dictionary, and is normally executed as part of the start-up initialization code.

See shadow for Block 26 for further information on target compilation of terminal tasks.

Screen # 138

Refer to Block 75 and the CPU Supplement for a map of the user variables initialized here.
The arguments on the stack when this block is entered are:
n size of the entire terminal partition
a device address This block is a good example of the use of interpretive execution to perform non-time critical and infrequently used procedures.

12/07/85 PLB - Modified to make a TASK: word !!!!

Screen # 139

( PLB*04/19/87)

CTLY-VEC allows the user to specify a routine to be executed before the CTLY action is taken !!!

Screen # 140

```
$ ON/OFF words                                    ( PLB*05/08/86)
CODE ON    $ ( addr-)

CODE OFF   $ ( addr-)

CODE TALLY   $ ( addr-)

CODE TALLY   $ ( addr-)

CODE W-ON    $ ( addr-)

CODE W-OFF   $ ( addr-)

CODE W-TALLY $ ( addr-)
```

Screen # 141

These routines provide convenient control and access to the clock whose interrupt routine is in Block 12.

EST sets the time. Change it to match your time zone.

(TIME) makes a string of format hh:mm given the number of minutes since midnight.

Note that @TIME (which returns the number of minutes since midnight) handles the automatic roll-over at midnight. It will run for a few days without having to be queried.

COUNTER and TIMER are used like this:
COUNTER process-to-be-timed TIMER ( return) #ms
Remember that since the clock is 100 Hz, COUNTER ... TIMER is only accurate to +- 10 ms .

Screen # 142

This calendar converts days since 1 JAN 1900 to and from that form and internal MJD. This calendar is most useful when dates are predominantly in the current year.

Remember to edit the default setting of the year in Block 9 every January!

Setting the date: 27 DEC NOW
When you need to set the year: 1985 A.D.
Typing the date: TODAY @ .DATE ( return) 27 DEC 1985

Both calenders (Blocks 30 and 31) store the date as a 16-bit count of the days since JAN 1, 1900, which was a Sunday.

DATED produces a dated help screen (see SYSTEM ).

Screen # 143

This calender is appropriate for applications in which dates entered are disrtibuted over many years ( birthdays, etc) The internal form of dates is compatible with the 'month-name' version in the previous block.

To set the date: 12/27/85 NOW
To type the date: TODAY W@ .DATE ( responds) 12/27/85 ok Both calenders (Blocks 30 and 31) store the date as a 16-bit count of the days since JAN 1, 1900, which was a Sunday.

DATED produces a dated help screen (see SYSTEM ).

Screen # 144

This utility is designed to produce program listings. Its use is documented in its "help screen".
A number of options are provided. The simplest is singlesided output. Alternatively, the program may print blocks on both sides of the paper, or may print the program on one side and the corresponding "shadow blocks" on the facing page.
The procedure for obtaining double-sided output is given in the next two blocks.

To change the line at the bottom of each page, modify C or Line 15, whichever is easiest.
INDEX can safely be started at Block 0 (it prints blanks for Blocks 0-8). It's good to begin major applications on 60 block boundaries, so INDEX prints 60 lines to a page. Load blocks, and blocks beginning a series of blocks, should not have their comment on Line 0 indented.

Screen # 145

( PLB*11/15/86)

Screen # 146

Screen # 147

Screen # 148

Screen # 149

Screen # 150

Screen # 151

Screen # 152

Code to get from low-level to high-level FORTH and vice-versa.

Usage is as follows:

```
CODE TEST  code  [[  FORTH HIGH-LEVEL ]]  code   NEXT
CODE TEST   code  [[  FORTH HIGH-LEVEL   ;  SMUDGE
: TEST   high-level  ]]  low-level code  [[  high-level ;
: TEST   high-level  ]] low-level code  NEXT  SMUDGE
```

Screen # 153

Screen # 154

$ *LFILL, *WFILL, *MOVE, *WMOVE                ( PLB*03/16/86)

These words were added because of the DBRA instruction.

The DBRA instruction has a limit of 65535 times through the loop. This causes a truncation of the count if the requested count is more than 65535.

Screen # 155

Screen # 156

$ 68000 Trap Diagnostic Words                ( PLB*04/09/86)

NEED TO DO FOLLOWING ALSO:

```
OPERATOR AB U MOV U R MOV  'NEXT # A2 MOV
    1)  RESTORE U REGISTER
    2)  RESTORE POINTER TO NEXT
```

Only the HOST needs to go back to USER mode.

Screen # 157

Screen # 158

Screen # 159

$ MACRO TEST

```
M: TEST-M   3 4 5 + + . ;M

: TEST2     ." HELLO" CR
       TEST-M
            ." GOODBYE" CR ;
```

Screen # 160

Bit set and test words

BIT-SET allows a single bit to be set in a bit array

BIT-CLR allows a single bit to be cleared in a bit array

BIT-CHG allows a single bit to be toggled in a bit array

BIT-TST allows a bit to be tested in a bit array

Note that a BIT-TAS ( bit test and set ) would simply be a copy of BIT-TST with a "DO A0 ) BTST" before the ,NEXT

Screen # 161

CASE statement taken from PROLOG.BLK for L&P F83

Screen # 162

Screen # 163

Screen # 164

Screen # 165

Screen # 166

Screen # 167

Screen # 168

Screen # 169

This block provides compatibility between Target Compiler usage for testing an application which is destined to be target compiled in a resident environment. The major differences are:

1. RAM is segregated into a separate region, whose allocation is controlled by 'R , THERE , and special versions of ALLOT , VARIABLE , and CVARIABLE .
2. Simulated versions are provided for words which exist only in the target compiler, such as LABEL , EQU and ORG . Their behavior is functionally compatible.
3. Dummy versions are provided for words that are relevant only in target compiling such as HOST , and ! .

When you are ready to test your application with this block construct two load blocks: one which loads this block before your application and one for use when actually target compiling. See Targeting FORTH for more details.

Screen # 170

This is the principle load block for the Target Compiler.
NEW is the block where the target code will begin.

LOG is a dummy for a logging word that prints names and addresses. The real version is in Block 110.
HEAD allots space for the target dictionary heads.
HDS stores the current and default size of a dictionary header.
?TWO indicates whether HOST definitions of target constants are desired.
'H is the target H . VOC is the target CONTEXT .
ORG sets 'H , HERE gets it and GAP increments it.
'R is the next available location in target RAM.
THERE gets 'R and ALLOT increments it.
W0 is the target address of the beginning of target code.
WINDOW sets W0 and initializes the other variables.

Screen # 171

NAME returns the address of the name of the last word defined.
PREVIOUS returns its target address.
-' searches for a word in the target dictionary.

FORTH is an immediate vocabulary used with HOST .
HOST is an immediate vocabulary in which host definitions and host versions of target definitions are placed.
ASSEMBLER is the target assembler vocabulary.

HASH is a redefinition of host's dictionary hash algorithm used to re-hash for the target vocabulary.
TARGET moves the last definition from host's vocabulary to the (unnamed) target vocabulary.

TWIN constructs a host version of a target CONSTANT .
SIAMESE constructs a host version of a target WCONSTANT .

Screen # 172

This is the HELP screen for the Target Compiler.

The words at the bottom of the screen provide headings for addresses generated at compile time, to inform the programmer of the progress of the compile and the sizes of various components of the system. The two numbers under "Nucleus" give the last byte of ROM and RAM used, respectively. "Edit" and "Asm" report the last addresses in the editor and assembler. The last two numbers report the final addresses in PROM and RAM.

Screen # 173

This version of memory access words compiles target code into RAM. Block 49 compiles onto disk.

Most words are analogous to those in Block 49

RAM is a 18 K-byte array for storing the target dictionary

FLUSH is redefined to copy RAM onto disk starting at block NEW .

The last thing in a target load block should be HOST FLUSH

Screen # 174

Screen # 175

EMPLACE constructs a target definition. When executed it will compile a reference to itself.
(CREATE) constructs a target entry. It includes a header if HDS indicates and links into the vocabulary indicated by by VOC .
CODE creates a target CODE entry.
EQU (for equate) defines a host constant ( CONSTANT will be redefined).
LABEL names the current position in the target dictionary.
STRING constructs a string in the target dictionary.

MODES is an array of addressing mode constants.
BEGIN and U) as well as all other assembler words are redefined to compile into the target dictionary.
USE is also so redefined.

Screen # 176

The words in this block are redefined to act on the target dictionary as their host counterparts act.

Note that all dictionary searches are restricted to the target (unnamed) vocabulary.

Screen # 177

These words redefine the standard structure words in Block 102 to use the new target run-time code.

The word ( is redefined to work inside target definitions.

Screen # 178

These words provide the compile-time code that must be attached to the run-time code previously assembled.
Exactly the right-sized gaps were left in the dictionary and are now being filled. Those gaps (Blocks 63 and 64) must be adjusted if changes are made here.

Two versions of VARIABLE and 2VARIABLE are provided for either PROM or RAM. PROM variables point to their value from their parameter field. System variables are stored in high RAM for security and memory protection, thus look like PROM variables. PROM variables are selected by FORGETting the RAM version of VARIABLE (in Block 60).

Screen # 179

This screen editor uses simple, visible, 1-letter commands. It is compatible with previous polyFORTH editors and with the instructions in Starting FORTH. Its modifications support cursor positioning commands which are present on most CRTs marketed today. Versions of these commands are available in Blocks 59 and 156-164. See instructions there and in Block 10 for selecting the version most appropriate for you.
Notice that not all words defined in this section are in the EDITOR vocabulary: those in Blocks 55, 58, and 59, plus T N and B here are in FORTH . T enters EDITOR .
WIPE erases the current ( SCR ) block to blanks, with 0 in the first word.
M copies the current line under a specified block and line.

Screen # 180

These words, though intended for editing support, are in the FORTH vocabulary.

>TYPE types a line after moving it to PAD . This is necessary because in a multi-user environment you can't type from a block buffer.

LIST lists a block in the form in which you see it now.
L lists the current block, and selects EDITOR .
COPY copies a block from one block number to another.
Note that this done by changing the buffer ID; thus if you have changed the block since it was last written, only the new location will contain the new information.

Screen # 181

This editor uses two string buffers, a "find" buffer ( #F ) and an "insert" buffer ( #I ). Their use is described in Starting FORTH.

T types a given line, leaving the cursor at its beginning.
P puts text following or the insert buffer in the current line.
X deletes the current line, moving lower lines up, with blank fill from the bottom.
U inserts the text following or the insert buffer under the current line, moving lower lines down and dropping line 15 off the bottom.
K Swaps the insert and find buffers.

Screen # 182

TILL deletes all the text from the character pointer up to the find buffer. TILL sets the find buffer. The usage is: TILL pattern
E deletes backward from the character pointer, the number of characters in the find buffer. It is most commonly used for deleting a piece of text which has been found by F .
I inserts text and sets the insert buffer. Usage: I text
D searches for and deletes the first occurance of the find buffer. D sets the find buffer. The usage is: D pattern
F finds the test in the find buffer. It also sets the find buffer. The usage is: F pattern
R replaces text found by F with the text in the insert buffer and sets the insert buffer. The usage is R text
S searches the blocks from SCR to the block whose number is the argument to S for a match on the pattern. Usage: n S pattern

Screen # 183

-MATCH takes the text address ( d ) and the text length (the first n ) and tries to find a find buffer match in it. The find buffer begins at ( s ) and has a length of the 2nd ( n ). If the search is successful, the values returned are a 'false' and the address of the end of the string. If the pattern is not found, the values returned are a 'true' and garbage.
<CMOVE is a backward character move. It is useful for copying a field to an overlapping field in higher memory.
CMOVE takes the same arguments as MOVE but move one byte at a time on all processors. Its use is guaranteed to be processor independent and transportable.

Screen # 184

This block contains the hardware-specific features needed to implement the 'screen editor'. They are implemented in such a way that you may easily modify the key words for any CRT with a simple cursor-positioning function.

(TAB) Given line (0-23) and column (0-80), positions the cursor to that position.
(MARK) The purpose of this routine is to highlight the position of the editing cursor, by whatever means the hardware permits: reverse video, underlining, etc. If none of these features are available, insert a caret (hex 5E). Given an address and count of a string to be highlighted, sets the highlighting, outputs the string, and resets it.

Screen # 185

The definitions loaded in this block define polyFORTH for 68000 computers, without consideration for any environment-specific features such as disk and terminal drivers.

The "nucleus" definitions include run-time code for the compiler words ( : , etc.). Target words which compile these addresses are subsequently defined. Thus there can be only CODE definitions until Blocks 51-53 are loaded.

The compiler in Blocks 99-104 and the assembler in Blocks 111-119 are the ones for the target system's programmer. These may not be present in target compiled applications except under license from FORTH, Inc.

Screen # 186

This block controls the entire target compilation of the system, including both standard FORTH features (Block 60) and configuration characteristics: disk & terminal drivers, amount of memory, number of disk buffers, presence/absence of heads, etc. Consult the Target Compiler documentation for a discussion of specific details.
Note that there are 220 bytes allocated for system variables (they are defined in Block 75). If you wish to define additional variables in this area this number must be changed if the required space exceeds 220 bytes. The 256 refers to the size of OPERATOR's user area.

See also the documentation for Block 47.

Screen # 187

Screen # 188

':' A gap left at compile time, into which the target system's compiler (Block 101) will compile the high-level portion of : Target applications without a compiler may recover this space by defining : GAP DROP ;
colon The run-time code for all : definitions. Note that it falls through to 'NEXT instead of doing a NEXT or a ,NEXT .
EXIT In addition to its glossary definition, EXIT is the run-time code for ; .

cell The run-time code for literals compiled in definitions
long The run-time code for 32-bit literals in definitions.

Screen # 189

Following the model discussed in the previous block, this block defines the run-time code for more compiler words, with GAPs left for the compile-time code to be added later.

Screen # 190

These definitions are the run-time code for the compiler directives that form structures, whose names are the upper-case equivalents.
2>R is the run-time code for DO . It is so named and allowed to keep its head because it is occasionally useful as a double-length version of >R .

The BEGINs on Lines 9 and 11 mark the beginning of code shared by loop , +loop , and /loop .

Screen # 191

These simple primitives are excellent examples of FORTH's assembler usage, especially the use of the IF ... ELSE ... THEN structure.

Note, as in the previous block, the use of HERE on Line 10 to mark the address of code to be shared by both 0< , > and < .

Screen # 192

These memory reference operators provide additional examples of good Assembler practice.

Note that W@ acts like C@ in that it fetches a sub-field of a 32-bit stack item without sign-extention.

Screen # 193

The stack operators in this block deal with 32-bit cells. They offer excellent examples of stack manipulation in code.

Screen # 194

The words 1+ , 2+ , etc. provide more than convenience: they are both shorter and faster than 1 + , etc., and thus should always be preferred.
Note that 2* , 2/ , and 4* use arithmetic shifts and are thus signed operations.

Screen # 195

By convention, all arithmetic operators with MOD in their names are unsigned operations; all others in this block are signed.

Precision of operators:

```
*  32 x 32 -> 32 multiply
/  32 / 16 -> 32 signed divide
*/  32 x 16 / 16 -> 32 signed ratio operation
*/MOD  32 x 16 / 16 -> 16-bit remainder, 32-bit quotient.
/MOD  32 / 16 -> 32-bit remainder, 32-bit quotient.
H* and H/ execute 68K multiply and divide instructions.
```

The math subroutines and */ are in Blocks 108-109 .

Screen # 196

MOVE moves a string, given source and destination addresses addresses and count. All arguments are in bytes; however, 32-bit cells are moved to take advantage of the performance increase. For moves involving byte counts which are not guaranteed to be even multiples of four, CMOVE should be used.

It should be noted that MOVE and CMOVE both use the looping primitive DBRA so the maximum number of bytes which may be moved is 262144 for MOVEs and 65536 for CMOVEs.

Screen # 197

Some less common arithmetic operators:
NEGATE returns a two's complement.
ABS returns an absolute value.
NOT reverses a truth value. It is identical to 0= .

MAX returns the maximum of 2 signed numbers.
MIN minimum 0 an 1 are defined as constants. This provides a shorter reference during compilation.

WITHIN tests for n within l to h-1 where l and h may be anywhere on the number circle.

Screen # 198

A variety of miscellaneous operators:
ERASE fills a given area of memory with zeroes.
FILL fills a given area of memory with the character on the top of the stack.

'S returns the address of the top of the stack. Its use is discouraged.
?DUP duplicates a number if it is non-zero.
Using ?DUP IF makes an ELSE DROP phrase unnecessary.

I' returns the limit of a LOOP (the 2nd item on the return stack).
J returns the index of an outer LOOP (the 3rd item).

LEAVE sets the LOOP limit to its index. This will force an exit at the end of the current iteration.

Screen # 199

The '2' operators operate on two 32-bit stack cells at a time.

2DUP duplicates the double number on top of stack.
2DROP drops the double number on top of stack.

@ fetches cell n from address a .
! stores cell n at address a .
+! adds n to the cell at address a .

Screen # 200

The USER variables for this system are documented in the Processor Supplement.

Most BACKGROUND tasks have shorter user areas than TERMINAL tasks, usually not extending beyond the first 14 bytes GOLDEN holds the dictionary heads used by EMPTY .
The cell after 'BUFFER holds the block# last written.
The byte at DISK 4+ is set if there's a disk error.
The cells after PREV contains the disk buffer status cells.
Note that only as many bytes as are required by the number of block buffers used are allotted.

Screen # 201

This is the inner loop of the multiprogrammer.

WAKE This code is the instruction stored in the STATUS cell of a user who is ready to become active. STATUS normally contains a JMP to the next task in the round robin.
GIVE This is the address of the code which activates a task. It is executed out of TRAP 0.
PAUSE This entry to the multiprogrammer starts by storing WAKE in the STATUS cell so the task will wake up next time around the loop.
WAIT This entry point is the normal entry for a task who will stay 'asleep' until some event (such as an interrupt) awakens him.
STOP This provides high-level access to WAIT .

Screen # 202

GRAB asserts control of a facility by storing the current user's STATUS address in its facility variable. If the facility isn't available (i.e, value non-zero and not this user) waits in PAUSE until it is available.
GET calls GRAB after one lap around the multiprogrammer.

RELEASE releases a specified facility variable by setting it to zero assuming it belongs to the current user — does nothing if it doesn't.

Screen # 203

EXECUTE takes an address of a FORTH definition (any kind) and executes it. On completion, control will pass to the FORTH word following EXECUTE .
@EXECUTE performs like EXECUTE , but takes an address containing the address of the word to be executed. If the address contains 0, branches to the NEXT at the end of TYPE (i.e. does nothing)
TYPE stores its arguments in PTR and CTR , respectively, and executes the routine whose address is in the user's 'TYPE .
EXPECT stores its address argument in PTR and its count (negated) in CTR , then executes the routine whose address is in the user's 'EXPECT . Note that CNT is set to a flag which indicates whether input editing is to be performed.
STRAIGHT EXPECTs without input editing.
CR , PAGE , TAB , and MARK execute CRT-specific routines.
EMIT outputs a single character.

Screen # 204

Screen # 205

Screen # 206

Screen # 207

( PLB*10/16/86)

10/16/86 fixed to remove old key presses on backspace !!!

Screen # 208

Screen # 209

These are basic output words plus some orphans:
HERE returns the next available byte in the dictionary.
PAD returns the address of a string scratch pad.

COUNT takes the address of a string (with count in first byte) and returns the address plus one and count (for TYPE , etc.)
BLANK blanks a string (as ERASE zeroes one).

?ANY is used by SPACES to count spaces in bunches of 8.
SPACES types spaces. A 0 or negative count does nothing.
SPACE types a space.
HOLD stores a character backwards in a string indicated by PTR . It is used during number conversion. The string actually runs backwards from PAD .
DIGIT converts a digit to ASCII, including the hex offset.

Screen # 210

Number formatting words:
<# initialized the string in PTR .
#> discards the number and returns the string address and count
SIGN tests the sign (from the 3rd stack position) and buffers a minus.
buffers a single digit.
#S buffers digits until the number reaches zero.

(.) formats a signed integer.
. types a signed integer, with trailing space.
U. types an unsigned integer, with trailing space.
U.R types an unsigned integer, right justified in a field.

DUMP displays a region of memory, which may be in I/O space.

Screen # 211

String output words include:
?R@ tests a truth value, if set it returns with an in-line string address; otherwise it exits from the calling definition (usually ABORT" ).

ABORT clears both stacks and goes to QUIT for input.

abort" is the run-time code for ABORT" . Upon error, it types the word at HERE , the message, and saves >IN in R# for the editor.

dot" is the run-time code for ." . It types the message.

ABORT" and ." are host definitions that reference the just-defined run-time code.

Screen # 212

The heart of the interpreter is here:

SOURCE locates the input string: BLK zero indicates the message buffer ( S0 @ ); non-zero, the block number.

word does the word of extracting a word from the input string and storing it at HERE 4+ (allowing room for the link which will go at HERE if the word is compiled) until CNT 1+ expires. If the string is empty, returns a 0 count. If the string is of even length, fills out the last byte in the last cell with a space.

WORD returns the next word in the input stream, or a zero-length string of one blank if the stream is exhausted. Note that the second reference to SOURCE is a dummy - it is replaced by a reference to BLOCK in Block 95, just after BLOCK is defined.

Screen # 213

Dictionary search:

HASH selects one of 8 dictionary threads based on the first character and current vocabulary (nibble from stack). It exits from the the calling definition when vocabularies are exhausted. The hash value is an offset into the dictionary heads. It's calculated by: <current vocabulary> <first character> + 14 AND 2+

-FIND searches the dictionary. If it finds a match, it returns the parameter field address, link field address, and 'false'. Otherwise, it repeats HASH .

01/30/86 PLB - MADE 'HASH' AND '-FIND' TO HAVE HEADS FOR AIM

Screen # 214

?DIGIT increments the address on the stack and then determines if the character at that location is a valid digit in the current BASE . If the character is valid, a true flag is left on the stack with the value of that digit underneath. Otherwise, only a false flag is left. For both cases, the address is not removed.

The number conversion here assumes 32-bit. Infix punctuation of numbers is allowed but not required. The high order cell of PTR is used to convey some useful information after conversion is complete. If this cell contains a negative number, there were no allowable punctuations in the converted number, otherwise it contains a count of the number of digits converted since the last punctuation was encountered.

Screen # 215

DEPTH returns the number of items on the parameter stack (before it was called).

-' searches the dictionary for the word following in the input stream. If found, returns 0 ('false'), with the link field address and parameter field address beneath. If not found, returns 'true' and HERE 2+.

' searches the dictionary for the word following in the input stream, and returns its parameter field address if found; aborts if not found.

INTERPRET interprets the input stream, executing words found in the dictionary and converting numbers to binary, until either the input stream is exhausted or a word is found that cannot be found or converted.

RESET clears the current user's return stack.

QUIT stops whatever is executing and resumes the (terminal's) normal behavior of awaiting input for the terminal.

Screen # 216

?ABSENT checks to see if the block whose number is on the stack is present in memory. If the block is present, ?ABSENT removes the block number from the stack, and leaves an address pointing to the beginning of the block buffer, and and then leaves the word which called ?ABSENT , by means of the ' EXIT BRA on Line 5. If the block is not listed in PREV then ?ABSENT leaves the block number on the stack, and exits normally through NEXT .

?UPDATED finds an old buffer. If the old buffer has its update bit set, ?UPDATED returns the buffer address with the block number of the buffer on top. The block number is later used to write out the data. If the buffer's update bit is not set, ?UPDATED returns the buffer address and EXITs the word which called it.

PREV points to the most recently accessed block buffer.

PREV 2+ points in turn to each but skips over PREV's buffer.

Screen # 217

INDEX adds the current user's OFFSET contents to the block number on the stack.

UPDATE sets the most significant bit of the cell in PREV which contains the block number of the most recently accessed block.

ESTABLISH makes the oldest buffer ( PREV 2+ ) into the newest buffer (by putting the pointer into PREV ) and marks the new buffer with the block number on the next-to-top of stack.

IDENTIFY marks the newest buffer ( in PREV ) with the block number from the stack, with OFFSET added.

Screen # 218

The words BLOCK and BUFFER defined here execute the the words whose addresses are in the system variables 'BLOCK and 'BUFFER respectively. Note that this vector is system wide (all users execute the same version of BLOCK and BUFFER ). This provides the capability for multiple disk controllers in the same system to be alternately treated as the system disk device under software control. This is very useful when writing disk drivers for a new controller.

BUFFER takes a block number and frees a buffer, and marks that buffer with the given block number, then leaves the address of the buffer on the stack.

BLOCK takes the block number, then insures that the block is present in a buffer, and leaves the address of the buffer.

FLUSH writes out all NB (# of buffers) updated buffers.

EMPTY-BUFFERS erases all the block buffers.

Screen # 219

Screen # 220

Screen # 221

Screen # 222

Screen # 223

Screen # 224

IMMEDIATE causes the preceding definition to be executed rather than compiled at compile time.
[COMPILE] forces compilation of what would otherwise be an IMMEDIATE compiler directive following in the input stream.
The above words help the host computer compile the target system's compiler.
?ALLOT increments H and returns 'true' if there are fewer than 250 bytes left in the dictionary.
ALLOT prints error message when H is too high.
, W, and C, compile a cell, word, or byte in the dictionary.
COMPILE compiles a reference to the word following it.
LITERAL compiles a 32 or 16-bit literal preceeded by the address of the appropriate run-time code ( cell or long ).

Screen # 225

] is FORTH's compiler.
[ exits ] .
['] compiles the parameter address of the word following it as a literal.
CFA converts a Link Field Address to a Code Field Address.
USE changes the code address of the LAST word to the address given.
;code leaves compile mode. and sets the code address of the most recent definition to the address following. This is the run-time behavior of ;CODE.
;CODE enables the Target Compiler to create defining words in the target system, whose run-time behavior is code.
DOES> enables the Target Compiler to create defining words in the target system whose run-time behavior is high-level.
SMUDGE toggles the smudge bit in the latest definition.

Screen # 226

The words in this block allow the target system to compile "data items". The use of these words is documented in the Reference Manual, Starting FORTH, and other sources.
CREATE executes the word whose address is in the system variable 'CREATE .

(CREATE) creates a dictionary entry whose link is at HERE , head and code address following. The code field is set to the code at create (Block 64); other defining words may use (CREATE) to construct the head and then substitute other code addresses.
The compile time portions of CREATE (above), CONSTANT , USER .and : are compiled into the gaps left before their code in Blocks 63, 64.
VARIABLE shares the code belonging to CREATE and allocates 4 bytes.
WVARIABLE allocate 2 bytes.

Screen # 227

This block defines the compiler directives that provide structures in the target system's compiler. The use of FORTH's structure words is described in the Reference Manual and other sources.

The compiler directives use the compile-time stack to pass the addresses needed to compile branches. Depending upon the processor, relative offsets or absolute addresses may be compiled; this computer uses the latter.

Most of the words that perform the run-time action for these words have the same name, but are in lower-case and headless. They are defined in Block 65.

Screen # 228

VOCABULARY defines a word which, when executed, will set CONTEXT to the sequence of vocabulary indices given.

The two versions of VOCABULARY are for the target system and the Target Compiler, respectively. The latter is used to define the target system's vocabularies FORTH , ASSEMBLER , and EDITOR .

The following definitions are for the target system's compiler
CODE starts an assembler definition. The code address is set to the new definition's parameter field.
;CODE terminates the compile-time portion of a defining word and commences it's run-time portion which is in code.
DOES> is functionally equivalent to ;CODE except that its run-time behavior is described in high-level.

Screen # 229

EMPTY resets H to the beginning of the task's dictionary given by H 4+ . The system definition chains in GOLDEN are used to restore the eight link heads, CONTEXT and CURRENT in the task's user area .
STRING compiles a string terminated by a given ASCII character.
ABORT" compiles an error message which will be displayed along with the word at HERE and the task restarted if the number on the stack at run-time is 'true'.
HEX , DECIMAL , BINARY change BASE appropriately.
." compiles a string for display at run-time.

( stops interpreting until the delimiter ")" is encountered.

LOAD saves the current position in the input stream and calls INTERPRET then restores the input stream pointer.

Screen # 230

Screen # 231

These tables are used by the START code to initialize RAM and OPERATOR's user area.

OPERATOR contains the information necessary to initialize the one task which is active following a boot. The format of this table is essentially the same as those constructed by TERMINAL in Block 25.

ram contains initial values for the system variables, in the order in which they are defined in Block 75.
INTERRUPTS contains initial values for interrupt vectors.

Screen # 232

The order of operations in the start-up sequence is:
1. System is booted from the cylinder 0 of the selected device and control is passed to the address contained in location PROM 4+ (the address of POWER-UP ).
2. POWER-UP sets the U and R registers to the address of OPERATOR , initializes S , and sets I to the address START where NEXT will branch. The processor is placed in supervisor mode and interrupts are disabled.
3. START initializes GOLDEN , erases OPERATOR's user area and copies initial values into it's first 64 bytes. MODE is initialized for the assembler and WIDTH is set to 3 character name truncation. The interrupt vectors for the disk and serial ports are initialized and OPERATOR is then greeted and activated.

Screen # 233

This block contains */ and a subroutine which is factored for use in */MOD . umul performs a 16 x 32 -> 48 bit multiply. The numbers to be multiplied are in D1 and D2,D3. The result is left in D5 and the upper half of D6.

Screen # 234 udiv performs a 32 / 16 -> 32 rem., 32 quot unsigned.
The arguments are passed in D0 ( divisor) and D1 (dividend)
The results are left in D1 (remainder) and D0 (quotient)
mul performs a 32 x 32 -> 32 unsigned multiply of registers D1 and D2 with the result left in D1 .

sdiv uses udiv to perform a 32 / 16 -> 32 bit signed divide.

Screen # 235

This block may be optionally loaded in the Target Compiler See Block 45 Line 4. If loaded, it produces a map showing the target address of each word defined. The map is of limited usefulness on CRT, but may be very useful on a printing terminal
This is the only way to relate the source definitions to a specific address in a set of target PROMS or remote system under test.
LOAD redefines LOAD to display the block numbers.
THRU similarly displays each block number.
LOG types the name and address of a target word being defined. It detects the end of a line and peforms a carriage return.
HELP avoids redisplaying the Target Compiler's HELP screen, as it is an inappropriate part of the Log.
.WHERE shows the value of all CONSTANTS defined and the target ram location for all VARIABLES .

Screen # 236

This block loads the assembler that will be resident in the target system. It should be omitted from any non-extensible target application.
TW@ , TW! , TC+! , TW+! are included so that the same blocks may be loaded for HOST and TARGET .
WIDTH is set to maximum length, 31 characters at the beginning of this block, to avoid any ambiguity. It is reset to 3 at the end.

WAIT is perpetuated into the TARGET dictionary since its LABEL definition is solely found in HOST .
U) is re-defined to compute the offset of a user variable. For example, BASE U) D0 MOV moves the current user's BASE to data register 0.
The last PROM address of the assembler is displayed at the end.

Screen # 237

MR) resets the assembler's user variables in preparation for the next opcode's operands.
(EA) gives the address of current byte of mode data.
+S/D advances S/D and adds the stack byte to (EA) .

The register names place their codes in the next MODE byte. Note that nothing is left on the stack!
RL is the place holder for register lists in MOVM .

H and B set WSZ to 1 or 0.
!AHEAD is given a half cell size (1 or 2) and a stack value to be posted at PAD .
AB sets absolute half or long mode and posts the address.

Screen # 238

IND builds address indirect modes. The A register is assumed at (EA) and the mode offset is added to it.
IMM builds and posts immediate modes. The high two bits are the size flag and the low bits are 3C. Note that #Q data are left on the stack!
OFS builds and posts address mode offsets.
NDX builds index offset modes. The extension word is left on the stack to be posted by an OFS word. S/D is backed up and (EA) for the pending OFS is set to B to bump the mode up.
The next words in the block are the mode designators that follow the above forms.
PC) builds and posts the PC-relative mode.

Screen # 239

,POST appends posted data to the current instruction. The address passed in is that which PAD had during the posting. The high bit of POST is set by BITS to override the apparent length of its immediate data.
!OP compiles the opcode and the extension words.
OPERAND adds addressing mode fields to the stacked opcode. The top item points to the half of MODE containing the field - the next item indicates which opcode field receives the data.
UNI assembles one or no operand opcodes. The case of 0 inputs falls through because the MODE bytes remain 0. Opcodes are not adjusted for word size if their size field is not 0.
M/M makes memory to memory opcodes such as ADDX . The low two bits of opcode mask are zero for byte-only opcodes.
MOV assembles the general and quick move instructions.

Screen # 240

@OP-MODE returns an opmode field value from the MODES table as indexed by its input (0, 1, or 2 for Dn, An, or memory dest.) and the word size. An input of zero is also used to return WSZ properly aligned.
-QUICK handles the case of #Q sources for ADD and SUB only. It returns false for non-quick sources.
-CONFUSED handles the case of opcodes that generate special forms for immediate data with non-address-register modes. These opcodes have their low bits on as a flag and their low nybble is used as the immediate subcode. True is returned otherwise.
R/M is used for binary opcodes. After eliminating the above cases, it masks out the low nybble and determines operand order with EOR being a special case with inverted order.

Screen # 241

1RG is used for register-only opcodes who's size field is one bit wide.
OPMODE given two register numbers, returns the op-mode field for the EXG instruction and adjusts the 4-bit register numbers by clearing their high bit. It returns 40 for two data registers, 48 for two address registers, and 88 for a combination.
EXG assembles an EXG instruction.
SHFT builds shift instructions, The cases are immediate or Dn shifts of Dn, or one-bit memory shifts. For convenience the type field occurs twice in the opcode masks.
BITS builds immediate or Dn specified bit opcodes.

Screen # 242

PMOV moves to or from a Dn and offset addressing. Size must be long or half cell.
MMOV moves to or from various memory address modes and RL .
A register list must follow of the following form:
[<list> \]*n <list \\>
where <list> is either a single register name or a pair of registers with the low-numbered first, and n may be 0.
MIRROR does a bit swap of the low 16 bits of the top stack.
2**N adds 2 to the power of the outer loop index to the stack.
\ ends a register sublist and \\ ends the last list.
SWP takes a data register.
EXT takes a data register and a size of long or half cell.
EXG works correctly only for two data registers.

Screen # 243

The opcodes are defined here.

STOP must be followed by an n W, to specify the status register value.
LINK must be followed by an n W, to specify the stack adjustment.

Screen # 244

These are the branch and looping instructions.

,NEXT compiles an in-line NEXT .

Screen # 245

Screen # 246

Screen # 247

Screen # 248

Release notes:
Special problems and features of this release are listed here.

Screen # 249

Screen # 0

( PolyForth Level 4 - AI Machine System ) ( PLB*01/16/86)
Rule Processor System Version
Update Records :

```
<01> 10/03/85 PLB  -  Initial Transfer from Forth Inc.
                         Original Disks.
<02> 10/07/85 PLB  -  Start of conversion to CP/M System.
<03> 11/09/85 PLB  -  Replaced STRAIGHT vector with KEY vector
<04> 12/01/85 PLB  -  Added ?TERMINAL and its own USER vector
<05> 01/06/86 PLB  -  Start of Rule Processor FORTH
                         configuration.
<06> 01/15/86 RFS,PLB  -  Convert kernel to full name field.
                         Also added VIEW field to kernel.
<07> 01/29/86 PLB  -  Added 'ABORT vector
```

Screen # 1

$ Load Screen for Forth, Inc. Standard Extensions( PLB*12/03/85)

$ Screen 9 still contains the original PolyForth Load Screen.
$ The FORTH, Inc PolyForth revision date is on this screen.

Screen # 2

```
$ Rule Processor System Variables                ( PLB*01/06/86)
$ Used by HOST during system configuration
HEX   VARIABLE (RP-VAR-PTR).    80000 (RP-VAR-PTR) !
: RP-VARIABLE
   -4 (RP-VAR-PTR) +!   (RP-VAR-PTR) @ CONSTANT ;
: WRP-VARIABLE
   -2 (RP-VAR-PTR) +!   (RP-VAR-PTR) @ CONSTANT ;
: RP-ARRAY  ( n-)
   NEGATE (RP-VAR-PTR) +!   (RP-VAR-PTR) @ CONSTANT ;
DECIMAL  5 LOAD
```

Screen # 3

```
$ Rule Processor System Variables                ( PLB*01/06/86)
$ Used to set the top of RP forth memory
HEX   VARIABLE (RP-VAR-PTR)       80000 (RP-VAR-PTR) !
: RP-VARIABLE
   -4 (RP-VAR-PTR) +!   (RP-VAR-PTR) @ CONSTANT ;
: WRP-VARIABLE
   -2 (RP-VAR-PTR) +!   (RP-VAR-PTR) @ CONSTANT ;
: RP-ARRAY ( n-)
   NEGATE (RP-VAR-PTR) +!    (RP-VAR-PTR) @ CONSTANT ;
DECIMAL  5 LOAD

(RP-VAR-PTR) @ CONSTANT RP-TOP

HEX  80000 (RP-VAR-PTR) !
```

Screen # 4

```
$ Rule Processor System Variables                ( PLB*01/06/86)
$ Used by the RP target compiler
FORTH : RP-VARIABLE
   -4 (RP-VAR-PTR) +!   (RP-VAR-PTR) @ CONSTANT ;
FORTH : WRP-VARIABLE
   -2 (RP-VAR-PTR) +!   (RP-VAR-PTR) @ CONSTANT ;
FORTH : RP-ARRAY ( n-)
   NEGATE (RP-VAR-PTR) +! (RP-VAR-PTR) @ CONSTANT ;
```

Screen # 5

```
$ Rule Processor System Variables                ( PLB*04/07/87)
DECIMAL
$ Non-initialized RP Variables - remain during RP Forth Load
WRP-VARIABLE  RP-#          $ Rule Processor Number
WRP-VARIABLE  <SERVER-EN>   $ Set on RP that is being served
WRP-VARIABLE  <DEBUG>       $ Sets debug mode in RP's
RP-VARIABLE   <TICKS>       $ Ticks Counter
   $ <TICKS> must be the last of the non-initialized variables
$ Initialized RP Variables - cleared during RP Forth Load
WRP-VARIABLE  <RP-CHAR-IN>  $ RP Character Input
WRP-VARIABLE  <SERVER-CMD>  $ Server Command
RP-VARIABLE   <SERVER-1>    $ Used by the various server
RP-VARIABLE   <SERVER-2>    $              commands ......
WRP-VARIABLE  <BOOT-CMD>    $ Initialize command to RP from Host
WRP-VARIABLE  <INTR-CMD>    $ Interrupt command to RP from Host
6 LOAD   7 LOAD     8 LOAD
```

Screen # 6

```
$ Rule Processor System Variables                ( PLB*01/20/87)
DECIMAL    4096 WCONSTANT SIZE-OF-NET
SIZE-OF-NET RP-ARRAY <NETWORK>      $ Network Space
RP-VARIABLE    <FREE-MEM>   $ Bytes of Free memory in RP
RP-VARIABLE    <S-B>        RP-VARIABLE  <D-B>
RP-VARIABLE    <S-H>        RP-VARIABLE  <D-H>
RP-VARIABLE    <H-B>        RP-VARIABLE  <SOFT-B>
RP-VARIABLE    <HARD-B>     RP-VARIABLE  <SOFT-R>
RP-VARIABLE    <HARD-R>     RP-VARIABLE  <WATCH>
RP-VARIABLE    <#RULES>     $ # Rules within RP
RP-VARIABLE    <#LHS>       RP-VARIABLE <RULE-BYTES>
RP-VARIABLE    <#WME>       RP-VARIABLE <WME-BYTES>
RP-VARIABLE    <MAX-WME-B>  RP-VARIABLE <MAX#WME>
RP-VARIABLE    <#ITEMS>     RP-VARIABLE <MAX#ITEMS>
WRP-VARIABLE   <#-IN-CS>
```

Screen # 7

```
$ Rule Processor System Variables                ( PLB*04/19/87)
128 WCONSTANT MAX#LHS         64 WCONSTANT MAX#BV
MAX#LHS 4* RP-ARRAY <L-START>        $ List start address
MAX#LHS 4* RP-ARRAY <L-END>          $ List end address
MAX#LHS 4* RP-ARRAY <L-BASE>         $ Base address of WME frame
MAX#LHS 4* RP-ARRAY <L-CNT>          $ Counter Array !!!!!!!
MAX#LHS 4* RP-ARRAY <CONFLICT-SET>   $ Conflict set
MAX#LHS 4* RP-ARRAY <SORTED-CS>      $ Sorted Conflict set
  MAX#LHS 4* RP-ARRAY <HIST>      $ HISTOGRAM OF RULE FILTER ENTRY
MAX#BV  4* RP-ARRAY <BOUND-VARIABLES>    $ Bound Variable Array
$ MAX#BV  4* RP-ARRAY <LOCAL-BV>       $ local RP binding
WRP-VARIABLE <COMPLEXITY>           $ rule complexity
WRP-VARIABLE <BEST-RULE>       $ Most firable rule
WRP-VARIABLE <STRATEGY>        WRP-VARIABLE  <CR-#LHS>
RP-VARIABLE  <LOAD-FCT>      $ used for rule loading
```

Screen # 8

```
$ Rule Processor System Variables                ( PLB*04/08/87)

RP-VARIABLE    <LHS-PASS>    RP-VARIABLE    <PRE-PASS>
RP-VARIABLE    <RULE-PASS>   RP-VARIABLE    <#FIREABLE>
RP-VARIABLE    <#N-FIREABLE> RP-VARIABLE    <R-#>

RP-VARIABLE    <RPA>         RP-VARIABLE    <RPB>
RP-VARIABLE    <RPC>         RP-VARIABLE    <RPD>
RP-VARIABLE    <RPE>         RP-VARIABLE    <RPF>

RP-VARIABLE    <RP1>         RP-VARIABLE    <RP2>
RP-VARIABLE    <RP3>         RP-VARIABLE    <RP4>
RP-VARIABLE    <RP5>         RP-VARIABLE    <RP6>    $ MUST BE LAST
```

Screen # 9

```
: <CREATE>   BLK W@ 16 *  >IN W@ 64 /  + W, (CREATE) ;
   ' <CREATE>  'CREATE !   2 WCONSTANT B/H ( 0 if no VIEW)

( Aids)  14 LOAD  13 LOAD  10 LOAD   ( Exceptions)  12 LOAD
( Extensions)  18 21 THRU   ( Editor)  29 LOAD
( Calendar)  31 LOAD   ( Clock)  15 16 ( OKI  17) THRU
( Disk error reporting)  33 LOAD
: SYSTEM   11 DATED  SPACE  @TIME .TIME ;
: HELP   SYSTEM ;   HELP
( Terminals)  24 25 THRU    ( Serial printer  27 LOAD)

GILD

( polyFORTH/32 Level 4  19 June 1985)
```

Screen # 10

```
$ BENCHMARKS                                     ( PLB*06/03/86)
: SSS START-TIMER ;
: EEE .END-TIME ;
HEX
: -TEST 0 0 SSS 7FFF 0 DO I DUP - DROP LOOP EEE ;
: *TEST 0 0 SSS 7FFF 0 DO I DUP * DROP LOOP EEE ;
: /TEST 0 0 SSS 7FFF 1 DO 7FFF I / DROP LOOP EEE ;
: MOVETEST 0 0 SSS 7FFF 0 DO 2 W@ 2 W! LOOP EEE ;
: COMPTEST 0 0 SSS 7FFF 0 DO I 4000 < IF ELSE THEN LOOP EEE ;
DECIMAL 8190 CONSTANT SIZE
VARIABLE FLAGS SIZE ALLOT
: DO-PRIME SSS FLAGS SIZE 1 FILL   0 SIZE 0 DO
   FLAGS I + C@ IF I DUP + 3 + DUP I +
      BEGIN DUP SIZE < WHILE 0 OVER FLAGS + C! OVER + REPEAT
   DROP DROP 1+ THEN LOOP
   EEE . ." PRIMES" CR 7 EMIT ;
```

Screen # 11

```
$ TEST

8190 CONSTANT SIZE
VARIABLE FLAGS SIZE ALLOT
: DO-PRIME2 SSS
   FLAGS SIZE 1 FILL
   0  SIZE 0
   DO I FLAGS + C@
   IF 3 I + I + DUP I + SIZE <
      IF SIZE FLAGS + OVER I + FLAGS +
         DO 0 I C! DUP +LOOP
      THEN DROP 1+ THEN LOOP EEE ." PRIMES-> " . ;
VARIABLE W
```

```
: T4 30000 0 SSS DO W @ W ! LOOP EEE ;
: T5 30000 0 SSS DO W C@ W C! LOOP EEE ;
: T17 101 1 SSS DO I BLOCK DROP LOOP EEE ;
```

Screen # 12

```
$ RP.PF Load Screen                                ( PLB*04/07/87)

START-SEGMENT .( ==> AI Machine Rule Processor Customization)

        13  16  THRU
        17  18  THRU         $ RP Memory Test
        19      LOAD         $ Blinking Light Demo
        20      LOAD         $ Debug Support
        21  23  THRU         $ 68000 Trap Support
        24      LOAD         $ .WME support thru host
$       25      LOAD         $ TEMP RULE ACCEPT !!!!
END-SEGMENT
```

Screen # 13

```
$ Time/Date support for Rule Processors            ( PLB*05/02/86)
HEX
WVARIABLE <YEAR>                   WVARIABLE <MONTH>
WVARIABLE <DAY>                    WVARIABLE <HOURS>
WVARIABLE <MINUTES>                WVARIABLE <SECONDS>
WVARIABLE <DOW>

: !CLOCK ;

: @CLOCK  1C HOST-SERVER
 <SERVER-1>     W@ <YEAR>     W! <SERVER-1> 2+  C@ <DAY>     W!
 <SERVER-1> 3 + C@ <MONTH>    W!
 <SERVER-2>     C@ <DOW>      W! <SERVER-2> 1+  C@ <SECONDS> W!
 <SERVER-2> 2+  C@ <MINUTES> W! <SERVER-2> 3 + C@ <HOURS>   W! ;
```

Screen # 14

```
$ SAVE-RPFORTH, BYE, CLONE                         ( PLB*01/10/86)
HEX

: BYE   FLUSH  18 HOST-SERVER ;

: (SAVE-STATE)    GILD GOLDEN ram 46 MOVE
    STATUS OPERATOR 8 + 40 CMOVE ;

: SAVE-RPFORTH  (SAVE-STATE)
    CR CR ." Saving RP-FORTH Image, Total bytes => " HERE U.
    HERE <SERVER-1> !    14 HOST-SERVER ;

: CLONE  (SAVE-STATE)   HERE <SERVER-1> ! 20 HOST-SERVER ;
```

Screen # 15

```
$ RP-COMPLETE                                      ( PLB*01/12/87)
HEX
$ RP-COMPLETE stores a 4321 (hex) into <INTR-CMD> to allow
$   the host to verify that the RP actually ran !!!!

: RP-COMPLETE        $% CR ." RP Complete "
$   4321 <INTR-CMD> W!   PUT IN ANOTHER VARIABLE !!!!!!!!!!
$     HOST WILL HAVE TO CLEAR THIS VARIABLE BEFORE RP-SIGNAL !!
    DEPTH IF CRITICAL CR ." RP Complete Stack Depth Error "
              .S ABORT THEN
    <SERVER-EN> W@   <DEBUG> W@  AND
    IF      ]] 2000 #W MTSR [[      QUIT
    ELSE    RP-STOP THEN ; RECOVER

$ ' RP-COMPLETE   RP-STREAM !
$ MACHINE CODE THIS WORD !!!!!
```

Screen # 16

```
$ Rule Processor Interrupt Routine                 ( PLB*04/07/87)
HEX
CREATE IRUPT-TABLE     1C       DUP ALLOT IRUPT-TABLE SWAP ERASE
       ' RP-STOP   IRUPT-TABLE 8 + !
       ' ABORT     IRUPT-TABLE 4+  !
$ Define Interrupt Routine
ASSEMBLER     BEGIN   <INTR-CMD> AB W. TST  0= IF RTE THEN
              2700 #W MTSR    S0 U) S MOV   S -) CLR   U R MOV
              D0 CLR     <INTR-CMD> AB D0 W. MOV
              IRUPT-TABLE # D0 ADD     D0 A0 MOV
              A0 ) W MOV   4 #Q W SUB  W )+ A0 MOV   A0 ) JMP
```

```
$ Store Interrupt Vectors
        DUP 64 !    DUP 68 !    DUP 6C !    DUP 70 !
                    DUP 74 !    DUP 78 !        7C !
```

Screen # 17

```
$ Pseudo-random Memory Test                        ( PLB*11/08/86)
$ Customized for Rule Processors 5/2/86
HEX
<RP1> CONSTANT <START>       <RP2> CONSTANT  <END>
<RP3> CONSTANT <PASS-CNT>    <RP4> CONSTANT  <ERR-CNT>
VARIABLE <SEED>

: .MTHEAD  HEX  CR CR CR ." Pseudo-Random Memory Test" CR
     ."      Testing from " <START> @ U. ." to "
     <END> @ U. CR CR ;
: .PASS    0D EMIT DECIMAL ." Pass# " <PASS-CNT> @ 5 U.R
                     ."      Errors-> " <ERR-CNT> @ 8 U.R ;

: .ERROR ( actual should-be addr -) <ERR-CNT> TALLY CTRL-Y .PASS
     HEX ."      Addr->" 7 U.R      ."      Written->" 5 U.R
     ."     Read->" 5 U.R    CR .PASS ;
```

Screen # 18

```
$ Pseudo-random Memory Test                        ( PLB*05/02/86)
HEX      $ : >RAND ( a-n)
CODE >RAND    S )+ D0 MOV    <SEED> 2+ AB D0 ADD
  <SEED> AB D0 MULU D0 D1 MOV  7 # D1 LSR  7 # D1 LSR D1 D0 EOR
    D1 D0 EOR   FFFF # D0 AND    D0 S -) MOV ,NEXT
$ : >RAND <SEED> @ OVER + # 5432 /MOD + FFFF AND ;
: FILL-WORDS     <END> @   <START> @ DO I >RAND I W! 2 +LOOP ;
: CHECK-WORDS    <END> @   <START> @ DO I W@
    DUP I >RAND = IF DROP ELSE I >RAND I .ERROR THEN 2 +LOOP ;
DECIMAL
: MTEST ( a n - )    OVER + <END> !    <START> !  <ERR-CNT> OFF
    .MTHEAD    <PASS-CNT> OFF
    BEGIN .PASS <PASS-CNT> TALLY  7654321 <SEED> +!
      FILL-WORDS    CTRL-Y  CHECK-WORDS  CTRL-Y  AGAIN ; RECOVER
: RP-MTEST INIT-FORTH HERE  S0 @ HERE - 256 - MTEST ; RECOVER
' RP-MTEST 'INIT 24 + !
```

Screen # 19

```
$ Blinking Light Demo                              ( PLB*11/08/86)
HEX

: BLINKER  RP-# W@ <RP2> @ * <RP1> @ + 0 DO LOOP
       <RP3> TALLY RP-STOP ; RECOVER

' BLINKER   IRUPT-TABLE 14 + !
```

Screen # 20

```
$ Debug Support on Rule Processors                 ( PLB*10/31/86)
HEX

: BUG-ON      <DEBUG> W-ON ;
: BUG-OFF     <DEBUG> W-OFF ;

: +PRT        <SERVER-1> W-ON   28 ?HOST-SERVER ;
: -PRT        <SERVER-1> W-OFF  28 ?HOST-SERVER ;

: .TOKEN      ( n-)  <SERVER-EN> W@ IF
    ?DUP IF
    <SERVER-1> ! 2C HOST-SERVER
    <SERVER-1> @  C# W+! ELSE ." NIL" THEN ELSE DROP THEN ;
```

Screen # 21

```
$ 68000 Trap Diagnostic Words                      ( PLB*04/08/86)
HEX     CREATE TRAP-REG         40 ALLOT
: (.DR) ."  D0          D1          D2          D3          D4          D5
            D6          D7" CR ;
: (.AR) ."  A0          A1          A2 next     A3 U        A4 W        A5
  I         A6 S        A7 R" CR ;
: (.REG) ( a-)  HEX 8 0 DO DUP @ <# # # # # # # # # #> TYPE  4+
    SPACE SPACE  LOOP DROP CR ;
: .TRAP-ABORT CR (.DR) TRAP-REG (.REG) (.AR) TRAP-REG 20 +
    (.REG)  CR DECIMAL ABORT ; RECOVER
: ;TRAP   R> DROP ; IMMEDIATE
: 68K-TRAP ( a-)  HERE SWAP !    $ Store vector in vector table
    [ ASSEMBLER ]    RL   TRAP-REG AB   MMOV   D0 D7 \ A0 R \\
    [ HOST? ]  ONLY->     0000 #W MTSR
    S0 U) S MOV              S -) CLR      >HIGH-LEVEL AB JSR
    CURRENT W@ CONTEXT W! ] ;    FORTH
```

Screen # 22

```
$ 68000 Trap Diagnostic Words                      ( PLB*04/08/86)
```

```
HEX  : RP-TRAP  CRITICAL CR ;
08 68K-TRAP RP-TRAP .M" Bus Error"              .TRAP-ABORT ;TRAP
0C 68K-TRAP RP-TRAP .M" Address Error"          .TRAP-ABORT ;TRAP
10 68K-TRAP RP-TRAP .M" Illegal Instruction"    .TRAP-ABORT ;TRAP
14 68K-TRAP RP-TRAP .M" Divide by Zero"         .TRAP-ABORT ;TRAP
18 68K-TRAP RP-TRAP .M" CHK Instruction"        .TRAP-ABORT ;TRAP
1C 68K-TRAP RP-TRAP .M" TRAPV Instruction"      .TRAP-ABORT ;TRAP
20 68K-TRAP RP-TRAP .M" Privilege Violation"    .TRAP-ABORT ;TRAP
24 68K-TRAP RP-TRAP .M" Trace"                  .TRAP-ABORT ;TRAP
28 68K-TRAP RP-TRAP .M" Line 1010 Emulator"     .TRAP-ABORT ;TRAP
2C 68K-TRAP RP-TRAP .M" Line 1111 Emulator"     .TRAP-ABORT ;TRAP
30 68K-TRAP RP-TRAP .M" Unassigned, Reserved"   .TRAP-ABORT ;TRAP
   $ Fill in all reserved trap locations
GILD   : RESERVED 30 @ SWAP ! ; : FR DO I RESERVED 4 +LOOP ;
34 RESERVED    60 40 FR    100 C0 FR EMPTY
```

Screen # 23

```
$ 68000 Trap Diagnostic Words                        ( PLB*04/08/86)
HEX
38 68K-TRAP RP-TRAP .M" 68010 Format Error"     .TRAP-ABORT ;TRAP
3C 68K-TRAP RP-TRAP .M" Uninitialized Interrupt Vector"
                                              .TRAP-ABORT ;TRAP
60 68K-TRAP RP-TRAP .M" Spurious Interrupt"     .TRAP-ABORT ;TRAP

GILD
```

Screen # 24

```
$ .WME support thru host                             ( PLB*10/29/86)
HEX
: CLASS>TOKEN ( class - token)  <SERVER-1> W! 34
 HOST-SERVER <SERVER-2> W@ <SERVER-1> @ .TOKEN ."  SIZE= " . ;

: ATTR>TOKEN ( class attr - )  <SERVER-1> 2+ W! <SERVER-1> W!
   38 HOST-SERVER
   <SERVER-2> W@ <SERVER-1> @ .TOKEN ." SIZE = " . ;
```

Screen # 25

```
$ TEMP SCREEN FOR ACCEPTING RULES FROM HOST        ( PLB*10/30/86)
$ INTR OFFSET WILL BE 18 HEX

$ : TEMP-ACCEPT  1000 0 DO I DROP LOOP RP-COMPLETE ;
$ : TEMP-ACCEPT CR <BYTES-SENT> W@ DUP ." Bytes Sent --> " DECIM
$    . ?DUP IF 0 DO I <NETWORK> + W@ HEX CR 5 U.R
$       2 +LOOP
$    THEN RP-COMPLETE ;
: TEMP-ACCEPT <NETWORK> SIZE-OF-NET DUMP RP-COMPLETE ;
HEX ' TEMP-ACCEPT  IRUPT-TABLE 18 + !
```

Screen # 26

Screen # 27

Screen # 28

Screen # 29

Screen # 30

Screen # 31

Screen # 32

Screen # 33

Screen # 34

Screen # 35

Screen # 36

Screen # 37

Screen # 38

Screen # 39

Screen # 40

Screen # 41

Screen # 42

Screen # 43

Screen # 44

```
  ( Target compatibility)   EMPTY
CREATE 'R  HERE 4+ ,   ( RAM size) ALLOT
: THERE ( - n)    'R @ ;
: ALLOT ( n)    'R +! ;
: ORG ( n)    1+ 2/ 2*  H ! ;
: GAP ( n)    HERE + ORG ;

: TARGET   IMMEDIATE ;
: HOST   FORTH ;   IMMEDIATE
: FORTH   FORTH ;   IMMEDIATE

: CVARIABLE   THERE CONSTANT  1 ALLOT ;
: VARIABLE   THERE 1 AND ALLOT  CVARIABLE  1 ALLOT ;
: LABEL   CREATE  ASSEMBLER ;
: EQU   CONSTANT ;
: |   ;
```

Screen # 45

```
( Target Compiler)   EMPTY   DECIMAL                ( PLB*01/03/86)
$ Rule Processor Kernel Target Compilation
-TWINS  3 LOAD $ RP variable definitions
  ' (CREATE) 'CREATE !   31 WIDTH 1+ C!
: AHEAD ( - a)   >IN W@  32 WORD  SWAP >IN W! ;
: LOG ;    : .WHERE ;     110 LOAD   HELP
CREATE HEAD  32 ALLOT   CREATE HDS  4 ALLOT   CREATE ?TWO  1 W,
VARIABLE WO   VARIABLE 'H   VARIABLE 'R   WVARIABLE VOC
( Meta)  46 LOAD   HOST DEFINITIONS
: ORG ( a)   1+ 2/ 2*  'H ! ;    : HERE ( - a)   'H @ ;
: GAP ( n)   HERE + ORG ;    : THERE ( - a)   'R @ ;   HEX
: WINDOW ( n)  DUP ORG WO ! 0 'R ! 000B VOC W!  HEAD 20 ERASE ;
: !   0 HDS W! ;       : RECOVER   -4 GAP ;      DECIMAL
( Compile to RAM)  48 49 THRU   ( Assembler)  50 LOAD
: ALLOT ( n)   'R +! ;
61 LOAD  EMPTY EMPTY CR .( RP Kernel Complete) CR
```

Screen # 46

```
  ( Host computer)
: NAME ( - a)   LAST @ @ 4+ ;
: PREVIOUS ( - a)  LAST @ @ CFA 4+ @ ;
: VOCAB ( - n)   NAME 1+ C@  VOC W@  10 - + ;
: -' ( - a t, a a f)   CONTEXT W@ >R  VOC W@ CONTEXT W!  -'
  R> CONTEXT W! ;
HEX 0071 VOCABULARY FORTH   IMMEDIATE
    0017 VOCABULARY HOST   IMMEDIATE
    0179 VOCABULARY ASSEMBLER       DECIMAL
: HASH ( - a)   VOCAB 10 +  14 AND 2*  CONTEXT 2+ + ;
: TARGET   LAST @  DUP @  DUP @  ROT ROT DUP
     HASH  DUP LAST !  DUP @  ROT !  !  ! ;
: TWIN   ?TWO W@ IF  .WHERE  DUP WIDTH W@  >IN W@
  ROT CONSTANT  >IN W! WIDTH W!  THEN  DROP ;
: SIAMESE   ?TWO W@ IF  .WHERE  DUP WIDTH W@  >IN W@
  ROT WCONSTANT  >IN W!  WIDTH W!  THEN DROP ;
```

Screen # 47

```
HELP           Displays these target COMPILER instructions

CP/M LOAD      Compiles polyFORTH for CP/M 68K system

s n TDUMP      Dumps target address space,  n bytes at  s
HERE U.        Current top of target dictionary
THERE U.       Next available target RAM location




Nucleus           Edit     Asm  Total        Program date
```

Screen # 48

```
  ( Compile to RAM)                                ( PLB*01/09/86)
20 CONSTANT PFK     PFK 1024 * CONSTANT PFSZ
CREATE RAM   PFSZ ALLOT
: DICTIONARY ( n)   RAM PFSZ 255 FILL  HDS 2DUP W!  2+ W! ;
: >T ( a - a)   WO @ - PFSZ 4- MIN  RAM + ;
: TC@ ( a - n)   >T C@ ;          : TC! ( n a)   >T C! ;
: TW@ ( a - n)   >T W@ ;          : TW! ( n a)   >T W! ;
: TW+! ( n a)   >T W+! ;          : T! ( d a)   >T ! ;
: TC.   HERE TC!  1 'H +! ;       : W,   2 GAP  HERE 2- TW! ;
: ,    4 GAP  HERE 4- T! ;
: CMOVE ( s d n)   >R  >T R> CMOVE ;   HEX
: TDUMP ( an-)  BASE W@  ROT ROT  HEX  CR CR  6 SPACES
  10 0 DO  OVER I +  OF AND  3 U.R  LOOP  CR  OVER + SWAP DO
  CR  I 4 U.R  SPACE  I 10 + I DO  I TC@  3 U.R  LOOP  2 SPACES
  I 10 + I DO  I TC@ 7F AND  DUP  20 < OVER 7F = OR IF  DROP 2E
  THEN  EMIT  LOOP  10 +LOOP  CR  BASE W! ;  DECIMAL
```

Screen # 49

```
  ( Compile to RAM  - CP/M EXTENSIONS)             ( PLB*01/03/86)
$ Rule Processor Image Save

HEX
CREATE PFS 24 ALLOT
: PFSAVE  PFS 24 ERASE
 0052504B PFS ! 45524E45 PFS 4+ ! 4C494D47 PFS 8 + !
 ( DELETE)  PFS 13 BDOS DROP  ( MAKE)  PFS 16 BDOS DROP
   PFK 8 * 0 DO
      I 80 * RAM + 1A BDOS DROP
      PFS 15 BDOS ABORT" File Write Error"
   LOOP  PFS 10 BDOS  FF = ABORT" File Close Error" FLUSH ;
```

Screen # 50

```
  ( Target assembler)                              ( PLB*01/16/86)
: SIZE   AHEAD C@  WIDTH C@  MIN 2+ -2 AND  4+  HDS W@ MIN 4+ ;
: EMPLACE ( n)   LOG  CONSTANT TARGET DOES>  @ 4- , ;
: (CREATE) SIZE DUP DUP IF BLK W@ 2048 + W, THEN ( VIEW FIELD)
     HERE +  EMPLACE 4- ?DUP IF
     4- >R  VOCAB  14 AND 2* HEAD +  DUP @ ,
     NAME HERE I CMOVE  HERE 4- SWAP !  R> GAP
  THEN  HDS 2+ W@  HDS W!  HERE 4+ , ;
: CODE   (CREATE) ASSEMBLER ;    : EQU ( n)   LOG CONSTANT ;
: LABEL   HERE EQU  ASSEMBLER ;
: STRING ( c)  WORD  DUP C@  2+ 2/ 2*
   >R I GAP  HERE I - R> CMOVE ;
HEX   ( WIDTH W@ >R  1FIF WIDTH W!)   ASSEMBLER DEFINITIONS
CREATE MODES  FORTH  00204000 , 0060E000 , 80A0C000 , ASSEMBLER
DECIMAL 112 119 THRU   : BEGIN ( n)   HERE ;   : U)   3) ;  MR>
( R> WIDTH W!) HOST DEFINITIONS   : USE ( a)   PREVIOUS 4- T! ;
```

Screen # 51

```
  ( Target compiler)
: COMPILE   -' ABORT" ?" DROP  4- FORTH , ;   IMMEDIATE
: [COMPILE]   [COMPILE] COMPILE ;   IMMEDIATE
: '   -' ABORT" ?" DROP @ ;
: LITERAL   COMPILE long , ;   TARGET
: [']   '  [COMPILE] LITERAL ;   TARGET
: ]   BEGIN  -' IF  NUMBER  ?CELL IF  COMPILE long ,
      ELSE  COMPILE cell W,  THEN  ELSE
   DROP  EXECUTE  DEPTH 0< ABORT" Stack empty"  THEN AGAIN ;
: [   R> DROP ;   TARGET
: ;code   R> @ USE ;
: ;CODE   FORTH COMPILE  HOST ;code  HERE FORTH ,  SMUDGE
   R> DROP  ASSEMBLER ;  IMMEDIATE
: DOES>   FORTH COMPILE  HOST ;code  HERE FORTH ,
  R> DROP  HOST  20153 W, does> ,  ] ;   IMMEDIATE
```

Screen # 52

```
  ( Compiler directives)
: BEGIN   HERE ;   TARGET       : !BACK   HERE  - W, ;
: UNTIL   COMPILE if  !BACK ;   TARGET
: AGAIN   COMPILE else  !BACK ;   TARGET
: THEN   HERE OVER -  SWAP TW! ;   TARGET
: IF   COMPILE if  HERE 0 W, ;   TARGET
: WHILE   [COMPILE] IF  SWAP ;   TARGET
: REPEAT   [COMPILE] AGAIN  [COMPILE] THEN ;   TARGET
: ELSE   COMPILE else  HERE 0 W. SWAP [COMPILE] THEN ; TARGET
: DO   COMPILE 2>R  HERE ;   TARGET
: LOOP   COMPILE loop  !BACK ;   TARGET
: /LOOP   COMPILE /looo  !BACK ;   TARGET
: +LOOP   COMPILE +looo  !BACK ;   TARGET
: ;   COMPILE EXIT  SMUDGE R> DROP ;   TARGET
: (   41 WORD  DROP ;   TARGET
: $   64  >IN W@  OVER MOD  -  >IN W+! ; TARGET
```

Screen # 53

```
  ( Defining Words)                                ( PLB*01/16/86)
HERE  colon ORG
FORTH : :   CURRENT W@ CONTEXT W!  (CREATE)  SMUDGE ] ;CODE
      create ORG $ The DUP IF 2+ THEN below is for VIEW FIELD
FORTH : CREATE HERE SIZE DUP IF 2+ THEN + TWIN  (CREATE)  ;CODE
      wconstant ORG
FORTH : WCONSTANT   DUP SIAMESE  (CREATE)  W,  ;CODE
      constant ORG
FORTH : CONSTANT   DUP TWIN  (CREATE) ,  ;CODE
```

```
   user ORG
FORTH : USER   WCONSTANT  ;CODE   ORG   4 LOAD ( RP VARIABLES)
FORTH : VARIABLE   THERE CONSTANT  4 ALLOT ;  ( PROM versions)
FORTH : 2VARIABLE   VARIABLE  4 ALLOT ;
FORTH : VARIABLE   CREATE 0 , ;
FORTH : 2VARIABLE   VARIABLE 0 , ;  ( RAM versions)
```

Screen # 54

Screen # 55

Screen # 56

Screen # 57

Screen # 58

```
  ( Character operators)
: -TRAILING ( a n - a n)   BEGIN 1- 2DUP + C@ 32 - OVER
   0< + UNTIL  1+ ;
CODE -MATCH   ( d n s n - a t)
     S )+ RL MMOV D0 D3 \\    1 #Q D0 W. SUB    D0 D5 MOV
   BEGIN   D3 A0 MOV   D1 A1 MOV   D5 D0 MOV
   BEGIN   A0 )+ A1 )+ B. CMP   D0 0= DBCC
      0= NOT IF   1 #Q D3 ADD   1 #Q D2 SUB  SWAP  0> NOT UNTIL
  THEN   A0 S -) MOV  1 #Q D0 W. ADD   D0 S -) MOV   NEXT
```

```
CODE <CMOVE   S )+ RL MMOV D1 \ A0 A1 \\   D1 TST   0= NOT IF
     D1 A1 ADD   D1 A0 ADD   1 #Q D1 SUB
     BEGIN   A1 -) A0 -) B. MOV   D1 DBRA  THEN   NEXT
CODE CMOVE   S )+ RL MMOV D1 \ A0 A1 \\
   1 #Q D1 SUB    0< NOT IF   BEGIN   A1 )+ A0 )+ B. MOV
     D1 DBRA   THEN   NEXT
```

Screen # 59

```
  ( CRT  Terminal)   HEX

: >TYPE ( a n)   >R  PAD I CMOVE  PAD R> TYPE ;

MSG (CR)   20D W, 0A00 W,   DECIMAL
: (PAGE)   24 0 DO CR  LOOP ;
: (TAB) ( l c)   2DROP  CR ;
: (MARK) ( a n)   >R PAD I CMOVE  94 EMIT  PAD R> TYPE ;

: CLEAN   18 0 TAB  79 SPACES  13 EMIT ;
```

Screen # 60

```
$ Rule Processor 68000 polyFORTH                        ( PLB*01/09/86)
CODE X   HERE 10 - HEAD !   HEAD DUP 4+ 28 MOVE
  HEX 8020  HERE 6 - TW!   DECIMAL
63 69 THRU    108 109 THRU    70 71 THRU  $ Nucleus
51 53 THRU      FORGET VARIABLE
72 74 THRU                $ Level 1
75 77 THRU                $ Multiprogrammer
78 LOAD                   $ Terminal
CREATE FILE# 4 GAP ( Define File number)  5 LOAD ( RP VARIABLES)
84 86 THRU                $ Output
87 90 THRU                $ Interpreter
91 93 THRU                $ Disk
99 105 THRU               $ Compiler
  HEX  HERE 7 U.R  THERE 7 U.R  DECIMAL
58 59 THRU                $ Kernel Extensions
111 LOAD                  $ Assembler
```

Screen # 61

```
$ Rule Processor PolyFORTH System                       ( PLB*01/07/86)
HELP   HOST DEFINITIONS   FORGET ALLOT
: ALLOT ( n)   'R +! ;
HEX    0 EQU PROM
26 DICTIONARY   PROM WINDOW   PROM 100  + ORG
2 EQU nb    RP-TOP  400 nb * - EQU FIRST   DECIMAL
  FIRST 220 256 + -  DUP EQU 'OPERATOR   256 +  'R !
60 LOAD
81 82 THRU                   $ Terminal
94 96 THRU                   $ Disk
106 107 THRU                 $ Initialize
HOST HERE H'S T!  HERE H'S 4 + T!
( Links)  HOST  HEAD ram 2+ 32 CMOVE
  HEX  HERE 7 U.R  THERE 7 U.R SPACE
HOST   PFSAVE  FLUSH
```

Screen # 62

Screen # 63

```
 ( Nucleus)                                             ( PLB*11/18/86)
LABEL ':'    44 GAP
LABEL colon   I R -) MOV   W I MOV
LABEL 'NEXT   ,NEXT

  CODE cell   I )+ A0 W. MOV   A0 S -) MOV   ,NEXT
  CODE long   I )+ S -) MOV   ,NEXT

CODE EXIT   R )+ I MOV   ,NEXT
```

Screen # 64

```
  ( Defining words - execution)
LABEL 'CREATE'    190 GAP
LABEL create   W S -) MOV   NEXT

LABEL 'WCONSTANT'   32 GAP
LABEL wconstant   W ) A0 W. MOV   A0 S -) MOV   NEXT
LABEL 'CONSTANT'  32 GAP
LABEL constant   W ) S -) MOV   NEXT
LABEL 'USER'    24 GAP
LABEL user   W ) A0 W. MOV   U A0 ADD   A0 S -) MOV   NEXT

LABEL does>   W S -) MOV   R )+ D7 MOV   I R -) MOV
      D7 I MOV   ,NEXT
```

Screen # 65

```
  ( Structures)
| CODE else   BEGIN   I ) I W. ADD   ,NEXT
| CODE if ( t)  S )+ TST   0= NOT UNTIL   2 #Q I ADD
   ,NEXT

CODE 2>R ( n n)   S )+ RL MMOV D0 D1 \\
   RL R -) MMOV D0 D1 \\   NEXT
CODE 2R> ( - n n)   R )+ RL MMOV D0 D1 \\
   RL S -) MMOV D0 D1 \\   NEXT
| CODE loop   1 #Q R ) ADD   BEGIN   R ) D0 MOV
   4 R) D0 CMP   CS IF   I ) A0 W. MOV   A0 I ADD   ,NEXT
      THEN   BEGIN  2 #Q I ADD   8 #Q R ADD   ,NEXT
| CODE /loop ( n)   S )+ D0 MOV   D0 R ) ADD   SWAP BRA
| CODE +loop ( n)   S )+ D0 MOV   D0 D1 MOV
   D0 R ) ADD   R ) D0 MOV   4 R) D0 SUB
      D1 D0 EOR   0< UNTIL   I ) A0 W. MOV   A0 I ADD   ,NEXT
```

Screen # 66

```
  ( Logical Operators)
CODE AND ( n n - n)   S )+ D0 MOV   D0 S ) AND   ,NEXT
CODE OR ( n n - n)   S )+ D0 MOV   D0 S ) OR   ,NEXT
CODE XOR ( n n - n)   S )+ D0 MOV   D0 S ) EOR   NEXT

CODE 0= ( n - t)   BEGIN   D1 CLR   S ) TST   0= IF
   1 #Q D1 ADD   THEN   D1 S ) MOV   ,NEXT

CODE = ( n n - t)   S )+ D0 MOV   D0 S ) SUB   BRA

CODE 0< ( n - t)   S ) TST   HERE   0< IF   1 # S ) MOV
   ELSE   S ) CLR   THEN   ,NEXT
CODE < ( n n - t)   4 S) D0 MOV   S )+ D0 SUB   DUP BRA
CODE > ( n n - t)   S )+ D0 MOV   S ) D0 SUB   BRA
```

Screen # 67

```
  ( Memory reference operators)
CODE W@ ( a - n)   S )+ A0 MOV   D0 CLR   A0 ) D0 W. MOV
   D0 S -) MOV   ,NEXT
CODE W! ( n a)   S )+ A0 MOV   2 #Q S ADD   S )+ A0 ) W. MOV
      ,NEXT
CODE W+! ( n a)   S )+ A0 MOV   S )+ D0 MOV   D0 A0 ) W. ADD
      NEXT
CODE C+!   S )+ A0 MOV   S )+ D0 MOV   D0 A0 ) B. ADD   NEXT

CODE C@ ( a - n)   S )+ A0 MOV   D0 CLR
   A0 ) D0 B. MOV   D0 S -) MOV   ,NEXT
CODE C! ( n a)   S )+ A0 MOV   S )+ D0 MOV   D0 A0 ) B. MOV
   ,NEXT

CODE >R ( n)   S )+ R -) MOV   NEXT
CODE R> ( - n)   R )+ S -) MOV   NEXT
```

Screen # 68

```
  ( Stack operators)
CODE DUP ( n - n n)   S ) S -) MOV   ,NEXT
CODE DROP ( n)   4 #Q S ADD   ,NEXT
CODE SWAP ( n1 n2 - n2 n1)   S )+ RL MMOV D0 D1 \\
   D0 S -) MOV   D1 S -) MOV   ,NEXT

CODE OVER ( n1 n2 - n1 n2 n1)   4 S) S -) MOV   ,NEXT
CODE ROT ( n1 n2 n3 - n2 n3 n1)   S )+ RL MMOV D0 D2 \\
   RL S -) MMOV D0 D1 \\   D2 S -) MOV   NEXT

CODE I ( - n)   R ) S -) MOV   ,NEXT
```

Screen # 69

```
  ( Arithmetic Operators)                             ( PLB*09/04/86)
CODE + ( n n -n)   S )+ D0 MOV   D0 S ) ADD   ,NEXT
CODE - ( n n -n)   S )+ D0 MOV   D0 S ) SUB   ,NEXT

CODE 1+ ( n - n)   1 #Q S ) ADD   NEXT
CODE 1- ( n - n)   1 #Q S ) SUB   NEXT
CODE 2+ ( n - n)   2 #Q S ) ADD   NEXT
CODE 2- ( n - n)   2 #Q S ) SUB   NEXT
CODE 4+ ( n - n)   4 #Q S ) ADD   NEXT
CODE 4- ( n - n)   4 #Q S ) SUB   NEXT

CODE 2* ( n - n)   2 S) ASL   S ) ROXL   ,NEXT
CODE 2/ ( n - n)   S ) ASR   2 S) ROXR   NEXT
CODE 4* ( n - n)   S )+ D0 MOV   2 # D0 ASL   D0 S -) MOV
   ,NEXT
CODE 4/ ( n-n) S )+ D0 MOV 2 # D0 ASR D0 S -) MOV ,NEXT
```

Screen # 70

```
  ( Multiply, divide)
CODE /MOD ( u u - r q)   S )+ RL MMOV D0 D1 \\
   udiv BSR   RL S -) MMOV D0 D1 \\   NEXT
CODE */MOD ( u u u - r q)   S )+ RL MMOV D0 D1 \\
   S )+ RL W. MMOV D2 D3 \\   umul BSR   mudiv BSR
      D6 W. CLR   D6 SWP   RL S -) MMOV D4 \ D6 \\   NEXT
CODE * ( n n - p)   S )+ RL MMOV   D1 D2 \\   mul BSR
   D1 S -) MOV   NEXT
CODE / ( n n - q)   S )+ RL MMOV D0 D1 \\   sdiv BSR
   D0 S -) MOV   NEXT
CODE MOD ( u u - r)   S )+ RL MMOV D0 D1 \\   sdiv BSR
 . D1 S -) MOV   NEXT
CODE H* ( n n - p)   S )+ RL MMOV D0 D1 \\   D0 D1 MULU
   HERE   D1 S -) MOV   NEXT
CODE H/ ( n n - q)   S )+ RL MMOV D0 D1 \\   D0 D1 DIVS
   D1 EXT   BRA
```

Screen # 71

```
  ( String Operators)
CODE MOVE   S )+ RL MMOV D0 \ A0 A1 \\
      2 # D0 LSR   1 #Q D0 SUB   0< NOT IF
   BEGIN   A1 )+ A0 )+ MOV   D0 DBRA   THEN   NEXT
```

Screen # 72

```
  ( Arithmetic)
CODE NEGATE ( n - n)   S ) NEG   NEXT
CODE ABS ( n - n)   S ) TST   0< IF   S ) NEG   THEN   NEXT
CODE NOT ( t - t)   ' 0= USE

CODE MIN ( n n - n)   S )+ D0 MOV   S ) D0 CMP   0< IF
   D0 S ) MOV   THEN   NEXT
CODE MAX ( n n - n)   S )+ D0 MOV   S ) D0 CMP   0> IF
   D0 S ) MOV   THEN   NEXT

CODE WITHIN ( n l h - t)   S )+ RL MMOV  D0 D2 \\   S -) CLR
   D1 D0 SUB   D1 D2 SUB   D0 D2 SUB   2 S) ROXL   NEXT

0 WCONSTANT 0   1 WCONSTANT 1
```

Screen # 73

```
  ( Miscellaneous)
CODE ERASE ( a n)   S -) CLR
LABEL fill   S )+ RL MMOV D0 D1 \ A0 \\
   1 #Q D1 SUB   0< NOT IF   BEGIN   D0 A0 )+ B. MOV
      D1 DBRA   THEN   NEXT
CODE FILL ( a n c)   fill USE

CODE 'S ( - a)   S S -) MOV   NEXT
CODE ?DUP ( n - 0, n n)   S ) TST   0= NOT IF
   S ) S -) MOV   THEN   NEXT

CODE I' ( - n)   4 R) S -) MOV   NEXT
CODE J ( - n)   8 R) S -) MOV   NEXT

CODE LEAVE   R ) 4 R) MOV   NEXT
```

Screen # 74

```
  ( 32-bit memory reference)
```

```
CODE 2DUP ( d - d d)   S ) RL MMOV DO D1 \\
   RL S -) MMOV DO D1 \\   ,NEXT
CODE 2DROP ( d)   8 #Q S ADD   ,NEXT

CODE @ ( a - n)   S )+ A0 MOV   A0 ) S -) MOV   ,NEXT
CODE ! ( n a)   S )+ A0 MOV   S )+ A0 ) MOV   ,NEXT
CODE +! ( n a)   S )+ A0 MOV   S )+ D0 MOV   D0 A0 ) ADD
   ,NEXT
```

Screen # 75

```
( System and USER variables)                        ( PLB*01/29/86)
0 USER STATUS    10 USER S0        14 USER CTR      16 USER PTR
20 USER EXTENT   22 USER 'CR       26 USER 'PAGE    30 USER 'TAB
34 USER 'MARK    38 USER 'TYPE     42 USER 'KEY     46 USER '?TERM
50 USER H        58 USER 'EXPECT   62 USER BASE     64 USER 'ABORT
68 USER CNT
70 USER >IN      72 USER BLK    74 USER CONTEXT    108 USER CURRENT
110 USER LAST    114 USER C#       116 USER L#      118 USER WIDTH
120 USER POST    121 USER S/D      122 USER MODE    124 USER WSZ
( WSZ 1+)        126 USER SCR      130 USER R#

VARIABLE GOLDEN 32 ALLOT   VARIABLE 'BLOCK   2VARIABLE 'BUFFER
VARIABLE 'NUMBER   VARIABLE 'CREATE   2VARIABLE NB
VARIABLE DISK  10 ALLOT   VARIABLE PREV nb 4* ALLOT
VARIABLE TODAY ( and  TICKS )  2 ALLOT
```

Screen # 76

```
  ( Multi-programmer)   HEX
4E40 WCONSTANT WAKE   ( 0 TRAP)

LABEL GIVE   R )+ D0 W. MOV   R )+ U MOV   2 #Q U SUB
   4EF9 #W U ) MOV   S0 4- U) S MOV   S )+ I MOV
   D0 MTSR   S )+ R MOV    NEXT

CODE PAUSE   4 #Q I SUB   HERE USE   WAKE #W U ) MOV
LABEL WAIT   R S -) MOV   I S -) MOV   S S0 4- U) MOV
   STATUS 2+ U) A0 MOV   A0 ) JMP

CODE STOP   WAIT USE      DECIMAL
```

Screen # 77

```
  ( Multiprogrammer control)
CODE GRAB ( a)   S )+ A0 MOV   A0 ) U CMP   0= NOT IF
   A0 ) TST   0= NOT IF   A0 S -) MOV
     ' PAUSE BRA   THEN
     U A0 ) MOV   THEN   NEXT

: GET ( a)   PAUSE GRAB ;

CODE RELEASE ( a)   S )+ A0 MOV   A0 ) U CMP   0= IF
   A0 ) CLR   THEN   NEXT
```

Screen # 78

```
  ( Vectored Terminal)                              ( PLB*11/09/85
CODE EXECUTE ( a)   S )+ W MOV  HERE   4 #Q W SUB  'NEXT 2+ BRA
CODE @EXECUTE ( a)   S )+ A0 MOV   A0 ) W MOV
   W D0 MOV   0= UNTIL   NEXT

: TYPE     ( a n)  DUP C# W+!  'TYPE @EXECUTE ;
: ?TERMINAL ( -f)  '?TERM @EXECUTE ;
: KEY ( -c)        'KEY @EXECUTE ;
: EXPECT   ( a n)  'EXPECT @EXECUTE ;
: STRAIGHT  ( a n-) ?DUP IF
      0 DO DUP KEY SWAP C! 1+ LOOP THEN DROP ;
: CR            'CR @EXECUTE  0 C# W!  1 L# W+! ;
: PAGE          'PAGE @EXECUTE  0 C# ! ;
: TAB ( l c)   2DUP 'TAB @EXECUTE  C# W! L# W! ;
: MARK ( a n)  'MARK @EXECUTE ;
: EMIT ( c)    'S 3 + 1 TYPE  DROP ;
```

Screen # 79

```
$ CP/M 68K BDOS Function Call                       ( PLB*10/29/85)
HEX
$ BDOS ( parameter function# - result )
CODE BDOS   S )+ D0 MOV   S )+ D1 MOV   4E42 W, ( TRAP2)
   D0 S -) MOV   ,NEXT

$ BIOS ( parameter function# - result )
CODE BIOS   S )+ D0 MOV   S )+ D1 MOV   RL R -) MMOV A2 S \\
   4E43 W, ( TRAP3)  R )+ RL MMOV A2 S \\   D0 S -) MOV  ,NEXT

CREATE FILE# 4 GAP
CREATE ~TPA 0A GAP
: ~GET-TPA   0 ~TPA W!  ~TPA 3F BDOS DROP ;
: LOW-TPA ( -a)   ~GET-TPA  ~TPA 2+ @ ;
: HIGH-TPA ( -a)   ~GET-TPA  ~TPA 6 + @ ;
```

Screen # 80

Screen # 81

```
$ Terminal I/O                                      ( PLB*01/07/86)
HEX
: HOST-SERVER  ( cmd# - )  <SERVER-CMD> W!
      BEGIN <SERVER-CMD> W@ 0= UNTIL ;
: ?HOST-SERVER ( cmd# - )  <SERVER-CMD> W!
      BEGIN <SERVER-EN> W@ <SERVER-CMD> W@ NOT NOT
      AND NOT UNTIL ;

: (TYPE)  ( addr cnt - )   <SERVER-EN> W@ IF
   ?DUP IF
     0 DO DUP C@
       <SERVER-1> W!   4 ?HOST-SERVER
   1+ LOOP THEN DROP ELSE 2DROP THEN ;
: (KEY) ( -char) BEGIN <RP-CHAR-IN> W@ UNTIL <RP-CHAR-IN> W@
      0 <RP-CHAR-IN> W! ;
: (?TERM) ( -flag)  <RP-CHAR-IN> W@ ;
```

Screen # 82

```
$ BDOS TERMINAL I/O                                 ( PLB*10/16/86)
DECIMAL
CREATE KYVAL 0 W,
: !CHAR ( C-)   PTR @ C!   1 PTR +!   1 CTR W+! ;
: (EXPECT)  ( a n-) DUP 0= IF 2DROP ELSE
   0 CNT C! NEGATE CTR W!    PTR !  ( SAVE COUNT AND ADDRESS )
BEGIN KEY 127 AND KYVAL C! ( MASK PARITY)
 KYVAL C@ DUP 8 = SWAP 127 = OR IF 255 KYVAL C!
     CNT C@ 0=  IF   7 EMIT  ELSE   8 EMIT ( BACKSPACE)
                   SPACE 8 EMIT ( erase old inout)
     -1 PTR +!   -1 CTR W+!   -1 CNT C+!   THEN THEN
 KYVAL C@ DUP 255 = NOT SWAP 13 = NOT AND
     IF KYVAL C@  DUP !CHAR 1 CNT C+! EMIT THEN
 KYVAL C@ 13 = IF  32 DUP  !CHAR 0 CTR W! EMIT  THEN
 CTR W@ 0= UNTIL THEN ;
```

Screen # 83

Screen # 84

```
   ( Output)
CODE HERE   H U) DO MOV   DO S -) MOV   NEXT
CODE PAD ( - a)   H U) DO MOV   64 # DO ADD   DO S -) MOV  NEXT
CODE COUNT ( a - a n)   S )+ AO MOV   DO CLR   AO )+ DO B. MOV
   RL S -) MMOV DO \ AO \\   NEXT
CODE BLANK ( a n)   32 # S -) MOV   fill BRA
HERE   8224 W, 8224 W, 8224 W, 8224 W,
' CODE ?ANY ( n - 0, n a # t)   S ) TST   0< IF   S ) CLR   ELSE
   SWAP # S -) MOV   8 #Q DO MOV   8 # 4 S) SUB   0< IF
   4 S) DO ADD   THEN   DO S -) MOV   W S -) MOV   THEN   NEXT
: SPACES ( n)   BEGIN  ?ANY WHILE  TYPE  REPEAT ;
: SPACE   1 SPACES ;
CODE HOLD ( c)   PTR U) AO MOV   S )+ DO MOV
   DO AO -) B. MOV   AO PTR U) MOV   NEXT
CODE DIGIT ( n - c)   10 #W 2 S) CMP   0< NOT IF
   7 #W 2 S) ADD   THEN   48 #W 2 S) ADD   NEXT
```

Screen # 85

```
   ( Numeric output)
CODE /DIGIT ( d - d n)   DO CLR   S )+ DO W. MOV
   S )+ D1 W. MOV   BASE U) DO DIVU   DO D2 MOV   D1 DO W. MOV
   BASE U) DO DIVU   DO S -) W. MOV   D2 S -) W. MOV   DO W. CLR
      DO SWP   DO S -) MOV   NEXT
: <#   PAD PTR ! ;
: #> ( d - a n)   DROP  PTR @  PAD OVER - ;
: SIGN ( n d - d)   SWAP 0< IF  45 HOLD  THEN ;
: # ( d - d)   /DIGIT  DIGIT HOLD ;
: #S ( d - d)   BEGIN  #  DUP 0= UNTIL ;
: (.) ( d - a n)   DUP ABS  <# #S SIGN #> ;
: . ( d)   (.) TYPE SPACE ;
: U.R ( d n)   >R <# #S #> R> OVER - SPACES  TYPE ;
: U.   0 U.R SPACE ;   : ?  @ . ;
$ : DUMP ( a n)   SWAP -2 AND  DUP ROT + SWAP DO  CR I 8 U.R
$    I 16 + I' MIN I DO  I W@ 6 U.R 2 /LOOP  16 +LOOP SPACE ;
```

Screen # 86

```
   ( String output)   DECIMAL                      ( PLB*05/13/86)
CODE RESET-68K     RESET NEXT
: CRITICAL 36 <SERVER-CMD> W! BEGIN RESET-68K
            <SERVER-CMD> W@ 0= UNTIL ;
CODE ?R@ ( t - a)   R ) AO MOV   DO CLR
   AO ) DO B. MOV   2 #Q DO ADD   0 # DO BCLR   DO R ) ADD
   S )+ TST   0= IF   R )+ I MOV   NEXT   THEN
      AO S -) MOV   NEXT
CODE (ABORT)   SO U) S MOV   S -) CLR
LABEL 'QUIT   0. # I MOV   NEXT
: ABORT 'ABORT @EXECUTE ; RECOVER
| : abort" ( t)   ?R@  BLK W@ ?DUP IF  SCR !  >IN W@  R# ! THEN
   HERE 4+ COUNT CRITICAL TYPE  SPACE  COUNT TYPE  CR  ABORT ;
RECOVER  | : dot"   1 ?R@  COUNT TYPE ;
FORTH : ABORT"   COMPILE abort"  34 STRING ;   TARGET
FORTH : ."   COMPILE dot"  34 STRING ;   TARGET
```

Screen # 87

```
( Interpreter)
| CODE SOURCE ( - # a)   1024 # S -) MOV   BLK U) AO W. MOV
     AO S -) MOV   0= IF   CNT 1+ U) 7 S) B. MOV
   6 S) B. CLR   SO U) S ) MOV   4 #Q I ADD   THEN   NEXT
| CODE (WORD) ( c # a - a)   >IN U) AO W. MOV   S )+ AO ADD
   H U) D7 MOV   5 #Q D7 ADD   0 # D7 BCLR   D7 A1 MOV
      D7 W MOV   A1 )+ W. CLR   8224 #W A1 ) MOV   D3 CLR
      S )+ RL MMOV DO D1 \\   >IN U) DO W. SUB   0= NOT IF
   1 #Q DO SUB   BEGIN   AO )+ D1 B. CMP   DO 0= DBCC
   0= NOT IF   1 #Q A1 SUB   1 #Q AO SUB   BEGIN
      AO )+ A1 ) B. MOV   A1 )+ D1 B. CMP   0= NOT IF
      1 #Q W ) B. ADD   SWAP DO DBRA   1 #Q A1 ADD
      THEN   THEN   THEN   W S -) MOV   32 #B A1 -) MOV
   -8 S) AO SUB   AO >IN U) W. MOV   ' EXIT BRA

: WORD ( c - a)  SOURCE SOURCE  (WORD) :  RECOVER
```

Screen # 88

```
   ( Dictionary Search)
| CODE HASH ( a v - a a, a t)  S )+ DO MOV  0= IF
   I S -) MOV   ' EXIT BRA   THEN   DO D1 MOV
      15 #W DO AND   4 # D1 LSR   S ) A1 MOV
   1 1) D2 B. MOV   D2 DO ADD   14 # DO AND   1 # DO W. ASL
      CONTEXT 2+ # DO ADD   U DO ADD   DO S -) MOV   NEXT
| CODE -FIND ( a a - a v, p a f)    DO AO MOV   A1 D4 MOV
   BEGIN   AO ) AO MOV   AO DO MOV  0= NOT IF   4 #Q AO ADD
   AO )+ D3 W. MOV   A1 )+ D3 W. SUB   1 # D3 W. ASL   0= IF
   -2 1) D2 B. MOV   1 # D2 B. ASR   0= NOT IF    BEGIN
  AO )+ D3 W. MOV  0< NOT IF   A1 )+ D3 W. SUB   0= IF
 1 #Q D2 B. SUB   ROT 0= UNTIL   ROT THEN   BEGIN   4 #Q AO ADD
   AO 4 S) MOV   DO S ) MOV   S -) CLR   ' EXIT BRA   ROT THEN
   A1 )+ D3 W. SUB   1 # D3 W. ASL   0= NOT UNTIL
   THEN   THEN   D4 A1 MOV   DO AO MOV   SWAP BRA   THEN
      8 #Q I SUB   D1 S ) MOV   NEXT
```

Screen # 89

```
   ( Number Input)
CODE ?DIGIT   01 #Q S ) ADD   S ) AO MOV   DO CLR
   AO ) DO B. MOV   58 #W DO CMP   0< NOT IF   65 #W DO CMP
      0< NOT IF   7 #Q DO SUB   SWAP THEN   48 #W DO SUB
      0< NOT IF   BASE U) DO W. CMP   0< IF   DO S -) MOV
   I S -) MOV   NEXT   THEN  THEN  THEN   S -) CLR   NEXT
CODE *DIGIT   S )+ DO MOV   S )+ D3 MOV   2 S) D1 W. MOV
   BASE U) D1 MULU   S ) D2 W. MOV   BASE U) D2 MULU   D2 SWP
   DO D2 W. MOV   D2 D1 ADD   D1 S ) MOV   D3 S -) MOV   NEXT

~ : CONVERT   BEGIN  ?DIGIT WHILE  *DIGIT  1 PTR W+!  REPEAT ;
: (NUMBER)   -1025 PTR W!  DUP 1+ C@ 45 = DUP >R  +
   0.  SWAP  BEGIN  CONVERT DUP C@  DUP 44 48 WITHIN
      SWAP 58 =  + WHILE  0 PTR W!  REPEAT  C@ 32 - ABORT" ?"
   R> IF  NEGATE  THEN ;
: NUMBER   'NUMBER @EXECUTE ;
```

Screen # 90

```
$ Rule Processor QUIT loop                          ( PLB*01/09/86)
CODE DEPTH ( - n)   SO U) DO MOV   S DO SUB
   2 # DO ASR   1 #Q DO SUB   DO S -) MOV   NEXT
: -' ( - a t, p a f)  32 WORD  CONTEXT W@  HASH -FIND ; RECOVER
: ' ( - a)   -' ABORT" ?"  DROP ;
: INTERPRET   BEGIN  -' IF  NUMBER  ELSE  DROP EXECUTE
      DEPTH 0< ABORT" Stack empty"  THEN AGAIN ;   RECOVER
| CODE RESET   U R MOV   NEXT
| CODE CLEAR   >IN U) CLR   CNT U) CNT 1+ U) B. MOV   NEXT
: QUERY  SO @ 80 EXPECT  CLEAR ;
: .RP#  ." RP"  RP-# W@  0 U.R  ." -" ;
: QUIT  BEGIN RESET QUERY INTERPRET   BASE W@ 10 BASE W! CR .RP#
  DEPTH 1- ?DUP IF 0 U.R THEN  DUP 10 = IF ." D" ELSE DUP 16 =
  IF ." H" ELSE DUP ." [" 0 U.R ." ]" THEN THEN ." >> " BASE
  W! AGAIN ; RECOVER   ' QUIT 'QUIT 2+ T!  ' EXIT ' X 4- T!
```

Screen # 91 .

```
( n-buffer Manager)   HEX
CODE ?ABSENT ( - a | n)   PREV 4+ # AO MOV   NB AB DO MOV
   1 #Q DO W. SUB   BEGIN   AO )+ D1 MOV   S ) D1 SUB
   D1 D1 ADD   0= IF   PREV 8 + # AO SUB   AO PREV AB W. MOV
   AO D1 MOV   100 #W D1 MULU   NB 4+ AB D1 ADD   D1 S ) MOV
   ( - a) ' EXIT BRA  THEN   DO DBRA   ( - n) NEXT

CODE ?UPDATED ( - a | a n)   PREV 2+ AB DO W. MOV   NB AB D1 MOV
   2 # D1 ASL   BEGIN   4 #Q DO W. ADD   DO D1 W. CMP   0= IF
   DO CLR   THEN   PREV AB DO W. CMP   0= NOT UNTIL
   DO PREV AB W. MOV   DO PREV 2+ AB W. MOV   DO A1 W. MOV
   100 #W DO MULU   NB 4+ AB DO ADD   DO S -) MOV
   PREV 4+ # A1 ADD   A1 ) DO MOV   7FFFFFFF # A1 ) MOV
   DO TST   0< NOT IF   ( - a) ' EXIT BRA   THEN   1F # DO BCLR
   DO S -) MOV   DO 'BUFFER 4+ AB MOV   ( - a n) NEXT
```

Screen # 92

```
   ( 31-bit Block)

CODE UPDATE   PREV AB AO W. MOV   PREV 4+ # AO ADD
   15 # AO ) BSET   NEXT

CODE ESTABLISH ( n' n - n)   PREV 2+ AB AO W. MOV
   AO PREV AB W. MOV   PREV # D7 MOV   4 S) 4 D7 +XL 0) MOV
   S )+ S ) MOV   NEXT

CODE IDENTIFY ( n a - a)   S )+ DO MOV
  PREV AB AO W. MOV   PREV # D1 MOV   DO 4 D1 +XL 0) MOV   NEXT
```

Screen # 93

```
  ( Vectored block, buffer)   HEX
| CODE buffer   'BUFFER AB W MOV   colon BRA

: BUFFER ( n - a)   DISK GET  buffer  ESTABLISH
   DISK RELEASE ;

| CODE block   'BLOCK AB W MOV   colon BRA

: BLOCK ( n - a)   PAUSE ?ABSENT  DISK GRAB  block
   DISK RELEASE ;   ' BLOCK 4-  ' WORD 4+ T!

: FLUSH   NB @ 0 DO 7FFFFFFF BUFFER DROP  LOOP ;
```

```
: EMPTY-BUFFERS   PREV NB @ 4* 4+ ERASE
   NB 4+ @  NB @ 400 *  ERASE  FLUSH ;
```

Screen # 94

```
$ Rule Processor Disk I/O                                ( PLB*01/07/86)

        CREATE <SHADOW> 4 GAP
        CREATE <MAXBLK> 4 GAP

: SHADOWS <SHADOW> @ ;

: (FILE) ( blk addr code -)  >R
    OVER    0 <MAXBLK> @ 1+ WITHIN NOT
    ABORT" Error - Block Number Out of Range"
    <SERVER-2> !   <SERVER-1> W!
    R> HOST-SERVER ;
```

Screen # 95

```
$ Rule Processor Disk I/O                                ( PLB*01/07/86)
HEX

: <OPEN-SCREEN> ( file#-)  <SERVER-1> W!    8 HOST-SERVER
    <SERVER-1> W@    <MAXBLK> !
    <SERVER-2> W@    <SHADOW> ! ;
```

Screen # 96

```
  ( Media switch)                                        ( PLB*04/29/86)
HEX
CREATE 'FILE  ' (FILE) ,

: (BLOCK)    ?ABSENT  buffer 2DUP 0C 'FILE @EXECUTE ( READ)
   ESTABLISH ;

: (BUFFER)   ?UPDATED  OVER 10 'FILE @EXECUTE ;  ( WRITE)

EXIT
NOTE-  EVENTUALLY PUT ERROR CODE IN DISK 4+
```

Screen # 97

Screen # 98

Screen # 99

```
( Compiler)   HEX
FORTH : IMMEDIATE   8000 PREVIOUS  NAME 4- CFA 4+ NAME - -
   TW+!  VOC W@  0003 VOC W!  TARGET VOC W! ;
FORTH : [COMPILE]   FORTH  CONTEXT W@  0003 CONTEXT W!
    '  EXECUTE  CONTEXT W! ;   TARGET   HOST DECIMAL
| CODE ?ALLOT ( n - t)   H U) DO MOV   S )+ DO ADD   1 #Q DO ADD
   0 # DO BCLR   DO H U) MOV   250 # DO ADD   DO S CMP
      CS NOT IF   ' EXIT BRA   THEN   I S -) MOV   NEXT
: ALLOT ( n)   ?ALLOT ABORT" Dictionary full" ;   RECOVER
CODE ?CELL   S ) DO MOV   32768 # DO ADD   -65536 # DO AND
   DO S -) MOV   NEXT
: C, ( n)   HERE C!  1 H +! ;   : , ( n)   4 ALLOT  HERE 4- ! ;
: W, ( n)   2 ALLOT  HERE 2- W! ;
CODE COMPILE   H U) A0 MOV   I )+ A0 )+ MOV   A0 H U) MOV  NEXT
: LITERAL ( n)   ?CELL IF COMPILE long  , ELSE
   COMPILE cell W,  THEN ;   IMMEDIATE
```

Screen # 100

```
  ( Defining words)
: ]   BEGIN -' IF  NUMBER  [COMPILE] LITERAL
   ELSE  4+ @  0< IF  EXECUTE  DEPTH 0< ABORT" Stack empty"
      ELSE 4- ,  THEN THEN  AGAIN ;   RECOVER
CODE [   ' EXIT USE       IMMEDIATE
: [']   '  [COMPILE] LITERAL ;   IMMEDIATE
CODE CFA   S )+ A0 MOV   6 #Q A0 ADD   DO CLR   -2 0) DO B. MOV
   31 #W DO AND   1 # DO ASR   0= NOT IF
     1 #Q DO SUB   BEGIN   A0 )+ W. TST   DO 0< NOT DBCC
   THEN   A0 S -) MOV   NEXT
: USE ( a)   LAST @ @  CFA  ! ;
| : ;code   R> USE ;
FORTH : ;CODE   COMPILE ;code  SMUDGE  R> DROP  ASSEMBLER ;
   TARGET
FORTH : DOES>   COMPILE ;code  20153 W, does> , ;   TARGET
: SMUDGE   LAST @ @ 4+  DUP C@ 32 XOR  SWAP C! ;
```

Screen # 101

```
  ( Defined words)                                       ( PLB*12/07/85)
: CREATE   'CREATE @EXECUTE ;
: ,VW   FILE# @ 1024 *   BLK W@ +  W, ;  ( VIEW FIELD)
   HERE   'CREATE' ORG
: (CREATE) 0 ALLOT ,VW HERE 32 WORD CURRENT W@ HASH DUP LAST !
   DUP @ ,  SWAP C@  WIDTH C@  2DUP MIN  2+ -2 AND  ALLOT >
  32768 HERE  ROT 2* - W+!  0. ,  !  WIDTH W@ WIDTH C! ;CODE
'WCONSTANT' ORG    : WCONSTANT ( n)   CREATE W,  ;CODE ( - n)
'CONSTANT' ORG     : CONSTANT ( n)   CREATE ,  ;CODE ( - n)
'USER' ORG         : USER ( n)   WCONSTANT  ;CODE ( - a)
':' ORG            : :   CURRENT W@ CONTEXT W!  CREATE
                      SMUDGE ]  ;CODE                  ORG
: WVARIABLE   CREATE  0 W, ;   : VARIABLE   CREATE  0. , ;
: MSG   CREATE  ;CODE      FORTH
: MSG   CREATE  DOES>  COUNT TYPE ;
```

Screen # 102

```
  ( Compiler Directives)
: BEGIN ( - a)   HERE ;   IMMEDIATE
| : !BACK ( a)   HERE  -  W, ;
: UNTIL ( a)    COMPILE if  !BACK ;   IMMEDIATE
: AGAIN ( a)    COMPILE else  !BACK ;   IMMEDIATE
: THEN ( a)    HERE OVER -  SWAP W! ;   IMMEDIATE
: IF ( - a)    COMPILE if  HERE 0 W, ;   IMMEDIATE
: WHILE ( a - a a)   [COMPILE] IF  SWAP ;   IMMEDIATE
: REPEAT ( a a)   [COMPILE] AGAIN  [COMPILE] THEN ;   IMMEDIATE
: ELSE ( a - a)   COMPILE else  HERE 0 W,
   SWAP  [COMPILE] THEN ;   IMMEDIATE
: DO ( - a)    COMPILE 2>R  HERE ;   IMMEDIATE
: LOOP ( a)    COMPILE loop  !BACK ;   IMMEDIATE
: /LOOP ( a)    COMPILE /loop  !BACK ;   IMMEDIATE
: +LOOP ( a)    COMPILE +loop  !BACK ;   IMMEDIATE
: ;   COMPILE EXIT  SMUDGE  R> DROP ;   IMMEDIATE   EXIT
```

Screen # 103

```
  ( Generic words)
: VOCABULARY ( n)   WCONSTANT  ;CODE     FORTH
: VOCABULARY ( n)   (CREATE) W,  DOES>  W@ CONTEXT W! ;

HEX 0013 VOCABULARY ASSEMBLER
 . 0001 VOCABULARY FORTH

: CODE   CREATE  HERE USE  ASSEMBLER ;
: ;CODE   COMPILE ;code  SMUDGE  R> DROP  ASSEMBLER ;
   IMMEDIATE        does>
: DOES>   COMPILE ;code  4EB9 W, LITERAL , ;   IMMEDIATE
DECIMAL
```

Screen # 104

```
  ( Miscellaneous)
: EMPTY   H 4+ @ H !  GOLDEN CONTEXT 36 MOVE ;
: GILD   CONTEXT GOLDEN 36 MOVE  HERE H 4+ ! ;
: STRING ( n)   -4 ALLOT  WORD C@  4+ 1+ ALLOT ;
: ABORT" ( t)   COMPILE abort"  34 STRING ;   IMMEDIATE
: ."   COMPILE dot"  34 STRING ;   IMMEDIATE
: .(   41 WORD COUNT TYPE ; IMMEDIATE
: DECIMAL   10 BASE W! ;
: HEX   16 BASE W! ;
: LOAD ( n)   >IN @ >R   0 >IN W!  BLK W!   INTERPRET
   R> >IN !  DECIMAL ;
: THRU ( f l)   1+ SWAP DO  I LOAD  LOOP ;
: (   41 WORD DROP ;   IMMEDIATE
: $   64  >IN W@  OVER MOD  -  >IN W+! ; IMMEDIATE
CODE R@ ( - n)   R ) S -) MOV   NEXT
```

Screen # 105

```
$ Miscellaneous, Cont.
CODE SP ( -n)   S DO MOV   DO S -) MOV   NEXT

: DEFINITIONS   CONTEXT W@  CURRENT W! ;
```

Screen # 106

```
  ( Initial RAM)   HEX                              ( PLB*01/27/87)
CREATE OPERATOR  ( 72 bytes)  'OPERATOR ,   'OPERATOR B0 - ,
   4EF9 W,  'OPERATOR ,  0 ,   'OPERATOR B0 - ,
   0 W,  0 ,  40 W,  ' (CR) ,   ' (PAGE) ,   ' (TAB) ,
   ' (MARK) ,   ' (TYPE) ,   ' (KEY) ,   ' (?TERM) ,
LABEL H'S  8 GAP   ' (EXPECT) ,  ( base) 0A W,  ' (ABORT) ,

CREATE ram   ( 70 bytes)  1 W, 20 GAP 1 W,   ' (BLOCK) ,
   ' (BUFFER) , 0 ,   ' (NUMBER) ,   ' (CREATE) , nb , FIRST ,
   0 , 0 W, ( DISK)
CREATE XYZ GIVE ,
CODE RP-STOP    2 GAP
   HERE HOST -3 AND DUP 'H ! 800000 OR ASSEMBLER  USE
   BEGIN   4E72 W, 2000 W,   BRA
: CONFIG-CHK   1234 <BOOT-CMD> W!    <BOOT-CMD> W@ 1234 -
   ABORT" ERROR IN BOOT"           RP-STOP ;
```

Screen # 107

```
  ( Power up)   HEX                                 ( PLB*04/02/87)
: INIT-FORTH   XYZ @ 80 ! ram GOLDEN 46 MOVE  OPERATOR 8 +
   STATUS  DUP 100 ERASE  44 CMOVE POST 6 ERASE 2 WSZ C!
   1F1F WIDTH W!  0 SCR ! EMPTY EMPTY-BUFFERS ;
: COLD  INIT-FORTH  ." RP polyFORTH/32 19 June 1985" CR ;
: COLD-3LOAD   COLD 1 <OPEN-SCREEN> 3 LOAD ;
: INIT-STOP  INIT-FORTH RP-STOP ;
CREATE 'INIT   ' RP-STOP ,   ' CONFIG-CHK ,   ' COLD ,
      ' COLD-3LOAD , ' INIT-STOP , ' INIT-STOP ,   4 GAP

LABEL START ] <BOOT-CMD> W@ 'INIT + @EXECUTE ABORT [
LABEL POWER-UP  START # I MOV   2000 #W MTSR
   'OPERATOR DUP # U MOV   B0 - # S MOV   U R MOV
   'NEXT # A2 MOV   D2 S -) MOV   NEXT
HERE PROM ORG 0 , POWER-UP , ORG   $ Set RP 68000 Restart Vector
```

Screen # 108

```
  ( Mixed arithmetic)
LABEL umul   D3 D4 MOV   D1 D4 MULU   D4 D6 W. MOV   D4 W. CLR
   D4 SWP   D2 D5 MOV   D1 D5 MULU   D4 D5 ADD   RTS
LABEL mudiv   D0 D5 DIVU   D5 D4 W. MOV   D5 SWP   D6 SWP
   D5 D6 W. MOV   D6 SWP   D0 D6 DIVU   D4 SWP
      D6 D4 W. MOV   RTS
CODE */ ( n n n - n)   S )+ RL MMOV D0 D1 \\
   S )+ RL W. MMOV D2 D3 \\   umul BSR
      D2 TST   0< IF   D5 SWP   D1 D5 W. SUB   D5 SWP   THEN
      D1 TST   0< IF   D2 SWP   D3 D2 W. MOV   D2 D5 SUB   THEN
   D0 D3 W. MOV   0< IF   D0 W. NEG   THEN
   D5 TST   0< IF   D0 SWP   D0 D5 ADD   D0 SWP   THEN
      mudiv BSR   D3 W. TST   0< IF   D4 NEG   THEN
   D4 S -) MOV   NEXT
```

Screen # 109

```
  ( Math subroutines)   HEX
LABEL udiv   D3 W. CLR   D0 D1 DIVU   800 ( OV) IF
      D1 D2 W. MOV   D1 W. CLR   D1 SWP   D0 D1 DIVU
      D1 D3 W. MOV   D2 D1 W. MOV   D0 D1 DIVU   THEN
   D1 D0 MOV   D0 SWP   D3 D0 W. MOV   D0 SWP
   D1 W. CLR   D1 SWP   RTS

LABEL mul   D1 D3 MOV   D1 D4 MOV   D4 SWP   D2 D5 MOV
   D5 SWP   D2 D1 MULU   D4 D2 MULU   D5 D3 MULU   D1 SWP
     D2 D1 W. ADD   D3 D1 W. ADD   D1 SWP   RTS

LABEL sdiv   D0 D4 W. MOV   0< IF   D0 W. NEG   THEN
   D4 SWP   D1 D4 EOR   D1 TST  0< IF   D1 NEG   THEN
   udiv BSR   D4 TST   0< IF   D0 NEG   THEN   RTS
```

Screen # 110

```
( Target compiler log)
: **   ." **" ;
: LOAD ( n)   CR  DUP BLOCK  DUP C@  40 ( left paren) = IF
   **  DUP 64 -TRAILING TYPE  **  CR  THEN  DROP
     DUP 4 U.R SPACE  LOAD  DEPTH IF .S  THEN ;

: THRU ( f l)   1+ SWAP DO  I LOAD LOOP ;
: ?SPACE   C# W@ + 2+ 78 > IF  CR 5 SPACES  THEN ;
: LOG ( a - a)   BASE W@ HEX  OVER <# #S #>  DUP AHEAD C@ +
   ?SPACE  TYPE SPACE  AHEAD COUNT TYPE  SPACE  BASE W! ;

: .WHERE   BASE W@ HEX  OVER <# 41 HOLD #S 40 HOLD #>
   DUP ?SPACE  TYPE  BASE W! ;
: HELP ( n)   PAGE ;
```

Screen # 111

```
( PROM Assembler)   HEX
00BD VOC W!   0 ?TWO W!   FORTH 1F1F WIDTH W! HOST
   ASSEMBLER DEFINITIONS
' W@ EMPLACE TW@        ' W! EMPLACE TW!
' C! EMPLACE TC!        ' W+! EMPLACE TW+!
: GAP ( n)   DUP 1 AND +  H +! ;    : ORG ( a)   H ! ;
   1 CREATE MODES  00204000 , 0060E000 , 80A0C000 ,
   DECIMAL   112 119 THRU
WAIT CONSTANT WAIT
: U) ( a)   STATUS - 3) ;       HEX

000B VOC FORTH W!    1 ?TWO W!   FORTH 1F1F WIDTH W! HOST
   HOST DEFINITIONS
     HERE 7 U.R
```

Screen # 112

```
  ( 68000 Assembler)   HEX
| : MR>   POST 6 ERASE  2 WSZ C! ;
| : (EA) ( - a)   S/D DUP C@ + ;
| : +S/D ( m)   1 S/D C+!  (EA) C+! ;

FORTH : REG   WCONSTANT  DOES> W@ +S/D ;
   00 REG D0    01 REG D1    02 REG D2    03 REG D3
   04 REG D4    05 REG D5    06 REG D6    07 REG D7
   08 REG A0    09 REG A1    0A REG A2    0B REG U     0C REG A4
   0C REG W     0D REG I     0E REG S     0F REG R     FF REG RL
: W.   1 WSZ C! ;        : B.   0 WSZ C! ;

| : !AHEAD ( a n)   DUP >R  POST C@ PAD +
     SWAP 2- IF  W!  ELSE  !  THEN  R> 2*  POST C+! ;
: AB ( a)   DUP -8000 AND  0= NEGATE 2+  DUP 37 + +S/D  !AHEAD ;
```

Screen # 113

```
  ( Addressing modes)   HEX
FORTH : IND   WCONSTANT  DOES> ( x)    W@ (EA) C+! ;
FORTH : IMM   WCONSTANT  DOES> ( n)    W@  DUP +S/D  40 /
     ?DUP IF  1-  DUP WSZ C!  1 MAX !AHEAD  THEN ;
FORTH : OFS   WCONSTANT  DOES> ( n)    W@ +S/D  1 !AHEAD ;
FORTH : NDX   WCONSTANT  DOES> ( n r)   W@  SWAP OFF AND +
     (EA) C@ 1000 * +  8 (EA) C!  -1 S/D C+! ;

   08 IND )      10 IND )+     18 IND -)
   28 OFS 0)     29 OFS 1)     2A OFS 2)     2B OFS 3)    2C OFS 4)
   2C OFS W)     2D OFS I)     2E OFS S)     2F OFS R)
   3C IMM #Q     7C IMM #B     BC IMM #W     FC IMM #
   00 NDX +X    800 NDX +XL

: PC) ( a)   (EA) 1+ C@ 0= NEGATE  DUP 7 AND  33 + +S/D
     IF HERE 2+ -  THEN 1 !AHEAD ;
```

Screen # 114

```
   ( Unary and binary opcodes)   HEX
| : ,POST ( a)   POST C@  DUP 80 AND IF  SWAP 2+ SWAP  THEN
     HERE 2+  SWAP 7F AND  DUP 2+ GAP  CMOVE  MR> ;
| : !OP ( o)   HERE TW!  PAD ,POST ;
| : OPERAND ( o 'f 'm - o')   MODE + C@  3F AND
     SWAP IF  8 40 */MOD +  40 *  THEN + ;

FORTH : UNI   WCONSTANT  DOES> ( mr)   W@  DUP C0 AND
     0= IF  WSZ C@ 40 * +  THEN  0 0 OPERAND  !OP ;
FORTH : M/M   WCONSTANT  DOES> ( m|r m|r)   W@ 8 /MOD
     WSZ C@ ROT AND  8 * +  MODE C@ 8 /MOD  0= NEGATE ROT +
     8 * +  (EA) C@ 7 AND  200 * +  !OP ;

: MOV ( ar# ar)   MODE C@ 3C - IF   WSZ C@  2 4 */MOD + 1+
     1000 *  1 1 OPERAND  0 0 OPERAND  !OP  EXIT THEN
   FF AND  (EA) C@ 200 *  7000 + +  W, MR> ;
```

Screen # 115

```
   ( Binary opcodes)   HEX
| : @OP-MODE ( n - o')   4* WSZ C@ +  MODES + .C@ 2* ;

| : -QUICK ( o - o 1 | o 'f 'm 0)   MODE C@ 3C -  ?DUP 0= IF
     9005 - IF 5000  ELSE 5100  THEN  0 @OP-MODE +
     SWAP 7 AND  200 * +  0 1  0 THEN ;

| : -CONFUSED ( o - o 1 | o 'f 'm 0)   MODE C@ 3C > IF
     DUP 1 AND IF  -2 AND  (EA) C@  OF 8 WITHIN IF  100 *
           0 @OP-MODE +  0 1  0 EXIT  THEN THEN THEN  1 ;

FORTH : R/M   WCONSTANT  DOES> ( rm#q r | r rm)   W@
   -QUICK IF  -CONFUSED IF  -10 AND  (EA) C@ 8 /
        2 MIN @OP-MODE  OVER OR >R  B100 =
        (EA) C@ OF >  + IF  0 1 MODE  ELSE  0 0 (EA)  THEN C@
        7 AND 200 *  R> +  ROT ROT  THEN THEN  OPERAND  !OP ;
```

Screen # 116

```
   ( Register ops)   HEX
FORTH : 1RG   WCONSTANT  DOES> ( d)   W@
     WSZ C@ 1-  40 * +  0 0 OPERAND  !OP ;
| : OPMODE ( r r - r r n)   OVER 8 < OVER 8 < AND IF  40
   ELSE  2DUP AND 8 AND  -8 *  88 + >R
   7 AND SWAP 7 AND SWAP  R>  THEN ;
: EXG   (EA) C@  (EA) 1- C@  OPMODE >R  200 * +  R> +
   C100 +  W,  MR> ;
FORTH : SHFT   WCONSTANT  DOES> ( d|# d | m)   W@
   MODE C@  3C 8 WITHIN IF  F138 AND  MODE C@
     DUP 8 > IF  DROP  F118 AND  PAD @ 7 AND  0 POST C!  THEN
     8 *  WSZ C@ +  40 *  (EA) C@ +  +
   ELSE  FFC0 AND  0 0 OPERAND  THEN  !OP ;
FORTH : BITS   WCONSTANT  DOES>  W@
   MODE C@  DUP 8 > IF  DROP  100 -  4  7E POST C+!  THEN
   200 * +  0 1 OPERAND  !OP ;
```

Screen # 117

```
   ( Exceptional instructions)   HEX
: PMOV   (EA) C@  5  MODE C@  DUP 7 > IF  SWAP 2- ROT  THEN
     8 * +  WSZ C@ +  40 * +  20 -  !OP ;
: MMOV   MODE C@ FF = NEGATE  4C80  WSZ C@ 1-  40 * +  OVER IF
     (EA) C@  20 28 WITHIN  WSZ 1+ C!  400 -  THEN
   0 ROT NEGATE OPERAND  0  S/D 3 ERASE ;
| : MIRROR   0 SWAP  10 0 DO  2 /MOD >R + 2* R>  LOOP DROP 2/ ;
| : 2**N   1  I' -1 DO  2* LOOP  2/ + ;
: \   0  (EA) C@ 1+ MODE C@ DO  2**N LOOP  WSZ 1+ C@ IF  MIRROR
   THEN +  S/D 3 ERASE ;
: \\   \  PAD  ROT W,  SWAP HERE TW!  ,POST  MR> ;
B000 | R/M CMP
: CMP   MODE W@  CMP 3838 AND 1818 = IF  HERE 2- DUP TW@
   FFEF AND  SWAP TW!  THEN ;
```

Screen # 118

```
   ( Opcodes)    HEX
4000 UNI NEGX    4200 UNI CLR     4400 UNI NEG     4600 UNI COM
4840 UNI PEA     46C0 UNI MTSR    4A00 UNI TST     4AC0 UNI TAS
4E71 UNI NOP     4E72 UNI STOP    4E73 UNI RTE     4E75 UNI RTS
4E77 UNI RTR     4E80 UNI JSR     4EC0 UNI JMP     4E70 UNI RESET
C1C0 R/M MULS    C0C0 R/M MULU    81C0 R/M DIVS    80C0 R/M DIVU
4101 R/M LEA     8001 R/M OR      C003 R/M AND     B10B R/M EOR
9005 R/M SUB     D007 R/M ADD                      8108 M/M SBCD
910B M/M SUBX    B10B M/M CMPM    C108 M/M ABCD    D10B M/M ADDX
E0E0 SHFT ASR    E1E0 SHFT ASL    E2E8 SHFT LSR    E3E8 SHFT LSL
E4F0 SHFT ROXR   E5F0 SHFT ROXL   E6F8 SHFT ROR    E7F8 SHFT ROL
0100 BITS BTST   0140 BITS BCHG   0180 BITS BCLR   01C0 BITS BSET
47C0 1RG NBCD    4800 1RG SWP     4880 1RG EXT
4E18 1RG >USP    4E20 1RG <USP    4E10 1RG UNLK
4E72 UNI STOP ( n W,)             4E08 1RG LINK ( n W,)
```

Screen # 119

```
   ( Transfers)   HEX
400 WCONSTANT CS   600 WCONSTANT 0=   B00 WCONSTANT VS
A00 WCONSTANT 0<   F00 WCONSTANT 0>   : NOT   100 XOR ;

| : ?PIECE ( n)   8000 -8000 WITHIN  ABORT" Jump range" ;
| : -BYTE ( a a - n t)   -  DUP 80 -80 WITHIN  OVER ?PIECE ;
: UNTIL   6000 + W,  HERE -BYTE IF W,  ELSE HERE 1- TC!  THEN ;
: BRA   0 UNTIL ;       : BSR   100 UNTIL ;

: THEN   HERE OVER -BYTE ABORT" Jump range"  SWAP 1- TC! ;
: IF   6000 + W,  HERE ;        : ELSE   0 IF  SWAP THEN ;

: DBCC   MODE C@ +  50C8 + W,  HERE -  DUP ?PIECE  W,  MR> ;
: DBRA   100 DBCC ;        : NEXT   A2 ) JMP ;
: ,NEXT   I )+ W MOV   W )+ A0 MOV   A0 ) JMP ;
```

Screen # 120

Screen # 121

Screen # 122

Screen # 123

( Release notes)

1. Interrupt code for OPERATOR and TYPIST's serial ports does not reliably detect control-S. This can cause buffer overflow when printing on serial printers. A temporary fix is to put a time delay in TYPIST's (CR) .
2. 2@ and 2! have been renamed to 2W@ and 2W! .
3. The assembler has been replaced. Many bugs have been fixed.
4. Database Manager and Documentor replaced.
5. Many shadow blocks have been improved.
6. NEXT is expanded in-line for critical nucleus words for performance reasons.
7. Editor replaced.
8. Entire nucleus replaced. Much of the code is the same, but some improvements have been made.

Screen # 124

( Release notes)
9. Source code has been reorganized to be more like other versions of polyFORTH II.
10. CLOCK utility added. This sets a battery-backed clock if you have one.
11. NETWORK utility added to transfer blocks between polyFORTH computers over a serial port.

Screen # 125

\ TTD
- FIX SCR 16 ( RP INTERRUPT VECTOR )
' CODE-WORD IS NOT POSSIBLE !!! CORRECT THIS

Screen # 126

Screen # 127

Screen # 128

Screen # 129

Screen # 130

\ Rule Processor System Variables ( PLB#01/17/86)
<HOST-CMD> = 0 - RP-STOP
= 4 - RP availability check
( puts a 1234H back into <HOST-CMD> )
= 8 - Normal FORTH
= 12 - Kernel Build - Same as normal FORTH, then does a "3 LOAD" to extend FORTH system.
= 16 - Initialize Forth, then stop
= 20 - Initialize OPS, then stop

Screen # 131

( PLB#11/21/86)

KEEP <RP6> LAST SO THAT RP-DISABLE CAN CLEAR FROM <RP6> TO <TICKS>

Screen # 132

Screen # 133

Screen # 134

This block is loaded when, after booting, the operator types HI . The routines loaded here are in the common dictionary which is available to all users.

<CREATE> This compiles, before each new entry, the block number in which the source resides. The cost is 2 bytes/entry. This information is used by LOCATE to display the block. To disable this feature, change B/H to 0 and put parens around the phrase ' <CREATE> 'CREATE !

Additional terminal tasks (if any) should be prompted after the code on Line 10 and before the BILD .

Line 15 is the product release date. Please don't change it.

Screen # 135

Screen # 136

Screen # 137

Screen # 138

Time/Date support for Rule Processors

The rule processors are allowed to request the time and date from the host for the purpose of date stamping within the editor

Screen # 139

SAVE-RPFORTH, BYE, CLONE

BYE tells the host to finish the server mode and go back to the status display (SAVE-STATE) saves the current state of the rule processor forth SAVE-RPFORTH tells the host to save the current rule processor forth in the file "RPFORTH.IMG". This image file can then be reloaded without having to recompile the rule processor forth system CLONE commands the host to make a copy of the rule processor's forth into all other rule processors. All on-line rule processors are then restarted.

Screen # 140

RP-COMPLETE

RP-COMPLETE looks at he debug status. If the rule processor is not being debugged, then it stops. If it is being debugged then it enters the quit loop.

Screen # 141

Current Offsets from IRUPT-TABLE ( PLB*05/08/86)

00 - Do nothing - return from exception
04 - ABORT
08 - RP-STOP
0C - Make-WME ( chem demo )
10 - Delete-WME ( chem demo )
14 - Blinker

Screen # 142

Rule Processor Memory Test

This pseudo-random memory test fills all free memory with a psuedo-random sequence based on a seed and the address. After all words are filled, then the code goes back through all locations filled and verifies that the written data has not changed.

Screen # 143

Screen # 144

Blinking Light Demo

This demo is a simple verification of the recognize/act cycle hardware. This particular code is the rule processors' delay loop.

Screen # 145

Debug Support on Rule Processors

BUG-ON  allows the rule processor to turn on the debug mode
BUG-OFF allows the rule processor to turn off the debug mode Note that these words affect only the rule processor that they are executed on !!!!

Screen # 146

$ 68000 Trap Diagnostic Words ( PLB*04/09/86)

NEED TO DO FOLLOWING ALSO:

OPERATOR AB U MOV U R MOV 'NEXT # A2 MOV

1) RESTORE U REGISTER
2) RESTORE POINTER TO NEXT

Only the HOST needs to go back to USER mode.

Screen # 147

Screen # 148

Screen # 149

Screen # 150

Screen # 151

Screen # 152

Screen # 153

Screen # 154

Screen # 155

Screen # 156

Screen # 157

Screen # 158

Screen # 159

Screen # 160

Screen # 161

Screen # 162

Screen # 163

Screen # 164

Screen # 165

Screen # 166

Screen # 167

Screen # 168

Screen # 169

This block provides compatibility between Target Compiler usage for testing an application which is destined to be target compiled in a resident environment. The major differences are:

1. RAM is segregated into a separate region, whose allocation is controlled by 'R , THERE , and special versions of ALLOT , VARIABLE , and CVARIABLE .
2. Simulated versions are provided for words which exist only in the target compiler, such as LABEL , EQU and ORG . Their behavior is functionally compatible.
3. Dummy versions are provided for words that are relevant only in target compiling such as HOST , and ! .

When you are ready to test your application with this block construct two load blocks: one which loads this block before your application and one for use when actually target compiling. See Targeting FORTH for more details.

Screen # 170

This is the principle load block for the Target Compiler.
NEW is the block where the target code will begin.
CP/M returns the load block of polyFORTH source code.

LOG is a dummy for a logging word that prints names and addresses. The real version is in Block 110.
HEAD allots space for the target dictionary heads.
HDS stores the current and default size of a dictionary header.
?TWO indicates whether HOST definitions of target constants are desired.
'H is the target H . VOC is the target CONTEXT .
ORG sets 'H , HERE gets it and GAP increments it.
'R is the next available location in target RAM.
THERE gets 'R and ALLOT increments it.
WO is the target address of the beginning of target code.
WINDOW sets WO and initializes the other variables.

Screen # 171

NAME returns the address of the name of the last word defined.
PREVIOUS returns its target address.
-' searches for a word in the target dictionary.

FORTH is an immediate vocabulary used with HOST .
HOST is an immediate vocabulary in which host definitions and host versions of target definitions are placed.
ASSEMBLER is the target assembler vocabulary.

HASH is a redefinition of host's dictionary hash algorithm used to re-hash for the target vocabulary.
TARGET moves the last definition from host's vocabulary to the (unnamed) target vocabulary.

TWIN constructs a host version of a target CONSTANT .
SIAMESE constructs a host version of a target WCONSTANT .

Screen # 172

This is the HELP screen for the Target Compiler.

The words at the bottom of the screen provide headings for addresses generated at compile time, to inform the programmer of the progress of the compile and the sizes of various components of the system. The two numbers under "Nucleus" give the last byte of ROM and RAM used, respectively. "Edit" and "Asm" report the last addresses in the editor and assembler. The last two numbers report the final addresses in PROM and RAM.

Screen # 173

This version of memory access words compiles target code into RAM. Block 49 compiles onto disk.

Most words are analogous to those in Block 49

RAM is a 18 K-byte array for storing the target dictionary

FLUSH is redefined to copy RAM onto disk starting at block NEW .

The last thing in a target load block should be HOST FLUSH

Screen # 174

Screen # 175

EMPLACE constructs a target definition. When executed it will compile a reference to itself.
(CREATE) constructs a target entry. It includes a header if HDS indicates and links into the vocabulary indicated by by VOC .
CODE creates a target CODE entry.
EQU (for equate) defines a host constant ( CONSTANT will be redefined).
LABEL names the current position in the target dictionary.
STRING constructs a string in the target dictionary.

MODES is an array of addressing mode constants.
BEGIN and U) as well as all other assembler words are redefined to compile into the target dictionary.
USE is also so redefined.

Screen # 176

The words in this block are redefined to act on the target dictionary as their host counterparts act.

Note that all dictionary searches are restricted to the target (unnamed) vocabulary.

Screen # 177

These words redefine the standard structure words in Block 102 to use the new target run-time code.

The word ( is redefined to work inside target definitions.

Screen # 178

These words provide the compile-time code that must be attached to the run-time code previously assembled.
Exactly the right-sized gaps were left in the dictionary and are now being filled. Those gaps (Blocks 63 and 64) must be adjusted if changes are made here.

Two versions of VARIABLE and 2VARIABLE are provided for either PROM or RAM. PROM variables point to their value from their parameter field. System variables are stored in high RAM for security and memory protection, thus look like PROM variables. PROM variables are selected by FORGETting the RAM version of VARIABLE (in Block 60).

Screen # 179

Screen $ 180

Screen # 181

Screen # 182

Screen # 183

-MATCH takes the text address ( d ) and the text length (the first n ) and tries to find a find buffer match in it. The find buffer begins at ( s ) and has a length of the 2nd ( n ). If the search is successful, the values returned are a 'false' and the address of the end of the string. If the pattern is not found, the values returned are a 'true' and garbage.
<CMOVE is a backward character move. It is useful for copying a field to an overlapping field in higher memory.
CMOVE takes the same arguments as MOVE but move one byte at a time on all processors. Its use is guaranteed to be processor independent and transportable.

Screen # 184

This block contains the hardware-specific features needed to implement the 'screen editor'. They are implemented in such a way that you may easily modify the key words for any CRT with a simple cursor-positioning function.

(TAB) Given line (0-23) and column (0-80), positions the cursor to that position.
(MARK) The purpose of this routine is to highlight the position of the editing cursor, by whatever means the hardware permits: reverse video, underlining, etc. If none of these features are available, insert a caret (hex 5E). Given an address and count of a string to be highlighted, sets the highlighting, outputs the string, and resets it.

Screen # 185

The definitions loaded in this block define polyFORTH for 68000 computers, without consideration for any environment-specific features such as disk and terminal drivers.

The "nucleus" definitions include run-time code for the compiler words ( : , etc.). Target words which compile these addresses are subsequently defined. Thus there can be only CODE definitions until Blocks 51-53 are loaded.

The compiler in Blocks 99-104 and the assembler in Blocks 111-119 are the ones for the target system's programmer. These may not be present in target compiled applications except under license from FORTH, Inc.

Screen # 186

This block controls the entire target compilation of the system, including both standard FORTH features (Block 60) and configuration characteristics: disk & terminal drivers, amount of memory, number of disk buffers, presence/absence of heads, etc. Consult the Target Compiler documentation for a discussion of specific details.

Note that there are 220 bytes allocated for system variables (they are defined in Block 75). If you wish to define additional variables in this area this number must be changed if the required space exceeds 220 bytes. The 256 refers to the size of OPERATOR's user area.

See also the documentation for Block 47.

Screen # 187

Screen # 188

':' A gap left at compile time, into which the target system's compiler (Block 101) will compile the high-level portion of : Target applications without a compiler may recover this space by defining : GAP DROP ;
colon The run-time code for all : definitions. Note that it falls through to 'NEXT instead of doing a NEXT or a ,NEXT .
EXIT In addition to its glossary definition, EXIT is the run-time code for ; .

cell The run-time code for literals compiled in definitions
long The run-time code for 32-bit literals in definitions.

Screen # 189

Following the model discussed in the previous block, this block defines the run-time code for more compiler words, with GAPs left for the compile-time code to be added later.

Screen # 190

These definitions are the run-time code for the compiler directives that form structures, whose names are the upper-case equivalents.

2>R is the run-time code for DO . It is so named and allowed to keep its head because it is occasionally useful as a double-length version of >R .

The BEGINs on Lines 9 and 11 mark the beginning of code shared by loop , +loop , and /loop .

Screen # 191

These simple primitives are excellent examples of FORTH's assembler usage, especially the use of the IF ... ELSE ... THEN structure.

Note, as in the previous block, the use of HERE on Line 10 to mark the address of code to be shared by both 0< , > and < .

Screen # 192

These memory reference operators provide additional examples of good Assembler practice.

Note that W@ acts like C@ in that it fetches a sub-field of a 32-bit stack item without sign-extention.

Screen # 193

The stack operators in this block deal with 32-bit cells. They offer excellent examples of stack manipulation in code.

Screen # 194

The words 1+ , 2+ , etc. provide more than convenience: they are both shorter and faster than 1 + , etc., and thus should always be preferred.

Note that 2* , 2/ , and 4* use arithmetic shifts and are thus signed operations.

Screen # 195

By convention, all arithmetic operators with MOD in their names are unsigned operations; all others in this block are signed.

Precision of operators:

* 32 x 32 -> 32 multiply
/ 32 / 16 -> 32 signed divide
*/ 32 x 16 / 16 -> 32 signed ratio operation
*/MOD 32 x 16 / 16 -> 16-bit remainder, 32-bit quotient.
/MOD 32 / 16 -> 32-bit remainder, 32-bit quotient.
H* and H/ execute 68K multiply and divide instructions.

The math subroutines and */ are in Blocks 108-109 .

Screen # 196

MOVE moves a string, given source and destination addresses addresses and count. All arguments are in bytes; however, 32-bit cells are moved to take advantage of the performance increase. For moves involving byte counts which are not guaranteed to be even multiples of four, CMOVE should be used.

It should be noted that MOVE and CMOVE both use the looping primitive DBRA so the maximum number of bytes which may be moved is 262144 for MOVEs and 65536 for CMOVEs.

Screen # 197

Some less common arithmetic operators:
NEGATE returns a two's complement.
ABS returns an absolute value.
NOT reverses a truth value. It is identical to 0= .

MAX returns the maximum of 2 signed numbers.
MIN minimum 0 an 1 are defined as constants. This provides a shorter reference during compilation.

WITHIN tests for n within l to h-1 where l and h may be anywhere on the number circle.

Screen # 198

A variety of miscellaneous operators:
ERASE fills a given area of memory with zeroes.
FILL fills a given area of memory with the character on the top of the stack.

'S returns the address of the top of the stack. Its use is discouraged.
?DUP duplicates a number if it is non-zero.
Using ?DUP IF makes an ELSE DROP phrase unnecessary.

I' returns the limit of a LOOP (the 2nd item on the return stack).
J returns the index of an outer LOOP (the 3rd item).

LEAVE sets the LOOP limit to its index. This will force an exit at the end of the current iteration.

Screen # 199

The '2' operators operate on two 32-bit stack cells at a time.

2DUP duplicates the double number on top of stack.
2DROP drops the double number on top of stack.

@ fetches cell n from address a .
! stores cell n at address a .
+! adds n to the cell at address a .

Screen # 200

The USER variables for this system are documented in the Processor Supplement.

Most BACKGROUND tasks have shorter user areas than TERMINAL tasks, usually not extending beyond the first 14 bytes GOLDEN holds the dictionary heads used by EMPTY .
The cell after 'BUFFER holds the block# last written.

The byte at DISK 4+ is set if there's a disk error.
The cells after PREV contains the disk buffer status cells.
Note that only as many bytes as are required by the number of block buffers used are allotted.

Screen # 201

This is the inner loop of the multiprogrammer.

WAKE This code is the instruction stored in the STATUS cell of a user who is ready to become active. STATUS normally contains a JMP to the next task in the round robin.
GIVE This is the address of the code which activates a task. It is executed out of TRAP 0.
PAUSE This entry to the multiprogrammer starts by storing WAKE in the STATUS cell so the task will wake up next time around the loop.
WAIT This entry point is the normal entry for a task who will stay 'asleep' until some event (such as an interrupt) awakens him.
STOP This provides high-level access to WAIT .

Screen # 202

GRAB asserts control of a facility by storing the current user's STATUS address in its facility variable. If the facility isn't available (i.e, value non-zero and not this user) waits in PAUSE until it is available.
GET calls GRAB after one lap around the multiprogrammer.

RELEASE releases a specified facility variable by setting it to zero assuming it belongs to the current user -- does nothing if it doesn't.

Screen # 203

EXECUTE takes an address of a FORTH definition (any kind) and executes it. On completion, control will pass to the FORTH word following EXECUTE .
@EXECUTE performs like EXECUTE , but takes an address containing the address of the word to be executed. If the address contains 0, branches to the NEXT at the end of TYPE (i.e. does nothing)
TYPE stores its arguments in PTR and CTR , respectively, and executes the routine whose address is in the user's 'TYPE .
EXPECT stores its address argument in PTR and its count (negated) in CTR , then executes the routine whose address is in the user's 'EXPECT . Note that CNT is set to a flag which indicates whether input editing is to be performed.
STRAIGHT EXPECTs without input editing.
CR , PAGE , TAB , and MARK execute CRT-specific routines.
EMIT outputs a single character.

Screen # 204

Screen # 205

Screen # 206

Screen # 207

( PLB#10/16/86)

10/16/86 fixed to remove old key presses on backspace !!!

Screen # 208

Screen # 209

These are basic output words plus some orphans:
HERE returns the next available byte in the dictionary.
PAD returns the address of a string scratch pad.

COUNT takes the address of a string (with count in first byte) and returns the address plus one and count (for TYPE , etc.)
BLANK blanks a string (as ERASE zeroes one).

?ANY is used by SPACES to count spaces in bunches of 8.
SPACES types spaces. A 0 or negative count does nothing.
SPACE types a space.
HOLD stores a character backwards in a string indicated by PTR . It is used during number conversion. The string actually runs backwards from PAD .
DIGIT converts a digit to ASCII, including the hex offset.

Screen # 210

Number formatting words:
<# initialized the string in PTR .
#> discards the number and returns the string address and count
SIGN tests the sign (from the 3rd stack position) and buffers a minus.
buffers a single digit.
#S buffers digits until the number reaches zero.

(.) formats a signed integer.
. types a signed integer, with trailing space.
U. types an unsigned integer, with trailing space.
U.R types an unsigned integer, right justified in a field.

DUMP displays a region of memory, which may be in I/O space.

Screen # 211

String output words include:
?R@ tests a truth value, if set it returns with an in-line string address; otherwise it exits from the calling definition (usually ABORT" ).

ABORT clears both stacks and goes to QUIT for input.

abort" is the run-time code for ABORT" . Upon error, it types the word at HERE , the message, and saves >IN in R# for the editor.
dot" is the run-time code for ." . It types the message.

ABORT" and ." are host definitions that reference the just-defined run-time code.

Screen # 212

The heart of the interpreter is here:
SOURCE locates the input string: BLK zero indicates the message buffer ( S0 @ ); non-zero, the block number.
word does the word of extracting a word from the input string and storing it at HERE 4+ (allowing room for the link which will go at HERE if the word is compiled) until CNT 1+ expires. If the string is empty, returns a 0 count. If the string is of even length, fills out the last byte in the last cell with a space.

WORD returns the next word in the input stream, or a zero-length string of one blank if the stream is exhausted. Note that the second reference to SOURCE is a dummy - it is replaced by a reference to BLOCK in Block 95, just after BLOCK is defined.

Screen # 213

Dictionary search:
HASH selects one of 8 dictionary threads based on the first character and current vocabulary (nibble from stack). It exits from the the calling definition when vocabularies are exhausted. The hash value is an offset into the dictionary heads. It's calculated by:
<current vocabulary> <first character> + 14 AND 2+

-FIND searches the dictionary. If it finds a match, it returns the parameter field address, link field address, and 'false'. Otherwise, it repeats HASH .

12/23/85 PLB - MADE 'HASH' AND '-FIND' TO HAVE HEADS FOR AIM

Screen # 214

?DIGIT increments the address on the stack and then determines if the character at that location is a valid digit in the current BASE . If the character is valid, a true flag is left on the stack with the value of that digit underneath. Otherwise, only a false flag is left. For both cases, the address is not removed.

The number conversion here assumes 32-bit. Infix punctuation of numbers is allowed but not required. The high order cell of PTR is used to convey some useful information after conversion is complete. If this cell contains a negative number, there were no allowable punctuations in the converted number, otherwise it contains a count of the number of digits converted since the last punctuation was encountered.

Screen # 215

DEPTH returns the number of items on the parameter stack (before it was called).
-' searches the dictionary for the word following in the input stream. If found, returns 0 ('false'), with the link field address and parameter field address beneath. If not found, returns 'true' and HERE 2+.
' searches the dictionary for the word following in the input stream. and returns its parameter field address if found;

aborts if not found.
INTERPRET interprets the input stream, executing words found in the dictionary and converting numbers to binary, until either the input stream is exhausted or a word is found that cannot be found or converted.
RESET clears the current user's return stack.
QUIT stops whatever is executing and resumes the (terminal's) normal behavior of awaiting input for the terminal.

Screen # 216

?ABSENT checks to see if the block whose number is on the stack is present in memory. If the block is present, ?ABSENT removes the block number from the stack, and leaves an address pointing to the beginning of the block buffer, and and then leaves the word which called ?ABSENT , by means of the ' EXIT BRA on Line 5. If the block is not listed in PREV then ?ABSENT leaves the block number on the stack, and exits normally through NEXT .
?UPDATED finds an old buffer. If the old buffer has its update bit set, ?UPDATED returns the buffer address with the block number of the buffer on top. The block number is later used to write out the data. If the buffer's update bit is not set, ?UPDATED returns the buffer address and EXITs the word which called it.
PREV points to the most recently accessed block buffer.
PREV 2+ points in turn to each but skips over PREV's buffer.

Screen # 217

INDEX adds the current user's OFFSET contents to the block number on the stack.
UPDATE sets the most significant bit of the cell in PREV which contains the block number of the most recently accessed block.
ESTABLISH makes the oldest buffer ( PREV 2+ ) into the newest buffer (by putting the pointer into PREV ) and marks the new buffer with the block number on the next-to-top of stack.
IDENTIFY marks the newest buffer ( in PREV ) with the block number from the stack, with OFFSET added.

Screen # 218

The words BLOCK and BUFFER defined here execute the the words whose addresses are in the system variables 'BLOCK and 'BUFFER respectively. Note that this vector is system wide (all users execute the same version of BLOCK and BUFFER ). This provides the capability for multiple disk controllers in the same system to be alternately treated as the system disk device under software control. This is very useful when writing disk drivers for a new controller.

BUFFER takes a block number and frees a buffer, and marks that buffer with the given block number, then leaves the address of the buffer on the stack.
BLOCK takes the block number, then insures that the block is present in a buffer, and leaves the address of the buffer.
FLUSH writes out all NB (# of buffers) updated buffers.
EMPTY-BUFFERS erases all the block buffers.

Screen # 219

$ Rule Processor Disk I/O ( PLB#01/07/86)
Host will service the Disk I/O request from the rule processors.

FILE OPEN:
12 byte filename addr -> <RP-FILE-ADDR>
0 -> <RP-FILE-BLK>
file-open command -> <RP-FILE-CMD>
Host returns <MAXBLK> in <RP-FILE-ADDR>
SHADOWS in <RP-FILE-BLK>
FILE ACCESS:
addr -> <RP-FILE-ADDR>
blk# -> <RP-FILE-BLK>
cmd -> <RP-FILE-CMD>

In both cases, the RP will wait for <RP-FILE-CMD> to go to 0

Screen # 220

Screen # 221

Screen # 222

Screen # 223

Screen # 224

IMMEDIATE causes the preceding definition to be executed rather than compiled at compile time.
[COMPILE] forces compilation of what would otherwise be an IMMEDIATE compiler directive following in the input stream.
The above words help the host computer compile the target system's compiler.
?ALLOT increments H and returns 'true' if there are fewer than 250 bytes left in the dictionary.
ALLOT prints error message when H is too high.
, W, and C, compile a cell, word, or byte in the dictionary.
COMPILE compiles a reference to the word following it.
LITERAL compiles a 32 or 16-bit literal preceeded by the address of the appropriate run-time code ( cell or long ).

Screen # 225

] is FORTH's compiler.
[ exits ] .
['] compiles the parameter address of the word following it as a literal.
CFA converts a Link Field Address to a Code Field Address.
USE changes the code address of the LAST word to the address given.
;code leaves compile mode, and sets the code address of the most recent definition to the address following. This is the run-time behavior of ;CODE.
;CODE enables the Target Compiler to create defining words in the target system, whose run-time behavior is code.
DOES> enables the Target Compiler to create defining words in the target system whose run-time behavior is high-level.
SMUDGE toggles the smudge bit in the latest definition.

Screen # 226

The words in this block allow the target system to compile "data items". The use of these words is documented in the Reference Manual, Starting FORTH, and other sources.
CREATE executes the word whose address is in the system variable 'CREATE .
(CREATE) creates a dictionary entry whose link is at HERE , head and code address following. The code field is set to the code at create (Block 64); other defining words may use (CREATE) to construct the head and then substitute other code addresses.
The compile time portions of CREATE (above), CONSTANT , USER and : are compiled into the gaps left before their code in Blocks 63, 64.
VARIABLE shares the code belonging to CREATE and allocates 4 bytes.
WVARIABLE allocate 2 bytes.

Screen # 227

This block defines the compiler directives that provide structures in the target system's compiler. The use of FORTH's structure words is described in the Reference Manual and other sources.

The compiler directives use the compile-time stack to pass the addresses needed to compile branches. Depending upon the processor, relative offsets or absolute addresses may be compiled; this computer uses the latter.

Most of the words that perform the run-time action for these words have the same name, but are in lower-case and headless. They are defined in Block 65.

Screen # 228

VOCABULARY defines a word which, when executed, will set CONTEXT to the sequence of vocabulary indices given.

The two versions of VOCABULARY are for the target system and the Target Compiler, respectively. The latter is used to define the target system's vocabularies FORTH , ASSEMBLER , and EDITOR .

The following definitions are for the target system's compiler
CODE starts an assembler definition. The code address is set to the new definition's parameter field.
;CODE terminates the compile-time portion of a defining word and commences it's run-time portion which is in code.
DOES> is functionally equivalent to ;CODE except that its run-time behavior is described in high-level.

Screen # 229

EMPTY resets H to the beginning of the task's dictionary given by H 4+ . The system definition chains in GOLDEN are used to restore the eight link heads, CONTEXT and CURRENT in the task's user area .
STRING compiles a string terminated by a given ASCII character.
ABORT" compiles an error message which will be displayed along with the word at HERE and the task restarted if the number on the stack at run-time is 'true'.
HEX , DECIMAL , BINARY change BASE appropriately.
." compiles a string for display at run-time.

( stops interpreting until the delimiter ")" is encountered.

LOAD saves the current position in the input stream and calls INTERPRET then restores the input stream pointer.

Screen # 230

Screen # 231

These tables are used by the START code to initialize RAM and OPERATOR's user area.

OPERATOR contains the information necessary to initialize the one task which is active following a boot. The format of this table is essentially the same as those constructed by TERMINAL in Block 25.

ram contains initial values for the system variables, in the order in which they are defined in Block 75.

Screen # 232

The order of operations in the start-up sequence is:
1. System is booted from the cylinder 0 of the selected device and control is passed to the address contained in location PROM 4+ (the address of POWER-UP ).
2. POWER-UP sets the U and R registers to the address of OPERATOR , initializes S , and sets I to the address START where NEXT will branch. The processor is placed in supervisor mode and interrupts are disabled.
3. START initializes GOLDEN , erases OPERATOR's user area and copies initial values into it's first 64 bytes. MODE is initialized for the assembler and WIDTH is set to 3 character name truncation. The interrupt vectors for the disk and serial ports are initialized and OPERATOR is then greeted and activated.

Screen # 233

This block contains */ and a subroutine which is factored for use in */MOD . umul performs a 16 x 32 -> 48 bit multiply. The numbers to be multiplied are in D1 and D2,D3. The result is left in D5 and the upper half of D6.

Screen # 234 udiv performs a 32 / 16 -> 32 rem., 32 quot unsigned.
The arguments are passed in D0 ( divisor) and D1 (dividend)
The results are left in D1 (remainder) and D0 (quotient)
mul performs a 32 x 32 -> 32 unsigned multiply of registers D1 and D2 with the result left in D1 .

sdiv uses udiv to perform a 32 / 16 -> 32 bit signed divide.

Screen # 235

This block may be optionally loaded in the Target Compiler See Block 45 Line 4. If loaded, it produces a map showing the target address of each word defined. The map is of limited usefulness on CRT, but may be very useful on a printing terminal
This is the only way to relate the source definitions to a specific address in a set of target PROMS or remote system under test.
LOAD redefines LOAD to display the block numbers.
THRU similarly displays each block number.
LOG types the name and address of a target word being defined. It detects the end of a line and peforms a carriage return.
HELP avoids redisplaying the Target Compiler's HELP screen, as it is an inappropriate part of the Log.
.WHERE shows the value of all CONSTANTS defined and the target ram location for all VARIABLES .

Screen # 236

This block loads the assembler that will be resident in the target system. It should be omitted from any non-extensible target application.
TW@ , TW! , TC+! , TW+! are included so that the same blocks may be loaded for HOST and TARGET .
WIDTH is set to maximum length, 31 characters at the beginning of this block, to avoid any ambiguity. It is reset to 3 at the end.

WAIT is perpetuated into the TARGET dictionary since its LABEL definition is solely found in HOST .
U) is re-defined to compute the offset of a user variable. For example, BASE U) DO MOV moves the current user's BASE to data register 0.
The last PROM address of the assembler is displayed at the end.

Screen # 237

MR) resets the assembler's user variables in preparation for the next opcode's operands.
(EA) gives the address of current byte of mode data.
+S/D advances S/D and adds the stack byte to (EA) .

The register names place their codes in the next MODE byte. Note that nothing is left on the stack!
RL is the place holder for register lists in MOVM .

H and B set WSZ to 1 or 0.
!AHEAD is given a half cell size (1 or 2) and a stack value to be posted at PAD .
AB sets absolute half or long mode and posts the address.

Screen # 238

IND builds address indirect modes. The A register is assumed at (EA) and the mode offset is added to it.
IMM builds and posts immediate modes. The high two bits are the size flag and the low bits are 3C. Note that #Q data are left on the stack!
OFS builds and posts address mode offsets.
NDX builds index offset modes. The extension word is left on the stack to be posted by an OFS word. S/D is backed up and (EA) for the pending OFS is set to 8 to bump the mode up.
The next words in the block are the mode designators that follow the above forms.
PC) builds and posts the PC-relative mode.

Screen # 239

,POST appends posted data to the current instruction. The address passed in is that which PAD had during the posting. The high bit of POST is set by BITS to override the apparent length of its immediate data.
!OP compiles the opcode and the extension words.
OPERAND adds addressing mode fields to the stacked opcode. The top item points to the half of MODE containing the field - the next item indicates which opcode field receives the data.
UNI assembles one or no operand opcodes. The case of 0 inputs falls through because the MODE bytes remain 0. Opcodes are not adjusted for word size if their size field is not 0.
M/M makes memory to memory opcodes such as ADDX . The low two bits of opcode mask are zero for byte-only opcodes.
MOV assembles the general and quick move instructions.

Screen # 240

@OP-MODE returns an opmode field value from the MODES table as indexed by its input (0, 1, or 2 for Dn, An, or memory dest.) and the word size. An input of zero is also used to return WSZ properly aligned.
-QUICK handles the case of #Q sources for ADD and SUB only. It returns false for non-quick sources.
-CONFUSED handles the case of opcodes that generate special forms for immediate data with non-address-register modes. These opcodes have their low bits on as a flag and their low nybble is used as the immediate subcode. True is returned otherwise.
R/M is used for binary opcodes. After eliminating the above cases, it masks out the low nybble and determines operand order with EOR being a special case with inverted order.

Screen # 241

1RG is used for register-only opcodes who's size field is one bit wide.
OPMODE given two register numbers, returns the op-mode field for the EXG instruction and adjusts the 4-bit register numbers by clearing their high bit. It returns 40 for two data registers, 48 for two address registers, and 88 for a combination.
EXG assembles an EXG instruction.
SHFT builds shift instructions, The cases are immediate or Dn shifts of Dn, or one-bit memory shifts. For convenience the type field occurs twice in the opcode masks.
BITS builds immediate or Dn specified bit opcodes.

Screen # 242

PMOV moves to or from a Dn and offset addressing. Size must be long or half cell.
MMOV moves to or from various memory address modes and RL .
A register list must follow of the following form:
[<list> \]*n <list \\>
where <list> is either a single register name or a pair of registers with the low-numbered first, and n may be 0.
MIRROR does a bit swap of the low 16 bits of the top stack.
2**N adds 2 to the power of the outer loop index to the stack.
\ ends a register sublist and \\ ends the last list.
SWP takes a data register.
EXT takes a data register and a size of long or half cell.
EXG works correctly only for two data registers.

Screen # 243

The opcodes are defined here.

STOP must be followed by an n W, to specify the status register value.
LINK must be followed by an n W, to specify the stack adjustment.

Screen # 244

These are the branch and looping instructions.

,NEXT compiles an in-line NEXT .

Screen # 245

Screen # 246

Screen # 247

Screen # 248

Release notes:
Special problems and features of this release are listed here.

Screen # 249

Screen # 0

```
FILES.PF -- CP/M Screen File Package              ( PLB*10/19/85)

Update Records :

<01> 10/19/85 PLB  -  Creation of Screen File Package
<02> 11/10/85 PLB  -  Added LOAD-FROM and Screen Copy Utilities
<03>  5/14/86 PLB  -  Documentation


This file allows PolyFORTH to interface to the CP/M-68K
    operating system.
```

Screen # 1

```
$ Load Screen for Screen Files                          ( PLB*04/19/37)
1 FILE# !    1 WCONSTANT HOST?        0 WCONSTANT RP?
 5                     LOAD          $ Load Mac/SBE words
 6                     LOAD          $ Load Base File System
 1  POLY.PF                      LOAD-FROM
 1  MAC.PF      SBE.PF    MAC/SBE   LOAD-FROM
 1  TIME.PF                      LOAD-FROM
 1  PFEDIT.PF  FSEDIT.PF  MAC/SBE   LOAD-FROM
 2  POLY.PF                      LOAD-FROM
 9                               LOAD       $ VIEW Support
HEX   000F VOCABULARY OPS-VOCAB  0009 VOCABULARY CMD-VOCAB
      000B VOCABULARY RHS-VOCAB     DECIMAL
1 WCONSTANT  DEBUG?        $ 0 for final system, 1 for debugging
SBE?   2                ?LOAD          $ AIM Host
' COLD 'INIT !   CR SAVE-68K FORTH.68K  CR  -TWINS $ BYE
  : COLD COLD OPS ; ' COLD 'INIT !   SAVE-68K OPS.68K CR BYE
```

Screen # 2

```
$ AIM Host Configuration                                ( PLB*02/11/87)
        2   DISPLAY.PF     LOAD-FROM     $ Status Display variables
        1   BDOS.PF        LOAD-FROM     $ CP/M File Interface
        1   TOKEN.PF       LOAD-FROM     $ String token package
        2   RPPOLY.PF      LOAD-FROM     $ RP variables
        1   HOST.PF        LOAD-FROM     $ Host to RP interface
        1   OPSVAR.PF      LOAD-FROM     $ OPS System Variables
        1   MM.PF          LOAD-FROM     $ Memory Management Pkg
        1   COUNTER.PF     LOAD-FROM     $ OPS Counter Statement
        1   PARSER.PF      LOAD-FROM     $ OPS Parser
        1   WME.PF         LOAD-FROM     $ WME Support Package
        1   CONRES.PF      LOAD-FROM     $ Conflict Resolution
        1   DISPLAY.PF     LOAD-FROM     $ Status Display & Server
        1   OPSCMD.PF      LOAD-FROM     $ OPS Commands
        1   RHS.PF         LOAD-FROM     $ RHS Parser & exec. code
        2   COUNTER.PF     LOAD-FROM     $ Counter Compilation
```

Screen # 3

```
$ AIM Rule Processor Configuration                      ( PLB*12/15/86)
DECIMAL      1 FILE# !    0 WCONSTANT HOST?      1 WCONSTANT RP?
             : (OPEN) FLUSH DUP FILE# ! <OPEN-SCREEN> ;
             : OPEN (OPEN) ;       4 @ WCONSTANT LOW-TPA
             5 6 THRU             $ MAC/SBE words & FILE System
1 WCONSTANT DEBUG?
          3         POLY.PF       LOAD-FROM
          2         RPVAR.PF      LOAD-FROM      $ '$$' and '$%' words
         12         RPPOLY.PF     LOAD-FROM
          2         TIME.PF       LOAD-FROM
$         1         PFEDIT.PF     LOAD-FROM
          1         TERMINAL.SCR  LOAD-FROM      VT-100
          1         FSEDIT.PF     LOAD-FROM
          9                       LOAD           $ VIEW
          4                       LOAD           $ More RP stuff
' COLD  'INIT !     CR SAVE-RPFORTH
```

Screen # 4

```
$ AIM Rule Processor Configuration                      ( PLB*12/15/86)
    2       OPSVAR.PF     LOAD-FROM     $ ALIGN
    1       RPVAR.PF      LOAD-FROM     $ RP Variables, Etc.
    2       MM.PF         LOAD-FROM     $ Memory Management Package
    1       LHS.PF        LOAD-FROM     $ LHS Stream Support
    2       FILTER.PF     LOAD-FROM     $ LHS Filter Code
    1       RPWME.PF      LOAD-FROM     $ RP WME Management Package
    1       FILTER.PF     LOAD-FROM     $ LHS Filter Code
    2       CONRES.PF     LOAD-FROM     $ Conflict Resolution
    2       LHS.PF        LOAD-FROM     $ LHS Evaluation Code
$   3       DEMO.PF       LOAD-FROM     $ CHEM DEMO
```

Screen # 5

```
$ Macintosh/SBE Conditional Support                     ( PLB*12/28/85)
WVARIABLE (SBE?)      $ 0 for Mac, 1 for SBE
$          HEX LOW-TPA E582 = NOT (SBE?) W!     $ old mac roms
           HEX LOW-TPA FEFC = NOT (SBE?) W!     $ new mac roms
DECIMAL

: SBE? ( -f)    (SBE?) W@ ;
: MAC? ( -f)    (SBE?) W@ NOT ;
: MAC/SBE ( n1 n2 - n )
     SBE? IF SWAP THEN   DROP ;

: HOST/RP ( n1 n2 - n)  RP? IF SWAP THEN DROP ;

: ONLY-> ( f-)  NOT IF 64 >IN W@ OVER MOD - >IN W+! THEN ;
          32768 LAST @ @ 4+ W+!  ( IMMEDIATE)
```

Screen # 6

```
$ Load Screen for File Interface System          ( PLB*10/19/85)
DECIMAL        HERE CR 10 SPACES
HOST?  ONLY->     .( ==> CP/M Screen File Support Words)
RP?    ONLY->     .( ==> Rule Processor File Support Words)

HOST?  ONLY->   10 23 THRU    $ Load Host Screen File Functions
RP?    ONLY->   10 13 THRU  17 18 THRU  23 LOAD   $ For RP
       7 8 THRU              $ Define Screen Files
       FILES.PF (OPEN)
RP?    ONLY->   END-SEGMENT  EXIT
45  POLY.PF     LOADS  ..HOST     $ Target Compile CP/M-68K Kernel
45  RPPOLY.PF   LOADS  ..RP       $ Target compile RP Kernel
 1  XFER.SCR    LOADS  ..SERIAL   $ Load Serial Disk Support
END-SEGMENT
```

Screen # 7

```
$ Screen File Open Table                              ( PLB*10/31/86)
$ Drive                     Filename
1  3  MAC/SBE  SCR-FILE  POLY.PF        $ HOST PolyFORTH sources
2  3  MAC/SBE  SCR-FILE  FILES.PF       $ CP/M-68K File System
2  3  MAC/SBE  SCR-FILE  RPPOLY.PF      $ RP PolyFORTH sources
2  3  MAC/SBE  SCR-FILE  PFEDIT.PF      $ PolyFORTH line editor
2  3  MAC/SBE  SCR-FILE  FSEDIT.PF      $ ORNL Full-screen editor
2  3  MAC/SBE  SCR-FILE  BDOS.PF        $ CP/M Extensions
2  3  MAC/SBE  SCR-FILE  TIME.PF        $ Time/Date formatting
2  3  MAC/SBE  SCR-FILE  TERMINAL.SCR   $ Terminal customization
2  3  MAC/SBE  SCR-FILE  SBE.PF         $ SBE configuration
2  3  MAC/SBE  SCR-FILE  MAC.PF         $ Macintosh configuration
1  3  MAC/SBE  SCR-FILE  XFER.SCR       $ Serial Disk support
2  3  MAC/SBE  SCR-FILE  TOKEN.PF       $ AIM Token Package
2  3  MAC/SBE  SCR-FILE  HOST.PF        $ AIM Host customization
2  3  MAC/SBE  SCR-FILE  DISPLAY.PF     $ Status Terminal Display
```

Screen # 8

```
$ Screen File Open Table, Cont.                       ( PLB*02/10/87)
2  3  MAC/SBE  SCR-FILE  PARSER.PF      $ OPS Parser
2  3  MAC/SBE  SCR-FILE  OPSVAR.PF      $ OPS Variables
2  3  MAC/SBE  SCR-FILE  OPSCMD.PF      $ OPS Commands
2  3  MAC/SBE  SCR-FILE  MM.PF          $ Memory Management
2  3  MAC/SBE  SCR-FILE  WME.PF         $ WME manager
2  3  MAC/SBE  SCR-FILE  RHS.PF         $ RHS parser and execution
2  3  MAC/SBE  SCR-FILE  LHS.PF         $ LHS evaluation on RP
2  3  MAC/SBE  SCR-FILE  DEBUG.PF       $ AIM Debug Screens
2  3  MAC/SBE  SCR-FILE  TEMP.SCR       $ Temporary Extensions
2  3  MAC/SBE  SCR-FILE  FILTER.PF      $ LHS Filter Code
2  3  MAC/SBE  SCR-FILE  RPWME.PF       $ RP WME manager
2  3  MAC/SBE  SCR-FILE  CONRES.PF      $ Conflict Resolution Code
2  3  MAC/SBE  SCR-FILE  RPVAR.PF       $ RP Variables & Support
2  3  MAC/SBE  SCR-FILE  COUNTER.PF     $ OPS Counter Statement
2  3  MAC/SBE  SCR-FILE  DEMO.PF        $ FIRST OPS DEMO
```

Screen # 9

```
$ VIEW support                                        ( PLB*01/16/86)
DECIMAL

: VIEW   'HEAD
         W@  1024 /MOD
         OVER 0= ABORT" Can't VIEW keyboard definition"
         (OPEN)   SCR !  0 R# ! L ;

: view VIEW ;
```

Screen # 10

```
$ Filename Parse Routine                              ( PLB*10/20/85)
HEX     VARIABLE 'PFCB      VARIABLE 'PPTR
        VARIABLE 'PCTR      VARIABLE 'POFFSET
: -LEADING ( a n-a n)  SWAP BEGIN 2DUP
   C@ DUP 20 = SWAP 9 = OR SWAP 0= NOT AND  WHILE
   1+ SWAP 1- SWAP REPEAT SWAP ;
: ~!DRV ( c-)  5F AND DUP DUP 40 > SWAP 51 < AND
   IF 40 - 'PFCB @ C!  ELSE R> 2DROP 2DROP 1 ( Drv#Err) THEN ;
: ~CK-CHAR ( c-c)  $ checks for valid char, returns w/ error flg
   DUP   61 7B WITHIN IF 20 - THEN  $ convert lower to upper
   DUP   DUP  41 5B WITHIN  SWAP  30 3A WITHIN OR
   NOT IF R> 2DROP 2 EXIT THEN ;
: ~@CHAR ( -c)    'PPTR @ C@  1 'PPTR +!  -1 'PCTR +! ;
: ~!FCB ( c-)    'PFCB @ 'POFFSET @ + C! 1 'POFFSET +! ;
DECIMAL
```

Screen # 11

```
$ Filename Parse Routine                              ( PLB*10/20/85)
HEX
: PARSE-FILENAME ( $$ a - f )  DUP 'PFCB ! DUP OC BLANK
   0 SWAP C!  COUNT -LEADING -TRAILING
   2DUP 2 > SWAP 1+ C@ 3A = AND   $ check for drive letter A-O
        IF OVER C@ ~!DRV 2 - SWAP 2+ SWAP THEN
   'PCTR !  ( character count)    'PPTR ! ( String Address)
   1 'POFFSET !       BEGIN ~@CHAR DUP 2E =
   IF ( .) DROP 1 ELSE ~CK-CHAR ~!FCB 0 THEN
   'POFFSET @ 0A = IF DROP 3 EXIT THEN  'PCTR @ NOT OR UNTIL
   'PCTR @ IF    9 'POFFSET !  ( Extension)
        BEGIN ~@CHAR ~CK-CHAR ~!FCB
          'PCTR @ NOT   'POFFSET @ OC = OR UNTIL
    THEN  'PCTR @ NOT NOT 4* ;
DECIMAL
```

Screen # 12

```
$ Screen File Defining Word                           ( PLB*10/31/86)
DECIMAL  12 CONSTANT SF-SIZE                $ Entry Size
         30 CONSTANT SF-#                   $ Max Number of entries
         WVARIABLE SF-CNT  0 SF-CNT W!      $ Automatic allocation
CREATE SF-TAB  SF-# SF-SIZE * DUP ALLOT $ Screen File Table
   SF-TAB SWAP ERASE

: FILE#>ADDR ( n-a)   127 AND   SF-SIZE * SF-TAB + ;
: SCR-FILE ( drive# -)    SF-CNT W@ >R
   R@ SF-# = ABORT" Too many screen files"
   >IN W@   32 WORD   SWAP  >IN W!
   R@ FILE#>ADDR PARSE-FILENAME ABORT" Filename Error"
   R@ NCONSTANT              $ Define File Number to Forth
   R> FILE#>ADDR C!          $ Set Drive Number
   1 SF-CNT W+! ;            $ Point to next file entry
```

Screen # 13

```
$ Filename Print                                      ( PLB*12/31/85)
DECIMAL

: >CHAR ( c-)    DUP 32 = IF DROP ELSE
    PAD DUP C@ + 1+ C!    1 PAD C+!  THEN ;
: FCB>$ ( fcb-addr - $$ )  0 PAD C!
    DUP C@ ?DUP IF 64 + >CHAR  58 >CHAR  THEN
    8 0 DO DUP I + 1+ C@ >CHAR LOOP
    46 >CHAR  3 0 DO DUP I + 9 + C@ >CHAR LOOP DROP PAD ;

: .FCB ( fcb-)  FCB>$ COUNT TYPE ;
: .FCB-W/O ( fcb-) FCB>$ COUNT 2- SWAP 2+ SWAP TYPE ;
: .PFFILE  FILE# @ FILE#>ADDR .FCB-W/O ;
```

Screen # 14

```
$ Screen File Open words                              ( PLB*12/28/85)
DECIMAL VARIABLE 'OPEN

: (CLS-SCR)  ( FILES @   2 FILES !)   $ Fake Get/Release
   FLUSH  ( FILES !) PFSCR 16 BDOS DROP  PFSCR 36 ERASE ;
: (FCB-OPEN) ( fcb-addr-)  (CLS-SCR)  PFSCR 12 MOVE
   <OPEN-SCREEN> ;

: <OPEN> ( file#-) FILES GET DUP FILE# ! FILE#>ADDR (FCB-OPEN) ;

: (OPEN) ( file#-)  'OPEN @EXECUTE ;
   ' <OPEN> 'OPEN !         $ Initial Vector
: OPEN ( file#-)    (OPEN)
   SHADOWS IF CR ." Screens opened in " .PFFILE  ." ==> "
     SHADOWS . CR THEN ;
```

Screen # 15

```
$ Scratch FCB's for various uses                      ( PLB*10/29/85)
HEX
CREATE FCB1  24 ALLOT
$ CREATE FCB2  24 ALLOT

: 0FCB1  FCB1 24 ERASE ;
$ : 0FCB2  FCB2 24 ERASE ;
DECIMAL
```

Screen # 16

```
$ CP/M Image SAVE-68K command                         ( PLB*01/29/86)
HEX
: >HEAD ( o-a)   LOW-TPA 100 + 1C - + ;
: SAVE-68K   FILES RELEASE   GILD  GOLDEN ram 46 MOVE
```

```
STATUS OPERATOR 8 + ( 40) 44 CMOVE
OFCB1 20 WORD  FCB1 PARSE-FILENAME ABORT" Filename Error"
FCB1  13 BDOS DROP ( ERASE)
FCB1 16 BDOS FF = ABORT" Create Error"
0 >HEAD 1C ERASE
601A 0 >HEAD W!     HERE LOW-TPA 100 + -  2 >HEAD !
LOW-TPA 100 + 16 >HEAD !  -1 1A >HEAD W!
0 >HEAD BEGIN  DUP  1A BDOS DROP ( DMA ADDR)
   FCB1 15 BDOS ABORT" Write Error"
   80 + DUP HERE > UNTIL DROP
FCB1 10 BDOS FF = ABORT" Close Error"
2 >HEAD @ CR U. ." bytes written to "  FCB1 .FCB ; DECIMAL
```

Screen # 17

```
$ Screen File Load words                          ( PLB*10/25/86)

: LOAD-FROM ( n file# - )
   FILE# @ >R   (OPEN)   LOAD   R> (OPEN) ;
: THRU-FROM ( start end file# - )
   FILE# @ >R   (OPEN)   THRU   R> (OPEN) ;
: ?LOAD-FROM ( f n file# - )
   ROT IF LOAD-FROM  ELSE 2DROP   THEN ;
: ?LOAD ( f n - )   SWAP IF LOAD   ELSE DROP   THEN ;
: ?THRU ( f start end - )
   ROT IF THRU   ELSE 2DROP   THEN ;
$ : >ACT ( offset-block#) BLK W@ + ;
$ : +LOAD ( o-)   >ACT LOAD ;
$ : +THRU ( o1 o2 - )  >ACT SWAP >ACT SWAP THRU ;
$ : ?+LOAD ( f o - ) >ACT ?LOAD ;
$ : ?+THRU ( f o1 o2 - )   >ACT SWAP >ACT SWAP ?THRU ;
```

Screen # 18

```
$ Misc. Screen File Support Words                 ( PLB*01/07/86)

: (Q) ( n-n)  SHADOWS ?DUP IF  SWAP OVER + SWAP 2* MOD THEN ;

: CK-SIZE ( blk#-f)  SHADOWS IF SHADOWS 1- ELSE <MAXBLK> @ THEN
     > ;

: LOADS ( blk file# -)  CREATE SWAP  W, W, DOES>
      DUP W@ SWAP 2+ W@   LOAD-FROM ;
```

Screen # 19

```
$ Block Transfer Words
VARIABLE T-N         $ Number of blocks to transfer
VARIABLE T-FB#       $ From Block #
VARIABLE T-TB#       $ To Block #
VARIABLE T-FF#       $ From File #
VARIABLE T-TF#       $ To File #

: >BUFF ( offset-addr)  2048 * PAD + ;
: READ-BLOCKS   T-FB# @ T-N @ + 1- CK-SIZE
  ABORT" Can't read that many blocks from source file"
  T-FB# @  T-N @  OVER + SWAP   DO 13 EMIT
   ." Reading Screen # " I 3 U.R
   I BLOCK  I T-FB# @ - >BUFF  1024 CMOVE
   SHADOWS IF I (Q) BLOCK  I T-FB# @ - >BUFF 1024 +  1024 CMOVE
   ELSE  I T-FB# @ - >BUFF 1024 + DUP 1024 BLANK 0 SWAP W! THEN
  LOOP ;
```

Screen # 20

```
$ Block Transfer Words, Cont.

: WRITE-BLOCKS  13 EMIT
  T-TB# @ T-N @ + 1- CK-SIZE
  ABORT" Can't write that many blocks to destination file"
  T-TB# @  T-N @  OVER + SWAP   DO 13 EMIT
   ." Writing Screen # " I 3 U.R
   I T-TB# @ - >BUFF I BUFFER  1024 CMOVE UPDATE
   SHADOWS IF I T-TB# @ - >BUFF 1024 +
   I (Q) BUFFER 1024 CMOVE UPDATE   THEN
  LOOP ;
```

Screen # 21

```
$ Block Transfer Words, Cont.

: ?T-ROOM   CR   T-N @ 2048 *   SP  HERE - 1000 -   >
    ABORT" Not enough memory to transfer blocks" ;
```

```
: TRANSFER ( from to n -)   FLUSH   T-N !  T-TB# !  T-FB# !
   ?T-ROOM         $ See if there is enough room
   READ-BLOCKS     WRITE-BLOCKS     FLUSH CR ;

: XTRANSFER ( from-file  from-block  to-file  to-block  n -)
   FLUSH   T-N !  T-TB# !  T-TF# !  T-FB# !  T-FF# !
   ?T-ROOM         $ See if there is enough room
   FILE# @ >R      T-FF# @ (OPEN)    READ-BLOCKS
   T-TF# @ (OPEN)    WRITE-BLOCKS R> (OPEN)    FLUSH CR ;
```

Screen # 22

```
$ File Creation Utility
HEX
: MAKE-FILE ( n-)        $ Use as  34 MAKE-FILE B:TERMINAL.SCR
   OFCB1  20 WORD   FCB1 PARSE-FILENAME ABORT" Filename Error"
   FCB1  13 BDOS DROP  $ DELETE FILE
   FCB1 16 BDOS FF = ABORT" Create Error"
   PAD 80 BLANK
   2/  10 ( 16) *    0 DO
     PAD   1A BDOS DROP   ( DMA Address)
      FCB1 15 BDOS ABORT" Write Error"
    LOOP    FCB1 10 BDOS FF = ABORT" Close Error" ;
DECIMAL
```

Screen # 23

```
$ Documentation Words during Screen Load
DECIMAL

: START-SEGMENT   ( -N)  HERE  CR 10 SPACES ;
: END-SEGMENT    ( N-)  13 EMIT DECIMAL HERE SWAP - 6 U.R ;
```

Screen # 30

Screen # 31

Screen # 32

```
$ AIM Host Configuration                          ( PLP*12/24/85)

More Host System configuration files
```

Screen # 33

$ AIM Rule Processor Configuration ( PLB*01/10/86)

Rule Processor configuration screen

Screen # 34

$ AIM Rule Processor Configuration ( PLB*01/10/86)

More rule processor configuration parameters

Screen # 35

$ Macintosh/SBE Conditional Support ( PLB*12/28/85)

Macintosh TPA starts at E582

SBE? returns true on an SBE system
MAC? returns true on a Macintosh system
MAC/SBE returns one of two numbers.
    i.e. 2 3 MAC/SBE returns 2 on a Macintosh This screen allows the same source code to be configured on either a Macintosh running IQ Software's CP/M-68K or on an SBE system also running CP/M-68K.

Screen # 36

Load screen for main file interface package

Notice that the RP is only given what is required to build it's FORTH.

```
..HOST      Target Compile CP/M-68K Kernel
..RP        Target compile RP Kernel
..SERIAL    Load Serial Disk Support
```

Screen # 37

$ Screen File Open Table ( PLB*01/02/86)

```
Drive:
  0 -> Default Drive
  1 -> A: Drive
  2 -> B: Drive
  3 -> C: Drive    , Etc.
```

Screen # 38

$ Screen File Open Table, Cont. ( PLB*01/07/86)

More screen file definitions

Screen # 39

$ VIEW support ( PLB*12/07/85)

VIEW allows the source code for a word to be displayed.

It does this by having a 2 byte field in front of the normal FORTH word definition. This field contains the file number in the upper 6 bits and the screen number in the lower 10 bits.

A possible extension of this would to be able to VIEW words located in the PolyFORTH kernel. For this reason, the POLY.PF file was defined first so that it would always have a file number of zero.
01/16/86 RFS,PLB - Added VIEW feature to kernel !!!!

Screen # 40

$ Filename Parse Routine ( PLB*10/20/85)

-LEADING is like -TRAILING except that it works on the beginning of a string. It should eventually be machine coded.

The rest of the words support the CP/M filename parser on the next screen.

Screen # 41

$ Filename Parse Routine ( PLB*10/20/85)

```
PARSE-FILENAME ( $$ a - f )
 $$  -> String to parse, first byte is the count byte
 a   -> Address of FCB to parse into. Must be at least 12 bytes.
 f   -> Flag returned to give status of parse
          0 -> Parse completed, no errors
          1 -> Drive error
          2 -> Bad character in filename or extension
          3 -> Filename Length must be 8 or less
          4 -> Extension Length must be 3 or less
```

Screen # 42

$ Screen File Defining Word ( PLB*01/02/86)
SF-SIZE is the number of bytes allocated to each file entry.
SF-# is the maximum number of files allowed in this system.
    Change this to suit your needs.
SF-TAB is the table where all the parsed filenames are stored.

FILE#>ADDR converts a file number to a 12 byte filename addr.
SCR-FILE is the Screen File defining word.
    It parses the filename into something suitable for CP/M and also defines a constant the FORTH can used to reference a file. Also note that the drive number is an input so that the FORTH constant has no reference to the actual drive that the file resides.
    At one time, the CP/M user number was also a parameter but did not prove to be very useful.

Screen # 43

$ Filename Print ( PLB*12/31/85)

.FCB - Print Filename with drive number.
.FCB-W/O - Print Filename without drive number.
.PFFILE - Print currently opened filename

Screen # 44

$ Screen File Open Words ( PLB*12/29/85)
'OPEN is a vector for open (CLS-SCR) closes the current screen file
(FCB-OPEN) opens the selected screen file <OPEN> opens the selected screen file specified by file number.

(OPEN) executes the vector 'OPEN

OPEN is the main word to open a file

Screen # 45

$ Scratch FCB's for various uses ( PLB*10/29/85)

Specify a few file FCB's for various uses.

Screen # 46

$ CP/M Image SAVE-68K command ( PLB*11/24/85)

SAVE-68K allows an expanded PolyFORTH system to be saved to disk as an executable file ( normally .68K ). Note that if any tasks were defined and running that when this new file is run, the tasks will come up running.

Screen # 47

$ Screen File Load words ( PLB*01/10/86)

LOAD-FROM loads a specified screen from a specified file.

THRU-FROM loads a specified range of screens from a specified file.
?LOAD-FROM is a conditional LOAD-FROM.

?LOAD is a conditional load useful for conditional compilation.
?THRU is a conditional THRU.

+LOAD, +THRU, ?+LOAD, ?+THRU are like their '?' counterparts except that their arguments are relative to the current block.

Screen # 48

$ Misc. Screen File Support Words ( PLB*01/07/86)

(0) returns the screen number of the shadow screen. If file does not contain shadows, then the original screen number is returned.
CK-SIZE returns a flag to verify if a block number is within the range of the currently selected file.
LOADS is a defining word that creates a utility loading word.

Screen # 49

$ Block Transfer Words

Miscellaneous words for Block Transfer Package.

Screen # 50

$ Block Transfer Words, Cont.

Miscellaneous words for Block Transfer Package.

Screen # 51

$ Block Transfer Words, Cont.

TRANSFER copies a range of blocks and their shadows. if appropriate, within one file. Note that overlap in the blocks is taken care of by the method of copy.

XTRANSFER copies blocks from one file to another, including shadow screens, if appropriate.

Screen # 52

$ File Creation Utility

MAKE-FILE creates a CP/M file as specified, with the specified number of blocks. Note that this word does not check for a .PF filetype. For example, to create a file X123.PF with 20 source screens and 20 shadows, one must enter:

40 MAKE-FILE B:X123.PF

Screen # 53

$ Documentation Words during Screen Load

START-SEGMENT is an interpreted word that is used while
extending the PolyFORTH kernel.
END-SEGMENT is used after START-SEGMENT to print the size of
the segment specified.

```
Use as:
START-SEGMENT  .( ==> PolyForth Editor)
  2 LOAD
  8 LOAD          $ Editor Extensions
END-SEGMENT
```

Screen # 0

```
$ PolyForth Editor

$ This is the editor that came with the original PolyForth
$    system. This system was dated June 19, 1985.
```

Screen # 1

```
$ Load Screen for PolyForth Editor
DECIMAL

START-SEGMENT  .( ==> PolyForth Editor)
    : ! ;     $ TEMP - HEADLESS CODE WORD
    2 LOAD          $ Main Editor Functions
    7 LOAD          $ Date stamping
    6 LOAD          $ Extensions
END-SEGMENT
```

Screen # 2

```
( PROM editor)
  : (COPY) ( n n)   SWAP BLOCK DROP  IDENTIFY  UPDATE ;

HEX    0015 VOCABULARY EDITOR   DECIMAL 3 LOAD
HEX    1F1F WIDTH W! EDITOR DEFINITIONS   DECIMAL  4 5 THRU
  : WIPE   0  SCR @ BLOCK DUP 1024 BLANK W!  UPDATE 0 ADV  L ;
  : M1 ( b l)   -LINE  RETAIN  SCR @  R# @  64 +  2>R
     64 * R# !  SCR !  u1  2R>  R# !  SCR !  .LINE ;
FORTH DEFINITIONS
  : T ( n)   -LINE  15 AND  64 *  R# !  .LINE  ;
  : N   1 [ EDITOR ] ADV L ;       : B   -1 [ EDITOR ] ADV L ;
FORTH
```

Screen # 3

```
  ( Editor)
! : #I ( - a)   PAD 80 + ;       ! : #F ( - a) . PAD 160 + ;
! : REST ( n - n)   R# @  OVER 1- AND - ;
! : AT ( - a)   SCR @ BLOCK  R# @ +  64 REST ;
! : SET ( n)   R# @  64 /MOD  1+  SWAP 2+ 1+ TAB ;
! : -LINE   SET  AT >TYPE SPACE ;
! : .LINE   EDITOR  SET  AT MARK  CLEAN  17 0 TAB  SPACE SPACE
   R# @ 63 AND  AT DROP OVER -  SWAP >TYPE  AT MARK ;
! : ADVANCE ( a)   R# @ +  1023 MIN  R# ! ;
: LIST ( n) PAGE DUP . 5 SPACES .PFFILE 16 0 DO CR I 2 U.R SPACE
 DUP BLOCK I 64 * +  64 -TRAILING >TYPE  LOOP SPACE  SCR ! CR ;
: L   SCR @ LIST  0 ADVANCE  .LINE ;
: COPY ( n n)   FLUSH (COPY) ;
! : BODY   R# @  1024 OVER  -64 AND  DO
     I R# !  -LINE  64 +LOOP  R# ! ;
```

Screen # 4

```
 ( Line editor)
! : ?BODY ( n)   EXTENT W@ 64 > IF  BODY  ELSE  DUP IF  -LINE
  THEN THEN ADVANCE  .LINE ;
! : string ( s - s')   94 WORD C@ IF  DUP 80 BLANK
```

```
      HERE 4+ HERE 1 AND +  2DUP C@ 1+ CMOVE  THEN 1+ ;
! : DELETE ( d d# s#)   OVER MIN  >R  I -  2DUP OVER I +
  ROT ROT CMOVE  + R> BLANK  UPDATE ;
! : INSERT ( s s# d d#)   ROT  OVER MIN >R  I -
  OVER DUP I +  ROT <CMOVE  R> CMOVE  UPDATE ;
! : ATO ( - a n)   R# @  -64 AND  R# !  AT ;
! : RETAIN   ATO #I  2DUP C!  1+ SWAP CMOVE ;
: P   -LINE  #I string  ATO CMOVE  UPDATE  .LINE ;
: X   RETAIN  ATO  1024 REST  SWAP DELETE  BODY .LINE ;
! : u1   #I string  64 ADVANCE  ATO SWAP  1024 REST  INSERT ;
: U   -LINE  u1  BODY .LINE ;
: K   #I PAD 160 MOVE  PAD #F 80 MOVE ;
```

Screen # 5

```
  ( String editor)
! : ADV ( n)   SCR +!  0 R# ! ;
! : -FOUND ( - a a' t)   #F string DROP  AT DROP  DUP
  1024 REST  1+ #F C@ -  #F COUNT  -MATCH ;
! : SEARCH   -LINE  -FOUND IF  #F  HERE 4+ 80 CMOVE
  CLEAN  ABORT" None"  THEN  SWAP - ADVANCE ;
! : EXT   AT DROP  EXTENT W@ REST ;
: TILL   R# @  SEARCH  R# @ SWAP  DUP R# !
  -  EXT ROT DELETE  0 ?BODY ;
! : e1   #F C@ DUP  NEGATE  ADVANCE  EXT ROT DELETE ;
: E   e1  0 ?BODY ;
'CREATE @ -TWINS
: I #I string  #I C@ EXT INSERT  -LINE  #I C@ ?BODY ; 'CREATE !
: D   SEARCH E ;       : F   SEARCH  .LINE ;       : R   e1 I ;
: S ( n)   SCR @ DO  -FOUND IF  2DROP  1 ADV
    ELSE  SWAP -  ADVANCE  I' LEAVE  L  THEN LOOP ;
```

Screen # 6

```
  ( Editor extensions)   EDITOR DEFINITIONS      ( PLB*10/07/85)
: M ( b n - b n+1)   DEPTH 2- ABORT" Accidental"  2DUP M1 1+ ;
: f   F ;      : d   D ;     : i   I ;      : e   E ;
: p   P ;      : x   X ;     : u   U ;      : r   R ;
: s   S ;      : k   K ;     : m   M ;      : till   TILL ;
: wipe   WIPE ;     FORTH DEFINITIONS
: Q   SCR @ (Q) SCR ! 0 R# ! L ;
: l   L ;  : n   N ;  : b   B ;  : q   Q ;  : t   T ;
: list   LIST ;      : copy   COPY ;     : flush   FLUSH ;
: empty   EMPTY ;    : load   LOAD ;
```

Screen # 7

```
  ( Misc. extentions)                              ( PLB*11/24/85)
( date stamp)  CREATE ID 6 ALLOT ( ADDED 7/30/85 PLB)
: -STAMP   SCR W@ BLOCK  45 + 19 BLANK  UPDATE L ;
: INITIALS ( -- ) ." Please enter your initials " ID 3 EXPECT
  CR ;
: STORE_INIT ( adr -- adr' ) BEGIN ID W@ 0= IF INITIALS 0
   ELSE 1 THEN UNTIL ID OVER 3 CMOVE 3 + ;
: STAMP ( -- ) SCR @ BLOCK PAD 1024 CMOVE PAD 49 + DUP 14
   BLANK 40 OVER C!  2+ STORE_INIT  42 OVER C! 1+
   TODAY W@ (DATE) >R OVER I CMOVE R> + 41 SWAP C!
   PAD SCR @ BUFFER 1024 CMOVE UPDATE FLUSH L ;
: stamp STAMP ;

HEX 504C4220 ID ! .(    Initials set to PLB !!!! ) DECIMAL
```

Screen # 10

Screen # 11

BOTH copies source and shadow.

QX NX and BX are used to display index pages.

Screen # 12

This screen editor uses simple, visible, 1-letter commands. It is compatible with previous polyFORTH editors and with the instructions in Starting FORTH. Its modifications support cursor positioning commands which are present on most CRTs marketed today. Versions of these commands are available in Blocks 59 and 156-164. See instructions there and in Block 10 for selecting the version most appropriate for you.
Notice that not all words defined in this section are in the EDITOR vocabulary: those in Blocks 55, 58, and 59, plus T N and B here are in FORTH . T enters EDITOR .
WIPE erases the current ( SCR ) block to blanks, with 0 in the first word.
M copies the current line under a specified block and line.

Screen # 13

These words, though intended for editing support, are in the FORTH vocabulary.

>TYPE types a line after moving it to PAD . This is necessary because in a multi-user environment you can't type from a block buffer.

LIST lists a block in the form in which you see it now.
L lists the current block, and selects EDITOR .
COPY copies a block from one block number to another.
Note that this done by changing the buffer ID: thus if you have changed the block since it was last written, only the new location will contain the new information.

Screen # 14

This editor uses two string buffers, a "find" buffer ( #F ) and an "insert" buffer ( #I ). Their use is described in Starting FORTH.

T types a given line, leaving the cursor at its beginning.
P puts text following or the insert buffer in the current line.
X deletes the current line, moving lower lines up, with blank fill from the bottom.
U inserts the text following or the insert buffer under the current line, moving lower lines down and dropping line 15 off the bottom.
K Swaps the insert and find buffers.

Screen # 15

TILL deletes all the text from the character pointer up to the find buffer. TILL sets the find buffer.
The usage is: TILL pattern
E deletes backward from the character pointer, the number of characters in the find buffer. It is most commonly used for deleting a piece of text which has been found by F .
I inserts text and sets the insert buffer. Usage: I text
D searches for and deletes the first occurance of the find buffer. D sets the find buffer. The usage is: D pattern
F finds the test in the find buffer. It also sets the find buffer. The usage is: F pattern
R replaces text found by F with the text in the insert buffer and sets the insert buffer. The usage is R text
S searches the blocks from SCR to the block whose number is the argument to S for a match on the pattern.
Usage: n S pattern

Screen # 16

These words are useful when editing documentation in lower case.
M has been re-defined to prevent accidental M's and also to speed up multiple line M's.

Screen # 17

Q displays a block of text associated with each block of code. Termed shadow blocks, these keep comments out of the way while permitting their easy retrieval and maintenance.

Screen # 0

```
$ ORNL Full Screen Editor for PolyFORTH          ( PLB*03/03/86)
$ Implementation is for the VT-100 in the ANSI mode !!!!

Update Records :
<01> 03/27/86 CDH  -  Completion of FSEDIT Package
                        ( except for search/replace )

<02> 10/15/86 PLB  -  Added Auto-Stamp function
```

Screen # 1

```
$ Full-Screen Editor Load Screen

START-SEGMENT  .( ==> polyFORTH Full-Screen Editor)
        2  9  THRU          $ Support Words
       15  34  THRU         $ Function Words
       38  44  THRU         $ Execution Tables and Editor
                            $       Execution words

HEX 504C4200 ID ! DECIMAL .(     Initials set to PLB)
' STMP 'AS-VEC !   $ TURN STAMP ON
$ **** 'AS-VEC OFF
END-SEGMENT
```

Screen # 2

```
$ System Functions                                ( CDH*03/12/86)

: flush  FLUSH ;     : load  LOAD ;     : empty EMPTY ;

: LIST ( n- ) PAGE DUP . 5 SPACES .PFFILE  16 0 DO CR I 2 U.R
   SPACE DUP BLOCK I 64 * + 64 -TRAILING >TYPE LOOP SPACE
   SCR ! CR ;
: list  LIST ;

: COPY ( n n - ) FLUSH SWAP BLOCK DROP IDENTIFY UPDATE ;
: copy ( n n - ) COPY ;
```

Screen # 3

```
$ Screen Display Words                            ( PLB*11/08/86)
DECIMAL
: CHAR-ADDR ( offset - addr )  PAD + 128 + ;
$ : CLR-EOL 27 EMIT 91 EMIT  48 EMIT 75 EMIT ; ( [OK )

: FS-LINE1 ( line# - line# )  DUP    6 + 6  TAB
```

```
   DUP 10 /MOD  0= IF 32 ELSE 49 THEN  M-EMIT   48 + M-EMIT ;
: FS-LINE2 ( line# -)    6 +   72 TAB   32 M-EMIT ;

: .FSLINE ( line# - line#)    FS-LINE1
   DUP 64 *  CHAR-ADDR 64 -TRAILING  TYPE CLR-EOL
   FS-LINE2 ;
```

Screen # 4

```
$ Screen Display Words                          ( CDH*03/03/86)
DECIMAL
: .CUR-POS     3 35 TAB
  R# @ 64 /MOD   2DUP    ." Row: " 2 U.R  ."  Col: " 2 U.R
  6 + SWAP 8 + TAB ;
: OFFSET ( character-offset - )  R# @ +  1023 AND R# ! ;
: CHAR-OFFSET ( character-offset  -)  OFFSET   .CUR-POS ;

: X-OFFSET ( offset-x - )    CHAR-OFFSET ;
: Y-OFFSET ( offset-y - ) 64 * CHAR-OFFSET ;

VARIABLE INSERT-FLAG   0 INSERT-FLAG !

: INS-ON  INSERT-FLAG ON  2 62 TAB .M" Insert Mode" .CUR-POS ;
: INS-OFF INSERT-FLAG OFF 2 62 TAB 11 SPACES .CUR-POS ;
```

Screen # 5

```
$ Screen display words                          ( CDH*03/07/86)
DECIMAL
: .SCRN    3 6 TAB ." Screen # : "  SCR @ 3 U.R     ;

: .HEADER    0 20 TAB .M" ORNL PolyFORTH Full Screen Editor"
    2 6 TAB ." File : "  .PFFILE
    .SCRN
    5  6 TAB    +VT-REV 67 SPACES -VT-REV ;

: R-U-SURE ( -f)   .M"  - Are you sure?" 1 SPACES 7 EMIT
    KEY  95 AND 89 =   23 6 TAB CLR-EOL .CUR-POS ;

: SCR-ERROR? ( scr# - f)  DUP 0<  SWAP <MAXBLK> @ > OR ;
: LN# ( -line number) R# @ 64 / ;
: SCR-REPRINT ( -) 16 LN# DO I .FSLINE LOOP  .CUR-POS ;
```

Screen # 6

```
$ Screen Display Words                          ( PLB*10/15/86)
DECIMAL

: .AS-ON  5 58 TAB .M" AutoStamp Mode" .CUR-POS ;
: .AS-OFF 5 58 TAB .M"                " .CUR-POS ;

: GOLD-ON    0 62 TAB .M" Gold Mode" .CUR-POS  ;
: GOLD-OFF   0 62 TAB 11 SPACES .CUR-POS ;

: .MFSLINE ( line#-) FS-LINE1
   DUP  64 * CHAR-ADDR 64 MARK CLR-EOL
   FS-LINE2 ;
```

Screen # 7

```
$ Initial FS Display                            ( PLB*10/15/86)
DECIMAL
VARIABLE CHANGE-FLAG
VARIABLE 'AS-VEC
: SAVE-CURRENT  CHANGE-FLAG @ IF  'AS-VEC @EXECUTE $ Autostamp
   0 CHAR-ADDR  SCR @ BLOCK
   1024 MOVE UPDATE FLUSH 0 CHANGE-FLAG ! THEN ;

: FS-DISP     DECIMAL
    .HEADER    'AS-VEC @ IF .AS-ON ELSE .AS-OFF THEN
    16 0 DO I .FSLINE LOOP
    22 6 TAB   +VT-REV 67 SPACES -VT-REV INS-OFF ;

: RESTORE-CURRENT    CHANGE-FLAG OFF
   SCR @ BLOCK  0 CHAR-ADDR  1024  MOVE    FS-DISP ;
```

Screen # 8

```
$ UTILITIES                                     ( CDH*03/19/86)

: GET-CHAR ( -c) R# @ CHAR-ADDR C@ ;

: ERASE-LINE CHANGE-FLAG ON R# @ DUP 63 AND - DUP R# !
 CHAR-ADDR  64 32 FILL ;
```

Screen # 9

```
$ Function Words - Join Line                    ( CDH*03/14/86)
VARIABLE POS1         VARIABLE POS2      VARIABLE L-LENGTH

HEX
: WRD-LEN ( -n) POS2 @ POS1 @ - 1 + ;
: E-O-L ( -addr for e-o-l)  R# @ 3C0 AND 3F +  ;

DECIMAL
: JOIN-LINE-ERR? ( -f) 0  R# @    DUP >R   E-O-L SWAP  DO
 GET-CHAR 32 = IF  1 OFFSET  ELSE  DROP 1 LEAVE  THEN
 LOOP R> R# ! ;
: SCAN ( -f) 0  64 0 DO   GET-CHAR 32 = IF  1 OFFSET  ELSE
  R# @ POS1 ! DROP 1 LEAVE  THEN  LOOP ;
: END-POS   POS1 @ R# !   BEGIN  1 OFFSET GET-CHAR 32 =  UNTIL
  -1 OFFSET R# @ POS2 ! ; ( ending position of word to join)
```

Screen # 10

```
$ Available Screen
```

Screen # 11

```
$ Available screen
```

Screen # 12

```
$ Available screen
```

Screen # 13

```
$ Available screen
```

Screen # 14

```
$ Available screen
```

Screen # 15

```
$ Function Words                                    ( CDH*03/04/8)
HEX
: %-CR DROP R# @ 40 + 3C0 AND R# ! .CUR-POS ;

DECIMAL
: LIMIT-SCR ( offset - ) SCR @ + DUP SCR-ERROR?
    IF DROP 7 EMIT SCR @ THEN SCR ! ;

: %-NXT-SCR SAVE-CURRENT 1 LIMIT-SCR 0 R# ! RESTORE-CURRENT ;
```

Screen # 16

```
$ Function Words                                    ( CDH*03/10/86)
: %-PREV-SCR SAVE-CURRENT -1 LIMIT-SCR 0 R# ! RESTORE-CURRENT ;

: %-SHAD SAVE-CURRENT SCR @ (Q) SCR ! 0 R# ! RESTORE-CURRENT ;

: %-INS-TOG INSERT-FLAG @ IF INS-OFF ELSE INS-ON THEN ;

: DEL-CHAR ( c-) CHANGE-FLAG ON R# @ DUP 63 OR >R
  CHAR-ADDR DUP 1+ SWAP 63 R# @ 63 AND - CMOVE
  32 R> CHAR-ADDR C! ;

: %-DEL ( c-) DROP DEL-CHAR R# @ 64 / .FSLINE .CUR-POS ;

: %-BS ( c-) CHANGE-FLAG ON R# @ 64 MOD 0= IF DROP 7 EMIT
  ELSE -1 .CUR-POS R# +! %-DEL THEN ;
```

Screen # 17

```
$ Function Words                                    ( CDH*03/11/86)
HEX
: (EXIT) SAVE-CURRENT 1B EMIT 3E EMIT 17 0 TAB FLUSH ;
: %-EXIT ( C-) (EXIT) R> R> 2DROP ;
: %-PF-EXIT (EXIT) R> R> 2DROP R> DROP ;
: %-HOME 0 R# ! .CUR-POS ;
: %-WIPE 0 R# ! 0 CHAR-ADDR 400 BLANK CHANGE-FLAG ON FS-DISP ;
: %-RESTORE 0 R# ! RESTORE-CURRENT ;
: %-SAVE SAVE-CURRENT ;
: %-DEL-WORD GET-CHAR 20 = IF 7 EMIT ELSE BEGIN -1 OFFSET
  GET-CHAR 20 = UNTIL 1 CHAR-OFFSET
  BEGIN DEL-CHAR GET-CHAR 20 = UNTIL
  0 BEGIN 1+ DEL-CHAR GET-CHAR 20 > OVER 40 = OR UNTIL DROP
  R# @ 40 / .FSLINE .CUR-POS THEN ;
```

Screen # 18

```
$ #IN and Function words                            ( CDH*03/17/86)
DECIMAL
: #IN ( - n t , f ) PAD 21 BLANK PAD 1+ 20 EXPECT
    20 PAD C! PAD
    -1025 PTR W! DUP 1+ C@ 45 = DUP >R +
    0. SWAP BEGIN CONVERT DUP C@ DUP 44 48 WITHIN
    SWAP 58 = + WHILE 0 PTR W! REPEAT C@ 32 - ( ABORT" ?")
    IF R> DROP DROP 0 EXIT THEN $ ADDED 11/24/25 PLB
    R> IF NEGATE THEN 1 ;

: %-JUMP 23 6 TAB .M" Edit Screen # :" 1 SPACES #IN
       IF DUP SCR-ERROR? IF DROP 7 EMIT ELSE
          SAVE-CURRENT SCR ! 0 R# ! RESTORE-CURRENT THEN
       ELSE 7 EMIT THEN 23 6 TAB CLR-EOL .CUR-POS ;
```

Screen # 19

```
$ Functions Words - Insert Line Function            ( CDH*03/12/86
HEX
: INS CHANGE-FLAG ON R# @ 3C0 AND DUP R# !
  CHAR-ADDR DUP 40 + ( addr1 addr2)
  10 LN# - 40 * <CMOVE ;

DECIMAL
: EMPTY-LINE? ( line#-f) 1 SWAP 64 * DUP 64 + SWAP
  DO I CHAR-ADDR C@
  32 = NOT IF DROP 0 LEAVE THEN LOOP ;
: %-ERA-LINE ( erase line) ERASE-LINE LN# .FSLINE .CUR-POS ;
: %-INS-LINE ( insert line) 15 EMPTY-LINE?
  IF INS %-ERA-LINE SCR-REPRINT ELSE
  23 6 TAB .M" Insert Line" R-U-SURE
  IF INS %-ERA-LINE SCR-REPRINT THEN THEN ;
```

Screen # 20

```
$ Functions Words - Split Line                      ( CDH*03/13/86)
HEX
: SPLIT ( -) R# @ >R INS R> DUP R# !
  CHAR-ADDR 40 BLANK
  SCR-REPRINT ;

DECIMAL
: %-SPLIT-LINE LN# 15 = IF 7 EMIT ELSE
   15 EMPTY-LINE? IF SPLIT ELSE
   23 6 TAB .M" Split line" R-U-SURE
   IF SPLIT THEN THEN THEN ;
```

Screen # 21

```
$ Functions Words                                   ( CDH*03/12/86)
DECIMAL
: %-ERA-EOL      CHANGE-FLAG ON R# @ DUP CHAR-ADDR SWAP
   63 AND 64 SWAP - BLANK LN# .FSLINE .CUR-POS ;

: %-ERA-EOS      CHANGE-FLAG ON R# @ DUP CHAR-ADDR SWAP
   1023 AND 1024 SWAP - BLANK SCR-REPRINT ;

HEX
: %-EOL R# @ 3C0 AND 3F + R# !
   40 0 DO GET-CHAR -1 OFFSET 20 > IF LEAVE THEN LOOP
   1 CHAR-OFFSET
   R# @ 40 MOD 3F = IF .CUR-POS ELSE
   GET-CHAR 20 > IF 1 CHAR-OFFSET THEN THEN ;
```

Screen # 22

```
$ Function words                                    ( CDH*03/07/86)
DECIMAL
: %-OVERWRITE ( c-) CHANGE-FLAG ON
       DUP EMIT R# @ CHAR-ADDR C! 1 CHAR-OFFSET ;
: INS-CHAR ( -) R# @ 63 OR DUP >R CHAR-ADDR C@
   32 = NOT IF 7 EMIT THEN R# @ CHAR-ADDR
   DUP 1+ 63 R# @ 63 AND - <CMOVE
   R# @ CHAR-ADDR C! R# @ 1+ R> MIN R# ! ;
: %-INS ( c-) CHANGE-FLAG ON INS-CHAR
   R# @ 64 / .FSLINE .CUR-POS ;
: %-NORMAL ( c-) INSERT-FLAG @ IF %-INS ELSE %-OVERWRITE THEN ;

: %-TAB ( c-) DROP R# @ 3 AND 4 SWAP - INSERT-FLAG @
  0= IF CHAR-OFFSET ELSE CHANGE-FLAG ON
  0 DO 32 INS-CHAR LOOP R# @ 64 / .FSLINE .CUR-POS THEN ;
```

Screen # 23

```
$ Function Words                                    ( CDH*03/17/96)
: %-U -1 Y-OFFSET ;
: %-D  1 Y-OFFSET ;
: %-R  1 X-OFFSET ;
: %-L -1 X-OFFSET ;

DECIMAL

: DEL-LINE R# @ CHAR-ADDR DUP 64 + ( addr2 addr1 )
  SWAP 16 LN# - 64 * MOVE 64 15 * CHAR-ADDR 64 32 FILL ;

: %-DEL-LINE ( delete line) %-ERA-LINE LN# 15 = IF ELSE
  DEL-LINE SCR-REPRINT THEN ;
```

Screen # 24

```
$ Function words                                    ( CDH*03/10/86)
DECIMAL
```

```
: %-ADV-WORD BEGIN GET-CHAR 1 OFFSET 32 = UNTIL
     BEGIN GET-CHAR 1 OFFSET 32 > UNTIL -1 CHAR-OFFSET ;

: %-PREV-WORD  -1 OFFSET GET-CHAR 32 =
     IF  BEGIN GET-CHAR -1 OFFSET 32 > UNTIL THEN
     BEGIN GET-CHAR -1 OFFSET 32 = UNTIL 2 CHAR-OFFSET ;
```

Screen # 25

```
$ Function words - join line                         ( CDH*03/18/86)
HEX
: JOIN   LN# OF = IF 07 EMIT ELSE
  JOIN-LINE-ERR?  IF  07 EMIT R> R> 2DROP EXIT  THEN
  E-O-L R# @  - L-LENGTH !    R# @ DUP >R
  3C0 AND 40 + R# !    0    16 0 DO R# @ SCAN ( -f) SWAP R# !
  IF  DROP 1 LEAVE ELSE  R# @ DEL-LINE R# !  THEN  LOOP
  NOT IF 7 EMIT R> R# ! R> R> 2DROP EXIT THEN
   END-POS ( get end addr)
   L-LENGTH @  WRD-LEN -  -1 > IF
   POS1 @ CHAR-ADDR I 1+
   CHAR-ADDR WRD-LEN CMOVE POS1 @ R# ! %-DEL-WORD
   R> WRD-LEN + 1 +  R# ! .CUR-POS   CHANGE-FLAG ON
  ELSE  07 EMIT R> R# ! .CUR-POS THEN
   THEN  ;
: %-JOIN-LINE JOIN SCR-REPRINT   ;
```

Screen # 26

```
$ Funtion Words - Stamp function                     ( PLB*10/15/86)
DECIMAL
CREATE ID 6 ALLOT   0 ID ! -
$ : CLEAR-INITIALS  0 ID ! ;
: INITIALS ( --) 23 6 TAB .M" Please enter your initials :"
     1 SPACES  ID 3 EXPECT 23 6 TAB CLR-EOL .CUR-POS ;
: STORE INIT ( adr-adr') BEGIN ID W@ 0= IF INITIALS 0 ELSE
     1 THEN UNTIL ID OVER 3 CMOVE 3 + ;
: STMP ( --) CHANGE-FLAG ON  0 CHAR-ADDR 49 + DUP 14
    BLANK 40 OVER C! 2 + STORE INIT 42 OVER C! 1+
    TODAY W@ (DATE) >R OVER I CMOVE R> + 41 SWAP C!
    R# OFF    0 .FSLINE      .CUR-POS ;
: %-STAMP STMP ;
: %-AS-TOG 'AS-VEC @ IF 'AS-VEC OFF .AS-OFF ELSE
    ['] STMP 'AS-VEC ! .AS-ON THEN ;
```

Screen # 27

```
$ Function Words - Cut and Copy Screen Display   ( PLB*07/04/86)
: BEEP  7 EMIT ;
VARIABLE .POS1   VARIABLE .POS2

: COPY-ON  23 6 TAB .M" Select text using up and down arrows, <C
R> when finished" .CUR-POS ;

: COPY-OFF   23 6 TAB CLR-EOL .CUR-POS ;
HEX
: UP-CUT  LN# .FSLINE .CUR-POS
   -40 R# +!     R# @ .POS1 @ <
   IF 2DROP GOLD-OFF  COPY-OFF
   0 R# ! .CUR-POS  R> R> R> 2DROP DROP EXIT THEN ;
: DOWN-CUT   40 R# +!
   R# @ 400 = IF  -40 R# +!  THEN   LN# .MFSLINE .CUR-POS  ;
```

Screen # 28

```
$ Function Words - Clipbord                          ( CDH*03/25/86)
HEX

: CLIPBOARD   PAD BB8 + ;
: CLIPBOARD-CLEAR   CLIPBOARD  400 BLANK ;
: LEN? ( -n) .POS2 @ .POS1 @ -  ;
```

Screen # 29

```
$ Fuction Words - Copy function                      ( CDH*03/21/86)
HEX
```

```
: CUT-COPY   CLIPBOARD-CLEAR   COPY-ON   LN# .MFSLINE
             R# @ 3C0 AND DUP  R# ! .CUR-POS  .POS1 !
 BEGIN
   KEY  DUP  1B ( esc ) = IF  KEY DROP KEY
                        DUP 41 = IF  UP-CUT  ELSE
                        DUP 42 = IF  DOWN-CUT ELSE
                        DUP 0D = IF           ELSE
                        BEEP
                        THEN THEN THEN THEN
 DUP 0D = NOT IF DROP THEN
 0D ( cr )  = UNTIL   R# @ 40 + .POS2 !
 .POS1 @ CHAR-ADDR  CLIPBOARD  LEN?  ( addr1 addr2 1) CMOVE ;
```

Screen # 30

```
$ Fuction Words - Copy function                      ( CDH*03/21/86)
HEX

: %-COPY   CUT-COPY
    R# @ >R
    .POS2 @ R# !    LN# ( -n)
    .POS1 @ R# !    LN# ( -n)
    DO I .FSLINE LOOP  ( unhighlighting text selected )
    R> R# ! .CUR-POS    COPY-OFF ;
```

Screen # 31

```
$ Function Words - Cut Function                      ( CDH*03/21/86)
HEX

: %-CUT  CUT-COPY COPY-OFF  CHANGE-FLAG ON   .POS1 @ R# !
   .POS2 @  .POS1 @
    DO  DEL-LINE   40 +LOOP   SCR-REPRINT ;
```

Screen # 32

```
$ Functin Wod - Show Clipboard Function              ( CDH*03/24/86)
DECIMAL
: %-SHOW-CLIPBOARD
   .POS2 @  .POS1 @ =
    IF  BEEP 23 6 TAB .M" Clipboard Empty "  .CUR-POS
        60000 0 DO LOOP
        23 6 TAB CLR-EOL   .CUR-POS
    ELSE
        SAVE-CURRENT PAGE
        LEN? 0 DO   CLIPBOARD I + 64 -TRAILING TYPE CR
             64 +LOOP
         23 26 TAB .M" Press <CR> to return"
         KEY  13 = IF PAGE RESTORE-CURRENT
        ELSE BEEP THEN  23 6 TAB CLR-EOL .CUR-POS
    THEN  ;
```

Screen # 33

```
$ Function Words - Paste Function                    ( CDH*03/25/86)
DECIMAL

: PASTE-TEXT   LEN? 64 / 0
    DO  INS  LOOP
    CLIPBOARD R# @ CHAR-ADDR ( addr1 addr2) LEN? CMOVE
    SCR-REPRINT ;

: %-PASTE   15 EMPTY-LINE?
    IF  PASTE-TEXT
    ELSE  23 6 TAB .M" Paste Text" R-U-SURE
       IF  PASTE-TEXT  THEN
    THEN ;
```

Screen # 34

```
$ Function Words                                     ( CDH*03/20/86)
```

```
HEX
$ Unimplemented function words (keys) on main keypad
: %-FIND BEEP ;
: %-REPLACE BEEP ;

$ GOLD FUNCTIONS - UNIMPLEMENTED
: %-FIND/REP BEEP ;
: %-DASH BEEP  ;     ( : %-DOT BEEP ;)     : %-0 BEEP ;
: %-4 BEEP ;         : %-8 BEEP ;          : %-9 BEEP ;
```

Screen # 35

```
$ Available screen
```

Screen # 36

```
$ Available screen
```

Screen # 37

```
$ Available screen
```

Screen # 38

```
$ Gold Key Table                                        ( CDH*03/20/86)
HEX     : ESC-ERROR  7 EMIT ;
: NOOP ;
CREATE PF1-TABLE  7F 41 - 4*  ALLOT  GILD

 : INIT-PF1-TABLE   7F 41 - 0 DO
    ['] ESC-ERROR   I 4* PF1-TABLE + ! LOOP :   INIT-PF1 TABLE

: >> 41 - 4*  PF1-TABLE + ' SWAP ! ;

50 >> NOOP          51 >> %-CUT    52 >> %-COPY   53 >> %-PASTE
6C >> %-ERA-EOL     6D >> %-DASH   6E >> %-AS-TOG 70 >> %-0
71 >> %-RESTORE     72 >> %-SAVE   73 >> %-STAMP  74 >> %-4
75 >> %-WIPE              76 >> %-ERA-EOS    77 >> %-FIND/REP
78 >> %-SHOW-CLIPBOARD 79 >> %-9             4D >> %-PF-EXIT
EMPTY
```

Screen # 39

```
$ Gold Sequence Detection and execution                 ( PLB*04/10/86)
```

```
HEX
: %-GOLD GOLD-ON KEY KEY DROP DROP
    KEY  7F AND 41 -   DUP 0< IF  DROP ESC-ERROR  ELSE
    4* PF1-TABLE + @EXECUTE THEN  GOLD-OFF ;
```

Screen # 40

```
$ Escape Key Table                                      ( CDH*03/04/86)
HEX
CREATE ESC-TABLE   7F 41 - 4* ALLOT  GILD
  : INIT-ESC-TABLE   7F 41 - 0 DO
  ['] ESC-ERROR    I 4* ESC-TABLE +   !   LOOP : INIT-ESC-TABLE
: >> 41 - 4* ESC-TABLE +  '  SWAP ! ;

41 >> %-U       42 >> %-D       43 >> %-R      44 >> %-L
50 >> %-GOLD    51 >> %-HOME    52 >> %-JUMP   53 >> %-DEL-WORD
6C >> %-EOL          6D >> %-JOIN-LINE  6E >> %-PREV-SCR
70 >> %-INS-TOG      71 >> %-PREV-WORD  72 >> %-ADV-WORD
73 >> %-SHAD         74 >> %-ERA-LINE   75 >> %-DEL-LINE
76 >> %-INS-LINE     77 >> %-FIND       78 >> %-REPLACE
79 >> %-SPLIT-LINE 4D >> %-NXT-SCR

EMPTY
```

Screen # 41

```
$ Escape Sequence Detection and execution               ( CDH*03/04/86)
HEX

: %-ESC ( c-)    KEY 2DROP KEY 7F AND
  41 - DUP 0< IF ESC-ERROR ELSE 4* ESC-TABLE + @EXECUTE THEN ;

: %-CONTROL-CHAR ( c- )  DUP 1A = IF  DROP %-EXIT  ELSE
  7 EMIT THEN DROP ;
```

Screen # 42

```
$ Main Execution Table                                  ( CDH*03/04/86)

CREATE EXEC-TABLE
    ' %-NORMAL   ,            $ Normal Characters
    ' %-CONTROL-CHAR   ,      $ Garbage Characters
    ' %-ESC   ,               $ Esc
    ' %-CR   ,                $ CR
    ' %-TAB   ,               $ Tab
    ' %-BS   ,                $ BS
    ' %-DEL   ,               $ DEL
```

Screen # 43

```
$ Full Screen Editor Look-up table                      ( CDH*03/04/86)
HEX
CREATE KEY-TABLE     80 ALLOT
GILD
: INITIALIZE-KEY-TABLE
       20  0 DO 4   I KEY-TABLE + C! LOOP
       80 20 DO 0   I KEY-TABLE + C! LOOP ;
     INITIALIZE-KEY-TABLE
: !KEY ( code key-offset - )  KEY-TABLE +   C! ;

08  1B  !KEY
0C  0D  !KEY
10  09  !KEY
14  08  !KEY
18  7F  !KEY
    EMPTY
```

Screen # 44

```
$ Full Screen Editor Startup words                      ( PLB*03/12/87)
DECIMAL
: SNIFF DEPTH DUP 0 > ABORT" Too many items on the stack..."
    0< ABORT" Editor Stack Empty ..." ;
: EDIT-LOOP   BEGIN    KEY 127 AND
                 DUP KEY-TABLE + C@    EXEC-TABLE + @EXECUTE
```

```
SNIFF       AGAIN ;

: L   50 @ PAD - 6000 < ABORT" NOT ENOUGH MEMORY"
   .ESC 61 EMIT ( ESC= )      PAGE RESTORE-CURRENT
   INSERT-FLAG OFF .POS1 OFF .POS2 OFF    EDIT-LOOP ;

: EDIT ( n-)    SCR ! L ;

: edit ( n-)    EDIT ;
: l  L ;           ( Lowercase )
```

Screen # 50

Screen # 51

Screen # 52

Original polyForth functions ( CDH*03/26/86)

Screen # 53

CHAR-AD added to R# gives actual address of character in the edit buffer located in pad
.M" prints given string in reverse video
M-EMIT used to print ASCII value in reverse video - here to primarily print a ( 32 ) blank for border around screen
CLR-EOL used to clear screen to end of line cursor is on
.FSLINE prints a line ( given the line number ) as well as the border (revrse video blank) at beginning and end of the line

Screen # 54

.CUR-POS updates the display counter at top of screen and repositions the cursor on the display to reflect its correct position in the in pad
X-OFFSET given a number (neg or pos to tell direction) moves the cursor left or right
Y-OFFSET given a number (same as above) moves the cursor up or down within the screen
INS-ON toggle to set flag for insert mode ON
INS-OFF toggle to set flag for insert mode OFF

Screen # 55

.SCRN prints part of the header displayed on screen
.HEADER prints part of the header and border diplayed on screen
R-U-SURE prints an "Are you sure?" message used in editing commands to double check that the user wants to execute a a function that will make a significant change (returns a flag)
SCR-ERROR? used to keep user from trying to list screens before screen zero and past the maximum screen number
LINE# returns the current line # that cursor is on
SCR_REPRINT reprints the screen from the current line # the cursor is on to the end of the screen

Screen # 56

GOLD-ON displays message indicating user is in gold mode
GOLD-OFF erases gold-on message when user leaves gold mode
.MFSLINE ( expects a line number ) prints a line in reverse video

Screen # 57

CHANGE-FLAG flag to signify if a change in the screen is made
SAVE-CURRENT saves the current screen (FLUSH)
FS-DISP prints the screen w/borders
RESTORE-CURRENT reads current screen off disk and prints to screen

Screen # 58

GET-CHAR gets the character whose address is in R# for comparison purposes
ERASE-LINE blanks (fills with blanks) line cursor currently is on in the edit buffer (pad)

Screen # 59

POS1 holds address of beginning of word to join
POS2 holds address of end of word to join
WRD-LEN length of word joining
E-O-L returns address of end of line
JOIN-LINE-ERR? returns flag - checks remainder for characters will not execute if any found
SCAN searches next line for word to join
END-POS finds ending position of word to be joined (stored in pos2)

Screen # 60

Screen # 61

Screen # 62

Screen # 63

Screen # 64

Screen # 65

%-CR sends cursor to beginning of next line (does not execute a line-feed
LIMIT-SCR test for attempt to read past maximum block or before screen zero (uses SCR-ERROR? found in #4)
%-NEX-SCR displays next screen (saving current screen if changes were made)

Screen # 66

( CDH*03/10/86)

%-PREV-SCR list previous screen for editing

%-SHAD displays shadow screen for current screen

%-INS-TOG insert/overwrite toggle ( if in insert mode a message appears at top left of screen )

%-DEL ( del key on keyboard ) deletes char at current cursor position shifting all following char 1 position left %-BS ( back space key on keyboard ) deletes char 1 position to left of current cursor position, shifting the following char 1 position left Screen # 67

(EXIT) saves current screen and puts cursor at bottom of screen
%-EXIT exits the editor from normal mode ( ctrl-z)
%-PF-EXIT exits the editor in gold mode
%-HOME sends the cursor to top left-hand corner (home)
%-WIPE erases the current screen (wipe)
%-RESTORE restores the current screen - reads from disk the current screen and displays
%-SAVE saves current screen
%-DEL-WORD deletes the word the cursor is currently in Screen # 68

#IN receives number of screen to jump to from the keyboard
%-JUMP allows user to go to another screen other than the previous or next Screen # 69

INS (insert mode) moves all following characters down 64 spaces beginning at the beginning of the line the cursor is currently on
EMPTY-LINE? returns a flag to indicate if line whose line # is given is empty or not
%-INS-LINE inserts line above the line where the cursor currently is (testing to see if anything on line 15 will be 'bumped' off the screen and giving user a choice not to insert if it will)
%-ERASE-LINE erases the line cursor is currently on (erase-line blanks pad)

Screen # 70

SPLIT splits the line at the current cursor position sending the second half to the next line in the same position %-SPLIT-LINE splits the line checking line 15 again to see if text will be bumped off and giving the user a choice if it will

Screen # 71

%-ERA-EOL erase (from current cursor position) to end of line
%-ERA-EOS erase (from current cursor position) to end of screen
%-EOL sends cursor to end of the line cursor is on (to end of characters on line)

Screen # 72

\ FULL SCREEN EDITOR ( CDH=03/10/86)
%-OVERWRITE in this mode characters overwrite existing ones seen on the screen
INS-CHAR inserts a character at a time at position to left of current cursor position shifting all following characters one position to the right
%-INS in this mode characters are inserted at the cursor position (ins-char)
%-NORMAL insert/overwrite toggle ( executed using the 0 key on the keypad )
%-TAB depending on insert/overwrite toggle either inserts a tab or just repositions the cursor on a tab (tabs are at 4 space intervals across line)

Screen # 73

FULL SCREEN EDITOR
%-U cursor up key ( arrow keys of the keyboard )
%-D cursor down key ( moves cursor one position in direction
%-R cursor right key indicated )
%-L cursor left key DEL-LINE deletes the line the cursor currently is on moving all following lines up one line %-DEL-LINE performs del-line unless cursor is on line 15, in which case only %-erase-line is needed

Screen # 74

%-ADV-WORD advances the cursor to the beginning of the next word (like the cursor keys this will also wrap to line one if on line 15)
%-PREV-WORD backs the cursor to the beginning of the previous word (again will wrap to line 15 from line 1)

Screen # 75

JOIN first checks for any characters on line following cursor (Join-line-err?) if errors then word is exited, if no errors:

the following text is searched for the next non-blank character (scan - if none found word is exited) when character is found the search continues for end of the word (end-pos). After these are found the word is joined to appropriate line if there is enough room ( if not word is exited ) and the line following that word is moved up also the length of the joined word.

%-JOIN-LINE joins if possible and reprints screen

Screen # 76

ID variable that holds the initials to use for STAMP
CLEAR-INITIALS clears out any initials stored in ID
INITIALS if no initails are stored in ID a message is printed to enter your initials and accepts 3 initials to be stored
STORE_INIT if no initials in ID then INITIALS will be executed
STMP stamps persons initials and date on top right line
%-STAMP executes stmp

Screen # 77

.POS1 holds address of beginning of string to copy, cut or paste
.POS2 holds address of end of string to copy, cut or paste
COPY-ON displays brief message of instructions for the copy and cut function for user
COPY-OFF erases copy-on message when copy or cut completed
UP-CUT moves cursor in upward direction de-selecting an area to cut or copy ( area is also un-highlighted )
DOWN-CUT moves cursor in downward direction highlighting area that is to be selected

* cut and copy perform their functions on a line basis only

Screen # 78

CLIPBOARD area in pad that holds cut or copied text
CLIPBOARD-CLEAR blanks clipboard area in pad
LEN? returns length of area cut or copied

Screen # 79

CUT-COPY clears clipboard, prints instructions to user and copies the selected text to clipboard ( if user goes past -up- original line selected the word is exited(up-cut) )

Screen # 80

%-COPY moves the selected text to clipboard then un-highlights the selected text and erases the intructions to the user (copy-off)

Screen # 81

%-CUT copies text (cut-copy) then deletes selected lines from the screen (del-line)

Screen # 82

%-SHOW-CLIPBOARD displays contents of clipboard on screen then with a user prompt returns to current screen at the users convenience ( if clipboard is empty message is given and clip-board is not displayed )

Screen # 83

PASTE-TEXT number of lines in clipboard are determined (len?) and that number of lines are inserted above line cursor is on (ins) text in clipboard is then moved to screen ( if their is text on the bottom that will be 'bumped' off user is again given the choice

Screen # 84

Screen # 85

Screen # 86

Screen # 87

Screen # 88

$ PF1-TABLE is the table for execution of Gold functions
Key pad sequences:

| | |
|---|---|
| 4D | ENTER labeled key |
| 50 | PF1 |
| 51 | PF2 |
| 52 | PF3 |
| 53 | PF4 |
| 6C | , (comma labeled key) |
| 6D | - (minus sign labeled key) |
| 6E | . (dot labeled key) |
| 70 | 0 |
| 71 | 1 key ..... 79 9 key |

keys containing names same as the keypad (ex. %-dash) are unused keys

Screen # 89

%-GOLD executes the gold function keys

Screen # 90

ESC-ERROR emits a beep
ESC-TABLE is the table for execution of normal keypad functions ( For table of key sequences and matching key pad key see screen #88)

Screen # 91

```
%-ESC executes ESC-TABLE found on screen #8 the normal keypad
functions
%-CONTROL-CHAR executes words using the ctrl key
```

Screen # 92

```
EXEC-TABLE execute table where %-NORMAL are characters and
numbers/symbols on keyboard, %-CONTROL-CHAR are sequences
defined on screen #14, %-ESC are defined on screen #8, and the
rest are defined elsewhere but execute as their name suggests
```

Screen # 93

```
$ Full Screen Editor Look-up table                  ( CDH*03/04/86)

KEY-TABLE is a key look-up table with the following values:

0   - Normal Characters
4   - Control Characters and Garbage Characters
8   - ESC key
12  - CR key
16  - TAB key
20  - Backspace key
24  - Delete key
```

Screen # 94

```
$ FULL SCREEN EDITOR                                ( CDH*03/10/86)
EDIT-LOOP receives a key and performs an action until ctrl-z or
gold enter (exit)
LL initializations, prints initial screen with borders and
headers that do not change
EDIT invokes editor with the screen whose number must be put on
the stack by the user
```

Screen # 0

```
$ BDOS.PF  --  CP/M BDOS Interface                  ( PLB*12/24/85)

Update Records :

<01> 12/24/85 PLB  -  Creation of CP/M Interface Package
<02>  5/14/86 PLB  -  Documentation
```

This file contains some interface words to the CP/M-68K operating system that are to be used by the OPS language system.

Screen # 1

```
$ Load Screen for CP/M Interface Package            ( PLB*12/06/86)
DECIMAL

START-SEGMENT .( ==> CP/M BDOS Interface Package)

           12  21  THRU        $ Character Output for terminal
                               $   and printer
            2  11  THRU        $ Get Character Support
DEBUG?     12      ?LOAD       $ Get Character test words

END-SEGMENT
```

Screen # 2

```
$ Simple File Functions                             ( PLB*12/24/85)
HEX
: BDOS&ERR ( param1 fcode -- error flag ) BDOS FF = ;
: F-OPEN         ( fcb-f)       0F BDOS&ERR ;
: F-CLOSE        ( fcb-f)       10 BDOS&ERR ;
: F-READ-SEQ     ( fcb-f)       14 BDOS ;
: F-WRITE-SEQ    ( fcb-f)       15 BDOS ;
: F-MAKE         ( fcb-f)       16 BDOS&ERR ;
: F-DMA          ( address-)    1A BDOS DROP ;
: F-READ-RAND    ( fcb-f)       21 BDOS ;
: F-WRITE-RAND   ( fcb-f)       22 BDOS ;
: F-DELETE       ( fcb-f)       13 BDOS ;
   $ : F-SEARCH-NEXT  ( fcb-f)       12 BDOS&ERR ;
   $ : F-SEARCH-FIRST ( fcb-f)       11 BDOS&ERR ;
   $ : F-RENAME       ( fcb-f)       17 BDOS ;
   $ : F-ATTRIBUTES   ( fcb-f)       1E BDOS ;
```

Screen # 3

```
$ Simple File Functions, Cont.                      ( PLB*12/24/85)
HEX
EXIT
$ More BDOS Functions not yet needed !!!!!!
: F-SIZE        ( fcb- )       23 BDOS DROP ;
: F-RAND-RECORD ( fcb- )       24 BDOS DROP ;
: F-WRITE-RANDZF ( fcb-f)      28 BDOS ;
: F-DISK-FREE    ( disk#- )    2E BDOS DROP ;
```

Screen # 4

```
$ CP/M Get-Character Routine                        ( PLB*12/06/86)
$ Gets a character from either the keyboard buffer
$   or the currently opened disk file.
DECIMAL
VARIABLE LINE#                  $ Line counter
VARIABLE CHAR#                  $ Character counter
VARIABLE LAST-CR                $ Character position of last CR
VARIABLE LAST-FILE-REC          $ Record # of last file read
36 ARRAY  FCB                   $ File Control Block
128 ARRAY FCB-BUFF              $ File input buffer
132 ARRAY LINE-BUFF             $ Keyboard input buffer

VARIABLE  'CHARACTER            $ Get-character vector
: GC ( -n)   COMPILE 'CHARACTER COMPILE @EXECUTE ; IMMEDIATE
```

Screen # 5

```
$ CP/M Keyboard Get-Character Routine               ( PLB*01/26/86)
DECIMAL
WVARIABLE (MORE-CHARS)
: EXPECT-MORE-INPUT        (MORE-CHARS) W-OFF ;
: DON'T-EXPECT-MORE-INPUT  (MORE-CHARS) W-ON ;

: GET-KBD-LINE    LAST-CR OFF    LINE-BUFF #KBD-COL  EXPECT
     CHAR# OFF
     CNT C@ LINE-BUFF +    132 CNT C@ -    BLANK ;
```

```
: GET-KBD-CHAR ( -c)   CHAR# @  #KBD-COL =
      IF GET-KBD-LINE  13 ( return CR) CR EXIT THEN
      CHAR# @ LINE-BUFF + C@ 127 AND  ( get-character)
      CHAR# TALLY  CHAR# @ #KBD-COL = (MORE-CHARS) W@ AND
      IF ABORT THEN ;
```

Screen # 6

```
$ File Stack Words                                    ( PLB*10/27/86)
  WVARIABLE  FS-POINTER
6  WCONSTANT  FILE-STACK-SIZE
24 WCONSTANT  FILE-STACK-WIDTH
FILE-STACK-WIDTH FILE-STACK-SIZE *  ARRAY FILE-STACK
: INIT-GET-CHAR     #KBD-COL  CHAR# !  DON'T-EXPECT-MORE-INPUT
    ['] GET-KBD-CHAR  'CHARACTER !  FS-POINTER W-OFF
    FILE-STACK  FILE-STACK-WIDTH   FILE-STACK-SIZE * ERASE ;
INIT-GET-CHAR
: PUSH-FILE ( -f)  FS-POINTER W@  FILE-STACK-SIZE =
    IF 1 EXIT ( Not enough room on file-stack)  THEN
    FS-POINTER W@ FILE-STACK-WIDTH * FILE-STACK + >R
    FCB R@ 12 MOVE ( filename)   LINE# @ R@ 12 + !
    CHAR# @ R@ 16 + !           LAST-CR @ R> 20 + !
    FS-POINTER W-TALLY   0 ( no-error)  ;
```

Screen # 7

```
$ File Stack Words                                    ( PLB*01/23/86)
DECIMAL
: POP-FILE -1 FS-POINTER W+!
      FS-POINTER W@ FILE-STACK-WIDTH * FILE-STACK + >R
      R@ FCB 12 MOVE ( filename)     R@ 12 + @  LINE# !
      R@ 16 + @ CHAR# !             R> 20 + @  LAST-CR !
      FS-POINTER W@  0= IF ['] GET-KBD-CHAR 'CHARACTER ! ELSE
      ( re-open file)   -1 LAST-FILE-REC !
        FCB F-OPEN ABORT" POP-FILE File reopen error" THEN ;

: READ-128 ( record# -)
      FCB-BUFF  F-DMA
      FCB 34 + W!    0 FCB 33 + C!
      FCB   F-READ-RAND  ABORT" Random Read Error" ;
```

Screen # 8

```
$ CP/M File Get-Character Routine                     ( PLB*01/22/86)
CODE GET-FILE-CHAR  $ ( -c)
    CHAR# AB D0 MOV       D0 D1 MOV           7 # D0 LSR
    LAST-FILE-REC AB D0 CMP 0= NOT IF
        $ Read new record from BDOS
        D0 LAST-FILE-REC AB MOV    D0 S -) MOV
        [[  READ-128  ]]  CHAR# AB D1 MOV
    THEN    127 # D1 AND   FCB-BUFF #  D1 ADD   D1 A0 MOV
    D0 CLR        A0 ) D0 B. MOV    1 #Q CHAR# AB ADD
    13 #B D0 CMP    0= IF     BEGIN 0 # D1 MOV  $ <1>
          D1 'CHARACTER AB MOV THEN
    26 #B D0 CMP    0= IF [[ POP-FILE ]] 13 #Q D0 MOV
    THEN   D0 S -) MOV ,NEXT
: CR-VECTOR ( C-) PAUSE LINE# TALLY  CHAR# @ LAST-CR !
    ['] GET-FILE-CHAR 'CHARACTER ! GET-FILE-CHAR ;
' CR-VECTOR    SWAP ( <1> ) 2+ !
```

Screen # 9

```
$ More Get-character File stuff                       ( PLB*01/23/86)
DECIMAL

 : FILE? ( -f)  'CHARACTER @  ['] GET-KBD-CHAR  =  NOT ;

 : FILE-OPEN ( $ - f)   $ TAKES A STRING INPUT, RETURNS A FLAG
    PUSH-FILE IF 1 EXIT ( Push-file error) THEN
    FCB PARSE-FILENAME IF 2 EXIT ( Filename error) THEN
    FCB F-OPEN          IF 3 EXIT ( Open Error)    THEN
    ['] GET-FILE-CHAR  'CHARACTER !
    CHAR# OFF   LINE# ON ( set to 1)    LAST-CR OFF
    -1 LAST-FILE-REC !       0 ( no error) ;
```

Screen # 10

```
$ Error Output Utility                                ( PLB*01/23/86)
DECIMAL
: >pd ( c-)  LINE# @ C!    LINE# TALLY ;
: >PD ( c-)  DUP 13 = OVER 10 = OR IF DROP EXIT THEN
    DUP 9 = ( tab) IF DROP
       BEGIN 32 >pd  LINE# @ PAD - 8 MOD 0= UNTIL
    ELSE >pd THEN ;

: RD-KBD-LN    PAD LINE# !   CHAR# @   CHAR# OFF
       #KBD-COL 0 DO   I LINE-BUFF + C@ >PD   DUP I 1+ =
              IF LINE# @ HERE ! THEN
      LOOP DROP ;
$ TAKE CARE OF EOF BETTER !!!!!
: RD-FILE-LN    PAD LINE# !  CHAR# @  LAST-CR @ CHAR# !
      BEGIN GC DUP >PD OVER CHAR# @ = IF LINE# @ HERE ! THEN
      13 = UNTIL DROP ;
```

Screen # 11

```
$ Error Output Utility                                ( PLB*04/08/87)
DECIMAL
: .HIGHLIGHT ( offset  a n - )  CR -TRAILING
     ROT OVER MIN ROT ROT    $ Correct if offset > n
     ROT >R  OVER R@  TYPE  SWAP R@ + SWAP R> - 1 MAX
     +REV TYPE -REV ;
: .GC-ERROR  LINE# @    CHAR# @    LAST-CR @
       FILE? IF    ." file '" FCB .FCB
                 ." ' on line number " LINE# @ .
                 PAD 200 BLANK RD-FILE-LN   ELSE
                 ." keyboard input"  PAD 200 BLANK RD-KBD-LN
                 THEN  HERE @ PAD -    PAD 200
           .HIGHLIGHT CR   LAST-CR !  CHAR# !  LINE# ! ;

: .ERROR-LINE          ?CR ." Error in "   .GC-ERROR ;
: .WARNING-LINE  CTRL-C ?CR ." Warning on " .GC-ERROR ;
```

Screen # 12

```
$ TESTING WORDS FOR FILE READ                         ( PLB*01/22/86)

: INIT-FILE    ." Input filename: "  PAD 80 $IN
  PAD    FILE-OPEN . ;

: CC GC EMIT ."   " ;

: TYPE-FILE BEGIN GC EMIT ?WAIT AGAIN ;

: TIME-TEST BEGIN GC DROP ?WAIT AGAIN ;
```

Screen # 13

```
$ New output modification words                       ( PLB*12/05/86)
HEX              $ These "characters" are converted
   $ to the appropriate sequences at output time
: PMIT ( c - ) EMIT C# W-IOCK ;
: +REV  80 PMIT ;                      : -REV   84 PMIT ;
: +UL   88 PMIT ;                      : -UL    8C PMIT ;
: +COMP 90 PMIT ;                      : -COMP  94 PMIT ;
$ page is a 98
: +CRT  9C PMIT ;                      : -CRT   A0 PMIT ;
: +PRT  A4 PMIT ;                      : -PRT   A8 PMIT ;
: +FILE AC PMIT ;                      : -FILE  B0 PMIT ;

: .VT-ESC[   1B (C-EMIT)     5B (C-EMIT)  ;
: .VT-CMD ( n - )   .VT-ESC[ (C-EMIT)  6D (C-EMIT) ;
: .PT-ESC ( n - )   1B (P-EMIT) (P-EMIT) ;
```

Screen # 14

```
$ Vectors for character output                        ( PLB*12/05/86)

VARIABLE (C-VEC)        $ console character output vector
VARIABLE (P-VEC)        $ printer character output vector
VARIABLE (F-VEC)        $ file character output vector

: CON? ( - f )      (C-VEC) @ ['] DROP - ;
: PRT? ( - f )      (P-VEC) @ ['] DROP - ;
: FIL? ( - f )      (F-VEC) @ ['] DROP - ;

WVARIABLE  TYPE-STATE
: SET-STATE ( n - )   TYPE-STATE W@ OR TYPE-STATE W! ;
: CLR-STATE ( n - )   ]] S ) COM [[ TYPE-STATE W@ AND
        TYPE-STATE W! ;
: CHK-STATE ( n - f )  TYPE-STATE W@ AND ;
```

Screen # 15

```
$ Command words ( VT-100 & Imagewriter II )           ( PLB*12/30/86)
HEX
: C+REV  37 .VT-CMD ;
$ : P+REV  61 .PT-ESC 32 (P-EMIT) ;
: P+REV   58 .PT-ESC ;    $ SAME AS P+UL !!!!
: C-REV  30 .VT-CMD ;
$ : P-REV  61 .PT-ESC 31 (P-EMIT) ;
: P-REV   59 .PT-ESC ;        $ SAME AS P-UL !!!!
: C+UL    34 .VT-CMD ;
: P+UL    58 .PT-ESC ;
```

```
: C-UL   30 .VT-CMD ;
: P-UL   59 .PT-ESC ;
: C+COMP .VT-ESC[ 3F (C-EMIT) 33 (C-EMIT) 68 (C-EMIT) ;
: P+COMP 51 .PT-ESC ;
: C-COMP .VT-ESC[ 3F (C-EMIT) 33 (C-EMIT) 6C (C-EMIT) ;
: P-COMP 45 .PT-ESC ;
```

Screen # 16

```
$ Output modes                                      ( PLB*12/06/86)
DECIMAL
: (+REV)     1 SET-STATE
             CON? IF C+REV THEN        PRT? IF P+REV THEN ;
: (-REV)     1 CLR-STATE
             CON? IF C-REV THEN        PRT? IF P-REV THEN ;

: (+UL)      2 SET-STATE
             CON? IF C+UL THEN         PRT? IF P+UL THEN ;
: (-UL)      2 CLR-STATE
             CON? IF C-UL THEN         PRT? IF P-UL THEN ;

: (+COMP)   4 SET-STATE  132 (#VT-COL) W!     $ 132 COL
   CON? IF C+COMP THEN                 PRT? IF P+COMP THEN ;
: (-COMP)   4 CLR-STATE   80 (#VT-COL) W!     $ 80 COL
   CON? IF C-COMP THEN                 PRT? IF P-COMP THEN ;
```

Screen # 17

```
$ Character output mode refresh                     ( PLB*12/30/86)
HEX
: (+PAGE) L# W-OFF
   CON? IF .VT-ESC[  32 (C-EMIT) 4A (C-EMIT)
           .VT-ESC[  66 (C-EMIT)                THEN
   PRT? IF 0C (P-EMIT) THEN ;
: REFRESH-CRT
   1 CHK-STATE IF C+REV  ELSE C-REV  THEN
   2 CHK-STATE IF C+UL   ELSE C-UL   THEN
   4 CHK-STATE IF C+COMP ELSE C-COMP THEN ;

: REFRESH-PRT
$   1 CHK-STATE IF P+REV  ELSE P-REV  THEN
$   2 CHK-STATE IF P+UL   ELSE P-UL   THEN
   1 CHK-STATE 2 CHK-STATE OR IF P+REV  ELSE P-REV  THEN
   4 CHK-STATE IF P+COMP ELSE P-COMP THEN ;
```

Screen # 18

```
$ Output Device Enable & Disable                    ( PLB*12/06/86)

: (+CRT)    ['] (C-EMIT) (C-VEC) ! REFRESH-CRT ;
: (-CRT)    ['] DROP     (C-VEC) ! ;
: (+PRT)    ['] (P-EMIT) (P-VEC) ! REFRESH-PRT ;
: (-PRT)    ['] DROP (P-VEC) ! ;
: (+FILE)   ['] DROP (F-VEC) ! ;     $ TEMP
: (-FILE)   ['] DROP (F-VEC) ! ;

CREATE TYPE-TAB ' (+REV) , ' (-REV) , ' (+UL) , ' (-UL) ,
    ' (+COMP) , ' (-COMP) , ' (+PAGE) , ' (+CRT) , ' (-CRT) ,
    ' (+PRT) , ' (-PRT) , ' (+FILE) , ' (-FILE) ,
```

Screen # 19

```
$ Main TYPE word for non-buffered output           ( PLB*12/05/86)
HEX
: (NORMAL-TYPE) ( addr n - )
   ?DUP IF 0 DO DUP C@
      DUP 80 AND IF       $ Special Control
          7F AND TYPE-TAB + @EXECUTE
      ELSE                $ Normal Character output
         DUP DUP
            (C-VEC) @EXECUTE
            (P-VEC) @EXECUTE
            (F-VEC) @EXECUTE
      THEN
   1+ LOOP THEN DROP ;

: (OPS-PAGE)    98 EMIT ;
```

Screen # 20

```
$ Buffered TYPE output vector                       ( PLB*12/06/86)

2048 ARRAY (TYPE-BUFF)          WVARIABLE (TYPE-CNT)

: FLUSH-TYPE (TYPE-CNT) W@ ?DUP
   IF (TYPE-BUFF) SWAP (NORMAL-TYPE) (TYPE-CNT) W-OFF THEN ;
: (BUFFER-TYPE) ( addr cnt - ) DUP (TYPE-CNT) W@ + 2048 >
   IF FLUSH-TYPE THEN
   >R  (TYPE-BUFF) (TYPE-CNT) W@ + ( to ) R@ CMOVE
   R> (TYPE-CNT) W+! ;
```

Screen # 21

```
$ TYPE vector setup                                 ( PLB*12/06/86)

: NORMAL-TYPE
   FLUSH-TYPE
   ['] (NORMAL-TYPE) 'TYPE !    ['] (OPS-PAGE) 'PAGE ! ;

: OPS-I/O  ['] (C-EMIT)    (C-VEC) !   TYPE-STATE W-OFF
           ['] DROP        (P-VEC) !   (TYPE-CNT) W-OFF
           ['] DROP        (F-VEC) !   NORMAL-TYPE ;

: FORTH-I/O    ['] (TYPE) 'TYPE !     ['] (PAGE) 'PAGE ! ;

: BUFFER-TYPE ['] (BUFFER-TYPE) 'TYPE ! ;
```

Screen # 30

Screen # 31

Screen # 32

These functions are described in the CP/M documentation

Screen # 33

These functions are not needed at the present time but can be used when needed

Screen # 34

$ CP/M Get-Character Routine ( PLB*01/21/86)

$ Gets a character from either the keyboard buffer
$ or the currently opened disk file.

External Words:
LINE#
CHAR#
GC
FILE?
INIT-KBD-BUFF

These words are the lowest level character words used by the OPS language system. The higher level words do not need to know if the characters are coming from the keyboard or the selected disk file.

Screen # 35

Keyboard input routines (MORE-CHARS) is a flag that can be used by higher level words to tell the low level routines to get another keyboard line or not.

GET-KBD-LINE gets a line of input from the keyboard

GET-KBD-CHAR gets the next character from the keyboard buffer If none are available and there are no more requested ( see (MORE-CHARS) above ), then it will get back to the OPS prompt using the ABORT

Screen # 36

File Interface Support

These words allow a file stack. Files can open files up to a depth of 6 ( initially )

Screen # 37

More support words for file interface

POP-FILE pops the file from the file stack and reopens the popped file, restores the character pointers, etc. Notice that the input stream will eventually go back to the keyboard entry routines READ-128 reads the next 128 byte CP/M record into FCB-BUFF

Screen # 38

File interface support

GET-FILE-CHAR is the main get-character word for the file interface package. It has been machine coded for speed.

Screen # 39

File interface support

FILE? returns true if the current input stream is coming from a CP/M file

FILE-OPEN takes care of opening a file and dealing with the file stack, character counters, etc.

Screen # 40

Error Output Utility

This screen will restore pointers back to the last CR and move the current line to PAD. PAD is then used to print the line containing the error

Screen # 41

Error Output Utility

.HIGHLIGHT will print a line with the portion after the error in reverse video

.GC-ERROR will print the stats as to where the error occured as well as the line containing the error .ERROR-LINE prints a error message
.WARNING-LINE prints a warning message

Screen # 42

Test words for Get-Character routines

Screen # 43

These next screens allow character output to be vectored to either the CRT screen or to the printer. Eventually, file output will be supported. The main reason for this support is to allow the appropriate escape sequences to be sent to each device.

Also included is support for output buffering. This allows character output to be entered into a RAM buffer during the RHS execution time and allow the HOST to run at full speed. When the rule processors are processing, the HOST will then actually type the RHS messages to the character output device. In this manner, some additional speed improvement can be realized.

Screen # 44

Screen # 45

( PLB*12/30/86)

12/30/86 note that reverse on the printer is the same as
    underline. this is because the normal "reverse" on the
    printer is very slow ....

Screen # 46

Screen # 47

( PLB*12/30/86)

12/30/86 notice change due to reverse being same as underline !

Screen # 48

Screen # 49

Screen # 50

Screen # 51

TYPE vector setup

NORMAL-TYPE turns off buffered type

OPS-I/O enables normal forth output to be "smart" by sending
    the correct escape sequences to both the printer and the CRT FORTH-I/O restores the normal forth output. Normally used only
    to return to FORTH from OPS
BUFFER-TYPE enables the use of the RAM buffer

Screen # 0

$ TIME.PF - Time & Date Support

Update Records:
<01> 11/24/85 PLB - Creation of file.

This file is used to interface to a real-time-clock and
    provide time/date conversion routines

Screen # 1

$ Load Screen for TIME.PF ( PLB*05/14/86)
DECIMAL

START-SEGMENT .( ==> Time and Date Support)

2 4 THRU

END-SEGMENT

Screen # 2

```
$ Simple Time/Date                               ( PLB*12/08/85)
DECIMAL
: @DATE 0 ;
: (DATE)  ( n - a n) DROP @CLOCK  <# <YEAR> W@ # # 47 HOLD DROP
                     <DAY> W@ # # 47 HOLD DROP
                     <MONTH> W@ # # #> ;

: .DATE ( n-)   (DATE)  TYPE ;


$ NOTE FIX SCR 2 & 3 TO SAVE THE BASE AND SET TO DECIMAL FOR CON
```

Screen # 3

```
$ SIMPLE TIME/DATE                               ( PLB*12/17/85)
DECIMAL
: @TIME 0 ;  $  FIX THIS !!!!
: (HMS)   ( n - a n) DROP @CLOCK <# <SECONDS> W@ # # 58 HOLD
                     DROP <MINUTES> W@ # # 58 HOLD DROP
                     <HOURS> W@ # # #> ;
: (HM)    ( n - a n) DROP @CLOCK <#
                     <MINUTES> W@ # # 58 HOLD DROP
                     <HOURS> W@ # # #> ;

: .TIME ( n-)   (HM)  TYPE ;
```

Screen # 4

```
$ Set Clock Routine                              ( PLB*01/06/86)

: SET-CLOCK ( m d y   h m s - )
    <SECONDS> W!  <MINUTES> W!   <HOURS> W!
    <YEAR>    W!  <DAY>     W!   <MONTH> W!
    -1 <DOW>  W!            !CLOCK ;

$ Note that <DOW> is not set !!!!
```

Screen # 10

Screen # 11

Screen # 12

Screen # 13

Screen # 14

Screen # 0

```
$ TERMINAL.SCR

$ This file contains the support for various video terminals.

<00> 11/10/85 PLB  -  TERMINAL.SCR file created
<01> 12/03/85 PLB  -  Defined terminal change words instead
        of letting the screen loads be immediate !!!
```

Screen # 2

```
  ( PERKIN 550 Terminal)      HEX                ( PLB*12/03/85)
: (PAGE)  1B EMIT 4B EMIT 20 0 DO 0 EMIT LOOP ;
: (TAB) ( l c)   20 + 1B EMIT 59 EMIT EMIT  20 + 1B EMIT 5B EMIT
   EMIT ;
: (MARK) ( a n)   >R PAD I CMOVE  ." "  PAD R> TYPE ;

: PERKIN
['] (PAGE) 'PAGE !   ['] (TAB) 'TAB !   ['] (MARK) 'MARK ! ;

EXIT
( This version is faster than the above, if "clear to end of
   page" is available on all terminals.)
MSG CLEAN   21B W, 5900 W,  DECIMAL

' CLEAN  FORGET CLEAN  ' CLEAN 4- !
```

Screen # 4

```
  ( Datamedia Elite)   HEX                       ( PLB*12/03/85)
: (TAB) ( l c)   100 * + 1E2020 +  'S 3 TYPE DROP ;

: DATAMEDIA
['] (TAB) 'TAB ! ;
```

Screen # 6

```
( ADM 5 Terminal)   HEX                          ( PLB*12/03/85)
MSG (PAGE)  59E W, 1A00 W, 00 W,
: (TAB) ( 1 c)   SWAP 100 * +  2020 +  1B3D0000 +  'S 4 TYPE
   DROP  ;
MSG INV   21B W, 291B W, 4700 W,
: (MARK) ( a n)  >R PAD I CMOVE  INV  PAD R> TYPE ;

: ADM5
['] (PAGE) 'PAGE !   ['] (TAB) 'TAB !   ['] (MARK) 'MARK ! ;
```

Screen # 8

```
( 4107 Tektronix)        HEX                     ( PLB*12/03/85)
MSG ANSI   4 C, 1B C, 25 C, 21 C, 31 C,
: (TAB)   BASE W@ >R  DECIMAL  <# 48 HOLD 1+  # # DROP  3B HOLD
     1+ # #  5B HOLD  1B HOLD   #>  R> BASE W!  TYPE ;

MSG TILLEND   3 C, 1B C, 5B C, 4A C,
: (PAGE)    0 0 (TAB)  TILLEND ;

MSG INV   4 C, 1B C, 5B C, 37 C, 6D C,
MSG NORM   4 C, 1B C, 5B C, 30 C, 6D C,

: (MARK) ( a n)   >R  PAD I CMOVE  INV  PAD R> TYPE  NORM ;
: TEK-4107
ANSI
['] (TAB) 'TAB !   ['] (PAGE) 'PAGE !   ['] (MARK) 'MARK ! ;
```

Screen # 10

```
$ Additional VT-100 Support                     ( PLB*12/05/86)
DECIMAL
: .ESC  27 EMIT ;
WVARIABLE (#VT-COL)      80 (#VT-COL) W!
: #KBD-COL ( -#col)      (#VT-COL) W@ ;
$ : VT-80    .ESC ." [?3l"    80 (#VT-COL) W!   PAGE ;
$ : VT-132   .ESC ." [?3h"   132 (#VT-COL) W!   PAGE ;

: +VT-REV   C# W@    .ESC ." [7m"      C# W! ;
: -VT-REV   C# W@    .ESC ." [m"       C# W! ;
: +VT-UL    C# W@    .ESC ." [4m"      C# W! ;
: -VT-UL    -VT-REV ;
: +VT-BLK   C# W@    .ESC ." [5;7m"    C# W! ;
: -VT-BLK   -VT-REV ;
: CLR-EOL   .ESC ." [OK" ;
```

Screen # 1

```
( VT-100 Terminal)       HEX                    ( PLB*01/25/86)
'CREATE @ -TWINS
: (TAB)   BASE W@ >R  DECIMAL  <# 48 HOLD 1+  # # DROP  3B HOLD
     1+ # #  5B HOLD  1B HOLD   #>  R> BASE W!  TYPE ;

MSG TILLEND   3 C, 1B C, 5B C, 4A C,
: (PAGE)    0 0 (TAB)  TILLEND ;

MSG INV   4 C, 1B C, 5B C, 37 C, 6D C,
MSG NORM   4 C, 1B C, 5B C, 30 C, 6D C,

$ : (MARK) ( a n)   >R  PAD I CMOVE  INV  PAD R> TYPE  NORM ;
: (MARK) ( a n-)  INV TYPE NORM ;
'CREATE !        DECIMAL 10 LOAD   $ Additional VT-100 Functions
: VT-100
['] (TAB) 'TAB !   ['] (PAGE) 'PAGE !   ['] (MARK) 'MARK ! ;
```

Screen # 3

```
( ADM 3A Terminal)   HEX                        ( PLB*12/03/85)
'CREATE @ -TWINS
MSG (PAGE)  2 C, 1E C, 1A C,
: (TAB) ( 1 c)   SWAP  100 * +  2020 +  1B3D0000 +
     'S 4 TYPE  DROP ;
: (MARK) ( a n)   >R PAD I CMOVE 16 EMIT  PAD R> TYPE 16 EMIT ;

: ADM3
['] (TAB) 'TAB !   ['] (PAGE) 'PAGE !   ['] (MARK) 'MARK ! ;

'CREATE !
```

Screen # 5

```
( SOROC-130 Terminal)      HEX                   ( PLB*12/03/85)
MSG (PAGE)   04 C,   1B C,  AA C,  0 C,  0 C,
: (MARK)   >R  PAD I CMOVE  5E EMIT  PAD R> TYPE  ;
: (TAB)   ( 1 c)    SWAP  100 * +   2020 +   1BBD0000 +
      'S 4 TYPE  DROP ;

: SOROC
['] (PAGE) 'PAGE !  ['] (TAB)  'TAB !    ['] (MARK)  'MARK ! ;
DECIMAL
```

Screen # 7

```
( Adds 20 Terminal)        HEX                   ( PLB*12/03/85)
MSG (PAGE)   01 C, 0C C,
: (TAB) ( 1 c)    SWAP  100 * +  2020 +  1B590000 +
     'S 4 TYPE  DROP ;
: ATT   1B EMIT  30 EMIT  EMIT ;   60 ATT
: (MARK) ( a n)    >R  PAD I CMOVE  0E EMIT  PAD R> TYPE
   OF EMIT ;
( This MARK is for terminals with underline)
: <MARK> ( a n)    >R PAD I CMOVE
   OE EMIT  PAD R> TYPE  OF EMIT ;
: ADDS+   ['] <MARK> 'MARK ! ;

: ADDS-20
['] (PAGE) 'PAGE !   ['] (TAB) 'TAB !   ['] (MARK) 'MARK ! ;
```

Screen # 9

Screen # 11

Screen # 0

```
$ SBE.PF - AI Machine Customization Screens

Update Records:
<01> 11/24/85 PLB  -  Creation of file.
<02> 12/26/85 PLB  -  Added Time/Date Support


This file provides support of the SBE system running CP/M-68K
```

Screen # 1

```
$ SBE.PF Load Screen                              ( PLB*03/25/86)
START-SEGMENT .( ==> SBE System Customization)

  1 TERMINAL.SCR LOAD-FROM    $ VT-100
  VT-100
  2 LOAD                      $ Printer Support
  3 4 THRU                    $ Time/Date Support
  5 LOAD                      $ Serial Disk Support
  6 8 THRU                    $ TASK1 Support
$ 9  LOAD                     $ Swap Keyboard
END-SEGMENT
```

Screen # 2

```
$ CP/M Printer Drivers                            ( PLB*04/21/87)
HEX
: (P-EMIT)  ( char - )
$   BEGIN PAUSE 0 F BIOS UNTIL
    BEGIN PAUSE   10 FD0004 C!  $ RESET EXTERNAL STATUS CMD
          FD0004 C@ 0C AND 0C = UNTIL
    5 BIOS DROP ;
: (P-TYPE)  ( ADDR COUNT - )
   ?DUP IF 0 DO DUP C@ (P-EMIT) 1+ LOOP THEN DROP ;

EXIT
: TEST BEGIN CTRL-Y FD0004 C@ 0D EMIT . AGAIN ;
: TEST2 BEGIN CTRL-Y 10 FD0004 C!
              FD0004 C@ 0D EMIT 8 AND . AGAIN ;
```

Screen # 3

```
$ Time/Date support for SBE                       ( PLB*01/06/86)
WVARIABLE <YEAR>                WVARIABLE <MONTH>
WVARIABLE <DAY>                 WVARIABLE <HOURS>
WVARIABLE <MINUTES>             WVARIABLE <SECONDS>
WVARIABLE <DOW>
HEX  FEFFA0 CONSTANT RTC-DATA    FEFFA2 CONSTANT RTC-ADDR
     FEFFA4 CONSTANT RTC-CTL     FEFFA6 CONSTANT RTC-PPI
: @5832 ( a-n)  RTC-ADDR C!   30 RTC-CTL C!  RTC-DATA C@ ;
: 2@5832 ( mask a - n ) DUP @5832 >R 1+ @5832 AND 0A * R> + ;
: @CLOCK  90 RTC-PPI C!  10 RTC-CTL C!
    7 0 2@5832   <SECONDS> W!    7 2 2@5832   <MINUTES> W!
    3 4 2@5832   <HOURS> W!      6    @5832   <DOW>     W!
    3 7 2@5832   <DAY>   W!      1 9 2@5832   <MONTH>   W!
    F B 2@5832   <YEAR>  W!      0 RTC-CTL C! ;
```

Screen # 4

```
$ Time/Date support for SBE                       ( PLB*01/06/86)
HEX
: !5832 ( n a-)  RTC-ADDR C!   50 RTC-CTL C!  RTC-DATA C! ;
: 2!5832 ( n a -) >R 0A /MOD  R@ 1+ !5832 R> !5832 ;
: !CLOCK  80 RTC-PPI C!  10 RTC-CTL C!
      <YEAR>   W@ 0B 2!5832   <MONTH>    W@     09 2!5832
      <DAY>    W@ 07 2!5832
      <HOURS> W@ 0A /MOD   8 OR 5 !5832   4 !5832
      <MINUTES> W@ 02 2!5832   <SECONDS>  W@     00 2!5832
      0 RTC-CTL C! ;
$ Note that the DOW is not being set !!!!
$   Also note that the leap year bit is not set !!!!!
EXIT
: CAL-CLOCK 90 RTC-PPI C!  20 RTC-CTL C! 0F RTC-ADDR C! ;
```

Screen # 5

```
$ SBE PORT ACCESS WORDS                           ( PLB*01/02/86)
HEX  FD0504 CONSTANT SER-CTRL
     FD0506 CONSTANT SER-DATA
: ?@SER ( -F) SER-CTRL C@ 1 AND ;
: @SER  BEGIN SER-CTRL C@ 1 AND UNTIL SER-DATA C@ ;
: !SER BEGIN SER-CTRL C@ 4 AND UNTIL SER-DATA C!
    150 0 DO LOOP ;
: >SER ( addr data - ) SWAP SER-CTRL C! DUP DROP  SER-CTRL C! ;
: BAUD ( n-)  SER-CTRL C@ DROP    09 80 >SER ( WR9-RESET)
   01 00 >SER ( CLR ENABLE)        04 44 >SER ( WR4-16 CLK/STOP)
   03 C1 >SER ( WR3-8BIT)          05 E8 >SER ( WR5-TX ENABLE)
   0B 56 >SER ( WR11-RX/TX CLK)  0E 80 >SER ( WR14-BR GEN ON)
   1C200 SWAP / 2- 100 /MOD
         D SWAP >SER ( HI-BAUD)  C SWAP >SER ( LO-BAUD)
   0E 83 >SER ( WR14-ENABLE BR) ;
DECIMAL   : SER-INIT 9600 BAUD ;
```

Screen # 6

```
$ Second Serial Terminal Task Support             ( PLB*03/25/86)
HEX  FD0500 CONSTANT SB-CTRL
     FD0502 CONSTANT SB-DATA
: ?@SB ( -F) SB-CTRL C@ 1 AND ;
: @SB  BEGIN PAUSE SB-CTRL C@ 1 AND UNTIL SB-DATA C@ ;
: !SB BEGIN PAUSE SB-CTRL C@ 4 AND UNTIL SB-DATA C! ;
: >SB ( addr data - ) SWAP SB-CTRL C! DUP DROP  SB-CTRL C! ;
: BD-B ( n-)  SB-CTRL C@ DROP    09 80 >SB ( WR9-RESET)
   01 00 >SB ( CLR ENABLE)       04 44 >SB ( WR4-16 CLK/STOP)
   03 C1 >SB ( WR3-8BIT)         05 E8 >SB ( WR5-TX ENABLE)
   0B 56 >SB ( WR11-RX/TX CLK)  0E 80 >SB ( WR14-BR GEN ON)
   1C200 SWAP / 2- 100 /MOD
         D SWAP >SB ( HI-BAUD)  C SWAP >SB ( LO-BAUD)
   0E 83 >SB ( WR14-ENABLE BR) ;
$ : XON/XOFF-B ?@SB IF @SB 13 = IF BEGIN @SB PAUSE 11 = UNTIL
$     THEN THEN ;
```

Screen # 7

```
$ Second Serial Terminal Task Support             ( PLB*10/15/86)
HEX   WVARIABLE (T1-KEY)      $ Holding area for key input
: NO-T1-KEY         -1 (T1-KEY) W! ;
: T1-KEY ( -c)       BEGIN ?TERMINAL UNTIL
            (T1-KEY) W@ FF AND    NO-T1-KEY ;

: T1-?TERMINAL  ( -f)    (T1-KEY) W@ FFFF =
    IF  ?@SB IF SB-DATA C@ 7F AND DUP
          13 = IF ( ^S) DROP
                  @SB DUP 11 = IF DROP NO-T1-KEY 0
                     ELSE (T1-KEY) W! 1 THEN
$                 BEGIN @SB 11 = UNTIL  NO-T1-KEY 0
               ELSE (T1-KEY) W! 1 ( return true)  THEN
      ELSE NO-T1-KEY 0 THEN  ( return false)
    ELSE 1 ( return true, key is in buffer)
    THEN ;
```

Screen # 8

```
$ Second Serial Terminal Task Support             ( PLB*01/11/87)
: (T1-TYPE) ( an-) ?DUP IF 0 DO T1-?TERMINAL DROP ( Xon/Xoff)
              DUP C@ !SB 1+ LOOP THEN DROP ;
800 TASK: TASK1       TASK1 CONSTRUCT

' (T1-TYPE)         TASK1 'TYPE    HIS !
' T1-?TERMINAL      TASK1 '?TERM   HIS !
' T1-KEY            TASK1 'KEY     HIS !
'CR @               TASK1 'CR      HIS !
'MARK @             TASK1 'MARK    HIS !
'PAGE @             TASK1 'PAGE    HIS !
'TAB @              TASK1 'TAB     HIS !
'EXPECT @           TASK1 'EXPECT HIS !
'ABORT @            TASK1 'ABORT   HIS !
'CREATE @ -TWINS      : COLD 9600  BD-B  COLD ( TASK1 PROMPT) ;
'CREATE !   $ : -TASK1   TASK1 ACTIVATE PAGE STOP ;
```

Screen # 10

Screen # 11

Load screen for SBE customization

Screen # 12

Printer output support

Goes through BIOS for maximum speed

Screen # 13

$ Time/Date support for SBE Based AI Machine

This screen contains the word to get the real-time-clock from the SBE. Other systems should conform to this convention so that the TIME.PF file is consistant.

@CLOCK should be used to set the variables shown. If something is not supported ( i.e. - the day of week ) it should be set to -1.

!CLOCK should set the RTC according to the variables shown.

This system is configured for the Diversified Technology CBX 583 Real-Time Clock/Calendar Expansion Module. Note that it is based on the 5832 Clock Chip.

Screen # 14

$ Time/Date support for SBE Based AI Machine

!CLOCK should set the RTC according to the variables shown.

Screen # 15

Serial port access words

This port is used for the serial disk support

Screen # 16

Serial port access words

This port is used for the status display activated to TASK1

Screen # 17

Status Display Port Access words

Here is the XON/XOFF support for the sloooow Visual 100

Screen # 18

TASK1 definition and support

Screen # 0

$ MAC.PF - Macintosh CP/M Customization Screens

This file is intended to be used as a customization for the Macintosh running IQ Software's CP/M 68K. This will include such utilities as serial port support, printer support, time/date support, etc.

Update Records:
<01> 11/24/85 PLB - Creation of file.

Screen # 1

```
$ MAC.PF Load Screen
START-SEGMENT .( ==> Macintosh CP/M 68K Support)
   1 TERMINAL.SCR LOAD-FROM    $ VT-100
   3 TERMINAL.SCR LOAD-FROM    $ ADM-3A
   2 3 THRU                    $ Modem port support
   4 LOAD                      $ Time/Date Support
   5 LOAD                      $ Printer Support
   6 LOAD                      $ Multitasking Terminal
   7 LOAD                      $ Heathkit RTC clock initialize
   8 LOAD                      $ Serial Disk Support
END-SEGMENT
```

Screen # 2

```
$ Macintosh AUX Port Access Words                    ( PLB*12/08/85)
HEX  CREATE AIN-PB   32 ALLOT
CODE ain#bytes   RL R -) MMOV D3 D7 \ A2 S \\
    81 # D0  MOV       4E43 W, ( TRAP 3)
    AIN-PB # A0 MOV      A005 200 + W,
    0A7C W, 2000 W,       ( 2000 SR EOR.W)
    82 # D0  MOV       4E43 W, ( TRAP 3)
    R )+ RL MMOV D3 D7 \ A2 S \\                    NEXT

CODE ain-init  RL R -) MMOV D3 D7 \ A2 S \\
    81 # D0  MOV       4E43 W. ( TRAP 3)
```

```
   AIN-PB # A0 MOV     A004 200 + W,
   0A7C W, 2000 W,     ( 2000 SR EOR.W)
   82 # D0  MOV        4E43 W, ( TRAP 3)
   R )+ RL MMOV D3 D7 \ A2 S \\              NEXT
DECIMAL
```

Screen # 3

```
$ Macintosh AUX Port Access Words                  ( PLB*12/08/85)
HEX
: #AIN-BYTES ( -n)     AIN-PB 32 ERASE
      -6  AIN-PB  18 + W!      2 AIN-PB  1A + W!
      ain#bytes   AIN-PB 1C + @ ;
'CREATE @ -TWINS
: COLD  AIN-PB 32 ERASE -6 AIN-PB 18 + W!  8 AIN-PB  1A + W!
      CC0A AIN-PB 1C + W!   ain-init COLD ;
'CREATE !
$ 300 bd->CD7C, 1200 bd->CC5F, 9600 bd->CC0A, 19200 bd->CC04

: H-?TERM ( -f)  #AIN-BYTES ;
: H-KEY ( -c) BEGIN ?TERMINAL UNTIL 0 7 BIOS ;
: H-TYPE ( a n-) ?DUP IF
   PAUSE 0 DO  DUP C@ 6 BIOS DROP 1+ LOOP THEN DROP ;
```

Screen # 4

```
$ Time/Date support for Macintosh
WVARIABLE <YEAR>                    WVARIABLE <MONTH>
WVARIABLE <DAY>                     WVARIABLE <HOURS>
WVARIABLE <MINUTES>                 WVARIABLE <SECONDS>
WVARIABLE <DOW>

HEX   CREATE BPB 00BE W, 0 , 0 ,
: @CLOCK   BPB 32 BDOS  >R
     R@      W@      <YEAR> W!       R@ 2+  W@     <MONTH> W!
     R@ 4 + W@       <DAY> W!        R@ 6 + W@     <HOURS> W!
     R@ 8 + W@       <MINUTES> W!    R@ A + W@     <SECONDS> W!
     R> C + W@ 1-    <DOW> W! ;

: !CLOCK CR  1 ABORT" Can't set the Macintosh Clock" ;
```

Screen # 5

```
$ CP/M Printer Drivers                              ( PLB*12/08/85)
HEX
: (P-TYPE)  ( addr cnt - )
   ?DUP IF
 0 DO PAUSE  DUP C@  5 BDOS DROP 1+ LOOP THEN DROP ;
```

Screen # 6

```
$ Macintosh Multitasking Terminal Support         ( PLB*12/08/85)
$ : (MAC-TYPE)   ( ADDR COUNT - )
$    PAUSE ?DUP IF 0 DO DUP C@ 6 BDOS DROP 1+ LOOP THEN DROP ;
800 TASK: TASK1 TASK1 CONSTRUCT ' (EXPECT)  TASK1 'EXPECT HIS !
  CREATE MAC-CON   28 ALLOT        CREATE H-CON  28 ALLOT
   ' (TYPE) 'TYPE !    ADM3     'CR   MAC-CON  28 CMOVE

' H-KEY 'KEY !    ' H-TYPE  'TYPE !    ' H-?TERM '?TERM !
   VT-100 'CR  H-CON 28 CMOVE        MAC-CON  'CR 28 CMOVE
: PROMPTS     OPERATOR PROMPT     TASK1 PROMPT ;
: MAC>OPR    MAC-CON  OPERATOR 'CR HIS 28 CMOVE
             H-CON    TASK1    'CR HIS 28 CMOVE PROMPTS ;
: TERM>OPR  H-CON    OPERATOR 'CR HIS 28 CMOVE
             MAC-CON  TASK1    'CR HIS 28 CMOVE PROMPTS ;
'CREATE @ -TWINS  : COLD COLD TERM>OPR ; 'CREATE !
: -TASK1      MAC>OPR   TASK1 ACTIVATE STOP ;
```

Screen # 7

```
$ Heathkit H-29 25th line clock set routine      ( PLB*12/15/85)
DECIMAL
: .hms ( end-char  a - )  W@ <# # # #> TYPE   EMIT ;
'CREATE @ -TWINS
: COLD    COLD DECIMAL   27 EMIT @CLOCK 91 EMIT
      59  <HOURS>    .hms      59 <MINUTES> .hms
      123 <SECONDS> .hms ;
'CREATE !
```

Screen # 8

```
$ MAC                                              ( PLB*12/30/85)
$ SERIAL DISK SUPPORT
DECIMAL
$ MODIFY FOR BIOS CALLS !!!!!
: @SER 0 7 BIOS ;
: ?@SER #AIN-BYTES ;
: !SER 6 BIOS DROP ;
: SER-INIT -TASK1 ;  $ READ EXTRA INPUT HERE
```

Screen # 10

Screen # 11

Screen # 12

Screen # 13

Screen # 14

```
$ Time/Date support for Macintosh

This screen contains the word to set the real-time-clock from
  the MAC. Other systems should conform to this convention
  so that the TIME.PF file is consistant.

@CLOCK should be used to set the variables shown. If something
   is not supported ( i.e. - the day of week ) it should
   be set to -1.

!CLOCK sets the clock according to the variables shown.
```

Screen # 15

Screen # 16

Screen # 17

Screen # 18

Screen # 0

```
$ XFER.SCR - Serial Disk transfer routines
```

Screen # 2

```
$ HOST
HEX
: CHECK-SUM ( N-) FFFF AND @SER 100 * @SER + = NOT
    ABORT" Checksum Error" ;
: WRITE-BLK# ( BLK# -)   100 /MOD !SER !SER ;
: READ-BLK ( ADDR-) 0 !SER 0 SWAP 400 OVER + SWAP
    DO @SER DUP I C! + LOOP CHECK-SUM ;
: WRITE-BLK ( ADDR-) @SER DROP  0 SWAP 400 OVER + SWAP
   DO I C@ DUP !SER + LOOP CHECK-SUM ;

: >OTHER ( F- ) !SER FILE# @ 7F AND !SER ;
```

```
: CK-RANGE ( B# A-B# A) OVER DUP <MAXBLK> @ > SWAP 0< OR
      ABORT" Serial Disk - Block Number out of range" ;
: H-RD ( B# A) CK-RANGE SWAP 22 >OTHER WRITE-BLK# READ-BLK ;
: H-WR ( B# A) CK-RANGE SWAP 33 >OTHER WRITE-BLK# WRITE-BLK ;
```

Screen # 4

```
$ SERIAL
HEX
: READ-BLK# ( -n)  @SER 100 * @SER + ;
: READ-BLK  ( ADDR-CKSUM) 0 !SER   0 SWAP 400 OVER + SWAP
    DO @SER DUP I C! + LOOP ;
: WRITE-BLK ( ADDR-CKSUM) @SER DROP  0 SWAP 400 OVER + SWAP
   DO I C@ DUP !SER + LOOP ;
: WRITE-CKSUM ( N-) 100 /MOD !SER !SER ;
```

Screen # 6

```
$ SERVER
HEX
: SER-SERVER SER-INIT DECIMAL (CLS-SCR) -1 FILE# !
   BEGIN   BEGIN CTRL-Y ?@SER UNTIL
     @SER
     DUP 11 = IF SERVER-FILE-SIZE DROP 0 THEN
     DUP 22 = IF SERVER-HOSTREAD  DROP 0 THEN
     DUP 33 = IF SERVER-HOSTWRITE DROP 0 THEN
     ?DUP IF CR ." Illegal Command -> " . THEN
   AGAIN ;
```

Screen # 0

```
$ TOKEN.PF - Token Package for AI Machine         ( PLB*02/03/86)

This is the token package that runs under PolyForth CP/M-68K.
   A FORTH dictionary-like structure is used to store the token
     values. Note that 32 threads are used to chain the linked
     lists for speed considerations.

<01> 02/04/86 PLB -- Changed package to add tokens to the top
                       of memory growing down.
```

Screen # 1

```
$ Load Screen for Token Package                        ( PLB*11/18/86)
DECIMAL
START-SEGMENT .( ==> AI Machine Token Package )

          3 8      THRU
DEBUG?    9        ?LOAD       $ Token Test Words

END-SEGMENT
```

Screen # 2

```
$ Token Package for rule processors                  ( PLB*11/18/86)

HEX
: TOKEN-NUM? ( token - f )  0< ;
: TOKEN># ( token - n )   7FFFFFFF AND DUP 40000000 AND 2* OR ;
```

Screen # 3

```
$ Token Package - Constants, Etc.                    ( PLB*03/16/87)
DECIMAL

VARIABLE TOKEN-PTR                    $ Downward growing pointer
32 4* ARRAY TOK-LINKS                 $ 32 threads to tokens !!
VARIABLE 'TOKEN-COUNT                 $ Counter of string tokens

TOK-LINKS CONSTANT INITIAL-TOK-PTR
16384          CONSTANT    #token-bytes
#token-bytes   ARRAY       tokens
: INIT-TOKEN   0 'TOKEN-COUNT !
    TOK-LINKS 128 ERASE   INITIAL-TOK-PTR TOKEN-PTR ! ;
INIT-TOKEN

: @TOKEN-BYTES ( -#bytes) INITIAL-TOK-PTR TOKEN-PTR @ - ;
: @TOKEN-COUNT ( -n)  'TOKEN-COUNT @ ;
```

Screen # 4

```
$ Token Package - Numerics                           ( PLB*01/11/87)
HEX
     $ TOKEN-NUM? - returns true if numeric token
: TOKEN-NUM? ( token - f )  0< ;
: TOKEN)# ( token - n )   7FFFFFFF AND DUP 40000000 AND 2* OR ;
: #>TOKEN ( n - token )   80000000 OR ;
DECIMAL

: (NUM)   -1025 PTR W!  DUP 1+ C@ 45 = DUP >R  +
   0. SWAP  BEGIN  CONVERT DUP C@  DUP 44 48 WITHIN DROP 0
     SWAP 46 =
            + WHILE  0 PTR W!  REPEAT  C@ 32 - ( ABORT" ?")
   IF  R> DROP DROP  0 EXIT THEN   $ ADDED 11/24/85 PLB
   R> IF  NEGATE  THEN 1 ;
```

Screen # 5

```
$ Token Package - T-HASH, T-FIND                     ( PLB*12/27/85)
HEX $ T-HASH ( $ - $ link-addr) hash on first character
CODE T-HASH   S ) A0 MOV $  D0 CLR   A0 ) D0 B. MOV  D0 D1 MOV
$     1 # D0 LSR     D0 A0 ADD   A0 ) D0 3. MOV  D1 D0 ADD
   A0 ) D0 W. MOV  D0 D1 MOV  8 # D1 LSR  D1 D0 ADD
 1F # D0 AND  2 # D0 LSL  TOK-LINKS # D0 ADD  D0 S -) MOV  ,NEXT
$ T-FIND ( $ link-addr - token or 0 ) $ Used by Literalize also
$ D0 - link-addr, D1 - $-addr, D2 - char-count
CODE T-FIND   S )+ D0 MOV         S )+ D1 MOV        D1 A0 MOV
              D2 CLR              A0 ) D2 B. MOV     1 # D2 LSR
  BEGIN       D0 A0 MOV           A0 ) D0 MOV
     0= IF   D0 S -) MOV          ,NEXT              THEN
     D2 D3 MOV    D1 A1 MOV       D0 A0 MOV      A0 )+ TST
     BEGIN   A1 )+   A0 )+    W. CMP    D3 0= DBCC
   D3 W. TST         0< UNTIL
   4 #Q D0 ADD       D0 S -) MOV     ,NEXT
```

Screen # 6

```
$ Token Package - TOKEN?                             ( PLB*01/11/87)
HEX
: TOKEN? ( $ - 0 or token )
     DUP (NUM)
     IF    $ Numeric !!!!!!
         #>TOKEN SWAP DROP
     ELSE    $ String Token !!!!!!
         DUP DUP C@ 1+ + 20 SWAP C!  $ Space at end !!
         T-HASH T-FIND
     THEN ;

$ : $TOKEN? ( $ - 0 or token )
$      $ String Token !!!!!!
$          DUP DUP C@ 1+ + 20 SWAP C!  $ Space at end !!
$          T-HASH T-FIND ;
```

Screen # 7

```
$ Token Package - $>TOKEN                            ( PLB*02/15/87)
HEX
: T-ADD ( $ link-addr - token ) 'TOKEN-COUNT TALLY
    OVER C@ 2+ -2 AND DUP >R 4+    NEGATE TOKEN-PTR +!
    DUP @ TOKEN-PTR @ !      TOKEN-PTR @ SWAP !
    TOKEN-PTR @ 4+   R> WMOVE
    TOKEN-PTR @ 4+ ;

: $>TOKEN ( $ - token ) DUP TOKEN? ?DUP
     IF SWAP DROP    $ String token found !!!
     ELSE            $ String token not found, add it !!!
```

```
         T-HASH T-ADD THEN ;
$ : $$>TOKEN ( $ - token ) DUP $TOKEN? ?DUP
$       IF SWAP DROP    $ String token found !!!
$       ELSE            $ String token not found, add it !!!
$           T-HASH T-ADD THEN ;
```

Screen # 8

```
$ Token Package - TOKEN>$                            ( PLB*12/23/85)
DECIMAL

: TOKEN>$ ( token - $ )   DUP TOKEN-NUM?
     IF    $ Numeric Token
        TOKEN># (.) PAD 1+ SWAP DUP PAD C! CMOVE PAD
    THEN ;   $ String Token needs no translation !!

: .TOKEN ( token-)  TOKEN>$ COUNT TYPE ;
```

Screen # 9

```
$ TEST WORDS                                         ( PLB*02/03/86)
CREATE A$ 40 ALLOT
: TOK-TEST ( N-) 0 DO CR ." INPUT A TOKEN --> "
     A$ 40 $IN
     A$ $>TOKEN  ."    TOKEN VALUE --> " BASE @ SWAP HEX
      U. BASE ! LOOP  CR CR ." TOKENS -> " @TOKEN-COUNT  .
      CR ." TOKEN BYTES -> " @TOKEN-BYTES  . CR ;
: TOK-TEST1 ( N-) 0 DO 7 A$ C!  I A$ 4 + ! 65 A$ 1+ C!
     A$ $>TOKEN DROP LOOP ;
: #TOK-IN-LINK ( n-)  4* TOK-LINKS +
     -1 SWAP   BEGIN  @ SWAP 1+ SWAP   DUP 0= UNTIL DROP ;
: .TOK#LINK CR   32 0 DO  I #TOK-IN-LINK . LOOP ;

: .THREAD ( n-) 31 AND  4* TOK-LINKS +
    BEGIN @ DUP WHILE DUP CR 4+ COUNT TYPE REPEAT CR DROP ;
```

Screen # 1

```
$ Load Screen for Serial Disk Support
DECIMAL

2 6 THRU

CR CR .( Type - SER-HOST or SER-SERVER on each computer ) CR CR
```

Screen # 3

```
$ HOST
DECIMAL
: OTHER ( N-N) 128 + ;
: [FILE] ( BLK# ADDR CODE - )  FILE# @ 128 < IF (FILE) ELSE
    DUP 33 = IF DROP H-RD 0 THEN
    DUP 34 = IF DROP H-WR 0 THEN
    ABORT" Wrong Function Code " THEN   ;

HEX
: [OPEN]  ( N-) FLUSH DUP 80 < IF <OPEN> ELSE DUP FILE# !
      7F AND  11 !SER !SER
     @SER 100 *    @SER +     <SHADOW> !
     @SER 100 *    @SER +     <MAXBLK> ! THEN ;

: SER-HOST SER-INIT ['] [OPEN] 'OPEN ! ['] [FILE] 'FILE ! BILD ;
```

Screen # 5

```
$ SERVER
HEX
: SERVER-FILE-SIZE  @SER ( FILE# )     OPEN
      SHADOWS 100 /MOD !SER !SER
      <MAXBLK> @ 100 /MOD !SER !SER ;

: .HOST-RD ( N-N) DUP CR ." Reading Block # " 3 U.R ."  in "
     .PFFILE ;
: .HOST-WR ( N-N) DUP CR ." Writing Block # " 3 U.R ."  in "
     .PFFILE ;
```

```
: SERVER-HOSTREAD @SER FILE# @ = NOT ABORT" Not the same file"
  READ-BLK# .HOST-RD BLOCK WRITE-BLK FLUSH WRITE-CKSUM ;

: SERVER-HOSTWRITE @SER FILE# @ = NOT ABORT" Not the same file"
  READ-BLK# .HOST-WR BUFFER READ-BLK UPDATE FLUSH WRITE-CKSUM ;
```

Screen # 7

```
$ Simple Terminal Program
DECIMAL

: TERM    SER-INIT
    BEGIN
      ?TERMINAL IF KEY DUP 25 = ABORT" End of Session"
               !SER THEN
      ?@SER  IF @SER EMIT THEN
    AGAIN ;
```

Screen # 12

```
$ THINGS TO DO !!!                                  ( PLB*12/23/85)

$ FIX (NUM) 0 THAT IT DOES NOT ASSIGN NULL STRING A VAL OF 0
$ FIX FOR FLOATING POINT PACKAGE
```

Screen # 13

Load Screen for token package

Screen # 14

Token support for rule processors. The RP's have to be able
to retreive a number given a numeric token. Likewise,
they have to be able to see if a token is numeric or not !!

Screen # 15

Token Package - Constants, Etc.

TOKEN-PTR points to the end of the next token to be added
TOK-LINKS are the links to the token linked list
'TOKEN-COUNT counts the string tokens INITIAL-TOK-PTR calculates the start of the token area INIT-TOKEN initializes the token package @TOKEN-BYTES returns the number of bytes used in string tokens
@TOKEN-COUNT returns number of string tokens

Screen # 16

Token Package - Numerics                        ( PLB*01/11/87)

TOKEN-NUM? returns true if token is a numeric token
TOKEN>\# converts a numeric token into a 32 bit integer
\#>TOKEN converts a 32 bit integer into a numeric token (NUM) was taken from the original PolyFORTH system to
convert numeric strings to integers.

```
: (NUM)   -1025 PTR W!  DUP 1+ C@ 45 = DUP >R  +
   0.  SWAP  BEGIN  CONVERT DUP C@  DUP 44 48 WITHIN
      SWAP 58 =  + WHILE  0 PTR W!  REPEAT  C@ 32 - ( ABORT" ?")
   IF  R> DROP DROP  0 EXIT THEN   $ ADDED 11/24/85 PLB
   R> IF  NEGATE  THEN ! ;
```

Screen # 17

```
$ Token Package - T-HASH, T-FIND                    ( PLB*12/26/85)
9 LOAD ( WCOMPARE)
HEX  VARIABLE  STR-ADDR         VARIABLE STR-CNT
$ T-HASH ( $ - $ link_addr) hash on first character
: T-HASH   DUP W@ IF AND 4* TOK-LINKS + ;

: T-FIND ( $ link_addr - token or 0 ) SWAP DUP STR-ADDR !
    C@ 2+ -2 AND STR-CNT !    $ STORE ADDR & COUNT
    BEGIN @ DUP 0= IF DROP 0 EXIT THEN
       DUP 4+ STR-ADDR @   STR-CNT @   WCOMPARE
    UNTIL 4+ ;
```

T-HASH calculates the link address given a string value
T-FIND searches the linked token list and returns the token
value if the string has been tokenized or 0 if it
hasn't been tokenized yet.

Screen # 18

Token Package - TOKEN?

TOKEN? tries to convert a string into a numeric or a string
token. Returns 0 if the string token has not been
tokenized yet.

Screen # 19

```
$ Token Package - $>TOKEN                           ( PLB*12/27/85)
: T-ADD ( $ link-addr - token # of bytes ) 1 TOKEN-COUNT +!
    OVER  HERE 4+  OVER C@ 1+  DUP >R CMOVE
    20  R> HERE 4+ +  C!   $ Move string to HERE
    ( stack -> $ link_addr )
    SWAP DROP
    DUP @ HERE !      HERE SWAP !
    HERE 4+ ( token)
    DUP C@ 3 + -2 AND 4+ DUP   TOKEN-BYTES +! ;
: $>TOKEN ( $ - token ) DUP TOKEN? ?DUP
       IF SWAP DROP   $ String token found !!!
       ELSE           $ String token not found, add it !!!
          T-HASH T-ADD ALLOT   THEN ;
```

T-ADD adds a string to the tokenized string list
$>TOKEN tries to tokenize a string. If a string token has not
been created, this word will create it.

Screen # 20

Token Package - TOKEN>$

TOKEN>$ converts a token into a string

```
.TOKEN prints a token
```

Screen # 21

```
Test words for token package
```

Screen # 0

```
HOST.PF — AI Machine Host Customization        ( PLB*01/07/86)

Update Records :

<01> 01/07/86 PLB  -  Creation of Host Interface Package
<02> 05/14/86 PLB  -  Documentation


This file contains the actual link between the software
    and the Interface Board as well as the Cell Boards
```

Screen # 1

```
$ HOST.PF Load Screen                           ( PLB*11/22/86)

START-SEGMENT .( ==> AI Machine Host Customization)

64 WCONSTANT #RP    $ Maximum number of rule processors

#RP ARRAY RP-CONFIG-TAB

 2 17 THRU          $ Hardware Access
18 LOAD             $ SEND DATA TO INDIVIDUAL RP'S
19 20 THRU          $ Send data over network
END-SEGMENT
```

Screen # 2

```
$ Address Constants for Interface Board          ( PLB*11/07/85)
HEX   C00000 CONSTANT NETWORK
      C80000 CONSTANT WINDOW1
      D00000 CONSTANT WINDOW2
      D80000 CONSTANT W1-OUT
      D80008 CONSTANT W2-OUT
      D80010 CONSTANT INT-OUT
      D80018 CONSTANT RST-OUT
      D80020 CONSTANT PIT0
      D80022 CONSTANT PIT1
      D80024 CONSTANT PIT2
      D80026 CONSTANT PITCTL
      D80028 CONSTANT SPR-OUT
      D80038 CONSTANT STATUS-IN
      D80038 CONSTANT BIT-OUT
      DC0000 CONSTANT CELLSTAT-IN      DECIMAL
```

Screen # 3

```
$ Cell Board and IF Board Access words           ( PLB*10/29/86)
HEX CODE >NET  NETWORK # S ) OR    NEXT     $ >NET ( a-a)
    CODE >W1   WINDOW1 # S ) OR    NEXT     $ >W1  ( a-a)
    CODE >W2   WINDOW2 # S ) OR    NEXT     $ >W2  ( a-a)
CODE !W1   S )+ D0 MOV   D0 W1-OUT AB W. MOV   NEXT $ !W1 ( n-)
CODE !W2   S )+ D0 MOV   D0 W2-OUT AB W. MOV   NEXT $ !W2 ( n-)
: !PIT0 ( n-) PIT0    W! ;
: !PIT1 ( n-) PIT1    W! ;
: !PIT2 ( n-) PIT2    W! ;
: !PITC ( n-) PITCTL  W! ;

: EX-NEXT -' IF NUMBER ELSE DROP EXECUTE THEN ;
: ~NET  EX-NEXT >NET [COMPILE] LITERAL ; IMMEDIATE
: ~W1   EX-NEXT >W1  [COMPILE] LITERAL ; IMMEDIATE
: ~W2   EX-NEXT >W2  [COMPILE] LITERAL ; IMMEDIATE
```

Screen # 4

```
$ Cell Board and IF Board Access words           ( PLB*04/03/86)
HEX
: +REF                 0D00 BIT-OUT W! ;
: -REF                 0C00 BIT-OUT W! ;
: CLR-REQ-BITS  #RP 0 DO I RP-CONFIG-TAB + DUP C@ 3 AND
    SWAP C! LOOP NEW-RP-STAT ;
: PULSE-INIT           0A00 BIT-OUT W! +REF CLR-REQ-BITS ;
: PULSE-PIT-LOCK       0900 BIT-OUT W! ;
: PULSE-CLRINT         0B00 BIT-OUT W! ;
: REF-COUNTS ( n-)     36 !PITC  100 /MOD SWAP !PIT0 !PIT0 ;
: REF-CYCLES ( n-)     72 !PITC  100 /MOD SWAP !PIT1 !PIT1 ;

DECIMAL  'CREATE @ -TWINS     $ 1552/16 @ 25MHZ
: COLD  PULSE-INIT     1552 REF-COUNTS 16 REF-CYCLES COLD ;
: BYE   PULSE-INIT     BYE ; RECOVER
'CREATE !
```

Screen # 5

```
$ Rule Processor RUN/HALT words                  ( PLB*04/07/87)
HEX
: @IF-STATUS    ( -n)     STATUS-IN W@ ;
: @CELL-STATUS ( -n)     -REF CELLSTAT-IN W@ +REF ;
: RP-ON/OFF ( addr n - ) -REF RST-OUT W!   W-OFF
    RST-OUT W-OFF +REF ;
: RP-HALT ( n-)         !W2 WINDOW2 200 RP-ON/OFF ;
: ALL-HALT                  NETWORK 200 RP-ON/OFF ;

$ : RP-COMPLETE? ( -f)  @IF-STATUS 8000 AND NOT NOT ;
CODE RP-COMPLETE? D0 CLR STATUS-IN AB D0 W. MOV
  8000 # D0 AND 0= NOT IF 1 # S -) MOV ELSE S -) CLR THEN ,NEXT
VARIABLE TICKS
: WAIT-FOR-RP-COMPLETE BEGIN TICKS TALLY TICKS @ ~NET <TICKS> !
                             CTRL-Y RP-COMPLETE? UNTIL ;
```

Screen # 6

```
$ Rule Processor Signal Words                    ( PLB*10/29/86)

: RP-INTERRUPT      -REF  7 INT-OUT W!
    8 0 DO LOOP     INT-OUT W-OFF   +REF ;
$ '6 0 DO LOOP' SEEMS TO BE THE SMALLEST DELAY TIME ABOVE

: ALL-SIGNAL ( n-)  ~NET <INTR-CMD> W!      RP-INTERRUPT ;

: RP-SIGNAL ( rp# n - )
    ~NET <INTR-CMD> W-OFF   SWAP !W1   ~W1 <INTR-CMD> W!
    RP-INTERRUPT ;
```

Screen # 7

```
$ PIT Timer 2 Read Words                         ( PLB*11/21/85)
$ CAUTION: This will not work if the PIT has been locked !!!!
$ Timer 2 is being clocked with a 381.469 Hz clock !!!!!
HEX
: PIT2-C@ ( -n)  PIT2 W@ FF AND ;
: START-TIMER  B0 !PITC  FF !PIT2   FF !PIT2 ;
: @TIMER ( N) 80 !PITC 10000 PIT2-C@ PIT2-C@ 100 * + - ;
  DECIMAL
: MS ( N-)  START-TIMER  381 * 1000 /
      BEGIN @TIMER 3 < UNTIL
      BEGIN CTRL-Y DUP @TIMER < UNTIL DROP ;
: @MS ( -N)  @TIMER 1000 * 381 / ;
: .END-TIME @TIMER 381 /MOD
    3 U.R ." Seconds, " 1000 * 381 / 3 U.R ." ms."  ;
```

Screen # 8

```
$ RP FORTH Image SAVE and RESTORE                    ( PLB*03/16/86)
HEX     $ create filename table
CREATE [RP-KERNEL]  00525048 , 45524E45 , 4C494D47 ,
CREATE [RP-FORTH]   00525046 , 4F525448 , 20494D47 ,
DECIMAL
: RP-RESTORE ( addr-of-filename  addr-of-target - )
     @FCB1   SWAP FCB1 12 MOVE
     DUP <TICKS> 0 #LFILL      $ zero up to non-inited area
     FCB1 F-OPEN ABORT" RP-RESTORE File Open Failure"
     BEGIN  PAUSE
       DUP F-DMA   128 +
       FCB1 F-READ-SEQ
     UNTIL DROP ;
```

Screen # 9

```
$ Rule Processor initialization                      ( PLB*10/29/86)
DECIMAL
: IDENTIFY-RP   #RP 0 DO  I !W2  I ^W2 RP-# W!  LOOP ;

: (RP-INIT) ( filename-addr - )
     PULSE-INIT   0 !W1 0 !W2
     NETWORK RP-RESTORE          IDENTIFY-RP ;

: LOAD-RP-KERNEL  [RP-KERNEL]  (RP-INIT) ;
: LOAD-RP-FORTH   [RP-FORTH]   (RP-INIT) ;
```

Screen # 10

```
$ Rule Processor Initialization                      ( PLB*10/29/86)
HEX
: RP-AVAILABLE? ( n-f) RP-CONFIG-TAB + C@ 1 AND ;
: RP-ONLINE?    ( n-f) RP-CONFIG-TAB + C@ 2 AND 2/ ;
: RP-REQUEST?   ( n-f) RP-CONFIG-TAB + C@ 4 AND 4/ ;

: ALL-RUN  ALL-HALT  NETWORK  100 RP-ON/OFF ;

: RP-START ( pr# command-code - )   OVER !W2 SWAP RP-HALT
    ^W2 <BOOT-CMD> W!      WINDOW2 100 RP-ON/OFF ;

: ALL-START ( command-code - )  ALL-HALT     ^NET <BOOT-CMD> W!
    #RP 0 DO I RP-ONLINE? IF I !W2 WINDOW2 100 RP-ON/OFF THEN
         LOOP ;
```

Screen # 11

```
$ Automatic RP Configuration                         ( PLB*11/21/96)
HEX
: GET-RP-CONFIGURATION
      ALL-HALT  4 ^NET <BOOT-CMD> W!  NETWORK 100 RP-ON/OFF
      WAIT-FOR-RP-COMPLETE
      #RP 0 DO
         I !W2    ( Select RP)
         ^W2 <BOOT-CMD> W@
         1234 = IF 3 ( available & on-line) ELSE 0 THEN
         I RP-CONFIG-TAB +   C!   ( Store in table)
      LOOP PULSE-INIT ;
: RP-ENABLE ( rp#-) RP-CONFIG-TAB + DUP C@ 1 AND
   IF 3 SWAP C! ELSE DROP THEN NEW-RP-STAT ;
: RP-DISABLE ( rp# - )  DUP !W2 ^W2 <RP6>  [ <TICKS> <RP6> - ]
   LITERAL ERASE        DUP RP-HALT   RP-CONFIG-TAB + DUP
   C@ 1 AND SWAP C! NEW-RP-STAT ;
```

Screen # 12

```
$ Automatic RP Configuration                         ( PLB*05/27/96)

: FIRST-RP ( -n) #RP 0 DO
       I RP-ONLINE? IF I R> R> 2DROP EXIT THEN
       LOOP 0 ;   $ Return '0' if no RP's on-line !!!!

: #RP-ONLINE ( -n)    0
       #RP 0 DO I RP-ONLINE? + LOOP ;
```

Screen # 13

```
$ Simple Diagnostic Routine                          ( PLB*11/08/86)
DECIMAL
: BLINK   ( host-blink-delay  rp-common  rp-specific - )
    PULSE-INIT
    ^NET <RP2> !    1 MAX ^NET <RP1> !
    ^NET <RP3> OFF
    1 MAX        $ Host Blink Delay
    16 ALL-START  WAIT-FOR-RP-COMPLETE
        BEGIN
            20 ALL-SIGNAL
            WAIT-FOR-RP-COMPLETE
            DUP 0 DO CTRL-Y LOOP
        AGAIN ; RECOVER
```

Screen # 14

```
$ RP Status Request Service                          ( PLB*10/29/86)
HEX
: CLR-CELLBD-REQ-LATCH
    200 RST-OUT W!  @CELL-STATUS DROP RST-OUT W-OFF ;

: REQUEST? ( -f ) @IF-STATUS 10 AND IF
    #RP 0 DO I !W2   ^W2 <SERVER-CMD> W@
       24 = 4*    RP-CONFIG-TAB I + DUP >R C@ 3 AND OR R> C!
       CLR-CELLBD-REQ-LATCH
    LOOP
    PULSE-CLRINT      $ Clear Req FF on IF Board
    1 ELSE 0 THEN ;
```

Screen # 15

```
$ Debug mode support                                 ( PLB*10/29/86)
DECIMAL

WVARIABLE BUG-MODE
: BUG-ON    ^NET <DEBUG> W-ON  BUG-MODE W-ON  NEW-HOST-STAT ;
: BUG-OFF   ^NET <DEBUG> W-OFF BUG-MODE W-OFF NEW-HOST-STAT ;
```

Screen # 16

```
$ Cell Run Status                                    ( PLB*10/30/86)

CREATE RUN-TAB      1 C,   2 C,   4 C,   8 C,

: RP-RUNNING? ( n-f )     DUP !W1
   @CELL-STATUS SWAP 3 AND RUN-TAB + C@ AND     NOT NOT ;

: RP-HALTED? ( n-f )  DUP !W1
   @CELL-STATUS SWAP 3 AND RUN-TAB + C@ AND    NOT ;

EXIT
: TEST BEGIN CTRL-Y 4 RP-RUNNING? IF ." RUN" CR THEN AGAIN ;
: HTEST BEGIN CTRL-Y 4 RP-HALTED? IF ." HALT" CR THEN AGAIN ;
: BTEST BEGIN CTRL-Y 4 RP-RUNNING? CR IF ." RUN" ELSE ." HALT"
   THEN AGAIN ;
```

Screen # 17

```
$ RP allocation words                                ( PLB*04/19/87)

WVARIABLE (RP-CNT)                  $ RP Counter
WVARIABLE (RP-#LHS)
$ : INIT-NEXT-RP  [ #RP 1- ] LITERAL (RP-CNT) W! ;
: CURRENT-RP ( - rp# ) (RP-CNT) W@ ;

$ $: NEXT-RP ( - rp# )     (RP-CNT) W@
$    #RP 0 DO 1+ #RP MOD DUP RP-ONLINE? IF LEAVE THEN LOOP
$    DUP (RP-CNT) W! ;
HEX
: NEXT-RP ( - rp# )   -1 (RP-CNT) W! -1 (RP-#LHS) W!
    BEGIN PAUSE #RP 0 DO I RP-ONLINE?  I RP-HALTED? AND
    IF I !W1 ^W1 <LOAD-FCT> @ (RP-#LHS) W@ OVER > IF
    I (RP-CNT) W! (RP-#LHS) W! ELSE DROP THEN THEN LOOP
    (RP-CNT) W@ FFFF = NOT UNTIL (RP-CNT) W@ ;
```

Screen # 18

```
$ Rule Processor Send Words                          ( PLB*01/29/87)
VARIABLE RP-HERE                $ Pointer to RP buffer
    SIZE-OF-NET ARRAY  NET-ARRAY
: WAIT-FOR-RP-HALT BEGIN CTRL-Y CURRENT-RP RP-HALTED? UNTIL ;
```

```
: INIT-RP,  NET-ARRAY RP-HERE !   ( WAIT-FOR-RP-HALT) ;
: ,RP ( n- )  RP-HERE @   !   RP-HERE 4TALLY ;
: W,RP ( n- ) RP-HERE @   W!  RP-HERE 2TALLY ;
: SEND-TO-RP     0 W,RP ( end) WAIT-FOR-RP-HALT
   NET-ARRAY "W1 <NETWORK>   RP-HERE @ NET-ARRAY - WMOVE
   CURRENT-RP 24 RP-SIGNAL
      NET-ARRAY RP-HERE ! ;

: ?SEND-RP ( #bytes - ) RP-HERE @ + [ NET-ARRAY SIZE-OF-NET +
   4- ] LITERAL >  IF SEND-TO-RP THEN ;
```

Screen # 19

```
$ Network Transmission Words                        ( PLB*12/16/86)
VARIABLE NET-HERE
: INIT-NET,  NET-ARRAY NET-HERE ! ;
$ W,NET ( n-)
CODE W,NET  S )+ D0 MOV  NET-HERE AB A0 MOV  D0 A0 ) W. MOV
   2 #Q NET-HERE AB ADD ,NEXT

: SEND-TO-NET WAIT-FOR-RP-COMPLETE
   0 W,NET ( end of stream)
   NET-ARRAY   "NET <NETWORK>
      NET-HERE @ NET-ARRAY - 2+ -4 AND MOVE
   24 ALL-SIGNAL  NET-ARRAY NET-HERE ! ;
```

Screen # 20

```
$ Network Transmission Words                        ( PLB*11/30/86)
$ ,NET ( n-)
CODE ,NET  S )+ D0 MOV  NET-HERE AB A0 MOV  D0 A0 ) MOV
   4 #Q NET-HERE AB ADD ,NEXT
$ ?SEND-NET ( #bytes - )
CODE ?SEND-NET   S )+ D0 MOV   NET-HERE AB D0 ADD
   NET-ARRAY SIZE-OF-NET + 4- # D0 SUB
   0> IF [[ SEND-TO-NET ]] THEN ,NEXT
$ MOV-TO-NET ( from #bytes - )
CODE MOV-TO-NET S )+ D0 MOV  S )+ A0 MOV  NET-HERE AB A1 MOV
   2 # D0 LSR   1 #Q D0 SUB 0< NOT IF
   BEGIN A0 )+ A1 )+ MOV D0 DBRA THEN A1 NET-HERE AB MOV ,NEXT

HEX
: ?SEND-TO-NET NET-HERE @ NET-ARRAY -
   IF 2 ?SEND-NET 80 W.NET SEND-TO-NET THEN ;
```

Screen # 30

Screen # 31

Host Interface Load Screen

#RP is the number of rule processors that can be put in the system

RP-CONFIG-TAB is the status table for the rule processors There is one byte for each rule processor

Screen # 32

```
$ Address Constants for Interface Board            ( PLB*11/07/85)
```

512K Write-Only Network
512K Window 1
512K Window 2
Window 1 Select Port
Window 2 Select Port
RP Cell Interrupt Port
Cell Reset & Host Int Enable
PIT Timer 0
PIT Timer 1
PIT Timer 2
PIT Control Port
Spare Output Port
IF Status Input Port
Bit set Output Port
Cell Board Status Port

Screen # 33

Cell Board and IF Board Access words

>NET converts an offset into a R/O network address
>W1 converts an offset into a R/W Window1 address
>W2 converts an offset into a R/W Window2 address !W1 selects processor that Window1 accesses will address
!W2 selects processor that Window2 accesses will address !PIT0 stores a number into PIT timer 0
!PIT1 stores a number into PIT timer 1
!PIT2 stores a number into PIT timer 2
!PITC stores a number into PIT control word

Screen # 34

Cell Board and IF Board Access words

@IF-STATUS gets IF Board status
@CELL-STATUS gets Cell Board status
+REF enables refresh
-REF inhibits refresh
PULSE-INIT resets all rule processor and IF status latches
PULSE-PIT-LOCK disables further accesses to PIT
PULSE-CLRINT clears interrupt latches
REF-COUNTS defines time period between refresh bursts
REF-CYCLES defines number of refresh cycles per burst Redefine COLD to start refresh
Redefine BYE to stop all processors upon exit to CP/M-68K

Screen # 35

Rule Processor RUN/HALT words

RP-ON/OFF is used to properly enable or disable any or all processors
RP-HALT is used to halt an individual processor
ALL-HALT is used to halt all rule processors RP-COMPLETE? returns a true flag if all rule processors are halted
WAIT-FOR-RP-COMPLETE waits for all rule processors to complete

Screen # 36

Rule Processor Signal Words

RP-INTERRUPT is used to properly interrupt rule processors Note that level 7 interrupts are used to allow the HOST to interrupt RP's even though they may be running already.

ALL-SIGNAL interrupts all rule processors given a command vector
RP-SIGNAL interrupts all rule processors. However, only the selected rule processor is given a vectored command number and the other rule processors will be interrupted and return from exception. Thus, effectively only the selected rule processor is interrupted.

Screen # 37

$ PIT Timer 2 Read Words ( PLB*11/21/85)

$ FOR SOME REASON, THE COUNTER SEEMS TO START AT FEFF
$ THIS IS THE REASON FOR THE 100 - ( IN HEX )
$ 5/6/86 IT WASN'T DOING THIS IN 5/86 SO IT WAS TAKEN BACK OUT !

Screen # 38

RP FORTH Image SAVE and RESTORE

[RP-KERNEL] contains the ASCII for "RPKERNEL.IMG"
[RP-FORTH] contains the ASCII for "RPFORTH.IMG"

RP-RESTORE reads the specified file from disk into the specified memory location

Screen # 39

Rule Processor initialization

IDENTIFY-RP puts the rule processor number into each rule processor (RP-INIT) loads the specified file into memory and sets them up to be ready to run LOAD-RP-KERNEL loads the RP kernel into rule processors
LOAD-RP-FORTH loads the RP extended forth into the rule processors

Screen # 40

Rule Processor Initialization

RP-AVAILABLE? returns the available bit of a selected RP
RP-ONLINE? returns the online bit of a selected RP
RP-REQUEST? returns the request bit os a selected RP ALL-RUN forces all processors to run RP-START gives a selected RP a start code and forces it to start execution ALL-START gives all rule processors a command code. Only the rule processors that are online are actually started. The off-line processors remain in the reset state

Screen # 41

$ Automatic RP Configuration ( PLB*11/21/86)
Each RP ( 0 to RP# -1 ) has a byte in RP-CONFIG-TAB.
The bits are assigned as follows:
Bit 0 - 1 indicates that the RP is physically available and can execute code.
1 - 1 indicates that the RP is available to the system. This allows some RP's to be taken off-line.
2 - 1 indicates a service request from the RP Eventual extensions may include a 68000/68010 flag, a 10/12.5 Mhz flag, and memory size configuration status ( 128K, 512K, 2M ?? ).
These extensions are not implemented yet and should only be implemented if there is a need for them.
RP-DISABLE clears the RP variables for the status display

Screen # 42

Automatic RP Configuration

FIRST-RP will return the processor number of the first rule processor available. This is used for automatically extending the RP kernel into the full Forth system.

#RP-ONLINE returns the number of rule processors that are on-line.

Screen # 43

Status Display Function Key Support
(BLINK) is used to hold the host blink delay
BLINK allows a quick test to be performed on the host/RP interaction of the recognize-act cycle

Screen # 44

RP Status Request Service

CLR-CELLBD-REQ-LATCH resets the request latch on the last cell board selected

REQUEST? looks at the request flag on the interface board. If there is a request pending, it will scan all rule processors to determine which ones are in need of service. If a rule processor needs to be serviced, then its request bit will be set in the configuration table.

Screen # 45

Debug mode support

BUG-MODE holds the current debug status for the rule processors
BUG-ON turns the debug mode on
BUG-OFF turns the debug mode off The debug mode, when enabled, forces the rule processor being serviced by the server task to go into the quit loop instead of halting after it has finished. See the RP-COMPLETE word within the rule processor code.

Screen # 46

Cell Run Status

These words determine the run state of the specified RP through the cell board status port. This does not detract from the speed of a running RP.

RP-RUNNING? returns true if the specified RP is running

RP-HALTED? returns true if the specified RP is halted

Screen # 47

RP allocation words $ old NEXT-RP simply allocted rules to the RP's on a round
$   robbin basis. This tends to distribute the rules evenly
$   within all RP's NEXT-RP allocates rules to the RP's by finding the halted RP that has the fewest number of LHS's. If all RP's are running ( by compiling rule filters ) then this word will wait until at least one RP is not running. This method seems to more evenly distribute the load than the original methcd.

Screen # 48

Rule Processor Send Words
RP-HERE pointer to RP buffer
NET-ARRAY temporary copy of the network transmission
WAIT-FOR-RP-HALT waits for the current RP to stop INIT-RP, initializes the RP, words
,RP adds a 32 bit word to the stream going to the selected RP
W,RP adds a 16 bit word to the stream going to the selected RP
SEND-TO-RP sends the temporary copy of the netowrk to the selected RP. Note that this package is used primarily for sending rules to rule processors ?SEND-RP will send the network copy to the selected RP if there is not enough room left in the temporary array. Message streams cannot be broken up !!!!!

Screen # 49

Network Transmission Words
NET-HERE pointer to the temporary network array
INIT-NET, initialize the network array stuff W,NET  sends 2 bytes to the network temporary array SEND-TO-NET sends the network buffer to all RP's This support may seem confusing, but it is nere for a reason. The temporary buffer ( NET-ARRAY ) is used to gather up as many network transmission stream "chunks" as possible. If a RHS requires more, then the first buffer is sent to the RP's for processing while the HOST starts to fill the temporary array with more stuff. Also effort has been taken to prevent a single message from being split across two transmissions.

Screen # 50

Network Transmission Words

,NET  sends a 32 bit word to the network temporary buffer

?SEND-NET sends the network buffer to the RP's if there is not enough room to put the next message into the temporary buffer.

MOV-TO-NET allows a memory move to the network buffer. This is useful when sending WME's to the RP's.

?SEND-TO-NET sends the temporary buffer to the network if it has something in it.

Screen # 0

DISPLAY.PF - AI Machine Status Display Package    ( PLB*04/29/86)

Update Records :

<01> 04/29/86 PLB  -  Creation of Status Display Package

This package allows a second terminal to be used as a status display and server for the rule processors

Screen # 1

```
$ DISPLAY.PF Load Screen                              ( PLB*04/08/87)
DECIMAL
START-SEGMENT .( ==> AI Machine Status Display Package)
      3 32 THRU
: +TASK1  TASK1 ACTIVATE
    BEGIN ?TERMINAL WHILE KEY DROP REPEAT      +STATUS ; RECOVER
```

```
: -TASK1  ~NET (SERVER-EN) W-OFF  TASK1 ACTIVATE PAGE STOP ;

' (SVR-ABORT) TASK1 'ABORT HIS !
' STATUS-LOOP 'SVR !
'CREATE @ -TWINS
   : COLD COLD   LOAD-RP-FORTH GET-RP-CONFIGURATION  BUG-OFF
          FIRST-RP DUP SVR-SERVE  SVR-WINDOW +TASK1 ;
'CREATE !      END-SEGMENT
```

Screen # 2

```
$ Server Interface - Status Variables             ( PLB*11/22/86)
$ To be loaded before main system
START-SEGMENT .( ==> AIM Status Display Variables)
WVARIABLE SVR-UPDATE       $ 0 when display is current
WVARIABLE BASE-RP
WVARIABLE SVR-PRT  SVR-PRT W-OFF $ 1 for echo to printer
WVARIABLE SVR-RP-VAR  SVR-RP-VAR W-ON $ 1 to enable RP var disp
WVARIABLE RP-STAT-UPDATE
WVARIABLE RP-VAR-UPDATE
WVARIABLE RP-SERVER#

: NEW-RP-STAT   2 RP-STAT-UPDATE W! ;
: NEW-RP-VAR    2 RP-VAR-UPDATE W! ;
: NEW-HOST-STAT 2 SVR-UPDATE W! ;
END-SEGMENT
```

Screen # 3

```
$ Server Interface - Status Variables             ( PLB*11/09/86)

VARIABLE  'SVR
VARIABLE  'STATUS     'STATUS OFF
WVARIABLE [RPVAR-VEC]

CODE (SVR-ABORT) SO U) S MOV  S -) CLR  U R MOV
    'SVR AB I MOV   NEXT

: SVR>W2  RP-SERVER# W@ !W2 ;

: (ECHO-TYPE) 2DUP (T1-TYPE) (P-TYPE) ;
```

Screen # 4

```
$ Server Interface - Character and File I/O      ( PLB*10/30/86)
DECIMAL
: SVR-EMIT  SVR>W2             ~W2 <SERVER-1> W@ EMIT ;

: SVR-OPEN  SVR>W2 ~W2 <SERVER-1> W@ (OPEN) SVR>W2
    <MAXBLK> @    ~W2 <SERVER-1> W!
    SHADOWS       ~W2 <SERVER-2> W! ;

: (SVR-R/W)  ( r/w code - )  >R  SVR>W2
    ~W2 <SERVER-1> W@  ( blk# )
    ~W2 <SERVER-2> @  WINDOW2 + ( addr)  R> 'FILE @EXECUTE ;

: SVR-READ  33 (SVR-R/W) ;
: SVR-WRITE 34 (SVR-R/W)  0 48 BDOS DROP ;
```

Screen # 5

```
$ RP FORTH Image SAVE                             ( PLB*10/31/86)
DECIMAL
VARIABLE 'SVR-BYE
: SVR-CLONE PULSE-INIT
      WINDOW2 NETWORK <SERVER-1> DUP >R >W2 @ *WMOVE
      R@ >W2    <TICKS> R> -   0 *WFILL   8 ALL-START ;

: SVR-SAVE   OFCB1      [RP-FORTH] FCB1 12 MOVE
  FCB1 F-DELETE DROP   FCB1 F-MAKE ABORT" RP-SAVE Make Error"
  OFCB1                [RP-FORTH] FCB1 12 MOVE
  ~W2 <SERVER-1> @ WINDOW2 +   WINDOW2
  DO  I F-DMA   FCB1 F-WRITE-SEQ ABORT" RP-SAVE Write Error"
    128 +LOOP   FCB1 F-CLOSE ABORT" RP-SAVE Close Error"
    SVR-CLONE   PULSE-INIT   'SVR-BYE @EXECUTE ; RECOVER
```

Screen # 6

```
$ Server Interface - Clock words, etc.            ( PLB*10/30/86)
HEX
: SVR-DATE @CLOCK
    <YEAR> W@  ~W2 <SERVER-1> W!
    <DAY>  W@  100 *   <MONTH> W@ +   ~W2 <SERVER-1> 2+ W!
    <DOW>  W@  100 *   <SECONDS> W@ +  ~W2 <SERVER-2>    W!
    <MINUTES> W@ 100 * <HOURS>   W@ +  ~W2 <SERVER-2> 2+ W! ;
```

```
: SVR-RP-PRT ~W2 <SERVER-1> W@   DUP SVR-PRT W!
    IF ['] (ECHO-TYPE) ELSE ['] (T1-TYPE) THEN 'TYPE ! ;
: SVR-.TOKEN  ~W2 <SERVER-1> @ ( token)
    DUP .TOKEN  TOKEN>$ C@ ~W2 <SERVER-1> ! ;

: SVR-TOKSIZ ~W2 <SERVER-1> @ ( token)  TOKEN>$ C@
    ~W2 <SERVER-1> W! ;
```

Screen # 7

```
$ Server Interface - Class & Attribute token @    ( PLB*11/02/86)

: SVR-CLS ~W2 <SERVER-1> W@ ( class) >CLASS-LIST 20 + @ ( token)
    DUP ~W2 <SERVER-1> !  TOKEN>$ C@ ~W2 <SERVER-2> W! ;

: SVR-ATTR ~W2 <SERVER-1> W@ ( class) >CLASS-LIST 24 + ( base)
    ~W2 <SERVER-1> 2+ W@ 4* + @ ( token) DUP ~W2 <SERVER-1> !
    TOKEN>$ C@ ~W2 <SERVER-2> W! ;
```

Screen # 8

```
$ Main Server Loop                                ( PLB*10/30/86)
WVARIABLE  RP-OLD-SERVE
: +STATUS ~NET <SERVER-EN> W-OFF  ['] (T1-TYPE) 'TYPE !
        CLR-REQ-BITS      FLUSH
        'STATUS @ 'SVR ! ABORT ; RECOVER
: SVR-BYE  SVR>W2 ~W2 <SERVER-CMD> W-OFF  RP-OLD-SERVE W@
    DUP IF 1- RP-SERVER# W! THEN RP-OLD-SERVE W-OFF
    +STATUS ; RECOVER
    ' SVR-BYE 'SVR-BYE !
: SVR-CRITICAL ;
CREATE SERVER-TABLE        0 ,                 ' SVR-EMIT ,
    ' SVR-OPEN ,          ' SVR-READ ,         ' SVR-WRITE ,
    ' SVR-SAVE ,          ' SVR-BYE ,          ' SVR-DATE ,
    ' SVR-CLONE ,         ' SVR-CRITICAL ,     ' SVR-RP-PRT ,
    ' SVR-.TOKEN ,        ' SVR-TOKSIZ ,       ' SVR-CLS ,
    ' SVR-ATTR ,
```

Screen # 9

```
$ Main Server Loop                                ( PLB*11/21/86)

: (SERVER)          .ESC 62 EMIT ( Exit ALT kpd mode)
    ~NET <SERVER-EN> W-OFF    SVR>W2 ~W2 <SERVER-EN> W-ON
    BEGIN SVR>W2 ~W2 <SERVER-CMD> W@  ?DUP
       IF SERVER-TABLE + @EXECUTE ~W2 <SERVER-CMD> W-OFF THEN
       ?TERMINAL IF KEY DUP 0= IF +STATUS THEN
          SVR>W2 ~W2 <RP-CHAR-IN> W!  THEN
    AGAIN ; RECOVER

: SERVER-LOOP ( Init RP-Server)   PAGE ( 80COL )
    (SERVER) ; RECOVER

: !SVR-TYPE-VEC  SVR-PRT W@ IF ['] (ECHO-TYPE) 'TYPE ! THEN ;

: +SERVER  !SVR-TYPE-VEC ['] SERVER-LOOP 'SVR ! ABORT ; RECOVER
```

Screen # 10

```
$ Display Support Words                           ( PLB*11/22/86)
DECIMAL
: .ON/OFF ( f-) IF ." On " ELSE ." Off" THEN ;
: .RP-#'S ( flag-to-clr-eol - ) 7 0 DO I 17 + 0 TAB
    +VT-REV I BASE-RP W@ + 2 U.R -VT-REV
    DUP IF CLR-EOL THEN    $ clear to end of line
    LOOP DROP ;
: LU.R  ( d n) >R <# #S #>  R@ OVER - DUP 0< IF
 2DROP DROP R> 0 DO ." -" LOOP ELSE SPACES TYPE R> DROP THEN ;

: STAT-LINE  12 0 TAB CLR-EOL ;
VARIABLE SVR-WVEC    SVR-WVEC OFF
: SVR-WINDOW ( rp# - )
    0 MAX  [ #RP 7 - ] LITERAL  MIN  BASE-RP W!
    SVR-WVEC ASSIGN 0 .RP-#'S SVR-WVEC OFF ;
```

Screen # 11

```
$ RP Variables Header Display                     ( PLB*04/08/87)
: .RP#1    [RPVAR-VEC] W-OFF   NEW-RP-VAR 16 0 TAB +VT-UL
    ." RP Memory #Rules #LHS  Bytes  #WME  Bytes Max#WME Max Byt
es #Entries Max Entries" -VT-UL 1 .RP-#'S ;
: .RP#2    4 [RPVAR-VEC] W!     NEW-RP-VAR     16 0 TAB +VT-UL
    ." RP Memory  Static  (bytes) Dynamic  (bytes)  Soft  (Kbyt
es)  Hard  (Kbytes)"    4 SPACES -VT-UL 1 .RP-#'S ;
: .RP#3    8 [RPVAR-VEC] W!     NEW-RP-VAR     16 0 TAB +VT-UL
    ." RP Memory #Rules  #LHS     LHS      PRE      RULE     +FIR
E    -FIRE    Rule#"    4 SPACES -VT-UL 1 .RP-#'S ;
: .RP#4   12 [RPVAR-VEC] W!     NEW-RP-VAR     16 0 TAB +VT-UL
    ." RP Memory #Rules  #LHS    <RP1>    <RP2>    <RP3>    <RP4
>    <RP5>    <RP6>"    4 SPACES -VT-UL 1 .RP-#'S ;
: .RP#5   16 [RPVAR-VEC] W!     NEW-RP-VAR     16 0 TAB +VT-UL
    ." RP Memory #Rules  #LHS    <RPA>    <RPB>    <RPC>    <RPD
>    <RPE>    <RPF>"    4 SPACES -VT-UL 1 .RP-#'S ;
```

Screen # 12

```
$ Status Display Modifiers                        ( PLB*11/22/86)

: NEW-SBASE ( offset-) BASE-RP W@  + SVR-WINDOW ;

: .SRP# ( rp#-) DUP >R 10 /MOD OVER 0= OVER 0= NOT AND
    13 R@ 12 + TAB IF 48 + EMIT ELSE DROP SPACE THEN
    14 R> 12 + TAB 48 + EMIT ;

: SVR-REBUILD  STAT-LINE ." Building Rule Processor Forth"
    LOAD-RP-KERNEL  GET-RP-CONFIGURATION  !SVR-TYPE-VEC
    FIRST-RP  DUP PAGE ." Building RP Forth on RP" . CR CR
    RP-SERVER# W@    1+   RP-OLD-SERVE W!   DUP RP-SERVER# W!
    12 RP-START  ['] (SERVER) 'SVR ! ABORT ; RECOVER
: SVR-RPEN-TOG  RP-SERVER# W@ DUP RP-ONLINE?
        IF RP-DISABLE ELSE RP-ENABLE THEN ;
```

Screen # 13

```
$ ESC key handler for status display             ( PLB*04/07/87)
: SVR-RP-FORTH  STAT-LINE ." Loading Forth into Rule Processors"
    LOAD-RP-FORTH  8 ALL-START  STAT-LINE ;
: SVR-MEM-TST  STAT-LINE ." Rule Processor Memory Test" .RP#4
    LOAD-RP-FORTH  24 ALL-START STAT-LINE ;
: SVR-BUG-TOG BUG-MODE W@ IF BUG-OFF ELSE BUG-ON THEN ;
: SVR-TOGPRT SVR-PRT W@ NOT SVR-PRT W!  NEW-HOST-STAT ;
: SVR-TOGRP  SVR-RP-VAR W@ NOT SVR-RP-VAR W!
    NEW-HOST-STAT NEW-RP-VAR ;
: >UC ( c - c )  DUP 97 123 WITHIN IF [ HEX ] 5F AND THEN ;

WVARIABLE SVR-SV    VARIABLE SVR-SVEC   SVR-SVEC OFF
: SVR-SERVE ( rp# - ) #RP MOD SVR-SV W! SVR-SVEC ASSIGN
    RP-SERVER# W@ +VT-REV .SRP# -VT-REV SVR-SV W@ DUP
    RP-SERVER# W! .SRP# SVR-SVEC OFF ;
: NEW-SRP ( offset-)  RP-SERVER# W@ + SVR-SERVE ;
```

Screen # 14

```
$ ESC key handler for status display              ( PLB*12/08/86)
: SVR-ESC  KEY DROP KEY CASE
 67 OF 1 NEW-SRP   ENDOF
 68 OF [ #RP 1- ] LITERAL NEW-SRP   ENDOF
 65 OF 1 NEW-SBASE ENDOF
 66 OF -1 NEW-SBASE ENDOF
 112 OF WATCH-0 ENDOF
 113 OF WATCH1? IF -W-1 ELSE +W-1 THEN ENDOF
 114 OF WATCH2? IF -W-2 ELSE +W-2 THEN ENDOF
 115 OF WATCH3? IF -W-3 ELSE +W-3 THEN ENDOF
 116 OF WATCH4? IF -W-4 ELSE +W-4 THEN ENDOF
 117 OF WATCH5? IF -W-5 ELSE +W-5 THEN ENDOF
 118 OF WATCH6? IF -W-6 ELSE +W-6 THEN ENDOF
        7 EMIT ENDCASE ;
: @RP-BS ( - rp#) BASE-RP W@ ;
: @RP-S# ( - rp#) RP-SERVER# W@ ;
```

Screen # 15

```
$ Keypress handler for server task                ( PLB*04/08/87)
: SVR-KP ?TERMINAL IF KEY >UC CASE   13 ( CR) OF +SERVER ENDOF
27 ( ESC) OF SVR-ESC        ENDOF 53 ( 5) OF .RP#5 ENDOF
68 ( D) OF SVR-BUG-TOG ENDOF 76 ( "L") OF SVR-RP-FORTH ENDOF
77 ( M) OF SVR-MEM-TST ENDOF 84 ( "T") OF SVR-RPEN-TOG ENDOF
80 ( P) OF SVR-TOGPRT  ENDOF 82 ( "R") OF PULSE-INIT   ENDOF
73 ( I) OF 4 ALL-SIGNAL ENDOF 72 ( H) OF 8 ALL-SIGNAL ENDOF
65 ( A) OF #RP 0 DO I RP-ENABLE  LOOP        ENDOF
88 ( X) OF #RP 0 DO I RP-DISABLE LOOP        ENDOF
49 ( 1) OF .RP#1 ENDOF    50 ( "2") OF .RP#2 ENDOF    51 ( 3) OF
.RP#3 ENDOF 52 ( 4) OF .RP#4 ENDOF 86 ( "V") OF SVR-TOGRP ENDOF
60 ( <) OF @RP-BS  7 - SVR-WINDOW    ENDOF
62 ( >) OF @RP-BS  7 + SVR-WINDOW    ENDOF
44 ( ,) OF @RP-S# 10 - DUP 0< IF #RP + THEN SVR-SERVE  ENDOF
46 ( .) OF @RP-S# 10 + SVR-SERVE     ENDOF
66 ( B) OF SVR-REBUILD ENDOF 7 EMIT ENDCASE THEN ;
```

Screen # 16

```
$ Host Status Display Header                      ( PLB*12/06/86)
: .HOST-HEADER
  +VT-REV ." GRNL AI Machine    Watch:"
                             55 SPACES -VT-REV
  1 0 TAB +VT-UL  19 SPACES
  ." Items          Bytes          Average" 26 SPACES -VT-UL
  2 0 TAB ." Free Memory:" CR
  ." String Tokens:" CR
```

```
." Literalize:" CR
." Productions:" CR
." Working Memory:" CR
." Time Tag:"       7 60  TAB ." Fired:" CR
." Totals =>          Non-Negated LHS           Negated LHS
         RHS"
11 0 TAB ." RP Variable Display:" 11 30 TAB ." RP Debug Mode:"
11 54 TAB ." RP Printer Echo:" ;
```

Screen # 17

```
$ Host Status Display                              ( PLB*12/08/86)
DECIMAL
WVARIABLE (M)
: .SVR-TIME SVR-KP  SVR-UPDATE W@
   @CLOCK <MINUTES> W@ DUP >R (M) W@ = NOT OR
   IF R> (M) W!   1 62 TAB +VT-UL  @DATE .DATE SPACE @TIME
   .TIME   -VT-UL
   ELSE R> DROP THEN ;

$ SVR1: 0-WORD-TO-EXECUTE   4-COL  6-ROW  8-HOLDING AREA
: SVR1: CREATE , W, W, 0 , DOES>
   DUP >R @EXECUTE ( get number) DUP R@ 8 + @ = NOT
   SVR-UPDATE W@ OR IF
      DUP R@ 8 + ! ( Save current)
      R@ 6 + W@   R> 4 + W@ TAB  8 LU.R
   ELSE SVR-KP R> 2DROP THEN ;
```

Screen # 18

```
$ Host Status Display                              ( PLB*05/01/86)
DECIMAL
: (NEW-DISP) ( addr-changedflag)  SVR-KP DUP @EXECUTE  SWAP 4+
   2DUP @ = ROT ROT ! NOT ;
: .ITEMS ( addr-) >R
   R@ 16 + W@  16 TAB  R@ 4+  @ DUP 8 LU.R
   R@ 16 + W@  31 TAB  R@ 12 + @ DUP 8 LU.R
   R> 16 + W@  45 TAB  OVER 0= IF 8 SPACES 2DROP ELSE
   SWAP / 8 LU.R THEN ;

$ SVR2:  0-WORD-TO-EXECUTE(COUNT)    4-HOLDING-COUNT
$          8-WORD-TO-EXECUTE(BYTE)    12-HOLDING-BYTE    16-ROW
: SVR2: CREATE , 0 , , 0 , W, DOES>
   >R    R@  (NEW-DISP)   R@ 8 + (NEW-DISP) OR
         SVR-UPDATE W@ OR
   IF  R> .ITEMS   ELSE R> DROP THEN ;
```

Screen # 19

```
$ Host Status Display                              ( PLB*03/16/87)
: HOST-FREE-MEM ( -n) #token-bytes @TOKEN-BYTES - FREE-MEM @ + ;
 : @#FIRED FIRED-COUNT @ ;
2 31     ' HOST-FREE-MEM                       SVR1:  .HOST-FREE
3        ' @TOKEN-BYTES     ' @TOKEN-COUNT     SVR2:  .HOST-TOK
4        ' @LIT-BYTES       ' @LIT-COUNT       SVR2:  .HOST-LIT
5        ' @RULE-BYTES      ' @RULE-COUNT      SVR2:  .HOST-RULE
6        ' @WME-BYTES       ' @WME-COUNT       SVR2:  .HOST-WME
7 16     ' @TIME-TAG                           SVR1:  .HOST-TT
8 10     ' @TOT-NN-LHS                         SVR1:  .TOT-NN-LHS
8 37     ' @TOT-N-LHS                          SVR1:  .TOT-N-LHS
8 60     ' @TOT-RHS                            SVR1:  .TOT-RHS
7 68     ' @#FIRED                             SVR1:  .#FIRED
: .HOST-STATUS .SVR-TIME .HOST-FREE .HOST-TOK .HOST-LIT
               .HOST-RULE  .HOST-WME    .HOST-TT   .#FIRED
               .TOT-NN-LHS  .TOT-N-LHS  .TOT-RHS ;
```

Screen # 20

```
$ Host Variable Display                            ( PLB*03/16/87)
: @H1 <HOST1> @ ;    : @H2 <HOST2> @ ;    : @H3 <HOST3> @ ;
: @TOT-CS TOTAL-#-IN-CS @ ;    : @INST-CS INST-#-IN-CS @ ;
2 68     ' @H1                                SVR1:  .H1
3 68     ' @H2                                SVR1:  .H2
4 68     ' @INST-CS                           SVR1:  .INST-CS
5 68     ' @TOT-CS                            SVR1:  .TOT-CS
VARIABLE  OLD-#-FIRED : ?/ ( nn-n) DUP IF / ELSE 2DROP 0 THEN ;
: .AVG-CS @#FIRED DUP OLD-#-FIRED @ = IF DROP ELSE DUP
   OLD-#-FIRED ! TOTAL-#-IN-CS @ 100 * SWAP ?/
   6 68 TAB <# # # 46 HOLD #S #> B  OVER - SPACES TYPE THEN ;
: .HOST-VAR    .H1 .H2 .INST-CS .TOT-CS .AVG-CS ;
: .HOST-VAR-HEADER   +VT-UL
  . 2 60 TAB ." <HOST1>"         3 60 TAB ." <HOST2>"
   -VT-UL                       4 60 TAB ." Inst CS:"
   5 60 TAB ." Tot CS:"         6 60 TAB ." Avg CS:" ;
```

Screen # 21

```
$ Rule Processor Header Display                    ( PLB*11/26/86)
DECIMAL
: .RP-HEADER 13 0 TAB +VT-REV ." RP Status:  "
      14 0 TAB 12 SPACES  15 0 TAB ." Online:        " -VT-REV
      #RP 0 DO SVR-KP  I !W2
         $ Put processor # onto screen
            I RP-SERVER# W@ = NOT IF +VT-REV  THEN
            I .SRP# -VT-REV
         LOOP
         +VT-REV 3 0 DO I 13 + 76 TAB 4 SPACES LOOP -VT-REV ;

28  ARRAY   $1       28  ARRAY   $2       28  ARRAY   $3
28  ARRAY   $4       28  ARRAY   $5       28  ARRAY   $6
28  ARRAY   $7       28  ARRAY   $8       28  ARRAY   $9
28  ARRAY   $A
```

Screen # 22

```
$ RP variable Display                              ( PLB*11/26/86)
WVARIABLE   COL-POS          WVARIABLE COL-WIDTH
VARIABLE    VAR-AD        $ VARIABLE ADDRESS
VARIABLE    BUFF-AD       $ BUFFER ADDRESS
VARIABLE    PR-SCL
: SCAN-RP     7 0 DO I BASE-RP W@ + !W2 ( set rp#)
      VAR-AD @@ DUP ( read rp)    I 4* BUFF-AD @ + @
      = NOT  RP-VAR-UPDATE W@ OR
      IF DUP I 4* BUFF-AD @ + ! ( store new)  PR-SCL @EXECUTE
      I 17 +    COL-POS W@ TAB   COL-WIDTH W@ LU.R
      ELSE DROP THEN   LOOP ;
```

Screen # 23

```
$ RP Variable Display                              ( PLB*11/26/86)
CREATE RPMD1
    03 C,   06 C,   <FREE-MEM> >W2 ,    $1 ,    0 ,
    13 C,   03 C,   <#RULES>   >W2 ,    $2 ,    0 ,
    17 C,   04 C,   <#LHS>     >W2 ,    $3 ,    0 ,
    22 C,   06 C, <RULE-BYTES> >W2 ,    $4 ,    0 ,
    29 C,   05 C,   <#WME>     >W2 ,    $5 ,    0 ,
    35 C,   06 C, <WME-BYTES>  >W2 ,    $6 ,    0 ,
    44 C,   05 C, <MAX#WME>    >W2 ,    $7 ,    0 ,
    53 C,   06 C, <MAX-WME-B>  >W2 ,    $8 ,    0 ,
    63 C,   05 C, <#ITEMS>     >W2 ,    $9 ,    0 ,
    75 C,   05 C, <MAX#ITEMS>  >W2 ,    $A ,    0 ,     0 W,
```

Screen # 24

```
$ RP Variable Display                              ( PLB*04/07/87)
CREATE RPMD4
    03 C,   06 C,   <FREE-MEM> >W2 ,    $1 ,    0 ,
    13 C.   03 C.   <#RULES>   >W2 .    $2 .    0 ,
    17 C.   05 C.   <#LHS>     >W2 .    $3 .    0 ,
    23 C.   08 C.   <RP1>      >W2 ,    $4 ,    0 ,
    32 C,   08 C,   <RP2>      >W2 ,    $5 ,    0 ,
    41 C.   08 C.   <RP3>      >W2-,    $6 .    0 .
    50 C,   08 C.   <RP4>      >W2 ,    $7 ,    0 ,
    59 C,   08 C,   <RP5>      >W2 ,    $8 ,    0 ,
    68 C,   08 C,   <RP6>      >W2 ,    $9 ,    0 ,     0 W,
```

Screen # 25

```
$ RP Variable Display                              ( PLB*04/08/87)
CREATE RPMD5
    03 C,   06 C,   <FREE-MEM> >W2 ,    $1 ,    0 ,
    13 C,   03 C,   <#RULES>   >W2 ,    $2 ,    0 ,
    17 C,   05 C,   <#LHS>     >W2 ,    $3 ,    0 ,
    23 C,   08 C,   <RPA>      >W2 ,    $4 ,    0 ,
    32 C,   08 C,   <RPB>      >W2 ,    $5 ,    0 ,
    41 C,   08 C,   <RPC>      >W2 ,    $6 ,    0 ,
    50 C,   08 C,   <RPD>      >W2 ,    $7 ,    0 ,
    59 C,   08 C,   <RPE>      >W2 ,    $8 ,    0 ,
    68 C,   08 C,   <RPF>      >W2 ,    $9 ,    0 ,     0 W,
```

Screen # 26

```
$ RP Variable Display                              ( PLB*04/07/87)
CREATE RPMD3
    03 C,   06 C,   <FREE-MEM>      >W2 ,    $1 ,    0 ,
    13 C,   03 C,   <#RULES>        >W2 ,    $2 ,    0 ,
    17 C,   05 C,   <#LHS>          >W2 ,    $3 ,    0 ,
    23 C,   08 C,   <LHS-PASS>      >W2 ,    $4 ,    0 ,
    32 C,   08 C,   <PRE-PASS>      >W2 ,    $5 ,    0 ,
    41 C,   08 C,   <RULE-PASS>     >W2 ,    $6 ,    0 ,
    50 C.   08 C.   <#FIREABLE>     >W2 ,    $7 ,    0 ,
```

```
   59 C,   08 C,   <#N-FIREABLE>   >W2 ,    $8 ,    0 ,
   68 C,   08 C,   <R-#>           >W2 ,    $9 ,    0 ,   0 W,
: /1024 1024 / ;   CREATE RPMD2
```

Screen # 27

```
$ RP Variable Display                                 ( PLB*04/08/87)
   03 C,   06 C,   <FREE-MEM> >W2 ,   $1 ,   0 ,
   13 C,   04 C,   <S-H>      >W2 ,   $2 ,   0 ,
   20 C,   06 C,   <S-B>      >W2 ,   $3 ,   0 ,
   31 C,   04 C,   <D-H>      >W2 ,   $4 ,   0 ,
   38 C,   06 C,   <D-B>      >W2 ,   $5 ,   0 ,
   46 C,   04 C,   <SOFT-R>   >W2 ,   $6 ,   0 ,
   51 C,   09 C,   <SOFT-B>   >W2 ,   $7 , ' /1024 ,
   62 C,   04 C,   <HARD-R>   >W2 ,   $8 ,   0 ,
   67 C,   09 C,   <HARD-B>   >W2 ,   $9 , ' /1024 ,  0 W,
CREATE RPMODE ' RPMD1 , ' RPMD2 , ' RPMD3 , ' RPMD4 , ' RPMD5 ,
: .RP-VAR-STATUS   SVR-RP-VAR W@ IF   [RPVAR-VEC] W@ RPMODE + @
   BEGIN DUP C@ WHILE
   DUP C@ COL-POS W! 1+          DUP C@ COL-WIDTH W! 1+
   DUP @ VAR-AD ! 4+             DUP @ BUFF-AD ! 4+
   DUP @ PR-SCL ! 4+             SCAN-RP REPEAT DROP   THEN ;
```

Screen # 28

```
$ Memory Management status display                    ( PLB*11/08/86)
$ SVR4: 0-ADDR-TO-FETCH   4-COL  6-ROW  8-HOLDING AREA
: SVR4: CREATE , W, W, 0 , DOES>
   DUP >R @@ ( get number) DUP R@ 8 + @ = NOT
   SVR-UPDATE W@ OR IF
       DUP R@ 8 + ! ( Save current)
       R@ 6 + W@   R> 4 + W@ TAB  +VT-REV  8 LU.R  -VT-REV
   ELSE SVR-KP R> 2DROP THEN ;

$ SVR5: 0-ADDR-TO-FETCH   4-COL  6-ROW  8-HOLDING AREA
: SVR5: CREATE , W, W, 0 , DOES>
   DUP >R @@ 1024 / ( get number) DUP R@ 8 + @ = NOT
   SVR-UPDATE W@ OR IF
       DUP R@ 8 + ! ( Save current)
       R@ 6 + W@   R> 4 + W@ TAB  +VT-REV  8 LU.R  -VT-REV
   ELSE SVR-KP R> 2DROP THEN ;
```

Screen # 29

```
$ Memory Management status display                    ( PLB*11/08/86)
: .MM-HEADER   +VT-REV 9 0 TAB
   ." Host Memory:   Static:          Dynamic:         Soft:
      Hard:             " CR
   ." Bytes:" 57 SPACES ." K" 14 SPACES ." K " -VT-REV ;
10  7 FREE-MEM         SVR4: .MM-FREE
10 23 STATIC-BYTES     SVR4: .MM-SB
10 41 DYNAMIC-BYTES    SVR4: .MM-DB
 9 23 STATIC-HANDLES   SVR4: .MM-SH
 9 41 DYNAMIC-HANDLES  SVR4: .MM-DH
 9 56 SOFT-REALLOC     SVR4: .MM-SOFT
 9 71 HARD-REALLOC     SVR4: .MM-HARD
10 54 SOFT-BYTES       SVR5: .MM-SOFT-B
10 69 HARD-BYTES       SVR5: .MM-HARD-B
: .MM-STATUS   .MM-SH .MM-DH .MM-SOFT .MM-HARD
   .MM-FREE    .MM-SB  .MM-DB  .MM-SOFT-B  .MM-HARD-B ;
```

Screen # 30

```
$ Status Mode Display                                 ( PLB*04/19/87)
DECIMAL
: .STATUS-MODES  SVR-UPDATE W@ IF
       11 21 TAB   SVR-RP-VAR W@ .ON/OFF
       11 45 TAB   BUG-MODE   W@ .ON/OFF
       11 71 TAB   SVR-PRT    W@ .ON/OFF
   THEN ;
VARIABLE WTCH-SAVE
: .HOST-WATCH [WATCH] @ WTCH-SAVE @ - IF 0 26 2DUP TAB
   +VT-REV 41 SPACES TAB .WTCH -VT-REV [WATCH] @ WTCH-SAVE !
   THEN ;
VARIABLE STRAT-SAVE
: .HOST-STRAT  STRAT-SAVE @ [STRATEGY] @ - IF 0 73 TAB
   +VT-REV MEA? IF ." MEA" ELSE ." LEX" THEN -VT-REV
   [STRATEGY] @ STRAT-SAVE ! THEN ;
```

Screen # 31

```
$ RP Request handler                                  ( PLB*11/22/86)
HEX  CREATE (DSP-TAB)    202D452A , ( space '-' 'E' '*' )
DECIMAL #RP ARRAY RP-CONFIG-COPY
: RP-STAT-CHANGED? ( pr# - f ) DUP RP-CONFIG-TAB + C@
              SWAP RP-CONFIG-COPY + C@ = NOT ;
: .RP-STATUS   RP-STAT-UPDATE W@  REQUEST? OR IF
   0 #RP 0 DO     I RP-STAT-CHANGED?
```

```
         IF I RP-CONFIG-TAB + C@  I RP-CONFIG-COPY + C!
     $ Put processor status onto screen
         15   I 12 + TAB   I RP-CONFIG-TAB + C@
              3 AND (DSP-TAB) + C@
              I RP-CONFIG-TAB + C@ 4 AND NOT
              IF +VT-REV  THEN   EMIT   -VT-REV   DROP 1
THEN LOOP IF 15 7 TAB +VT-REV #RP-ONLINE 3 U.R -VT-REV THEN
                                   THEN ;
```

Screen # 32

```
$ Main Server Loop                                    ( PLB*04/19/87)
: CK-STK DEPTH 0= NOT IF 7 EMIT ." STACKDPTH=" DEPTH . THEN ;
: STATUS-LOOP   PAGE .ESC 61 EMIT ( Enter ALT kod mode)
             .HOST-HEADER  .HOST-VAR-HEADER
             .MM-HEADER            .RP-HEADER  .RP#1
             NEW-HOST-STAT         NEW-RP-STAT NEW-RP-VAR
             RP-CONFIG-COPY #RP -1 FILL   -1 OLD-#-FIRED !
             [WATCH] @ 1+ WTCH-SAVE !  -1 STRAT-SAVE !
   BEGIN   .HOST-WATCH   SVR-WVEC @EXECUTE SVR-SVEC @EXECUTE
   .HOST-STRAT .HOST-STATUS  .RP-STATUS   .RP-VAR-STATUS
             .STATUS-MODES .MM-STATUS   .HOST-VAR
             RP-VAR-UPDATE  W@ IF RP-VAR-UPDATE  W-DOCK THEN
             RP-STAT-UPDATE W@ IF RP-STAT-UPDATE W-DOCK THEN
             SVR-UPDATE     W@ IF SVR-UPDATE     W-DOCK THEN
CK-STK       AGAIN ;
' STATUS-LOOP 'STATUS !
```

Screen # 34

Screen # 35

DISPLAY.PF Load Screen

T1>SERVER initiates server task

COLD is redefined to initialize rule processors and start server task

Screen # 36

Server Interface — Status Variables

| | |
|---|---|
| SVR-UPDATE | forces host status to be updated when set |
| BASE-RP | processor number of first RP in variable window |
| SVR-PRT | allows RP output to echo to printer when set |
| SVR-RP-VAR | enables RP variable display |
| RP-STAT-UPDATE | forces RP status line update when set |
| RP-VAR-UPDATE | forces RP variable update when set |
| RP-SERVER# | number of RP that is being served |
| NEW-RP-STAT | forces update of RP status lines |
| NEW-RP-VAR | forces update of RP variable window |
| NEW-HOST-STAT | forces update of host status |

Screen # 37

Screen # 38

Screen # 39

Screen # 40

Screen # 41

Screen # 42

```
Server command codes passed from RP to Host      ( PLB#10/29/86)
00  - do nothing
04  - Output Character EMIT
08  - File OPEN
0C  - File Read
10  - File Write
14  - Save RP forth image
18  - BYE, exit server back to status display
1C  - get time and date
20  - CLONE RP
24  - Critical Request  ( Something went wrong !!! )
28  - RP Print Echo Enable/Disable
2C  - Print token from rule processor, return length
30  - Get token size
34  - Get Class Token
38  - Get Attribute Token
```

Screen # 43

Screen # 44

Screen # 45

Screen # 46

Screen # 47

Screen # 48

Screen # 49

Screen # 50

Screen # 51

Screen # 52

Screen # 53

Screen # 54

Screen # 55

Screen # 56

Screen # 57

Screen # 58

Screen # 59

Screen # 60

Screen # 61

Screen # 62

Screen # 63

Screen # 64

Screen # 65

Screen # 66

Screen # 0

```
$ PARSER.PF -- OPS Parser                              ( PLB*01/27/86)
Update Records :
(01) 01/27/86 PLB  -  Creation of OPS Parser
```

Screen # 1

```
$ Load Screen for OPS Parser                           ( PLB*12/07/86)
DECIMAL
START-SEGMENT .( ==> OPS Parser)
             2  4   THRU        $ Misc. Messages
             6  12  THRU        $ Get Atom
DEBUG?       13     ?LOAD       $ Get Atom Debug
             14 18  THRU        $ OPS command interpreter
             19 23  THRU        $ Literalize Statement
             24 28  THRU        $ Rule Compilation Support
             29     LOAD        $ OPS Initialization
             30 31  THRU        $ ATOM-TYPE
             32 59  THRU        $ Rule LHS Parser
   GILD
$ : ..P       PARSER.PF OPEN  -TWINS 32 59 THRU GILD +TWINS ;
END-SEGMENT
```

Screen # 2

```
$ OPS related variables                              ( PLB*10/??/??)
DECIMAL

80 WCONSTANT  ATOM-LENGTH          $ Length of atoms
ATOM-LENGTH   ARRAY AT$            $ Atom that GET-ATOM builds
WVARIABLE C$              $ Last character read by GET-ATOM


HEX 03414141 AT$ !        $ Initial string of 'AAA'
    58 C$ C!              $ Initial C$ of 'X'
DECIMAL
```

Screen # 3

```
$ Print utilities                                    ( PLB*12/14/86)
VARIABLE RN-TOKEN
: CR-ABORT  CR ABORT ; RECOVER
: PP-CR     CR 10 SPACES ;
: .PP ( n- )   C# W@ +  #KBD-COL > IF PP-CR THEN ;
: .'RN$' RN-TOKEN @ TOKEN>$
       COUNT DUP 2+ .PP 39 EMIT TYPE 39 EMIT ;
: .RN$-REV  RN-TOKEN @ TOKEN>$ COUNT DUP .PP +REV TYPE -REV ;

: .AT$ AT$ COUNT DUP 2+ .PP 39 EMIT TYPE 39 EMIT ;
: .C$  39 EMIT C$ C@ EMIT      39 EMIT ;
: .ILL-ATOM  .ERROR-LINE
       ." Illegal Atom " .AT$ ."  in production " .'RN$'
       CR-ABORT ; RECOVER
: .ILL-COND .ERROR-LINE ." Illegal Conditional within LHS "
    #LHS W@ . ." in production " .'RN$' CR-ABORT ; RECOVER
```

Screen # 4

```
$ Get Atom Error messages                            ( PLB*01/27/86)
DECIMAL
: .GA-E1 .ERROR-LINE ." Missing '>' in variable " .AT$
        ."  in production " .'RN$'  CR-ABORT ; RECOVER

: .GA-E2 .ERROR-LINE ." Missing '-->' in production " .'RN$'
        CR-ABORT ; RECOVER

: .GA-E3! ( c-) C$ C!   .ERROR-LINE ." Illegal character " .C$
  ."  following '-' in production " .'RN$'  CR-ABORT ; RECOVER

: .GA-E4! ( c-)  C$ C!
        .ERROR-LINE ." Catastrophic failure involving " .C$
        ."  in production " .'RN$' CR-ABORT ; RECOVER
```

Screen # 5

Screen # 6

```
$ Get Atom  -  Character Translation Table        ( PLB*09/26/86)
DECIMAL CREATE GA-TABLE 128 ALLOT $ Character Translation Table
GILD
: INIT-GA-TABLE  128 0 DO 0   I GA-TABLE + C! LOOP
        33 0 DO  1 I GA-TABLE + C! LOOP ;
INIT-GA-TABLE  EMPTY     $ No need to keep table initialization
2 59  GA-TABLE + C!                            $ ;
3 94  GA-TABLE + C!     3 41 GA-TABLE + C!
3 123 GA-TABLE + C!     3 125 GA-TABLE + C!    $ Reserved Char
                        4  40 GA-TABLE + C!    $ (
                        5  60 GA-TABLE + C!    $ <
                        6  62 GA-TABLE + C!    $ >
                        7  45 GA-TABLE + C!    $ -
                        8  61 GA-TABLE + C!    $ =
GA-TABLE 48 + 10 9 FILL                        $ 0 to 9
9  43 GA-TABLE + C!     9  46 GA-TABLE + C!    $ + .
```

Screen # 7

```
$ Get Atom  -  State Definitions                     ( PLB*12/21/86)
DECIMAL
WVARIABLE  (RESERVED-CHAR) $ 1 if atom contains a reserved char
WVARIABLE  (OPS-VAR)       $ 1 if atom is a variable '<xxx>'

: GA-COMMENT ( c-)   DROP BEGIN GC 13 = UNTIL ;
   ASSEMBLER  DEFINITIONS
   : %%CLEAN-ATOM   DO CLR  AT$ AB DO B. MOV   1 #Q DO ADD
         AT$ # DO ADD   DO AO MOV  32 #B AO )  MOV ;
   FORTH DEFINITIONS
CODE CLEAN-ATOM    %%CLEAN-ATOM  ,NEXT
CODE ADD-CHAR BEGIN  S )+ D1 MOV  1 #Q DO MOV  AT$ AB DO B. ADD
   AT$ # DO ADD   DO AO MOV    D1 AO ) B. MOV
   1 #B AT$ AB ADD   ,NEXT
CODE   ADD-RCHAR  1 #W (RESERVED-CHAR) AB MOV   DUP BRA
CODE   ADD-NUM-CHAR   0 #W (RESERVED-CHAR) AB MOV  BRA
```

Screen # 8

```
$ Get Atom  -  State Definitions                     ( PLB*02/27/86)


CODE DROP-EXIT  4 #Q S ADD   %%CLEAN-ATOM
     1 # CHAR# AB SUB     R )+ I MOV   NEXT


: ADD-VEXIT  ( c-)   ADD-CHAR (OPS-VAR) W-ON
        CLEAN-ATOM R> DROP ;
: ADD-EXIT ( c-)     ADD-CHAR
        CLEAN-ATOM R> DROP ;
: ADD-REXIT ( c-)    ADD-RCHAR
        CLEAN-ATOM R> DROP ;
```

Screen # 9

```
$ Get Atom State Machine Support                     ( PLB*02/27/86)
DECIMAL
CREATE GET-ATOM-STATES 18     16 * DUP ALLOT
         GET-ATOM-STATES SWAP ERASE
GILD


: S> ( 10-items state# - )
       16 * GET-ATOM-STATES + PAD !
       ' PAD @ !    $ Store execution word
       0 9 DO I 4+ PAD @ + C! -1 +LOOP ;
```

Screen # 10

```
$ Get Atom  -  Get Atom State Table                  ( PLB*09/26/86)
HEX
$  0   1   2   3   4   5   6   7   8   9    Next State
$ Norm Sp  ;  ^)(}  (   <   >   -   =  Number
  02  00  01  0E  0E  06  09  0A  10  02    0 S> DROP
  02  00  01  03  03  06  09  0A  10  02    1 S> GA-COMMENT
  02  04  04  04  04  04  04  02  02  02    2 S> ADD-CHAR
  00  00  00  00  00  00  00  00  00  00    3 S> ADD-EXIT
  00  00  00  00  00  00  00  00  00  00    4 S> DROP-EXIT
  00  00  00  00  00  00  00  C0  00  00    5 S> .GA-E4!
  07  04  04  08  08  03  03  07  03  07    6 S> ADD-RCHAR
  07  08  0B  08  08  0B  0F  07  07  07    7 S> ADD-CHAR
  00  00  00  00  00  00  00  00  00  00    8 S> .GA-E1
  04  04  04  04  04  04  03  04  03  04    9 S> ADD-RCHAR
```

Screen # 11

```
$ Get Atom  -  Get Atom State Table                  ( PLB*12/21/86)
HEX
$  0   1   2   3   4   5   6   7   8   9    Next State
$ Norm Sp  ;  ^)()  (   <   >   -   =  Number
  0C  04  0C  04  04  0C  0C  0B  0C  11    A S> ADD-RCHAR
  0D  0D  0D  0D  0D  0D  03  0D  0D  0D    B S> ADD-CHAR
  00  00  00  00  00  00  00  00  00  00    C S> .GA-E3!
  00  00  00  00  00  00  00  00  00  00    D S> .GA-E2
  00  00  00  00  00  00  00  00  00  00    E S> ADD-REXIT
  00  00  00  00  00  00  00  00  00  00    F S> ADD-VEXIT
  04  04  04  04  04  03  03  04  05  04   10 S> ADD-RCHAR
  02  04  04  04  04  04  04  04  04  11   11 S> ADD-NUM-CHAR

EMPTY
: RESERVED? ( -f)    (RESERVED-CHAR) W@ ;
: OPS-VAR?  ( -f)    (OPS-VAR) W@ ;
```

Screen # 12

```
$ Get Atom                                               ( PLB*02/27/86)
WVARIABLE AT-STATE
: GET-ATOM ( atom is returned in AT$ )  PAUSE AT$ OFF
  AT-STATE W-OFF  (RESERVED-CHAR) W-OFF   (OPS-VAR) W-OFF
   BEGIN   GC
   ]]    DO CLR        D1 CLR
   S ) A0 MOV     GA-TABLE # A0 ADD    A0 ) D1 B. MOV
       AT-STATE AB DO B. MOV          4 # DO LSL
       GET-ATOM-STATES 4+  # DO ADD   D1 DO ADD      DO A0 MOV
       DO CLR   A0 ) DO B. MOV      DO AT-STATE AB B. MOV
       4 $ DO LSL
       GET-ATOM-STATES # DO ADD
       DO S -) MOV
  [[  @EXECUTE AGAIN ; RECOVER
```

Screen # 13

```
$ Get Atom Diagnostics                                   ( PLB*12/21/86)
DECIMAL
EXIT     $ MODIFIED TIMER WORDS 5/8/86
: TEST-ATOMI INIT-GET-CHAR BEGIN ?WAIT GET-ATOM CR .AT$ AGAIN ;
: TEST-ATOM BEGIN ?WAIT GET-ATOM CR .AT$ AGAIN ;

: TIME-ATOM START-TIMER BEGIN GET-ATOM AGAIN ;
: TIME-ATOM/TOKEN START-TIMER
           BEGIN GET-ATOM AT$ $>TOKEN DROP AGAIN ;


: T-ATOM-TYPE-I INIT-GET-CHAR BEGIN ?WAIT GET-ATOM CR
     .AT$  (RESERVED-CHAR) W@ .   (OPS-VAR) W@ . AGAIN ;
: X INIT-GET-CHAR BEGIN ?WAIT GET-ATOM CR
     .AT$  (RESERVED-CHAR) W@ .   (OPS-VAR) W@ . AGAIN ;
```

Screen # 14

```
$ OPS <> FORTH Support                                   ( PLB*01/30/86)


: OPS:   OPS-VOCAB DEFINITIONS   CREATE SMUDGE
         FORTH    DEFINITIONS   ] ;CODE
         I R -) MOV   W I MOV  NEXT

: OPS-VIEW     CONTEXT W@ >R  OPS-VOCAB
               -' IF R> CONTEXT W! 1 ABORT" ?" THEN
               SWAP DROP 2- ( B/H) W@   1024 /MOD
               OVER 0=   R> CONTEXT W!
               ABORT" Can't VIEW a keyboard definition"
               (OPEN) SCR !   R# OFF   L ;
```

Screen # 15

```
$ OPS Command Interpreter                               ( PLB*04/19/87)
HEX : OPS-' ( p t, p a f) AT$ CONTEXT W@ HASH -FIND ; RECOVER
: OPS-QUIT   NORMAL-TYPE CON? NOT IF +CRT THEN
    INIT-GET-CHAR    ?SEND-TO-NET    ?CR ." OPS> "
    ?CR-STATE OFF    ?SP-STATE OFF
    BEGIN   DECIMAL  CTLY-VEC OFF
     DEPTH ?DUP IF .WARNING-LINE ." Stack Depth is " . CR THEN
     CK-JOT  [RHS#] OFF
     GET-ATOM   AT$ W@ 0128 = NOT IF   $ '('
       .ERROR-LINE ." No leading '(' in command" CR-ABORT
       THEN  GET-ATOM
       OPS-' IF .ERROR-LINE ." Illegal Command, " .AT$
       CR-ABORT THEN   EXPECT-MORE-INPUT   DROP  EXECUTE
       DON'T-EXPECT-MORE-INPUT
     AGAIN ; RECOVER
```

Screen # 16

```
$ (OPS-ABORT)                                           ( PLB*02/10/87)

CODE (OPS-ABORT)    SO U) S MOV   S -) CLR
     U R MOV  ' OPS-QUIT # I MOV  NEXT
```

Screen # 17

```
$ OPS Initialization                                    ( PLB*03/19/87)

VARIABLE 'INIT-OPS           $ Vector for OPS Initialization

: INIT-OPS-ABORT   ['] (OPS-ABORT) 'ABORT ! ;

: .OPS-HEAD ." Version of MM/DD/YY" CR CR ;
   @DATE (DATE) ' .OPS-HEAD 16 + SWAP CMOVE

: OPS   PULSE-INIT   1000 0 DO PAUSE LOOP
        FLUSH  GILD  'INIT-OPS @EXECUTE
        INIT-OPS-ABORT   OPS-VOCAB DEFINITIONS   OPS-I/O GILD
        ." ORNL Parallel Processing OPS Machine" CR CR
        10 SPACES .OPS-HEAD ABORT ; RECOVER
```

Screen # 18

```
$ Some OPS Commands                                     ( PLB*01/30/86)
HEX
: NO-)  INIT-OPS-ABORT    .ERROR-LINE
     ." Expecting a ')' to end structure " CR-ABORT ; RECOVER

: END')'     DON'T-EXPECT-MORE-INPUT
         ['] NO-) 'ABORT !  GET-ATOM   AT$ W@ 0129 =
         NOT IF NO-) THEN INIT-OPS-ABORT ;
```

Screen # 19

```
$ OPS Literalize Statement                              ( PLB*11/01/86)

OPS: FINISH-LITERALIZE  END')' ;
VARIABLE     LIT-HDL
VARIABLE     LAST-LIT     $ Pointer to last literalize frame
WVARIABLE    LIT#         $ Class number of last literalize frame
VARIABLE     LAST-L-HDL  $ Last literalize handle
```

Screen # 20

```
$ OPS Literalize Statement                              ( PLB*11/01/86)

: INIT-LIT   LIT-COUNT OFF  60 DUP DUP LIT-BYTES
    OPEN-STATIC DUP LIT-HDL ! CLOSE-STATIC ;
CODE >CLASS-LIST  S )+ DO MOV 2 # DO LSL LIT-HDL AB A0 MOV
    A0 ) A0 MOV  DO A0 ADD A0 ) A0 MOV A0 ) S -) MOV .NEXT
: OPEN-CLASS ( class# - ) DUP LIT# W!  >CLASS-LIST LAST-LIT ! ;
CODE L-PTR  LAST-LIT AB A0 MOV A0 ) A0 MOV A0 ) S -) MOV .NEXT
CODE L-FREE LAST-LIT AB DO MOV  4 # DO ADD DO S -) MOV .NEXT
CODE L-SIZE LAST-LIT AB DO MOV  8 # DO ADD DO S -) MOV .NEXT
CODE L-#    LAST-LIT AB DO MOV 10 # DO ADD DO S -) MOV ,NEXT
CODE L-CNT  LAST-LIT AB DO MOV 12 # DO ADD DO S -) MOV ,NEXT
CODE L-MAX  LAST-LIT AB DO MOV 16 # DO ADD DO S -) MOV ,NEXT
CODE L-TOK  LAST-LIT AB DO MOV 20 # DO ADD DO S -) MOV ,NEXT
CODE L-1ST  LAST-LIT AB DO MOV 24 # DO ADD DO S -) MOV ,NEXT
```

Screen # 21

```
$ OPS Literalize Statement                              ( PLB*11/01/86)
: L-CREATE   LIT-COUNT @ 4*  LIT-HDL @ SIZE-OF-FRAME
    < NOT IF 20 DUP LIT-BYTES +! LIT-HDL @ RESIZE-STATIC THEN
    $ Now create new literalize array
    1000 OPEN-STATIC  DUP LAST-L-HDL !     LIT-COUNT @ LIT# W!
        LIT-COUNT @ 4* LIT-HDL @@ + !
    LAST-L-HDL @@ LAST-LIT !     L-CNT OFF    L-MAX OFF
    L-FREE OFF   4 L-SIZE W! L-# W-OFF    ;
: L-CREATE-SINGLE ( token- )  L-CREATE   L-TOK !
   24 DUP LAST-L-HDL @  CLOSE-STATIC LIT-BYTES +!
   'INIT-LIT&WME @EXECUTE LIT-COUNT TALLY ;
VARIABLE LAST-ATTR      $ Contains last ATTR offset
: ?ATTR ( token - f ) LAST-ATTR !
   L-# W@ DUP IF 0 SWAP 0 DO I 4* L-1ST + @
      LAST-ATTR @ = IF DROP 1 I 4* LAST-ATTR ! LEAVE THEN
   LOOP THEN ;
```

Screen # 22

```
$ OPS Literalize Statement                              ( PLB*11/01/86)
: ADD-ATTRIBUTE  AT$ $>TOKEN  ( Get attribute token)
     $ Check to see if attribute is already on list !!!!
     DUP ?ATTR IF .ERROR-LINE   ." Attribute " .AT$
        ."  has already been added to literalize list"
        LAST-L-HDL @ RELEASE-STATIC  CR-ABORT THEN
     L-# W@ 4* L-1ST + !   ( store token )
```

```
   L-# W-TALLY       4 L-SIZE W+! ;
: ?LIT ( token - -1-or-literalize# )
   LIT-COUNT @ ?DUP IF -1 SWAP 0 DO
      OVER   I >CLASS-LIST 20 + ( token-field) @  =
         IF DROP I LEAVE THEN
   LOOP SWAP DROP ELSE DROP -1 THEN ;
```

Screen # 23

```
$ OPS Literalize Statement                      ( PLB*11/01/86)
HEX OPS: LITERALIZE    GET-ATOM AT$ $>TOKEN  DUP >R
  ?LIT -1 - IF .ERROR-LINE ." Item " .AT$
   ."  has already been LITERALIZED" CR-ABORT THEN
   RESERVED? IF .ERROR-LINE ." Item " .AT$
   ."  contains a reserved chararacter" CR-ABORT THEN
  L-CREATE   R> L-TOK !
  BEGIN GET-ATOM RESERVED? NOT WHILE ADD-ATTRIBUTE REPEAT
  AT$ W@ 0129 = NOT IF .ERROR-LINE ." Attribute " .AT$
  ."  is not allowed to contain a reserved character"
  LAST-L-HDL @ RELEASE-STATIC CR-ABORT  THEN
  $ close literalize frame
  L-# W@ 4* 18 + ( size) DUP LAST-L-HDL @ CLOSE-STATIC
  LIT-BYTES +! 'INIT-LIT&WME @EXECUTE LIT-COUNT TALLY ;
```

Screen # 24

```
$ Rule Initialization and support              ( PLB*12/16/86)
VARIABLE RULE-HDL            VARIABLE NEXT-RULE
VARIABLE 'CURRENT-RULE       WVARIABLE RL#
: INIT-RULE  400 DUP DUP RULE-BYTES !
             OPEN-STATIC DUP RULE-HDL ! CLOSE-STATIC
             RULE-COUNT OFF NEXT-RULE OFF ;

: RULE>ADDR ( n-addr) 4* RULE-HDL @@ + @@ ;
: RULE>HDL  ( n-hdl ) 4* RULE-HDL @@ + @  ;

: ?RULE ( token - -1-or-rule# )
   NEXT-RULE @ ?DUP IF -1 SWAP 0 DO
         I 4* RULE-HDL @@ + @ IF    $ non-deleted rule
        OVER  I RULE>ADDR @ =
            IF DROP I LEAVE THEN   THEN
        LOOP SWAP DROP ELSE DROP -1 THEN ;
```

Screen # 25

```
$ Rule Frame OPEN routines                      ( PLB*12/21/86)
: OPEN-RULE ( n - ) DUP RL# W!   RULE>HDL 'CURRENT-RULE ! ;
: R-TOKEN      ( - addr ) 'CURRENT-RULE @@ ;
: R-#LHS       ( - addr ) 'CURRENT-RULE @@ 4+ ;
: R-#NNLHS     ( - addr ) 'CURRENT-RULE @@ 6 + ;
: R-#RHS       ( - addr ) 'CURRENT-RULE @@ 8 + ;
: R-#FIRINGS   ( - addr ) 'CURRENT-RULE @@ 10 + ;
: R-RP#        ( - addr ) 'CURRENT-RULE @@ 14 + ;
: R-FILENAME   ( - addr ) 'CURRENT-RULE @@ 16 + ;
: R-STARTLINE  ( - addr ) 'CURRENT-RULE @@ 28 + ;
: R-STARTCHAR  ( - addr ) 'CURRENT-RULE @@ 32 + ;
: R-ENDCHAR    ( - addr ) 'CURRENT-RULE @@ 36 + ;
: R-BVNAMES    ( - addr ) 'CURRENT-RULE @@ 40 + ;
: R-#BV        ( - addr ) 'CURRENT-RULE @@ 44 + ;
: R-COMPLEXITY ( - addr ) 'CURRENT-RULE @@ 46 + ;
: R-RHSCODE    ( - addr ) 'CURRENT-RULE @@ 48 + ;
```

Screen # 26

```
$ ,RHS words                                    ( PLB*12/07/86)
VARIABLE    RHS-PTR
VARIABLE LAST-RULE

CODE >RHS     S )+ D0 MOV  LAST-RULE AB A0 MOV   12 # A0 ADD
   A0 ) D1 MOV    4 #Q D1 SUB      D0 D1 CMP 0<
      IF D0 S -) MOV    D1 D0 SUB  2048 # D0 ADD   D0 S -) MOV
       LAST-RULE AB S -) MOV    [[ RESIZE-STATIC ]]
           S )+ D0 MOV THEN   LAST-RULE AB A0 MOV
      A0 ) A0 MOV   D0 A0 ADD   A0 S -) MOV ,NEXT

: ,RHS     ( n - )   RHS-PTR @ >RHS  !    RHS-PTR 4TALLY ;
: W,RHS    ( n - )   RHS-PTR @ >RHS  W!   RHS-PTR 2TALLY ;
: RHS,CFA  ( n - )   4- ,RHS ;
CODE rhs,cfa I )+ S -) MOV [[ ,RHS ; SMUDGE
: [RHS,CFA]  COMPILE rhs,cfa   ' 4- , ; IMMEDIATE
```

Screen # 27

```
$ Rule Creation Support                         ( PLB*12/21/86)
VARIABLE DUPL-RULE
: P-CREATE  NEXT-RULE @ 4*   RULE-HDL @ SIZE-OF-FRAME
   < NOT IF 100 DUP RULE-BYTES +! RULE-HDL @ RESIZE-STATIC THEN
   $ Now, create new rule frame
   INITIAL-PROD-SIZE OPEN-STATIC DUP LAST-RULE !
   NEXT-RULE @ 4* RULE-HDL @@ + !
   NEXT-RULE @ OPEN-RULE
```

```
   INITIAL-PROD-SIZE LAST-RULE @ CLOSE-STATIC
   48 RHS-PTR ! ;
HEX : P-REMOVE ( n-)  DUP 4 ?SEND-NET 1C W,NET W,NET ( rule #)
   4*  RULE-HDL @@ + DUP @ >R  OFF
   R@ SIZE-OF-FRAME NEGATE RULE-BYTES +!
   R> RELEASE-STATIC   RULE-COUNT DOCK ;
: .DELETE-RULE ?CR ." Previously compiled production "
   .'RN$' 9 .PP ."  EXCISE'd" ;
```

Screen # 28

```
$ Rule Parser Error ABORT vector                ( PLB*02/06/87)

: (R-ABORT)      LAST-RULE @ RELEASE-STATIC
                CLOSE-JOT1
                INIT-OPS-ABORT
                (OPS-ABORT) ; RECOVER


: CLEAR-#FIRINGS        NEXT-RULE @ 1- ?DUP IF 0 DO
          I 4* RULE-HDL @@ + @ IF I OPEN-RULE R-#FIRINGS OFF
      THEN LOOP THEN ;

: CLEAR-CLASS           LIT-COUNT @ ?DUP IF 0 DO
          I OPEN-CLASS  L-MAX OFF
      LOOP THEN MAX-WME OFF WME-BYTES @ MAX-WMEB ! ;
```

Screen # 29

```
$ OPS initialization code                       ( PLB*04/08/87)

: INIT-OPS  ' INIT-MEM      INIT-TOKEN      INIT-JOT
  INIT-LIT   INIT-RULE   'INIT-WME @EXECUTE  INIT-COUNTER
   INIT-NET,   FIRED-COUNT OFF   CTRL-C-FLG W-OFF
   WATCH-0 +W-1 +W-4 +W-2  +W-6 $ set initial watch to 1 2 4 6
   SET-LEX   (FILE-ACCEPT) W-OFF   TOTAL-#-IN-CS OFF
   20 ALL-START WAIT-FOR-RP-COMPLETE  "NET (TICKS) OFF
   <HOST1>    OFF  <HOST2>    OFF    <HOST3>  OFF
   <HOST4>    OFF  <HOST5>    OFF
   TOTAL-NON-NEGATED-LHS W-OFF      TOTAL-NEGATED-LHS W-OFF
   TOTAL-RHS W-OFF   WME-COUNT OFF   WME-BYTES OFF
   TIME-TAG OFF   EMPTY ;   ' INIT-OPS 'INIT-OPS !
```

Screen # 30

```
$ Atom Characterization routine                 ( PLB*07/10/86)
HEX  ASSEMBLER DEFINITIONS
: PUSH-EXIT ( n-) #Q D0 MOV D0 S -) MOV ,NEXT ;
FORTH DEFINITIONS
CODE ATOM-TYPE
 (RESERVED-CHAR) AB W. TST  0=      IF 0 PUSH-EXIT  THEN
 (OPS-VAR)          AB W. TST  0= NOT IF 1 PUSH-EXIT  THEN
 AT$ AB D1 MOV
 01282000 # D1 CMP 0= IF 02 PUSH-EXIT THEN   $ (
 01292000 # D1 CMP 0= IF 03 PUSH-EXIT THEN   $ )
 017B2000 # D1 CMP 0= IF 04 PUSH-EXIT THEN   $ {
 017D2000 # D1 CMP 0= IF 05 PUSH-EXIT THEN   $ }
 012D2000 # D1 CMP 0= IF 06 PUSH-EXIT THEN   $ -
 015E2000 # D1 CMP 0= IF 07 PUSH-EXIT THEN   $ ^
 013D2000 # D1 CMP 0= IF 08 PUSH-EXIT THEN   $ =
 013E2000 # D1 CMP 0= IF 09 PUSH-EXIT THEN   $ >
```

Screen # 31

```
$ Atom Characterization routine                 ( PLB*07/10/86)
HEX
 013C2000 # D1 CMP 0= IF 0A PUSH-EXIT THEN   $ <
 023C3E20 # D1 CMP 0= IF 0B PUSH-EXIT THEN   $ <>
 023D3E20 # D1 CMP 0= IF 0C PUSH-EXIT THEN   $ =>
 023E3D20 # D1 CMP 0= IF 0C PUSH-EXIT THEN   $ >=
 023D3C20 # D1 CMP 0= IF 0D PUSH-EXIT THEN   $ =>
 023C3D20 # D1 CMP 0= IF 0D PUSH-EXIT THEN   $ >=
 023C3C20 # D1 CMP 0= IF 0E PUSH-EXIT THEN   $ <<
 023E3E20 # D1 CMP 0= IF 0F PUSH-EXIT THEN   $ >>
 032D2D3E # D1 CMP 0= IF 10 PUSH-EXIT THEN   $ -->
 11 PUSH-EXIT
```

Screen # 32

Screen # 33

Screen # 34

Screen # 35

```
$ JOT access words                                  ( PLB*12/22/86)
WVARIABLE COMPLEX
: INC-COMP  COMPLEX W-TALLY ;

: >BIND ( bv# - addr )  4* >JOT1 ;
: >NAMED-LHS ( lhs# - addr ) 4*  [ MAX#BV 4* ] LITERAL
          + >JOT1 ;

: >CLASS# ( lhs# - addr )  [ MAX#BV MAX#LHS + 4* ] LITERAL
          + >JOT1 ;

: >REM-FLAG ( lhs# - addr ) [ MAX#BV MAX#LHS + 4* MAX#LHS + ]
          LITERAL + >JOT1 ;

: >NN-LHS#   ( lhs# - addr ) [ MAX#BV MAX#LHS + 4* MAX#LHS 2* + ]
          LITERAL + >JOT1 ;
```

Screen # 36

```
$ Bound Variable Checker                            ( PLB*12/14/86)
HEX WVARIABLE NEXT-BIND         WVARIABLE BIND-POS
: BIND-VAR ( token - ) NEXT-BIND W@ MAX#BV = IF .ERROR-LINE
    ." Too many bound variables in production " .'RN$' CR-ABORT
    THEN    NEXT-BIND W@ >BIND !
    NEGATE-FLAG W@ IF .ERROR-LINE ." Cannot bind variable " .AT$
    ."  within negated LHS # " #LHS W@ . ." in production "
    .'RN$' CR-ABORT THEN
    4 ?SEND-RP
    18 W,RP  NEXT-BIND W@ W,RP      $ Send binding position to RP
    NEXT-BIND W-TALLY ;

: BOUND? ( - token f ) AT$ $>TOKEN 0 SWAP
    NEXT-BIND W@ ?DUP IF 0 DO I >BIND @ OVER =
        IF I BIND-POS W! SWAP DROP 1 SWAP  LEAVE THEN LOOP
    THEN SWAP ;
```

Screen # 37

```
$ Simple Conditions involving variables          ( PLB*12/21/86)
WVARIABLE COND-TYPE     $ Condition Type
HEX CREATE COND-VAR-TAB 0 , 0 , 38 C, 40 C, 44 C, 3C C,
        48 C, 4C C,  DECIMAL
: COND-VAR INC-COMP BOUND?
    IF DROP ( don't need token)  4 ?SEND-RP
        COND-TYPE W@ COND-VAR-TAB + C@ W,RP  $ Condition
        BIND-POS W@ W,RP    $ Binding Position
        8 COND-TYPE W!     $ Set back to '='
    ELSE
        COND-TYPE W@ 8 - IF .ERROR-LINE
        ." Illegal condition on first occurrance of variable "
        .AT$ PP-CR ." on LHS# " #LHS W@ . ." in production "
        .'RN$' CR-ABORT THEN   BIND-VAR THEN ;
```

Screen # 38

```
$ Conditionals Support                              ( PLB*02/15/87)
HEX : COND-COND      ATOM-TYPE COND-TYPE W! ;
: .ILL-STR-COMP .ERROR-LINE ." Illegal comparison on string "
    .AT$   ."  on LHS# " #LHS W@ . ." in production "
    .'RN$' CR-ABORT ; RECOVER
: COND-COMPL    2 ?SEND-RP
                50 W,RP ;  $ Send msg to RP - compound condition
CREATE COND-LIT-TAB 0 , 0 , 20 C, 28 C, 2C C, 24 C,
    30 C, 34 C,
: ?$>TOKEN ( a - token-or-nil) DUP @ 034E494C =
    IF DROP 0 ELSE $>TOKEN THEN ;   DECIMAL
: COND-LIT  INC-COMP AT$ ?$>TOKEN   DUP TOKEN-NUM? NOT
        IF COND-TYPE W@ DUP 8 = SWAP 11 = OR NOT IF
            .ILL-STR-COMP THEN THEN   6 ?SEND-RP
        COND-TYPE W@ COND-LIT-TAB + C@ W,RP      ,RP ( token)
        8 COND-TYPE W! ;
```

Screen # 39

```
$ OR'ed condition execution words                   ( PLB*11/26/86)
HEX
: OR-EXIT   2 ?SEND-RP 58 W,RP   8 COND-TYPE W!   R> DROP ;
CREATE OR-LIT-TAB 0 , 0 , 5C C, 64 C, 80 C, 60 C, 6C C, 70 C,
: OR-LIT AT$ ?$>TOKEN DUP TOKEN-NUM? NOT IF COND-TYPE W@ DUP
    8 = SWAP 0B = OR NOT IF .ILL-STR-COMP THEN THEN
    6 ?SEND-RP
    COND-TYPE W@ OR-LIT-TAB + C@ W,RP     ,RP ( token)
    8 COND-TYPE W! ;
CREATE OR-VAR-TAB 0 , 0 , 74 C, 7C C, 80 C, 78 C, 84 C, 88 C,
: OR-VAR BOUND? IF DROP COND-TYPE W@ OR-VAR-TAB + C@
    4 ?SEND-RP
    W,RP ( condition) BIND-POS W@ W,RP 8 COND-TYPE W!
    ELSE .ERROR-LINE ." Unbound variable " .AT$
    ."  in OR condition on LHS# " #LHS W@ . ." in production "
    .'RN$' CR-ABORT THEN ;
```

Screen # 40

```
$ OR'ed condition State Table and support          ( PLB*10/04/86)
CREATE OR-STATES  6 22 * DUP ALLOT  OR-STATES SWAP ERASE  GILD
: STATE>  ( 18-items state# - )
    22 * OR-STATES + PAD !    ' PAD @ !
    0 17 DO  I 4+ PAD @ + C!  -1 +LOOP ;    HEX
$  0  1  2  3  4  5  6  7  8  9  A  B  C  D  E  F 10 11
   3  4  1  1  1  1  1  1  2  2  2  2  2  2  1  1  1  1
             0 STATE> PAUSE            $ Starting State - NOOP
   0  0  0  0  0  0  0  0  0  0  0  0  0  0  0  0  0  0
             1 STATE> .ILL-COND        $ Illegal Conditional
   3  4  1  1  1  1  1  1  1  1  1  1  1  1  1  1  1  1
             2 STATE> COND-COND        $ Conditional =,<>,>, etc.
   3  4  1  1  1  1  1  1  2  2  2  2  2  2  1  5  1  1
             3 STATE> OR-LIT           $ Literal
   3  4  1  1  1  1  1  1  2  2  2  2  2  2  1  5  1  1
             4 STATE> OR-VAR           $ Variable
```

Screen # 41

```
HEX   $ Conditionals State Table                    ( PLB*12/21/86)
$  0  1  2  3  4  5  6  7  8  9  A  B  C  D  E  F 10 11
   0  0  0  0  0  0  0  0  0  0  0  0  0  0  0  0  0  0
             5 STATE> OR-EXIT          $ Exit or'd condition
EMPTY WVARIABLE OR-STATE       DECIMAL
: COND-OR    INC-COMP OR-STATE W-OFF    8 COND-TYPE W!
    $ Send OR'ed start msg to RP
    2 ?SEND-RP   [ HEX 54 DECIMAL ] LITERAL W,RP
    BEGIN
        GET-ATOM ATOM-TYPE
        OR-STATE W@ 22 * OR-STATES + + 4+ C@
        DUP OR-STATE W!
        22 * OR-STATES + @EXECUTE
    AGAIN ; RECOVER
```

Screen # 42

```
$ END-LHS                                           ( PLB*11/26/86)
HEX
: END-LHS          NEGATE-FLAG W-OFF 2 ?SEND-RP
                   0C W,RP ;    $ Send msg to RP to end LHS

: (COND-END)       2 ?SEND-RP
                   14 W,RP ;     $ Send msg to RP to end condition


: COND-END         (COND-END) R> DROP ;
: COND-LHS-END     (COND-END) END-LHS 2R> 2DROP ;
```

Screen # 43

```
$ Conditionals State Table and support          ( PLB*09/25/86)

DECIMAL

CREATE COND-STATES 17   22 * DUP ALLOT  COND-STATES SWAP ERASE
GILD

: STATE>  ( 18-items state# - )
   22 * COND-STATES + PAD !
   ' PAD @  !
   0 17 DO  I 4+ PAD @ + C!  -1 +LOOP ;
```

Screen # 44

```
HEX   $ Conditionals State Table                   ( PLB*09/25/86)
$  0  1  2  3  4  5  6  7  8  9  A  B  C  D  E  F 10 11
   4  5  1  1  A  1  1  1  6  6  6  6  6  6  9  1  1  1
          0 STATE> PAUSE          $ Starting State - NOOP
   0  0  0  0  0  0  0  0  0  0  0  0  0  0  0  0  0  0
          1 STATE> .ILL-COND      $ Illegal Conditional
   0  0  0  0  0  0  0  0  0  0  0  0  0  0  0  0  0  0
          2 STATE> COND-END       $ End of conditional
   0  0  0  0  0  0  0  0  0  0  0  0  0  0  0  0  0  0
          3 STATE> COND-LHS-END   $ End of conditional and LHS
   1  1  1  3  1  1  1  2  1  1  1  1  1  1  1  1  1  1
          4 STATE> COND-LIT       $ Literal Match
   1  1  1  3  1  1  1  2  1  1  1  1  1  1  1  1  1  1
          5 STATE> COND-VAR       $ Variable Match
   7  8  1  1  1  1  1  1  1  1  1  1  1  1  1  1  1  1
          6 STATE> COND-COND      $ Conditionals ( =,<>,>, etc.
```

Screen # 45

```
HEX   $ Conditionals State Table                   ( PLB*09/25/86)
$  0  1  2  3  4  5  6  7  8  9  A  B  C  D  E  F 10 11
   1  1  1  3  1  1  1  2  1  1  1  1  1  1  1  1  1  1
          7 STATE> COND-LIT       $ Eg. '> 7' or '= HOUSE'
   1  1  1  3  1  1  1  2  1  1  1  1  1  1  1  1  1  1
          8 STATE> COND-VAR       $ Eg. '<> <X>' or '> <Y>'
   1  1  1  3  1  1  1  2  1  1  1  1  1  1  1  1  1  1
          9 STATE> COND-OR        $ Eg. '<< 7 HOUSE FOOD >>'
   C  E  1  1  1  1  1  1  B  B  B  B  B  B 10  1  1  1
          A STATE> COND-COMPL     $ Found '('
   C  D  1  1  1  1  1  1  1  1  1  1  1  1 10  1  1  1
          B STATE> COND-COND      $ Found condition
   C  D  1  1  1  F  1  1  B  B  B  B  B  B 10  1  1  1
          C STATE> COND-LIT       $ Eg. '> 7' or '= HOUSE'
   C  D  1  1  1  F  1  1  B  B  B  B  B  B 10  1  1  1
          D STATE> COND-VAR       $ Eg. '<> <X>' or '> <Y>'
```

Screen # 46

```
HEX   $ Conditionals State Table                   ( PLB*09/25/86)
$  0  1  2  3  4  5  6  7  8  9  A  B  C  D  E  F 10 11
   C  D  1  1  1  1  1  1  B  B  B  B  B  B 10  1  1  1
          E STATE> COND-VAR       $ Eg. '[ <X>'
   1  1  1  3  1  1  1  2  1  1  1  1  1  1  1  1  1  1
          F STATE> PAUSE          $ Found ']' now must be * or)
   C  D  1  1  1  F  1  1  B  B  B  B  B  B 10  1  1  1
         10 STATE> COND-OR        $ Eg. '<< 7 HOUSE FOOD >>'

EMPTY
```

Screen # 47

```
$ Parse Conditions State Machine                ( PLB*12/12/86)
WVARIABLE COND-STATE
: PARSE-CONDITION   COND-STATE W-OFF    8 COND-TYPE W!
   $ Send attribute offset to RP
   4 ?SEND-RP  16 W,RP      LAST-ATTR @ W,RP
   BEGIN
      GET-ATOM ATOM-TYPE
      COND-STATE W@ 22 * COND-STATES + + 4+ C@
      DUP COND-STATE W!
      22 * COND-STATES + @EXECUTE
   AGAIN ; RECOVER

: .TOO-MANY-LHS .ERROR-LINE ." Too many LHS's in production "
   .'RN$' CR-ABORT ; RECOVER
```

Screen # 48

```
$ PARSE-LHS                                     ( PLB*12/21/86)
: PARSE-LHS     INC-COMP GET-ATOM ATOM-TYPE IF .ILL-ATOM THEN
   AT$ $>TOKEN DUP ?LIT DUP -1 =
```

```
   IF $ Not literalized - literalize it
      DROP L-CREATE-SINGLE LIT-COUNT @ 1-
   ELSE $ Literalized, store info
      SWAP DROP
   THEN OPEN-CLASS #LHS W@ 1- MAX#LHS = IF .TOO-MANY-LHS THEN
   8 ?SEND-RP  08 W,RP  #LHS W@ 1- W,RP  NEGATE-FLAG W@ W,RP
   LIT# W@ DUP W,RP    #LHS W@ 1- DUP >R >CLASS# C!
NEGATE-FLAG W@ IF 0 ELSE #NON-NEGATED-LHS W@ THEN R> >NN-LHS# C!
    GET-ATOM ATOM-TYPE CASE 3 OF END-LHS EXIT ENDOF
    7 OF BEGIN GET-ATOM AT$ $>TOKEN ?ATTR NOT IF .ERROR-LINE
       ." Illegal Attribute in LHS# " #LHS W@ .
       ." in production " .'RN$' CR-ABORT THEN
    PARSE-CONDITION AGAIN ENDOF .ILL-ATOM ENDCASE ; RECOVER
```

Screen # 49

```
$ Named LHS Table entry code                    ( PLB*12/14/86)

: NAMED-LHS AT$ $>TOKEN
$ THE STATE MACHINE MAKES SURE THAT THE NAME IS A VARIABLE !!!!
   #LHS W@ 0 DO I >NAMED-LHS @ OVER =
      IF .ERROR-LINE
         ." Duplicate LHS name on LHS# " #LHS W@ .
         ." in production " .'RN$' CR-ABORT THEN
   LOOP #LHS W@ 1- >NAMED-LHS ! ;
```

Screen # 50

```
$ LHS State Machine Execution Words             ( PLB*11/29/86)
: PARSE-LHS-INC #NON-NEGATED-LHS W-TALLY
                #LHS W-TALLY    PARSE-LHS ;
: NEGATED-LHS   #NON-NEGATED-LHS W@ IF
                   #LHS W-TALLY NEGATE-FLAG W-ON
                ELSE .ERROR-LINE
   ." Negated LHS must be preceded by at least one non-negated
LHS in production " .'RN$' CR-ABORT THEN ;
: INC-LHS#      #LHS W-TALLY #NON-NEGATED-LHS W-TALLY ;

: .NO-RHS      .ERROR-LINE
   ." Production " .'RN$' ."  has no RHS's" CR-ABORT ; RECOVER

: .NO-LHS      .ERROR-LINE
   ." Production " .'RN$' ."  has no LHS's" CR-ABORT ; RECOVER
```

Screen # 51

```
$ LHS Parser State Table and support            ( PLB*07/14/86)

DECIMAL

CREATE LHS-STATES 14   22 * DUP ALLOT  LHS-STATES SWAP ERASE
GILD

: STATE>  ( 18-items state# - )
   22 * LHS-STATES + PAD !
   ' PAD @  !
   0 17 DO  I 4+ PAD @ + C!  -1 +LOOP ;
```

Screen # 52

```
HEX   $ LHS Parser State Table                     ( PLB*07/13/86)
$  0  1  2  3  4  5  6  7  8  9  A  B  C  D  E  F 10 11
   1  1  3  2  6  1  4  1  1  1  1  1  1  1  1  1  B  1
          0 STATE> PAUSE          $ Starting State ( NOOP )
   0  0  0  0  0  0  0  0  0  0  0  0  0  0  0  0  0  0
          1 STATE> .ILL-ATOM      $ Illegal atom ERROR
   0  0  0  0  0  0  0  0  0  0  0  0  0  0  0  0  0  0
          2 STATE> .NO-RHS        $ no RHS in rule ERROR
   1  1  3  2  6  1  4  1  1  1  1  1  1  1  1  1  3  1
          3 STATE> PARSE-LHS-INC  $ '(' found, parse LHS
   1  1  5  1  1  1  1  1  1  1  1  1  1  1  1  1  1  1
          4 STATE> NEGATED-LHS    $ '-' found
   1  1  3  2  6  1  4  1  1  1  1  1  1  1  1  1  B  1
          5 STATE> PARSE-LHS      $ '-(' found, parse neg. LHS
   1  7  9  1  1  1  1  1  1  1  1  1  1  1  1  1  1  1
          6 STATE> INC-LHS#       $ '(' found
```

Screen # 53

```
HEX   $ LHS Parser State Table                     ( PLB*07/13/86)
$  0  1  2  3  4  5  6  7  8  9  A  B  C  D  E  F 10 11
   1  1  8  1  1  1  1  1  1  1  1  1  1  1  1  1  1  1
          7 STATE> NAMED-LHS      $ '( <var>' found
   1  1  1  1  1  0  1  1  1  1  1  1  1  1  1  1  1  1
          8 STATE> PARSE-LHS      $ '( <var> (' found, parse
   1  A  1  1  1  0  1  1  1  1  1  1  1  1  1  1  1  1
```

```
      9 STATE> PARSE-LHS      $ '((' found, parse
1 1 1 1 1 0 1 1 1 1 1 1 1 1 1 1 1 1 1
      A STATE> NAMED-LHS      $ ' <var>' found
0 0 0 0 0 0 0 0 0 0 0 0 0 0 0 0 0 0 0
      B STATE> EXIT           $ '-->' found, exit LHS parse

EMPTY
```

Screen # 54

```
$ Rule LHS Parser State Machine                    ( PLB*11/26/86)
WVARIABLE LHS-STATE
: READ-LHS  NEXT-BIND W-OFF
     LHS-STATE W-OFF
     INIT-RP,  $ Waits for RP to halt before sending LHS's
     $ Send to RP the start of rule code
     04 W,RP      NEXT-RULE @ W,RP        RN-TOKEN @ ,RP
     NEGATE-FLAG      W-OFF
     BEGIN
     GET-ATOM     ATOM-TYPE
        LHS-STATE W@ 22 * LHS-STATES +    + 4+  C@
        DUP LHS-STATE W!
           22 * LHS-STATES + @EXECUTE
     AGAIN ; RECOVER
```

Screen # 55

```
$ RHS Parser                                       ( PLB*12/12/86)
: READ-RHS
   BEGIN GET-ATOM ATOM-TYPE DUP 2 = WHILE DROP
      $ Execute compiling word
         GET-ATOM RHS-VOCAB DEFINITIONS OPS-'
         OPS-VOCAB DEFINITIONS   IF .ERROR-LINE
     ." Illegal RHS action " .AT$ ."  in production " .'RN$'
     ."  on RHS # " #RHS W@ 1+ .
     CR-ABORT THEN
      #RHS W-TALLY DROP EXECUTE
     REPEAT
   3 = IF EXIT ( right parenthesis ) THEN   .ERROR-LINE
   ." Must use a '(' or ')', not "
   .AT$ PP-CR ." to start or end a RHS in production " .'RN$'
   ."  on RHS # " #RHS W@ 1+ . CR-ABORT ; RECOVER
```

Screen # 56

```
$ Vector for closing RHS filter                    ( PLB*12/16/86)

VARIABLE    CLOSE-RHS-CODE
```

Screen # 57

```
$ CLOSE-RULE                                       ( PLB*04/09/87)
: CLOSE-RULE      CLOSE-RHS-CODE @EXECUTE
   CHAR# @             R-ENDCHAR !   #LHS W@ R-#LHS W!
   #NON-NEGATED-LHS W@ R-#NNLHS W!   #RHS W@ R-#RHS W!
   RHS-PTR @ 2+ -4 AND   $ Rule Size !!!!
   DUP RULE-BYTES +! LAST-RULE @ SIZE-OF-FRAME -
   LAST-RULE @ RESIZE-STATIC  COMPLEX W@ R-COMPLEXITY W!
   DUPL-RULE @ DUP -1 = IF DROP ELSE .DELETE-RULE P-REMOVE THEN
   RULE-COUNT TALLY   NEXT-RULE TALLY CLOSE-JOT1
   #NON-NEGATED-LHS W@ DUP TOTAL-NON-NEGATED-LHS W+!
   #LHS W@ SWAP - TOTAL-NEGATED-LHS W+!
   #RHS W@ TOTAL-RHS W+!
   WATCH4? IF NORMAL-TYPE ?CR NEXT-RULE @ 4 U.R
      ."   RP" CURRENT-RP (.) DUP >R TYPE 3 R> - SPACES
   #NON-NEGATED-LHS W@ DUP 4 U.R
  #LHS W@ SWAP - 4 U.R #RHS W@ 5 U.R 3 SPACES .RN$-REV CR THEN ;
```

Screen # 58

```
$ Rule Name Handler                                ( PLB*12/16/86)

: READ-RULE-NAME  GET-ATOM AT$ $>TOKEN DUP RN-TOKEN !
   ?RULE DUPL-RULE !
   P-CREATE  ['] (R-ABORT) 'ABORT !
   [ MAX#BV 4 *  MAX#LHS 7 * + ] LITERAL DUP OPEN-JOT1
```

```
   JOT1 SWAP ERASE
   #NON-NEGATED-LHS W-OFF   #LHS W-OFF   #RHS W-OFF
   R-TOKEN      40 ERASE
   RN-TOKEN @ R-TOKEN  !
   FILE? IF FCB  R-FILENAME             12 *LMOVE THEN
   LAST-CR @     R-STARTCHAR            !
   LINE# @       R-STARTLINE            !
  ATOM-TYPE IF .ERROR-LINE .AT$
     ."  is an invalid production name" CR-ABORT THEN ;
```

Screen # 59

```
$ OPS Rule Parser                                  ( PLB*02/15/87)

OPS: P    $ Read rule name and prepare for new rule
     READ-RULE-NAME COMPLEX W-OFF
     NEXT-RP  LAST-RULE @@ 14 + W!
     READ-LHS     NEXT-BIND W@ R-#BV W!
       #LHS W@ 0= IF .NO-LHS  THEN    4 ?SEND-RP
       [ HEX 8C DECIMAL ] LITERAL W,RP  $ End of LHS def....
           COMPLEX W@ W,RP
       $ Start Rule Processor for second phase of parsing
       SEND-TO-RP  CTRL-Y
     READ-RHS    #RHS W@ 0= IF .NO-RHS  THEN
     $ Everything must be OK, now close rule !!!!!!
     CLOSE-RULE INIT-OPS-ABORT CTRL-C ;
```

Screen # 60

Screen # 61

```
$ CHECK ON

ON DROP-EXIT AT END OF LINE ETC, DOES THE LINE# NEED TO BE FIXED
    ALSO ????
```

Screen # 62

```
Misc. variables
```

Screen # 63

```
Misc. Print utilities
```

Screen # 64

Misc. print utilities

Screen # 65

Screen # 66

```
$ Get Atom  -  Character Translation Table       ( PLB*01/27/86)

GA-TABLE is a translation table for GET-ATOM that allows
   a very quick table look-up of input characters to determine
   which category they are in.

0)  Normal Characters
1)  Delimiter Characters - space, tab, CR, LF, Etc.
2)  ; for a comment delimiter
3)   ) ( ] for reserved characters
4)  (  reserved character
5)  <  reserved character for variables
6)  >  reserved character for variables
7)  -  reserved character for negated LHS, and "-->"
8)  =  reserved character for LHS conditionals
```

Screen # 67

```
$ Get Atom  -  State Definitions                  ( PLB*02/02/86)
DECIMAL
WVARIABLE  (RESERVED-CHAR) $ 1 if atom contains a reserved char
WVARIABLE  (OPS-VAR)       $ 1 if atom is a variable '<xxx>'
: .GA-E3! ( c-)  C$ C!  .GA-E3 ; RECOVER
: .GA-E4! ( c-)  C$ C!  .GA-E4 ; RECOVER

: GA-COMMENT ( c-)   DROP BEGIN GC 13 = UNTIL ;
: CLEAN-ATOM   32   AT$ C@ 1+  AT$ + C! ;
: DROP-EXIT ( c-) CLEAN-ATOM -1 CHAR# +! R> 2DROP ;
: ADD-CHAR ( c-) AT$ C@  AT$ 1+ + C!   1 AT$ C+! ;
: ADD-EXIT ( c-) ADD-CHAR CLEAN-ATOM R> DROP ;
: ADD-RCHAR ( c-)  1 (RESERVED-CHAR) W!  ADD-CHAR ;
: ADD-REXIT ( c-)  ADD-RCHAR  CLEAN-ATOM R> DROP ;
: ADD-VEXIT ( c-) 1 (OPS-VAR) W! ADD-CHAR CLEAN-ATOM R> DROP ;
```

Screen # 68

Get Atom  -  State Definitions

DROP-EXIT  end of atom has been found

ADD-VEXIT  end of variable has been found

ADD-EXIT  end of atom has been found

ADD-REXIT  end of reserved atom has been found

Screen # 69

Get Atom State Machine Support

GET-ATOM-STATES is the state machine table for GET-ATOM

S> is the word that stuffs the state machine table

Screen # 70

```
$ Get Atom  -  Get Atom State Table               ( PLB*01/29/86)

GET-ATOM-STATES is the state table for GET-ATOM

State 0   - Wait for start of atom
State 1   - Read comment to end of line
State 2   - Append atom characters
State 3   - Append character then exit
State 4   - Backup character pointer then exit
State 5   - " Catastrophic Failure"
State 6   - Start of atom is '<'
State 7   - Add characters to variable atom
State 8   - " Missing '>' in variable"
State 9   - Start of atom is '>'
```

Screen # 71

```
$ Get Atom  -  Get Atom State Table               ( PLB*02/02/86)
HEX

State A   - Start of atom is '-'
State B   - Detected '--' pattern
State C   - " Illegal character following '-' "
State D   - " Missing '-->' in rule"
State E   - Add reserved character then exit
State F   - Add '>' to end of variable type atom then exit
State 10  - Start of atom is '='
```

Screen # 72

```
$ Get Atom                                        ( PLB*02/27/86)
WVARIABLE AT-STATE

: GET-ATOM ( atom is returned in AT$ )  AT$ W-OFF
  AT-STATE W-OFF  (RESERVED-CHAR) W-OFF   (OPS-VAR) W-OFF
    BEGIN   GC   DUP GA-TABLE + C@
       AT-STATE W@ 16 * GET-ATOM-STATES + 4+ + C@
       DUP AT-STATE W!  16 * GET-ATOM-STATES +
    @EXECUTE AGAIN ; RECOVER

$ GET-ATOM is the main state machine word to get proper OPS
$   atoms from either the keyboard or a file.
```

Screen # 73

Screen # 74

OPS <> FORTH Support

OPS: defines OPS commands that are valid at the OPS prompt

OPS-VIEW allows for quick debugging of OPS: words.

Screen # 75

This is the main OPS command loop

Screen # 76

(OPS-ABORT) is the OPS Abort vector word

Screen # 77

OPS Initialization

OPS goes from the FORTH environment to the OPS environment

Screen # 78

Some OPS Commands

END')' looks in the character input stream for a ')'
An error message is printed if ')' is not found.

Screen # 79

OPS Literalize Statement

FINISH-LITERALIZE is for OPS compatibility. Actually does nothing here !!!

Screen # 80

```
$ OPS Literalize Statement                          ( PLI*10/14/86)
OPS: FINISH-LITERALIZE  END')' ;
VARIABLE LIT-HDL
VARIABLE    LAST-LIT    $ Pointer to last literalize frame
WVARIABLE   LIT#        $ Class number of last literalize frame
VARIABLE    LAST-L-HDL  $ Last literalize handle
: INIT-LIT   LIT-COUNT OFF  60 DUP DUP LIT-BYTES !
    OPEN-STATIC DUP LIT-HDL ! CLOSE-STATIC ;
: >CLASS-LIST ( class# - addr ) 4* LIT-HDL @@ + @@ ;
: OPEN-CLASS ( class# - ) DUP LIT# W!  >CLASS-LIST LAST-LIT ! ;
: L-PTR ( - addr-of-wme-frame)   LAST-LIT @ @@ ;
: L-FREE ( - addr-of-free-field) LAST-LIT @ 4+ ;
: L-SIZE ( - addr-of-size-field) LAST-LIT @ 8 + ;
: L-#    ( - addr-of-#-field)    LAST-LIT @ 10 + ;
: L-TOK  ( - addr-of-token)      LAST-LIT @ 12 + ;
: L-1ST  ( - addr-of-1st-attr)   LAST-LIT @ 16 + ;
```

Screen # 81

OPS Literalize Statement
L-CREATE creates the static frames for an empty literalize L-CREATE-SINGLE creates a literalize frame with no attributes For use within LHS compiler for things such as START which do not need to be literalized.

?ATTR scans the current literalize statement to see if a given attribute has been defined

Screen # 82

OPS Literalize Statement
ADD-ATTRIBUTE adds an attribute to the end of the current literalize statement ?LIT scans through literalize statements to see if something has been literalized or not

Screen # 83

OPS Literalize Statement

LITERALIZE is the OPS: word to literalize items and to add normal attributes.

Screen # 84

Rule Initialization and support

INIT-RULE initializes the rule compiler support

RULE>ADDR gives address of rule frame given the 0 based rule#
RULE>HDL gives address of rule handle given the 0 based rule#

?RULE scans rule list to see if a rule of the given name exists

Screen # 85

Rule frame access words

R-BVNAMES @ gives the offset within the rule frame of the BV name list
R-#BV W@ gives the number of BV in the LHS of a rule (new RHS bindings are not counted)

Screen # 86

,RHS words for RHS compilation
RHS-PTR offset into rule frame on HOST
LAST-RULE contains handle of rule frame on HOST >RHS converts offset into real address of rule frame ,RHS adds 4 byte word to rule code
W,RHS adds 2 byte word to rule code
RHS,CFA adds FORTH CFA to rule code

[RHS,CFA] compiles next word into rule code

Screen # 87

Rule Creation Support
DUPL-RULE for detecting duplicate rule names
P-CREATE sets up for a new rule P-REMOVE ( n-) removes specified rule from system

Screen # 88

Rule Parser Error ABORT vector (R-ABORT) closes current rule when an error has been detected CLEAR-#FIRINGS clears the # of firings stat for all rules CLEAR-CLASS clears the stats kept for literalize statements

Screen # 89

OPS initialization code

INIT-OPS is the main OPS initialization word

Screen # 90

Atom Characterization routine

0 - Normal Atom
1 - Variable Atom
2 - (
3 - )
4 - {
5 - }
6 - -
7 - ^
8 - =
9 - >

Screen # 91

Atom Characterization routine

A - <
B - <>
C - => or >=
D - =< or <=
E - <<
F - >>
10 - -->
11 - Invalid Atom

Screen # 92

Screen # 93

Screen # 94

Screen # 95

JOT access words
COMPLEX keeps a running total of the current rule's complexity

INC-COMP increments the complexity stat

>BIND given BV#, points to token of BV name
>NAMED-LHS given LHS#, points to LHS name >CLASS# given LHS#, points to CLASS # of LHS >REM-FLAG given LHS#, points to remove flag >NN-LHS# given LHS#, points to non-negated LHS#

Screen # 96

Bound Variable Checker

BIND-VAR binds a variable

BOUND? determines if a variable has been bound or not.

Screen # 97

Simple Conditions involving variables
COND-TYPE condition type
COND-VAR-TAB table of codes to send to RP COND-VAR deals with conditions on variables.

Screen # 98

Conditionals Support
COND-COND stores condition code

COND-COMPL compound condition

COND-LIT-TAB table of RP codes to handle conditions on literals

?$>TOKEN returns 0 if atom is 'NIL'

COND-LIT handles conditions on literals

Screen # 99

OR'ed condition execution words

OR-EXIT exit OR state.....
OR-LIT-TAB RP stream codes for OR'd conditions
OR-LIT handles OR of a literal OR-VAR-TAB RP stream codes for OR'd conditions
OR-VAR handles OR of a variable

Screen # 100

State Machine for OR'd literals and variables

Screen # 101

COND-OR is the state machine to handle parsing of OR'd statements

Screen # 102

Various words for the LHS parsing state machine

Screen # 103

State machine support for parsing a single conditional

Screen # 104

Screen # 105

Screen # 106

Screen # 107

Parse Conditions State Machine

PARSE-CONDITION is the main condition parsing state machine

Screen # 108

PARSE-LHS
PARSE-LHS is the main word for parsing LHS's

Screen # 109

Support for named LHS's

Screen # 110

( PLB#11/25/86)

Can't have a negated LHS as the first LHS in a rule

Screen # 111

Outer state machine for parsing LHS's

Screen # 112

State machine table for outer LHS parser

Screen # 113

State machine table for outer LHS parser

Screen # 114

Main state machine for parsing rule LHS's. Loops until the '-->' is found

Screen # 115

RHS Parser

READ-RHS reads RHS's until the end of the rule is reached. This word executes the RHS: words.

Screen # 116

Screen # 117

CLOSE-RULE completes the parsing of a rule and closes all rule data arrays.

Screen # 118

```
Rule Name Handler

READ-RULE-NAME reads rule name and opens rule frame
```

Screen # 119

```
OPS Rule Parser

P is the main OPS rule compiler word.
```

Screen # 0

```
$ OPSVAR.PF -- OPS Variables                     ( PLB*05/19/86)

Update Records :

<01> 05/19/86 PLB  -  Creation of OPS Variables
```

Screen # 1

```
$ Load Screen for OPS Variables                  ( PLB*01/19/87)
DECIMAL
START-SEGMENT .( ==> OPS Variables)
      2  3    THRU       $ Status and debug variables
      4       LOAD       $ Parser Variables
      5       LOAD       $ Vector for LIT to init WME frame
      6  7    THRU       $ Watch Support
      8       LOAD       $ Immediate Counter
      9       LOAD       $ ALIGN
      10      LOAD       $ Strategy
      11      LOAD       $ FILE-ACCEPT
END-SEGMENT
```

Screen # 2

```
$ OPS Room Status output                         ( PLB*03/16/87)
VARIABLE LIT-COUNT       VARIABLE LIT-BYTES
VARIABLE RULE-COUNT      VARIABLE RULE-BYTES
VARIABLE WME-COUNT       VARIABLE WME-BYTES
VARIABLE TIME-TAG
VARIABLE [RHS#]
VARIABLE FIRED-COUNT

: @LIT-BYTES LIT-BYTES @ ;        : @LIT-COUNT LIT-COUNT @ ;
: @WME-BYTES WME-BYTES @ ;        : @WME-COUNT WME-COUNT @ ;
: @RULE-BYTES RULE-BYTES @ ;      : @RULE-COUNT RULE-COUNT @ ;
: @TIME-TAG   TIME-TAG @ ;
```

Screen # 3

```
$ Host Debug Variable Definitions                ( PLB*07/12/86)

VARIABLE    <HOST1>          <HOST1> OFF
VARIABLE    <HOST2>          <HOST2> OFF
VARIABLE    <HOST3>          <HOST3> OFF
VARIABLE    <HOST4>          <HOST4> OFF
VARIABLE    <HOST5>          <HOST5> OFF
```

Screen # 4

```
$ OPS Parser Variables                           ( PLB*10/17/86)

$ Below are used by rule parser...............
WVARIABLE   NEGATE-FLAG
WVARIABLE   #NON-NEGATED-LHS
WVARIABLE   #LHS
WVARIABLE   #RHS
32 1024 * CONSTANT INITIAL-PROD-SIZE
$ Below are used for system statistics
WVARIABLE   TOTAL-NON-NEGATED-LHS
WVARIABLE   TOTAL-NEGATED-LHS
WVARIABLE   TOTAL-RHS
   : @TOT-NN-LHS  TOTAL-NON-NEGATED-LHS W@ ;
   : @TOT-N-LHS   TOTAL-NEGATED-LHS W@ ;
   : @TOT-RHS     TOTAL-RHS W@ ;
```

Screen # 5

```
$ Variables & Vectors used by MAKE/MODIFY/REMOVE ( PLB*11/01/86)

VARIABLE 'INIT-LIT&WME        $ Used to allow literalize after
          $ first make/mod/remove initialize its WME frame


VARIABLE 'INIT-WME            $ Used by main init function to
          $ allow wme package to init itself


VARIABLE '1ST-WME              $ used by wme package to finish
          $ wme init when first wme is made !!!!

VARIABLE MAX-WME
VARIABLE MAX-WMEB
```

Screen # 6

```
$ Watch Variable and flag-check words            ( PLB*12/14/86)
VARIABLE [WATCH]
: WATCH1? [WATCH] @ 1 AND ;       : WATCH2? [WATCH] @ 2 AND ;
: WATCH3? [WATCH] @ 4 AND ;       : WATCH4? [WATCH] @ 8 AND ;
: WATCH5? [WATCH] @ 16 AND ;      : WATCH6? [WATCH] @ 32 AND ;
: .WTCH   [WATCH] @ IF
      WATCH1? IF ." 1 (P) "  THEN
      WATCH2? IF ." 2 (WM) " THEN
      WATCH3? IF ." 3 (CS) " THEN
      WATCH4? IF ." 4 (PS) " THEN
      WATCH5? IF ." 5 (MM) " THEN
      WATCH6? IF ." 6 (MSG)" THEN
   ELSE ." 0 (OFF)" THEN ;

: .WATCH ?CR ?WAIT ." Watch is set to " .WTCH ;
: ?.WATCH WATCH6? IF .WATCH THEN ;
```

Screen # 7

```
$ Watch Variable and flag-check words            ( PLB*12/12/86)

: !WATCH ( N-)  DUP [WATCH] ! ^NET <WATCH> ! ;
: SET-WATCH ( mask - )  [WATCH] @ OR !WATCH ;

CODE COMPLEMENT ( n - n )  S ) COM NEXT
: CLR-WATCH ( mask - )  COMPLEMENT [WATCH] @ AND !WATCH ;

: WATCH-0  0 !WATCH ;
: +W-1   1 SET-WATCH ;          : +W-2  2 SET-WATCH ;
: +W-3   4 SET-WATCH ;          : +W-4  8 SET-WATCH ;
: +W-5  16 SET-WATCH ;          : +W-6 32 SET-WATCH ;

: -W-1   1 CLR-WATCH ;          : -W-2  2 CLR-WATCH ;
: -W-3   4 CLR-WATCH ;          : -W-4  8 CLR-WATCH ;
: -W-5  16 CLR-WATCH ;          : -W-6 32 CLR-WATCH ;
```

Screen # 8

```
$ IMMEDIATE COUNTER                              ( PLB*03/16/87)
$ for WM, REMOVE, MODIFY from keyboard

VARIABLE    IMM-CNT
```

```
VARIABLE     TOTAL-#-IN-CS
VARIABLE     INST-#-IN-CS
```

Screen # 9

```
$ ALIGN                                          ( PLB*12/06/86)

: ALIGN ( #char starting-col - )
  C# W@ OVER 2DUP > IF 2DROP ELSE SWAP - 1 MAX
                                          SPACES 2DROP EXIT THEN
  OVER 2+ C# W@ +   #KBD-COL > IF CR SPACES DROP EXIT THEN
  2DROP 2 SPACES ;
```

Screen # 10

```
$ Strategy Support                               ( PLB*12/14/86)

WVARIABLE [STRATEGY]

: LEX? ( - f ) [STRATEGY] W@ NOT ;
: MEA? ( - f ) [STRATEGY] W@ ;

: .STRATEGY  ?CR ." Strategy is set to "
       MEA? IF ." MEA" ELSE ." LEX" THEN ;
: ?.STRATEGY WATCH6? IF .STRATEGY THEN ;

: SET-LEX   [STRATEGY] W-OFF ^NET <STRATEGY> W-OFF ;
: SET-MEA   [STRATEGY] W-ON  ^NET <STRATEGY> W-ON  ;
```

Screen # 11

```
$ FILE-ACCEPT stuff                              ( PLB*01/19/87)

36      ARRAY   ACCEPT-FCB      $ holds filename for FILE-ACCEPT
134     ARRAY   ACCEPT-BUFF     $ holds 1 line from file
128     ARRAY   ACC-FCB-BUFF    $ holds 1 128 byte record
WVARIABLE       (FILE-ACCEPT)
WVARIABLE       (ACCEPT-PTR)
```

Screen # 30

Screen # 31

Screen # 32

Screen # 33

Screen # 34

Screen # 35

Screen # 36

```
                                                 ( PLB*10/17/86)
Watch Levels:
0   - all off
1   - Production Firing Status
2   - WME make/modify/remove status
3   - Conflict set status
4   - Rule status during compile phase
5   - Memory management status
```

Screen # 37

Screen # 38

Screen # 39

Screen # 40

Screen # 41

Screen # 0

```
$ OPSCMD.PF -- OPS Commands                    ( PLB*05/19/86)

Update Records :

<01> 05/19/86 PLB  -  Creation of OPS Commands
```

Screen # 1

```
$ Load Screen for OPS Commands                 ( PLB*03/19/87)
START-SEGMENT .( ==> OPS Commands)
    2     OPSCMD.PF   LOADS ..OPS
    3   4    THRU       $ LIT-LIST
        5    LOAD       $ OPS-ON-FLAG
    6  10    THRU       $ Misc. OPS Commands
       11    LOAD       $ TIMER COMMANDS
    12 16    THRU       $ PMLIST, EXCISE
       17    LOAD       $ TYPE command
    18 19    THRU       $ WATCH commands
       20    LOAD       $ WMSTAT
    21 23    THRU       $ WINDOW, SERVE, ENABLE, DISABLE
    24 27    THRU       $ RUN, RUN-TILL
    28       LOAD       $ STRATEGY
35 LOAD        29     LOAD        $ FILE-ACCEPT
 31 32   THRU    33 34 THRU END-SEGMENT  $ CS and FROCS
```

Screen # 2

```
$ Reload Screen for OPS System                 ( PLB*10/28/86)

-TWINS
2 FILES.PF LOAD-FROM
   GET-RP-CONFIGURATION
   FIRST-RP DUP RP-SERVER# W!
   #RP 8 - MIN BASE-RP W!
+TASK1
```

Screen # 3

```
$ Literalize List Output                       ( PLB*02/15/87)
DECIMAL

: .LIT ( index-)  ?CR ?CWAIT OPEN-CLASS
   L-TOK @ TOKEN>$ ( CR) COUNT +REV TYPE -REV
   L-# W@ ?DUP IF 0 DO  I 4* L-1ST + @
      TOKEN>$ COUNT DUP 20 ALIGN TYPE
   LOOP THEN ;

: .LER ( garbage-) DROP .AT$ ." has not been LITERALIZE'd" ;

: ?.LIT   AT$ TOKEN? DUP 0= IF .LER EXIT THEN
        ?LIT DUP -1 = IF .LER EXIT THEN .LIT ;
```

Screen # 4

```
$ Literalize List Output                       ( PLB*12/14/86)
HEX
: ?LITL LIT-COUNT @ 0= IF ?CR  ." Nothing has been LITERALIZED"
      R> DROP THEN ;

: .L-ALL LIT-COUNT @ ?DUP IF 0 DO I .LIT LOOP THEN ( CR) ;

OPS: LIT-LIST   GET-ATOM  AT$ W@ 0129 = IF ?LITL
       LIT-COUNT @ 1- .LIT EXIT  THEN
    AT$ W@ 012A = IF ( '*') END')' ?LITL .L-ALL EXIT THEN
    ?.LIT ( Print the first one)
    BEGIN   GET-ATOM   AT$ W@ 0129 = NOT WHILE ?.LIT REPEAT
    ( CR) ;
```

Screen # 5

```
$ OPS-ON-FLAG, STATUS                          ( PLB*11/23/86)
HEX
: OPS-ON-FLAG ( -f) GET-ATOM
   AT$ @ >R   0
   R@ ( ON ) 024F4E20 = IF 2+ THEN
   R@ ( on ) 026F6E20 = IF 2+ THEN
   R@ ( OFF) 034F4646 = IF 1+ THEN
   R> ( off) 036F6666 = IF 1+ THEN
   DUP 0= IF .ERROR-LINE ." Switch must be 'ON' or 'OFF'"
         CR-ABORT THEN
   END')'
   1- ;
OPS: STATUS   OPS-ON-FLAG IF NEW-RP-VAR +TASK1
  ( BEGIN PAUSE RP-VAR-UPDATE W@ 0= UNTIL) ELSE -TASK1 THEN ;
```

Screen # 6

```
$ Some OPS Commands                            ( PLB*12/11/86)
DECIMAL
: ?FIX-VT   #KBD-COL 132 = IF -COMP THEN ;

: opBYE   NORMAL-TYPE
       ?FIX-VT CR ." Exiting to CP/M" CR BYE ; RECOVER
```

```
OPS: BYE  END')' opBYE ; RECOVER
OPS: EXIT END')' opBYE ; RECOVER

OPS: FORTH END')' ?FIX-VT  EMPTY
    FORTH DEFINITIONS  GILD  ['] (ABORT)  'ABORT !
    CR ." Exiting to polyFORTH" CR FORTH-I/O ABORT ; RECOVER

OPS: VT-80  END')'  -COMP ;
OPS: VT-132 END')'  +COMP ;
```

Screen # 7

```
$ OPS File Load Command                                    ( PLB*01/30/86)
DECIMAL

OPS: LOAD    GET-ATOM  AT$ PAD ATOM-LENGTH MOVE  $ Save filename
             END')'   PAD FILE-OPEN
             PAD AT$ ATOM-LENGTH MOVE
             DUP 0= IF DROP EXIT THEN
             .ERROR-LINE
DUP 1 = IF ." No more room on file stack to open more files"
                                                           THEN
DUP 2 = IF ." Filename error, " .AT$ THEN
DUP 3 = IF ." File Open Error, " .AT$ THEN
        CR-ABORT ; RECOVER
```

Screen # 8

```
$ More OPS Commands                                        ( PLB*12/06/86)
DECIMAL

OPS: CRT        OPS-ON-FLAG IF +CRT ELSE -CRT THEN ;
OPS: PRINTER    OPS-ON-FLAG IF +PRT ELSE -PRT THEN ;

OPS: PAGE       END')' PAGE ;
```

Screen # 9

```
$ OPS Room Status output                                   ( PLB*03/16/87)
DECIMAL

: .HRM ( cnt bytes - ) $ HOST-ROOM
   DUP >R 6 U.R ."  in " DUP 7 U.R ."  bytes"
   R> DUP IF ." , " / 5 U.R ."  average" ELSE 2DROP THEN CR ;
OPS: ROOM  END')' ?CR 10 SPACES ." Host Memory Status" CR CR
   ." Literalize        " LIT-BYTES @     LIT-COUNT @     .HRM
   ." Production RHS's " RULE-BYTES @    RULE-COUNT @    .HRM
   ." String tokens     " @TOKEN-BYTES   @TOKEN-COUNT    .HRM  CR
   10 SPACES RULE-BYTES @ LIT-BYTES @ + @TOKEN-BYTES  +
       U. ." total bytes with "
   HOST-FREE-MEM U. ." bytes left over" CR ;
```

Screen # 10

```
$ Misc. OPS Commands                                       ( PLB*01/21/87)

OPS: RESET     END')'    'INIT-OPS @EXECUTE ;
VARIABLE (STP-WTCH)
: @SEC ( - n )  @CLOCK <HOURS> W@ 3600 * <MINUTES> W@ 60 * +
              <SECONDS> W@ + ;
OPS: STOPWATCH OPS-ON-FLAG IF
        @SEC (STP-WTCH) !
    ELSE
        @SEC (STP-WTCH) @ -
        ?CR ." The stopwatch is " 10 * 6 /
        <# # # 46 HOLD #S #> TYPE ."  minutes."
    THEN ;
```

Screen # 11

```
$ Timer Commands                                           ( PLB*03/25/87)

OPS: TIME    END')'  START-TIMER ;

OPS: END-TIME   END')'  ?CR ." Timer is " .END-TIME ;

OPS: CLOCK      END')'  ?CR ." The time is " @TIME (HMS) TYPE
            ."  on " @DATE .DATE ;

OPS: WAIT    END')'  SEND-TO-NET WAIT-FOR-RP-COMPLETE ;
```

Screen # 12

```
$ Rule EXCISE                                              ( PLB*02/15/87)
DECIMAL
: PM-EX ( index - ) CTRL-C
    DUP 4* RULE-HDL @@ + @
       IF DUP 4* RULE-HDL @@ + @@ @ RN-TOKEN !
             ?CR ." Excising production " .RN$
          P-REMOVE
       ELSE DROP THEN ;
```

Screen # 13

```
$ Rule List Output                                         ( PLB*04/07/87)
DECIMAL
: .RUL ( index - ) ?CR DUP 4* RULE-HDL @@ + @ IF
     ?CWAIT DUP 1+ 4 U.R  3 SPACES RULE>ADDR >R
     R@ @ RN-TOKEN ! .RN$-REV PP-CR
     R@ 6 + W@  4 U.R ."  Non-negated LHS,"
     R@ 4+ W@ R@ 6 + W@ - 4 U.R ."  Negated LHS,"
     R@ 8 + W@ 5 U.R ."  RHS"
     R@ 14 + W@ ."    RP" (.) DUP >R TYPE 3 R> - SPACES
   R> 10 + @ DUP 7 U.R 1 = IF ."  Firing" ELSE ."  Firings" THEN
     ELSE 1+ 4 U.R 3 SPACES ." is not defined" CR THEN ;
```

Screen # 14

```
$ Production execution shell                               ( PLB*09/19/86)

VARIABLE (PM-EXEC)      $ vector for execution word

: .RER    .AT$ ."  is not a production" CR ;

: ?(RUL)    AT$ TOKEN? DUP 0= IF DROP .RER EXIT THEN
        DUP TOKEN-NUM? IF TOKEN># DUP
        CASE
            1 NEXT-RULE @ RANGEOF
               1- DUP 4* RULE-HDL @@ + @ 0=
               IF DROP .RER ELSE (PM-EXEC) @EXECUTE THEN ENDOF
            DROP .RER ENDCASE
        ELSE
            ?RULE DUP -1 = IF DROP .RER EXIT THEN
            (PM-EXEC) @EXECUTE THEN ;
```

Screen # 15

```
$ Production execution shell                               ( PLB*09/19/86)
HEX
: ?RULL RULE-COUNT @ 0= IF ." No productions defined"
      CR R> DROP THEN ;

: R-ALL NEXT-RULE @ ?DUP IF 0 DO I (PM-EXEC) @EXECUTE
        LOOP THEN ;

: PM-EXEC   GET-ATOM  AT$ W@ 0129 = IF ?RULL
        $ below, scan from end of list  <FIX-THIS> !!!!!
        0 NEXT-RULE @ 1- DO I 4* RULE-HDL @@ + @
            IF I LEAVE THEN -1 +LOOP
               (PM-EXEC) @EXECUTE EXIT  THEN
    AT$ W@ 012A = IF ( '*') END')' ?RULL R-ALL EXIT THEN
    ?(RUL) ( Execute the first one)
    BEGIN   GET-ATOM   AT$ W@ 0129 = NOT WHILE ?(RUL) REPEAT ;
```

Screen # 16

```
$ PMLIST, EXCISE                                           ( PLB*09/19/86)

OPS: PMLIST     ['] .RUL (PM-EXEC) !  PM-EXEC ;

OPS: EXCISE     ['] PM-EX (PM-EXEC) !  PM-EXEC ;
```

Screen # 17

```
$ TYPE command                                    ( PLB*12/14/86)

OPS: TYPE ?CR
     BEGIN GET-ATOM ATOM-TYPE 3 - WHILE
        AT$ COUNT TYPE SPACE REPEAT ;
```

Screen # 18

```
$ WATCH command                                   ( PLB*12/14/86)
HEX OPS: WATCH
   SEND-TO-NET
   BEGIN GET-ATOM AT$ W@ 0129 = NOT
   WHILE AT$ @   CASE
   01302000 OF WATCH-0 ENDOF   034F4646 OF WATCH-0 ENDOF
   01312000 OF +W-1 ENDOF   01502000 OF +W-1 ENDOF
   01322000 OF +W-2 ENDOF   02574D20 OF +W-2 ENDOF
   01332000 OF +W-3 ENDOF   02435320 OF +W-3 ENDOF
   01342000 OF +W-4 ENDOF   02505320 OF +W-4 ENDOF
   01352000 OF +W-5 ENDOF   024D4D20 OF +W-5 ENDOF
   01362000 OF +W-6 ENDOF   034D5347 OF +W-6 ENDOF
      .WARNING-LINE ." Illegal Watch Command" CR
      ENDCASE   REPEAT .WATCH ;
```

Screen # 19

```
$ NO-WATCH command                                ( PLB*12/14/86)
HEX OPS: NO-WATCH   SEND-TO-NET
                    BEGIN GET-ATOM AT$ W@ 0129 = NOT
   WHILE AT$ @   CASE
   01312000 OF -W-1 ENDOF   01502000 OF -W-1 ENDOF
   01322000 OF -W-2 ENDOF   02574D20 OF -W-2 ENDOF
   01332000 OF -W-3 ENDOF   02435320 OF -W-3 ENDOF
   01342000 OF -W-4 ENDOF   02505320 OF -W-4 ENDOF
   01352000 OF -W-5 ENDOF   024D4D20 OF -W-5 ENDOF
   01362000 OF -W-6 ENDOF   034D5347 OF -W-6 ENDOF
      .WARNING-LINE ." Illegal Watch Command" CR
      ENDCASE   REPEAT .WATCH ;
```

Screen # 20

```
$ WMSTAT function                                 ( PLB*02/15/87)
OPS: WMSTAT END')' ?CR
   LIT-COUNT @ ?DUP IF ." WME Statistics:" CR   36 SPACES
      ." Current          Maximum          Bytes/WME"
      CR 0 DO ?CWAIT I OPEN-CLASS
      L-TOK @ TOKEN>$ COUNT +REV TYPE -REV
      C# W@ DUP 30 > IF DROP CR 30 ELSE 30 SWAP - THEN SPACES
   5 SPACES     L-CNT @ 8 U.R        $ current wme count
  10 SPACES     L-MAX @ 8 U.R        $ maximum wme count
  10 SPACES     L-SIZE W@ 8 U.R      $ size of each wme
         CR LOOP
   ." WME Count:"  25 SPACES WME-COUNT @ 8 U.R 10 SPACES
         MAX-WME @ 8 U.R CR
   ." WME Bytes:"  25 SPACES WME-BYTES @ 8 U.R 10 SPACES
         MAX-WMEB @ 8 U.R
   ELSE ." Nothing has been literalized." CR THEN ;
```

Screen # 21

```
$ CONV-RP#                                        ( PLB*11/23/86)

: CONV-RP# ( - rp# or -1 )
   AT$ TOKEN? ?DUP NOT IF -1 EXIT THEN
   DUP TOKEN-NUM? IF TOKEN># ELSE DROP -1 EXIT THEN
   ( # ON STACK)
   DUP 0 #RP WITHIN NOT IF DROP -1 THEN ;
```

Screen # 22

```
$ WINDOW OPS command                              ( PLB*12/14/86)
OPS: WINDOW GET-ATOM ?CR ATOM-TYPE 3 = IF
      ." Status Window is set to RP" BASE-RP W@ . ELSE
      CONV-RP# END')' DUP -1 =
         IF ." Illegal Rule Processor Number - Window not cha
nged" DROP
         ELSE DUP SVR-WINDOW ." Status Window has been set to
 RP" . THEN THEN ;

OPS: SERVE GET-ATOM ?CR ATOM-TYPE 3 = IF
      ." Server is set to RP" RP-SERVER# W@ . ELSE
      CONV-RP# END')' DUP -1 =
         IF ." Illegal Rule Processor Number - Server not cha
nged" DROP
         ELSE DUP SVR-SERVE ." Server has been set to RP"
      . THEN THEN ;
```

Screen # 23

```
$ RP ENABLE and DISABLE from keyboard             ( PLB*03/19/87)

OPS: ENABLE
   BEGIN ?CR GET-ATOM ATOM-TYPE 3 - WHILE
   CONV-RP# DUP -1 = IF DROP ." Illegal Rule Processor Number -
 " .AT$ ELSE DUP RP-ENABLE ." Enable RP" . THEN  REPEAT ;

OPS: DISABLE
   BEGIN ?CR GET-ATOM ATOM-TYPE 3 - WHILE
   CONV-RP# DUP -1 = IF DROP ." Illegal Rule Processor Number -
 " .AT$ ELSE DUP RP-DISABLE ." Disable RP" . THEN  REPEAT ;
```

Screen # 24

```
$ RUN support                                     ( PLB*12/21/86)
CODE FILTER-EXECUTE   S )+ W MOV     ' QUIT 4- @ AB JMP
: ?.TOKEN ?DUP IF .TOKEN ELSE ." NIL" THEN ;

: .CS ( lhs# - ) >R R@ R-#BV W@ 4* R-TOKEN + R-BVNAMES @ +
   BIT-TST IF ( non-negated) R> 4* ~W1 <CONFLICT-SET> + @
      (.) DUP 1+ .PP  TYPE SPACE
   ELSE R> DROP 3 .PP ." — " THEN ;
: .RUN ?CR FIRED-COUNT @ 1+ +UL 0 U.R ." ." SPACE -UL
   +REV R-TOKEN @ .TOKEN  -REV 2 SPACES
   R-#LHS W@ 0 DO I .CS LOOP CR    WATCH3? IF
      R-#BV W@ ?DUP IF 0 DO  I 4* R-TOKEN + ( base)
      R-BVNAMES @ + @ 5 SPACES .TOKEN  ."  = "
      I 4* ~W1 <BOUND-VARIABLES> + @ ?.TOKEN CR
   LOOP THEN THEN ;
```

Screen # 25

```
$ RUN support                                     ( PLB*02/15/87)
HEX
: RUN-ONE ( - couldn't-run-production-flag )
   $ Send "Evaluate Rules" msg to Network
   2 ?SEND-NET   84 W.NET    SEND-TO-NET CTRL-Y
   NORMAL-TYPE WAIT-FOR-RP-COMPLETE  RESOLVE-HOST-CONFLICT
      CTRL-C
      DUP -1 =  IF $ Couldn't fire a rule
         DROP 1
      ELSE   $ Fire production !!!!
         DUP OPEN-RULE  6 ?SEND-NET  88 W.NET
            R-RP# W@ W.NET     W.NET ( rule# ) BUFFER-TYPE
         WATCH1? WATCH3? OR IF .RUN THEN
         R-#FIRINGS TALLY    FIRED-COUNT TALLY
         R-RHSCODE FILTER-EXECUTE  0
      THEN ;
```

Screen # 26

```
$ RUN command                                     ( PLB*02/15/87)
: .ILL-CNT  .ERROR-LINE ." Expecting a number in this position i
nstead of " .AT$ CR-ABORT ; RECOVER
: .NO-PROD-TRUE  ?CR ." No Productions true " CR ;

: +RUN-TILL ( firing-offset - )  CTRL-C-FLG W-OFF
            AT$ TOKEN? DUP 0= IF .ILL-CNT THEN
            DUP TOKEN-NUM? IF TOKEN># ELSE .ILL-CNT THEN
         ( calculate where to go to ) +
         FIRED-COUNT @ OVER < NOT  IF .WARNING-LINE
           ." Can't RUN-TILL a previous firing number" CR
         END')' ELSE END')'
         WAIT-FOR-RP-COMPLETE
         BEGIN ?CWAIT RUN-ONE IF .NO-PROD-TRUE DROP EXIT THEN
            FIRED-COUNT @ OVER = UNTIL THEN DROP ;
```

Screen # 27

```
$ RUN command                                     ( PLB*01/29/87)

: RUN-ALL WAIT-FOR-RP-COMPLETE   CTRL-C-FLG W-OFF
     BEGIN RUN-ONE IF .NO-PROD-TRUE EXIT THEN AGAIN ;
```

```
OPS: RUN    GET-ATOM   ATOM-TYPE 3 = IF
               0 RUN-ALL DROP ( 0 drop for HALT stack)
            ELSE FIRED-COUNT @ +RUN-TILL THEN ;

OPS: RUN-TILL   GET-ATOM 0 +RUN-TILL ;
```

Screen # 28

```
$ STRATEGY                                        ( PLB*12/14/86)
HEX
OPS: STRATEGY GET-ATOM ATOM-TYPE 3 = IF
        .STRATEGY
      ELSE
        AT$ @
        CASE
          034C4558 OF SET-LEX ENDOF
          034D4541 OF SET-MEA ENDOF
          .WARNING-LINE
          ." Strategy must be set to LEX or MEA." CR
          ENDCASE
          .STRATEGY END')'
      THEN ;
```

Screen # 29

```
$ FILE-ACCEPT                                     ( PLB*01/19/87)

: READ-ACCEPT-FILE   (ACCEPT-PTR) W-OFF
    ACC-FCB-BUFF F-DMA    ACCEPT-FCB F-READ-SEQ
    IF .ERROR-LINE ." FILE-ACCEPT read error " ABORT THEN ;

OPS: FILE-ACCEPT   ACCEPT-FCB 36 ERASE
    GET-ATOM  AT$ PAD ATOM-LENGTH MOVE  $ Save filename
    END')'   PAD AT$ ATOM-LENGTH MOVE
    PAD ACCEPT-FCB PARSE-FILENAME IF .ERROR-LINE
      ." Filename error " .AT$
      ."  is not a valid filename" ABORT THEN
    ACCEPT-FCB F-OPEN IF .ERROR-LINE  ." File open error " .AT$
      ."  couldn't be opened." ABORT THEN
    (FILE-ACCEPT) W-ON     READ-ACCEPT-FILE ;
```

Screen # 30

Screen # 31

```
$ GET-CS                                          ( PLB*04/19/87)
HEX WVARIABLE #CS   VARIABLE TOTAL#INST
: GET-CS ( rule# - ) DUP 4* RULE-HDL @@ + @ IF OPEN-RULE
    6 ?SEND-NET BC W,NET    R-RP# W@ W,NET      RL# W@ W,NET
    SEND-TO-NET WAIT-FOR-RP-COMPLETE
    R-RP# W@ !W1  ~W1 <#-IN-CS> W@ DUP #CS W! ?DUP
    IF  ?CR R-TOKEN @ .TOKEN ."  has " DUP .
        DUP 1 = IF ." fireable instantiation:" ELSE
       ." fireable instantiations:" THEN 0 SWAP 1- DO
    8 ?SEND-NET      C0 W,NET    R-RP# W@ W,NET
    RL# W@ W,NET     I W,NET  SEND-TO-NET WAIT-FOR-RP-COMPLETE
    ?CWAIT ?CR 4 SPACES R-#LHS W@ 0 DO I .CS LOOP
    TOTAL#INST TALLY -1 +LOOP THEN ELSE DROP THEN ;

: GET-CS-PRT ( index - ) GET-CS #CS W@ NOT IF ?CR ?WAIT
   R-TOKEN @ .TOKEN ."  has no fireable instantiations." THEN ;
```

Screen # 32

```
$ CS                                              ( PLB*04/19/87)
HEX
: .INST-END   CTLY-VEC OFF
    TOTAL#INST @ ?DUP IF ?CR . ." total instantiation"
      TOTAL#INST @ 1 - IF ." s" THEN ."  printed."
    ELSE ?CR ." No productions true" THEN ;

OPS: CS ['] GET-CS (PM-EXEC) !   ['] .INST-END CTLY-VEC !
```

```
    TOTAL#INST OFF  GET-ATOM AT$ W@ 0129 = IF ?RULL R-ALL
      ELSE
      ['] SET-CS-PRT (PM-EXEC) !
      ?(RUL)     $ execute the first one
      BEGIN GET-ATOM AT$ W@ 0129 = NOT WHILE ?(RUL)
         REPEAT
    THEN .INST-END ;
```

Screen # 33

```
$ SET-#PROC                                       ( PLB*03/19/87)

: SET-#PROC ( #procs - #actual-procs )
    $ Disable All RP's
    #RP 0 DO I RP-DISABLE LOOP
    $ Enable processors
    #RP 0 DO I RP-ENABLE #RP-ONLINE OVER = IF LEAVE THEN LOOP
    DROP
    #RP-ONLINE ;
```

Screen # 34

```
$ PROCS                                           ( PLB*03/19/87)

: CONV-#RP ( - rp# or -1 ) AT$ TOKEN? ?DUP NOT IF -1 EXIT THEN
    DUP TOKEN-NUM? IF TOKEN>#  ELSE DROP -1 EXIT THEN
    ( # ON STACK) DUP 1 #RP 1+ WITHIN NOT IF DROP -1 THEN ;

OPS: PROCS GET-ATOM ?CR ATOM-TYPE 3 = IF
        ." Number of RP's available is " #RP-ONLINE . ELSE
        CONV-#RP END')' DUP -1 =
          IF ." Illegal number of rule processors - not change
d" DROP
          ELSE SET-#PROC . ." Processors enabled"
        THEN THEN ;
```

Screen # 35

```
$ IDENTIFY                                        ( PLB*04/09/87)
HEX
OPS: IDENTIFY END')' 2 ?SEND-NET C4 W,NET SEND-TO-NET ;
DECIMAL
OPS: FILTER END')' 10 0 DO I 4* 0   CR 5 SPACES I 2 U.R
    #RP 0 DO I RP-ONLINE? IF
        I !W1  OVER ~W1 <HIST> + @ +
    THEN LOOP 12 U.R DROP LOOP ;
OPS: FILTER+ END')'  ?CR
    0 #RP 0 DO I RP-ONLINE? IF
        I !W1  ~W1 <RP6> @ +
    THEN LOOP 12 U.R ;
OPS: FILTER- END')'  ?CR
    0 #RP 0 DO I RP-ONLINE? IF
        I !W1  ~W1 <RP5> @ +
    THEN LOOP 12 U.R ;
```

Screen # 50

Screen # 51

Screen # 52

This is the screen loaded when "..OPS" is typed. This is used only during debug and compiles most of the critical OPS code.

Screen # 53

Literalize List Output

.LIT prints the selected LITERALIZE statement and all attributes assigned to it.

.LER prints an error message

?.LIT prints the literalize statement whose token is in AT#

Screen # 54

Literalize List Output

?LITL makes sure that something has been literalized before printing

.L-ALL prints all literalize statements

LIT-LIST is the OPS: word that allows the user to print the literalize statements. The syntax is as follows:

```
(LIT-LIST)      prints the last literalize
(LIT-LIST *)    prints all literalize statements
(LIT-LIST name name )   prints the selected literalize
                        statements
```

Screen # 55

OPS-ON-FLAG, STATUS

OPS-ON-FLAG provides a convenient method for reading ON/OFF flags from within OPS: statements STATUS allows the user to turn the status display task on or off When the status display is off, there is roughly a 10 % increase in system speed.

Screen # 56

Some OPS Commands

?FIX-VT puts the system into 80 column mode if it is not already
opBYE exits to CP/M from within OPS BYE and EXIT both will exit OPS to get to CP/M FORTH is an OPS: command that allows the user to get into FORTH from within OPS VT-80 is an OPS: word that sets 80 column mode
VT-132 is an OPS: word that sets 132 column mode

Screen # 57

OPS File Load Command

LOAD is the command used to load from a file. Note that there is no difference from file input and keyboard input. The same commands will work in file that work from the keyboard

Screen # 58

More OPS Commands

CRT is an OPS: command that allows output to the CRT to be turned on or off.
PRINTER is an OPS: command that allows output to the printer to be turned on or off.
PAGE simply clears the screen and/or form-feeds the paper depending if the CRT or Printer is turned on.

Screen # 59

OPS Room Status output

ROOM allows the user to print system stats on the CRT and/or printer.

Screen # 60

Misc. OPS Commands

RESET is an OPS: command that allows the user to reset the entire OPS system

STOPWATCH provides a simple timing mechanism. The user must turn the stopwatch on before useful timing information can be gained. Note that the user can enter as many (STOPWATCH OFF)'s as he wants to to get an elapsed time.

Note: eventually needs to be fixed to span more than one day !!! Maybe interrupt drive it for more accuracy ???

Screen # 61

Timer Commands

TIME starts a timer on the Interface Board. This timer has a 3 ms. resolution.
END-TIME stops the timer started by (TIME) and prints the elapsed time out.
CLOCK prints the calendar time and date.

Screen # 62

Rule EXCISE

PM-EX removes a production from the system

Screen # 63

Rule List Output

.RUL prints the stats for a selected rule.

Screen # 64

Production execution shell (PM-EXEC) holds the vector for the execution word. In this way, the same code can be used for EXCISE and PMLIST ?(RUL) executes the (PM-EXEC) vector for the rule whose name is given in AT$. This word also does some error checking.

Screen # 65

Production execution shell

R-ALL executes the (PM-EXEC) vector for all of the rules in the system

PM-EXEC is the main execution word for EXCISE and PMLIST

Screen # 66

PMLIST, EXCISE

PMLIST prints the stats for the specified rule

EXCISE removes the specified rules from the system

The syntax for these words is identical. Examples are given for PMLIST below:

(PMLIST) prints the stats for the last rule defined
(PMLIST *) prints the stats for all rules in the system
(PMLIST name name ) prints the stats for the specified rules in the system

Screen # 67

TYPE command

TYPE is used as a convenience. The syntax is as follows:

(TYPE Now loading the initialization rules.)

When executed will send the text to the output device immediately.

Screen # 68

WATCH command

WATCH is used from the keyboard to set the WATCH level.

0 or OFF - watch is turned off
1 or P - watch productions as they are run
2 or WM - watch working memory additions/deletions
3 or CS - watch the conflict set of the running rules
4 or FS - watch the compilation status of the rules
5 or MM - watch the status of the memory management
6 or MSG - watch RHS status messages such as STRATEGY

Screen # 69

NO-WATCH command

NO-WATCH is used to turn certain watch levels off.

Screen # 70

WMSTAT function

WMSTAT prints stats for all defined classes.

Screen # 71

CONV-RP#

CONV-RP# reads the string in AT$ and returns the RP number selected. It returns -1 if a non-numeric is entered or the RP number is not in a valid range

Screen # 72

WINDOW OPS command
WINDOW allows the user to set the top window to be set in the lower part of the status display screen.

SERVE allows the user to select a rule processor that will be served by the server task.

Screen # 73

RP ENABLE and DISABLE from keyboard

ENABLE selects a single processor to be enabled from the keyboard

DISABLE selects a single processor to be disabled from the keyboard

Screen # 74 support
FILTER-EXECUTE executes the RHS code
?.TOKEN prints "NIL" if the token is a nil token .CS prints the conflict set for WATCH 3

.RUN prints run time status for the rules as they fire.

Screen # 75

RUN support

RUN-ONE runs a single production.

Screen # 76

RUN command
.ILL-CNT is an error message

.NO-PROD-TRUE prints an error message

+RUN-TILL adds the given firing-offset to the number in AT$ to determine how far to run.

Screen # 77

RUN command

RUN-ALL runs until no productions can fire

RUN is the main OPS command to start a system running
(RUN) runs until no more productions can fire
(RUN n) runs 'n' productions RUN-TILL runs until the specified production count
(RUN-TILL n) runs until the 'n'th total firing Screen # 78

STRATEGY

STRATEGY is the OPS: command to set the strategy to LEX or MEA

Screen # 79

FILE-ACCEPT

READ-ACCEPT-FILE reads 128 bytes from the ACCEPT file

FILE-ACCEPT is a command that a user can give to redirect the ACCEPT input from the keyboard to a file.

Screen # 80

Screen # 81

GET-CS

GET-CS prints the conflict set for the specified rule

Screen # 82

CS

CS is the user command to print the conflict set. The syntax is as follows:
(CS) prints the CS for all rules
(CS name name) prints the CS for the specified rules Screen # 83

Screen # 84

Screen # 85

Screen # 0

```
$ MM.PF  -- Memory Management Package            ( PLB*07/26/86)
Update Records :

<01> 07/26/86 PLB  -  Creation of Memory Management Package

The memory management runs on both the HOST and the RP's and
    provides for resizeable memory arrays. Each "frame" has a
    handle that points to it. This handle never changes even
    though the frame itself may move in memory. Static frames
    are intended for structures that do not change often. These
    static frames are "butted" against on another. They can be
    removed and resized, but will cause some delay. Dynamic
    frames are ones in which the sizes can grow and shrink
    rapidly. Dynamic frames are only moved if there is not
    enough room to make them grow. They are normally spread
    out in memory.
```

Screen # 1

```
$ Load Screen for HOST Memory Management Package ( PLB*01/20/87)
DECIMAL
START-SEGMENT .( ==> HOST Memory Management Package)
   : MM-BOTTOM ( -a)    PAD 1024 + ;
$  : MM-BOTTOM ( -A)    300000 PAD < ABORT" TEMP-MM-ERROR"
$       300000 ;
: MM-TOP ( -a)     (ARR-PTR) @ ;
VARIABLE     FREE-MEM
VARIABLE     SOFT-REALLOC         VARIABLE HARD-REALLOC
VARIABLE     SOFT-BYTES           VARIABLE HARD-BYTES
VARIABLE     STATIC-HANDLES       VARIABLE DYNAMIC-HANDLES
VARIABLE     HANDLE-BYTES
VARIABLE     DYNAMIC-BYTES        VARIABLE STATIC-BYTES
   3  30  THRU       $ Main MM Package
END-SEGMENT
```

Screen # 2

```
$ Load Screen for RP Memory Management Package    ( PLB*04/07/87)
DECIMAL  START-SEGMENT .( ==> RP Memory Management Package)
$    : MM-BOTTOM ( -a)    PAD 1024 + ;
     : MM-BOTTOM ( -A)    PAD $Z DROP 150000
            DUP PAD < ABORT" TEMP-MM-ERROR" ;

    S0 @ 1024 -    CONSTANT  MM-TOP     $ allow 1024 for param stk
<FREE-MEM> CONSTANT FREE-MEM    <S-B> CONSTANT STATIC-BYTES
<SOFT-R>   CONSTANT SOFT-REALLOC <HARD-R> CONSTANT HARD-REALLOC
<SOFT-B>   CONSTANT SOFT-BYTES   <HARD-B> CONSTANT HARD-BYTES
<S-H>   CONSTANT STATIC-HANDLES <D-H> CONSTANT DYNAMIC-HANDLES
<H-B>   CONSTANT HANDLE-BYTES    <D-B> CONSTANT DYNAMIC-BYTES
: WATCH5? ( -f) <SERVER-EN> W@ IF [WATCH] @ 16 AND ELSE 0 THEN ;
   3  30  THRU       $ Main MM Package
END-SEGMENT
```

Screen # 3

```
$ Memory Management Variables, Etc.              ( PLB*05/04/87)

16 WCONSTANT HANDLE-SIZE
VARIABLE     HIGH-STATIC-LINK        $ Highest Static  frame handle
VARIABLE     LOW-STATIC-LINK         $ Lowest  Static  frame handle
VARIABLE     HIGH-DYNAMIC-LINK       $ Highest Dynamic frame handle
VARIABLE     LOW-DYNAMIC-LINK        $ Lowest  Dynamic frame handle

VARIABLE     FREE-HANDLE-LINK        $ Points to a free handle
VARIABLE     LOWEST-HANDLE           $ Points to lowest handle

VARIABLE     MM-VEC                  $ Vector to user routine that
                                     $ is called after reallocate
VARIABLE     'SUM-BYTES              $ Points to reallocation sum
WVARIABLE    MM-DIRTY                $ "Need to Reallocate" flag
WVARIABLE    DY-MODE                 $ Dynamic Mode
```

Screen # 4

```
$ Memory Management Initialization               ( PLB*05/04/87)
CODE @@  $ ( addr - addr )
   S )+ A0 MOV    A0 ) A0 MOV    A0 ) S -) MOV   NEXT
: INIT-MEM
        MM-TOP  MM-BOTTOM - FREE-MEM !   MM-TOP LOWEST-HANDLE !
        SOFT-REALLOC OFF             HARD-REALLOC OFF
        SOFT-BYTES OFF               HARD-BYTES   OFF
        STATIC-HANDLES OFF           DYNAMIC-HANDLES OFF
        HIGH-STATIC-LINK OFF         LOW-STATIC-LINK OFF
        HIGH-DYNAMIC-LINK OFF        LOW-DYNAMIC-LINK OFF
        FREE-HANDLE-LINK OFF
        HANDLE-BYTES OFF             STATIC-BYTES OFF
        DYNAMIC-BYTES OFF            HARD-BYTES 'SUM-BYTES !
        MM-DIRTY W-OFF               DY-MODE W-ON
        MM-VEC OFF ;
```

Screen # 5

```
$ Memory Size update words                        ( PLB*08/24/86)

CODE UPDATE-HANDLE-BYTES
   HANDLE-SIZE # D0 MOV      D0 HANDLE-BYTES AB ADD
   D0 FREE-MEM AB SUB        NEXT

$ UPDATE-STATIC-BYTES ( size-to-add - )
CODE UPDATE-STATIC-BYTES      S )+ D0 MOV
   D0 STATIC-BYTES AB ADD       D0 FREE-MEM AB SUB       NEXT

$ UPDATE-DYNAMIC-BYTES ( size-to-add - )
CODE UPDATE-DYNAMIC-BYTES    S )+ D0 MOV
   D0 DYNAMIC-BYTES AB ADD      D0 FREE-MEM AB SUB       NEXT

$ SIZE-OF-FRAME ( handle - size )
CODE SIZE-OF-FRAME  S )+ A0 MOV  12 # A0 ADD  A0 ) S -) MOV NEXT
```

Screen # 6

```
$ Frame boundry words                             ( PLB*08/29/86)

: TOP-OF-STATIC ( - a )  STATIC-HANDLES @
      IF HIGH-STATIC-LINK @ DUP @ SWAP SIZE-OF-FRAME +
      ELSE MM-BOTTOM THEN ;

: TOP-OF-DYNAMIC ( - a ) DYNAMIC-HANDLES @
      IF HIGH-DYNAMIC-LINK @ DUP @ SWAP SIZE-OF-FRAME +
      ELSE TOP-OF-STATIC THEN ;


: BOTTOM-OF-DYNAMIC ( - a )  DYNAMIC-HANDLES @
      IF LOW-DYNAMIC-LINK @@ ELSE LOWEST-HANDLE @ THEN ;
```

Screen # 7

```
$ Watch messages for memory manager               ( PLB*12/14/86)
VARIABLE LAST-H-B        $ LAST HARD BYTE COUNT
: !HB  HARD-BYTES @ LAST-H-B ! ;
: .mm-b ." ==> " LAST-H-B @ . ." bytes moved." ;
: .MM-SR ?CR
      ." Memory Soft Reallocate " NEGATE LAST-H-B ! .mm-b ;
: MM? ( bytes&FLAG - ) WATCH5?
   IF HARD-BYTES @ LAST-H-B @ - DUP LAST-H-B !
   ELSE 0 THEN ;
: .MM-OS MM? IF ?CR ." Memory Open Static " .mm-b THEN ;
: .MM-RS MM? IF ?CR ." Memory Resize Static " .mm-b THEN ;
: .MM-CD MM? IF ?CR ." Memory Create Dynamic " .mm-b THEN ;
: .MM-RD MM? IF ?CR ." Memory Resize Dynamic " .mm-b THEN ;
```

Screen # 8

```
$ MOVE-UP
                                                  ( PLB*10/11/86)
$ MOVE-UP ( from to count - )
CODE MOVE-UP  S )+ D1 MOV      S )+ A1 MOV      S )+ A0 MOV
  A0 A1 CMP    0= IF NEXT THEN
  0< IF [[ 1 ABORT" MM Error - Can't move frame up" ]] THEN
  D1 TST       0= IF NEXT THEN
  D1 A0 ADD    D1 A1 ADD
  D1 D0 MOV    2 # D1 LSR       1 #Q D1 SUB       D1 D2 MOV
  D2 SWP
  BEGIN   BEGIN              A0 -) A1 -) MOV      D1 DBRA
  D2 DBRA
  'SUM-BYTES AB A0 MOV       D0 A0 ) ADD   NEXT
```

Screen # 9

```
$ MOVE-DOWN
                                                  ( PLB*10/11/86)
$ MOVE-DOWN ( from to count - )
CODE MOVE-DOWN  S )+ D1 MOV      S )+ A1 MOV      S )+ A0 MOV
  A0 A1 CMP    0= IF NEXT THEN
  0> IF [[ 1 ABORT" MM Error - Can't move frame down" ]] THEN
  D1 TST       0= IF NEXT THEN
  D1 D0 MOV    2 # D1 LSR       1 #Q D1 SUB       D1 D2 MOV
  D2 SWP
  BEGIN   BEGIN              A0 )+ A1 )+ MOV      D1 DBRA
  D2 DBRA
  'SUM-BYTES AB A0 MOV       D0 A0 ) ADD   NEXT
```

Screen # 10

```
$ SHUFFLE-STATIC-UP SHUFFLE-DYNAMIC-UP-COMPACT    ( PLB*08/31/86)
```

```
: SHUFFLE-UP ( top-location link-address-8 - )
   BEGIN  8 + @ DUP WHILE
      >R    R@ SIZE-OF-FRAME - DUP ( to )
      R@ @ ( from )  SWAP
      DUP R@ !        $ update handle
      R@ SIZE-OF-FRAME MOVE-UP  R> REPEAT  2DROP ;

: SHUFFLE-STATIC-UP
   BOTTOM-OF-DYNAMIC   HIGH-STATIC-LINK 8 -   SHUFFLE-UP ;

: SHUFFLE-DYNAMIC-UP-COMPACT        2 DY-MODE W!
   LOWEST-HANDLE @     HIGH-DYNAMIC-LINK 8 -   SHUFFLE-UP ;
```

Screen # 11

```
$ SHUFFLE-STATIC-DOWN                              ( PLB*08/31/86)

: SHUFFLE-DOWN ( low-address link-4 - )
   BEGIN  4+ @ DUP WHILE
      >R    R@ @ ( from )
      OVER ( to )
      DUP R@ !      $ update handle
      R@ SIZE-OF-FRAME MOVE-DOWN
      R@ SIZE-OF-FRAME +
      R> REPEAT 2DROP ;

: SHUFFLE-STATIC-DOWN
   MM-BOTTOM   LOW-STATIC-LINK 4-          SHUFFLE-DOWN ;

: SHUFFLE-DYNAMIC-DOWN-COMPACT      DY-MODE W-ON
   TOP-OF-STATIC   LOW-DYNAMIC-LINK 4-     SHUFFLE-DOWN ;
```

Screen # 12

```
$ SHUFFLE-DYNAMIC-DOWN                             ( PLB*08/28/86)
VARIABLE  DYNAMIC-GAP
: SHUFFLE-DYNAMIC-DOWN   DY-MODE W-OFF
   LOWEST-HANDLE @ TOP-OF-STATIC -  DYNAMIC-BYTES @ -
      DYNAMIC-HANDLES @ 1 MAX / -2 AND  DYNAMIC-GAP !
   TOP-OF-STATIC   LOW-DYNAMIC-LINK 4-
   BEGIN  4+ @ DUP WHILE
      >R    R@ @ ( from )    OVER ( to )
      DUP R@ !      $ update handle
      R@ SIZE-OF-FRAME MOVE-DOWN
      R@ SIZE-OF-FRAME +  DYNAMIC-GAP @ +
      R> REPEAT 2DROP ;
$ This word spreads dynamic frames apart to ease access and
$   improve speed.
$ SHADOW CONTAINS AN ATTEMPT AT MAKING THE GAPS PROPORTIONAL
$ TO FRAME SIZE. 16 BIT MATH KILLS IT !!!!!
```

Screen # 13

```
$ SHUFFLE-DYNAMIC-DOWN-PART                        ( PLB*08/28/86)
VARIABLE  PART-HANDLE        VARIABLE PART-SIZE
: SHUFFLE-DYNAMIC-DOWN-PART   DY-MODE W-OFF
   LOWEST-HANDLE @ TOP-OF-STATIC -  DYNAMIC-BYTES @ -
      DYNAMIC-HANDLES @ 1 MAX / -2 AND  DYNAMIC-GAP !
   TOP-OF-STATIC   LOW-DYNAMIC-LINK 4-
   BEGIN  4+ @ DUP WHILE
      >R    R@ @ ( from )    OVER ( to )
      DUP R@ !      $ update handle
      R@ SIZE-OF-FRAME MOVE-DOWN
      R@ SIZE-OF-FRAME +  DYNAMIC-GAP @ +
      R@ PART-HANDLE @ = IF PART-SIZE @ + THEN
      R> REPEAT 2DROP ;
```

Screen # 14

```
$ Soft Memory Reallocation                         ( PLB*05/04/87)
: SOFT-REALLOCATE
   MM-DIRTY W@ IF
      SOFT-BYTES 'SUM-BYTES !     SOFT-REALLOC TALLY
   SOFT-BYTES @
      SHUFFLE-STATIC-DOWN
      SHUFFLE-DYNAMIC-UP-COMPACT
      SHUFFLE-DYNAMIC-DOWN
   SOFT-BYTES @ - ?DUP IF WATCHS? IF .MM-SR ELSE DROP THEN THEN
      HARD-BYTES 'SUM-BYTES !
      MM-DIRTY W-OFF MM-VEC @EXECUTE
   THEN ;
$ ++++++++++++++++++++++++++++++++++++++++++++++++++++++++++
$ TEST-MM    DOES A COMPACT FOR CODE DEBUGGING......
$ WHILE NOT DEBUGGING    : TEST-MM ; IMMEDIATE
$ ++++++++++++++++++++++++++++++++++++++++++++++++++++++++++
```

Screen # 15

```
$ Handle Room Allocation                           ( PLB*05/04/87)

: MAKE-ROOM-FOR-HANDLE
      DY-MODE W@ CASE
   0 OF SHUFFLE-DYNAMIC-DOWN ENDOF
   1 OF 1 ABORT" Can't create a handle" ENDOF
   2 OF BOTTOM-OF-DYNAMIC HANDLE-SIZE 4* -
            LOW-DYNAMIC-LINK 4- SHUFFLE-DOWN ENDOF
   ENDCASE MM-VEC @EXECUTE ;
```

Screen # 16

```
$ GET-HANDLE                                       ( PLB*08/24/86)
: GET-HANDLE ( - handle-address)  FREE-HANDLE-LINK @ DUP
   IF
      $ Old handle available, use it and take off free list
      $   and put next free handle address in FREE-HANDLE-LINK
         DUP @ FREE-HANDLE-LINK !
   ELSE DROP
      $ No old handles available, create new one
         LOWEST-HANDLE @ HANDLE-SIZE -   >R
         R@ LOWEST-HANDLE !      UPDATE-HANDLE-BYTES
         R@ TOP-OF-DYNAMIC <
            IF MAKE-ROOM-FOR-HANDLE THEN
         R>
   THEN ;
```

Screen # 17

```
$ RELEASE-HANDLE                                   ( PLB*08/24/86)
: RELEASE-HANDLE ( handle - )  >R
   LOWEST-HANDLE @ R@ =
      IF  $ Lowest handle, just let it go !!!
         R> HANDLE-SIZE + LOWEST-HANDLE !
         [ HANDLE-SIZE NEGATE ] LITERAL HANDLE-BYTES +!
         HANDLE-SIZE FREE-MEM +!
      ELSE
         FREE-HANDLE-LINK @  R@ !     R> FREE-HANDLE-LINK !
      THEN ;
```

Screen # 18

```
$ RELEASE-STATIC                                   ( PLB*08/24/86)
DECIMAL
: RELEASE-STATIC ( handle -- ) >R
   R@ SIZE-OF-FRAME NEGATE UPDATE-STATIC-BYTES
   $ update links of previous and next handles
  R@ 4+ @ R@ 8 + @ DUP IF 4+ ELSE DROP LOW-STATIC-LINK THEN !
  R@ 8 + @ R@ 4+ @ DUP IF 8 + ELSE DROP HIGH-STATIC-LINK THEN !
   STATIC-HANDLES DOCK
   R> RELEASE-HANDLE ;

$ SHOULD MM-DIRTY BE TURNED ON ???
```

Screen # 19

```
$ RELEASE-DYNAMIC                                  ( PLB*08/24/86)
DECIMAL
: RELEASE-DYNAMIC ( handle - )  >R
   R@ SIZE-OF-FRAME NEGATE UPDATE-DYNAMIC-BYTES
   $ update links of previous and next handles
  R@ 4+ @ R@ 8 + @ DUP IF 4+ ELSE DROP LOW-DYNAMIC-LINK THEN !
  R@ 8 + @ R@ 4+ @ DUP IF 8 + ELSE DROP HIGH-DYNAMIC-LINK THEN !
   DYNAMIC-HANDLES DOCK
   R> RELEASE-HANDLE ;
```

Screen # 20

```
$ OPEN-STATIC                                      ( PLB*05/04/87)
: OPEN-STATIC ( minimum-size - handle )  HARD-REALLOC TALLY
   !HB SHUFFLE-STATIC-DOWN  GET-HANDLE >R >R
   DY-MODE W@ 2 - IF SHUFFLE-DYNAMIC-UP-COMPACT THEN
   BOTTOM-OF-DYNAMIC TOP-OF-STATIC - DUP R@ <
      IF SHUFFLE-STATIC-DOWN
         R@ <   ABORT" MM Error - can't open static frame"
      ELSE DROP THEN R> DROP
   TOP-OF-STATIC R@ !    $ store initial frame address
   R@ 12 + OFF           $ zero frame size until it is closed
   $ Update links
   R@ 4+ OFF   HIGH-STATIC-LINK @ ?DUP IF R@ SWAP 4+ ! THEN
   HIGH-STATIC-LINK @ R@ 8 + !    R@ HIGH-STATIC-LINK !
   STATIC-HANDLES @ 0= IF R@ LOW-STATIC-LINK ! THEN
   STATIC-HANDLES TALLY   R> .MM-OS MM-VEC @EXECUTE ;
```

Screen # 21

```
$ CLOSE-STATIC                                        ( PLB*08/25/86)
DECIMAL
: CLOSE-STATIC ( final-size handle - )   >R
    DUP R> 12 + !               $ store size
    UPDATE-STATIC-BYTES ;       $ update byte count
```

Screen # 22

```
$ RESIZE-STATIC                                       ( PLB*05/04/87)

: RESIZE-STATIC ( incremental-size handle - ) HARD-REALLOC TALLY
    !HB >R ( save handle )
    DUP 0< IF ( negative ) DUP UPDATE-STATIC-BYTES R> 12 + +!
            SHUFFLE-STATIC-DOWN
       ELSE
            SHUFFLE-DYNAMIC-UP-COMPACT
            SHUFFLE-STATIC-UP
            DUP UPDATE-STATIC-BYTES R> 12 + +! $ Update frame
            SHUFFLE-STATIC-DOWN
            SHUFFLE-DYNAMIC-DOWN
       THEN .MM-RS MM-VEC @EXECUTE ;
$ FIX THIS !!!   ON SHUFFLE-STATIC-DOWN, IF YOU TRY TO
$ RESIZE A STATIC FRAME BY A LARGE POSITIVE AMOUNT, A MEMORY
$ ERROR OCCURS DUE TO READING FROM NON-EXISTANT MEMORY
```

Screen # 23

```
$ CREATE-DYNAMIC                                      ( PLB*05/04/87)

: CREATE-DYNAMIC ( initial-size - handle )   HARD-REALLOC TALLY
    MM-DIRTY W-ON  !HB
    SHUFFLE-STATIC-DOWN     SHUFFLE-DYNAMIC-DOWN-COMPACT
    GET-HANDLE >R
    LOWEST-HANDLE @   TOP-OF-DYNAMIC -  OVER  <
    ABORT" MM Error - Can't create dynamic frame"
    DUP   R@ 12 + !   UPDATE-DYNAMIC-BYTES
    TOP-OF-DYNAMIC    R@ !      $ store handle
    $ Update links
    R@ 4+ OFF   HIGH-DYNAMIC-LINK @ ?DUP IF R@ SWAP 4+ ! THEN
    HIGH-DYNAMIC-LINK @ R@ 8 + !    R@ HIGH-DYNAMIC-LINK !
    DYNAMIC-HANDLES @ 0= IF R@ LOW-DYNAMIC-LINK ! THEN
    DYNAMIC-HANDLES TALLY   R> .MM-CD MM-VEC @EXECUTE ;
```

Screen # 24

```
$ RESIZE-DYNAMIC                                      ( PLB*10/25/86)
EXIT     $ High Level Version !!!!
: RESIZE-DYNAMIC ( incremental-size handle - )    >R
    DUP
    R@ @  R@ SIZE-OF-FRAME + + ( new top-of-frame )
    R@ 4+ @ ?DUP IF @ ELSE LOWEST-HANDLE @ THEN
    > IF     $ Need to make more room !!!!!
       FREE-MEM @ OVER <
            ABORT" MM-Error - not enough dynamic room"
       !HB SHUFFLE-STATIC-DOWN      SHUFFLE-DYNAMIC-UP-COMPACT
           R@ PART-HANDLE !     HARD-REALLOC TALLY
           DUP DUP UPDATE-DYNAMIC-BYTES PART-SIZE !
       SHUFFLE-DYNAMIC-DOWN-PART
           R> 12 + +!  .MM-RD
  ELSE  DUP R> 12 + +!  UPDATE-DYNAMIC-BYTES   MM-DIRTY W-ON
    THEN ;
```

Screen # 25

```
$ RESIZE-DYNAMIC High Level Support                   ( PLB*05/04/87)

: SCOOT-DYNAMIC ( incremental-size handle - )    >R
       FREE-MEM @ OVER <
            ABORT" MM-Error - not enough dynamic room"
       !HB SHUFFLE-STATIC-DOWN      SHUFFLE-DYNAMIC-UP-COMPACT
           R@ PART-HANDLE !     HARD-REALLOC TALLY
           DUP DUP UPDATE-DYNAMIC-BYTES PART-SIZE !
       SHUFFLE-DYNAMIC-DOWN-PART
           R> 12 + +!  .MM-RD MM-VEC @EXECUTE ;
```

Screen # 26

```
$ RESIZE-DYNAMIC machine code subroutine              ( PLB*10/25/86)
```

```
ASSEMBLER
CREATE resize-dynamic   $ A0 - handle   D0 - incremental size
    A0 A1 MOV  12 # A1 ADD   A1 ) D1 MOV  A0 ) D1 ADD
       D0 D1 ADD
    A0 A1 MOV  4 #Q A1 ADD   A1 ) D2 MOV  0= NOT
  IF D2 A1 MOV  A1 ) D2 MOV  ELSE LOWEST-HANDLE AB D2 MOV THEN
    D1 D2 CMP
      0< IF D0 S -) MOV  A0 S -) MOV [[ SCOOT-DYNAMIC ]]
      ELSE   1 #W MM-DIRTY AB MOV
        A0 A1 MOV  12 # A1 ADD   D0 A1 ) ADD
    D0 DYNAMIC-BYTES AB ADD     D0 FREE-MEM AB SUB
    THEN   RTS

CODE RESIZE-DYNAMIC    $ ( incremental-size  handle - )
    S )+ A0 MOV    S )+ D0 MOV  resize-dynamic BSR ,NEXT
```

Screen # 27

Screen # 28

```
$ JOT area support                                    ( PLB*10/27/86)
4096 WCONSTANT JOT1-SZ   VARIABLE 'JOT1 $ holder for jot1 hdl
2048 WCONSTANT JOT2-SZ   VARIABLE 'JOT2 $ holder for jot2 hdl
: OPEN-JOT1 ( size - )  DUP JOT1-SZ > IF
    JOT1-SZ - 'JOT1 @ RESIZE-STATIC ELSE DROP THEN ;
$ : JOT1 ( -addr )  'JOT1 @@ ;
$ : >JOT1 ( offset - addr ) 'JOT1 @ SIZE-OF-FRAME OVER > NOT
$        IF 2048 'JOT1 @ RESIZE-STATIC THEN
$         'JOT1 @@ + ;

: CLOSE-JOT1    JOT1-SZ 'JOT1 @ SIZE-OF-FRAME -
    ?DUP IF 'JOT1 @ RESIZE-STATIC THEN ;
: INIT-JOT
  JOT1-SZ OPEN-STATIC DUP 'JOT1 ! JOT1-SZ SWAP CLOSE-STATIC
  JOT2-SZ OPEN-STATIC DUP 'JOT2 ! JOT2-SZ SWAP CLOSE-STATIC ;
```

Screen # 29

```
$ JOT area support                                    ( PLB*10/27/86)
: OPEN-JOT2 ( size - )  DUP JOT2-SZ > IF
    JOT2-SZ - 'JOT2 @ RESIZE-STATIC ELSE DROP THEN ;
$ : JOT2 ( -addr )  'JOT2 @@ ;
$ : >JOT2 ( offset - addr ) 'JOT2 @ SIZE-OF-FRAME OVER > NOT
$        IF 2048 'JOT2 @ RESIZE-STATIC THEN
$         'JOT2 @@ + ;
: CLOSE-JOT2    JOT2-SZ 'JOT2 @ SIZE-OF-FRAME -
    ?DUP IF 'JOT2 @ RESIZE-STATIC THEN ;

RP? ONLY-> EXIT      $ CK-JOT IS NOT ON RP
: CK-JOT 'JOT1 @ SIZE-OF-FRAME JOT1-SZ - IF .WARNING-LINE
  ." JOT1 size is " 'JOT1 @ SIZE-OF-FRAME . CR CLOSE-JOT1 THEN
   'JOT2 @ SIZE-OF-FRAME JOT2-SZ - IF .WARNING-LINE
  ." JOT2 size is " 'JOT2 @ SIZE-OF-FRAME . CR CLOSE-JOT2 THEN ;
```

Screen # 30

```
$ Faster JOT words                                    ( PLB*10/25/86)
CODE JOT1    'JOT1 AB A0 MOV    A0 ) S -) MOV ,NEXT
CODE JOT2    'JOT2 AB A0 MOV.   A0 ) S -) MOV ,NEXT
CODE >JOT1     S )+ D0 MOV    'JOT1 AB A0 MOV   12 # A0 ADD
    A0 ) D1 MOV    4 #Q D1 SUB      D0 D1 CMP 0<
        IF D0 S -) MOV    D1 D0 SUB  2048 # D0 ADD   D0 S -) MOV
           'JOT1 AB S -) MOV    [[ RESIZE-STATIC ]]
            S )+ D0 MOV THEN   'JOT1 AB A0 MOV
       A0 ) A0 MOV   D0 A0 ADD   A0 S -) MOV ,NEXT

CODE >JOT2     S )+ D0 MOV    'JOT2 AB A0 MOV   12 # A0 ADD
    A0 ) D1 MOV    4 #Q D1 SUB      D0 D1 CMP 0<
        IF D0 S -) MOV    D1 D0 SUB  2048 # D0 ADD   D0 S -) MOV
           'JOT2 AB S -) MOV    [[ RESIZE-STATIC ]]
            S )+ D0 MOV THEN   'JOT2 AB A0 MOV
       A0 ) A0 MOV   D0 A0 ADD   A0 S -) MOV ,NEXT
```

Screen # 40

Screen # 41

Load Screen for HOST memory management package

Screen # 42

Load Screen for RP memory management package

Screen # 43

DY-MODE definitions:
0 - NORMAL ( SPREAD OUT ) 1 - COMPACT ON BOTTOM 2 - COMP ON TOP

Screen # 44

Memory Management Initialization

@@ is a double indirect fetch. Normally a pointer to a handle is given and @@ returns the address of the frame in memory INIT-MEM initializes the memory management package

Screen # 45

Memory Size update words

```
: UPDATE-HANDLE-BYTES
    HANDLE-SIZE HANDLE-BYTES +!
    [ HANDLE-SIZE NEGATE ] LITERAL FREE-MEM +! ;

: UPDATE-STATIC-BYTES ( size-to-add - )
    DUP STATIC-BYTES +!   NEGATE FREE-MEM +! ;

: UPDATE-DYNAMIC-BYTES ( size-to-add - )
    DUP DYNAMIC-BYTES +!  NEGATE FREE-MEM +! ;

: SIZE-OF-FRAME ( handle - size ) 12 + @ ;
```

These words update various stats within the MM package

Screen # 46

Frame boundry words

TOP-OF-STATIC returns the address of the top if the static area.

TOP-OF-DYNAMIC returns the address of the top of the dynamic area.

BOTTOM-OF-DYNAMIC returns the address of the bottom of the dynamic area

Screen # 47

Various debug messages for the memory management package

Screen # 48

```
$ MOVE-UP                                              ( PLB+05/28/86)

VARIABLE  M-SIZE        VARIABLE  M-TO       VARIABLE M-FROM

: MOVE-UP ( from to size - )   M-SIZE ! 2DUP M-TO ! M-FROM !
    2DUP = IF 2DROP EXIT THEN
    > ABORT" MM Error - Can't move frame up"
    M-SIZE @  'SUM-BYTES @ +!
    M-FROM @  M-TO @ M-SIZE @  <CMOVE ;
```

MOVE-UP will move a frame up in memory from a lower address to a higher address. Stats are also updated.

Screen # 49

```
$ MOVE-DOWN                                            ( PLB+08/28/86

: MOVE-DOWN ( from to size - )   M-SIZE ! 2DUP M-TO ! M-FROM !
    2DUP = IF 2DROP EXIT THEN
    < ABORT" MM Error - Can't move frame down"
    M-SIZE @  'SUM-BYTES @ +!
    M-FROM @  M-TO @ M-SIZE @  *LMOVE ;
```

MOVE-DOWN will move a frame up in memory from a higher address to a lower address. Stats are also updated.

Screen # 50

SHUFFLE-STATIC-UP SHUFFLE-DYNAMIC-UP-COMPACT

SHUFFLE-UP moves the selected frames starting with the given link up in memory. This is used for reallocation of memory.

SHUFFLE-STATIC-UP moves all static frames up in memory

SHUFFLE-DYNAMIC-UP-COMPACT moves all dynamic frames up in memory and compacts them at the same time.

Screen # 51

Shuffle Down Stuff

SHUFFLE-DOWN moves the selected frames starting with the given link down in memory. This is used for reallocation of memory SHUFFLE-STATIC-DOWN moves all static frames down in memory, compacting them against each other.

SHUFFLE-DYNAMIC-DOWN-COMPACT moves all dynamic frames down in memory, compacting them against each other.

Screen # 52

```
$ SHUFFLE-DYNAMIC-DOWN                                ( PLP+08/28/86)
VARIABLE  CONS-GAP           VARIABLE PROP-FREE
: SHUFFLE-DYNAMIC-DOWN
   LOWEST-HANDLE @ TOP-OF-STATIC -  DYNAMIC-BYTES @ -
   ( free-mem) 4/ DUP  3 * PROP-FREE !
      DYNAMIC-HANDLES @ 1 MAX / -2 AND  CONS-GAP !
   TOP-OF-STATIC  LOW-DYNAMIC-LINK 4-
   BEGIN  4+ @ DUP WHILE
      >R    R@ @ ( from )   OVER ( to )
      DUP R@ !      $ update handle
      R@ SIZE-OF-FRAME 2DROP DROP $ MOVE-DOWN
      R@ SIZE-OF-FRAME +  CONS-GAP @ +
         R@ SIZE-OF-FRAME 8 /
         PROP-FREE @   8 /    DYNAMIC-BYTES @  64 /
         1 MAX */  .S -2 AND +   .S
      R> REPEAT 2DROP ;
```

Screen # 53

This word will only copy the original part of the dynamic frame, but will allocate the full space to the frame. This word is used by RESIZE-DYNAMIC.

Screen # 54

Soft Memory Reallocation

SOFT-REALLOCATE will even the system out if there is a need to. This should only be done when time delay will not matter. For example, the RP's can be soft-reallocating while the HOST is waiting for keyboard entry.

Screen # 55

Handle Room Allocation

MAKE-ROOM-FOR-HANDLE looks at the state of the system and makes room for a new handle.

Screen # 56

GET-HANDLE will make a new handle. If there is a handle on the free list, one will be taken from there. If not, room is made at the top of the dynamic area and a new handle is created.

Screen # 57

RELEASE-HANDLE will release a handle. If it is the lowest handle then it is simply returned to the system. Otherwise, the released handle will be added to the free list.

Screen # 58

RELEASE-STATIC

RELEASE-STATIC removes a static frame and it's handle from the system.
- update STATIC-BYTES
- update TOP-STATIC
- update links
- release handle

Screen # 59

$ RELEASE-DYNAMIC ( PLP+08/24/86)

RELEASE-DYNAMIC removes a dynamic frame and it's handle from the system.
- update DYNAMIC-BYTES
- update LOW-DYNAMIC
- update links
- release handle

Screen # 60

OPEN-STATIC

OPEN-STATIC creates a static frame given a minimum size.

- increment HARD-REALLOC
- shuffle dynamic up and compact
- check for enough room
    may have to shuffle static down
    error if not enough room
- create new static handle
- update links
- zero static frame size
- increment STATIC-HANDLES
- return handle

Screen # 61

CLOSE-STATIC

CLOSE-STATIC closes the MAKE-STATIC word. Before this, the new static frame is as big as memory. CLOSE-STATIC actually shrinks the static frame down to size.
- store final size
- update STATIC-BYTES
- update TOP-STATIC

Screen # 62

RESIZE-STATIC

RESIZE-STATIC allows a static frame to be resized. This does not occur when the system is running normally.

- shuffle dynamic up and compact
- shuffle static up
- update frame size
- update STATIC-BYTES
- shuffle static down
- shuffle dynamic down $ IF INCR-SIZE IS NEGATIVE, CAN SIMPLY SHUFFLE-STATIC-DOWN !!!!
$ NEED TO DO SOME ERROR CHECKING HERE !!!!!!

Screen # 63

CREATE-DYNAMIC

CREATE-DYNAMIC creates a dynamic frame of a given size

- increment HARD-REALLOC
- shuffle static down ( conditional ??? )
- shuffle dynamic down and compact
- get top location
- create new dynamic handle
- update links
- store size
- check size to see if memory is large enough
- update DYNAMIC-BYTES
- shuffle dynamic up

Screen # 64

$ RESIZE-DYNAMIC ( PLB*08/24/86)

- calculate new top of frame
- see if there is enough room
  if so, resize frame, update DYNAMIC-BYTES, and return
- increment HARD-REALLOC
- shuffle static down
- shuffle dynamic down and compact
- resize frame and update DYNAMIC-BYTES
- check for enough room, error if not enough room
- shuffle dynamic up

Screen # 65

SCOOT-DYNAMIC is support for the machine coded RESIZE-DYNAMIC

Screen # 66

RESIZE-DYNAMIC machine code subroutine resize-dynamic is a subroutine for use in machine code words that need to resize dynamic frames RESIZE-DYNAMIC resizes the specified dynamic frame by the specified amount.

Screen # 67

Screen # 68

The next few screens show the JOT definitions. There are two arrays JOT1 and JOT2 that can be resized at will. Both of these are static frames. Use these words like the PAD is normally used. PAD is not good to use for temporary storage because the memory management package starts soon after PAD.

Screen # 69

Screen # 70

Screen # 0

$ WME.PF -- Working Memory Management Package ( PLB*10/10/86)

Update Records :

<01> 10/10/86 PLB - Creation of WME Management Package

Screen # 1

```
$ Load Screen for HOST WME Management Package    ( PLB*03/17/87)
DECIMAL START-SEGMENT .( ==> HOST WME Management Package)

   3  15  THRU    $ WME Management

   16  44  THRU   $ Immediate MAKE / MODIFY / REMOVE / WM

   45  47  THRU   $ SAVE-WM to disk file

$ : ..WME  WME.PF OPEN -TWINS 3 49 THRU +TWINS ;

END-SEGMENT
```

Screen # 2

Screen # 3

```
$ WME Variables                                     ( PLB*11/02/86)
VARIABLE 'WME-LIST
VARIABLE %CLASS-ADDR   VARIABLE %WME-ADDR  VARIABLE %WME-OFFSET
$ >WME-LIST ( wme# - addr ) 4* 'WME-LIST @@ + ;
CODE >WME-LIST  S )+ D0 MOV   2 # D0 LSL   'WME-LIST AB A0 MOV
    A0 ) D0 ADD  D0 S -) MOV ,NEXT
```

```
CODE ?RESIZE-WME-LIST  TIME-TAG AB DO MOV  2 # DO LSL
    4 #Q DO ADD   'WME-LIST AB A0 MOV 12 # A0 ADD
   A0 ) D1 MOV      DO D1 CMP  0< IF
       'WME-LIST AB A0 MOV      4000 # DO MOV
       DO WME-BYTES AB ADD
       resize-dynamic AB JSR
       'WME-LIST AB A0 MOV  12 # A0 ADD   A0 ) DO MOV
       DO S -) MOV HEX [[ 6 ?SEND-NET 0AC W,NET   ,NET ]]
   THEN ,NEXT
```

Screen # 4

Screen # 5

```
$ WME>ADDR                                          ( PLB*11/16/86)
HEX
CODE WME>ADDR  S )+ DO MOV 2 # DO LSL 'WME-LIST AB A0 MOV
    A0 ) DO ADD      DO A0 MOV   D2 CLR  A0 ) D2 B. MOV
    2 # D2 LSL   LIT-HDL AB A1 MOV A1 ) A1 MOV D2 A1 ADD
    A1 ) A1 MOV   A1 ) A1 MOV   A1 ) A1 MOV  A1 ) A1 MOV
    A0 ) A1 ADD   A1 S -) MOV ,NEXT

: WME? ( wme# - f )   DUP 1 TIME-TAG @ 1+ WITHIN
    IF  >WME-LIST @ -1 = NOT  ELSE  DROP 0   THEN ;
CODE WME>CLASS     S )+ DO MOV    2 # DO LSL  'WME-LIST AB A0 MOV
 A0 ) DO ADD  DO A0 MOV DO CLR A0 ) DO B. MOV DO S -) MOV ,NEXT
CODE WME>OFFSET   S )+ DO MOV    2 # DO LSL  'WME-LIST AB A0 MOV
 A0 ) DO ADD  DO A0 MOV A0 ) DO MOV 00FFFFFF # DO AND
                                       DO S -) MOV ,NEXT
```

Screen # 6

```
$ Watch 2 (WM) Printout                             ( PLB*02/12/87)
: @W-ATTR  %WME-ADDR @ ;
: .AV-PAIRS
    L-# W@ ?DUP IF 0 DO
        I 4* 4+ @W-ATTR + @
        IF    I 4* L-1ST + @ TOKEN>$ DUP C@
              @W-ATTR  I 4* 4+  + @ TOKEN>$ SWAP OVER C@
              + 3 + 20 ALIGN  SWAP ." ^" COUNT TYPE SPACE
              COUNT TYPE
        THEN
    LOOP THEN ( 1 20 LIT-ALIGN) ."  )" ;
: .SWME ( wme# - )  DUP  4 U.R ." : ( "
    DUP WME>CLASS OPEN-CLASS WME>ADDR %WME-ADDR !
    L-TOK @ .TOKEN .AV-PAIRS ;
: .REM-WME ( wme# - )  NORMAL-TYPE ?CR ." <=WM " .SWME ;
: .MAKE-WME ( wme# - ) NORMAL-TYPE ?CR ." WM=> " .SWME ;
```

Screen # 7

```
$ MAKE-WME                                          ( PLB*12/14/86)
VARIABLE (WME-SZ)        VARIABLE (WME-CLS)  VARIABLE (WME-ADDR)
: MAKE-WME ( class - addr-of-new-wme)   DUP (WME-CLS) !
    '1ST-WME @EXECUTE WME-COUNT TALLY   DUP >CLASS-LIST >R
    TIME-TAG TALLY     ?RESIZE-WME-LIST   R@ 4+ @ ?DUP
    R@ 12 + TALLY  R@ 12 + @   R@ 16 + @ MAX  R@ 16 + !
    IF  ( free-offset ) DUP  R@ @@ + @   R@ 4+ !
    ELSE    $ No free WME of this class, make a new one
       R@ @ SIZE-OF-FRAME      R@ 8 + W@ ( size)
         DUP WME-BYTES +!      R@ @ ( handle) RESIZE-DYNAMIC
    THEN  ( offset)   $ Store offset and class in WME-LIST
       DUP TIME-TAG @ >WME-LIST DUP >R !  SWAP R> C!
    R@ @@ + ( addr)
    $ Put in WME #
    R> 8 + W@ ( size) (WME-SZ) !
    DUP TIME-TAG @ SWAP ! DUP (WME-ADDR) ! ;
```

Screen # 8

```
$ SEND-REMOVE                                       ( PLB*03/19/87)
HEX
: SEND-REMOVE ( wme# - ) $ CR ." SEND-REMOVE " DUP .
    0A ?SEND-NET     98 W,NET   [RHS#] @ ,NET     ,NET ;
   $ Send code,rhs#,wme#
```

Screen # 9

```
$ REMOVE-WME                                        ( PLB*03/19/87)
HEX : REMOVE-WME ( wme# - )  DUP WME? NOT IF R> 2DROP EXIT THEN
    '1ST-WME @EXECUTE >R    WME-COUNT  DOCK
    R@ SEND-REMOVE $ Send code,rhs#,wme#
    WATCH2? IF SEND-TO-NET R@ .REM-WME THEN
    R@ WME>CLASS >CLASS-LIST    DUP %CLASS-ADDR ! 0C + DOCK
    R@ WME>ADDR  %WME-ADDR !     R@ WME>OFFSET  %WME-OFFSET !
    -1 R> >WME-LIST !
    $ Determine if WME was at end of list !!!
    %CLASS-ADDR @ DUP @ SIZE-OF-FRAME SWAP 8 + W@ -
    %WME-OFFSET @ = IF    $ simply release to free memory
        %CLASS-ADDR @ 8 + W@ NEGATE DUP WME-BYTES +!
        %CLASS-ADDR @@ RESIZE-DYNAMIC
    ELSE  $ not at end, add to free list !!!!
        %CLASS-ADDR @ 4+ DUP >R @   %WME-ADDR @  !
        %WME-OFFSET @                R>           !   THEN ;
```

Screen # 10

```
$ REMOVE-*                                          ( PLB*02/06/87)
HEX
: REMOVE-SINGLE-CLASS ( class# - ) DUP OPEN-CLASS  L-FREE OFF
    L-CNT OFF 8 ?SEND-NET  9C W,NET  [RHS#] @ ,NET  W,NET
        $ Remove entries in WME-LIST
        TIME-TAG @ ?DUP IF 1+ 1 DO    I WME>CLASS LIT# W@ =
                IF -1 I >WME-LIST ! WME-COUNT DOCK THEN
        LOOP THEN
        4  ( initial size)   LAST-LIT @@ SIZE-OF-FRAME -
         DUP WME-BYTES +! LAST-LIT @@ RESIZE-DYNAMIC ;
: REMOVE-*  WME-COUNT OFF  TIME-TAG OFF    0FA0 ( 4000.) DUP
    'WME-LIST @ SIZE-OF-FRAME -   DUP WME-BYTES +!
      'WME-LIST @ RESIZE-DYNAMIC
   LIT-COUNT @ ?DUP IF 0 DO I REMOVE-SINGLE-CLASS LOOP THEN
   0A ?SEND-NET  A0 W,NET [RHS#] @ ,NET ,NET CLEAR-#FIRINGS
   CLEAR-CLASS  TOTAL-#-IN-CS OFF  FIRED-COUNT OFF ;
```

Screen # 11

```
$ FINISH-MAKE                                       ( PLB*01/09/87)
HEX
: FINISH-MAKE (WME-SZ) @ 8 + ?SEND-NET
    90 W,NET  [RHS#] @ ,NET  (WME-CLS) @ W,NET
    (WME-ADDR) @  (WME-SZ) @ MOV-TO-NET
        WATCH2? IF SEND-TO-NET TIME-TAG @ .MAKE-WME THEN
        $ Check maximum stuff
        WME-COUNT @ MAX-WME @ MAX MAX-WME !
        WME-BYTES @ MAX-WMEB @ MAX  MAX-WMEB ! ;
```

Screen # 12

```
$ INIT-LIT&WME                                      ( PLB*11/01/86)
HEX
: (INIT-SINGLE-CLASS)  ( class# - ) DUP
        >CLASS-LIST >R
        $ Send to RP's here
        8 ?SEND-NET    A4 W,NET    ( class ) W,NET
           R@ 8 + W@ W,NET      R@ 0A + W@ W,NET
        R@ 4+ OFF                  $ Zero free list
        4 WME-BYTES +!
        4 CREATE-DYNAMIC R> ! ; $ Create WME array

: INIT-LIT&WME   LIT-COUNT @ (INIT-SINGLE-CLASS) ;
```

Screen # 13

```
$ WME Initialization                                ( PLB*11/02/86)
: (INIT-WME)   WME-COUNT OFF   TIME-TAG OFF
    '1ST-WME OFF
    ['] INIT-LIT&WME   'INIT-LIT&WME !
    $ Create WME-LIST
       4000 DUP DUP WME-BYTES +!
       CREATE-DYNAMIC 'WME-LIST !
       [ HEX ] 6 ?SEND-NET  A6 W,NET    ,NET
    $ Create CLASS Arrays of zero length
       LIT-COUNT @ ?DUP IF 0 DO
         I (INIT-SINGLE-CLASS) LOOP THEN
    WME-BYTES @ MAX-WMEB ! ;

: INIT-WME   MAX-WME OFF     MAX-WMEB OFF
             'INIT-LIT&WME OFF   ['] (INIT-WME) '1ST-WME ! ;
' INIT-WME 'INIT-WME !
```

Screen # 14

Screen # 15

Screen # 16

```
$ WME print routines                                   ( PLB*02/15/87)
: .#WME ?CR IMM-CNT @ CASE
   0 OF ." No WME's have been " ENDOF
   1 OF ." 1 WME has been " ENDOF
   IMM-CNT @ . ." WME's have been " ENDCASE ;

: .WME ( wme# - )  ?CR ?CWAIT   DUP 4 U.R ." : ( "
   DUP WME>CLASS OPEN-CLASS  WME>ADDR %WME-ADDR !
   L-TOK @ TOKEN>$ COUNT +REV TYPE -REV     $ print class name
   .AV-PAIRS IMM-CNT TALLY ;

: .WME-END .#WME ." printed" CTLY-VEC OFF ;

OPS: WMTT END')' ['] .WME-END CTLY-VEC !  IMM-CNT OFF
     TIME-TAG @ ?DUP IF 1+ 1 DO  I WME? IF I .WME
     THEN  LOOP THEN .WME-END ;
```

Screen # 17

```
$ Support for MAKE & MODIFY from keyboard         ( PLB*10/28/86)
: .ILL-CLASS .ERROR-LINE ." Item " .AT$
   ." has not been literalized."  CR-ABORT ; RECOVER
: [READ-CLASS]  GET-ATOM AT$ TOKEN? ?DUP 0= IF .ILL-CLASS THEN
   ?LIT DUP -1 = IF .ILL-CLASS THEN
   OPEN-CLASS      JOT1  L-SIZE W@  ERASE ;
```

Screen # 18

```
$ Support for MAKE & MODIFY from keyboard         ( PLB*10/28/86)
: .ILL-SYN  .ERROR-LINE ." Syntax Error - expecting '^' or ')'"
   CR-ABORT ; RECOVER
: .ILL-ATTR .ERROR-LINE ." Illegal Attribute " .AT$
   ." for class '" L-TOK @ .TOKEN ." '" CR-ABORT ; RECOVER
: .ILL-VAL  .ERROR-LINE ." Illegal Value " .AT$
   CR-ABORT ; RECOVER
: .NO-TOK  .ERROR-LINE .AT$ ."  has not been tokenized, must be
illegal in this position" CR-ABORT ; RECOVER
: [READ-AV-PAIRS] BEGIN  GET-ATOM ATOM-TYPE
      7 =   $ Looking for a '^'
   WHILE
      GET-ATOM AT$ TOKEN? ?ATTR NOT IF .ILL-ATTR THEN
      GET-ATOM    ATOM-TYPE   IF .ILL-VAL THEN
         AT$ ?$>TOKEN   LAST-ATTR @ >JOT1 !
   REPEAT ATOM-TYPE 3 - IF .ILL-SYN   THEN ;
```

Screen # 19

```
$ Immediate MAKE                                  ( PLB*03/16/87)

OPS: MAKE [READ-CLASS] [READ-AV-PAIRS]
    $ Make a WME
    WATCH2? IF ?CWAIT ELSE CTRL-C THEN
    LIT# W@ MAKE-WME 4+ JOT1   SWAP   $ AVOID MM ERROR !!!!
    L-# W@ 4*  MOVE FINISH-MAKE
    -1 INST-#-IN-CS ! ;
```

Screen # 20

```
$ Filter Support Words                            ( PLB*10/25/86)
VARIABLE %-HERE
: ?% ( n - addr)  DUP %-HERE @ +  >JOT1  SWAP - ;

: %, ( n - )  4 ?%  !   4 %-HERE +! ;
: %W, ( n - ) 2 ?%  W!  2 %-HERE +! ;
 : PFA%, ( n - ) 4- %, ;

EXIT
: TEST INIT-OPS  %-HERE OFF
   ['] %, 4- @  %,    ['] ! 4- %,   ['] EXIT 4- %, ;
: CCC  SCRATCH 4+ EXECUTE ;
```

Screen # 21

```
$ Immediate Parser for MODIFY REMOVE WM          ( PLB*12/14/86)
WVARIABLE IMMC-STATE     VARIABLE WME-ADDR
VARIABLE 'C-PEEL    $ FOR A WHOLE CLASS
VARIABLE 'PEEL
: SCAN-END BEGIN GET-ATOM ATOM-TYPE 3 = UNTIL ;
: .IMM-CLASS .WARNING-LINE ." Item " .AT$
   ." has not been literalized."  ;
: .IMM-WME  .WARNING-LINE .AT$
 ." is not a valid Working Memory Element" ;
: .IMM-ATTR  .WARNING-LINE ." Item " .AT$
   ." is not an attribute of class " L-TOK @ .TOKEN ;
: .IMM-SYNT  .WARNING-LINE ." Illegal Syntax involving "
   .AT$ ;
: .ILL-CND .IMM-SYNT 2R> 2DROP SCAN-END ;
: .IMM-OR .IMM-SYNT 2R> 2DROP R> DROP SCAN-END ;
: >ATTR ( offset - attribute)   WME-ADDR @ + @ ;
```

Screen # 22

```
$ Filter Conditionals                             ( PLB*10/20/86)
: T>#'S ( token token - n n )
   2DUP TOKEN-NUM? SWAP TOKEN-NUM? AND
   IF TOKEN># SWAP TOKEN># SWAP
      ELSE DROP 2DROP 2R> 2DROP 0 THEN ;
: ?=     = NOT IF R> 2DROP 0 ( no-match) THEN ;
: ?<>    =     IF R> 2DROP 0 ( no-match) THEN ;
: ?>     T>#'S > NOT IF R> 2DROP 0 THEN ;
: ?<     T>#'S < NOT IF R> 2DROP 0 THEN ;
: ?>=    T>#'S <     IF R> 2DROP 0 THEN ;
: ?<=    T>#'S >     IF R> 2DROP 0 THEN ;

CREATE CND-TAB  ' ?= ,       ' ?> ,       ' ?< ,
  ' ?<> ,      ' ?>= ,      ' ?<= ,
: COND%, COND-TYPE W@ 8 - 4 * CND-TAB + @ PFA%,
   8 COND-TYPE W! ;
```

Screen # 23

```
$ Filter Conditionals for OR                      ( PLB*10/21/86)
: OT>#'S ( token token - n n )
   2DUP TOKEN-NUM? SWAP TOKEN-NUM? AND
   IF TOKEN># SWAP TOKEN># SWAP
      ELSE 2DROP R> DROP EXIT THEN ;
: ?0=    =      IF SWAP DROP 1 SWAP THEN ;
: ?0<>   = NOT IF SWAP DROP 1 SWAP THEN ;
: ?0>    OT>#'S >     IF SWAP DROP 1 SWAP THEN ;
: ?0<    OT>#'S <     IF SWAP DROP 1 SWAP THEN ;
: ?0>=   OT>#'S < NOT IF SWAP DROP 1 SWAP THEN ;
: ?0<=   OT>#'S > NOT IF SWAP DROP 1 SWAP THEN ;

CREATE CNDO-TAB  ' ?0= ,      ' ?0> ,      ' ?0< ,
  ' ?0<> ,     ' ?0>= ,     ' ?0<= ,
: COND-OR%, COND-TYPE W@ 8 - 4 * CNDO-TAB + @ PFA%,
   8 COND-TYPE W! ;
```

Screen # 24

```
$ OR Stuff                                        ( PLB*10/21/86)

: OR-E  ( f token - token)   SWAP NOT
   IF R> 2DROP 0 EXIT THEN ;

: OR-EX ['] OR-E PFA%,  R> DROP ;      $ END OR

: OR-LT AT$ ?$>TOKEN DUP TOKEN-NUM? NOT
   IF COND-TYPE W@ DUP 8 = SWAP 11 = OR NOT
      IF DROP .IMM-SYNT SCAN-END R> DROP 2R> 2DROP EXIT THEN
   THEN
   ['] DUP PFA%,   ['] long PFA%,  %,  COND-OR%, ;
```

Screen # 25

```
$ OR'ed condition State Table and support        ( PLB*10/20/86)
CREATE OR-STS  6 22 * DUP ALLOT  OR-STS SWAP ERASE  GILD
: STATE>  ( 18-items state# - )
   22 * OR-STS + PAD !   ' PAD @ !
   0 17 DO  I 4+ PAD @ + C!  -1 +LOOP ;    HEX
$  0  1  2  3  4  5  6  7  8  9  A  B  C  D  E  F 10 11
   3  4  1  1  1  1  1  1  2  2  2  2  2  2  1  1  1  1
           0 STATE> PAUSE              $ Starting State - NOOP
   0  0  0  0  0  0  0  0  0  0  0  0  0  0  0  0  0  0
           1 STATE> .IMM-OR            $ Illegal Conditional
```

```
3  4  1  1  1  1  1  1  1  1  1  1  1  1  1  1  1  1
         2 STATE> COND-COND      $ Conditional =,<>,>, etc.
3  4  1  1  1  1  1  1  2  2  2  2  2  2  1  5  1  1
         3 STATE> OR-LT          $ Literal
3  4  1  1  1  1  1  1  2  2  2  2  2  2  1  5  1  1
         4 STATE> .IMM-OR        $ Variable
```

Screen # 26

```
HEX   $ Conditionals State Table                  ( PLB*11/01/86)
$  0  1  2  3  4  5  6  7  8  9  A  B  C  D  E  F 10 11
   0  0  0  0  0  0  0  0  0  0  0  0  0  0  0  0  0  0
         5 STATE> OR-EX          $ Exit or'd condition
EMPTY WVARIABLE OR-ST      DECIMAL
: CND-OR   OR-ST W-OFF    8 COND-TYPE W!
   ['] 0 PFA%,     ['] SWAP PFA%,
   BEGIN
      GET-ATOM ATOM-TYPE
      OR-ST W@ 22 * OR-STS + + 4+ C@
      DUP OR-ST W!
      22 * OR-STS + @EXECUTE
   AGAIN ; RECOVER
```

Screen # 27

```
$ State Execution Words                          ( PLB*10/20/86)
   $ These words add code to the WME filter in JOT1

: CND-LIT AT$ ?$>TOKEN DUP TOKEN-NUM? NOT
   IF COND-TYPE W@ DUP 8 = SWAP 11 = OR NOT
      IF DROP .IMM-SYNT SCAN-END 2R> 2DROP EXIT THEN THEN
   ['] DUP PFA%,   ['] long PFA%,  %,  COND%, ;
```

Screen # 28

```
$ State Execution Words                          ( PLB*10/25/86)

: (CND-END) ['] DROP PFA%. ;
: CND-END (CND-END) R> DROP ;
: CND-LHS-END (CND-END) 2R> 2DROP  $ fix ret stk
   ['] 1 PFA%, ( true flag)   ['] EXIT PFA%, ( exit filter)
   TIME-TAG @ ?DUP IF 1+ 1 DO
      I WME>CLASS LIT# W@ = IF  I WME>ADDR 4+ WME-ADDR !
            JOT1 4+ EXECUTE
         IF I 'PEEL @EXECUTE THEN THEN
   LOOP THEN ;
```

Screen # 29

```
$ Conditionals State Table and support           ( PLB*10/19/86)

DECIMAL

CREATE IMMC-STATES 17   22 * DUP ALLOT  IMMC-STATES SWAP ERASE
GILD

: STATE>  ( 18-items state# - )
   22 * IMMC-STATES + PAD !
   ' PAD @  !
   0 17 DO  I 4+ PAD @ + C!  -1 +LOOP ;
```

Screen # 30

```
HEX   $ Conditionals State Table                  ( PLB*10/20/86)
$  0  1  2  3  4  5  6  7  8  9  A  B  C  D  E  F 10 11
   4  5  1  1  A  1  1  1  6  6  6  6  6  6  9  1  1  1
         0 STATE> PAUSE          $ Starting State - NOOP
   0  0  0  0  0  0  0  0  0  0  0  0  0  0  0  0  0  0
         1 STATE> .ILL-CND       $ Illegal Conditional
   0  0  0  0  0  0  0  0  0  0  0  0  0  0  0  0  0  0
         2 STATE> CND-END        $ End of conditional
   0  0  0  0  0  0  0  0  0  0  0  0  0  0  0  0  0  0
         3 STATE> CND-LHS-END    $ End of conditional and LHS
   1  1  1  3  1  1  1  2  1  1  1  1  1  1  1  1  1  1
         4 STATE> CND-LIT        $ Literal Match
   1  1  1  3  1  1  1  2  1  1  1  1  1  1  1  1  1  1
         5 STATE> .ILL-CND       $ Variable Match
   7  8  1  1  1  1  1  1  1  1  1  1  1  1  1  1  1  1
         6 STATE> COND-COND      $ Conditionals ( =,<>,>, etc.
```

Screen # 31

```
HEX   $ Conditionals State Table                  ( PLB*10/20/86)
$  0  1  2  3  4  5  6  7  8  9  A  B  C  D  E  F 10 11
   1  1  1  3  1  1  1  2  1  1  1  1  1  1  1  1  1  1
         7 STATE> CND-LIT        $ Eg. '> 7' or '= HOUSE'
   1  1  1  3  1  1  1  2  1  1  1  1  1  1  1  1  1  1
         8 STATE> .ILL-CND       $ Eg. '<> <X>' or '> <Y>'
   1  1  1  3  1  1  1  2  1  1  1  1  1  1  1  1  1  1
         9 STATE> CND-OR         $ Eg. '<< 7 HOUSE FOOD >>'
   C  E  1  1  1  1  1  1  B  B  B  B  B  B 10  1  1  1
         A STATE> PAUSE          $ Found '{'
   C  D  1  1  1  1  1  1  1  1  1  1  1  1 10  1  1  1
         B STATE> COND-COND      $ Found condition
   C  D  1  1  1  F  1  1  B  B  B  B  B  B 10  1  1  1
         C STATE> CND-LIT        $ Eg. '> 7' or '= HOUSE'
   C  D  1  1  1  F  1  1  B  B  B  B  B  B 10  1  1  1
         D STATE> .ILL-CND       $ Eg. '<> <X>' or '> <Y>'
```

Screen # 32

```
HEX   $ Conditionals State Table                  ( PLB*10/19/86)
$  0  1  2  3  4  5  6  7  8  9  A  B  C  D  E  F 10 11
   C  D  1  1  1  1  1  1  B  B  B  B  B  B 10  1  1  1
         E STATE> .ILL-CND       $ Eg. '{ <X>'
   1  1  1  3  1  1  1  2  1  1  1  1  1  1  1  1  1  1
         F STATE> PAUSE          $ Found '}' now must be ^ or
   C  D  1  1  1  F  1  1  B  B  B  B  B  B 10  1  1  1
        10 STATE> CND-OR         $ Eg. '<< 7 HOUSE FOOD >>'

EMPTY
```

Screen # 33

```
$ Parse Conditions State Machine                 ( PLB*10/20/86)
: PARSE-SUB-COND   IMMC-STATE W-OFF    3 COND-TYPE W!
   $ Add Attribute to filter
   $ Code puts attribute offset on stack and then gets attr val
   ['] long PFA%,   LAST-ATTR @ %,    ['] >ATTR PFA%,
   BEGIN
      GET-ATOM ATOM-TYPE
      IMMC-STATE W@ 22 * IMMC-STATES + + 4+ C@
      DUP IMMC-STATE W!
      22 * IMMC-STATES + @EXECUTE
   AGAIN ; RECOVER
```

Screen # 34

```
$ Parse immediate complex conditions             ( PLB*12/23/86)

: PARSE-SUB
   GET-ATOM ATOM-TYPE IF .IMM-CLASS SCAN-END EXIT THEN
   AT$ TOKEN? ?LIT DUP -1 =
      IF .IMM-CLASS SCAN-END DROP EXIT THEN
   OPEN-CLASS
   $ Initialize Filter here !!!!
   %-HERE OFF    [ ' %, 4- @ ] LITERAL %,     $ set code field
   GET-ATOM ATOM-TYPE CASE
   3 OF LIT# W@ 'C-PEEL @EXECUTE EXIT ENDOF
   7 OF BEGIN GET-ATOM AT$ TOKEN?
      ?ATTR NOT IF .IMM-ATTR SCAN-END EXIT THEN
   PARSE-SUB-COND AGAIN ENDOF .IMM-SYNT SCAN-END ENDCASE ;
```

Screen # 35

```
$ PARSE-KBD function for MODIFY REMOVE WM        ( PLB*12/23/86)
HEX
: PARSE-KBD     BEGIN
   AT$ W@ 012B = IF PARSE-SUB ELSE
      AT$ TOKEN?
      DUP TOKEN-NUM? IF
         TOKEN>$ DUP WME? NOT IF DROP .IMM-WME ELSE
         'PEEL @EXECUTE  THEN
      ELSE  $ not a number, check to see if it is a class
         ?LIT DUP -1 = IF DROP .IMM-CLASS ELSE
            'C-PEEL @EXECUTE THEN
      THEN THEN GET-ATOM ATOM-TYPE 3 = ATOM-TYPE 7 = OR UNTIL
      CLOSE-JOT1 ;
: CK-END    ATOM-TYPE 3 - IF .ERROR-LINE ." Expecting a ')' to e
nd structure" CR-ABORT THEN ;
```

Screen # 36

Screen # 37

```
$ Support for immediate MODIFY                    ( PLB*02/15/87)
VARIABLE CHG-CNT
VARIABLE MOD-CNT    $ also used to hold WME# being modified
: CHG-SINGLE ( wme# - ) WATCH2? IF ?CWAIT ELSE CTRL-C THEN
       DUP WME? IF IMM-CNT TALLY
       DUP WME>CLASS OPEN-CLASS  MOD-CNT !
       LIT# W@ MAKE-WME 4+   MOD-CNT @ WME>ADDR 4+ SWAP DUP >R
          L-SIZE W@ 4- MOVE   R> ( address )
       CHG-CNT @ 0 DO
          I 4* >JOT1 @ ?ATTR IF
             LAST-ATTR @ OVER +  ( address)
             I 1+ 4* >JOT1 @ SWAP !
          ELSE ." NOT AN ATTRIBUTE" THEN
       2 +LOOP DROP FINISH-MAKE  MOD-CNT @ REMOVE-WME
    ELSE DROP THEN ;
```

Screen # 38

```
$ DO-CHANGES for immediate MODIFY                 ( PLB*10/31/86)
VARIABLE OLD-TT
HEX
: DO-CHANGES TIME-TAG @ OLD-TT ! MOD-CNT @ ?DUP IF 0 DO
         I 4* >JOT2 @
    DUP 80000000 AND
    IF  OFF AND
        OLD-TT @ 1+ 0 DO I WME>CLASS OVER =
           IF I CHG-SINGLE THEN
        LOOP DROP
    ELSE  CHG-SINGLE  THEN
    LOOP THEN ;
```

Screen # 39

```
$ READ-CHANGES for Immediate MODIFY               ( PLB*10/25/86)

: ADD-CHG ( - addr) CHG-CNT @ 4* >JOT1   CHG-CNT TALLY ;
: AB-MOD CLOSE-JOT2 CLOSE-JOT1 ;
: READ-CHANGES  CHG-CNT OFF
    BEGIN ATOM-TYPE 7 =      $ '^'
    WHILE
        GET-ATOM AT$ TOKEN? DUP NOT IF AB-MOD .NO-TOK THEN
           ADD-CHG !
        GET-ATOM ATOM-TYPE IF AB-MOD .ILL-VAL THEN
           AT$ ?$>TOKEN ADD-CHG !
    GET-ATOM REPEAT
    ATOM-TYPE 3 - IF AB-MOD .ILL-SYN THEN ;
```

Screen # 40

```
$ Execution Words for immediate MODIFY            ( PLB*10/25/86)

: ADD-MOD ( - addr ) MOD-CNT TALLY  MOD-CNT @ 4* >JOT2 4- ;

HEX
: ADD-S     ( wme# - )      ADD-MOD ! ;
: ADD-CLS   ( class# - )    80000000 OR ADD-MOD ! ;
```

Screen # 41

```
$ immediate MODIFY                                ( PLB*03/16/87)
: .IMM-MOD AB-MOD  .#WME ." modified" ;

OPS: MODIFY  ['] ADD-S  'PEEL !     ['] ADD-CLS 'C-PEEL !
   IMM-CNT OFF  ['] .IMM-MOD CTLY-VEC !
   MOD-CNT OFF
   GET-ATOM
   PARSE-KBD ATOM-TYPE 7 - IF .ERROR-LINE
    ." Expecting a '^' to begin MODIFY changes" .IMM-MOD
       CR-ABORT THEN
   READ-CHANGES    DO-CHANGES .IMM-MOD
   -1 INST-#-IN-CS ! ;
```

Screen # 42

```
$ Immediate Remove Support                        ( PLB*02/15/87)

: ?REM-WME ( wme# - )  WATCH2? IF ?CWAIT THEN  DUP WME?
   IF REMOVE-WME IMM-CNT TALLY ELSE DROP THEN ;

: REM-CLASS ( class# - )   OPEN-CLASS
      TIME-TAG @ ?DUP IF 1+ 1 DO  I WME>CLASS LIT# W@ = IF
      WATCH2? IF I ?REM-WME ELSE IMM-CNT TALLY THEN
             THEN  LOOP THEN
   LIT# W@ REMOVE-SINGLE-CLASS ;

: REM-*   WATCH2? IF TIME-TAG @ ?DUP IF 1+ 1 DO  I ?REM-WME
   LOOP THEN ELSE WME-COUNT @ IMM-CNT ! THEN REMOVE-* ;
```

Screen # 43

```
$ immediate REMOVE                                ( PLB*03/16/87)
HEX
: .REM-IMM .#WME ." removed" CTLY-VEC OFF -1 INST-#-IN-CS ! ;

: /rem/  '1ST-WME @EXECUTE
       IMM-CNT OFF   ['] .REM-IMM CTLY-VEC !
   GET-ATOM  ATOM-TYPE 03 = IF TIME-TAG @ 0=
            IF .REM-IMM EXIT THEN
      0 1 TIME-TAG @ DO I WME? IF DROP I LEAVE THEN -1 +LOOP
       ?REM-WME .REM-IMM EXIT    THEN
   AT$ W@ 012A  = IF END')'  REM-* .REM-IMM EXIT THEN
   ['] REM-CLASS 'C-PEEL ! ['] ?REM-WME  'PEEL !
   PARSE-KBD .REM-IMM CK-END ;

OPS: REMOVE     /rem/ ;      OPS: OPS-REMOVE     /rem/ ;
```

Screen # 44

```
$ immediate WME dump                              ( PLB*12/03/86)
HEX
: .WME-CLASS ( class# - ) OPEN-CLASS
   TIME-TAG @ ?DUP IF 1+ 1 DO  I WME>CLASS LIT# W@ = IF
       I .WME THEN   LOOP THEN ;

: .WME* LIT-COUNT @ ?DUP IF 0 DO I .WME-CLASS LOOP THEN ;

OPS: WM IMM-CNT OFF   ['] .WME-END CTLY-VEC !  GET-ATOM
   ATOM-TYPE 03 = IF TIME-TAG @ 0= IF .WME-END EXIT THEN
     0 1 TIME-TAG @ DO I WME? IF DROP I LEAVE THEN -1 +LOOP
       DUP WME? IF .WME ELSE DROP THEN .WME-END EXIT   THEN
   AT$ W@ 012A  = IF END')'  .WME* .WME-END EXIT THEN
   ['] .WME-CLASS 'C-PEEL !  ['] .WME  'PEEL !   PARSE-KBD
   CK-END .WME-END ;
```

Screen # 45

```
$ Support for SAVE-WM                             ( PLB*03/17/87)
WVARIABLE SAVE-PTR          128 ARRAY SAVE-BUFF
: WRITE-SAVE SAVE-PTR W-OFF SAVE-BUFF F-DMA FCB1 F-WRITE-SEQ
   IF ['] (NORMAL-TYPE) 'TYPE ! .WARNING-LINE
      ." SAVE-WM Write Error." CR THEN SAVE-BUFF 128 0 FILL ;

: (SAVE-TYPE) ( a n - ) ?DUP IF 0 DO DUP C@
   SAVE-PTR W@ SAVE-BUFF + C! ( store character)
   SAVE-PTR W-TALLY SAVE-PTR W@ 128 = IF WRITE-SAVE THEN
   1+ LOOP THEN DROP ;

: SAVE-WME ( wme# - )   'TYPE @ >R ['] (SAVE-TYPE) 'TYPE !
   CR ." (MAKE " DUP WME>CLASS OPEN-CLASS WME>ADDR %WME-ADDR !
   L-TOK @ .TOKEN $ print class name
   .AV-PAIRS R> 'TYPE ! IMM-CNT TALLY ;
```

Screen # 46

```
$ Support for SAVE-WM                              ( PLB*03/17/87)
HEX
: SAVE-FILE GET-ATOM ( read filename) 0FCB1 AT$ FCB1
   PARSE-FILENAME IF .ERROR-LINE ." File name error - " .AT$
      ."  is not a valid filename" ABORT THEN
   FCB1 F-DELETE DROP ( erase) FCB1 F-MAKE IF .ERROR-LINE
      ." SAVE-WME file could not be created" ABORT THEN
   SAVE-PTR W-OFF ;

: CLOSE-SAVE-FILE 'TYPE @ ['] (SAVE-TYPE) 'TYPE ! CR
   1A EMIT ( `Z) 'TYPE ! WRITE-SAVE FCB1 F-CLOSE
   IF .WARNING-LINE ." SAVE-WM Close Error" THEN ;
```

Screen # 47

```
$ Save WME's to a file                            ( PLB*03/18/87)
HEX : .SAVE-END   CLOSE-SAVE-FILE
         .#WME ." saved to disk file" CTLY-VEC OFF ;
: SAVE-CLASS ( class# - ) OPEN-CLASS
   TIME-TAG @ ?DUP IF 1+ 1 DO  I WME>CLASS LIT# W@ = IF
      I SAVE-WME THEN   LOOP THEN ;
: SAVE*  TIME-TAG @ ?DUP IF 1+ 1 DO I WME? IF I SAVE-WME THEN
     LOOP THEN ;

OPS: SAVE-WM IMM-CNT OFF   SAVE-FILE   ['] .SAVE-END CTLY-VEC !
GET-ATOM ATOM-TYPE 03 = IF TIME-TAG @ 0= IF .SAVE-END EXIT THEN
     0 1 TIME-TAG @ DO I WME? IF DROP I LEAVE THEN -1 +LOOP
        DUP WME? IF SAVE-WME ELSE DROP THEN .SAVE-END EXIT THEN
   AT$ W@ 012A  = IF END')'  SAVE* .SAVE-END EXIT THEN
   ['] SAVE-CLASS 'C-PEEL !  ['] SAVE-WME  'PEEL !   PARSE-KBD
   CK-END .SAVE-END ;
```

Screen # 50

Screen # 51

Screen # 52

Screen # 53

WME Variables

'WME-LIST is the variable that holds the handle to the WME list

>WME-LIST points to an entry in the WME list

?RESIZE-WME-LIST resizes the WME list if it cannot hold any more entries

Screen # 54

Screen # 55

```
WME>ADDR
$ WME>ADDR points the the actual WME
: WME>ADDR ( wme# - addr )
   >WME-LIST DUP C@ ( class)
   >CLASS-LIST @@ SWAP @ ( offset) + 0FFFFFF AND ;
$ WME? determines if a WME exists or not
: WME? ( wme# - f )   DUP 1 TIME-TAG @ 1+ WITHIN
   IF  >WME-LIST @ -1 = NOT  ELSE  DROP 0   THEN ;

$ WME>CLASS fetches the class of the WME
: WME>CLASS ( wme# - class# )    >WME-LIST C@ ;
$ WME>OFFSET fetches the offset of a WME
: WME>OFFSET ( wme# - offset )   >WME-LIST @ 0FFFFFF AND ;
```

Screen # 56

Printout stuff to print the WME changes when WATCH 2 is on

Screen # 57

MAKE-WME will make an entry for a new WME given the class number
Note that memory reallocation can occur at this point.
If there is an unused entry for a particular class, then that address is the one returned. If there is not a blank entry, then the WME frame is made larger and the address is returned.

No need to clear WME - just put WME# in it

Screen # 58

Screen # 59

REMOVE-WME removes a WME from the system. It also notifies the RP's to remove their copy if they need to.

- zero wme-list pointer
- decrement wme count
- if wme is at end of wme array, release it back to free memory & update wme-bytes
- if wme is not at end of wme array, add it to free list

Screen # 60

REMOVE-*

REMOVE-SINGLE-CLASS removes all WME's from a specified class

REMOVE-* removes all WME's from the system

Screen # 61

FINISH-MAKE actually sends the new WME to the RP's It also updates various stats.

Screen # 62

INIT-LIT&WME (INIT-SINGLE-CLASS) provides a cheat to add classes after other WME's already have been made. The classes are not initialized until the first WME has been made. This is done in order to minimize the memory reallocation on the HOST. After the first WME has been made, then any new classes are initialized as they are defined.

All classes have been given an initial size of 4 bytes. This is to allow the free list code to be simpler !!!

INIT-LIT&WME initializes the newly defined class AFTER the first WME make !!!

Screen # 63

WME Initialization
(INIT-WME) is executed only once when the first WME is made. It then turns off the '1ST-WME vector to prevent itself from being called again.

Screen # 64

Screen # 65

Screen # 66

WME print routines
.#WME prints the number of WME's printed

.WME prints the WME specified

.WME-END prints the number of WME's printed and cleans up

WMTT is an OPS: command to print the WME's in time-tag order. No arguments are needed

Screen # 67

Support for MAKE & MODIFY from keyboard

.ILL-CLASS prints an error message

[READ-CLASS] reads the class name

Screen # 68

Support for MAKE & MODIFY from keyboard

Misc. Error messages

[READ-AV-PAIRS] reads the input device until the end of the attribute value pair is found

Screen # 69

Immediate MAKE

MAKE is an OPS: command to make a WME from the keyboard

Screen # 70

Filter Support Words

Misc. support for the immediate filter

Screen # 71

Immediate Parser for MODIFY REMOVE WM

Misc. support for immediate MODIFY REMOVE and WM

Screen # 72

Screen # 73

Screen # 74

Screen # 75

Screen # 76

Screen # 77

Screen # 78

Screen # 79

Screen # 80

Screen # 81

Screen # 82

Screen # 83

Screen # 84

Screen # 85

```
$ PARSE-KBD function for MODIFY REMOVE WM          ( PLB#12/23/86)
HEX
: PARSE-KBD     BEGIN ." PARSE-KBD " .AT$ ATOM-TYPE . AT$ W@ .
   AT$ TOKEN? DUP 0=
   IF DROP AT$ W@ 0128 = IF PARSE-SUB ELSE .IMM-CLASS THEN ELSE
   DUP TOKEN-NUM? IF
      TOKEN># DUP WME? NOT IF DROP .IMM-WME ELSE
      'PEEL @EXECUTE  THEN
   ELSE   $ not a number, check to see if it is a class
      ?LIT DUP -1 = IF DROP .IMM-CLASS ELSE
         'C-PEEL @EXECUTE THEN
   THEN THEN GET-ATOM ATOM-TYPE 3 = ATOM-TYPE 7 = OR UNTIL
   CLOSE-JOT1 ;

: CK-END    ATOM-TYPE 3 - IF .ERROR-LINE ." Expecting a ')' to e
nd structure" CR-ABORT THEN ;
```

Screen # 86

Screen # 87

```
$ Support for immediate MODIFY                      ( PLB#11/01/86)
VARIABLE CHG-CNT
VARIABLE MOD-CNT    $ also used to hold WME# being modified

: CHG-SINGLE ( wme# - ) WATCH2? IF ?WAIT ELSE CTRL-Y THEN
      DUP WME? IF IMM-CNT TALLY
      DUP WME>CLASS OPEN-CLASS  DUP MOD-CNT !
      MODIFY-WME 4+ ( addr - )
      CHG-CNT @ 0 DO
         I 4* >JOT1 @ ?ATTR IF
            LAST-ATTR @ OVER +  ( address)
            I 1+ 4* >JOT1 @ SWAP !
         ELSE ." NOT AN ATTRIBUTE" THEN
      2 +LOOP DROP FINISH-MODIFY
   ELSE DROP THEN ;
```

Screen # 88

Screen # 89

Screen # 90

Screen # 91

MODIFY is an OPS: command that allows the user to modify
    a single WME or groups of WME's from the keyboard

```
    (MODIFY 123 ^WANT HOUSE)  modifies a single WME
    (MODIFY GOAL ^WANT HOUSE) modifies all WME's of a given
                class
    (MODIFY (GOAL ^STATUS PENDING) ^STATUS COMPLETE)
          modifies a specified group of WME's
```

Screen # 92

Stuff needed for REMOVE and OPS-REMOVE

Screen # 93

REMOVE and OPS-REMOVE are OPS: commands to allow the user
    to remove WME's from the system

```
    (REMOVE)          removes last made WME
    (REMOVE *)        removes all WME's
    (REMOVE class-name) removes all WME's of a given class
    (REMOVE (GOAL ^WANT << HOUSE BOAT >> ))
                      removes specified WME's
```

Screen # 94

( PLB#05/17/87)

WM is an OPS: command that allows the user to dump working
    memory. The syntax is as follows:

```
    (WM)                 prints last made WME
    (WM  *)              prints all WME's in order of class
    (WM  class-name)     prints all WME's of a given class
    (WM  (GOAL ^WANT << OBJECT1 OBJECT2 >> )
                         prints specified WME's
```

Screen # 95

Screen # 96

Screen # 97

Screen # 0

```
$ RHS.PF  —  RHS Parser and execution code        ( PLB*10/10/86)

Update Records :

(01) 10/10/86 PLB  -  Creation of RHS Support Package
```

Screen # 1

```
$ Load Screen for RHS Support Package             ( PLB*04/01/97)

DECIMAL START-SEGMENT .( ==> RHS Support Package)
        2   3   THRU    $ RHS: and CMD:
        4       LOAD    $ TEMP COND AND SETQ !!!!!!!!!!!
        5       LOAD    $ Misc. RHS: words
        6       LOAD    $ EXEC-CMD
        7   11  THRU    $ RHS runtime words
        12  19  THRU    $ CMD: words
        20  31  THRU    $ RHS: words
        40  48  THRU    $ WRITE
END-SEGMENT
```

Screen # 2

```
$ RHS Compiling Word Support                      ( PLB*09/14/86)

: RHS:   RHS-VOCAB DEFINITIONS   CREATE SMUDGE
         FORTH     DEFINITIONS   ] ;CODE
         I R -) MOV   W I MOV  NEXT

: RHS-VIEW     CONTEXT W@ >R  RHS-VOCAB
               -' IF R> CONTEXT W! 1 ABORT" ?" THEN
               SWAP DROP 2- ( B/H) W@   1024 /MOD
               OVER 0=   R> CONTEXT W!
               ABORT" Can't VIEW a keyboard definition"
               (OPEN) SCR ! 0 R# ! L ;
```

Screen # 3

```
$ CMD Compiling Word Support                      ( PLB*12/17/86)
WVARIABLE SPACE-NEEDED

: CMD:   CMD-VOCAB DEFINITIONS   CREATE SMUDGE
         FORTH     DEFINITIONS   ] ;CODE
         I R -) MOV   W I MOV  NEXT

: CMD-VIEW     CONTEXT W@ >R  CMD-VOCAB
               -' IF R> CONTEXT W! 1 ABORT" ?" THEN
               SWAP DROP 2- ( B/H) W@   1024 /MOD
               OVER 0=   R> CONTEXT W!
               ABORT" Can't VIEW a keyboard definition"
               (OPEN) SCR ! 0 R# ! L ;
```

Screen # 4

```
$ DUMMY RHS PARSER                                ( PLB*04/01/37)
VARIABLE LEVEL-COUNT
: TST1 ( CR ." RULE RHS ........ " ) ;
: TEMP-READ-RHS  1 LEVEL-COUNT !
   5 [RHS.CFA] TST1
   BEGIN
      GET-ATOM ATOM-TYPE
      DUP 2 = IF LEVEL-COUNT TALLY THEN
          3 = IF LEVEL-COUNT DOCK  THEN
  LEVEL-COUNT @ 0= UNTIL ;

$ RHS: WRITE    TEMP-READ-RHS ;
RHS: SETQ TEMP-READ-RHS ;
RHS: COND TEMP-READ-RHS ;
RHS: ADD_TO_VECTOR   TEMP-READ-RHS ;
```

Screen # 5

```
$ HALT and EXIT                                   ( PLB*01/19/87)

: RHS-END')' GET-ATOM ATOM-TYPE 3 - IF .ERROR-LINE
   ." Expecting a ')' in RHS# " #RHS W@ . ." in production "
   .'RN$' CR-ABORT THEN ;

RHS: EXIT [RHS,CFA] NORMAL-TYPE
          [RHS,CFA] opBYE RHS-END')' ;

RHS: HALT [RHS,CFA] NORMAL-TYPE
          [RHS,CFA] 2R> [RHS,CFA] 2DROP
          [RHS,CFA] R>
          [RHS,CFA] 2DROP ( for +RUN-TILL stack !!! )
          [RHS,CFA] EXIT RHS-END')' ;
```

Screen # 6

```
$ EXEC-CMD                                        ( PLB*12/12/86)

: EXEC-CMD  GET-ATOM
   CMD-VOCAB DEFINITIONS OPS-' OPS-VOCAB DEFINITIONS
   IF .ERROR-LINE ." Illegal function " .AT$ ."  in RHS# "
        #RHS W@ . ." in production " .'RN$' CR-ABORT
   THEN
   DROP EXECUTE ;
```

Screen # 7

```
$ FILE-ACCEPT                                     ( PLB*01/19/87)

: GET-ACCEPT-CHAR ( - c ) (ACCEPT-PTR) W@ ACC-FCB-BUFF + C@
   DUP 26 = IF DROP 13 (FILE-ACCEPT) W-OFF EXIT THEN
   (ACCEPT-PTR) W-TALLY (ACCEPT-PTR) W@ 128 = IF
```

```
READ-ACCEPT-FILE THEN ;

: ACCEPT-FROM-FILE  ACCEPT-BUFF OFF
  BEGIN
  0 BEGIN DROP GET-ACCEPT-CHAR DUP 10 = NOT UNTIL $ strip lf
      DUP DUP EMIT   ACCEPT-BUFF C@ 1+ ACCEPT-BUFF + C!
      1 ACCEPT-BUFF C+!
  13 ( CR ) = UNTIL
  -1 ACCEPT-BUFF C+! ( correct count)
  32 ACCEPT-BUFF C@ 1+ ACCEPT-BUFF + C! ;
```

Screen # 8

```
$ /ACCEPT/                                        ( PLB*01/19/97)

: /ACCEPT/  (FILE-ACCEPT) W@ IF
               ACCEPT-FROM-FILE
            ELSE
               NORMAL-TYPE
               ACCEPT-BUFF 1+ #KBD-COL EXPECT
               CNT C@ ACCEPT-BUFF C! BUFFER-TYPE
            THEN
            ACCEPT-BUFF ?$>TOKEN ;


CMD: ACCEPT
         RHS-END')'    [RHS,CFA] /ACCEPT/ 1 ;
```

Screen # 9

```
$ /MAKE/                                          ( PLB*12/12/86)
$ /MAKE/ expects 2byte class#, 2byte size, n-byte WME template
$   to follow it in the rule frame
VARIABLE /WME-ADDR/
CODE /MAKE/       I )+ A0 W. MOV      A0 D0 MOV    $ Class
                  I )+ A0 W. MOV      I A1 MOV     $ size
                  A0 I ADD            $ update I
                  A1 S -) MOV         $ Addr
                  A0 S -) MOV         $ size
                  D0 S -) MOV         $ CLASS
        [[
                  MAKE-WME 4+ /WME-ADDR/ !
                  >R
                  ( from)  /WME-ADDR/ @  ( to)  R> ( size)
                  MOVE ; SMUDGE
```

Screen # 10

```
* Misc. Execution words                           ( PLB*12/17/86)

CODE /@RP-BINDING/  I )+ A0 W. MOV  <BOUND-VARIABLES> >W1
    # A0 ADD  A0 ) S -) MOV ,NEXT

CODE /!RP-BINDING/  I )+ A0 W. MOV  <BOUND-VARIABLES> >W1
    # A0 ADD  S )+ A0 ) MOV ,NEXT

CODE /@RP-BINDING-INT/  I )+ A0 W. MOV  <BOUND-VARIABLES> >W1
    # A0 ADD  A0 ) S -) MOV [[ DUP TOKEN-NUM? IF TOKEN># ELSE
    .ERROR-LINE ." Expecting a numeric argument, not "
    39 EMIT .TOKEN 39 EMIT CR-ABORT THEN ; SMUDGE

CODE /!WME-VAL/ I )+ A0 W. MOV  /WME-ADDR/ AB A0 ADD
    S )+ A0 ) MOV ,NEXT
```

Screen # 11

```
$ WRITE support                                   ( PLB*12/17/86)
WVARIABLE END-WR-CNT
CODE .TOK-LIST    I )+ A0 W. MOV      I D0 MOV
    A0 I ADD      D0 S -) MOV        A0 S -) MOV [[
    4/ ( count)  DUP IF DUP END-WR-CNT W! 0 DO
             I 4* OVER + @ .TOKEN
             I 1+ END-WR-CNT W@ = NOT IF SPACE THEN
    LOOP DROP ELSE 2DROP THEN ; SMUDGE
CODE .WR-VAR       I )+ A0 W. MOV  <BOUND-VARIABLES> >W1 # A0 ADD
    A0 ) S -) MOV
    [[ ?.TOKEN ; SMUDGE
HEX
: /TOKEN>FLAG/ ( token - flag ) DUP TOKEN-NUM?
    IF TOKEN># 0= NOT
    ELSE ( string) TOKEN>$ @ 024F4E20 = THEN ;
```

Screen # 12

```
$ (WATCH) and (STRATEGY)                          ( PLB*12/17/86)

: /@WATCH/ WATCH1? IF 1 ELSE 0 THEN
           WATCH2? IF 10 * 2 + THEN
           WATCH3? IF 10 * 3 + THEN
           WATCH4? IF 10 * 4 + THEN
           WATCH5? IF 10 * 5 + THEN
           WATCH6? IF 10 * 6 + THEN #>TOKEN ;

CMD: WATCH [RHS,CFA] /@WATCH/ RHS-END')' 1 ;
HEX
: /@STRAT/  LEX? IF 034C4558 ELSE 034D4541 THEN
            ACCEPT-BUFF !  ACCEPT-BUFF $>TOKEN ;

CMD: STRATEGY    [RHS,CFA] /@STRAT/   RHS-END')'   1 ;
```

Screen # 13

```
$ COMPUTE support                                 ( PLB*12/14/86)
WVARIABLE UNARY                   WVARIABLE OPSTACK-PTR
: PUSH-OPSTACK  ( n - ) ACCEPT-BUFF  OPSTACK-PTR W@ + C!
    OPSTACK-PTR W-TALLY   OPSTACK-PTR W@ 50 > IF
    .ERROR-LINE ." Too many items on operator stack in COMPUTE"
            CR-ABORT THEN ;
: POP-OPSTACK ( - n ) OPSTACK-PTR W-DOCK
    ACCEPT-BUFF OPSTACK-PTR W@ + ACCEPT-BUFF MAX C@ ;
: @-OPSTACK
    ACCEPT-BUFF OPSTACK-PTR W@ + 1- ACCEPT-BUFF MAX C@ ;
: INIT-OPSTACK  OPSTACK-PTR W-OFF 0 PUSH-OPSTACK ;
```

Screen # 14

```
$ COMPUTE support                                 ( PLB*12/15/86)

: CMD/   DUP 0= IF .ERROR-LINE ." Divide by 0 Error" ABORT
    THEN / ;

: OPERAND ( precedence - ) >R
          BEGIN R@ @-OPSTACK >
    IF ( place operator on tos ) R> PUSH-OPSTACK EXIT
    ELSE ( pop opstack) POP-OPSTACK CASE
    0 OF R> DROP EXIT ENDOF
    2 OF [RHS,CFA] +       ENDOF    3 OF [RHS,CFA] - ENDOF
    4 OF [RHS,CFA] CMD/    ENDOF    5 OF [RHS,CFA] * ENDOF
    6 OF [RHS,CFA] NEGATE ENDOF ENDCASE THEN AGAIN ;
```

Screen # 15

```
$ COMPUTE support                                 ( PLB*12/17/86)
: DO-/      4   OPERAND ;          : DO-*      5 , OPERAND ;
: DO-+      2   OPERAND ;
: DO-- UNARY W@ IF 6 ELSE 3 THEN OPERAND ;
: DO-( 0 PUSH-OPSTACK ;
: DO-) 0 OPERAND OPSTACK-PTR W@ NOT ;
$ DO-LIT & DO-VAR are used in the TABTO parser !!!
: DO-LIT AT$ TOKEN? DUP TOKEN-NUM? NOT IF .ERROR-LINE
    ." Illegal numeric operator " .AT$ ."  in RHS# " #RHS W@ .
    ." in production " .'RN$' CR-ABORT THEN
   TOKEN># ?CELL IF [RHS,CFA] long ,RHS
       ELSE [RHS,CFA] cell W,RHS THEN ;
: DO-VAR  BOUND? NOT IF .ERROR-LINE ." Variable " .AT$ ."  has n
ot been bound in RHS# " #RHS W@ . ." in production " .'RN$'
  ABORT THEN
  DROP [RHS,CFA] /@RP-BINDING-INT/  BIND-POS W@ 4* W,RHS ;
```

Screen # 16

```
$ COMPUTE support                                 ( PLB*12/14/86)
HEX CMD: COMPUTE     INIT-OPSTACK  UNARY W-ON
     BEGIN GET-ATOM AT$ W@ CASE
   012A OF ( *)     DO-*     UNARY W-ON      ENDOF
   012B OF ( +)     DO-+     UNARY W-ON      ENDOF
   012F OF ( /)     DO-/     UNARY W-ON      ENDOF
        ATOM-TYPE CASE
   0 OF ( normal)     UNARY W-OFF    DO-LIT  ENDOF
   1 OF ( variable)  UNARY W-OFF    DO-VAR  ENDOF
   2 OF ( left paren)  DO-(  UNARY W-ON     ENDOF
   3 OF ( right paren) DO-)  IF DROP 1
      [RHS,CFA] #>TOKEN EXIT THEN UNARY W-OFF ENDOF
   6 OF ( - )             DO--  UNARY W-ON    ENDOF
      .ERROR-LINE ." Illegal COMPUTE parameter in RHS# "
      #RHS W@ . ." in production " .'RN$' CR-ABORT
  ENDCASE ENDCASE AGAIN ; RECOVER
```

Screen # 17

```
$ Various WRITE commands                          ( PLB*12/17/86)

CMD: CRLF    [RHS,CFA] CR   RHS-END')'  SPACE-NEEDED W-OFF 0 ;
CMD: PAGE    [RHS,CFA] PAGE RHS-END')'  SPACE-NEEDED W-OFF 0 ;
```

```
CMD: VT-132  [RHS,CFA] +COMP RHS-END')'  SPACE-NEEDED W-ON 0 ;
CMD: VT-80   [RHS,CFA] -COMP RHS-END')'  SPACE-NEEDED W-ON 0 ;

CMD: SPACE   [RHS,CFA] SPACE RHS-END')'  SPACE-NEEDED W-OFF 0 ;

: ?REV ( f - ) IF +REV ELSE -REV THEN ;
: ?UL  ( f - ) IF +UL  ELSE -UL  THEN ;
: ?PRT ( f - ) IF +PRT ELSE -PRT THEN ;
: ?CRT ( f - ) IF +CRT ELSE -CRT THEN ;
```

Screen # 18

```
$ More WRITE type commands                            ( PLB*12/17/86)
: .RHS-ILL-BV  .ERROR-LINE ." Illegal Bound Variable " .AT$ ."
in RHS# " #RHS W@ . ." in production " .'RN$' ABORT ; RECOVER
HEX : DO-WR-CMD  SPACE-NEEDED W-OFF GET-ATOM AT$ @ >R
R@  024F4E20 = IF R> 2DROP DROP RHS.CFA RHS-END')' 0 EXIT THEN
R>  034F4646 = IF      DROP RHS.CFA DROP RHS-END')' 0 EXIT THEN
    ATOM-TYPE 1 - IF .ERROR-LINE ." Expacting 'ON', 'OFF' or a v
ariable, not " .AT$ PP-CR ."  in RHS# " #RHS W@ .
." in production " .'RN$' ABORT THEN
    BOUND? IF DROP [RHS,CFA] /@RP-BINDING/ BIND-POS W@ 4* W,RHS
    ELSE .RHS-ILL-BV THEN  [RHS,CFA] /TOKEN>FLAG/
    RHS.CFA 2DROP ( the +/- CFA's) RHS-END')' 0 ;
CMD: REV ['] +REV ['] -REV ['] ?REV DO-WR-CMD ;
CMD: UL  ['] +UL  ['] -UL  ['] ?UL  DO-WR-CMD ;
CMD: PRT ['] +PRT ['] -PRT ['] ?PRT DO-WR-CMD ;
CMD: CRT ['] +CRT ['] -CRT ['] ?CRT DO-WR-CMD ;
```

Screen # 19

```
$ TABTO function                                      ( PLB*12/17/86)

: /TABTO/ ( col# - ) C# W@ - 1- DUP 0< IF
        NEGATE ?DUP IF 0 DO 8 EMIT LOOP THEN
    ELSE SPACES THEN ;

CMD: TABTO  GET-ATOM ATOM-TYPE CASE
    0 OF DO-LIT  ENDOF
    1 OF DO-VAR  ENDOF
    3 OF EXIT    ENDOF
    .ERROR-LINE ." Illegal TABTO parameter " .AT$
    ."  in RHS# " #RHS W@ . ." in production " .'RN$' ABORT
    ENDCASE
    [RHS,CFA] /TABTO/
    SPACE-NEEDED W-OFF 0 RHS-END')' ;
```

Screen # 20

```
$ Error messages                                      ( PLB*12/17/86)

: .RHS-ILL-ATOM
        .ERROR-LINE ." Illegal atom " .AT$ ."  in RHS# " #RHS W@
        . ." in production " .'RN$' CR-ABORT ; RECOVER

: ?.RHS-ILL-FUNC NOT IF .ERROR-LINE ." Improper Function in RHS#
 " #RHS W@ . ." in production " .'RN$' CR-ABORT THEN ;
```

Screen # 21

```
$ RHS MAKE compilation word                           ( PLB*04/01/87)
VARIABLE MAKE-TEMPLATE
: PARSE-RHS-VALUE GET-ATOM ATOM-TYPE CASE
    0 OF ( literal) AT$ ?$>TOKEN LAST-ATTR @ MAKE-TEMPLATE @ +
       >RHS !                                         ENDOF
    1 OF ( variable) BOUND? IF DROP [RHS,CFA] /@RP-BINDING/
       BIND-POS W@ 4* W,RHS  [RHS,CFA] /!WME-VAL/ LAST-ATTR @
       W,RHS ELSE .RHS-ILL-BV THEN ENDOF
    2 OF ( function) EXEC-CMD ?.RHS-ILL-FUNC
       [RHS,CFA] /!WME-VAL/ LAST-ATTR @ W,RHS ENDOF
       .RHS-ILL-ATOM
    ENDCASE ;
```

Screen # 22

```
$ RHS MAKE compilation word                           ( PLB*04/01/87)
RHS: MAKE  GET-ATOM ATOM-TYPE IF .ILL-ATOM THEN
    AT$ TOKEN?  ?LIT DUP -1 = IF .ERROR-LINE
    ." Illegal class " .AT$ ."  in RHS# " #RHS W@ .
    ." in production " .'RN$' CR-ABORT THEN
    DUP OPEN-CLASS  [RHS,CFA] /MAKE/
    W,RHS ( class)  L-# W@ 4* W,RHS ( size)
    RHS-PTR @ MAKE-TEMPLATE !                 $ Save RHS pointer
    L-# W@ ?DUP IF 0 DO 0 ,RHS LOOP THEN  $ Make blank template
    BEGIN  GET-ATOM ATOM-TYPE
                   CASE 3 OF [RHS,CFA] FINISH-MAKE EXIT ENDOF
       7 OF GET-ATOM AT$ $>TOKEN ?ATTR NOT IF .ERROR-LINE
       ." Illegal attribute " .AT$ ."  in RHS# " #RHS W@ .
       ." in production " .'RN$' CR-ABORT THEN
    PARSE-RHS-VALUE ENDOF   $ TEMP-IGNORE-VECT-ATTR
                       ( .ILL-ATOM) ENDCASE AGAIN ; RECOVER
```

Screen # 23

```
$ BIND                                                ( PLB*02/15/87)

RHS: BIND  GET-ATOM ATOM-TYPE 1 - IF .ERROR-LINE
    ." Must BIND a variable, not " .AT$ ."  in RHS# " #RHS W@ .
    ." in production " .'RN$' CR-ABORT THEN
    BOUND? IF DROP ( don't need token) BIND-POS W@
        ELSE NEXT-BIND W@ SWAP BIND-VAR THEN  4* ( bind offset)
    GET-ATOM ATOM-TYPE CASE
    0 OF ( literal) AT$ ?$>TOKEN [RHS,CFA] long ,RHS ENDOF
    1 OF ( variable) BOUND? IF DROP [RHS,CFA] /@RP-BINDING/
        BIND-POS W@ 4* W,RHS ELSE .RHS-ILL-BV THEN ENDOF
    2 OF ( function) EXEC-CMD ?.RHS-ILL-FUNC ENDOF
    .RHS-ILL-ATOM ENDCASE
    [RHS,CFA] /!RP-BINDING/ W,RHS ( offset) RHS-END')' ;
```

Screen # 24

```
$ STRATEGY                                            ( PLB*12/14/86)
: .RHS-BAD-STRAT .ERROR-LINE ." Invalid strategy " .AT$
     ."  in RHS# " #RHS W@ . ." in production " .'RN$'
     CR-ABORT ; RECOVER
HEX
RHS: STRATEGY
    GET-ATOM ATOM-TYPE CASE
    0 OF AT$ @ CASE
             034C4558 OF [RHS,CFA] SET-LEX ENDOF
             034D4541 OF [RHS,CFA] SET-MEA ENDOF
             .RHS-BAD-STRAT ENDCASE ENDOF
    1 OF .ERROR-LINE ." NOT SET FOR VARIABLES YET !!! "
       CR-ABORT ENDOF
    3 OF [RHS,CFA] ?.STRATEGY EXIT ENDOF
    .RHS-BAD-STRAT ENDCASE
    [RHS,CFA] ?.STRATEGY RHS-END')' ;
```

Screen # 25

```
$ WATCH command                                       ( PLB*12/14/86)
HEX RHS: WATCH
    BEGIN GET-ATOM AT$ W@ 0129 = NOT
    WHILE AT$ @   >R   0
 01302000 R@ = 034F4646 R@ = OR IF DROP 1 [RHS,CFA] WATCH-0 THEN
 01312000 R@ = 01502000 R@ = OR IF DROP 1 [RHS,CFA] +W-1    THEN
 01322000 R@ = 02574D20 R@ = OR IF DROP 1 [RHS,CFA] +W-2    THEN
 01332000 R@ = 02435320 R@ = OR IF DROP 1 [RHS,CFA] +W-3    THEN
 01342000 R@ = 02505320 R@ = OR IF DROP 1 [RHS,CFA] +W-4    THEN
 01352000 R@ = 024D4D20 R@ = OR IF DROP 1 [RHS,CFA] +W-5    THEN
 01362000 R@ = 034D5347 R> = OR IF DROP 1 [RHS,CFA] +W-6    THEN
       NOT IF .ERROR-LINE ." Illegal Watch Command " .AT$
       ." in RHS# " #RHS W@ . ." in production " .'RN$'
       CR-ABORT THEN
    REPEAT [RHS,CFA] ?.WATCH ;
```

Screen # 26

```
$ WATCH command                                       ( PLB*12/14/86)
HEX RHS: NO-WATCH
    BEGIN GET-ATOM AT$ W@ 0129 = NOT
    WHILE AT$ @   >R   0
 01312000 R@ = 01502000 R@ = OR IF DROP 1 [RHS,CFA] -W-1    THEN
 01322000 R@ = 02574D20 R@ = OR IF DROP 1 [RHS,CFA] -W-2    THEN
 01332000 R@ = 02435320 R@ = OR IF DROP 1 [RHS,CFA] -W-3    THEN
 01342000 R@ = 02505320 R@ = OR IF DROP 1 [RHS,CFA] -W-4    THEN
 01352000 R@ = 024D4D20 R@ = OR IF DROP 1 [RHS,CFA] -W-5    THEN
 01362000 R@ = 034D5347 R> = OR IF DROP 1 [RHS,CFA] -W-6    THEN
       NOT IF .ERROR-LINE ." Illegal Watch Command " .AT$
       ." in RHS# " #RHS W@ . ." in production " .'RN$'
       CR-ABORT THEN
    REPEAT [RHS,CFA] ?.WATCH ;
```

Screen # 27

```
$ MODIFY and REMOVE support                           ( PLB*03/18/87)
: .RHS-ILL-LHS .ERROR-LINE ." Illegal LHS identifier " .AT$
    ."  in RHS# " #RHS W@ . ." in production " .'RN$'
    ABORT ; RECOVER
: GET-MOD/REMOVE ( - lhs# )
```

```
AT$ TOKEN? DUP NOT IF .RHS-ILL-LHS THEN
DUP TOKEN-NUM? IF TOKEN)# DUP 0= IF .RHS-ILL-LHS THEN
1  #LHS W@ 0 DO OVER I >NN-LHS# C@ =
      IF 2DROP I 0 LEAVE THEN LOOP
IF .RHS-ILL-LHS THEN
ELSE $ has to be a variable
   ATOM-TYPE 1 - IF .RHS-ILL-LHS THEN
   1  0 #LHS W@ 1- DO OVER I >NAMED-LHS @ =
      IF 2DROP I 0 LEAVE THEN
   -1 +LOOP IF .RHS-ILL-LHS THEN
THEN ;
```

Screen # 28

```
$ REMOVE                                          ( PLB*03/18/87)

: rhs-remove
   BEGIN GET-ATOM ATOM-TYPE 3 - WHILE
      1   GET-MOD/REMOVE >REM-FLAG C! REPEAT ;

RHS: REMOVE rhs-remove ;        RHS: OPS-REMOVE rhs-remove ;
```

Screen # 29

```
$ CLOSE-RHS-CODE vector                           ( PLB*03/18/87)
CODE /REM-WME/   I )+ A0 W. MOV   <CONFLICT-SET> >W1 # A0 ADD
   A0 ) S -) MOV [[ REMOVE-WME ; SMUDGE
: /MD-RM/ ( offset-) ^W1 <CONFLICT-SET> + @ SEND-REMOVE ;
: close-rhs-code
   #LHS W@ 0 DO I >REM-FLAG C@
      IF [RHS.CFA] /REM-WME/ I 4* W,RHS THEN
   LOOP    [RHS,CFA] EXIT
   $ Now add BV tokens to end of RHS execution code
   RHS-PTR @  R-BVNAMES !
   R-#BV W@ ?DUP IF 0 DO I >BIND @ ,RHS LOOP THEN
   $ Now, set negated LHS bit array ( for use in WATCH 3 )
   RHS-PTR @  #LHS W@ 7 + 8 / 1+ -2 AND 0 DO 0 W,RHS 2 +LOOP
   >RHS #LHS W@ 0 DO I >NN-LHS# C@ IF I OVER BIT-SET THEN LOOP
   DROP ;
' close-rhs-code  CLOSE-RHS-CODE !
```

Screen # 30

```
$ MODIFY support                                  ( PLB*02/15/87)

: PEEL-MODIFY GET-ATOM AT$ TOKEN?  ?ATTR NOT IF .ERROR-LINE
   ." Illegal attribute " .AT$ ."  in RHS# " #RHS W@ .
   ." in production " .'RN$' ABORT THEN
  GET-ATOM ATOM-TYPE CASE
   0 OF ( literal) AT$ ?$>TOKEN [RHS,CFA] long  ,RHS
      [RHS,CFA] /!WME-VAL/ LAST-ATTR @ W,RHS ENDOF
   1 OF ( variable) BOUND? IF DROP [RHS,CFA] /@RP-BINDING/
      BIND-POS W@ 4* W,RHS  [RHS,CFA] /!WME-VAL/ LAST-ATTR @
      W,RHS ELSE .RHS-ILL-BV THEN ENDOF
   2 OF ( function) EXEC-CMD ?.RHS-ILL-FUNC
      [RHS,CFA] /!WME-VAL/ LAST-ATTR @ W,RHS ENDOF
      .RHS-ILL-ATOM
   ENDCASE ;
```

Screen # 31

```
$ MODIFY support                                  ( PLB*03/18/87)
CODE /COPY-CS-WME/  I )+ A0 W. MOV  <CONFLICT-SET> >W1 # A0 ADD
   I )+ A1 W. MOV  A0 ) S -) MOV  A1 S -) MOV  I )+ A1 W. MOV
   A1 S -) MOV [[ >R MAKE-WME 4+ DUP /WME-ADDR/ !
   SWAP WME>ADDR 4+ SWAP R> MOVE ; SMUDGE
RHS: MODIFY     GET-ATOM GET-MOD/REMOVE  1 OVER >REM-FLAG C!
   [RHS,CFA] cell DUP 4* W,RHS ( save offset) [RHS,CFA] /MD-RM/
   [RHS,CFA] /COPY-CS-WME/ DUP 4* W,RHS ( save CS offset)
   >CLASS# C@ DUP OPEN-CLASS  W,RHS ( save class# )
   L-# W@ 4* W,RHS ( size )
   BEGIN GET-ATOM ATOM-TYPE CASE
      3 OF [RHS,CFA] FINISH-MAKE EXIT ENDOF
      7 OF PEEL-MODIFY                ENDOF
   .ERROR-LINE ." Illegal MODIFY syntax involving " .AT$
 ."  in RHS# " #RHS W@ . ." in production " .'RN$' ABORT
   ENDCASE AGAIN ; RECOVER
```

Screen # 32

Screen # 33

Screen # 34

Screen # 35

Screen # 36

Screen # 37

Screen # 38

Screen # 39

Screen # 40

```
$ Get Atom  -  Character Translation Table        ( PLB*12/16/86)
DECIMAL CREATE WR-TABLE 128 ALLOT $ Character Translation Table
WVARIABLE WR-STATE       GILD
: INIT-WR-TABLE  128 0 DO 0   I WR-TABLE + C! LOOP
       33 0 DO  1 I WR-TABLE + C! LOOP ;
INIT-WR-TABLE  EMPTY     $ No need to keep table initialization
    2 59  WR-TABLE + C!      $ ;
    3 41  WR-TABLE + C!      $ )
    4 40  WR-TABLE + C!      $ (
    5 60  WR-TABLE + C!      $ <
    6 62  WR-TABLE + C!      $ >
    7 34  WR-TABLE + C!      $ "
    8 47  WR-TABLE + C!      $ /
    9 92  WR-TABLE + C!      $ \
WR-TABLE 48 + 10 10 FILL     $ 0 to 9
10 43 WR-TABLE + C!   10 46 WR-TABLE + C!   $ + and .
```

Screen # 41

```
$ WRITE state machine execution words           ( PLB*01/29/87)
WVARIABLE WR-EX-FLG            WVARIABLE TOK-LIST-FLG
WVARIABLE WR-LP-INHIBIT
: RESOLVE-SPACE SPACE-NEEDED W@ IF [RHS,CFA] SPACE
        SPACE-NEEDED W-OFF THEN ;

: START-CMD ( char-from-sm - ) R> 2DROP EXEC-CMD
     WR-LP-INHIBIT W-ON
     IF $ leaves token on stack at run time
        RESOLVE-SPACE
        [RHS,CFA] ?.TOKEN
        SPACE-NEEDED W-ON
    THEN TOK-LIST-FLG W-OFF ;
```

Screen # 42

```
$ WRITE state machine execution words           ( PLB*01/30/87)

: .ILL-WR-SYN C$ C! .ERROR-LINE ." Illegal WRITE syntax involvin
g " .C$ ."  in RHS# " #RHS W@ .
     ." in production " .'RN$' ABORT ; RECOVER

: EXIT-WRITE  ( char - ) WR-EX-FLG W-ON R> 2DROP ;

CODE QT-EXIT  4 #Q S ADD  %%CLEAN-ATOM R )+ I MOV NEXT

: WR-// ( char - ) DROP GET-ATOM (OPS-VAR) W-OFF R> DROP ;

: WR-\ ( char - ) DROP
    GC [RHS,CFA] cell  W,RHS  [RHS,CFA] EMIT
    SPACE-NEEDED W-ON   TOK-LIST-FLG W-OFF
    WR-LP-INHIBIT W-ON R> DROP ;
```

Screen # 43

```
$ Get Atom State Machine Support                ( PLB*01/29/87)
DECIMAL
CREATE GET-WR-STATES 16     16 * DUP ALLOT
            GET-WR-STATES SWAP ERASE
GILD


: S> ( 11-items state# - )
        16 * GET-WR-STATES + PAD !
        ' PAD @ !     $ Store execution word
        0 10 DO I 4+ PAD @ + C! -1 +LOOP ;
```

Screen # 44

```
$ WRITE Get Atom  -  Get Atom State Table       ( PLB*01/29/87)
HEX
$ 0   1   2   3   4   5   6   7   8   9   A    Next State
$ Nm  Sp  ;   )   (   <   >   "   /   \  num
 02  00  01  05  04  09  02  07  0E  0D  06   0 S> DROP
 02  00  01  05  04  09  02  07  0E  0D  06   1 S> GA-COMMENT
 02  03  03  03  03  03  03  03  03  03  02   2 S> ADD-CHAR
 00  00  00  00  00  00  00  00  00  00  00   3 S> DROP-EXIT
 00  00  00  00  00  00  00  00  00  00  00   4 S> START-CMD
 00  00  00  00  00  00  00  00  00  00  00   5 S> EXIT-WRITE
 02  03  03  03  03  03  03  03  02  03  05   6 S> ADD-CHAR
 08  08  08  08  08  08  08  0C  08  08  08   7 S> DROP
 08  08  08  08  08  08  08  0C  08  08  08   8 S> ADD-CHAR
 09  0A  0A  0A  0A  0A  0B  0A  09  09  09   9 S> ADD-CHAR
 00  00  00  00  00  00  00  00  00  00  00   A S> .ILL-WR-SYN
```

Screen # 45

```
$ WRITE Get Atom  -  Get Atom State Table       ( PLB*01/29/87)
HEX
$ 0   1   2   3   4   5   6   7   8   9   A    Next State
$ Nm  Sp  ;   )   (   <   >   "   /   \  num
 00  00  00  00  00  00  00  00  00  00  00   B S> ADD-VEXIT
 00  00  00  00  00  00  00  00  00  00  00   C S> QT-EXIT
 00  00  00  00  00  00  00  00  00  00  00   D S> WR-\
 0A  0A  0A  0A  0A  0A  0A  0A  0F  0A  0A   E S> DROP
 00  00  00  00  00  00  00  00  00  00  00   F S> WR-//

EXIT
 --  --  --  --  --  --  --  --  --  --  --   E S> DROP
 --  --  --  --  --  --  --  --  --  --  --   F S> DROP
 --  --  --  --  --  --  --  --  --  --  --  10 S> DROP
 --  --  --  --  --  --  --  --  --  --  --  11 S> DROP
```

Screen # 46

```
$ Get Atom                                      ( PLB*12/17/86)
EMPTY
: GET-WR-ATOM ( atom is returned in AT$ )  PAUSE AT$ OFF
  WR-STATE W-OFF  (RESERVED-CHAR) W-OFF   (OPS-VAR) W-OFF
   BEGIN  GC
   ]]    DO CLR       D1 CLR
   S ) A0 MOV      WR-TABLE # A0 ADD     A0 ) D1 B. MOV
        WR-STATE AB D0 B. MOV          4 # D0 LSL
        GET-WR-STATES 4+  # D0 ADD    D1 D0 ADD       D0 A0 MOV
        D0 CLR    A0 ) D0 B. MOV      D0 WR-STATE AB B. MOV
        4 # D0 LSL
        GET-WR-STATES # D0 ADD
        D0 S -) MOV
  [[  @EXECUTE AGAIN ; RECOVER
```

Screen # 47

```
$ WRITE support                                 ( PLB*01/30/87)
VARIABLE TOK-NUM
: ADD-TOK-LIST  TOK-LIST-FLG W@ NOT IF RESOLVE-SPACE
       [RHS,CFA] .TOK-LIST   RHS-PTR @ TOK-NUM !  0 W,RHS
       $ open token list
       TOK-LIST-FLG W-ON
 THEN AT$ $>TOKEN ,RHS 4 TOK-NUM @ >RHS W+! SPACE-NEEDED W-ON ;

: WR-VAR  TOK-LIST-FLG W-OFF BOUND? IF DROP ( don't need token)
    [RHS,CFA] .WR-VAR  BIND-POS W@ 4* W,RHS ELSE
    .ERROR-LINE ." Cannot print value of unbound variable "
    .AT$ ."  in RHS# " #RHS W@ . ." in production " .'RN$'
   ABORT THEN SPACE-NEEDED W-ON ;
```

Screen # 48

```
$ WRITE                                         ( PLB*02/09/87)


: (WRITE)   SPACE-NEEDED W-OFF
              WR-EX-FLG W-OFF           TOK-LIST-FLG W-OFF
  BEGIN WR-LP-INHIBIT W-OFF
     GET-WR-ATOM   WR-EX-FLG W@ NOT
    WHILE  WR-LP-INHIBIT W@ NOT IF
         (OPS-VAR) W@ IF RESOLVE-SPACE WR-VAR
             ELSE
                          ADD-TOK-LIST
             THEN THEN
   REPEAT ;

RHS: WRITE (WRITE) ;        RHS: OPS-WRITE (WRITE) ;
```

Screen # 50

Screen # 51

Screen # 52

RHS Compiling Word Support

RHS: defines RHS commands

RHS-VIEW is a debug tool to allow VIEWing of RHS: words

Screen # 53

CMD: words should return a flag at compile time
This flag should be 0 when no arguments are left on the stack at RHS run time and should be 1 when arguments are left on the stack.
This allows the parser to keep (CRLF) commands out of make/modify etc. and allows the WRITE parser to know if to [RHS,CFA] a '.TOKEN' after the command has been compiled

Screen # 54

Screen # 55

HALT and EXIT

RHS-END')' gets the next atom and makes sure it is a ')'

EXIT is a RHS: word that allows a rule to exit to the CP/M-68K operating system

HALT is a RHS: word to stop the normal execution of the OPS system and return control to the OPS user interface

Screen # 56

EXEC-CMD executes the commands in the CMD: vocabulary

Screen # 57

Support for accepting input from a text file instead of the normal keyboard entry

Screen # 58

ACCEPT words

/ACCEPT/ is the main ACCEPT word. It is executed only within a rule RHS.

Screen # 59

/MAKE/ is the runtime word that actually allows a rule RHS to make a WME.

The format of /MAKE/ in memory is as follows:

4 bytes - cfa of /MAKE/ itself
2 bytes - class number
2 bytes - class size
n bytes - template of literals within WME The literals are preset in the n byte array at compile time but the variables must be placed at run time.

Screen # 60

Misc. Execution words

/@RP-BINDING/ gets the variable binding from the RP when a rule is fired.

/!RP-BINDING/ stores the variable binding into the RP when a rule is fired. This is used mainly by BIND /@RP-BINDING-INT/ gets the variable binding from the RP and also makes sure that it is numeric. This would be used in the COMPUTE statement.

/!WME-VAL/ is used to store the variables into a WME at run time
The literals are preset in the WME template at compile time but the variables must be assigned at run time.

Screen # 61

WRITE support
WVARIABLE END-WR-CNT
.TOK-LIST is the main run time code for WRITEing tokens to the screen. Text in a write statement is converted into a list of tokens preceeded by a 2 byte count. This allows compact storage of the WRITE statements.

.WR-VAR is the run time code to get a variable binding and write its value to the output device(s)

/TOKEN>FLAG/ converts a token into a flag. If the token is numeric, a non-zero implies true. If the token is a string, then it must be "ON" to give a true flag.

Screen # 62

(WATCH) and (STRATEGY)

/@WATCH/ is the run time code for reading the WATCH level. For example, if WATCH was set to ( 1 3 4 ), then a numeric token of "134" would be returned WATCH is a CMD: word for getting the current WATCH level /@STRAT/ is the run time code for getting the "LEX" or "MEA" strategy and converting it to a token.

STRATEGY is a CMD: word for getting the current STRATEGY

Screen # 63

Support for converting infix notation to postfix stack notation

Screen # 64

( PLB*12/13/86)

All operators set UNARY flag
All variables and literal clear UNARY flag
UNARY flag is used in '-' to determine if it is negation or subtraction

Screen # 65

( PLB*12/13/86)

All operators set UNARY flag
All variables and literal clear UNARY flag
UNARY flag is used in '-' to determine if it is negation or subtraction

Screen # 66

Main CMD: COMPUTE word

Screen # 67

Various WRITE commands to be used for clean output

Screen # 68

More WRITE commands

Examples:
(REV ON)
(REV OFF)
(REV <REVERSE-FLAG>)

Screen # 69

TABTO function

/TABTO/ is the run time word for tabbing on the screen
Notice that it will emit backspaces if needed to get to the desired position.

TABTO word can take a literal or a variable

Screen # 70

Screen # 71

RHS MAKE compilation word

PARSE-RHS-VALUE is the compile time support for paring RHS templates of WME's.

Screen # 72

MAKE is the RHS: word to make new working memory elements from the RHS of the rules.

Screen # 73

BIND is the RHS: word to bind new values to existing or new variables.

Screen # 74

RHS: STRATEGY allows a running program to change the strategy

Screen # 75

RHS: WATCH allows the watch level from being set from within a running OPS program

Screen # 76

RHS: NO-WATCH allows watch levels to be removed from within a running OPS program

Screen # 77

Support for RHS: MODIFY and REMOVE

Screen # 78

Screen # 79

This is required to properly close the rule on the host

Screen # 80

Screen # 81

Screen # 82

Screen # 83

Screen # 84

Screen # 85

Screen # 86

Screen # 87

Screen # 88

Screen # 89

Screen # 90

```
$ WR Get Atom  -  Character Translation Table     ( PLB*12/15/85)

WR-TABLE is a translation table for WR-GET-ATOM that allows
   a very quick table look-up of input characters to determine
   which category they are in.
0)  Normal Characters
1)  Delimiter Characters - space, tab, CR, LF, Etc.
2)  ; for a comment delimiter
3)  )  reserved character
4)  (  reserved character
5)  <  reserved character for variables
6)  >  reserved character for variables
7)  "  reserved character for quoted string
8)  /  reserved character for // quote of next atom
9)  \  reserved character for \ quote of next character
A)  + .  for proper parsing of numbers
```

Screen # 91

( PLB*12/16/86)

Screen # 92

( PLB*12/16/86)

Screen # 93

( PLB*12/16/86)

Screen # 94

```
$ Get Atom  -  Get Atom State Table                 ( PLB*12/16/86)


State 0   - Wait for start of atom
State 1   - Read comment to end of line
State 2   - Append atom character
State 3   - Backup character pointer then exit
State 4   - Start of CMD: function found
State 5   - End of WRITE statement found
State 6   - Scan for numeric atom
State 7   - Start quoted string
State 8   - Scan for quoted string
State 9   - Start of atom is '<'
State A   - " Illegal WRITE syntax involving ......"
```

Screen # 95

```
$ Get Atom  -  Get Atom State Table                 ( PLB*01/29/87)
HEX

State B   - End of variable found
State C   - End of " quoted string found
State D   - \ found, quote next character
State E   - / found
State F   - // found - quote next atom
```

Screen # 96

```
$ Get Atom                                          ( PLB*12/16/86)
$ COPIED FROM GET-ATOM CODE !!!!!!!!!!!!!!!!!!!!!!!
WVARIABLE AT-STATE
```

```
: GET-ATOM ( atom is returned in AT$ )  AT$ W-OFF
  AT-STATE W-OFF  (RESERVED-CHAR) W-OFF   (OPS-VAR) W-OFF
    BEGIN   6C   DUP 6A-TABLE + C@
      AT-STATE W@ 16 * GET-ATOM-STATES + 4* + C@
       DUP AT-STATE W!  16 * GET-ATOM-STATES +
    @EXECUTE AGAIN ; RECOVER
```

Screen # 97

Screen # 98

Screen # 0

```
$ RPVAR.PF  --  RP Variables and Support          ( PLB*10/31/86)

Update Records :

(01) 10/31/86 PLB  -  Creation of RP Variables and Support file
```

Screen # 1

```
$ Load Screen for RP Variables, Etc.               ( PLB*04/19/87)
DECIMAL START-SEGMENT .( ==> RP Variables and Support)
    3        LOAD    $ Class & WME variables
    4        LOAD    $ Rule Filter Code variables
    5        LOAD    $ FILTER-EXECUTE
    6        LOAD    $ Runtime variables
    7        LOAD    $ 2^24*
    8        LOAD    $ TIMER
$%  9        LOAD    $ (BUFFER-TYPE)
END-SEGMENT
```

Screen # 2

```
$ '$$' and '$%' Conditional Comment Words        ( PLB*05/26/87)
DECIMAL START-SEGMENT .( ==> Conditional Comment Words)
$ '$$' can be used to include status messages during debug
$   but take them out of the final system.

$ : $$ [COMPILE] $ ; IMMEDIATE $ Debug Mode OFF - comment

  : $$ ; IMMEDIATE             $ Debug Mode ON - not a comment

$ '$%' can be used to include run-time status messages during
```

```
$   debug but take them out of the final system.

   : $% [COMPILE] $ ; IMMEDIATE $ Debug Mode OFF - comment
$ : $% ; IMMEDIATE            $ Debug Mode ON - not a comment

END-SEGMENT
```

Screen # 3

```
$ Misc. Class & WME Variables & Pointers        ( PLB*11/16/86)

VARIABLE    LIT-HDL
WVARIABLE   LIT#
VARIABLE    LAST-LIT
VARIABLE    [RHS#]
VARIABLE    WME-OFFSET
VARIABLE    [WATCH]
VARIABLE    TIME-TAG         $ MAX WME # RECEIVED FROM HOST
```

Screen # 4

```
$ Rule Filter code variables                     ( PLB*02/24/87)

VARIABLE    RULE
VARIABLE    RL-#
VARIABLE    RL-TOKEN
VARIABLE    RL-#NEGLHS
VARIABLE    RL-#BV

VARIABLE    L-LHS#
VARIABLE    L-NEG
VARIABLE    L-CLASS

WVARIABLE   VAR-IN-LHS
VARIABLE    LHS-FIX
```

Screen # 5

```
$ FILTER-EXECUTE                                 ( PLB*12/03/86)

CODE FILTER-EXECUTE
    S )+ W MOV    ' QUIT 4- @  AB JMP

EXIT
$ SPEED THIS UP WITH   S )+ W MOV  'QUIT 4- @ AB JMP ?????
: TEST ." HELLO" ;

: T1 ['] TEST FILTER-EXECUTE ."   BYE" ;
```

Screen # 6

```
$ Runtime variables                              ( PLB*02/22/87)

VARIABLE    /WME-ADDR/        $ Stores the actual address of
                              $  the WME opened by the rule
                              $  filter code

VARIABLE    /LHS#/            $ LHS # in rule filter code

WVARIABLE   FIRE-INDEX        $ Contains the local rule #
                              $   of the most fireable rule
VARIABLE    WME#-TO-REMOVE

VARIABLE    PIVOT             $ Pivot position
```

Screen # 7

```
$ 2^24*                                          ( PLB*12/04/86)

$ 2^24* ( n - n )
CODE 2^24*  S )+ D0 MOV      24 #Q D1 MOV
                             D1  D0 ASL  D0 S -) MOV ,NEXT
```

Screen # 8

```
$ TIMER words                                    ( PLB*04/08/87)

VARIABLE TIME1                  VARIABLE CURRENT-COUNT1
VARIABLE TIME2                  VARIABLE CURRENT-COUNT2

: TIMER1 ( var-or-0 - )
   CURRENT-COUNT1 @ IF
      <TICKS> @ TIME1 @ - CURRENT-COUNT1 @ +!
   THEN <TICKS> @ TIME1 ! CURRENT-COUNT1 ! ;

: TIMER2 ( var-or-0 - )
   CURRENT-COUNT2 @ IF
      <TICKS> @ TIME2 @ - CURRENT-COUNT2 @ +!
   THEN <TICKS> @ TIME2 ! CURRENT-COUNT2 ! ;
```

Screen # 9

```
$ Buffered TYPE output vector                    ( PLB*04/19/87)

CREATE (TYPE-BUFF)  2048 ALLOT    WVARIABLE (TYPE-CNT)

: FLUSH-TYPE (TYPE-CNT) W@ ?DUP
   IF (TYPE-BUFF) SWAP (TYPE) (TYPE-CNT) W-OFF THEN ;

: (BUFFER-TYPE) ( addr cnt - )
   <SERVER-EN> W@ IF FLUSH-TYPE (TYPE) ELSE
   DUP (TYPE-CNT) W@ + 2048 >
   IF FLUSH-TYPE THEN
   >R  (TYPE-BUFF) (TYPE-CNT) W@ + ( to ) R@ CMOVE
   R> (TYPE-CNT) W+! THEN ;

' (BUFFER-TYPE) 'TYPE !
```

Screen # 15

Screen # 16

Screen # 17

```
'$$' and '$%' Conditional Comment Words

'$$' can be used to include status messages during debug
   but take them out of the final system. This is for messages
   only in the rule compile phase only.

'$%' can be used to include run-time status messages during
   debug but take them out of the final system.
```

Screen # 18

Screen # 19

Screen # 20

FILTER-EXECUTE

FILTER-EXECUTE executes the LHS and Rule filter code

Screen # 21

Screen # 22

Screen # 23

Screen # 24

Screen # 0

```
$ RPWME.PF  --  RP Working Memory Management      ( PLB*10/31/86)

Update Records :

(01) 10/31/86 PLB  -  Creation of RP WME Management Package
```

Screen # 1

```
$ Load Screen for RP WME Management Package      ( PLB*11/25/86)
DECIMAL START-SEGMENT .( ==> RP WME Management Package)

   2   3   THRU    $ RP WME Initialization
   4   10  THRU    $ Main RP WME Code

END-SEGMENT
```

Screen # 2

```
$ INIT-WME, RESIZE-WME                                  ( PLB*04/07/87)
VARIABLE 'WME-LIST                    VARIABLE %WME-ADDR
$ >WME-LIST ( wme# - addr ) 4* 'WME-LIST @@ + ;
CODE >WME-LIST  S )+ DO MOV   2 # DO LSL   'WME-LIST AB AO MOV
   AO ) DO ADD  DO S -) MOV ,NEXT
: INIT-WME  %   $% DUP CR ." Init WME list, Size= " .
   DUP <WME-BYTES> +! CREATE-DYNAMIC 'WME-LIST ! ;
: RESIZE-WME  %   $% DUP CR ." Resize WME list, New Size= " .
   'WME-LIST @ SIZE-OF-FRAME  -  DUP <WME-BYTES> +!
      'WME-LIST @ RESIZE-DYNAMIC ;
: RM-ALLWME  $% CR ." Remove All WME "
      %RHS RESIZE-WME TIME-TAG OFF <MAX#WME> OFF
      <WME-BYTES> @ <MAX-WME-B> ! <MAX#ITEMS> OFF
      <LHS-PASS> OFF <PRE-PASS> OFF <RULE-PASS> OFF
      <#FIREABLE> OFF <#N-FIREABLE> OFF
      <R-#> OFF ;
```

Screen # 3

```
$ INIT-RPWME                                         ( PLB*11/09/86)

: INIT-RPWME
   <MAX#WME> OFF        <MAX-WME-B> OFF
   <#WME>    OFF        <WME-BYTES> OFF ;

$ This code is run when the RP's are brought out of the reset
$   state.
```

Screen # 4

```
$ WME>ADDR                                            ( PLB*11/16/86)
HEX
$ CODE WME>ADDR  S )+ DO MOV 2 # DO LSL 'WME-LIST AB AO MOV
$    AO ) DO ADD      DO AO MOV   D2 CLR  AO ) D2 B. MOV
$    2 # D2 LSL   LIT-HDL AB A1 MOV A1 ) A1 MOV D2 A1 ADD
$    A1 ) A1 MOV   A1 ) A1 MOV   A1 ) A1 MOV  A1 ) A1 MOV
$    AO ) A1 ADD   A1 S -) MOV ,NEXT
: WME>ADDR ( wme# - addr )
   >WME-LIST DUP C@ ( class)
   >CLASS-LIST @@ SWAP @ ( offset) + OFFFFFF AND ;
: WME? ( wme# - f )  >WME-LIST @ -1 = NOT ;
CODE WME>CLASS    S )+ DO MOV   2 # DO LSL  'WME-LIST AB AO MOV
 AO ) DO ADD  DO AO MOV DO CLR AO ) DO B. MOV DO S -) MOV ,NEXT
CODE WME>OFFSET   S )+ DO MOV   2 # DO LSL  'WME-LIST AB AO MOV
 AO ) DO ADD  DO AO MOV AO ) DO MOV OOFFFFFF # DO AND
                                  DO S -) MOV ,NEXT
```

Screen # 5

```
$ WME printout support                                ( PLB*11/02/86)
HEX
```

```
: .CLASS LIT# W@  <SERVER-1> W! 34 ?HOST-SERVER
    <SERVER-1> @ +VT-REV .TOKEN -VT-REV ;

: @ASIZE ( N-N) LIT# W@ <SERVER-1> W!  <SERVER-1> 2+ W!
    38 ?HOST-SERVER  <SERVER-2> W@ ;

: .ATTR ( N-) LIT# W@ <SERVER-1> W!  <SERVER-1> 2+ W!
    38 ?HOST-SERVER  <SERVER-1> @ .TOKEN ;

: @TOK-SIZE ( TOKEN -N )  <SERVER-1> !  30 ?HOST-SERVER
    <SERVER-1> W@ ;
```

Screen # 6

```
$ Watch 2 (WM) Printout                          ( PLB*11/15/86)
: @W-ATTR  %WME-ADDR @ ;
: .AV-PAIRS
   L-# W@ ?DUP IF 0 DO
      I 4* 4+ @W-ATTR + @
      IF    I @ASIZE
       @W-ATTR  I 4* 4+  + @  DUP >R @TOK-SIZE  + 3 + 20 ALIGN
          ." ^" R> I .ATTR SPACE  .TOKEN
          THEN
   LOOP THEN ( 1 20 LIT-ALIGN) ."  )" ;
: .SWME ( wme# - )  DUP  4 U.R ." : ( "
   WME>ADDR %WME-ADDR ! .CLASS  .AV-PAIRS ;
: .REM-WME ( wme# - )  CR ." <=WM " .SWME ;
: .MAKE-WME ( wme# - ) CR ." WM=> " .SWME ;
: WATCH2? ( -f) <SERVER-EN> W@ IF [WATCH] @ 2 AND ELSE 0 THEN ;
```

Screen # 7

```
$ MAKE-WME Support                              ( PLB*03/01/87)
VARIABLE STREAM-WME
: SETUP-MAKE-WME
    STREAM-PTR @ STREAM-WME !
    L-FREE @ ?DUP
    IF ( free-offset ) WME-OFFSET !
    ELSE    $ No free WME of this class, make a new one
       LAST-LIT @@ SIZE-OF-FRAME WME-OFFSET !
    THEN ;


$ This word sets up the MAKE-WME word. Basically, it stores the
$   offset of the WME to be made. It does not do anything else
$   because the LHS's may not grab a particular WME. But if they
$   do, they will need the offset into the WME frame !!!!
```

Screen # 8

```
$ MAKE-WME                                      ( PLB*04/08/87)
: MAKE-WME    <#WME> TALLY  <RPE> TIMER2
   L-CNT TALLY   L-MAX @  L-CNT @ MAX L-MAX !   L-FREE @
   IF WME-OFFSET @ ( free-offset ) DUP  L-PTR + @   L-FREE !
   ELSE    $ No free WME of this class, make a new one
     WME-OFFSET @  LAST-LIT @@ L-SIZE W@
       DUP <WME-BYTES> +!     SWAP RESIZE-DYNAMIC
       LIT# W@ OPEN-CLASS   $ MM REALLOCATION
       <WME-BYTES> @ <MAX-WME-B> @   MAX <MAX-WME-B> !
   THEN  ( offset)    $ Store offset and class in WME-LIST
      DUP %@ ( timetag) >WME-LIST DUP >R !  LIT# W@ R> C!
   L-PTR + ( addr)    $ $$$$$$DUP %WME-ADDR !
   $ Put WME from network into local WM
   %@ ( timetag) SWAP L-SIZE W@ %MOVE
   $% DUP WATCH2? IF .MAKE-WME ELSE DROP THEN
   TIME-TAG ! <#WME> @  <MAX#WME> @ MAX <MAX#WME> ! 0 TIMER2 ;
```

Screen # 9

```
$ REMOVE-WME                                    ( PLB*12/15/86)
HEX
: REMOVE-WME ( wme# - )
    >R    <#WME> DOCK
    ( R@ WME>CLASS OPEN-CLASS )    L-CNT DOCK
    $% WATCH2? IF R@ .REM-WME THEN
    R@ WME>ADDR  %WME-ADDR !    R@ WME>OFFSET  WME-OFFSET !
    -1 R> >WME-LIST !
    $ Determine if WME was at end of list !!!
    LAST-LIT @ DUP @ SIZE-OF-FRAME SWAP 8 + W@ -
    WME-OFFSET @ = IF    $ simply release to free memory
       LAST-LIT @ 8 + W@ NEGATE DUP <WME-BYTES> +!
       LAST-LIT @@ RESIZE-DYNAMIC
    ELSE  $ not at end, add to free list !!!!
       LAST-LIT @ 4+ DUP >R @   %WME-ADDR @  !
       WME-OFFSET @                R>            !   THEN ;
```

Screen # 10

```
$ REMOVE-SINGLE-CLASS                           ( PLB*11/24/86)
HEX
: REMOVE-SINGLE-CLASS ( class# - ) L-FREE OFF    L-CNT OFF
      $ Remove entries in WME-LIST
      TIME-TAG @ ?DUP IF 1+ 1 DO
        I WME>CLASS OVER =
            IF -1 I >WME-LIST ! <#WME> DOCK THEN
      LOOP THEN DROP
      4  ( initial size)   LAST-LIT @@ SIZE-OF-FRAME -
       DUP <WME-BYTES> +! LAST-LIT @@ RESIZE-DYNAMIC ;
```

Screen # 20

Screen # 21

Screen # 22

```
INIT-WME, RESIZE-WME
'WME-LIST contains the handle to the local WME list

>WME-LIST points to a single WME entry in the WME list given
    the WME number

INIT-WME  initializes the WME package on the RP's

RESIZE-WME changes the size of the WME list on the RP's. This is
    done on a command from the host since all WME entry arrays
    are the same size. This prevents the RP from having to check
RM-ALLWME  removes all WME's from the RP's
```

Screen # 23

Screen # 24

```
WME>ADDR, WME?, WME>CLASS, WME>OFFSET
$ WME>ADDR points to the actual WME given the WME#
: WME>ADDR ( wme# - addr )
    >WME-LIST DUP C@ ( class)
    >CLASS-LIST @@ SWAP @ ( offset) + 0FFFFFF AND ;

$ WME? determines is a particular WME is in the RP
: WME? ( wme# - f )   DUP ! TIME-TAG @ 1+ WITHIN
   IF  >WME-LIST @ -1 = NOT  ELSE  DROP 0   THEN ;

$ WME>CLASS returns the class number given the WME number
: WME>CLASS ( wme# - class# )    >WME-LIST C@ ;
$ WME>OFFSET returns the offset within the WME frame given
$   the WME number
: WME>OFFSET ( wme# - offset )   >WME-LIST @ 0FFFFFF AND ;
```

Screen # 25

Misc. print utilities

Screen # 26

Watch 2 (WM) Printout

Utilities to print WME's that have been accepted from the HOST
Used only for debug !!!!

Screen # 27

3/12/87 Actually, the SETUP-MAKE-WME is probably not required any more. This is because the WME is made the very first time that a LHS filter passes. See the code in LHS.PF

Screen # 28

- increment time-tag
- make sure there is enough room in WME-LIST
- change wme# in wme array ( keeping old data !!! )
- make new entry in WME-LIST the same as the old one
- zero old WME-LIST entry to signify that it is removed
- return address Note that there is no memory reallocation unless the WME-LIST size had to be increased !!!!

Screen # 29

- zero wme-list pointer
- decrement wme count
- if wme is at end of wme array, release it back to free memory & update wme-bytes
- if wme is not at end of wme array, add it to free list

Screen # 30

REMOVE-SINGLE-CLASS resets the WME information for the class specified.

Screen # 0

```
$ FILTER.PF  --  RP LHS Filter Code                 ( PLB*10/31/86)

Update Records :

<01> 10/31/86 PLB  -  Creation of RP LHS Filter Package
```

Screen # 1

```
$ Load Screen for RP LHS Filter Code                ( PLB*03/26/87)
DECIMAL START-SEGMENT .( ==> RP LHS Filter Package)
     2   TOKEN.PF    LOAD-FROM      $ Token Support
     5         LOAD    $ INIT-PROD
     6         LOAD
     7         LOAD    $ JOT SUPPORT
$    8   10    THRU    $ Rule Header Definitions
    40   45    THRU    $ Rule Header Definitions ( Code Words )
    11         LOAD    $ More Rule Compilation Support
    12   14    THRU    $ LHS List Manipulation
DEBUG?   15   ?LOAD    $ LHS list print words
    16   23    THRU    $ Filter Execution Words
    24   27    THRU    $ RULE & LHS OPEN & CLOSE
    30   36    THRU    $ LHS FILTER CODE
    37   39    THRU    $ Variable Binding and comparison filter
END-SEGMENT
```

Screen # 2

```
$ Load Screen for RP Class Initialization          ( PLB*11/02/86)
DECIMAL START-SEGMENT .( ==> RP Class Support)
    3   4    THRU    $ Class Initialization and Support
END-SEGMENT
```

Screen # 3

```
$ Class Initialization and Support                 ( PLB*02/12/87)
: INIT-CLASS  [ 15 20 * ] LITERAL DUP OPEN-STATIC
    DUP LIT-HDL ! CLOSE-STATIC ;
: >CLASS-LIST ( class# - addr ) 20 * LIT-HDL @@ + ;
: OPEN-CLASS ( class# - ) DUP LIT# W! >CLASS-LIST LAST-LIT ! ;
: %CLASS      W% OPEN-CLASS ;
CODE L-PTR   LAST-LIT AB A0 MOV A0 ) A0 MOV A0 ) S -) MOV ,NEXT
CODE L-FREE  LAST-LIT AB D0 MOV  4 # D0 ADD D0 S -) MOV ,NEXT
CODE L-SIZE  LAST-LIT AB D0 MOV  8 # D0 ADD D0 S -) MOV ,NEXT
CODE L-#     LAST-LIT AB D0 MOV 10 # D0 ADD D0 S -) MOV ,NEXT
CODE L-CNT   LAST-LIT AB D0 MOV 12 # D0 ADD D0 S -) MOV ,NEXT
CODE L-MAX   LAST-LIT AB D0 MOV 16 # D0 ADD D0 S -) MOV ,NEXT

: ?RESIZE-CLASS ( n-)  1+ 20 * DUP LIT-HDL @ SIZE-OF-FRAME >
    IF 40 + LIT-HDL @ SIZE-OF-FRAME - LIT-HDL @ RESIZE-STATIC
    ELSE DROP THEN ;
```

Screen # 4

```
$ Class Initialization and Support                 ( PLB*02/12/87)

: NEW-CLASS
```

```
W%      $$ DUP CR ." New Class-> " .
   DUP ?RESIZE-CLASS OPEN-CLASS
W%      $$ DUP ." Size-> " .
   L-SIZE W!
W%      $$ DUP ." #ATTR-> " .
   L-# W!
L-FREE OFF    L-CNT OFF     L-MAX OFF
4 DUP <WME-BYTES> +!
   <WME-BYTES> @ <MAX-WME-B> @ MAX  <MAX-WME-B> !
CREATE-DYNAMIC  LIT# W@ OPEN-CLASS  $ AVOID MM ERROR !!!
                    LAST-LIT @ ! ;
```

Screen # 5

```
$ INIT-PROD                                        ( PLB*11/18/86)
VARIABLE    'PROD-LIST
VARIABLE    'LHS-LIST
: CR-STATIC ( size - handle ) DUP OPEN-STATIC >R R@ CLOSE-STATIC
   R> ;
: INIT-PROD
   100 ( 25 rules)  DUP CR-STATIC     'PROD-LIST !
   800  ( 200 LHS)  DUP CR-STATIC     'LHS-LIST !
      + <RULE-BYTES> ! ;

: >PROD-FRAME ( n - addr-of-prod-frame) 4* 'PROD-LIST @@ + @@ ;
: >LHS-FRAME  ( n - addr-of-lhs-frame)  4* 'LHS-LIST  @@ + @@ ;
```

Screen # 6

```
$ Production list and LHS list management          ( PLB*12/03/86)

: ADD-TO-PROD-LIST ( handle-of-prod-frame - )
   <#RULES> @ DUP  4* 4+   'PROD-LIST @ SIZE-OF-FRAME  >
      IF 80 DUP <RULE-BYTES> +! 'PROD-LIST @ RESIZE-STATIC
         $$ CR ." Resize PROD-LIST"
      THEN
   4* 'PROD-LIST @@ + !    <#RULES> TALLY ;

: ADD-TO-LHS-LIST ( handle-of-lhs-frame - )
   <#LHS> @ DUP   4* 4+    'LHS-LIST @ SIZE-OF-FRAME  >
      IF 160 DUP <RULE-BYTES> +! 'LHS-LIST @ RESIZE-STATIC
         $$ CR ." Resize LHS-LIST"
      THEN
   4* 'LHS-LIST @@ + !    <#LHS> TALLY ;
```

Screen # 7

```
$ ,JOT words                                       ( PLB*12/14/86)
VARIABLE     J1-PTR             VARIABLE     J2-PTR
: ,J2        ( n - )  J2-PTR @ [ MAX#LHS 8 * ] LITERAL +
                      >JOT2 !    J2-PTR 4TALLY ;
: W,J2       ( n - )  J2-PTR @ [ MAX#LHS 8 * ] LITERAL +
                      >JOT2 W!   J2-PTR 2TALLY ;
: J2,CFA     ( n - )  4- ,J2 ;

CODE j2,cfa I )+ S -) MOV [[ ,J2 ; SMUDGE
: [J2,CFA]  COMPILE j2,cfa    ' 4- , ; IMMEDIATE

: J2-FILTER ( - addr )    JOT2 [ MAX#LHS 8 * ] LITERAL + ;
: CK-J2 ( lhs# - lhs# ) DUP MAX#LHS = ABORT" Too many LHS !!" ;
: >HDL       ( lhs# - addr ) CK-J2 4* JOT2 + ;
: >OFFSET    ( lhs# - addr ) CK-J2 4* JOT2 +
             [ MAX#LHS 4 * ] LITERAL + ;
```

Screen # 8

```
$ OPEN-RULE                                        ( PLB*03/17/87)
VARIABLE    RULE-HDL          40 WCONSTANT HEADER-SIZE
: OPEN-RULE ( n -) DUP RULE ! 4* 'PROD-LIST @@ + @ RULE-HDL ! ;
: R-#LHS              ( - addr) RULE-HDL @@ ;
: R-#                 ( - addr) RULE-HDL @@ 2+ ;
: R-NAME              ( - addr) RULE-HDL @@ 4+ ;
: R-#NEGLHS           ( - addr) RULE-HDL @@ 8 + ;
: R-#RHS              ( - addr) RULE-HDL @@ 10 + ;
: R-#BV               ( - addr) RULE-HDL @@ 12 + ;
: R-TIME              ( - addr) RULE-HDL @@ 14 + ;
: R-MAXMEM            ( - addr) RULE-HDL @@ 18 + ;

: R-#FIREABLE         ( - addr) RULE-HDL @@ 22 + ;
: R-FIREABLE          ( - addr) RULE-HDL @@ 24 + ;
: R-#NOT-FIREABLE     ( - addr) RULE-HDL @@ 28 + ;
: R-NOT-FIREABLE      ( - addr) RULE-HDL @@ 30 + ;
```

Screen # 9

```
$ OPEN-RULE stuff                                  ( PLB*03/17/87)
: R-PRECHECK   ( - addr) RULE-HDL @@ 34 + ;
: R-COMPLEXITY ( - addr) RULE-HDL @@ 38 + ;
: >FIREABLE ( n - address ) R-#LHS W@ 8 * + R-FIREABLE @@ + ;
: >NOT-FIREABLE ( n - address ) R-#LHS W@ 4* +
     R-NOT-FIREABLE @@ + ;

: R-FILTER     ( lhs# - addr) 4* RULE-HDL @@ + HEADER-SIZE + ;
: R-LHS-LIST    ( lhs# - addr) 4* RULE-HDL @@ + HEADER-SIZE +
                      R-#LHS W@ 4* + ;
: R-START-FILTERS ( - addr ) R-#LHS W@ R-LHS-LIST ;

M: EXECUTE-RULE-FILTER ( lhs# - flag )  <RP3> TALLY
        R-FILTER @ RULE-HDL @@ + FILTER-EXECUTE ;M
M: EXECUTE-PRECHECK     ( - flag )        <RP2> TALLY
        R-PRECHECK @ RULE-HDL @@ + FILTER-EXECUTE ;M
```

Screen # 10

```
$ OPEN-LHS Stuff                                   ( PLB*02/16/87)
VARIABLE    LHS-HDL
M: OPEN-LHS  ( n - ) 4* 'LHS-LIST @@ + @ LHS-HDL ! ;M

M: LHS-LIST   ( -addr) LHS-HDL @@ ;M
   $ the class is stored in the first byte of LHS-LIST
   $    LHS-LIST C@ returns class
: LHS-R#      ( -addr) LHS-HDL @@ 4+ ;
: LHS-NF      ( -addr) LHS-HDL @@ 5 + ;
: LHS-#       ( -addr) LHS-HDL @@ 6 + ;
M: LHS-FILTER ( -addr) LHS-HDL @@ 8 + ;M
: ,J1         ( n - )   J1-PTR @ >JOT1 !    J1-PTR 4TALLY ;
: W,J1        ( n - )   J1-PTR @ >JOT1 W!   J1-PTR 2TALLY ;
: J1,CFA      ( n - )   4- ,J1 ;
CODE j1,cfa I )+ S -) MOV [[ ,J1 ; SMUDGE
: [J1,CFA]  COMPILE j1,cfa    ' 4- , ; IMMEDIATE
```

Screen # 11

```
$ ,LHS Stuff                                       ( PLB*12/07/86)
VARIABLE ',LHS
CODE >,LHS    S )+ D0 MOV    ',LHS AB A0 MOV   12 # A0 ADD
   A0 ) D1 MOV    4 #Q D1 SUB       D0 D1 CMP 0<
      IF D0 S -) MOV    D1 D0 SUB  2048 # D0 ADD   D0 S -) MOV
         ',LHS AB S -) MOV    [[ RESIZE-STATIC ]]
          S )+ D0 MOV THEN   ',LHS AB A0 MOV
      A0 ) A0 MOV   D0 A0 ADD   A0 S -) MOV .NEXT

VARIABLE     ,LHS-PTR
: ,LHS  ( n - )    ,LHS-PTR @ >,LHS !     ,LHS-PTR 4TALLY ;
: W,LHS ( n - )    ,LHS-PTR @ >,LHS W!    ,LHS-PTR 2TALLY ;
: L,CFA ( n - )    4- ,LHS ;

CODE l,cfa I )+ S -) MOV [[ ,LHS ; SMUDGE
: [LHS,CFA]  COMPILE l,cfa    ' 4- , ; IMMEDIATE
```

Screen # 12

```
$ LHS List manipulation code                       ( PLB*04/08/87)

: ADD-OFFSET      <RPF> TIMER2
   LHS-R# C@ OPEN-RULE                 $ open rule
   <#ITEMS> TALLY
   <#ITEMS> @ <MAX#ITEMS> @ MAX <MAX#ITEMS> !
   WME-OFFSET @                        $ offset to add to list
   LHS-LIST @ >R R@ SIZE-OF-FRAME      $ get position to add to
   4 R@ RESIZE-DYNAMIC                 $ Add 4 bytes
   R> @ + !                            $ Store offset in LHS list
   0 TIMER2 ;
```

Screen # 13

```
$ LHS List manipulation code                       ( PLB*02/22/87)
VARIABLE END-AD
: REMOVE-OFFSET ( -removed flag)    0 ( nothing removed flag )
   LHS-LIST @  DUP @ SWAP SIZE-OF-FRAME
   OVER + DUP END-AD ! SWAP 2DUP = IF 2DROP ( nothing on list)
   ELSE
      DO I @ WME-OFFSET @ = IF LEAVE  DROP 1 ( remove-flag)
         LHS-R# C@ OPEN-RULE
$        ." Scoot " I .
         I 4 + ( from)  I ( to)
            END-AD @ I - 4- ( count) MOVE
         -4 LHS-LIST @ RESIZE-DYNAMIC
         <#ITEMS> DOCK
      THEN
   4 +LOOP THEN ;
```

Screen # 14

```
$ LHS List manipulation code                        ( PLB*04/07/87)

: RESET-LHS-LIST   LHS-R# C@ OPEN-RULE
   LHS-LIST @ >R
   R@ SIZE-OF-FRAME NEGATE DUP 4/ <#ITEMS> +!  $ Update count
   R> RESIZE-DYNAMIC
   $ Reset FIRED-ON list if LHS is non-negated !!!!
   LHS-NF C@ NOT IF
      R-FIREABLE @ SIZE-OF-FRAME NEGATE DUP
         R-FIREABLE @ RESIZE-DYNAMIC
      4/ R-#LHS W@ /   <#FIREABLE> +!
   THEN ;
```

Screen # 15

```
$ LHS List manipulation code                        ( PLB*12/10/86)
      $ DEBUG ONLY !!!!!!!

: .LHS-LIST  ( lhs# - ) OPEN-LHS
   LHS-LIST @  DUP @ SWAP SIZE-OF-FRAME
   OVER + DUP END-AD ! SWAP 2DUP = IF 2DROP ( nothing on list)
   ELSE
      DO I @ ( offset ) .S
         LHS-LIST  C@ OPEN-CLASS
         L-PTR + @ CR .SWME
   4 +LOOP THEN ;
```

Screen # 16

```
$ Filter Support Words                              ( PLB*11/22/86)

$ 1EXIT pushes a 1 on the stack and exits the filter
CODE 1EXIT
    R )+ I MOV  1 # S -) MOV  ,NEXT

$ 0EXIT pushes a 0 on the stack and exits the filter
CODE 0EXIT
    R )+ I MOV  0 # S -) MOV  ,NEXT
```

Screen # 17

```
$ Filter Conditionals                               ( PLB*03/01/87)
$ for simple condition - does not have to drop extra stack item
: ST>#'S ( token token - n n )
   2DUP TOKEN-NUM? SWAP TOKEN-NUM? AND
   IF TOKEN># SWAP TOKEN># SWAP
      ELSE 2DROP 2R> 2DROP 0EXIT THEN ;

: ?S=    = NOT        IF R> DROP 0EXIT ( no-match) THEN ;
: ?S<>   =            IF R> DROP 0EXIT ( no-match) THEN ;
: ?S>    ST>#'S > NOT IF R> DROP 0EXIT THEN ;
: ?S<    ST>#'S < NOT IF R> DROP 0EXIT THEN ;
: ?S>=   ST>#'S <     IF R> DROP 0EXIT THEN ;
: ?S<=   ST>#'S >     IF R> DROP 0EXIT THEN ;
```

Screen # 18

```
$ Filter Conditionals                               ( PLB*03/01/87)
$ for complex condition - has to drop extra stack item
: CT>#'S ( token token - n n )
   2DUP TOKEN-NUM? SWAP TOKEN-NUM? AND
   IF TOKEN># SWAP TOKEN># SWAP
      ELSE DROP 2DROP 2R> 2DROP 0EXIT THEN ;

: ?C=    = NOT IF R> 2DROP 0EXIT ( no-match) THEN ;
: ?C<>   =     IF R> 2DROP 0EXIT ( no-match) THEN ;
: ?C>    CT>#'S > NOT IF R> 2DROP 0EXIT THEN ;
: ?C<    CT>#'S < NOT IF R> 2DROP 0EXIT THEN ;
: ?C>=   CT>#'S <     IF R> 2DROP 0EXIT THEN ;
: ?C<=   CT>#'S >     IF R> 2DROP 0EXIT THEN ;
```

Screen # 19

```
$ Filter Conditionals for OR                        ( PLB*03/01/87)
: OT>#'S ( token token - n n )
   2DUP TOKEN-NUM? SWAP TOKEN-NUM? AND
   IF TOKEN># SWAP TOKEN># SWAP
      ELSE 2DROP R> DROP EXIT THEN ;

: ?O=    OVER        =     IF SWAP DROP 1 SWAP THEN ;
: ?O<>   OVER        = NOT IF SWAP DROP 1 SWAP THEN ;
: ?O>    OVER OT>#'S >     IF SWAP DROP 1 SWAP THEN ;
: ?O<    OVER OT>#'S <     IF SWAP DROP 1 SWAP THEN ;
: ?O>=   OVER OT>#'S < NOT IF SWAP DROP 1 SWAP THEN ;
: ?O<=   OVER OT>#'S > NOT IF SWAP DROP 1 SWAP THEN ;
```

Screen # 20

```
$ Filter Execution Words                            ( PLB*03/01/87)
$ 2 byte offset follows >L-ATTR
$ >L-ATTR ( - token-value ) STREAM-WME @ + @ ;
CODE >L-ATTR I )+ A1 W. MOV STREAM-WME AB A1 ADD
   A1 ) S -) MOV ,NEXT

CODE POP-3-EXIT  4 #Q R ADD   R )+ I MOV  3 # S -) MOV ,NEXT
CODE DROP-2-EXIT 2 # S ) MOV  R )+ I MOV               ,NEXT
$ OR condition stuff
$ 0-SWAP 0 SWAP ;
CODE 0-SWAP S ) S -) MOV  4 S) CLR ,NEXT
: S-OR-E ( f token - )          DROP NOT IF R>  DROP 0EXIT THEN ;
: C-OR-E ( f token - token )  SWAP NOT IF R> 2DROP 0EXIT THEN ;
CREATE NEGATED-BITS   MAX#LHS  8  /MOD SWAP 0= 0= 2* +
   1+ -2 AND ALLOT
```

Screen # 21

```
$ Negated LHS filter words                          ( PLB*03/01/87)

$ /CH-NEG-LHS/ must exit with a zero flag if there are any
   $   elements on the list specified !!!!
CODE /CH-NEG-LHS/      I )+ A1 W. MOV A1 S -) MOV
   [[ $% CR ." /CH-NEG-LHS/ " DUP .
   R-LHS-LIST @ SIZE-OF-FRAME
   IF ( exit) R> DROP 0EXIT THEN ; SMUDGE

$ /CH-NN-LHS/ must exit with a zero flag if there are not any
   $   elements on the list specified !!!!
CODE /CH-NN-LHS/       I )+ A1 W. MOV A1 S -) MOV
   [[ $% CR ." /CH-NN-LHS/ " DUP .
   R-LHS-LIST @ SIZE-OF-FRAME NOT
   IF ( exit) R> DROP 0EXIT THEN ; SMUDGE
```

Screen # 22

```
$ Filter LHS open words                             ( PLB*12/31/86)
$ /OPEN-NN-LHS/ ( lhs# follows )
CODE /OPEN-NN-LHS/ I )+ A0 W. MOV  A0 S -) MOV
   [[ DUP NEGATED-BITS BIT-CLR $% CR ." /OPEN-NN-LHS/ " DUP .
   DUP /LHS#/ ! 4* >R   R@ <L-CNT> + @@ ( wme offset)
   R> <L-BASE> + @ +     /WME-ADDR/ ! ; SMUDGE

$ /OPEN-NEG-LHS/ ( - f) ( lhs# follows )
CODE /OPEN-NEG-LHS/ I )+ A0 W. MOV   A0 S -) MOV
   [[ DUP NEGATED-BITS BIT-SET $% CR ." /OPEN-NEG-LHS/ " DUP .
   DUP /LHS#/ ! 4* >R   R@ <L-START> + @
   IF $ something is on list
      R@ <L-CNT> + @@ ( wme offset) R> <L-BASE> + @ + ( 4+ ??)
      /WME-ADDR/ !  0 ( no-skip)
   ELSE R> DROP 1 ( skip) THEN ; SMUDGE
```

Screen # 23

```
$ Variable Binding and access execution words    ( PLB*03/01/87)
$ /@VALUE/   ( - value )  ( offset follows)
CODE /@VALUE/  I )+ A0 W. MOV  /WME-ADDR/ AB A0 ADD
   A0 ) S -) MOV ,NEXT
$ /BIND-VAR/ ( value - )  ( offset follows )
CODE /BIND-VAR/ I )+ A0 W. MOV   <BOUND-VARIABLES> # A0 ADD
   S )+ A0 ) MOV ,NEXT
$ /@VAR/     ( - value )  ( offset follows )
CODE /@VAR/ I )+ A0 W. MOV        <BOUND-VARIABLES> # A0 ADD
   A0 ) S -) MOV ,NEXT
CODE /NEG-SETUP/  I )+ A0 W. MOV  I A0 ADD
   $ A0 now points to end of neg lhs !!!
   S )+ TST 0= NOT IF
      A0 I MOV  4 #Q I ADD  ,NEXT    $ skip the DROP !!!!!
   THEN A0 R -) MOV  ,NEXT
$ /NEG-SETUP/ is followed by 2 byte relative addr to next lhs
```

Screen # 24

```
$ P-NEW                                             ( PLB*04/21/87)
: P-NEW     W%  RL-# !        % RL-TOKEN !
```

```
  $$ CR ." New Production #-> " RL-# @ .
  $$      CR 3 SPACES +VT-REV RL-TOKEN @ .TOKEN -VT-REV
  RL-#NEGLHS OFF   RL-#BV OFF
  J1-PTR OFF  J2-PTR OFF ;
: CALC-P-SIZE ( - n ) HEADER-SIZE   RL-#BV @ 4* +
  L-LHS# @ 1+ 16 * +  J1-PTR @ +  J2-PTR @ + ;
: SET-FILTERS J2-FILTER R-START-FILTERS J2-PTR @ *WMOVE
  R-START-FILTERS RULE-HDL @@ - R-PRECHECK !
  JOT1 R-START-FILTERS J2-PTR @ + DUP >R J1-PTR @ *WMOVE
  R> RULE-HDL @@ - L-LHS# @ 1+ 0 DO I >OFFSET @ OVER +
  I R-FILTER ! LOOP DROP ;
: LOAD-FCT ( #lhs - n ) DUP * ;
$ : LOAD-FCT ( #lhs - n ) 1 SWAP 0 DO 4* LOOP ;
```

Screen # 25

```
$ END-P                                          ( PLB*04/19/87)
: END-P WZ >R     $$ R@ CR ." End of Rule, complexity = " .
  [J1,CFA] 1EXIT    [J2,CFA] 1EXIT    $ Complete Filters
  $ Calculate size of rule frame
  CALC-P-SIZE       2+ -4 AND DUP <RULE-BYTES> +!
  CR-STATIC   ADD-TO-PROD-LIST
    RL-#NEGLHS @ IF 0 CREATE-DYNAMIC ELSE -1 THEN
    0 CREATE-DYNAMIC
    <#RULES> @ 1- OPEN-RULE  R-FIREABLE ! R-NOT-FIREABLE !
    R-#FIREABLE W-OFF  R-#NOT-FIREABLE W-OFF R-#RHS W-OFF
    R-TIME OFF  R-MAXMEM OFF      R> R-COMPLEXITY W!
    RL-# @ R-# W!         RL-TOKEN @ R-NAME !
    L-LHS# @ 1+ R-#LHS W! RL-#NEGLHS @ R-#NEGLHS W!
    L-LHS# @ 1+ LOAD-FCT <LOAD-FCT> +!    RL-#BV @ R-#BV W!
  R-#LHS W@ 0 DO I >HDL @    I R-LHS-LIST ! LOOP
  SET-FILTERS CLOSE-JOT1 CLOSE-JOT2 ;
```

Screen # 26

```
$ P-NEWLHS                                       ( PLB*04/17/86)
: P-NEWLHS WZ L-LHS# !   WZ L-NEG !      WZ L-CLASS !
  J1-PTR @     L-LHS# @ >OFFSET !  $ Store rule filter entry pt
  $$ CR ." New LHS - #-> " L-LHS# @ . ." Class-> " L-CLASS @ .
  $$        L-NEG @ IF 3 SPACES ." Negated" THEN
  10000 CR-STATIC DUP ADD-TO-LHS-LIST ',LHS !
  <#LHS> @ 1- OPEN-LHS     ,LHS-PTR OFF     VAR-IN-LHS W-OFF
    0               ,LHS              $ LHS-LIST
    <#RULES> @ 256 *    L-NEG @ 255 AND OR W,LHS
    $ LHS-R# ( local rule # !!!!) and LHS-NF
    L-LHS# @ W,LHS          $ LHS-#
  $ Set rule filter entry point
    J1-PTR  @ L-LHS# @ >OFFSET !     L-NEG @
IF RL-#NEGLHS TALLY [J1,CFA] /OPEN-NEG-LHS/ L-LHS# @ W,J1
         [J1,CFA] /NEG-SETUP/ -1 W,J1 J1-PTR @ LHS-FIX !
    ELSE [J1,CFA] /OPEN-NN-LHS/ L-LHS# @ W,J1 THEN ;
```

Screen # 27

```
$ P-ENDLHS                                       ( PLB*12/24/86)
: P-ENDLHS        $$ CR ." End of LHS"
 L-NEG @ IF [J1,CFA] POP-3-EXIT J1-PTR @ LHS-FIX @ .S ." R" -
  LHS-FIX @ 2- >JOT1 W!    [J1,CFA] DROP-2-EXIT THEN
  $ if negated LHS has no variables, then add to R-NEG-FILTER
  L-NEG @ IF VAR-IN-LHS W@ NOT IF [J2,CFA] /CH-NEG-LHS/
     L-LHS# @ W,J2 THEN ELSE
  [J2,CFA] /CH-NN-LHS/  L-LHS# @ W,J2 THEN
  [LHS,CFA] 1EXIT      $ exit LHS filter
  ,LHS-PTR @ 2+ -4 AND ,LHS-PTR !   $ Must be multiple of 4 !!
  ,LHS-PTR @  LHS-HDL @ SIZE-OF-FRAME  -  LHS-HDL @
     RESIZE-STATIC            ,LHS-PTR @ <RULE-BYTES> +!
  $ Now, make empty LHS list ,  reopen LHS to prevent MM error
  0 CREATE-DYNAMIC  L-CLASS @ 2^24* OR
    <#LHS> @ 1- OPEN-LHS  DUP L-LHS# @ >HDL ! LHS-LIST ! ;
```

Screen # 28

Screen # 29

Screen # 30

```
$ NEW-ATTR                                       ( PLB*12/07/86)
VARIABLE ,LHS-SAVE                  VARIABLE ,J1-SAVE
WVARIABLE ,LHS-FLAG
WVARIABLE COMPLEX-FLAG
WVARIABLE ,RULE-FLAG
: CC-START     $$ CR ." Compound Condition Start"
     COMPLEX-FLAG W-ON ;
: NEW-ATTR WZ        ,LHS-FLAG W-OFF     ,LHS-PTR @ ,LHS-SAVE !
    ,RULE-FLAG W-OFF     J1-PTR @ ,J1-SAVE !  COMPLEX-FLAG W-OFF
    $$ DUP CR ." New Attribute => " .
    DUP  [LHS,CFA] >L-ATTR  4+ W,LHS ( attribute offset)
         [J1,CFA] /@VALUE/  4+ W,J1  ( attribute offset) ;
```

Screen # 31

```
$ END-ATTR                                       ( PLB*12/07/86)

: END-ATTR  $$  CR ." End Attribute"
   ,LHS-FLAG W@ IF
       COMPLEX-FLAG W@ IF   [LHS,CFA] DROP     THEN
   ELSE  $$ ."      No Literals !!!"
       ,LHS-SAVE @ ,LHS-PTR !
   THEN

   ,RULE-FLAG W@ IF
       COMPLEX-FLAG W@ IF  [J1,CFA] DROP    THEN
   ELSE    $$ ."     No Variables !!!"
       ,J1-SAVE @ J1-PTR !
   THEN ;
```

Screen # 32

```
$ Literal Filter Words                           ( PLB*12/07/86)
CREATE CLHS-TAB
    ' ?C= ,  ' ?C<> ,  ' ?C> ,  ' ?C< ,  ' ?C>= ,  ' ?C<= ,
CREATE SLHS-TAB
    ' ?S= ,  ' ?S<> ,  ' ?S> ,  ' ?S< ,  ' ?S>= ,  ' ?S<= ,

: DO-LIT ( token exec-offset- ) SWAP ,LHS-FLAG W-ON
   COMPLEX-FLAG W@
   IF $ COMPLEX
       [LHS,CFA] DUP  $$ ."  Complex"
       [LHS,CFA] long     ,LHS ( token)
       CLHS-TAB + @ L,CFA
   ELSE
       [LHS,CFA] long     ,LHS ( token)
       SLHS-TAB + @ L,CFA
   THEN ;
```

Screen # 33

```
$ Literal Filter Words                           ( PLB*11/22/86)

: LIT= %     $$ DUP CR ." Literal =  " .TOKEN
   0 DO-LIT ;
: LIT<> %    $$ DUP CR ." Literal <> " .TOKEN
   4 DO-LIT ;
: LIT> %     $$ DUP CR ." Literal >  " .TOKEN
   8 DO-LIT ;
: LIT< %     $$ DUP CR ." Literal <  " .TOKEN
   12 DO-LIT ;
: LIT>= %    $$ DUP CR ." Literal >= " .TOKEN
   16 DO-LIT ;
: LIT<= %    $$ DUP CR ." Literal <= " .TOKEN
   20 DO-LIT ;
```

Screen # 34

```
$ OR Compilation Stuff                           ( PLB*12/07/86)

WVARIABLE OR-V-FLG      VARIABLE OR-LHS-SAVE
VARIABLE  OR-RULE-SAVE

: COMP-OL ( token exec-word - ) SWAP 2DUP
   [LHS,CFA] long     ,LHS ( token) L,CFA ( exec-word )
   [J1,CFA] long      ,J1  ( token) J1,CFA ( exec-word) ;

: COMP-OV ( var# exec-word - ) OR-V-FLG W-ON
   SWAP 4* ( convert to var-offset)
   [J1,CFA] /@VAR/  W,J1 ( offset )   J1,CFA ( exec-word) ;
```

Screen # 35

```
$ OR Literal and Variable Start and End Words     ( PLB*12/07/86)

: ENTER-OR OR-V-FLG W-OFF   $$   CR ." Enter OR"
    ,LHS-PTR @ OR-LHS-SAVE !     J1-PTR @ OR-RULE-SAVE !
    [LHS,CFA] O-SWAP [J1,CFA] O-SWAP ;

: EXIT-OR  $$   CR ." Exit OR"
    COMPLEX-FLAG W@ IF ['] C-OR-E ELSE ['] S-OR-E THEN DUP
        L,CFA  J1,CFA
    OR-V-FLG W@
    IF        $ Variables - Restore LHS pointer
        OR-LHS-SAVE @ ,LHS-PTR !    ,RULE-FLAG W-ON
    ELSE     $ No Variables - Restore Rule pointer
        OR-RULE-SAVE @ J1-PTR !     ,LHS-FLAG W-ON
    THEN ;
```

Screen # 36

```
$ OR Literal Compile Words                        ( PLB*11/23/86)

: ORL=      % $$ DUP CR ." OR Literal =  " .TOKEN
    ['] ?0=  COMP-OL ;
: ORL<>     % $$ DUP CR ." OR Literal <> " .TOKEN
    ['] ?0<> COMP-OL ;
: ORL>      % $$ DUP CR ." OR Literal >  " .TOKEN
    ['] ?0>  COMP-OL ;
: ORL<      % $$ DUP CR ." OR Literal <  " .TOKEN
    ['] ?0<  COMP-OL ;
: ORL>=     % $$ DUP CR ." OR Literal >= " .TOKEN
    ['] ?0>= COMP-OL ;
: ORL<=     % $$ DUP OR ." OR Literal <= " .TOKEN
    ['] ?0<= COMP-OL ;
```

Screen # 37

```
$ Variable Binding                                ( PLB*12/21/86)
: BIND-VAR  W%        VAR-IN-LHS W-ON  ,RULE-FLAG W-ON
        $$ DUP CR ." Bind Variable -> " .
        RL-#BV TALLY COMPLEX-FLAG W@ IF [J1,CFA] DUP THEN
        4* ( convert to offset )  [J1,CFA] /BIND-VAR/  W,J1 ;

: DO-VAR ( var# exec-offset - )  VAR-IN-LHS W-ON .RULE-FLAG W-ON
    SWAP 4* ( convert var# to offset) COMPLEX-FLAG W@
    IF $ COMPLEX
        ['] DUP  J1,CFA    $$ ."  Rule Filter Complex"
        [J1,CFA] /@VAR/ W.J1  ( variable offset)
        CLHS-TAB + @ J1,CFA
    ELSE
        [J1,CFA] /@VAR/ W,J1  ( variable offset)
        SLHS-TAB + @ J1,CFA
    THEN ;
```

Screen # 38

```
$ Variable Comparison compilation words          ( PLB*12/01/86)

: VAR=  W%  $$ DUP CR ." Variable = " .
    0 DO-VAR ;
: VAR<> W%  $$ DUP CR ." Variable <> " .
    4 DO-VAR ;
: VAR>  W%  $$ DUP CR ." Variable >  " .
    8 DO-VAR ;
: VAR<  W%  $$ DUP CR ." Variable <  " .
    12 DO-VAR ;
: VAR>= W%  $$ DUP CR ." Variable >= " .
    16 DO-VAR ;
: VAR<= W%  $$ DUP CR ." Variable <= " .
    20 DO-VAR ;
```

Screen # 39

```
$ OR Variable compilation words                   ( PLB*12/02/86)

: ORV=  W%       $$  DUP CR ." OR Variable = " .
    ['] ?0=      COMP-OV ;
: ORV<> W%       $$  DUP CR ." OR Variable <> " .
    ['] ?0<>     COMP-OV ;
: ORV>  W%       $$  DUP CR ." OR Variable > " .
    ['] ?0>      COMP-OV ;
: ORV<  W%       $$  DUP CR ." OR Variable < " .
    ['] ?0<      COMP-OV ;
: ORV>= W%       $$  DUP CR ." OR Variable >= " .
    ['] ?0>=     COMP-OV ;
: ORV<= W%       $$  DUP CR ." OR Variable <= " .
    ['] ?0<=     COMP-OV ;
```

Screen # 40

```
$ OPEN-RULE                                        ( PLB*03/26/87)
VARIABLE    RULE-HDL        40 WCONSTANT HEADER-SIZE
$ OPEN-RULE ( n -)
CODE OPEN-RULE   S )+ DO MOV   DO RULE AB MOV
    2 # DO LSL   'PROD-LIST AB A0 MOV  A0 ) A0 MOV
    0 DO +XL 0)  RULE-HDL AB MOV .NEXT
: R: CREATE W, ;CODE  RULE-HDL AB A0 MOV  A0 ) A0 MOV
    W ) A0 W. ADD   A0 S -) MOV  .NEXT
$ Keep R-#LHS with a zero offset. Other code depends on this
 0 R: R-#LHS      2 R: R-#                4 R: R-NAME
 8 R: R-#NEGLHS  10 R: R-#RHS            12 R: R-#BV
14 R: R-TIME     18 R: R-MAXMEM          22 R: R-#FIREABLE
24 R: R-FIREABLE  28 R: R-#NOT-FIREABLE 30 R: R-NOT-FIREABLE
34 R: R-PRECHECK  38 R: R-COMPLEXITY
$ KEEP 24 AS OFFSET FOR R-FIREABLE   R-PRECHECK !!!!!!!
$ GO BACK THROUGH AND SET CONSTANTS
```

Screen # 41

```
$ OPEN-RULE stuff                                  ( PLB*03/26/87)

$ >FIREABLE ( n - address ) R-#LHS W@ 8 * * R-FIREABLE @@ + ;
CODE >FIREABLE  RULE-HDL AB A0 MOV A0 ) A0 MOV
    A0 ) DO W. MOV   3 # DO W. LSL   S )+ D1 MOV  DO D1 MULU
    24  0)  A0 MOV   A0 ) A0 MOV  D1 A0 ADD A0 S -) MOV ,NEXT

$ >NOT-FIREABLE ( n - a) R-#LHS W@ 4* * R-NOT-FIREABLE @@ + ;
CODE >NOT-FIREABLE  RULE-HDL AB A0 MOV A0 ) A0 MOV
    A0 ) DO W. MOV   2 # DO W. LSL   S )+ D1 MOV  DO D1 MULU
    30  0)  A0 MOV   A0 ) A0 MOV  D1 A0 ADD A0 S -) MOV ,NEXT
```

Screen # 42

```
$ OPEN-RULE stuff                                  ( PLB*03/26/87)
$ R-FILTER    ( lhs# - addr) 4* RULE-HDL @@ + HEADER-SIZE + ;
CODE R-FILTER S )+ DO MOV  2 # DO W. LSL   RULE-HDL AB A0 MOV
    A0 ) A0 MOV   HEADER-SIZE DO +X 0) A0 LEA A0 S -) MOV ,NEXT

$ : R-LHS-LIST ( lhs#-addr) 4* RULE-HDL @@ + HEADER-SIZE +
$                        R-#LHS W@ 4* + ;
CODE R-LHS-LIST S )+ DO MOV   RULE-HDL AB A0 MOV
     A0 ) A0 MOV   A0 ) DO W. ADD  2 # DO W. LSL
     HEADER-SIZE DO +X 0) A0 LEA   A0 S -) MOV ,NEXT

: R-START-FILTERS ( - addr ) R-#LHS W@ R-LHS-LIST ;
```

Screen # 43

```
$ OPEN-RULE stuff                                  ( PLB*04/08/87)
M: EXECUTE-RULE-FILTER ( lhs# - flag )  <RULE-PASS> TALLY
<RPA> TIMER2 R-FILTER @ RULE-HDL @@ + FILTER-EXECUTE 0 TIMER2 ;M
 $ CODE EXECUTE-RULE-FILTER    1 #Q <RULE-PASS> AB ADD
$    S )+ DO MOV   2 # DO W. LSL   RULE-HDL AB W MOV
$    W ) W MOV   HEADER-SIZE DO +X W) W ADD
$    I R -) MOV   W I MOV  ,NEXT

M: EXECUTE-PRECHECK    ( - flag )  <RPB> TIMER2 <PRE-PASS> TALLY
       R-PRECHECK @ RULE-HDL @@ + FILTER-EXECUTE 0 TIMER2 ;M
$ CODE EXECUTE-PRECHECK   1 #Q <PRE-PASS> AB ADD
$     RULE-HDL AB W MOV  W ) W MOV
$     34 W) A0 MOV  A0 W ADD  I R -) MOV W I MOV ,NEXT
```

Screen # 44

```
$ OPEN-LHS Stuff                                   ( PLB*04/07/87)
VARIABLE   LHS-HDL
$ M: OPEN-LHS  ( n - ) 4* 'LHS-LIST @@ + @ LHS-HDL ! ;M
CODE OPEN-LHS    S )+ DO MOV    2 # DO LSL   'LHS-LIST AB A0 MOV
   A0 ) A0 MOV  0 DO +XL 0) LHS-HDL AB MOV  .NEXT
CODE LHS-LIST  LHS-HDL AB A0 MOV A0 ) S -) MOV .NEXT

CREATE  LHS-BRANCH   LHS-HDL AB A0 MOV   A0 ) DO  ADD
   DO S -) MOV ,NEXT
CODE LHS-R#      4 #Q DO MOV  LHS-BRANCH AB JMP
CODE LHS-NF      5 #Q DO MOV  LHS-BRANCH AB JMP
CODE LHS-#       6 #Q DO MOV  LHS-BRANCH AB JMP
CODE LHS-FILTER 8 #Q DO MOV  LHS-BRANCH AB JMP

CODE EXECUTE-LHS-FILTER  1 #Q <LHS-PASS> AB ADD LHS-HDL AB W MOV
   W ) W MOV 8 #Q W ADD I R -) MOV W I MOV ,NEXT
```

Screen # 45

```
$ OPEN-LHS Stuff                                  ( PLB*03/26/87)

: ,J1       ( n - )   J1-PTR @ >JOT1 !    J1-PTR 4TALLY ;
: W,J1      ( n - )   J1-PTR @ >JOT1 W!   J1-PTR 2TALLY ;
: J1,CFA    ( n - )   4- ,J1 ;
CODE j1,cfa I )+ S -) MOV [[ ,J1 ; SMUDGE
: [J1,CFA]  COMPILE j1,cfa   ' 4- , ; IMMEDIATE
```

Screen # 50

Screen # 51

Screen # 52

Screen # 53

```
Class Initialization and Support
INIT-CLASS runs when the RP comes out of the reset state and
    sets up to accept literalize statements
>CLASS-LIST points to the class frame given the class number
OPEN-CLASS sets a particular class. Done for speed !!!!!!
%CLASS reads the class number from the input stream and opens it
L-PTR gets the address of the actual WME frame
L-FREE contains the free offset for the linked free list
L-SIZE contains the size of a WME in a given class
L-# contains the number of attributes in a given class
L-CNT contains the current number of WME's in a given class
L-MAX contains the maximum number of WME's in a given class

?RESIZE-CLASS checks the size of the literalize frame and adds
    more room to it if there is not enough room.
```

Screen # 54

```
Class Initialization and Support

NEW-CLASS reads the input stream and adds the new class info
    to the RP
```

Screen # 55

```
INIT-PROD
'PROD-LIST contains the handle of the production list
'LHS-LIST contains the handle of the LHS list
CR-STATIC creates a static frame of a specified size

INIT-PROD initializes the RP for productions and LHS's


>PROD-FRAME points to the production frame
>LHS-FRAME  points to the lhs code frame
```

Screen # 56

```
Production list and LHS list manage art

ADD-TO-PROD-LIST adds a production to the production list



ADD-TO-LHS-LIST adds a LHS to the LHS list
```

Screen # 57

```
                                                  ( PLB*12/14/86)

JOT2 is to be used as the negated LHS filter code holding area
```

Screen # 58

```
$ OPEN-RULE                                       ( PLB*12/21/86)

OPEN-RULE selects a sinngle rule for further manipulation
R-CF          2 byte address of the change flag
R-FIREABLE    2 byte address of the fireable flag
R-#           2 byte address of the rule number
R-NAME        4 byte address of the rule name token
R-#LHS        2 byte address of the # of LHS
R-#NEGLHS     2 byte address of the # of negated LHS
R-#RHS        2 byte address of the number of RHS
R-#BV         2 byte address of the # of bound variables
R-TIME        4 byte address of the ticks count used by rule
R-MAXMEM      4 byte address of the maximum memory used by rule
R-FIRED-ON    4 byte address of the handle to the already
                fired-on set
R-COMPLEXITY 2 byte address of the number of logical comparisons
```

Screen # 59

```
$ OPEN-RULE stuff                                 ( PLB*03/17/87)

R-LHS-LIST    address of the handles to the LHS lists
        The upper byte contains the class#  R-LHS-LIST C@
R-FILTER      address of the rule match filter code
```

Screen # 60

( PLB*12/14/86)

JOT1 is to be used as the rule match filter code holding area

Screen # 61

,LHS Stuff

This section adds code to the LHS filter.

Screen # 62

LHS List manipulation code

ADD-OFFSET adds a WME offset ( within the local WME frame) to the LHS list currently open. Offsets are used to maximize speed.

Screen # 63

LHS List manipulation code

REMOVE-OFFSET scans a LHS list to see if the specified offset is in it or not. A flag is returned to tell if the list did have the specified offset in it.

Screen # 64

LHS List manipulation code

RESET-LHS-LIST resets the LHS list for a given LHS.

Screen # 65

Prints the list for a given LHS. For debug only !!!!!

Screen # 66

Filter Support Words

1EXIT pushes a 1 on the stack and exits the filter

0EXIT pushes a 0 on the stack and exits the filter

Screen # 67

Filter Conditionals

This is the run time code for simple conditionals. Because the conditionals are simple, these words do not have to DUP the argument or worry about dropping it upon exit !!

Screen # 68

Filter Conditionals

This code is the run time conditional code for the RP. Since it is part of a complex condition, this code has to make sure that the stack is correct upon exit.

Screen # 69

Filter Conditionals for OR

This is the OR run time filter code. Note that this code sets a flag on the stack if an OR condition passes. The actual exit if the entire OR condition does not pass is at the end of the OR statement.

Screen # 70

Filter Execution Words

XL-ATTR gets the WME stream value specified by the 2 byte offset following the XL-ATTR in the filter.

POP-2-EXIT is used to signify that a negated LHS has failed
DROP-2-EXIT is used to signify that a negated LHS has passed O-SWAP is used to set up the OR conditional stuff
S-OR-E simple OR exit code
C-OR-E complex OR exit code
NEGATED-BITS allows a bit field to be made that tells which LHS's in a rule are negated or not

Screen # 71

Negated LHS filter words

/CH-NEG-LHS/ is the precheck filter code for negated LHS's

/CH-NN-LHS/ is the precheck filter code for non-negated LHS's

Screen # 72

$ Filter LHS open words ( PLB*12/04/86)

/OPEN-NN-LHS/ opens a non-negated LHS for the rule filter
/OPEN-NEG-LHS/ opens a negated LHS for the rule filter. This code also returns a flag to tell the rule filter code to skip this LHS. This is done if no elements are on the negated LHS list. This flag is 1 when there are no elements on neg-lhs list - think of this as the skip-lhs flag !!!

Screen # 73

```
$ Variable Binding and access execution words    ( PLB*12/07/86)
$ run time code !!!!
: /@VALUE/    ( attribute-offset - value )  /WME-ADDR/ @ + @ ;
: /BIND-VAR/  ( value var-offset - )  R-BV ! ;
: /@VAR/      ( var-offset - value )  R-BV @ ;

CODE /NEG-SETUP/  I )+ A0 W. MOV  I A0 ADD
    $ A0 now points to end of neg lhs !!!
    S )+ TST 0= NOT IF
       A0 I MOV  4 #Q I ADD  ,NEXT     $ skip the DROP !!!!!
    THEN A0 R -) MOV  ,NEXT
$ /NEG-SETUP/ is followed by 2 byte relative addr to next lhs

CODE POP-0-EXIT  4 #Q R ADD   R )+ I MOV  0 # S -) MOV ,NEXT
```

Screen # 74

P-NEW

P-NEW reads the input stream from the host to set up a new production on the RP

CALC-P-SIZE calculates the production size

SET-FILTERS copies all of the temporary filters to the correct frames.

Screen # 75

Closes the rule compilation on the RP

- calculate size of new rule frame
  update <WME-BYTES>
- create rule frame
  add to rule list
- put stats in rule frame
- move LHS handles to rule frame
- move rule filter code to rule frame
- close JOT1 & JOT2

Screen # 76

Creates a new LHS on the RP

- read stuff from host
- create large static frame
  add to lhs list
  add to JOT2
- init ,LHS
- put stats into lhs frame

Screen # 77

Closes a LHS on the RP

- resize static
- update <RULE-BYTES>

Screen # 78

Screen # 79

Screen # 80

NEW-ATTR

NEW-ATTR reads new attribute information from the HOST

Screen # 81

END-ATTR

END-ATTR closes the attribute just received from the host. This code mainly resets pointers if certain sections of code did not need to be added.

Screen # 82

Literal Filter Words
CLHS-TAB is the complex condition table

SLHS-TAB is the simple condition table

DO-LIT is the generic word to compile literal conditions into the filter code. The LHS filters only have literal conditions and the rule filters have only variable binding conditions. One exception to this is the OR condition. If the OR has only literals, it will be added to the LHS filter. If it has any variable conditions, then it will be added to the main rule filter code.

Screen # 83

These words read the input stream from the HOST for literal conditions

Screen # 84

OR Compilation Stuff

Support for compiling OR'd conditions into the RP

Screen # 85

OR Literal and Variable Start and End Words

ENTER-OR sets up the entry to the OR condition

EXIT-OR exits the OR condition. It is this code that determines if an OR condition has had any variables or not and restores the pointer of the filter that will not have the OR code

Screen # 86

More stuff for OR'ed conditionals

Screen # 87

Variable Binding
BIND-VAR reads the input stream for the binding of a new variable. Note that this routine is executed only once for each new bound variable. Subsequent references to a variable go through the DO-VAR below.

DO-VAR compiles a variable reference into the rule filter. Note that the compilation depends on the complex flag.

Screen # 88

Variable Comparison compilation words

These words read the input stream for conditions on previously bound variables.

Screen # 89

OR Variable compilation words

These words read the input stream to determine variable bindings within a OR'ed condition.

Screen # 90

$ OPEN-RULE ( PLB*12/21/86)

OPEN-RULE selects a sinngle rule for further manipulation
R-CF 2 byte address of the change flag
R-FIREABLE 2 byte address of the fireable flag
R-# 2 byte address of the rule number
R-NAME 4 byte address of the rule name token
R-#LHS 2 byte address of the # of LHS
R-#NEGLHS 2 byte address of the # of negated LHS
R-#RHS 2 byte address of the number of RHS
R-#BV 2 byte address of the # of bound variables
R-TIME 4 byte address of the ticks count used by rule
R-MAXMEM 4 byte address of the maximum memory used by rule
R-FIRED-ON 4 byte address of the handle to the already fired-on set
R-COMPLEXITY 2 byte address of the number of logical comparisons

Screen # 91

$ OPEN-RULE stuff ( PLB*03/17/87)

R-LHS-LIST address of the handles to the LHS lists
The upper byte contains the class# R-LHS-LIST C@
R-FILTER address of the rule match filter code

Screen # 92

```
$ OPEN-RULE stuff                                    ( PLB*03/17/87)

R-LHS-LIST   address of the handles to the LHS lists
      The upper byte contains the class#  R-LHS-LIST C@
R-FILTER     address of the rule match filter code
```

Screen # 93

```
$ OPEN-RULE stuff                                    ( PLB*03/17/87)

R-LHS-LIST   address of the handles to the LHS lists
      The upper byte contains the class#  R-LHS-LIST C@
R-FILTER     address of the rule match filter code
```

Screen # 94

```
                                                     ( PLB*03/26/87)



  $ the class is stored in the first byte of LHS-LIST
  $   LHS-LIST C@ returns class
: LHS-LIST   ( -addr) LHS-HDL @@ ;
: LHS-R#     ( -addr) LHS-HDL @@ 4+ ;
: LHS-NF     ( -addr) LHS-HDL @@ 5 + ;
: LHS-#      ( -addr) LHS-HDL @@ 6 + ;
: LHS-FILTER ( -addr) LHS-HDL @@ 8 + ;
```

Screen # 95

```
                                                     ( PLB*12/14/86)
```

Screen # 0

```
$ LHS.PF  --  LHS Evaluation Code                    ( PLB*10/10/86)

Update Records :

<01> 10/10/86 PLB  -  Creation of LHS Evaluation Package
```

Screen # 1

```
$ Load Screen for LHS Evaluation Code                ( PLB*03/13/87)
DECIMAL START-SEGMENT .( ==> LHS Stream Support)

   8      LOAD    $ RP Stream Support
   10  12 THRU    $ Temporary Stuff

END-SEGMENT
```

Screen # 2

```
$ Load Screen for LHS Evaluation Code                ( PLB*03/19/87)
DECIMAL START-SEGMENT .( ==> LHS Evaluation Code)

    13  19  THRU     $ Support for fireable list
    20  47  THRU     $ Counter code and evaluation code
    48  49  THRU     $ Support for HOST (CS) command
                     $    and IDENTIFY
    3   7   THRU     $ Rule Processor Initialization

END-SEGMENT
```

Screen # 3

```
$ Rule Processor Stream Vector Table                 ( PLB*02/17/87)
CREATE RP-STREAM
( 00)   ' RP-COMPLETE ,  ' P-NEW ,        ' P-NEWLHS ,
( 0C)   ' P-ENDLHS ,     ' NEW-ATTR ,     ' END-ATTR ,
( 18)   ' BIND-VAR ,     ' P-EXCISE ,     ' LIT= ,
( 24)   ' LIT<> ,        ' LIT> ,         ' LIT< ,
( 30)   ' LIT>= ,        ' LIT<= ,        ' VAR= ,
( 3C)   ' VAR<> ,        ' VAR> ,         ' VAR< ,
( 48)   ' VAR>= ,        ' VAR<= ,        ' CC-START ,
( 54)   ' ENTER-OR ,     ' EXIT-OR ,      ' ORL= ,
( 60)   ' ORL<> ,        ' ORL> ,         ' ORL< ,
( 6C)   ' ORL>= ,        ' ORL<= ,        ' ORV= ,
( 78)   ' ORV<> ,        ' ORV> ,         ' ORV< ,
( 84)   ' ORV>= ,        ' ORV<= ,        ' END-P ,
( 90)   ' MK-WME ,       0 ,              ' RM-WME ,
( 9C)   ' RM-CLS ,       ' RM-ALLWME ,    ' NEW-CLASS ,
```

Screen # 4

```
$ Rule Processor Stream Vector Table, cont.          ( PLB*03/19/87)

( A8)   ' INIT-WME ,     ' RESIZE-WME ,   ' SOFT-R ,
( B4)   ' EVAL-RULES ,   ' FIRE-RULE ,    ' GET#FIREABLE ,
( C0)   ' GET-NTH ,      ' SHOW-BD ,
```

Screen # 5

```
$ RP Stream Interpreter                              ( PLB*05/04/87)
HEX
CODE INTERPRET-STREAM
    <WATCH> AB [WATCH] AB MOV
    <NETWORK> #   STREAM-PTR AB MOV
    BEGIN
$%        [[ DEPTH IF CRITICAL CR ." Stack Depth is " DEPTH . .S
$%       ABORT THEN ]]
          STREAM-PTR AB A0 MOV  A0 ) A1 W. MOV
              2 #Q STREAM-PTR AB ADD
          RP-STREAM # A1 ADD    A1 S -) MOV [[ @EXECUTE ]]
    BRA

HEX ' INTERPRET-STREAM    IRUPT-TABLE 18 + !
```

Screen # 6

Screen # 7

```
$ RP "Power Up" Initialization                    ( PLB*04/08/87)
DECIMAL

: RP-COLD   INIT-FORTH  PAGE CR
    ." ORNL AI Machine Rule Processor System"   CR
    <RP6>    <TICKS> <RP6> -  ERASE     $ clear all RP variables
    INIT-MEM     INIT-JOT
    INIT-CLASS  INIT-PROD    INIT-RPWME
    RP-COMPLETE ; RECOVER

      ' RP-COLD 'INIT 20 + !
```

Screen # 8

```
$ Variables and Support for RP                    ( PLB*12/07/86)
VARIABLE    STREAM-PTR       $ Pointer to stream
$ % ( - n )
CODE %        STREAM-PTR AB A0 MOV   A0 ) S -) MOV
              4 #Q STREAM-PTR AB ADD ,NEXT
$ W% ( - n )
CODE W%       STREAM-PTR AB A0 MOV  A0 ) A1 W. MOV  A1 S -) MOV
              2 #Q STREAM-PTR AB ADD .NEXT
CODE %RHS    STREAM-PTR AB A0 MOV   A0 ) [RHS#] AB MOV
              4 #Q STREAM-PTR AB ADD .NEXT
$ %@ ( - n )
CODE %@       STREAM-PTR AB A0 MOV  A0 ) S -) MOV   ,NEXT

 : %MOVE ( to count - )  >R
     >R STREAM-PTR @ R> R@ MOVE  R> STREAM-PTR +! ;
```

Screen # 9

Screen # 10

```
$ Temporary and Debug Stuff                       ( PLB*12/01/86)

$ : P-NEW CR ." New Production => #-> " W% . ." Name-> "
$     % .TOKEN <#RULES> TALLY ;
$ : P-NEWLHS <#LHS> TALLY CR ." New LHS => " W% . W% . W% . ;
$ : P-ENDLHS CR ." End LHS" ;
$ : NEW-CLASS CR ." New Class => " W% . W% . W% . ;
$ : NEW-ATTR CR ." New Attribute => " W% . ;
$ : END-ATTR CR ." End Attribute" ;
$ : BIND-VAR CR ." Bind Variable -> " W% . ;
: P-EXCISE CR ." Excise Production -> " W% . ;
$ : LIT=     CR ." Literal =  " % .TOKEN ;
$ : LIT<>    CR ." Literal <> " % .TOKEN ;
$ : LIT>     CR ." Literal >  " % .TOKEN ;
$ : LIT<     CR ." Literal <  " % .TOKEN ;
$ : LIT>=    CR ." Literal >= " % .TOKEN ;
```

Screen # 11

```
$ Temporary and Debug Stuff                       ( PLB*12/01/86)
$ : LIT<=    CR ." Literal <= " % .TOKEN ;
$ : VAR=     CR ." Variable =  " W% . ;
$ : VAR<>    CR ." Variable <> " W% . ;
$ : VAR>     CR ." Variable >  " W% . ;
$ : VAR<     CR ." Variable <  " W% . ;
$ : VAR>=    CR ." Variable >= " W% . ;
$ : VAR<=    CR ." Variable <= " W% . ;
$ : CC-START CR ." Compound Condition Start" ;
$ : ENTER-OR CR ." Enter OR" ;
$ : EXIT-OR  CR ." Exit OR" ;
$ : ORL=     CR ." OR Literal =  " % .TOKEN ;
$ : ORL<>    CR ." OR Literal <> " % .TOKEN ;
$ : ORL>     CR ." OR Literal >  " % .TOKEN ;
$ : ORL<     CR ." OR Literal <  " % .TOKEN ;
$ : ORL>=    CR ." OR Literal >= " % .TOKEN ;
```

Screen # 12

```
$ Temporary and Debug Stuff                       ( PLB*01/01/87)
$ : ORL<=    CR ." OR Literal <= " % .TOKEN ;
$ : ORV=     CR ." OR Variable =  " W% . ;
$ : ORV<>    CR ." OR Variable <> " W% . ;
$ : ORV>     CR ." OR Variable >  " W% . ;
$ : ORV<     CR ." OR Variable <  " W% . ;
$ : ORV>=    CR ." OR Variable >= " W% . ;
$ : ORV<=    CR ." OR Variable <= " W% . ;
$ : END-P    CR ." End of rule compilation" ;
$ : RM-CLS   CR ." Remove Class " %RHS W% . ;
$ : RM-ALLWME CR ." Remove All WME " %RHS % . ;

: SOFT-R  CR ." Soft Reallocate " SOFT-REALLOCATE ;
$ : FIRE-RULE W% RP-# W@ = IF W% DROP $ ." FIRE RULE " .
$    ELSE STREAM-PTR 2TALLY THEN ;
```

Screen # 13

```
$ RESET-FIREABLE REMOVE-FIREABLE                  ( PLB*04/07/87)

: RESET-FIREABLE     R-FIREABLE @ SIZE-OF-FRAME NEGATE
      R-FIREABLE @ RESIZE-DYNAMIC
      R-#FIREABLE W@ NEGATE <#FIREABLE> +! R-#FIREABLE W-OFF ;

: REMOVE-FIREABLE ( index - ) $% CR ." REMOVE-FIREABLE " DUP .
    DUP >FIREABLE SWAP 1+ >FIREABLE SWAP ( from to ) OVER
    R-#FIREABLE W@ >FIREABLE SWAP -
    MOVE      ( move instantiations )
    <#FIREABLE> DOCK  R-#FIREABLE W-DOCK
    R-#LHS W@ 8 * NEGATE R-FIREABLE @ RESIZE-DYNAMIC ;
```

Screen # 14

```
$ RESET-NOT-FIREABLE REMOVE-NOT-FIREABLE          ( PLB*04/18/87)

: RESET-NOT-FIREABLE    R-#NEGLHS W@ IF
        R-NOT-FIREABLE @ SIZE-OF-FRAME NEGATE
        R-NOT-FIREABLE @ RESIZE-DYNAMIC
        R-#NOT-FIREABLE W@ NEGATE <#N-FIREABLE> +!
        R-#NOT-FIREABLE W-OFF THEN ;

: REMOVE-NOT-FIREABLE ( index - )
    $% CR ." REMOVE-NOT-FIREABLE " DUP .
    DUP >NOT-FIREABLE SWAP 1+ >NOT-FIREABLE SWAP ( from to) OVER
    R-#NOT-FIREABLE W@ >NOT-FIREABLE SWAP -
    MOVE      ( move instantiations )
    <#N-FIREABLE> DOCK  R-#NOT-FIREABLE W-DOCK
    R-#LHS W@ 4* NEGATE R-NOT-FIREABLE @ RESIZE-DYNAMIC ;
```

Screen # 15

```
$ CALC-CS                                         ( PLB*03/18/87)

: CALC-CS ( dest-addr - )
      R-#LHS W@ 0 DO
          I NEGATED-BITS BIT-TST IF
             I 4* OVER + OFF      $ Negated !!!!
          ELSE    $ Non-negated !!!!
             DUP
             I 4* <L-CNT> + @@ ( offset) I 4* <L-BASE> + @ +
             @ ( WME#) I 4* ROT + !
          THEN
      LOOP DROP ;
```

Screen # 16

```
$ Debug Support                                   ( PLB*04/20/87)

 : .LAST-CS  CR ." LAST INSTANTIATION IS : " CR 5 SPACES
    R-#LHS W@ 0 DO I 4* ( R-#LHS W@ 4* +)
        R-#FIREABLE W@ 1- >FIREABLE + @ .
    LOOP ;
```

Screen # 17

```
$ REDO-COUNTER                                    ( PLB*05/04/87)

: REDO-COUNTER $% CR ." REDO-COUNTER "
      R-#LHS W@ 0 DO
```

```
     I R-LHS-LIST @ ( handle) DUP SIZE-OF-FRAME ?DUP
  IF  $ something on list !!!!!
     $ keep <L-CNT> minus <L-START> constant
     I 4* DUP <L-CNT> + @ SWAP <L-START> + @ -
          I 4* <L-CNT> + !
     ( 4- )  I 4* <L-END> + !
     ( handle ) @ DUP <L-START> I 4* + !
        DUP <L-CNT> I 4* + +! <L-END> I 4* + +!
        I R-LHS-LIST C@ >CLASS-LIST @@ I 4* <L-BASE> + !
  ELSE DROP $  must be negated !!!!
  THEN LOOP ;
: MM-FIX   RULE @ OPEN-RULE REDO-COUNTER ; -
```

Screen # 18

```
$ ADD-FIREABLE                                     ( PLB*05/04/87)

: ADD-FIREABLE-TOP <#FIREABLE> TALLY   $% CR ." ADD-FIREABLE "
   R-#FIREABLE W@  R-#LHS W@ 8 * DUP >R * ( offset )
   R> R-FIREABLE @
                  RESIZE-DYNAMIC   $ MM ERROR HERE
$   RULE @ OPEN-RULE    REDO-COUNTER
   $% CR ." AFTER RESIZE " .S
   R-FIREABLE @@ + DUP   $ address of end of list !!!!
   CALC-CS
   R-#LHS W@ 4* 2DUP + DUP >R SWAP MOVE  $ move wme#'s
   R> R-#LHS W@
   MEA? IF 1- SWAP 4+ SWAP THEN  $ MEA skips 1st LHS !!!
     SORT ( sort SC set)      R-#FIREABLE W-TALLY $% .LAST-CS
   ;
M: ADD-FIREABLE ADD-FIREABLE-TOP  SORT-FIREABLE ;M
```

Screen # 19

```
$ ADD-NOT-FIREABLE                                 ( PLB*05/04/87)

: ADD-NOT-FIREABLE ( - addr) $% CR ." ADD-NOT-FIREABLE "
   <#N-FIREABLE> TALLY
   R-#NOT-FIREABLE W@  R-#LHS W@ 4* DUP >R * ( offset )
   R> R-NOT-FIREABLE @
                  RESIZE-DYNAMIC   $ MM ERROR HERE
$      RULE @ OPEN-RULE
$      REDO-COUNTER           $ NEED TO REDO COUNTER ARRAY STUFF??
   $% CR ." AFTER RESIZE " .S
   R-NOT-FIREABLE @@ +     $ address of end of list !!!!
   R-#NOT-FIREABLE W-TALLY ;

$ NOTE THAT THE NOT FIREABLE LIST DOES NOT KEEP A SORTED SET !!!
```

Screen # 20

```
$ SET-COUNT                                        ( PLB*05/04/87)
$ must reset L-CNT given address of the WME#'s
: SET-COUNT ( addr - )
   R-#LHS W@ 0 DO I 4* OVER + @ ( wme# )
     ?DUP IF
     $ now, scan LHS list to see what the L-CNT should be
     WME>OFFSET $ CR ." OFFSET= " DUP .
     I 4* DUP <L-END> + @ 4+ SWAP <L-START> + @ DO
        $ CR 3 SPACES ." I = " I . I @ .
          I @ OVER = IF LEAVE I THEN
     4 +LOOP SWAP DROP
( .S)    I 4* <L-CNT> + !    $ Store Count
     ELSE $ negated LHS !!!!!
          I 4* DUP <L-CNT> + OFF DUP <L-END> + OFF
          <L-START> + OFF
   THEN LOOP DROP ;
```

Screen # 21

```
$ SET-COUNT-NOPIV                                  ( PLB*05/01/87)
$ must reset L-CNT given address of the WME#'s
: SET-COUNT-NOPIV ( addr - ) $% CR ." SET-COUNT-NOPIV " .S
   R-#LHS W@ 0 DO I PIVOT @ - IF I 4* OVER + @ ( wme# )
     ?DUP IF
     $ now, scan LHS list to see what the L-CNT should be
     WME>OFFSET $ CR ." OFFSET= " DUP .
     I 4* DUP <L-END> + @ 4+ SWAP <L-START> + @ DO
        $ CR 3 SPACES ." I = " I . I @ .
          I @ OVER = IF LEAVE I THEN
     4 +LOOP SWAP DROP
.S   I 4* <L-CNT> + !    $ Store Count
     ELSE $ negated LHS !!!!!
          I 4* DUP <L-CNT> + OFF DUP <L-END> + OFF
          <L-START> + OFF
   THEN THEN LOOP DROP CR ." END SCNOPIV " .S ;
```

Screen # 22

```
$ DOMINATE                                         ( PLB*04/18/87)
$ 0 - no match     1 - a1 dominates      2 - a2 dominates
VARIABLE A1          VARIABLE A2      WVARIABLE D-F
: DOM-FILL ( a start - ) R-#LHS W@ SWAP DO I 4* OVER + -1 SWAP !
   LOOP DROP ;
: DOMINATE ( a1 a2 - f )   A2 !  A1 !    D-F W-ON ( default)
   R-#LHS W@ 0 DO
       I 4* A1 @ + @ ( get a1 time tag )
       I 4* A2 @ + @ ( get a2 time tag )
         2DUP = IF DROP -1 = IF LEAVE D-F W-ON THEN
     ELSE   LEAVE D-F W-OFF
   2DUP 0= IF D-F W-ON A1 @ I DOM-FILL THEN
       0= IF 2 D-F W! A2 @ I DOM-FILL THEN
   -1 = IF 2 D-F W! THEN      -1 = IF D-F W-ON THEN
       THEN LOOP D-F W@ ;
```

Screen # 23

```
$ CLOSE-NOT-FIREABLE                               ( PLB*03/18/87)
$ : CLOSE-NOT-FIREABLE ;   EXIT
: .DM R-#LHS W@ 0 DO I 4* OVER + @ . LOOP DROP ;
: .DOM 2DUP CR ." #2 --> " .DM  CR ." #1 --> " .DM ;
: CLOSE-NOT-FIREABLE   $% CR ." CLOSE-NOT-FIREABLE "
   R-#NOT-FIREABLE W@ DUP 1 > IF
      DUP 1- >NOT-FIREABLE SWAP 1- 0 DO  $% CR ." CL-NF " I .
        I >NOT-FIREABLE OVER ( .DOM) DOMINATE
        $%      CR ." DOM= " DUP .
     CASE
        1 OF LEAVE
             R-#NOT-FIREABLE W@ 1- REMOVE-NOT-FIREABLE ENDOF
        2 OF LEAVE
             I REMOVE-NOT-FIREABLE ENDOF
     ENDCASE LOOP DROP
   ELSE DROP THEN ;
```

Screen # 24

```
$ NEW-COUNT                                        ( PLB*04/24/87)
: .COUNT CR R-#LHS W@ 0 DO SPACE
     I 4* <L-CNT> + @    I 4* <L-START> + @ - 4/ 4 U.R LOOP ;
: TEST-CNT 2DUP < IF CRITICAL ." NEW-COUNT ERROR" .S THEN ;
: NEW-COUNT ( - finish-flag) $% CR ." NEW-COUNT"
   BEGIN /LHS#/ @ -1 = IF 1EXIT ( end of rule) THEN
       /LHS#/ @ NEGATED-BITS BIT-TST
       IF /LHS#/ DOCK 0
       ELSE
          /LHS#/ @ PIVOT @ = IF /LHS#/ DOCK 0 ELSE
          /LHS#/ @ 4* <L-END> OVER + @ SWAP <L-CNT> + @ 4+
TEST-CNT    = IF /LHS#/ DOCK 0 ELSE 1 THEN THEN
   THEN UNTIL      /LHS#/ @ 4* >R
   4 R@ <L-CNT> + +!       $ increment counter
   R-#LHS W@ R> 4/ 1+      DO ! PIVOT @ - IF
   I 4* <L-START> + @ I 4* <L-CNT> + ! THEN LOOP 0 ( flag) ;
```

Screen # 25

```
$ Counter Support                                  ( PLB*05/01/87)
WVARIABLE NEG-FLAG   NEG-FLAG W-OFF
: NEG-COUNT    ( - finish-flag) $% CR ." NEG-COUNT "
   /LHS#/ @ 4* >R
   R@ <L-END> + @      R@ <L-CNT> + @ 4+ =
   IF $ have gone through all negated entries, go to next LHS
         NEG-FLAG W@ IF NEG-FLAG W-OFF R> DROP
              /LHS#/ DOCK NEW-COUNT EXIT THEN
      R@ <L-START> + @ R> <L-CNT> + ! /LHS#/ TALLY
      /LHS#/ @ R-#LHS W@ =
      IF $ end of rule - found instantiation
        ADD-FIREABLE
      -2 /LHS#/ +! ( backup to possible nn-LHS) NEW-COUNT EXIT
      ELSE 0 ( flag) THEN    $ go on to next LHS
   ELSE  4 R> <L-CNT> + +!  $ try next entry for this neg LHS
   0 ( flag) THEN ;
```

Screen # 26

```
$ Counter Words                                    ( PLB*04/23/87)
: PASS-RULE     $% CR ." PASS-RULE "
     ADD-FIREABLE   NEW-COUNT ;

: PASS-NEG  ADD-NOT-FIREABLE
      $% CR ." PASS-NEG "
      NEG-FLAG W-ON
      $ Calculate not-fireable conflict set ( partial !!!)
      R-#LHS W@ 0 DO I /LHS#/ @ > IF -1 OVER I 4* + ! ELSE
         I /LHS#/ @ =    I NEGATED-BITS BIT-TST NOT OR IF
         DUP I 4* <L-CNT> + @@ ( offset) I 4* <L-BASE> + @ +
             @ ( WME#) I 4* ROT + !
         ELSE I 4* OVER + OFF THEN
   THEN LOOP $% CR ." NOT-FIREABLE--> " DUP 20 DUMP
   DROP    CLOSE-NOT-FIREABLE NEG-COUNT ;
```

Screen # 27

```
$ PIVOT-COUNTER                                    ( PLB*05/04/87)
CREATE PIVOT-TAB       ' NEW-COUNT ,    ' PASS-RULE ,
                       ' NEG-COUNT ,    ' PASS-NEG ,
```

```
: .START CR ." <L-START>:" <L-START> 20 DUMP CR ;
: .CNT   CR ." <L-CNT>:" <L-CNT> 20 DUMP CR ;
: .END CR ." <L-END>:" <L-END> 20 DUMP CR ;
: PIVOT-COUNTER $% CR ." PIVOT-COUNTER " .START .CNT .END
   BEGIN /LHS#/ @
      DUP 4* <HIST> + TALLY   $ UPDATE HISTOGRAM
   EXECUTE-RULE-FILTER <RPD> TIMER2
   DUP 1 > IF <RP5> TALLY ELSE <RP6> TALLY THEN
      $% .COUNT  DUP ." FILTER OUT = " .
      4* PIVOT-TAB + @EXECUTE
   UNTIL ( ." EXIT PIVOT-COUNTER " .S ) ;
```

Screen # 28

```
$ INIT-COUNTER                                    ( PLB*05/01/87)
: INIT-COUNTER $% CR ." INIT-COUNTER "
   R-#LHS W@ 0 DO
      I R-LHS-LIST @ ( handle) DUP SIZE-OF-FRAME ?DUP
      IF $ has something on list !!!!
         ( 4-) I 4* <L-END> + !
         ( handle) @ DUP <L-START> I 4* + !
               <L-END> I 4* + +!
         I R-LHS-LIST C@ >CLASS-LIST @@ I 4* <L-BASE> + !
      ELSE $ nothing on list ( has to be negated !!! )
         DROP
         I 4* DUP <L-START> + OFF    DUP <L-END> + OFF
         <L-BASE> + OFF
      THEN
   LOOP /LHS#/ OFF   <L-START> <L-CNT> R-#LHS W@ 4* MOVE ;
```

Screen # 29

Screen # 30

Screen # 31

```
$ NEW>COUNT                                       ( PLB*04/21/87)
EXIT

: NEW>COUNT ( - finish-flag) $% CR ." NEW>COUNT"
   BEGIN /LHS#/ @ -1 = IF 1EXIT ( end of rule) THEN
      /LHS#/ @ NEGATED-BITS BIT-TST
      IF /LHS#/ DOCK 0
      ELSE
         /LHS#/ @ PIVOT @ = IF /LHS#/ DOCK 0 ELSE
         /LHS#/ @ 4* <L-END> OVER + @ SWAP <L-CNT> + @ 4+
         = IF /LHS#/ DOCK 0 ELSE 1 THEN THEN
   THEN UNTIL
   /LHS#/ @ 4* >R
   4 R@ <L-CNT> + +!       $ increment counter
   R-#LHS W@ R> 4/ 1+      DO I PIVOT @ - IF
   I 4* <L-START> + @ I 4* <L-CNT> + ! THEN LOOP 0 ( flag) ;
```

Screen # 32

```
$ Counter Support                                 ( PLB*05/01/87)
EXIT WVARIABLE NEG-FLAG - NEG-FLAG W-OFF
: NEG>COUNT   ( - finish-flag) $% CR ." NEG>COUNT "
   /LHS#/ @ 4* >R
   R@ <L-END> + @     R@ <L-CNT> + @ 4+ =
   IF $ have gone through all negated entries. go to next LHS
         NEG-FLAG W@ IF NEG-FLAG W-OFF R> DROP
            /LHS#/ DOCK NEW-COUNT EXIT THEN
      R@ <L-START> + @ R> <L-CNT> + ! /LHS#/ TALLY
      /LHS#/ @ R-#LHS W@ =
      IF $ end of rule - found instantiation
         ADD-FIREABLE
         -2 /LHS#/ +! ( backup to possible nn-LHS) NEW-COUNT
      ELSE 0 ( flag) THEN   $ go on to next LHS
   ELSE  4 R> <L-CNT> + +!  $ try next entry for this neg LHS
   0 ( flag) THEN ;
```

Screen # 33

```
$ Counter Words                                   ( PLB*05/01/87)
EXIT
: PASS>RULE      $% CR ." PASS>RULE "
                 ADD-FIREABLE   NEW>COUNT ;

: PASS>NEG  ADD-NOT-FIREABLE
      $% CR ." PASS>NEG "
      NEG-FLAG W-ON
      $ Calculate not-fireable conflict set ( partial !!!)
      R-#LHS W@ 0 DO I /LHS#/ @ > IF -1 OVER I 4* + ! ELSE
         I /LHS#/ @ =   I NEGATED-BITS BIT-TST NOT OR IF
         DUP I 4* <L-CNT> + @@ ( offset) I 4* <L-BASE> + @ +
            @ ( WME#) I 4* ROT + !
         ELSE I 4* OVER + OFF THEN
      THEN LOOP $% CR ." NOT-FIREABLE--> " DUP 20 DUMP
      DROP   CLOSE-NOT-FIREABLE NEG-COUNT ;
```

Screen # 34

```
$ >PIVOT-COUNTER                                  ( PLB*04/21/87)
EXIT
CREATE >PIVOT-TAB   ' NEW>COUNT ,    ' PASS>RULE ,
                    ' NEG>COUNT ,    ' PASS>NEG ,


: >PIVOT-COUNTER $% CR ." >PIVOT-COUNTER " .START .CNT .END
   BEGIN /LHS#/ @
      DUP 4* <HIST> + TALLY   $ UPDATE HISTOGRAM
   EXECUTE-RULE-FILTER <RPD> TIMER2
   DUP 1 > IF <RP5> TALLY ELSE <RP6> TALLY THEN
      $% .COUNT  DUP ." FILTER OUT = " .
      4* >PIVOT-TAB + @EXECUTE
   UNTIL ( ." EXIT PIVOT-COUNTER " .S ) ;
```

Screen # 35

```
$ SET-COUNT<PIV                                   ( PLB*04/21/87)
EXIT $ must reset L-CNT given address of the WME#'s
: SET-COUNT<PIV ( addr - ) $% CR ." SET-COUNT<PIV " .S
   R-#LHS W@ 0 DO I PIVOT @ - IF I 4* OVER + @ ( wme# )
      ?DUP IF
      $ now, scan LHS list to see what the L-CNT should be
      WME>OFFSET $ CR ." OFFSET= " DUP .
      I 4* DUP <L-END> + @ 4+ SWAP <L-START> + @ DO
         $ CR 3 SPACES ." I = " I . I @ .
            I @ OVER = IF LEAVE I THEN
      4 +LOOP SWAP DROP
      I 4* <L-CNT> + !     $ Store Count
      ELSE $ negated LHS !!!!!
         I 4* DUP <L-CNT> + OFF DUP <L-END> + OFF
         <L-START> + OFF
   THEN THEN LOOP DROP CR ." END SCNOPIV " .S ;
```

Screen # 36

```
$ REM-NEGATED                                     ( PLB*04/21/87)
: REM-NEGATED ; EXIT
: REM-NEGATED   $% CR ." REM-NEGATED
   LHS-# W@ DUP PIVOT ! 4* ( offset)
   R-#NOT-FIREABLE W@ ?DUP IF 1- 0 SWAP DO
      I >NOT-FIREABLE OVER + @  WME#-TO-REMOVE @ =
      IF  RULE @ OPEN-RULE
          INIT-COUNTER
          I >NOT-FIREABLE  SET-COUNT<PIV
          >PIVOT-COUNTER
   $ NEED TO CHECK PRECHECK ????????

      THEN -1 +LOOP THEN DROP ;
```

Screen # 37

```
$ SET-TO-END                                      ( PLB*05/22/87)
```

```
: SET-TO-END ( lhs# - ) >R R@ R-LHS-LIST @ SIZE-OF-FRAME 4-
    R@ 4* <L-START> + @  + R> 4* <L-CNT> + ! ;
```

Screen # 38

```
$ MAKE-NEGATED                                   ( PLB*05/22/87)
: MAKE-NEGATED  $% CR ." MAKE-NEGATED " .S
   R-# W@ 1+ <R-#> !  $ Rule Number
   LHS-# W@ PIVOT !     $ Store LHS#
$ Scan FIREABLE to see if any instantiations need to be removed
   R-#FIREABLE W@ ?DUP IF 1- 0 SWAP DO $% CR ." SC FIR " I . .S
       INIT-COUNTER I >FIREABLE SET-COUNT-NOPIV
       PIVOT @ SET-TO-END                          $% .COUNT
  BEGIN /LHS#/ @ EXECUTE-RULE-FILTER CASE 0 OF ABORT ENDOF
   1 OF 0 1 ENDOF 3 OF 1 1 ENDOF 2 OF /LHS#/ TALLY /LHS#/ @
   R-#LHS W@ = IF 0 1 ELSE 0 THEN ENDOF ENDCASE UNTIL IF
           $ Move from fireable to not-fireable and set WME#
       ADD-NOT-FIREABLE I >FIREABLE SWAP
       DUP >R R-#LHS W@ 4* MOVE R>
       I REMOVE-FIREABLE   PIVOT @ 4* + TIME-TAG @ SWAP !
   THEN -1 +LOOP THEN ;
```

Screen # 39

Screen # 40

```
$ REM-NON-NEGATED                                ( PLB*03/17/87)

: REM-NON-NEGATED $% CR ." REM-NON-NEGATED " WME-OFFSET @ .
   $ Scan FIREABLE list
   R-#FIREABLE W@ ?DUP IF 1- 0 SWAP DO
       $% CR 3 SPACES ." RMNNLP " I .
       I >FIREABLE LHS-# W@ 4* + @ WME#-TO-REMOVE @ =
       IF I REMOVE-FIREABLE THEN
   -1 +LOOP THEN
   $ Scan NOT-FIREABLE list
   R-#NOT-FIREABLE W@ ?DUP IF 1- 0 SWAP DO
       $% CR 3 SPACES ." RMNNLP ( NOT-FIREABLE) " I .
       I >NOT-FIREABLE LHS-# W@ 4* + @ WME#-TO-REMOVE @ =
       IF I REMOVE-NOT-FIREABLE THEN
   -1 +LOOP THEN ;
```

Screen # 41

```
$ MAKE-NON-NEGATED                               ( PLB*04/19/87)

: MAKE-NON-NEGATED  $% CR ." MAKE-NON-NEGATED "
   R-# W@ 1+ <R-#> !  $ Rule Number
   EXECUTE-PRECHECK IF $% CR ." PRECHECK PASSED "
       LHS-# W@ PIVOT !         $ Store pivot info .....
       INIT-COUNTER
       PIVOT @ 4* >R   <L-END> R@ + @  4-   <L-CNT> R> + !
       PIVOT-COUNTER
   THEN ;
```

Screen # 42

```
$ MK-WME                                         ( PLB*05/04/87)
VARIABLE MK-VEC
: MK-WME  %RHS %CLASS   SETUP-MAKE-WME ['] MAKE-WME MK-VEC !
    ['] MM-FIX MM-VEC ! $ Scan all LHS for possible match
    <RP1> TIMER1 <#LHS> @ ?DUP IF 0 DO I OPEN-LHS
    LHS-LIST C@ LIT# W@ = IF <RPC> TIMER2 EXECUTE-LHS-FILTER
    0 TIMER2      $   <RP1> TALLY   LHS-FILTER FILTER-EXECUTE
        IF MK-VEC @EXECUTE MK-VEC OFF   $ Keep WME
 I OPEN-LHS ADD-OFFSET          $ Add WME to LHS List and mark chg
           I OPEN-LHS              $ Avoid MM Errors !!!!
        RULE @ OPEN-RULE    $ MM ERRORS !!!!!!!
      $% CR ." PIVOT FOR : " R-NAME @ .TOKEN
    LHS-NF C@ IF MAKE-NEGATED ELSE MAKE-NON-NEGATED THEN
 THEN THEN LOOP THEN MM-VEC OFF
 MK-VEC @ IF -1 %@ DUP TIME-TAG ! ( timetag) >WME-LIST !
    L-SIZE W@ STREAM-PTR +! THEN <R-#> OFF 0 TIMER1 ;
```

Screen # 43

```
$ RM-WME                                         ( PLB*05/04/87)

: RM-WME    <RP2> TIMER1 ['] MM-FIX MM-VEC !
   %RHS    % DUP WME? IF  DUP WME#-TO-REMOVE !
   DUP WME>CLASS OPEN-CLASS REMOVE-WME
   $ scan all lhs for offset WME-OFFSET
   <#LHS> @ ?DUP IF 0 DO I OPEN-LHS
      R-# W@ 1+ <R-#> !    $ Rule Number
      LHS-LIST C@ LIT# W@ = IF
         REMOVE-OFFSET            $ Remove WME from LHS list
   $% CR ." RM-WME " LHS-R# C@ . LHS-# W@ . DUP .
             IF  LHS-NF C@ IF REM-NEGATED
                     ELSE REM-NON-NEGATED THEN
         THEN THEN
   LOOP THEN ELSE DROP THEN <R-#> OFF 0 TIMER1 MM-VEC OFF ;
```

Screen # 44

```
$ RM-CLS                                         ( PLB*03/17/87)

: RM-CLS    %RHS    W% +% DUP CR ." Remove Class " .
   DUP OPEN-CLASS  REMOVE-SINGLE-CLASS
   $ scan all LHS for class given
   <#LHS> @ ?DUP IF 0 DO I OPEN-LHS
      LHS-LIST C@ LIT# W@ = IF
$          ." REMOVE CLASS FROM LHS" I .
           RESET-LHS-LIST
           LHS-NF C@
              NOT IF RESET-NOT-FIREABLE RESET-FIREABLE THEN
   THEN LOOP THEN ;
```

Screen # 45

```
$ EVAL-RULES                                     ( PLB*04/24/87)
HEX : EVAL-RULES -1 <BEST-RULE> W! $% CR ." Evaluate Rules"
   <RP3> TIMER1
   <#-IN-CS> W-OFF   <#RULES> @ ?DUP IF 0 DO I OPEN-RULE
      R-#FIREABLE W@ IF
            R-# W@ 1+ <R-#> !    $ Rule Number
            $% CR ." Rule Fireable " I . R-NAME @ .TOKEN
            <#-IN-CS> W-TALLY I RESOLVE-RP-CONFLICT THEN
   LOOP THEN  $% CR ." END OF EVAL-RULES LOOP"
   <BEST-RULE> W@ FFFF - IF FIRE-INDEX W@ OPEN-RULE
   INIT-COUNTER R-#FIREABLE W@ 1- >FIREABLE >R
   R@ SET-COUNT  $% ." AFTER SET-COUNT "
   R-#LHS W@ 4* DUP
   R> + ( sorted) SWAP >R <SORTED-CS> R> MOVE
   0 EXECUTE-RULE-FILTER ." RFILT OUT= " .
   <CONFLICT-SET> CALC-CS THEN   <R-#> OFF 0 TIMER1 ;
```

Screen # 46

```
$ FIRE-RULE                                      ( PLB*04/18/87)
: FIRE-RULE <RP4> TIMER1
         W% RP-# W@ = IF W%   $% CR ." Fire Rule " DUP .
         $% CR ." FIRE-INDEX " FIRE-INDEX W@ .
     FIRE-INDEX W@ OPEN-RULE
     R-# W@ 2DUP = IF 2DROP ELSE CRITICAL . . ." FIRE-R ERR"
         FIRE-INDEX W@ .  .S ABORT THEN
     $ now , remove instantiation from fireable list
     $   and move it to not-fireable list
   R-#NEGLHS W@ IF
     ADD-NOT-FIREABLE  R-#FIREABLE W@ 1- DUP >R >FIREABLE
     SWAP R-#LHS W@ 4* MOVE R> REMOVE-FIREABLE
     CLOSE-NOT-FIREABLE
     $% CR ." END OF FIRE-RULE " .S
   ELSE R-#FIREABLE W@ 1- REMOVE-FIREABLE THEN
  ELSE STREAM-PTR 2TALLY THEN 0 TIMER1 ;
```

Screen # 47

```
$ GET#FIREABLE                                   ( PLB*03/01/87)
: .GET-ERR   CRITICAL ." RULE IS NOT HERE " ABORT ; RECOVER

: GET#FIREABLE W% RP-# W@ = IF W% ( rule#)
   <#RULES> @ ?DUP IF 0 DO I OPEN-RULE R-# W@ OVER =
         IF LEAVE -1 OR THEN LOOP
     -1 - IF .GET-ERR  THEN
         R-#FIREABLE W@ <#-IN-CS> W!
     ELSE DROP <#-IN-CS> W-OFF THEN
  ELSE STREAM-PTR 2TALLY THEN ;
```

Screen # 48

```
$ GET-NTH                                             ( PLB*04/19/87)
: GET-NTH      W% RP-# W@ = IF W% ( rule#)
   <#RULES> @ ?DUP IF 0 DO I OPEN-RULE R-# W@ OVER =
        IF LEAVE -1 OR THEN LOOP
     -1 - IF .GET-ERR THEN
     $ Now, get nth instantiation
     INIT-COUNTER W% >FIREABLE >R
        R@ SET-COUNT  $% ." AFTER SET-COUNT "
        R-#LHS W@ 4* DUP
        R> + ( sorted) SWAP >R <SORTED-CS> R> MOVE
        0 EXECUTE-RULE-FILTER DROP $.." RFILT OUT= " .
        <CONFLICT-SET> CALC-CS
        $% <CONFLICT-SET> 40 DUMP
     ELSE .GET-ERR  THEN
  ELSE STREAM-PTR 4TALLY THEN ;
```

Screen # 49

```
$ IDENTIFY                                            ( PLB*03/25/87)
CREATE ID-TAB   1 C,  2 C,  4 C,  8 C,

: SHOW-BD  RP-# W@ 4/ ( board number) RP-# W@ 3 AND
   ID-TAB + C@ AND
   IF BEGIN AGAIN ELSE RP-STOP THEN ; RECOVER
```

Screen # 50

Screen # 51

Load Screen for LHS Evaluation Code

The screens loaded by this load screen must be loaded before the reset of the RP code is loaded, in particular the code in FILTER.PF

Screen # 52

Load Screen for LHS Evaluation Code

This load screen loads the actual evaluation code. It should be loaded after most of the other RP code has been loaded.

Screen # 53

Rule Processor Stream Vector Table

RP-STREAM is the vector table that is used to decode commands from the host and execute the appropriate code on the RP. Note that some of this code is used for the actual compilation of LHS's into the RP, in which only one RP is interrupted by the HOST, and that other code is used for the actual running of the system, in which case all processors execute the stream sent by the host.

Screen # 54

Rule Processor Stream Vector Table, cont.

More of the vector table

Screen # 55

```
$ RP Stream Interpreter                               ( PLB*12/02/86)
HEX
: INTERPRET-STREAM
   <WATCH> @ [WATCH] !
   <NETWORK> STREAM-PTR !
   BEGIN .S
      W%   RP-STREAM +   @EXECUTE
   AGAIN ; RECOVER

HEX ' INTERPRET-STREAM   IRUPT-TABLE 19 + !
```

This is the main stream interpreter on the RP's. This is the code that is run upon interrupt from the HOST. Note that it has been machine coded for speed.

Screen # 56

Screen # 57

RP "Power Up" Initialization

RP-COLD is the RP initialization code for the evaluation code on the RP's. This code is run once when the OPS system is first brought up and also when the user executes the RESET command from the keyboard.

Screen # 58

```
$ Variables and Support for RP                        ( PLB*11/02/86)

VARIABLE    STREAM-PTR       $ Pointer to stream

: %  ( - n )  STREAM-PTR @@   STREAM-PTR 4TALLY ;
: W% ( - n )  STREAM-PTR @ W@ STREAM-PTR 2TALLY ;
: %RHS          % [RHS#] ! ;
: %@ ( - n ) STREAM-PTR @@ ;
: %MOVE ( to count - )  >R
   >R STREAM-PTR @ R> R@ MOVE  R> STREAM-PTR +! ;
```

This code "peels off" commands from the HOST that have been placed in the <NETWORK> buffer. See INTERPRET-STREAM also.

Screen # 59

Screen # 60

Screen # 61

Screen # 62

Screen # 63

RESET-FIREABLE REMOVE-FIREABLE

RESET-FIREABLE resets the fireable list for the open rule

REMOVE-FIREABLE removes a selected fireable entry from the fireable list. Remember that the fireable list is kept in order. The top ( highest address ) of the list is the most fireable instantiation.

Screen # 64

RESET-FIREABLE REMOVE-FIREABLE

RESET-FIREABLE resets the fireable list for the open rule

REMOVE-FIREABLE removes a selected fireable entry from the fireable list. Remember that the fireable list is kept in order. The top ( highest address ) of the list is the most fireable instantiation.

Screen # 65

CALC-CS

CALC-CS calculates the conflict set ( of time tags ) from the counter array which stores the WME offsets.

Screen # 66

Screen # 67

REDO-COUNTER

REDO-COUNTER assures that the counter is correct after a memory reallocation.

Screen # 68

ADD-FIREABLE

ADD-FIREABLE adds an instantiation to the fireable list.

Note: put conflict set sort in here !!!!!!!

Screen # 69

ADD-FIREABLE

ADD-FIREABLE adds an instantiation to the fireable list.

Note: put conflict set sort in here !!!!!!!

Screen # 70

SET-COUNT

SET-COUNT resets the counter arrays given the address of a list of time tags.

Screen # 71

Screen # 72

Screen # 73

Screen # 74

NEW-COUNT

NEW-COUNT is the main counter code. This word scans the counter array and sets the /LHS#/ variable appropriately. This code prevents the rule filter from having to be executed from the top ( first LHS ) each time it is entered. This word returns a finish flag to tell when no more counter patterns can be found.

Screen # 75

Counter Support

NEG-COUNT is the counter code for negated LHS's. This code will make sure that all entries on a negated LHS list are checked before going on to the next LHS in the rule filter.

Screen # 76

Counter Words

These words are for the counter code execution.

Screen # 77

PIVOT-COUNTER ( PLB*02/22/87)

PIVOT-TAB - execution table

| offset | purpose |
|---|---|
| 0 | Failed non-negated LHS |
| 1 | Passed entire rule filter - add to fireable list |
| 2 | Failed negated LHS - instantiation may still have a chance |
| 3 | Passed negated LHS - thus failing instantiation |

Screen # 78

INIT-COUNTER

INIT-COUNTER sets up the counter arrays for the rule filter and counter code.

Screen # 79

Screen # 80

Screen # 81

NEW-COUNT

NEW-COUNT is the main counter code. This word scans the counter array and sets the /LHS#/ variable appropriately. This code prevents the rule filter from having to be executed from the top ( first LHS ) each time it is entered. This word returns a finish flag to tell when no more counter patterns can be found.

Screen # 82

Counter Support

NEG-COUNT is the counter code for negated LHS's. This code will make sure that all entries on a negated LHS list are checked before going on to the next LHS in the rule filter.

Screen # 83

Counter Words

These words are for the counter code execution.

Screen # 84

PIVOT-COUNTER ( PLB*02/22/87)

PIVOT-TAB - execution table

| offset | purpose |
|---|---|
| 0 | Failed non-negated LHS |
| 1 | Passed entire rule filter - add to fireable list |
| 2 | Failed negated LHS - instantiation may still have a chance |
| 3 | Passed negated LHS - thus failing instantiation |

Screen # 85

Screen # 86

Screen # 87

Screen # 88

```
$ MAKE-NEGATED                                        ( PLB*05/22/87)
: MAKE-NEGATED  $% CR ." MAKE-NEGATED " .S
   R-# W@ 1+ <R-#> !  $ Rule Number
   LHS-# W@ PIVOT !    $ Store LHS#
$ Scan FIREABLE to see if any instantiations need to be removed
   R-#FIREABLE W@ ?DUP IF 1- 0 SWAP DO $% CR ." SC FIR " I . .S
      INIT-COUNTER I >FIREABLE SET-COUNT-NOPIV
      PIVOT @ SET-TO-END                              $% .COUNT
  0 BEGIN DROP /LHS#/ @ EXECUTE-RULE-FILTER .S DUP 1 AND UNTIL
   2 AND IF
         $ Move from fireable to not-fireable and set WME#
      ADD-NOT-FIREABLE I >FIREABLE SWAP
      DUP >R R-#LHS W@ 4* MOVE R>
      I REMOVE-FIREABLE   PIVOT @ 4* + TIME-TAG @ SWAP !
   THEN -1 +LOOP THEN ;
```

Screen # 89

Screen # 90

REM-NON-NEGATED

REM-NON-NEGATED is the code that scans the fireable list when a WME is removed from a non-negated LHS. If any instantiation is found with the removed time-tag, then it is removed from the fireable list.

Screen # 91

MAKE-NON-NEGATED

MAKE-NON-NEGATED executes the counter code and pivots on the newly made WME that has been added to a non-negated LHS list

Screen # 92

MK-WME

MK-WME scans all LHS's in a RP and checks for a LHS match. If a match is found then this code will then execute the appropriate code to determine if a new fireable instantiation needs to be added to the fireable list of a certain rule.

Screen # 93

RM-WME

RM-WME is the main code for removing a WME from the local working memory. This code scans all LHS lists to see if there are any references to the removed WME. If so, it will then check the fireable and not-fireable lists to see if any instantiations need to be removed or added. In this case, instantiations can only be added when a WME is removed from a negated LHS that will make the rule fireable again.

Screen # 94

RM-CLS

RM-CLS removes all WME's from a RP given a class number. All appropriate lists are reset.

Screen # 95

EVAL-RULES

EVAL-RULES is the main evaluation code. This word scans all rules and checks the fireable lists. If a rule has an entry on the fireable list, then conflict resolution is performed between that rule and any previous rule that may also have something on the fireable list.

After the most fireable rule is determined, the rule filter is executed once in order to recalculate the bound variables for the most fireable instantiation. The HOST needs the bound variables for the rule that is going to fire.

Screen # 96

FIRE-RULE

FIRE-RULE is the code that is executed after the HOST fires a rule. The RP needs to know if it has a rule fired so that it can remove the fired instantiation from the fireable list.

Screen # 97

GET#FIREABLE

GET#FIREABLE is the code that allows the HOST to determine how many fireable instantiations are on the fireable list for a particular rule. This is used by the HOST CS command.

Screen # 98

GET-NTH

GET-NTH allows the host to select the fireable instantiation and get in return the time tags and bound variables. Again, this code is used primarily by the HOST CS command.

Screen # 99

Screen # 0

```
$ CONRES.PF  --  Conflict Resolution Package      ( PLB*10/31/86)

Update Records :

<01> 10/31/86 PLB  -  Creation of Conflict Resolution Package
```

This is the main conflict resolution support for both the HOST and the RP's. Efforts have been taken to allow the same conflict resolution code to be loaded both on the HOST and the RP's. Conflict resolution on the RP's has to resolve conflicts among the multiple rules within a single RP, thus returning the single most fireable rule back to the HOST. Conflict resolution on the HOST has to scan all RP's to determine the single most fireable rule among the entire system.

Screen # 1

```
$ Load Screen for HOST Conflict Resolution        ( PLB*12/29/86)
DECIMAL START-SEGMENT .( ==> HOST Conflict Resolution Package)
     3        LOAD           $ HOST access words

$ 1EXIT pushes a 1 on the stack and exits the filter
CODE 1EXIT   R )+ I MOV  1 # S -) MOV  ,NEXT

$ 0EXIT pushes a 0 on the stack and exits the filter
CODE 0EXIT   R )+ I MOV  0 # S -) MOV  ,NEXT

     12       LOAD           $ Temporary debug support
     9   10   THRU           $ Main conflict resolution code
     4        LOAD           $ RESOLVE-HOST-CONFLICT

END-SEGMENT
```

Screen # 2

```
$ Load Screen for RP Conflict Resolution Package ( PLB*04/18/86)

DECIMAL START-SEGMENT .( ==> RP Conflict Resolution Package)

: MEA? ( - f )  <STRATEGY> W@ ;

     5        LOAD           $ RP access words
     13       LOAD           $ Temporary debug support
     9   10   THRU           $ Main conflict resolution code
     6   8    THRU           $ More RP conflict resolution code
     14  15   THRU           $ SORT-FIREABLE
END-SEGMENT
```

Screen # 3

```
$ HOST access words for Conflict Resolution       ( PLB*12/22/86)
WVARIABLE                  COMPLEXITY
WVARIABLE                  BEST-RULE
WVARIABLE                  NUM-OF-LHS
MAX#LHS 4*       ARRAY     CONFLICT-SET
MAX#LHS 4*       ARRAY     SORTED-CS
<CONFLICT-SET> >W1         CONSTANT NEW-CS
<COMPLEXITY>   >W1         CONSTANT NEW-COMPLEXITY
<CR-#LHS>      >W1         CONSTANT NEW-#LHS
<SORTED-CS>    >W1         CONSTANT NEW-SORTED-CS
<BEST-RULE>    >W1         CONSTANT NEW-RULE#

: ACCEPT-NEW  NEW-COMPLEXITY W@ COMPLEXITY W!
  NEW-RULE# W@ BEST-RULE W! NEW-#LHS W@ DUP 4* >R NUM-OF-LHS W!
  NEW-CS CONFLICT-SET R@ MOVE  NEW-SORTED-CS SORTED-CS R> MOVE ;
```

Screen # 4

```
$ HOST Conflict Resolution                        ( PLB*03/16/87)
WVARIABLE BEST-RP#
HEX
: RESOLVE-HOST-CONFLICT  -1 BEST-RULE W!  INST-#-IN-CS OFF
    #RP 0 DO I RP-ONLINE? IF   I !W1
          ~W1 <#-IN-CS> W@   INST-#-IN-CS +!
          NEW-RULE# W@ FFFF = NOT IF
              RESOLVE-CONFLICT
                 IF ACCEPT-NEW I BEST-RP# W! THEN
    THEN THEN LOOP
    BEST-RULE W@ FFFF = IF
       -1
    ELSE
       BEST-RULE W@    BEST-RP# W@ !W1
    THEN INST-#-IN-CS @ TOTAL-#-IN-CS +! ;
```

Screen # 5

```
$ RP access words for Conflict Resolution         ( PLB*02/25/87)
<COMPLEXITY>    CONSTANT     COMPLEXITY    VARIABLE OLD-NAME
```

```
<BEST-RULE>     CONSTANT    BEST-RULE
<CR-#LHS>       CONSTANT    NUM-OF-LHS
<CONFLICT-SET>  CONSTANT    CONFLICT-SET
<SORTED-CS>     CONSTANT    SORTED-CS

: NEW-COMPLEXITY        COMPILE R-COMPLEXITY ; IMMEDIATE
: NEW-#LHS              COMPILE R-#LHS ; IMMEDIATE
: NEW-SORTED-CS         R-#FIREABLE W@ 1- >FIREABLE
            R-#LHS W@ 4* + ;
: NEW-RULE#             COMPILE R-# ; IMMEDIATE

: ACCEPT-NEW NEW-COMPLEXITY W@ COMPLEXITY W! R-NAME @ OLD-NAME !
  NEW-RULE# W@ BEST-RULE W! NEW-#LHS W@ DUP 4* >R NUM-OF-LHS W!
  NEW-SORTED-CS SORTED-CS R> MOVE ;
```

Screen # 6

```
$ Self Consistent Set Sort                         ( PLB*12/29/86)

$ CREATE TEST  3 , 5 , 2 , 100 , 34 , 54 , 21 , 3 , 101 , 23 ,
$    34 , 34 , 45 , 12 , 43 , 56 , 67 , 89 , 102 , 3 , 65 ,
$ : .TEST 21 0 DO CR I 4* TEST + @ . LOOP ;
WVARIABLE NO-SWAP-FLG
: SORT ( addr n - ) DUP 2 < IF 2DROP EXIT THEN  $ no need to
                                  $ sort zero or one items
    1- 4* OVER + SWAP
    BEGIN  NO-SWAP-FLG W-ON   2DUP 2DUP
        DO I @  I 4+ @ 2DUP < IF I !  I 4+ ! NO-SWAP-FLG W-OFF
           ELSE 2DROP THEN 4 +LOOP
        SWAP 4-     $ backward sort !!!!
        DO I @  I 4+ @ 2DUP < IF I !  I 4+ ! NO-SWAP-FLG W-OFF
           ELSE 2DROP THEN -4 +LOOP
    NO-SWAP-FLG W@ UNTIL 2DROP ;
```

Screen # 7

```
$ RP SET-FIREABLE                                  ( PLB*02/24/87)
EXIT
: SET-FIREABLE  R-#FIREABLE W@ 1- >FIREABLE
    <L-CNT> R-#LHS W@ 4* MOVE
    0 EXECUTE-RULE-FILTER     ." FLG= " . $ get bindings, etc.
    R-#LHS W@ 0 DO
           I NEGATED-BITS BIT-TST IF
                I 4* R-SC-SET + OFF
           ELSE $ Something on list
           I 4* <L-CNT> + @@ ( OFFSET) I 4* <L-BASE> + @ +
           @ ( WME # )    I 4* R-SC-SET + !
           THEN
    LOOP R-SC-SET R-SORT-SET R-#LHS W@ 4* MOVE
        R-SORT-SET R-#LHS W@
        MEA? IF 1- SWAP 4+ SWAP THEN    $ MEA skips 1st LHS !!!
            SORT ; $ sort self consistent set
```

Screen # 8

```
$ RESOLVE-RP-CONFLICT                              ( PLB*01/03/87)

: RESOLVE-RP-CONFLICT  ( fireable-index - )
      RESOLVE-CONFLICT IF FIRE-INDEX W! ACCEPT-NEW
        ELSE DROP THEN ;
```

Screen # 9

```
$ SORTED-COMPARE                                   ( PLB*02/03/87)
: >SORTED-CS ( n - wme# ) DUP NUM-OF-LHS W@ < IF
  4* SORTED-CS + @ ELSE DROP 0 THEN ( CR ." OLD= " DUP .) ;
: >NEW-SORTED-CS ( n - wme# ) DUP NEW-#LHS W@ < IF
  4* NEW-SORTED-CS + @ ELSE DROP 0 THEN ( CR ." NEW=" DUP .) ;
VARIABLE  CR-INDEX               VARIABLE CR-MAX
M: SORTED-COMPARE  CR-INDEX OFF
    NEW-#LHS W@    NUM-OF-LHS W@ $ **2DUP CR ." OLD/NEW => " . .
                                 MAX CR-MAX ! BEGIN
$         CR ." INDEX = " CR-INDEX @ .
      CR-INDEX @ >SORTED-CS  CR-INDEX @ >NEW-SORTED-CS
      2DUP 0= SWAP 0= AND IF CR-MAX @ 1- CR-INDEX ! 2DROP
              ELSE
           2DUP > IF 2DROP 0EXIT THEN
                < IF       1EXIT THEN
    THEN CR-INDEX TALLY   CR-INDEX @ CR-MAX @ = UNTIL ;M
```

Screen # 10

```
$ Main Conflict Resolution Code for HOST and RP  ( PLB*03/01/87)
HEX
: RESOLVE-CONFLICT ( - accept-flag ) $  .CON-RULES
    BEST-RULE W@ FFFF = IF 1EXIT ( no rules pending ) THEN
    MEA? IF    SORTED-CS @   NEW-SORTED-CS @
         $ Note: MEA sorted 1st LHS is same as the full CS
         $ Sorted used here because RP does not store full CS
         2DUP > IF 2DROP 0EXIT THEN
              < IF       1EXIT THEN   THEN
$    ." start sorted-compare"
    SORTED-COMPARE
    COMPLEXITY W@ NEW-COMPLEXITY W@
         2DUP > IF 2DROP 0EXIT THEN
              < IF       1EXIT THEN     0 ( arbitrary !! ) ;
```

Screen # 11

Screen # 12

```
$ HOST TEMP                                        ( PLB*12/29/86)
HEX
: .CON-RULES  CR ." Resolving Conflict between "
    ." OLD-> " BEST-RULE W@ DUP FFFF = IF ." none " DROP
    ELSE OPEN-RULE R-TOKEN @ .TOKEN THEN
    ."   and NEW-> "
    NEW-RULE# W@ OPEN-RULE R-TOKEN @ .TOKEN ;
```

Screen # 13

```
$ RP TEMP                                          ( PLB*12/29/86)
HEX
: .CON-RULES  CR ." Resolving Conflict between "
    ." OLD-> " BEST-RULE W@ FFFF = IF ." none "
    ELSE OLD-NAME @ .TOKEN THEN
    ."   and NEW-> "
    R-NAME @ .TOKEN ;
```

Screen # 14

```
$ SORT-FIREABLE                                    ( PLB*04/18/87)

: MOVE-FIREABLE ( position-to-move-BEFORE - )    >R
    R-#FIREABLE W@ R@ - 1- ?DUP IF
        R@ >FIREABLE    R@ 1+ >FIREABLE    ROT R-#LHS W@ 8 * *
        <CMOVE
        JOT1 R> >FIREABLE R-#LHS W@ 8 * MOVE
        ELSE R> DROP ( already there !!!) THEN ;
```

Screen # 15

```
$ SORT-FIREABLE                                    ( PLB*04/18/87)
VARIABLE CFF     $ Compare Fireable Flag
: COMPARE-FIREABLE ( addr - f) R-#FIREABLE W@ 1- >FIREABLE
    R-#LHS W@ 4* >R   R@ + SWAP R> + SWAP   $ point to WME#'s
    R-#LHS W@ 0 DO
        OVER @ OVER @   2DUP > IF LEAVE CFF OFF THEN
                             < IF LEAVE CFF ON  THEN
    4+ SWAP 4+ SWAP LOOP 2DROP CFF @ ;

: SORT-FIREABLE    $% CR ." SORT-FIREABLE "
   R-#FIREABLE W@ 1- ?DUP IF  DUP >FIREABLE JOT1 R-#LHS W@
        8 * MOVE     1- 0 SWAP DO
        $ compare new instantiation with I instantiation
  I >FIREABLE COMPARE-FIREABLE IF I 1+ MOVE-FIREABLE LEAVE ELSE
        I 0= IF 0 MOVE-FIREABLE THEN THEN
    -1 +LOOP THEN ;
```

Screen # 20

Screen # 21

Load screen for HOST conflict resolution

Screen # 22

Load screen for RP conflict resolution

Screen # 23

Access words to allow HOST and RP's to load the same conflict resolution code

Screen # 24

RESOLVE-HOST-CONFLICT scans all active RP's and does conflict resolution between the scanned RP and the current best fireable rule. This word returns the rule number of the best fireable rule or -1 if no rules are fireable.

Screen # 25

Access words to allow HOST and RP's to load the same conflict resolution code

Screen # 26

Simple Bubble Sort for RP use only. The OPS5 standard requires that the time tags for all LHS's in a rule must be sorted for determination of the most fireable rule. This is done once on the RP's. The sorted order is needed by the host but is simply read from the RP to avoid having to resort the conflict set.

Screen # 27

OLD CODE - REMOVE THIS SOON !!!!!!!

Screen # 28

RESOLVE-RP-CONFLICT resolves the conflict between the current rule being evaluated and the previous most fireable within a particular RP. If the current rule dominates, the fireable index is saved along with the new rule information ( ACCEPT-NEW ) . The fireable index simply is the RP's own rule number for a particular rule. This should not be confused with the HOST rule number which is assigned in the order of compilation. The fireable index is assigned by the RP at the time the rule LHS's are being loaded and is an offset into a local rule pointer table for the RP. ( 0,1,2 ... )

Screen # 29

SORTED-COMPARE compares the conflict set of two rules to determine which one dominates. This comparison takes place on the sorted set of time-tags. At any point in the comparison, the rule that has the higher numbered time-tag will dominate.

Screen # 30

RESOLVE-RP-CONFLICT is the main conflict resolution code.
If the MEA strategy is selected, the first LHS in each rule dominates all others. If a particular rule dominates at this point, then no further computation is required.
If the LEX strategy is selected ( or MEA finds no 1st LHS dominance ) then the sorted comparison is done.
If no dominance is found still, then the rule complexity of the two rules in question will determine dominance.
Finally, if two rules are equal up to this point an arbitrary selection can be made. In this case, we simply give dominance to the rule that has already been accepted. This simply is due to a slight increase in speed by not having to accept the new rule.

Screen # 31

Screen # 32

Screen # 33

Screen # 34

Screen # 35

Screen # 0

```
$ COUNTER.PF -- OPS Counter Statement Support ( PLB*02/10/87)

Update Records :

<01> 2/10/87 PLB - Creation of Counter Support

The counter support here is a start at a general purpose
   extension to the OPS language. It is required for running
   IDA's Chemical Synthesis program.
```

Screen # 1

```
$ Load Screen for Counter Support Statement      ( PLB*02/11/87)
DECIMAL START-SEGMENT .( ==> Counter Statement Support Package)

      3  5      THRU    $ Low level counter support

END-SEGMENT
```

Screen # 2

```
$ Load Screen for Counter Word Compilation       ( PLB*02/11/87)
DECIMAL START-SEGMENT .( ==> Counter Statement Compiler Package)

      6  10     THRU    $ Higher level counter statements

END-SEGMENT
```

Screen # 3

```
$ Counter Initialization                           ( PLB*02/11/87)

WVARIABLE  COUNTER-COUNT
VARIABLE   'COUNTER            $ handle for counter stuff

: INIT-COUNTER      COUNTER-COUNT W-OFF
      80  ( 10 initial counters )  DUP OPEN-STATIC
      DUP 'COUNTER !  CLOSE-STATIC ;
```

Screen # 4

```
$ COUNTER-OFFSET                                   ( PLB*02/11/87)
VARIABLE   C-TAG
: COUNTER-OFFSET ( token - offset or -1 )   -1 C-TAG !
      COUNTER-COUNT W@ ?DUP IF 0 DO
            I 8 * 'COUNTER @@ + @ OVER = IF I 8 * C-TAG !
            LEAVE THEN
         LOOP  DROP C-TAG @
      ELSE DROP -1 THEN ;

: CREATE-COUNTER ( token - error-flag ) DUP COUNTER-OFFSET
   -1 = IF COUNTER-COUNT W-TALLY   COUNTER-COUNT W@ 8 *
      'COUNTER @ SIZE-OF-FRAME  > IF 40 'COUNTER @
      RESIZE-STATIC THEN
      COUNTER-COUNT W@ 1- 8 *  'COUNTER @@ + DUP 4+ OFF
      ! ( store token )
   0 ELSE DROP ( error, already a counter ) 1 THEN ;
```

Screen # 5

```
$ SET-COUNTER                                        ( PLB*02/11/87)

: SET-COUNTER ( value offset - )  'COUNTER @@ + 4+ ! ;

: VALUE-COUNTER ( offset - value ) 'COUNTER @@ + 4+ @ ;

: TALLY-COUNTER  ( offset - value ) 'COUNTER @@ + 4+ DUP TALLY
     @ ;

: DOCK-COUNTER  ( offset - value ) 'COUNTER @@ + 4+ DUP DOCK
     @ ;

: CLEAR-ALL-COUNTERS    COUNTER-COUNT W@ ?DUP IF 0 DO
   0  I 8 *  SET-COUNTER LOOP THEN ;
```

Screen # 6

```
$ CLIST                                              ( PLB*02/11/87)

OPS: CLIST END')'
    COUNTER-COUNT W@ ?DUP IF 0 DO ?CR
       I 8 * 'COUNTER @@ + DUP @ +REV .TOKEN -REV
       10 20 ALIGN 4+ @ 10 U.R
    LOOP CR
    ELSE ?CR ." No Counters have been defined" CR THEN ;
```

Screen # 7

```
$ COUNTER statement                                  ( PLB*02/11/87)

OPS: COUNTER GET-ATOM ATOM-TYPE IF .ERROR-LINE
    ." Illegal name " .AT$ ."  for a counter value." ABORT THEN
    AT$ $>TOKEN DUP END')'
    CREATE-COUNTER  IF .ERROR-LINE ." Counter '" .TOKEN
    ." ' has already been defined." ABORT ELSE DROP THEN ;
```

Screen # 8

```
$ Counter CMD: words                                 ( PLB*02/15/87)

: PROCESS-CNT GET-ATOM AT$ TOKEN?  COUNTER-OFFSET DUP -1 =
    IF .ERROR-LINE ." Atom " .AT$ ."  is not a counter." ABORT
    THEN [RHS,CFA] cell W,RHS RHS-END')' ;

: C>VALUE   ( offset - token)   VALUE-COUNTER #>TOKEN ;
: C>NEXT    ( offset - token)   TALLY-COUNTER #>TOKEN ;
: C>DOCK    ( offset - token)   DOCK-COUNTER  #>TOKEN ;

CMD: VALUE   PROCESS-CNT [RHS,CFA] C>VALUE    1 ;
CMD: GCOUNT  PROCESS-CNT [RHS,CFA] C>NEXT     1 ;
CMD: NEXT    PROCESS-CNT [RHS,CFA] C>NEXT     1 ;
CMD: DOCK    PROCESS-CNT [RHS,CFA] C>DOCK     1 ;
```

Screen # 9

```
$ SET support                                        ( PLB*02/11/87)

: CHK-FOR-NUM ( token - token )
    DUP TOKEN-NUM? NOT IF CR ." Error - must be a numeric, not "
    .TOKEN ABORT THEN ;
```

Screen # 10

```
$ SET                                                ( PLB*02/11/87)
```

```
RHS: SET  GET-ATOM AT$ TOKEN? COUNTER-OFFSET DUP -1 = IF
   .ERROR-LINE ." Must SET a counter, not " .AT$ ."  in RHS# "
   #RHS W@ . ." in production " .'RN$' CR-ABORT THEN
   GET-ATOM ATOM-TYPE CASE
   0 OF ( literal) AT$ TOKEN? DUP TOKEN-NUM? NOT IF .ERROR-LINE
      ." Must SET a counter to a numeric value, not " .AT$
      ."  in RHS# " #RHS W@ . ." in production " .'RN$'
      ABORT THEN              [RHS,CFA] long ,RHS ENDOF
   1 OF ( variable) BOUND? IF DROP [RHS,CFA] /@RP-BINDING/
      BIND-POS W@ 4* W,RHS ELSE .RHS-ILL-BV THEN ENDOF
   2 OF ( function) EXEC-CMD ?.RHS-ILL-FUNC ENDOF
   .RHS-ILL-ATOM ENDCASE
   [RHS,CFA] CHK-FOR-NUM    [RHS,CFA] TOKEN>#
   [RHS,CFA] cell   W,RHS   [RHS,CFA] SET-COUNTER RHS-END')' ;
```

Screen # 20

Screen # 21

```
COUNTER STUFF                                        ( PLB*02/11/87)

DEFINE:      (COUNTER  NAME)
USE:         (GCOUNT  NAME)   or  (NEXT NAME)
             (VALUE   NAME)
                     FETCH FROM OPS: AND RHS:
SET:         ????    SET FROM OPS: AND RHS:
             (CLEAR-COUNTERS)    OPS:, RHS: WORDS !!!!
INIT-COUNTER
CREATE-COUNTER        ( TOKEN - F )
COUNTER-OFFSET        ( TOKEN - OFFSET OR -1 )
SET-COUNTER           ( VALUE OFFSET - )
VALUE-COUNTER         ( OFFSET - VALUE )
TALLY-COUNTER         ( OFFSET - VALUE )
DOCK-COUNTER          ( OFFSET - VALUE )
CLEAR-ALL-COUNTERS
```

Screen # 22

Screen # 23

INIT-COUNTER sets up the counter package. Each counter requires 8 bytes. The first four bytes is the token for the counter name. The second four bytes is the counter value.

Screen # 24

COUNTER-OFFSET scans existing counters to return the counter offset if the counter exists. If the counter does not exist, then -1 is returned.

CREATE-COUNTER takes a token for the counter name and creates a counter. If the counter of the given name already exists an error flag is returned.

Screen # 25

SET-COUNTER sets the value of a given counter

VALUE-COUNTER returns the value of the given counter

TALLY-COUNTER increments the counter and then returns the value of a given counter DOCK-COUNTER decrements the counter and then returns the value of a given counter CLEAR-ALL-COUNTERS sets the value of all defined counters to 0

Screen # 26

CLIST is an OPS command that prints all counters and their values

Screen # 27

COUNTER is the OPS command that defines a new counter

Syntax:

(COUNTER THIS-IS-MY-COUNTER)

Screen # 28

These CMD: words allow the counters to be incorporated into the RHS's of the rules Screen # 29

CHK-FOR-NUM will assure that a counter has been assigned a numeric token. not a string token.

Screen # 30

SET is a RHS: word to allow the counter to be set from a rule RHS.

What is claimed is:

1. A parallel processing system for processing production rule programs having a plurality of rules wherein each rule includes at least one non-negated "if" condition left hand side and at least one "then" action right hand side comprising:

(a) a data bus;

(b) an address bus;

(c) a host processor connected to said data and address buses, said host processor including means for executing the right hand sides of said rules;

(d) a plurality of rule processors, each connected to said data and address busses and each including a memory storage device having a data memory section storing data and a program memory section for storing said at least one left hand side of at least one of said rules, said memory storage device having storage locations designated by addresses, each rule processor comprising means for evaluating said at least one stored left hand side of said at least one rule and for generating an associated match flag if all conditions specified in the stored at least one left hand side are satisfied by at least a combination of said stored data;

(e) said host processor comprising means responsive to said match flags from each of said rule processors, for selecting one of said rules and executing the actions of said at least one right hand side of said selected rule for generating commands and associated data;

(f) said host processor comprising means for transmitting said commands and associated data to all of said rule processors; and (g) each of said rule processors comprising means for receiving said commands and associated data and selecting ones of said commands and associated data for which said associated data is identified in said at least one stored left hand side of said rule and for changing said stored data in accordance with said selected ones of said commands and associated data.

2. A parallel processing system as recited in claim 1 wherein said host processor comprising means is operative for transmitting said commands and associated data to all of said rule processors simultaneously.

3. A parallel processing system as recited in claim 1 wherein said host processor includes a memory and means for mapping a portion thereof directly into addresses of the memory storage device of each rule processor.

4. A parallel processing system as recited in claim 3 wherein said mapping means includes means for mapping addresses of said portion of said host processor memory into the same addresses of each of said memory storage devices of each rule processor.

5. A parallel processing system as recited in claim 3 wherein said portion of said host processor memory includes a network section and a window section and wherein said mapping means includes:

(a) means for simultaneously mapping host processor addresses corresponding to said network section into the same rule processor addresses for each of said rule processor memory storage devices; and (b) means for mapping host processor addresses corresponding to said window section into rule processor memory storage device addresses for a selected one of said rule processors.

6. A parallel processing system as claimed in claim 5 wherein said commands include one or more from the group: MAKE, REMOVE and MODIFY, and wherein said associated data includes an element class an at least one working memory element (WME) defined as an attribute-value pair, said MAKE command creating a WME of an element class, said REMOVE command deleting a WME and said MODIFY command removing a WME and replacing same with a WME in the same element class.

7. A parallel processing system as recited in claim 5 further including an interface connected to said host processor and each of said rule processors.

8. A parallel processing system as recited in claim 7 wherein said interface includes a window port means for latching said host processor addresses corresponding to said window section.

9. A parallel processing system as recited in claim 8 wherein said interface further includes a status port means for latching a status of said rule processors for input into said host processor.

10. A parallel processing system as recited in claim 3 wherein said portion of said host processor memory includes a network section, a first window section and a second window section, and wherein said mapping means includes:

(a) means for simultaneously mapping host processor addresses corresponding to said network section into the same rule processor addresses for each of said rule processor memory storage devices; and (b) means for mapping host processor addresses corresponding to said first window section into first corresponding rule processor memory storage device addresses for a first of said rule processors and for mapping host processor addresses corresponding to said second window section into second corresponding rule processor memory storage device addresses of a second of said rule processors.

11. A parallel processing system as recited in claim 10 wherein said host processor comprises means, operative in a window-to-window transfer mode, for addressing said first and second window sections for transmitting information stored in said first corresponding addresses of said memory storage device of said first rule processor to locations specified by said second corresponding addresses of said memory storage of said second rule processor.

12. A parallel processing system as recited in claim 11 wherein said host processor comprises means, operative to test operability of said plurality of rule processors, for detecting a malfunction.

13. A parallel processing system as recited in claim 12 wherein said host processor comprises means, operative in said window-to-window transfer mode, for transmitting the left hand side rule stored in a detected malfunctioning rule processor to another rule processor which is not detected as malfunctioning.

14. A parallel processing system as recited in claim 10 further comprising an interface connected to said host processor and each of said rule processors, said interface including a first window port means for latching said host processor address corresponding to said first window section and a second window port means for latching said host processor address corresponding to said second window section.

15. A parallel processing system as recited in claim 3 wherein said host processor comprises means, operative in a network transmission mode, for simultaneously transmitting information into the same address locations of the memory storage device of each of said rule processors and in a window transmission mode for transmitting information into address locations of the memory storage device of a designated rule processor.

16. A parallel processing system as recited in claim 15 wherein said host processor comprises means for transmitting said commands and associated data in said network mode.

17. A parallel processing system as recited in claim 14 wherein said host processor comprises means for transmitting said at least one left hand side of said at least one rule in said window transmission mode.

18. A parallel processing system as recited in claim 15 wherein said host processor comprises means for transmitting said at least one left hand side of said at least one rule in said window transmission mode.

19. A parallel processing system as recited in claim 15 wherein said host processor comprises means for loading an operating system into the memory storage device of each of said rule processors in a network transmission mode.

20. A parallel processing system as recited in claim 15 wherein said rule processor includes a CPU which includes means for halting operation of said rule processor upon completion of evaluation of said at least one left hand side of said at least one rule, said host processor including means for simultaneously starting said CPUs of each of said rule processors after completion of a network transmission mode.

21. A parallel processing system as recited in claim 1 wherein said host processor comprises means, operative in a network transmission mode, for simultaneously transmitting information into the same address locations of the memory storage device of each of said rule processors and in a window transmission mode for transmitting information into address locations of the memory storage device of a designated rule processor.

22. A parallel processing system as recited in claim 21 wherein said host processor comprises means for transmitting said commands and associated data in said network mode.

23. A parallel processing system as recited in claim 22 wherein said host processor comprises means for transmitting said at least one left hand side of said at least one rule in said window transmission mode.

24. A parallel processing system as recited in claim 21 wherein said host processor comprises means for transmitting said at least one left hand side of said at least one rule in said window transmission mode.

25. A parallel processing system as recited in claim 21 wherein said host processor comprises means for loading an operating system into the memory storage device of each of said rule processors in a network transmission mode.

26. A parallel processing system as recited in claim 21 wherein said commands include one or more from the group: MAKE, REMOVE, and MODIFY, and wherein said associated data includes an element class and at least one working memory element (WME) defined as an attribute-value pair, said Make command creating a WME of an element class, said REMOVE command deleting a WME and said MODIFY command removing a WME and replacing same with a WME in the same element class.

27. A parallel processing system as recited i claim 24 wherein said host processor comprises means for transmitting to said rule processors said command and associated data in the form of message bytes and for transmitting said WME by designating only said value information, said attribute information being specified by the position of said value information within said transmitted message bytes.

28. A parallel processing system as recited in claim 1 wherein each of said rule processors operates independently of the others.

29. A parallel processing system as recited in claim 1 wherein said host processor comprises means for simultaneously initiating operation of each rule processor for evaluation of said stored left hand sides.

30. A parallel processing system as recited in claim 29 wherein each of said rule processors includes a CPU and means for generating a "complete" signal indicative of the non-running state of said CPU, said host processor including means, responsive to said "complete" signal for each of said rule processors in addition to said match flags, for selecting said rule and for executing the at least one right hand side action for said selected rule.

31. A parallel processing system as recited in claim 1 wherein said commands include one or more from the group: MAKE, REMOVE, and MODIFY, and wherein said associated data includes an element class an at least one working memory element (WME) defined as an attribute-value pair, said TAKE command creating a WME of an element class, said REMOVE command deleting a WME and said MODIFY command removing a WME and replacing same with a WME in the same element class.

32. A parallel processing system as claimed in claim 31 wherein said host processor comprises means for transmitting to said rule processors said command and associated data in the form of message bytes and for transmitting said WME by designating only said value information, said attribute information being specified by the position of said value information within said transmitted message bytes.

33. A parallel processing system as claimed in claim 32 wherein said host processor comprises means for transmitting to said rule processors said command and associated data in the form of message bytes and for transmitting said WME by designating only said value information, said attribute information being specified by the position of said value information within said transmitted message bytes.

34. A parallel processing system as recited in claim 1 wherein each of said rule processors includes a CPU and an associated status port for providing a status signal indicative of the status of said CPU, said host processor including means for accessing said status port without interrupting said CPU.

35. A parallel processing system as recited in claim 34 wherein each CPU of each of said rule processors includes means for providing a "complete" signal to said associated status port, said "complete" signal indicative of the non-running state of said associated CPU.

36. A parallel processing system as recited in claim 1 further comprising an interface connected to said host processor and each of said rule processors.

37. A parallel processing system as recited in claim 36 wherein said memory storage device of each of said rule processors includes a dynamic random access memory (DRAM) having said storage locations, and said interfacing includes means for refreshing said storage locations by generating refresh addresses.

38. A parallel processing system as recited in claim 37 wherein said refreshing means includes means for refreshing all of said DRAMs simultaneously.

39. A parallel processing system as recited in claim 37 wherein said interface further comprises an address multiplexer for selecting among (1) addresses from said host processor and (2) addresses from said refreshing means for passing same to said DRAMs for each of said rule processors.

40. A parallel processing system for processing programs having a plurality of rules, each rule having a conditional part which satisfies conditions involving data elements and an action part which satisfies actions to be taken in creating or deleting said data elements, said system comprising:

(a) a host processor, said host processor having a storage device for storing said data elements and at least the action part of each of said rules;

(b) a plurality of rule processors, each rule processor having a memory for storing the condition part of at least one rule;

(c) means for transmitting an indication of said created or deleted data elements from said host processor simultaneously to each of said rule processors;

(d) each rule processor including means for receiving said data elements and creating or deleting at least said data elements involved in said stored conditional part of said at least one rule;

(e) said rule processors including means, operative in response to a start signal transmitted by said host processor, for evaluating said conditional part of said at least one rule, each rule processor including means for evaluating said conditional part independently of other rule processors;

(f) means for transmitting a group of data elements which satisfies said conditional part of any rule from said rule processors to said host processor; and (g) said host processor including means for selecting a single rule among the plurality of said rules having satisfied conditional parts and for executing said action part of said selected rule.

41. A parallel processing system as recited in claim 40 wherein each of said rule processors comprises means for selecting one group among a plurality of groups of data elements which each satisfied said conditional part of said at least one rule for permitting transmission of said selected group to said host processor.

42. A parallel processing system as recited in claim 41 wherein each of said groups of data elements self-consistently satisfy each of a plurality of conditions specified by said conditional part of said at least one rule.

43. A parallel processing system as recited in claim 40 wherein more than one rule conditional part of more than one rule is stored in said memory of at least one rule processor.

44. A parallel processing system as recited in claim 40 wherein said data elements created by each of said rule processors are stored in the corresponding memory thereof.

45. A parallel processing method for processing production rule programs having a plurality of rules wherein each rule includes at least one "if" condition left hand side and at least "then" action right hand side comprising the steps of:

(a) connecting a host processor to a data and address bus, said host processor executing the right hand sides of said rules;

(b) connecting a plurality of rule processors to said data and address buses, each rule processor including a memory storage device having a data memory section and a program memory section, said memory storage device having storage locations designated by addresses;

(c) storing data in said data memory section;

(d) storing said at least one left hand side of at least one of said rules in said program memory section;

(e) evaluating in each rule processor said at least one stored left hand side of said at least one rule;

(f) generating an associated match flag if all conditions specified in the stored at least one left hand side are satisfied by at least a combination of said stored data;

(g) selecting, by means of said host processor and in response to said match flags from each of said rule processors, one of said rules and executing the actions of said at least one right hand side of said selected rule fo generating commands and associated data;

(h) transmitting, by means of said host processor, said commands and associated data to all of said rule processors; and (i) receiving in each of said rule processors said commands and associated data and selecting one of said commands and associated data for which said associated data is identified in said at least one stored left hand side of said rule and changing said stored data in accordance with said selected ones of said commands and associated data.

46. A parallel processing method as recited in claim 45 wherein said transmitting step includes transmitting said commands and associated data to all of said rule processors simultaneously.

47. A parallel processing method as recited in claim 45 wherein said host processor includes a memory and said method further comprises a step of mapping a portion of said host processor memory directly into addresses of the memory storage device of each rule processor.

48. A parallel processing method as recited in claim 47 wherein said mapping step includes the step of mapping addresses of said portion of said host processor memory into the same addresses of each of said memory storage devices of each rule processor.

49. A parallel processing system as recited in claim 48 wherein said portion of said host processor memory includes a network section and a window section and wherein said mapping step includes:

(a) simultaneously mapping host processor addresses corresponding to said network section into the same rule processor addresses for each of said rule processor memory storage devices; and (b) mapping host processor addresses corresponding to said window section into rule processor memory storage device addresses for a selected one of said rule processors.

50. A parallel processing method as recited in claim 47 wherein said portion of said host processor memory includes a network section, a first window section and a second window section and wherein said mapping step includes the steps of:

(a) simultaneously mapping host processor addresses corresponding to said network section into the same rule processor addresses for each of said rule processor memory storage devices; and (b) mapping host processor addresses corresponding to said first window section into first corresponding rule processor memory storage device addresses for a first of said rule processors and for mapping host processor addresses corresponding to said second window section into second corresponding rule processor memory storage device addresses of a second of said rule processors.

51. A parallel processing method as recited in claim 50 including the step of transmitting information stored in said first corresponding addresses of said memory storage device of said first rule processor to locations specified by said second corresponding addresses of said second rule processor.

52. A parallel processing method for processing programs having a plurality of rules, each rule having a conditional part which specifies conditions involving data elements and an action part which specifies actions to be taken in creating or deleting said data elements, said system comprising the steps of:

(a) storing said data elements and at least the action part of each of said rules in a host processor having a storage device;

(b) storing the conditional part of at least one rule in each of a plurality of rule processors, each rule processor having a memory;

(c) creating or deleting said data elements;

(d) transmitting indications of said created or deleted data element from said host processor simultaneously from each of said rule processors;

(e) receiving in each rule processor said data elements and creating or deleting in each rule processor at least said data elements involved in said stored conditional part of said at least one rule;

(f) transmitting a start signal to each rule processor;

(g) evaluating in each rule processor in response to said start signal transmitted by said host processor, said conditional part of said at least one rule, each rule processor operative in evaluating said conditional part independently of other rule processors;

(h) transmitting a group of data elements which satisfies said conditional part of any rule from said rule processors to said host processor; and (i) selecting in said host processor a single rule among any plurality of said rules having satisfied conditional parts and executing said action part of said selected rule.

53. A parallel processing method as recited in claim 52 further including the step of selecting, within each rule processor, among a plurality of groups of that element which each satisfy said conditional part of said at least one rule for permitting transmission of said selected group to said host processor.

54. A parallel processing method as recited in claim 53 wherein each of said groups of data elements self-consistently satisfy each of a plurality of conditions specified by said conditional part of said at least one rule.

55. A parallel processing method as recited in claim 52 further including the step of storing more than one conditional part of more than one rule in said memory of at least one rule processor.

* * * * *